US010955994B2

(12) United States Patent
Kondrk et al.

(10) Patent No.: US 10,955,994 B2
(45) Date of Patent: Mar. 23, 2021

(54) USER INTERFACES FOR DOWNLOADING APPLICATIONS ON AN ELECTRONIC DEVICE

(71) Applicant: Apple Inc., Cupertino, CA (US)

(72) Inventors: Robert H. Kondrk, Cupertino, CA (US); Alan C. Dye, San Francisco, CA (US); William M. Bachman, San Jose, CA (US); Monika E. Gromek, Oakland, CA (US); Alexander Constantin Diego Fringes, San Francisco, CA (US); Joseph Andrew Magnani, San Francisco, CA (US); Colin Bennett, San Francisco, CA (US); Alexander Johnston, San Francisco, CA (US); Jessica R. Caimi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 15/719,217

(22) Filed: Sep. 28, 2017

(65) Prior Publication Data

US 2018/0348967 A1 Dec. 6, 2018

Related U.S. Application Data

(60) Provisional application No. 62/524,592, filed on Jun. 25, 2017, provisional application No. 62/514,335, filed on Jun. 2, 2017.

(51) Int. Cl.

*G06F 17/00* (2019.01)
*G06F 3/0482* (2013.01)

(Continued)

(52) U.S. Cl.

CPC .............. *G06F 3/0482* (2013.01); *G06F 8/20* (2013.01); *G06F 8/34* (2013.01); *G06F 9/44521* (2013.01);

(Continued)

(58) Field of Classification Search

None

See application file for complete search history.

(56) References Cited

U.S. PATENT DOCUMENTS 5,483,261 A 1/1996 Yasutake
5,488,204 A 1/1996 Mead et al.

(Continued)

FOREIGN PATENT DOCUMENTS

JP 2000-163031 A 6/2000
JP 2002-342033 A 11/2002

(Continued)

OTHER PUBLICATIONS

Screen captures from YouTube video clip entitled "Playstation Store PS4 Walkthrough! (Games, Deals, Redeem Codes , and More!) 2020", 11 pages, uploaded on Jan. 28, 2017 by user "Splitz". Retrieved from Internet: < https://www.youtube.com/watch?v=-Zk9bzfFeOc> (Year: 2017).*

(Continued)

*Primary Examiner* — Mustafa A Amin
(74) *Attorney, Agent, or Firm* — Kubota & Basol LLP

(57) ABSTRACT

In some embodiments, an electronic device presents information about, and facilitates downloading of, featured applications in an app store application. In some embodiments, an electronic device facilitates browsing of applications and games by category. In some embodiments, an electronic device facilitates presentation of information about in-app purchases for a game or application in an app store application. In some embodiments, an electronic device facili- (Continued)

tates the purchase of in-app purchases for the games or applications that are available on the electronic device. In some embodiments, an electronic device facilitates the download/purchase of games, applications and/or in-app purchases from outside of an app store application that is for browsing such content available on the electronic device. In some embodiments, an electronic device autoplays media content corresponding to applications (e.g., games, non-game applications, etc.) in an app store application so as to facilitate the ordered presentation of the media content to the user.

21 Claims, 264 Drawing Sheets

(51) Int. Cl.

| | |
|---|---|
| ***G06Q 30/06*** | (2012.01) |
| ***G06F 21/62*** | (2013.01) |
| ***G06F 8/20*** | (2018.01) |
| ***G06F 9/445*** | (2018.01) |
| ***G06F 9/451*** | (2018.01) |
| ***G06F 8/34*** | (2018.01) |
| *G06F 3/0481* | (2013.01) |

(52) U.S. Cl.
CPC .......... *G06F 9/451* (2018.02); *G06F 21/6209* (2013.01); *G06Q 30/0641* (2013.01); *G06F 3/04817* (2013.01)

(56) References Cited

U.S. PATENT DOCUMENTS 5,825,352 A 10/1998 Bisset et al.
5,835,079 A 11/1998 Shieh
5,880,411 A 3/1999 Gillespie et al.
6,188,391 B1 2/2001 Seely et al.
6,310,610 B1 10/2001 Beaton et al.
6,323,846 B1 11/2001 Westerman et al.
6,690,387 B2 2/2004 Zimmerman et al.
7,015,894 B2 3/2006 Morohoshi
7,184,064 B2 2/2007 Zimmerman et al.
7,663,607 B2 2/2010 Hotelling et al.
8,479,122 B2 7/2013 Hotelling et al.
9,454,349 B2 * 9/2016 Farrell ...................... G06F 8/38
10,391,403 B2 * 8/2019 Yong ....................... A63F 13/35
2006/0197753 A1 9/2006 Hotelling
2009/0307105 A1 * 12/2009 Lemay .................. G06F 3/0482 705/26.1
2011/0117890 A1 * 5/2011 Lundgren ......... H04M 1/72525 455/414.1
2012/0089521 A1 4/2012 Abrevaya et al.
2012/0166308 A1 * 6/2012 Ahmed .................. G06Q 20/12 705/26.41
2013/0124606 A1 5/2013 Carpenter et al.
2013/0198606 A1 * 8/2013 Farrell ................ G06F 9/44526 715/234
2013/0332886 A1 * 12/2013 Cranfill ................ G06F 3/0482 715/835
2014/0359595 A1 * 12/2014 Sehgal ...................... G06F 8/61 717/171
2015/0074546 A1 * 3/2015 Slawson ............... G06F 3/0484 715/747
2015/0149329 A1 * 5/2015 Tam .................. G06Q 30/0643 705/27.2
2015/0207800 A1 * 7/2015 Jitkoff .................. H04L 63/102 726/4
2015/0347010 A1 12/2015 Yang et al.
2015/0348001 A1 12/2015 Van Os et al.
2016/0004709 A1 1/2016 Butts
2016/0045827 A1 * 2/2016 Moya ..................... A63F 13/60 345/582
2016/0103668 A1 * 4/2016 Srinivasan ................ G06F 8/61 717/178
2016/0259517 A1 9/2016 Butcher et al.
2016/0309003 A1 10/2016 Boyd et al.
2017/0357721 A1 * 12/2017 Chernenkov ....... G06F 16/9566

FOREIGN PATENT DOCUMENTS

WO WO_2018_22307 A1 12/2018
WOWO_2018_22307WO_2 A1 12/2018

OTHER PUBLICATIONS

International Search Report dated Oct. 30, 2018, for PCT Application No. PCT/US2018/035710, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combing Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
International Preliminary Report on Patentability received for PCT Patent Application No. PCT/US2018/035710, dated Dec. 12, 2019, 11 pages.

* cited by examiner

User B

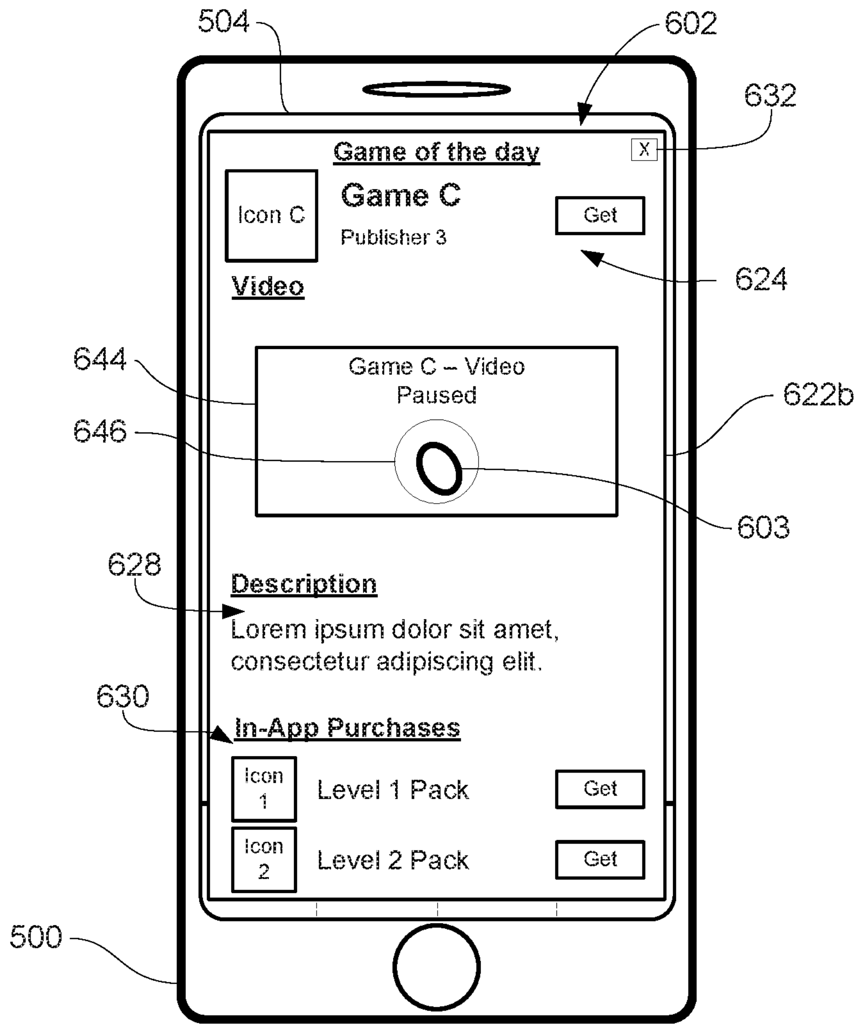
FIG. 6AAA

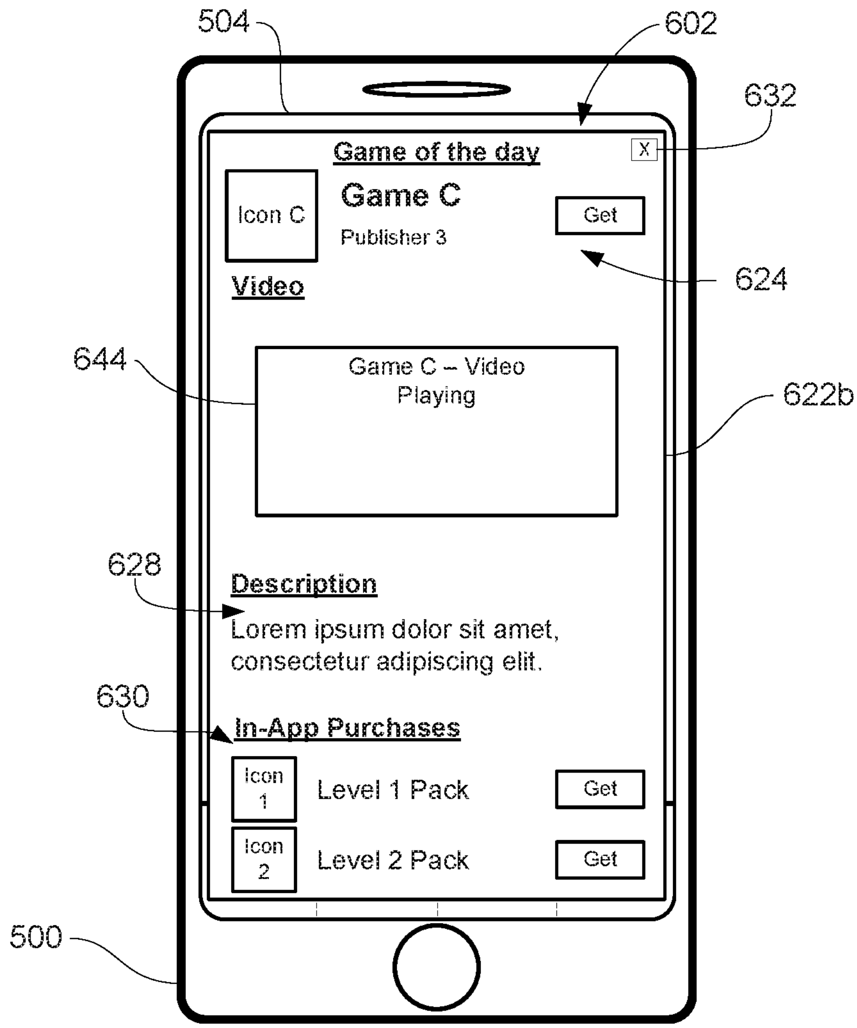
FIG. 6BBB

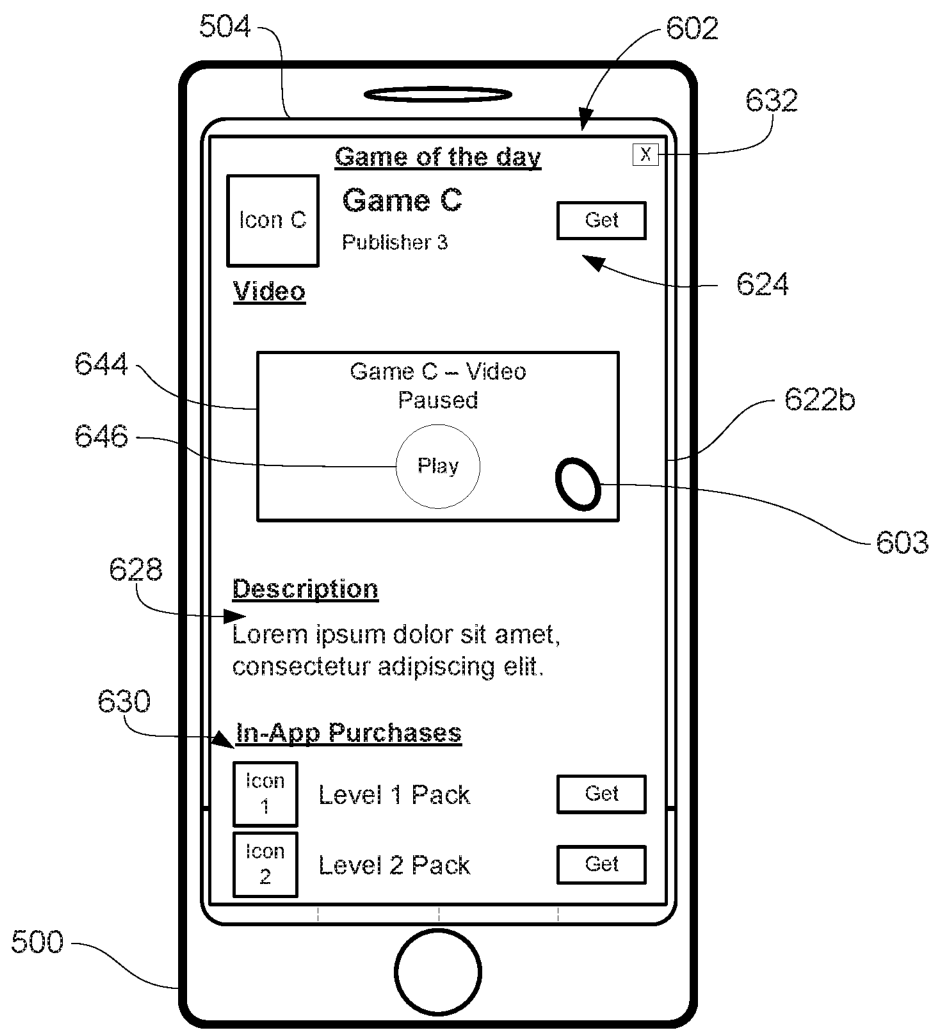
FIG. 6CCC

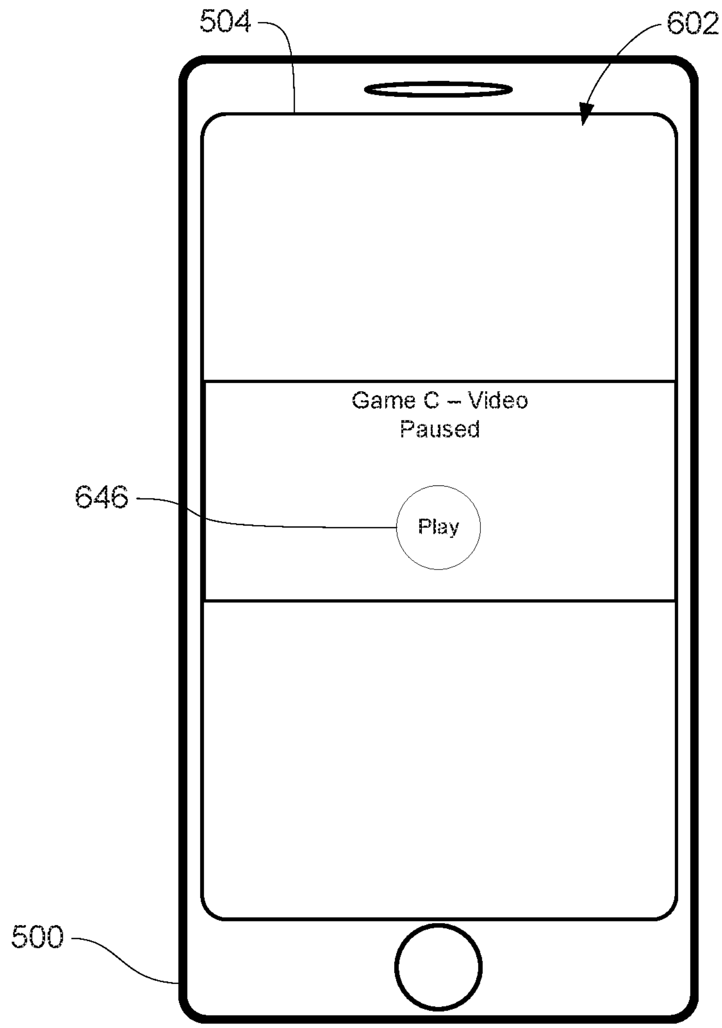
FIG. 6DDD

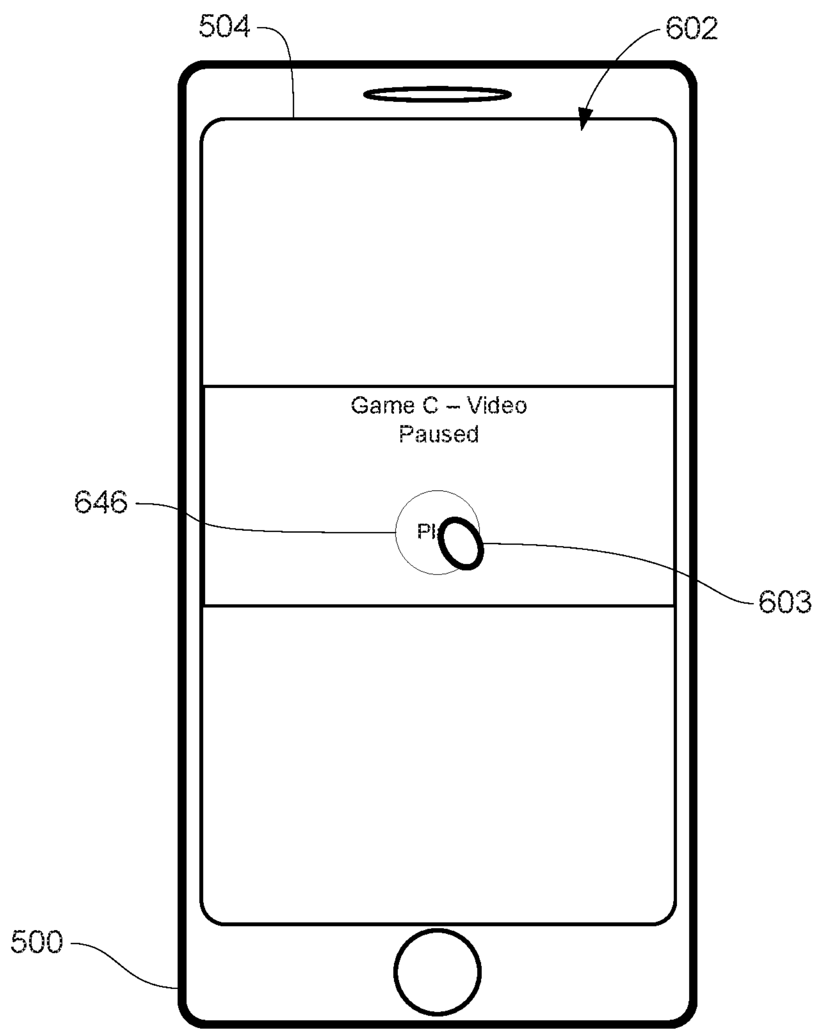
FIG. 6EEE

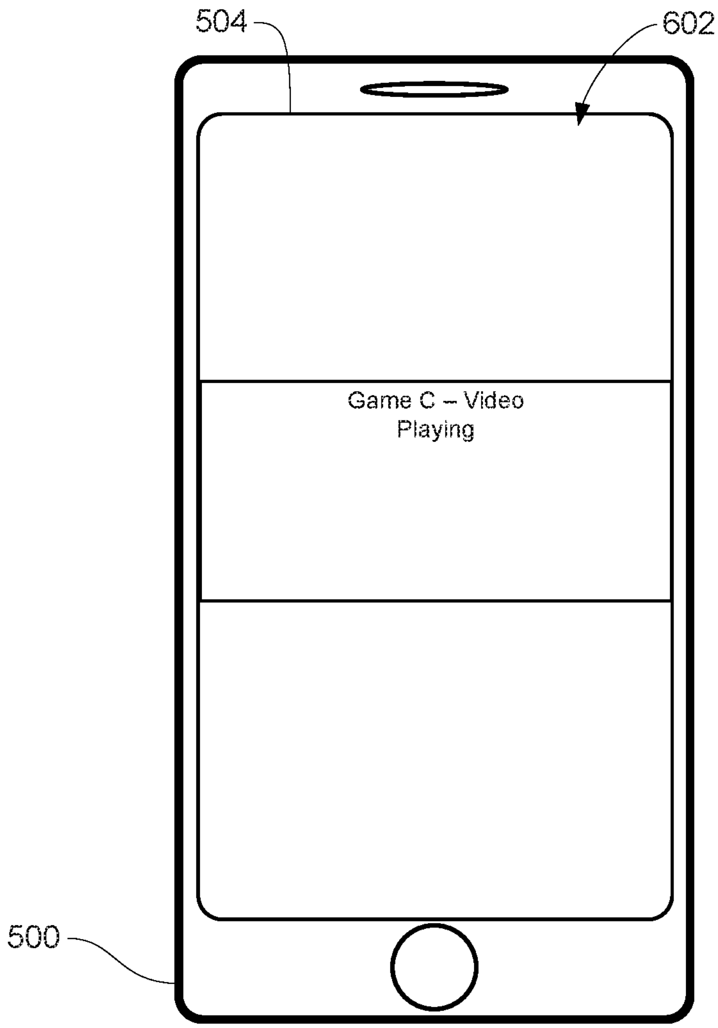
FIG. 6FFF

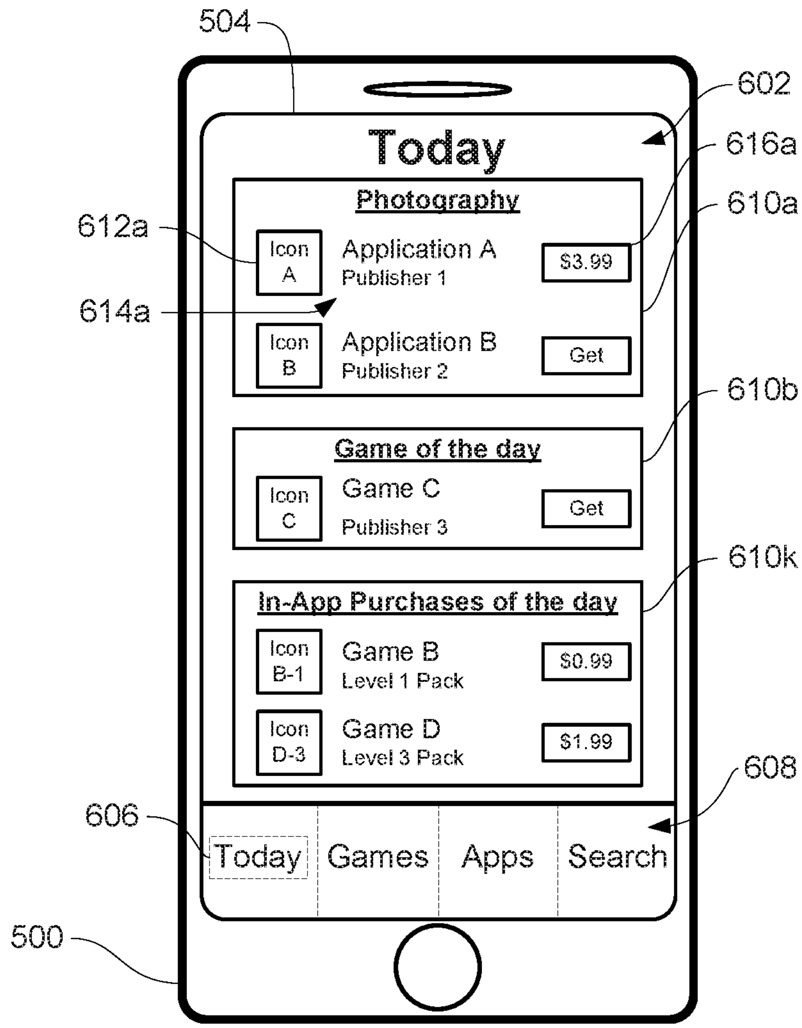
FIG. 6GGG

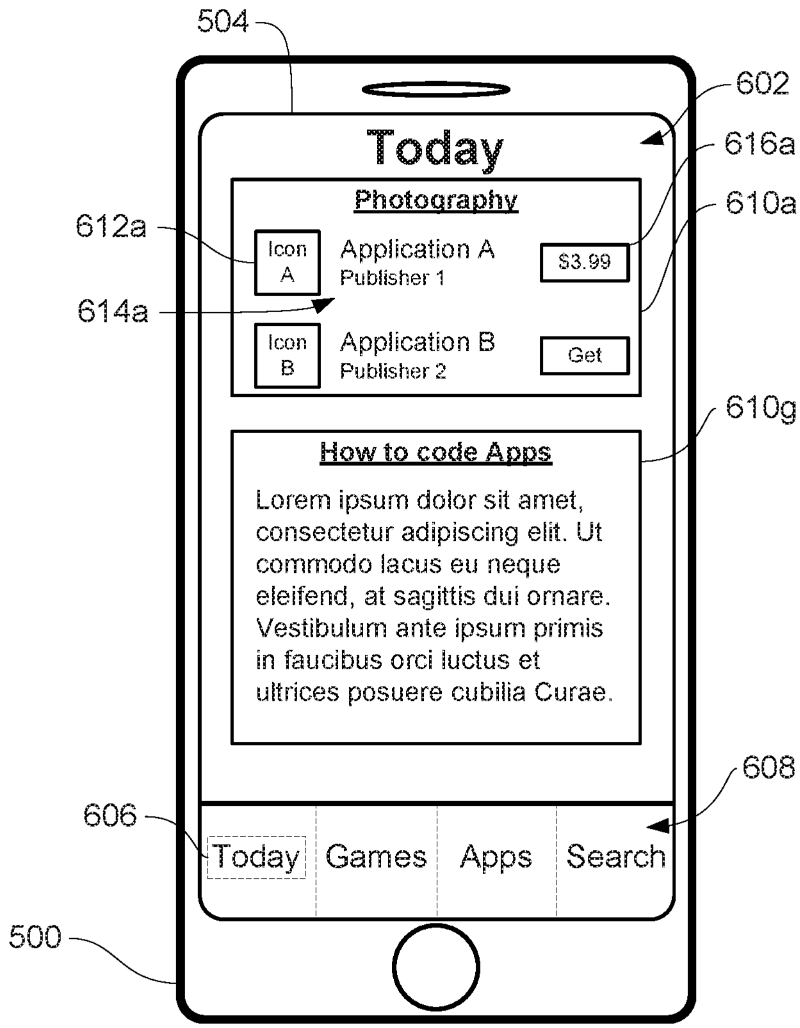
FIG. 6HHH

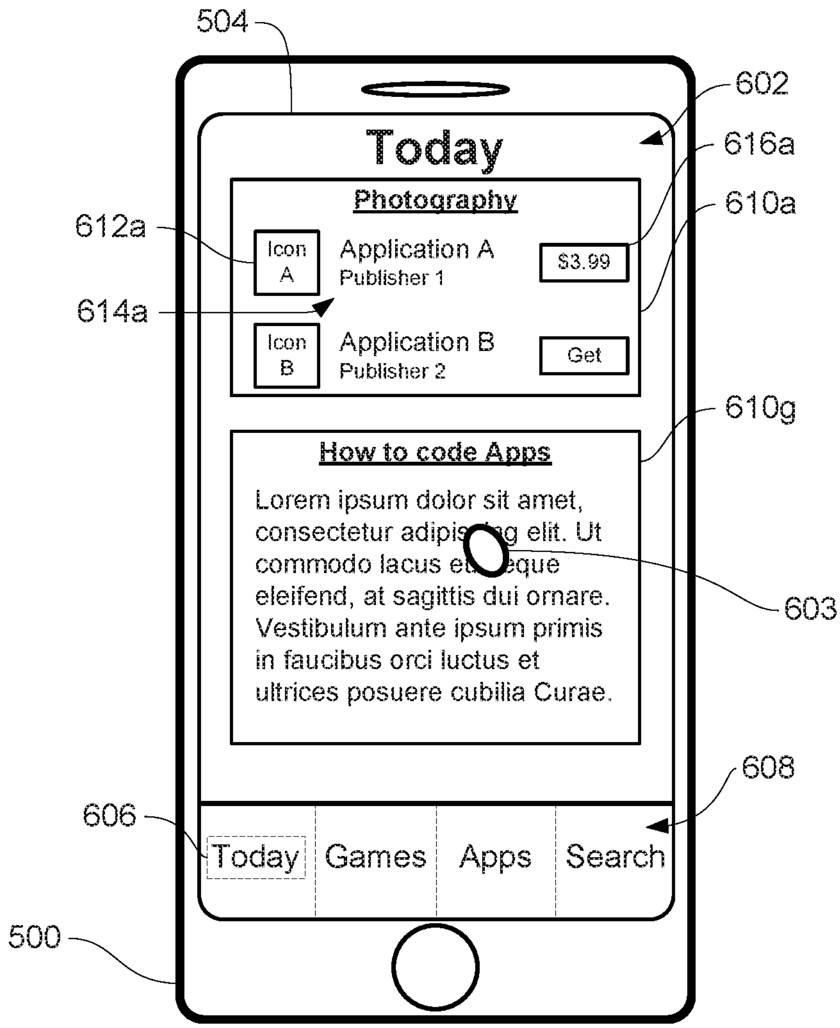
FIG. 6III

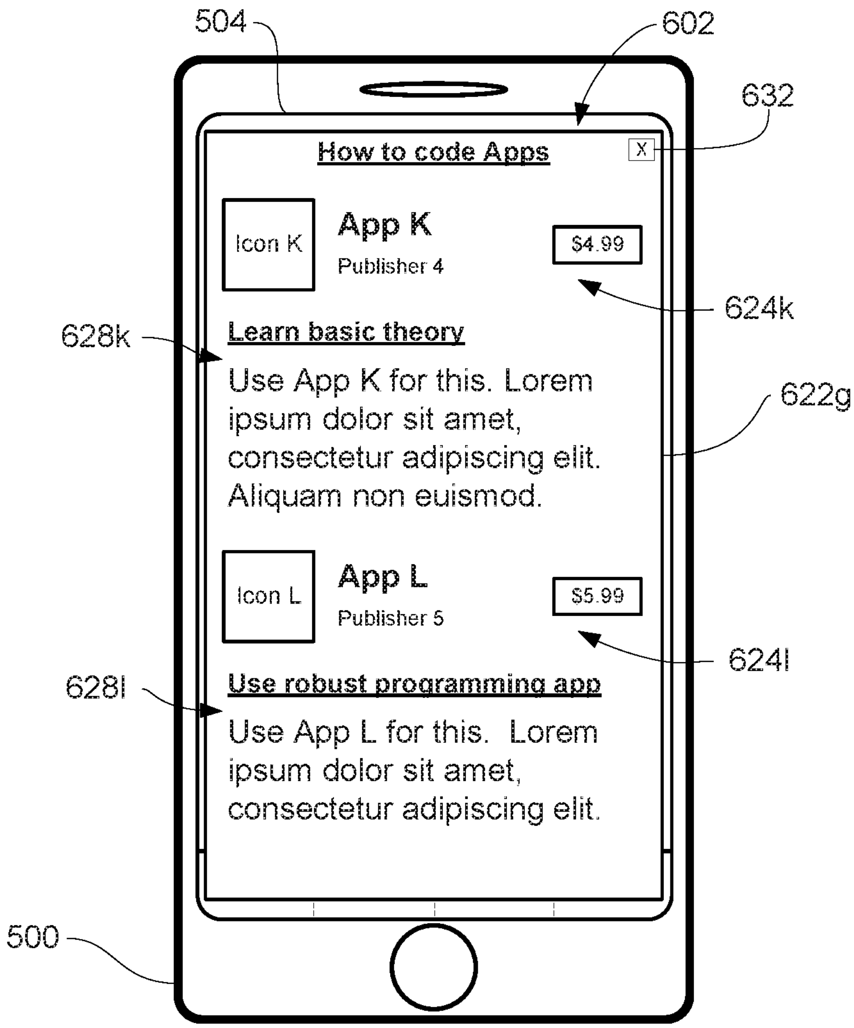
FIG. 6JJJ

Figure 7D:
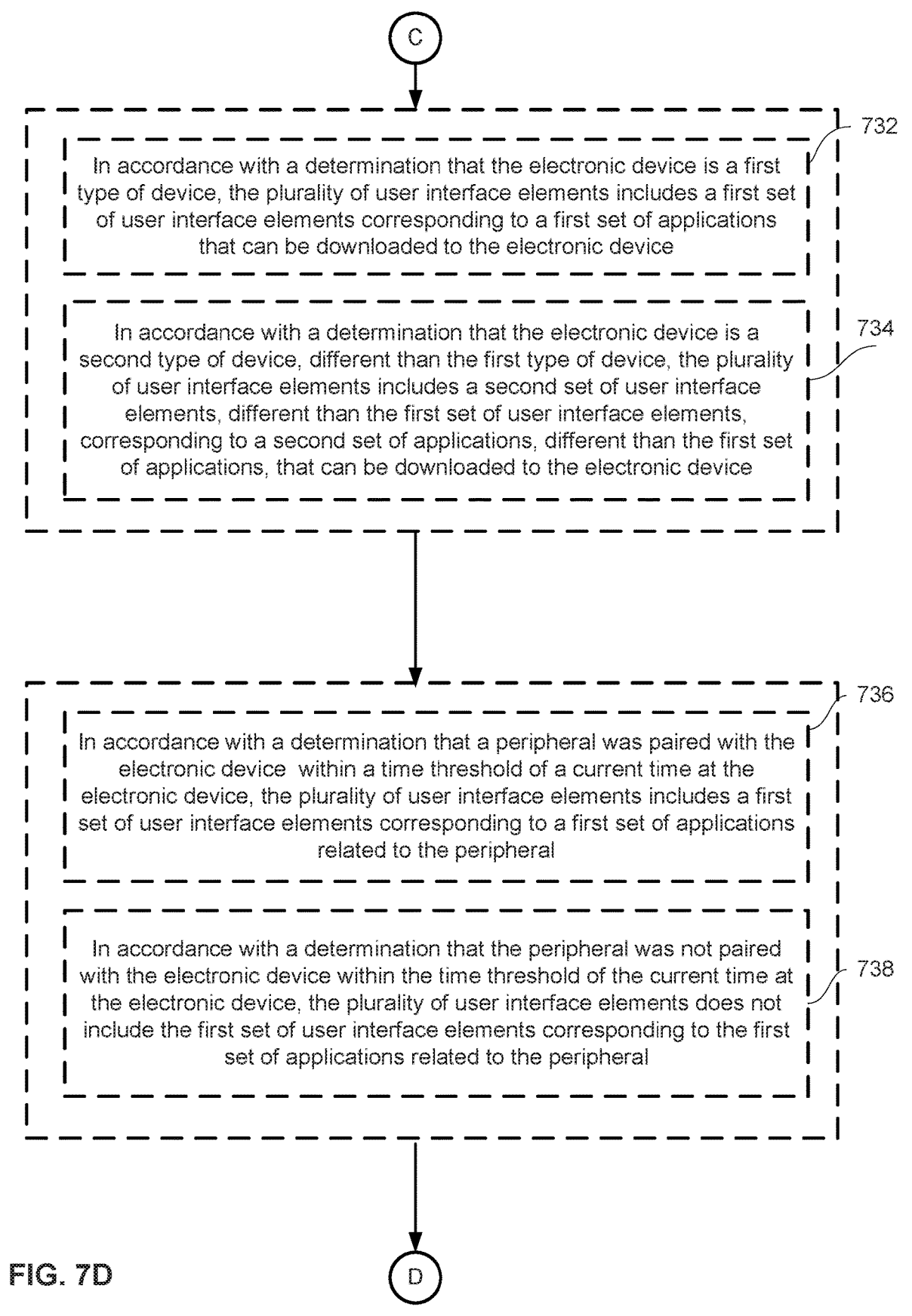

C

732
In accordance with a determination that the electronic device is a first type of device, the plurality of user interface elements includes a first set of user interface elements corresponding to a first set of applications that can be downloaded to the electronic device 734
In accordance with a determination that the electronic device is a second type of device, different than the first type of device, the plurality of user interface elements includes a second set of user interface elements, different than the first set of user interface elements, corresponding to a second set of applications, different than the first set of applications, that can be downloaded to the electronic device 736
In accordance with a determination that a peripheral was paired with the electronic device within a time threshold of a current time at the electronic device, the plurality of user interface elements includes a first set of user interface elements corresponding to a first set of applications related to the peripheral 738
In accordance with a determination that the peripheral was not paired with the electronic device within the time threshold of the current time at the electronic device, the plurality of user interface elements does not include the first set of user interface elements corresponding to the first set of applications related to the peripheral

Figure 7E:
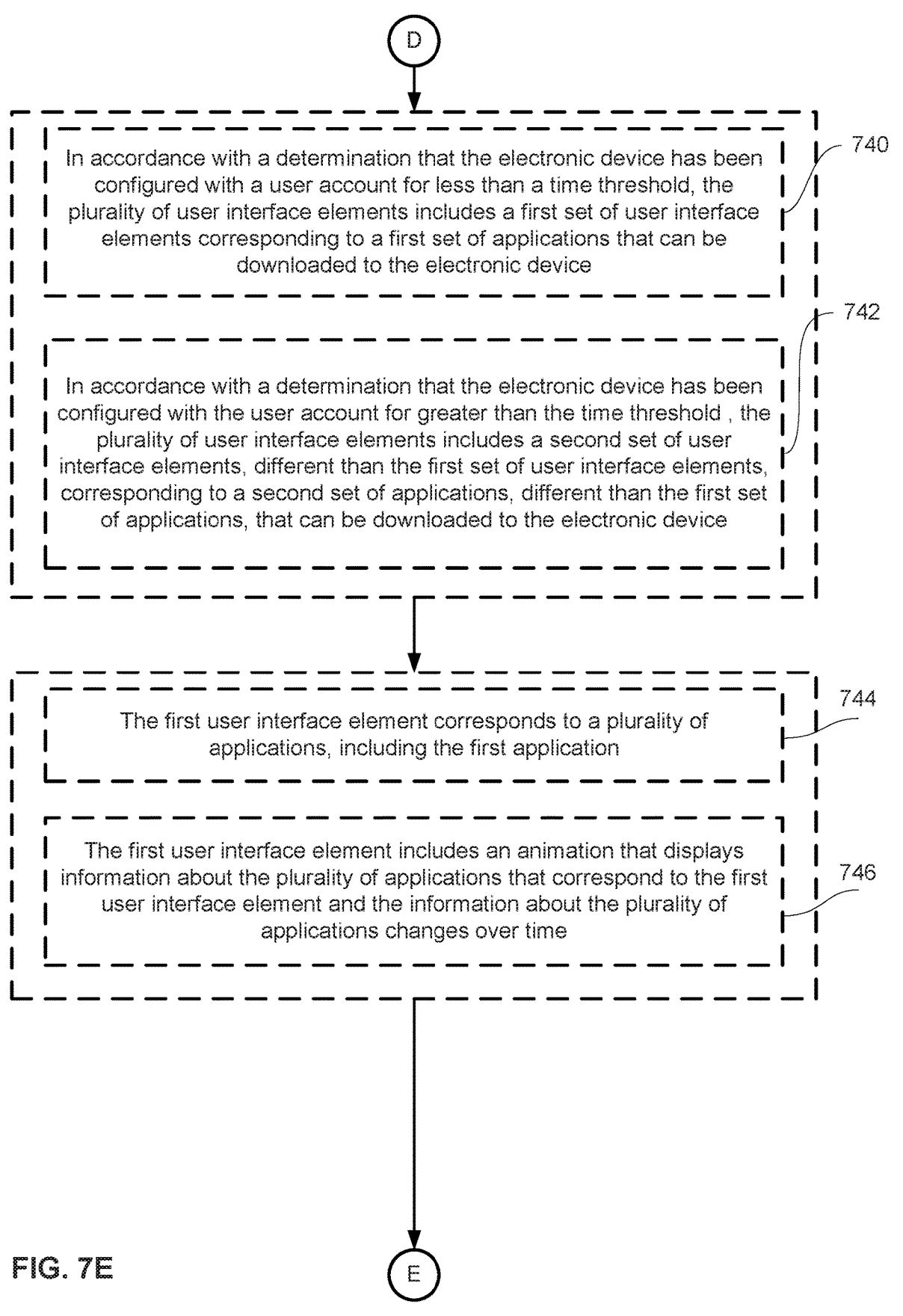

740 In accordance with a determination that the electronic device has been configured with a user account for less than a time threshold, the plurality of user interface elements includes a first set of user interface elements corresponding to a first set of applications that can be downloaded to the electronic device 742 In accordance with a determination that the electronic device has been configured with the user account for greater than the time threshold , the plurality of user interface elements includes a second set of user interface elements, different than the first set of user interface elements, corresponding to a second set of applications, different than the first set of applications, that can be downloaded to the electronic device 744 The first user interface element corresponds to a plurality of applications, including the first application 746 The first user interface element includes an animation that displays information about the plurality of applications that correspond to the first user interface element and the information about the plurality of applications changes over time

L 798-18: The first user interface element includes the respective application icons for the plurality of applications corresponding to the first user interface element including the first application icon for the first application and the second application icon for the second application 798-20: In accordance with a determination that the selection of the first user interface element includes selection of the second application icon for the second application, displaying the second user interface element includes displaying the second user interface element with the second application icon of the second application and a second respective selectable affordance of the respective selectable affordances for the second application having a focus 798-22: In accordance with a determination that the selection of the first user interface element does not include the selection of the second application icon for the second application, displaying the second user interface element includes displaying the second user interface element with the second application icon of the second application and the second selectable affordance for the second application not having the focus

Figure 11A:
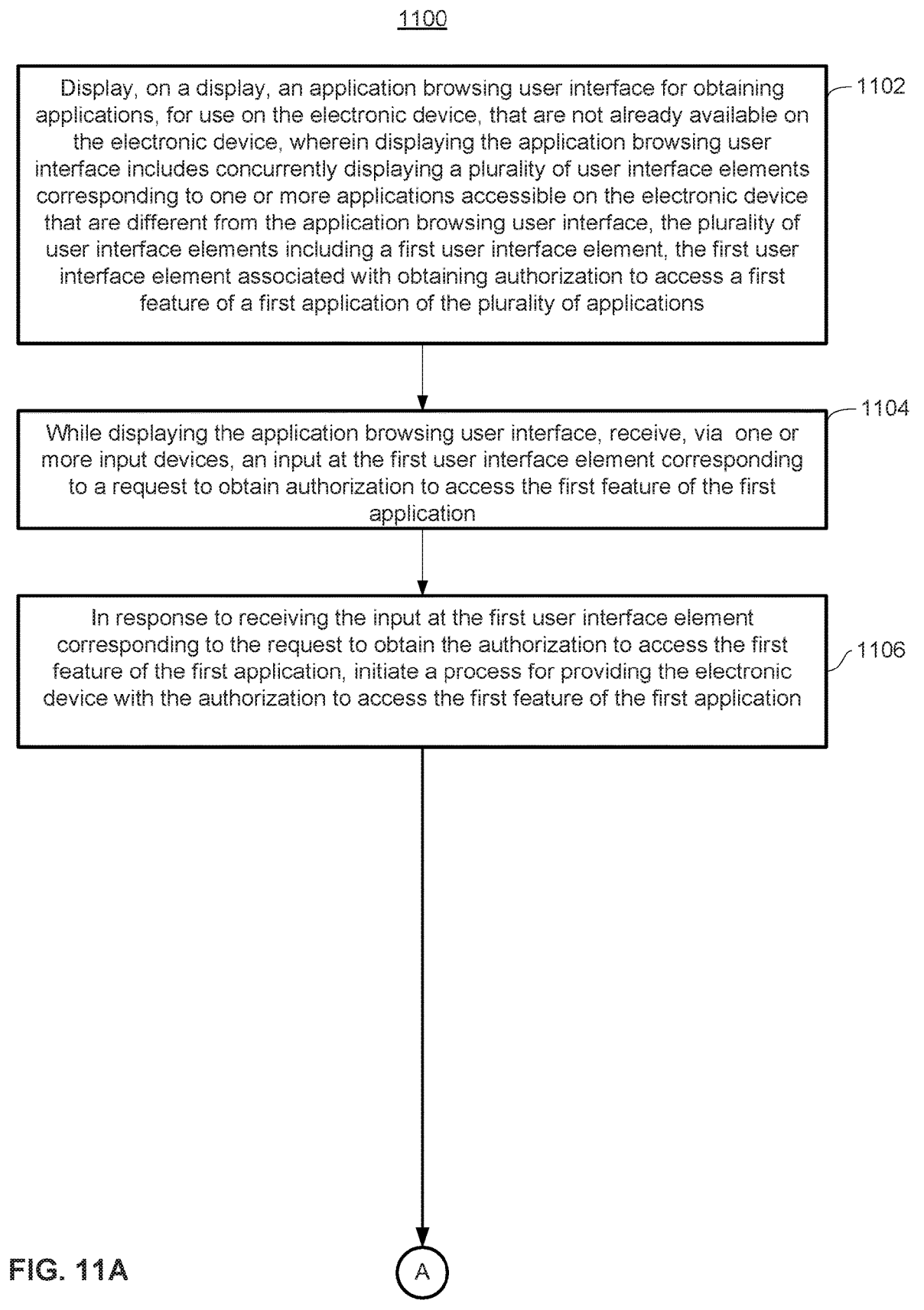

Display, on a display, an application browsing user interface for obtaining applications, for use on the electronic device, that are not already available on the electronic device, wherein displaying the application browsing user interface includes concurrently displaying a plurality of user interface elements corresponding to one or more applications accessible on the electronic device that are different from the application browsing user interface, the plurality of user interface elements including a first user interface element, the first user interface element associated with obtaining authorization to access a first feature of a first application of the plurality of applications 1102

While displaying the application browsing user interface, receive, via one or more input devices, an input at the first user interface element corresponding to a request to obtain authorization to access the first feature of the first application 1104

In response to receiving the input at the first user interface element corresponding to the request to obtain the authorization to access the first feature of the first application, initiate a process for providing the electronic device with the authorization to access the first feature of the first application 1106

FIG. 12T
504
1205
Game B
Would you still like to purchase Level 1 Pack for Game B for $1.99?
1221
Yes
No
500

FIG. 12V
504
1205
Game B
Purchase Level 1 Pack for Game B?
1222
Payment Method: Method A
Payment Address: Address A
$1.99
Authenticate to Pay
Cancel
500

FIG. 14J
504
1405
Web Browser
www.progbasics.com
Welcome to
Programming Basics
Programming Basics
Image
Lorem ipsum dolor sit amet, consectetur adipiscing elit. Sed id scelerisque augue, sit amet hendrerit erat. Aenean vestibulum porttitor elit in rhoncus.
500

USER INTERFACES FOR DOWNLOADING APPLICATIONS ON AN ELECTRONIC DEVICE

CROSS REFERENCE TO RELATED APPLICATIONS

This application claims the benefit under 35 USC 119(e) of U.S. Provisional Patent Application No. 62/524,592, filed Jun. 25, 2017 and claims the benefit of U.S. Provisional Patent Application No. 62/514,335, filed Jun. 2, 2017 the contents of which are incorporated herein by reference in their entirety for all purposes.

FIELD OF THE DISCLOSURE

This relates generally to electronic devices that allow for browsing and downloading applications, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, applications are downloadable to such a device, and user interaction with such a device entails browsing and downloading such applications to the device. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that present information about, and facilitate downloading of, featured applications in an app store application, and one or more operations related to the above that the electronic devices optionally perform. Some embodiments described in this disclosure are directed to one or more electronic devices that facilitate browsing of applications and games by category, and one or more operations related to the above that the electronic devices optionally perform. Some embodiments described in this disclosure are directed to one or more electronic devices that facilitate presentation of information about in-app purchases for a game or application in an app store application, and one or more operations related to the above that the electronic devices optionally perform. Some embodiments described in this disclosure are directed to one or more electronic devices that facilitate the purchase of in-app purchases for the games or applications that are available on the electronic devices, and one or more operations related to the above that the electronic devices optionally perform. Some embodiments described in this disclosure are directed to one or more electronic devices that facilitate the download/purchase of games, applications and/or in-app purchases from outside of an app store application that is for browsing such content available on the electronic devices, and one or more operations related to the above that the electronic devices optionally perform. Some embodiments described in this disclosure are directed to one or more electronic devices that autoplay media content corresponding to applications (e.g., games, non-game applications, etc.) in an app store application so as to facilitate the ordered presentation of the media content to the user, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 11A-11E are flow diagrams illustrating a method of facilitating presentation of information about, and thus purchase of, in-app purchases for a game or application in an app store application in accordance with some embodiments of the disclosure.

DETAILED DESCRIPTION

Description of Embodiments

Figure 1A:
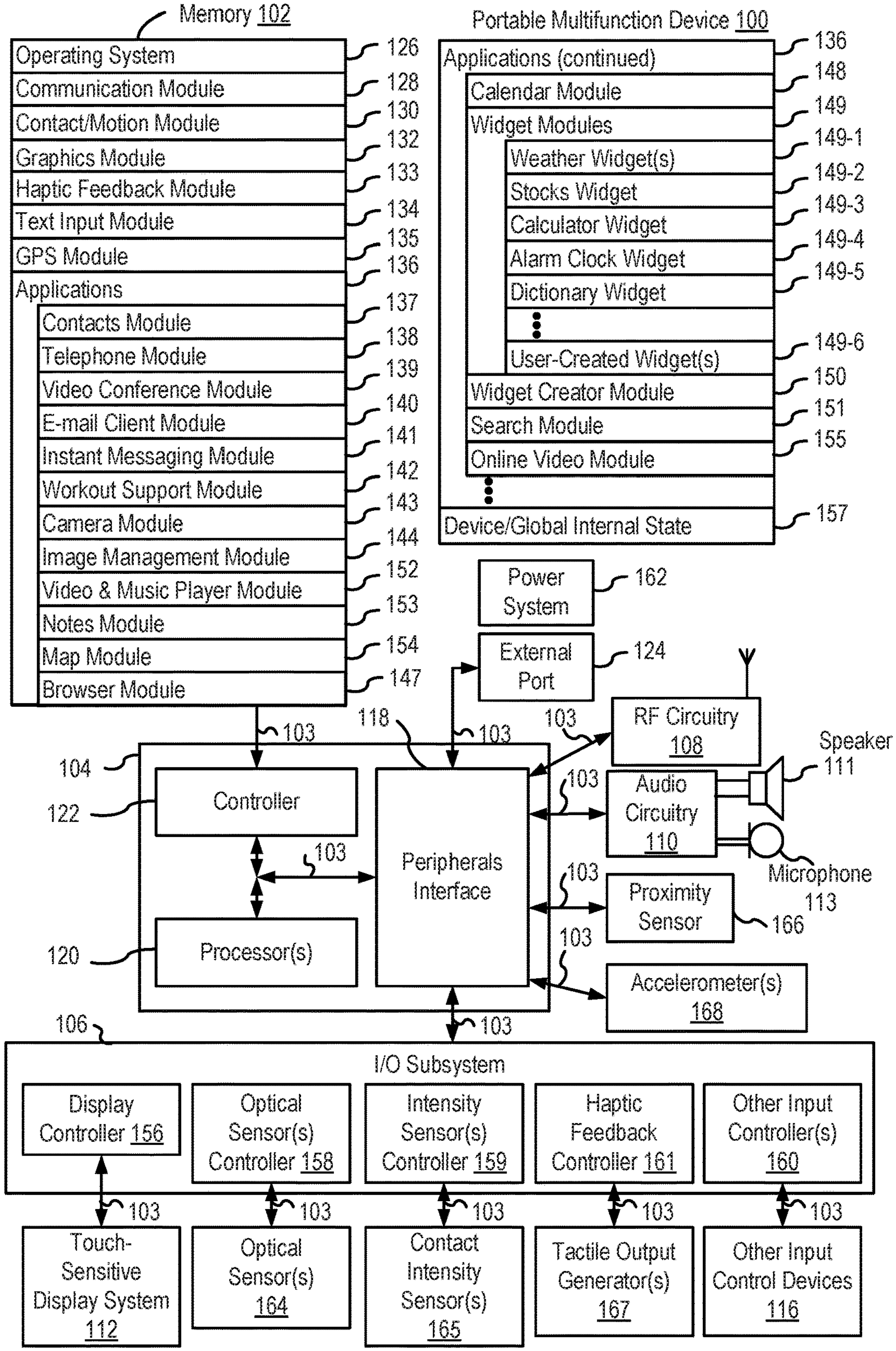
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for browsing and/or downloading applications, games and/or in-app purchases available for download to the electronic devices. Such techniques can reduce the cognitive burden on a user who browses and/or downloads such applications, games and/or in-app purchases, thereby enhancing productivity. Further, such techniques can reduce processor and battery power otherwise wasted on redundant user inputs.

Although the following description uses terms “first,” “second,” etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
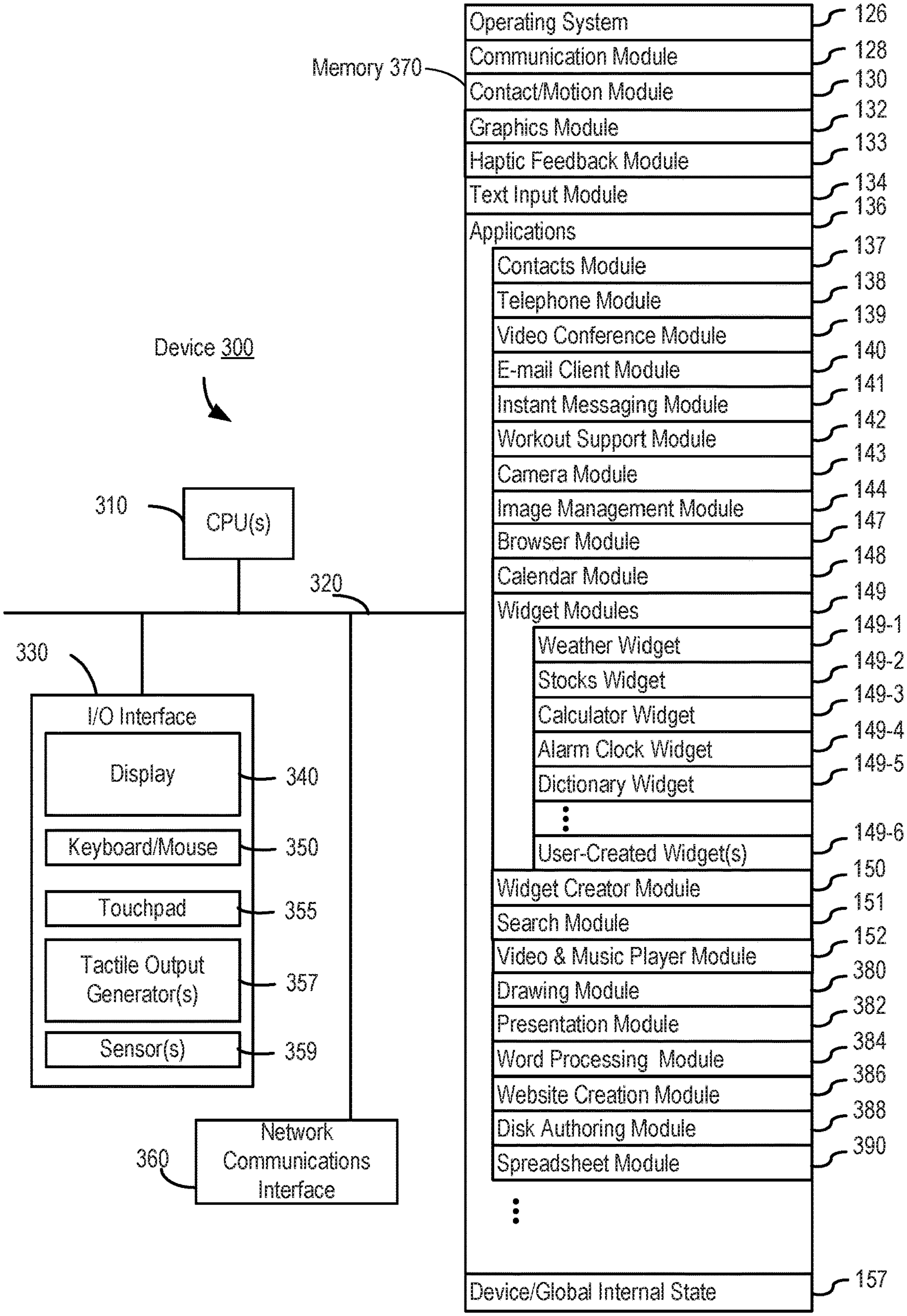
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
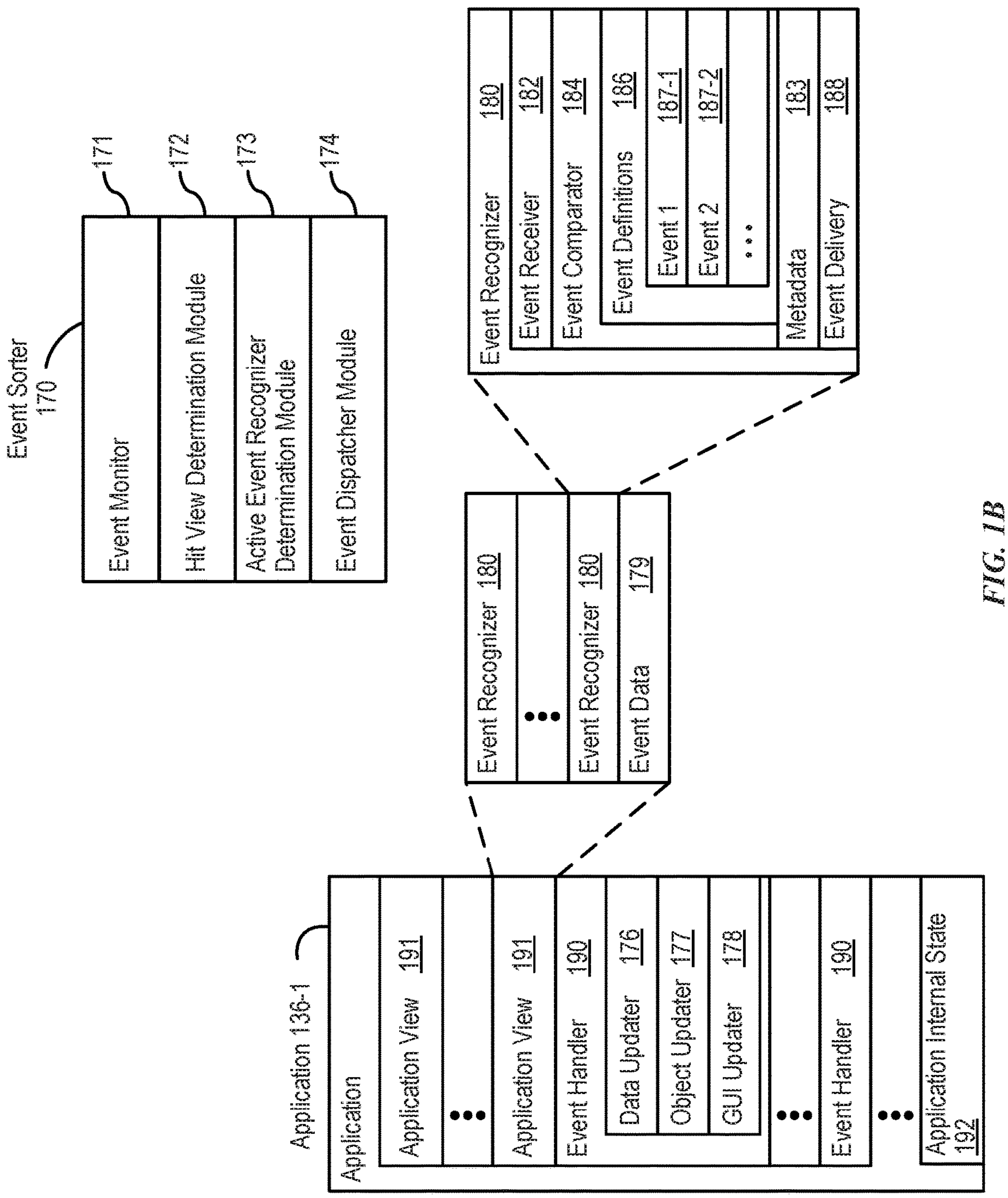
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
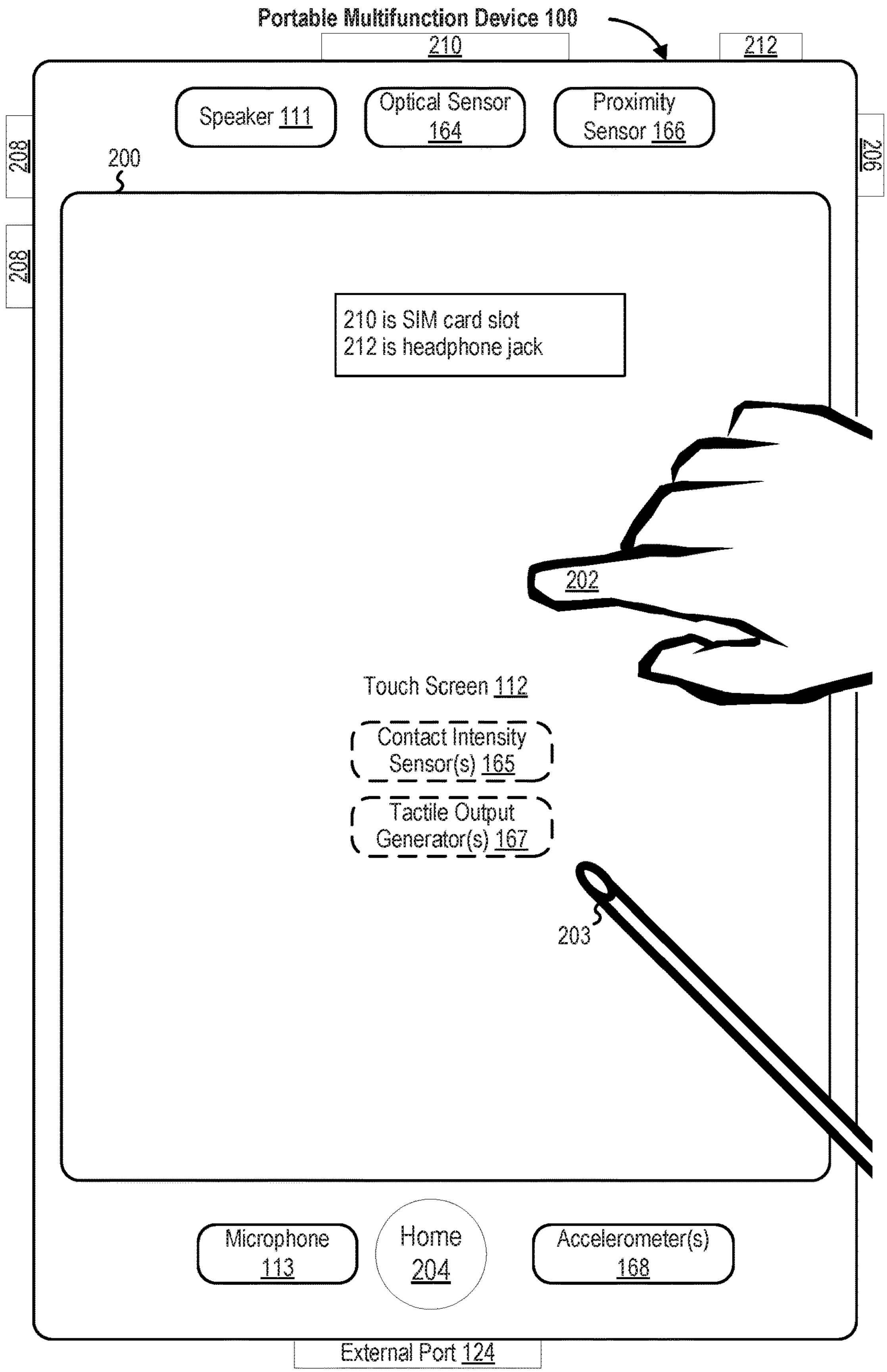
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
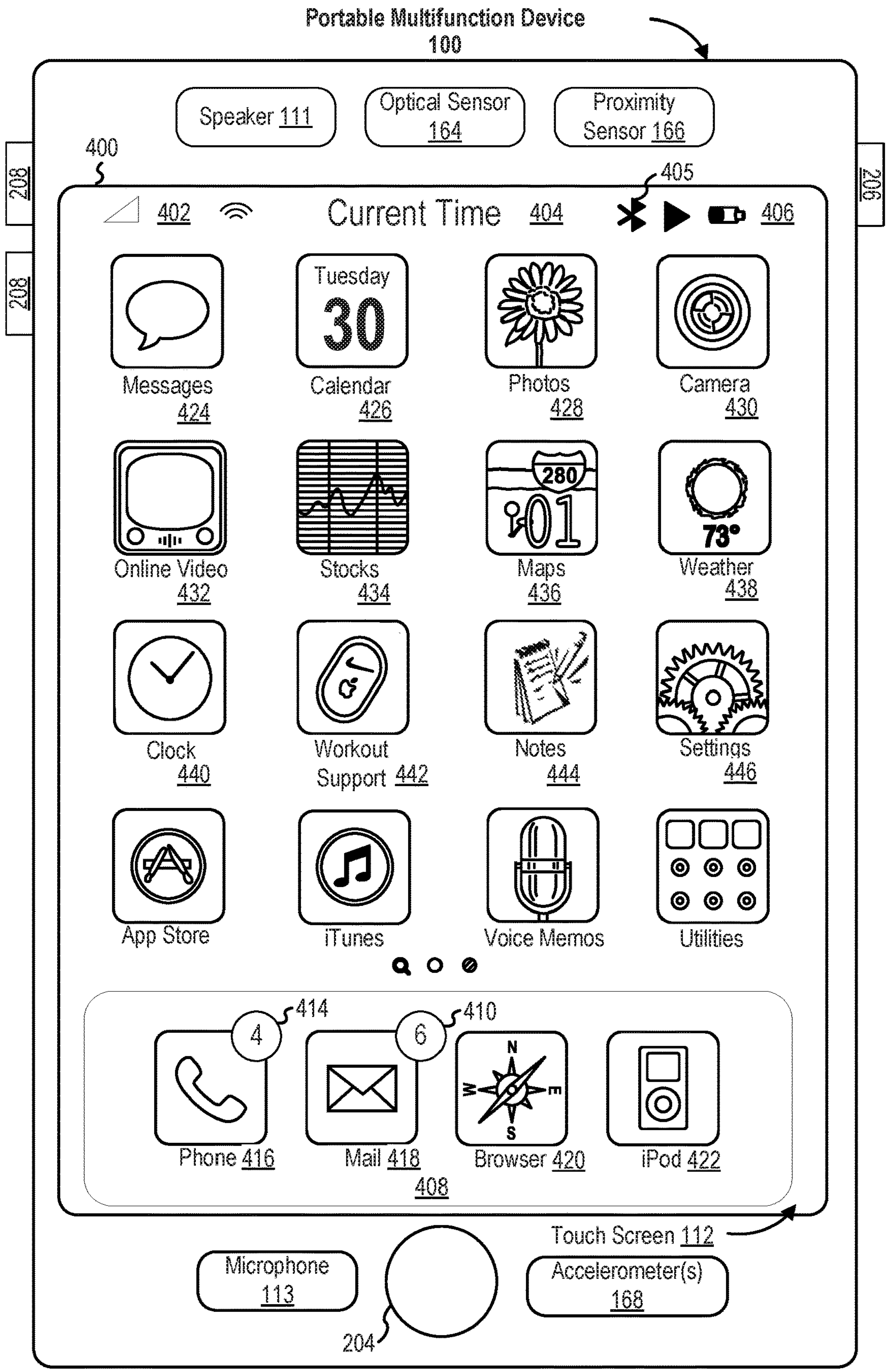
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
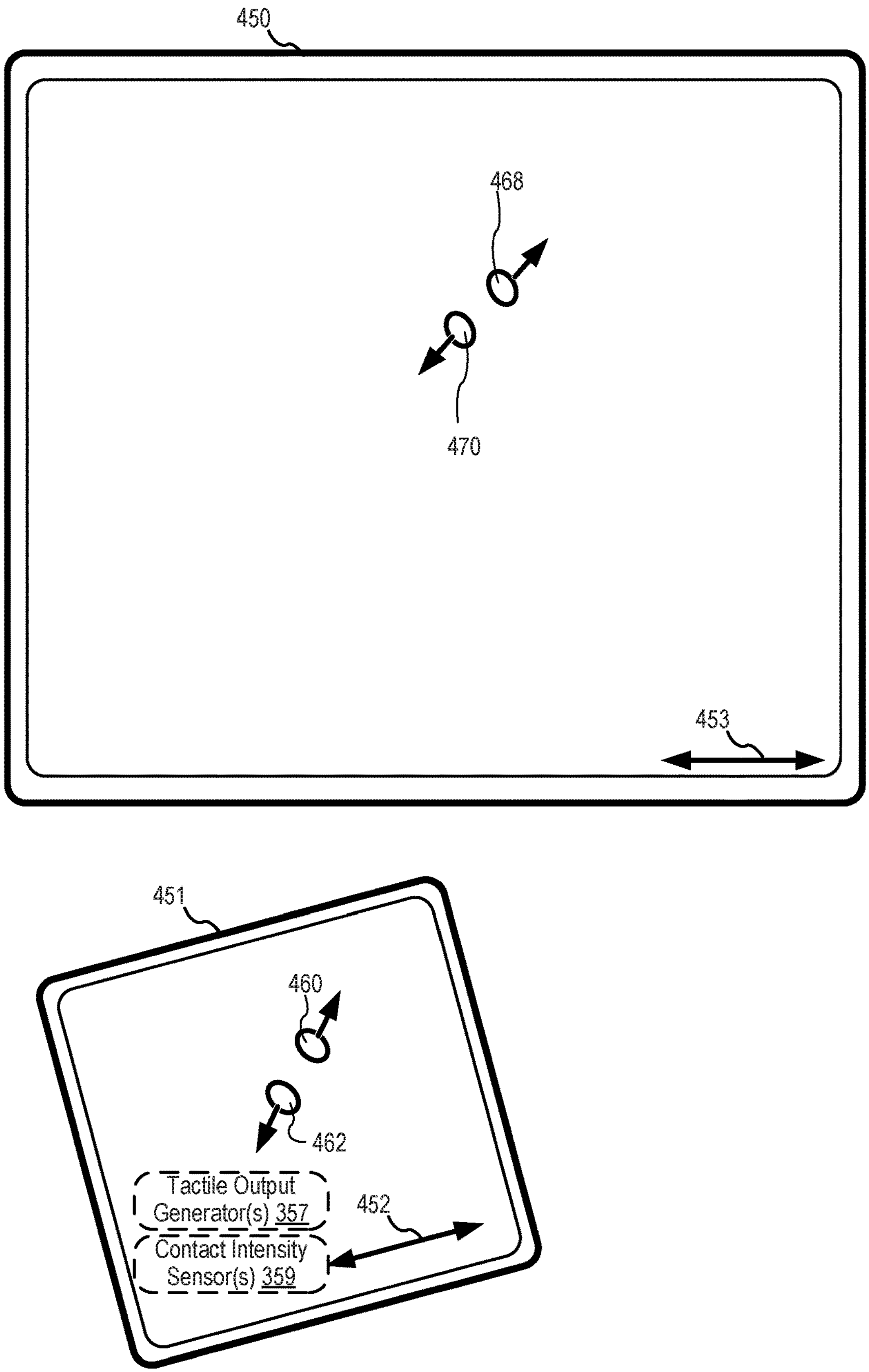
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
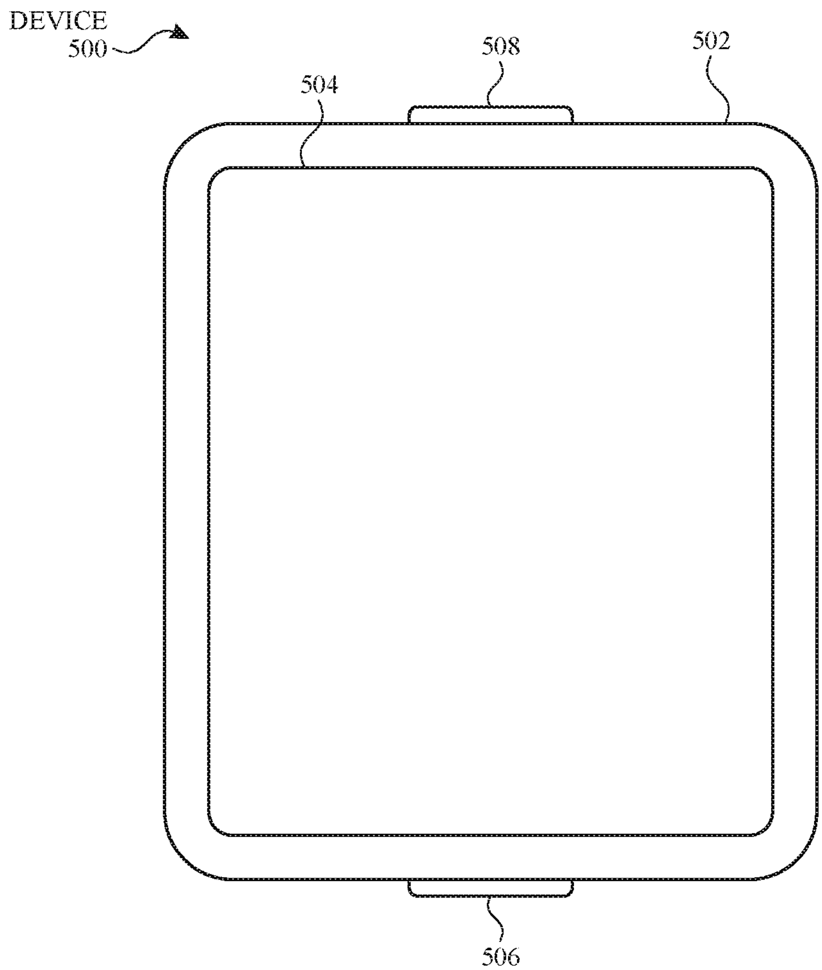
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
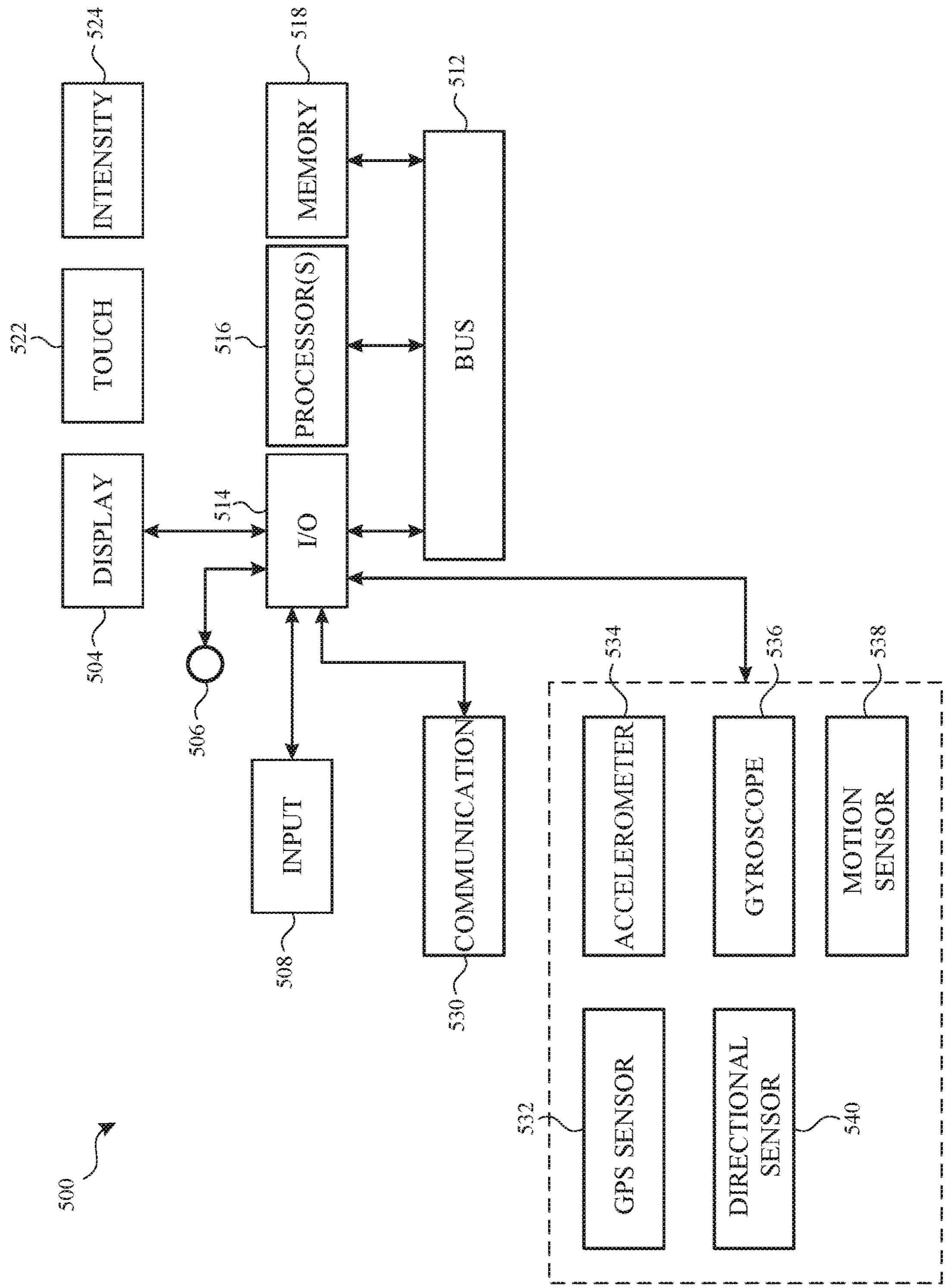
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes

700, 900, 1100, 1300 and 1500 (FIGS. 7, 9, 11, 13 and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
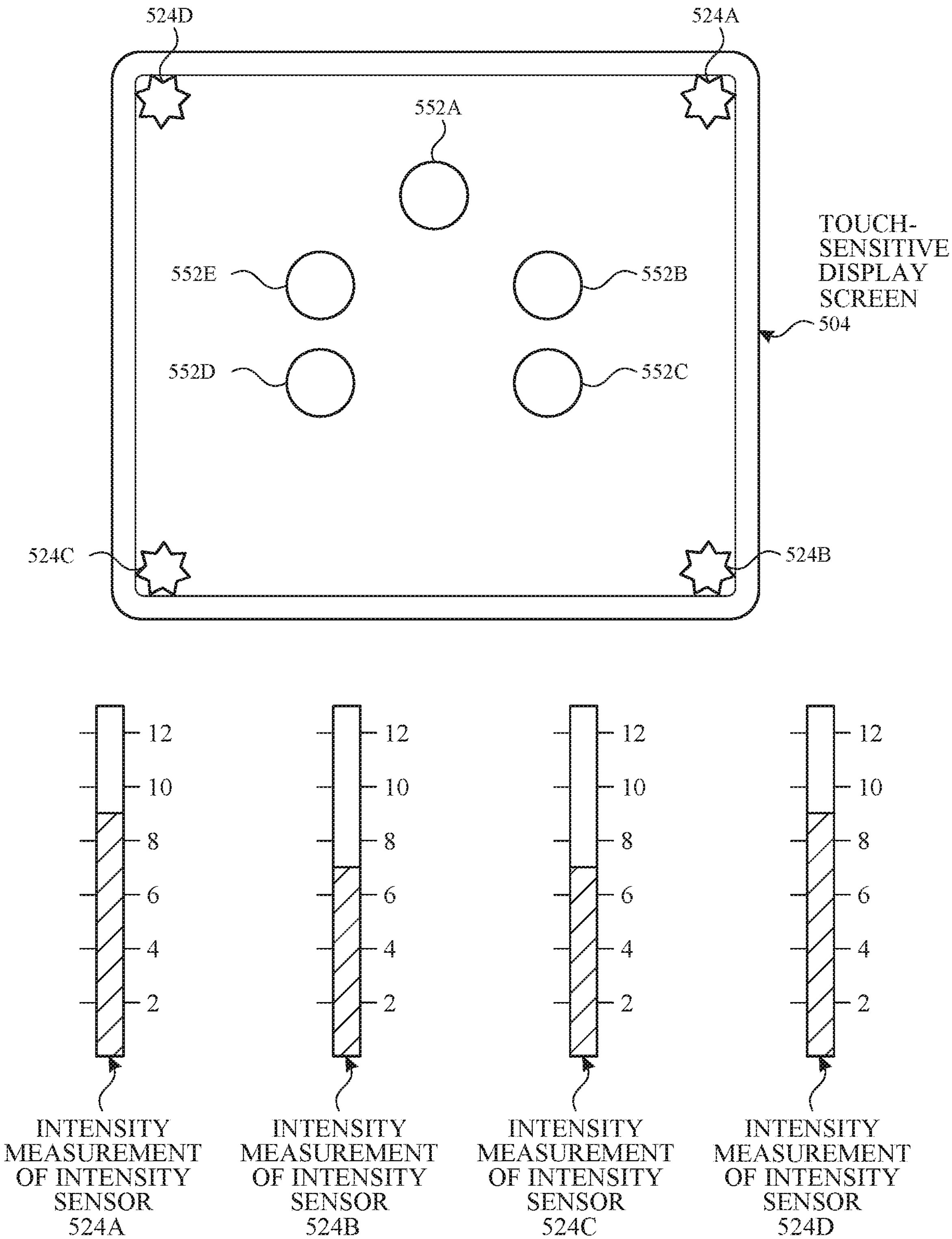
FIGS. 5C-5D illustrate exemplary components of a personal electronic device having a touch-sensitive display and intensity sensors in accordance with some embodiments.
Figure 5D:
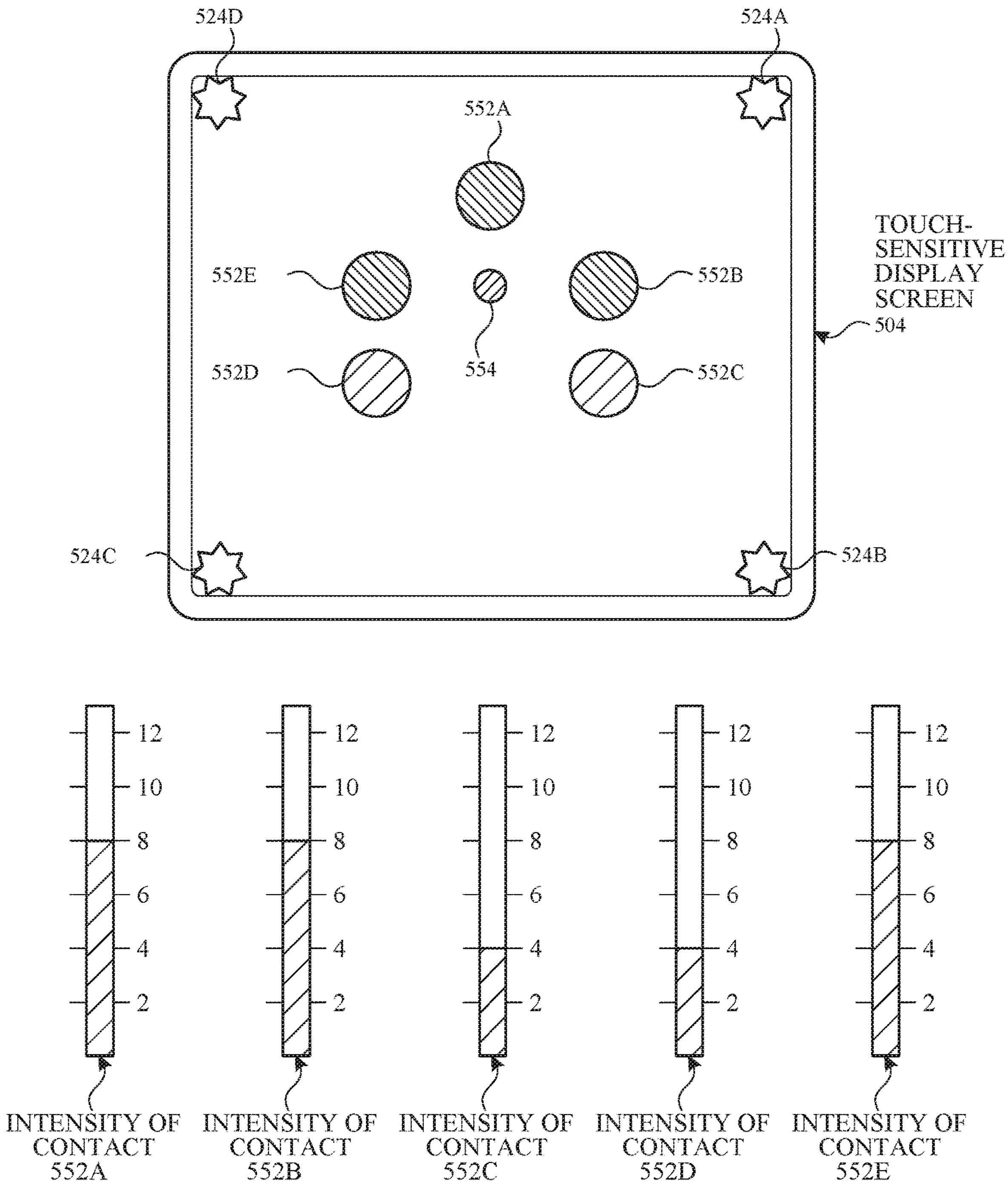

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
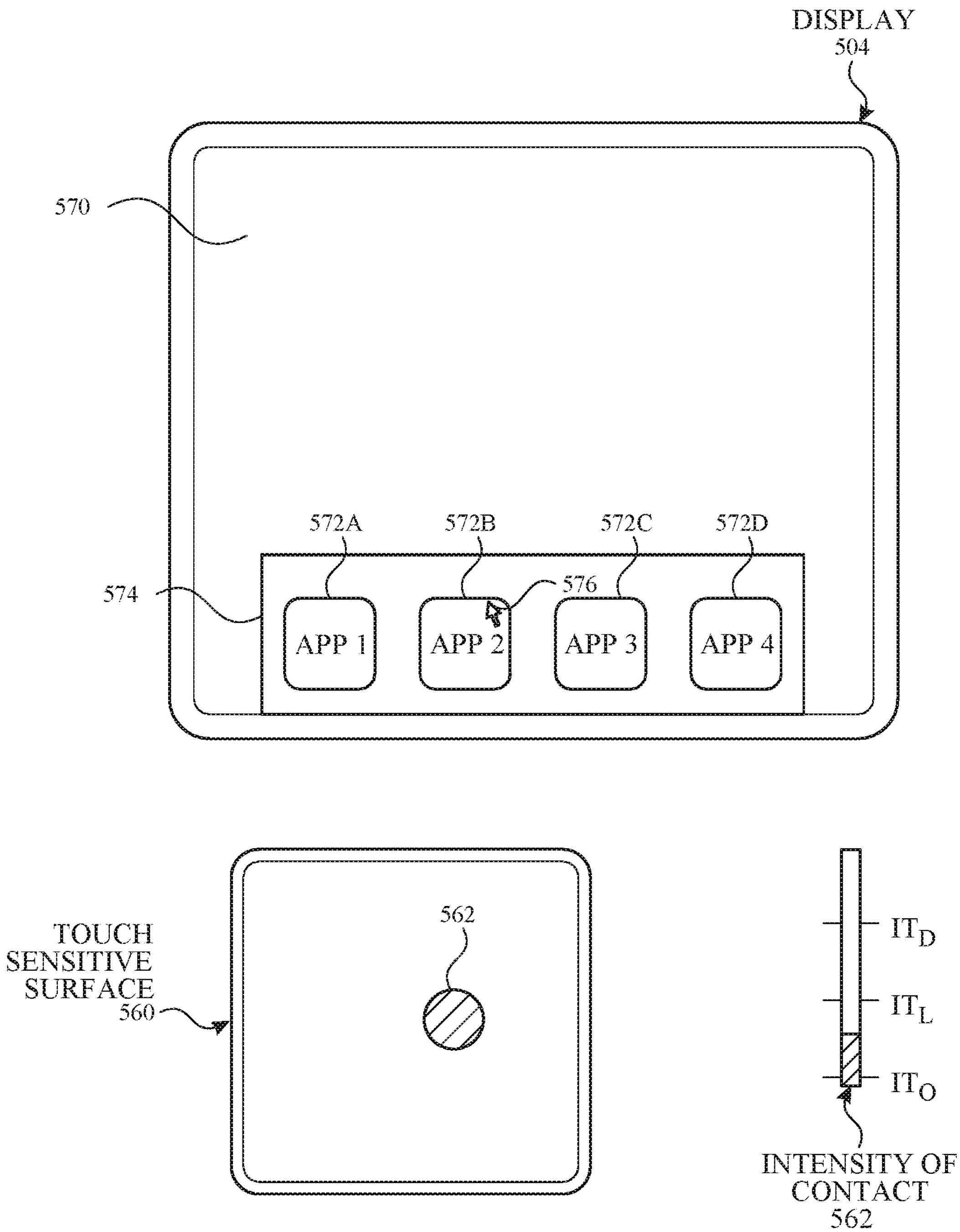
FIGS. 5E-5H illustrate exemplary components and user interfaces of a personal electronic device in accordance with some embodiments.
Figure 5F:
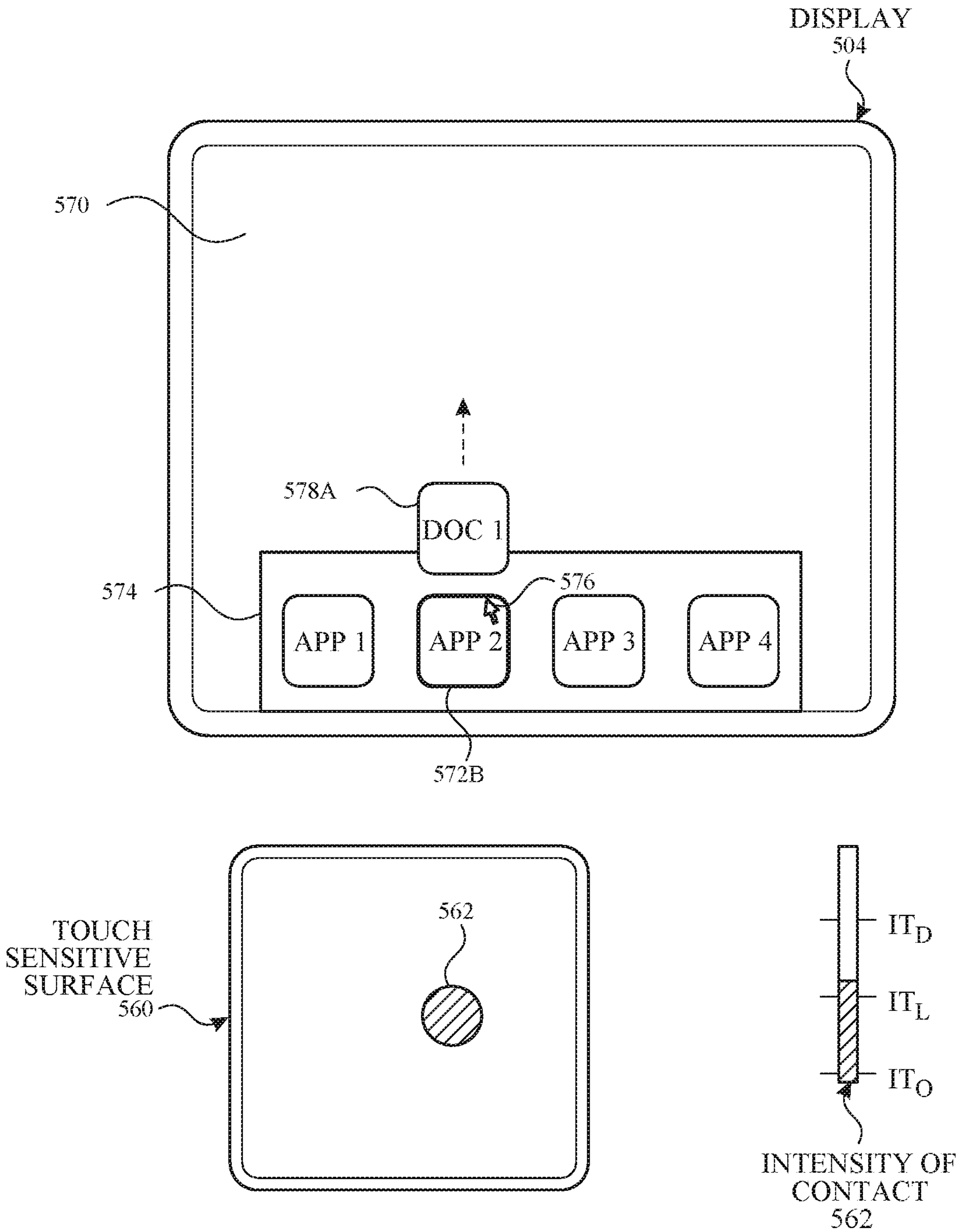
Figure 5G:
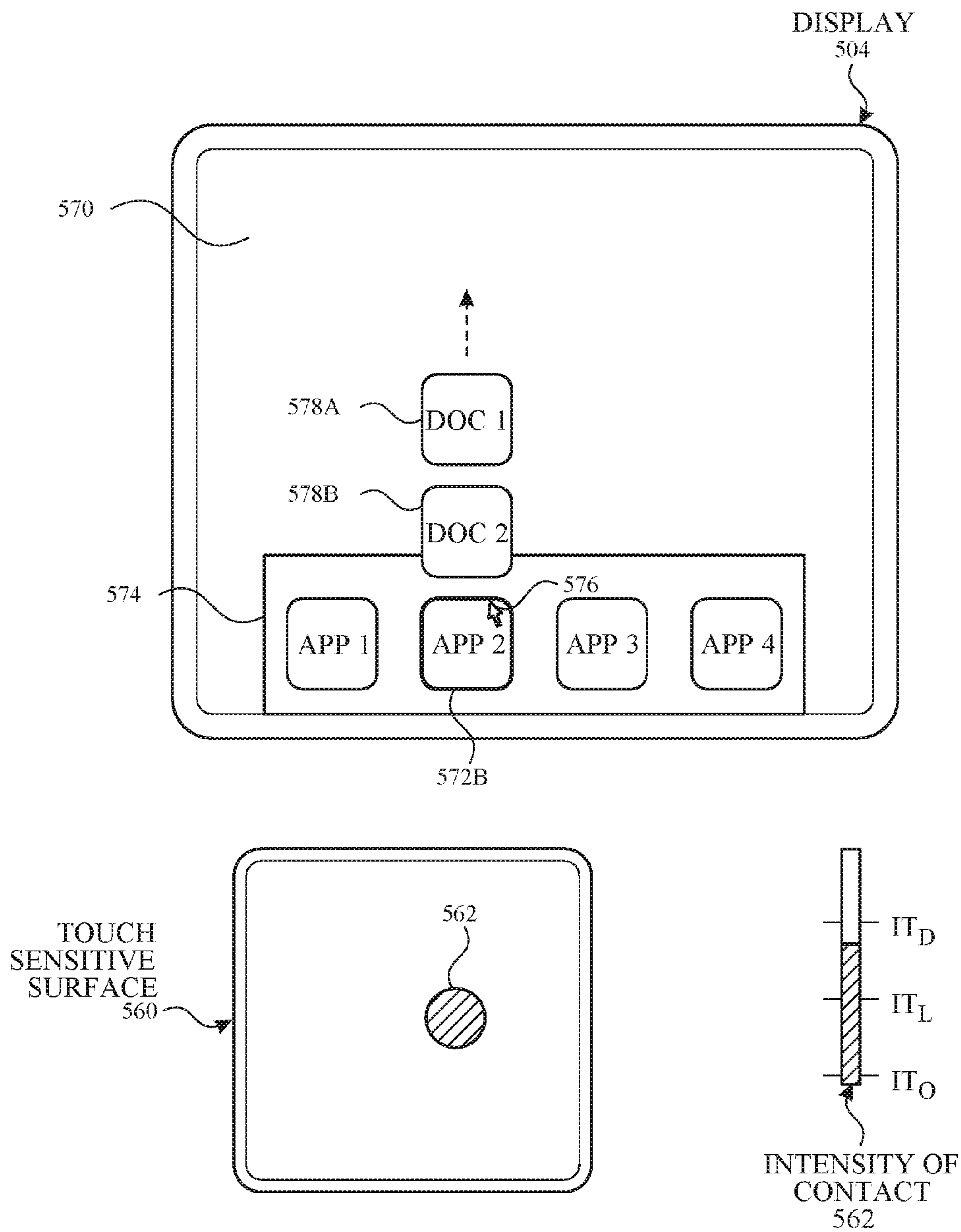
Figure 5H:
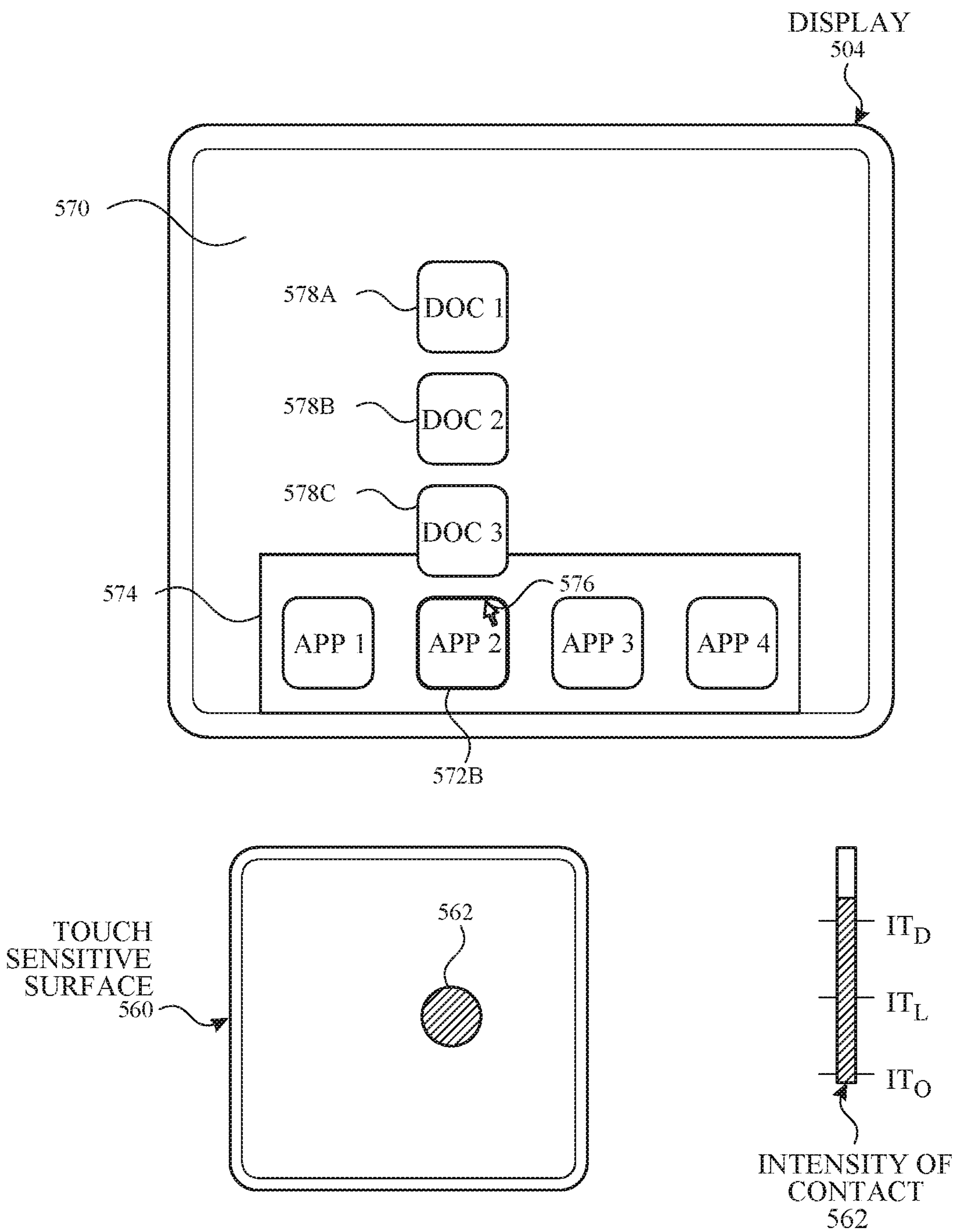

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Application Browsing User Interface—Featured Applications

Users interact with electronic devices in many different manners, including browsing applications that may be available (e.g., available for purchase and/or download) on the electronic devices. For example, a user may browse applications in an app store application for downloading applications to an electronic device. However, in some circumstances, the number of applications available in the app store application makes it difficult for the user to find or identify applications of potentially greater interest to the user. The embodiments described below provide ways in which an electronic device presents information about, and facilitates downloading of, featured applications (e.g., games, non-game applications, etc.) in an app store application, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6JJJ illustrate exemplary ways in which an electronic device presents information about, and facilitates downloading of, featured applications in an app store application in accordance with some embodiments of the disclosure. The embodiments in these figures are used to illustrate the processes described below, including the processes described with reference to FIGS. 7A-7O.

Figure 6A:
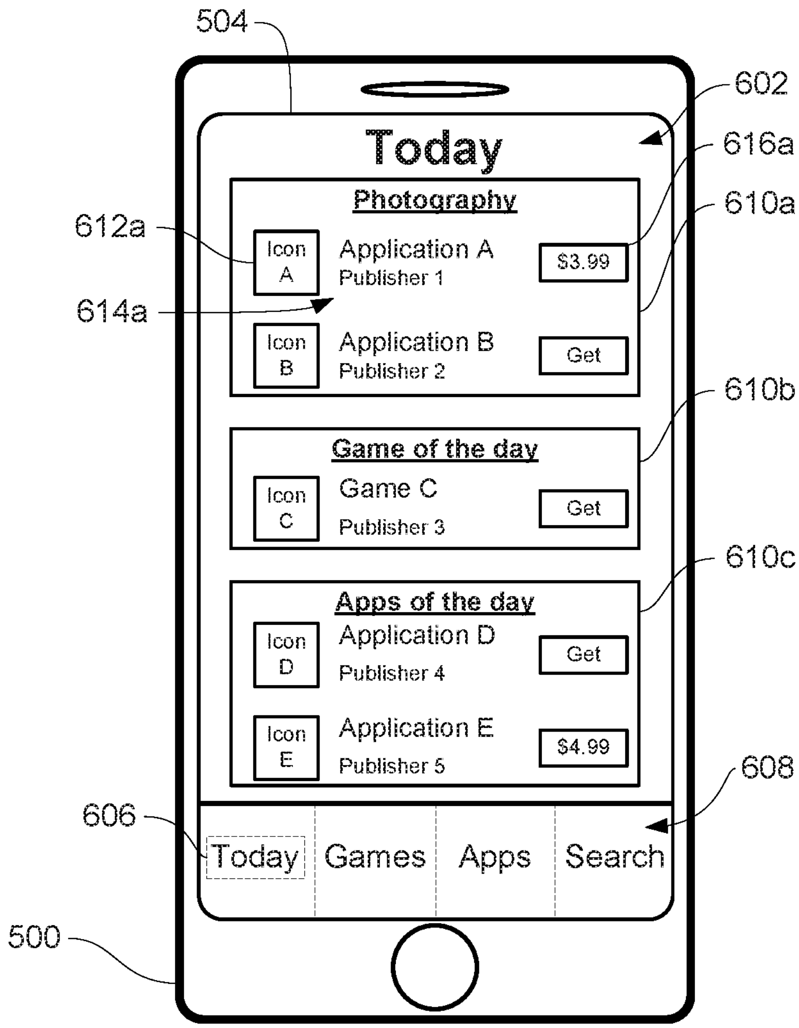
FIGS. 6A-6JJJ illustrate exemplary ways in which an electronic device presents information about, and facilitates downloading of, featured applications in an app store application in accordance with some embodiments of the disclosure.

FIG. 6A illustrates exemplary device 500 with touch screen 504, such as described with reference to FIGS. 5A-5H. Touch screen 504 optionally displays one or more user interfaces that include various content. In the example illustrated in FIG. 6A, touch screen 504 displays an app store application for browsing applications available for download to device 500 that is running on device 500. In FIG. 6A, the app store application displays application browsing user interface 602, which includes a navigation bar 608. Navigation bar 608 facilitates navigation through the app store application, as will be described in greater detail with reference to FIGS. 8A-8LL and method 900.

Navigation bar 608 includes a "Today" element, a "Games" element, an "Apps" element and a "Search" element. In FIG. 6A, the "Today" element is currently selected (indicated by selection indicator 606), and as a result, user interface 602 displays various information relating to one or more applications that are currently being featured for download to device 500 for various reasons. For example, user interface 602 includes different cards 610, such as card 610*a* relating to photography, card 610*b* relating to the game of the day, and card 610*c* relating to applications, other than games, of the day (referred to as "apps"). As shown in FIG. 6A, cards 610 display various information relating to the apps or games to which cards 610 correspond. For example, card 610*a* corresponds to application A and application B, and displays icon 612*a* for application A, information 614*a* for application A (e.g., the name of application A, the publisher of application A, etc.) and affordance 616*a*, which displays the price of application A (e.g., $3.99) and is selectable to initiate a process to download application A to device 500, as will be described in more detail below. Card 610*a* similarly displays corresponding information and elements for application B, card 610*b* similarly displays corresponding information and elements for game C, and card 610*c* similarly displays corresponding information and elements for applications D and E. As shown in FIG. 6A, when an app or game is a paid app or paid game (e.g., payment is required to purchase/download the app or game), the corresponding selectable affordance for that app or game displays the price for that app or game, such as shown by affordance 616*a* for application A. However, when an app or game is a free app or free game (e.g., payment is not required to download the app or game), the corresponding selectable affordance for that app or game displays no price for that app or game, and simply displays an indication that the app or game is available for download, such as "Get" as shown by the selectable affordance for application B in card 610*a*.

Figure 6B:
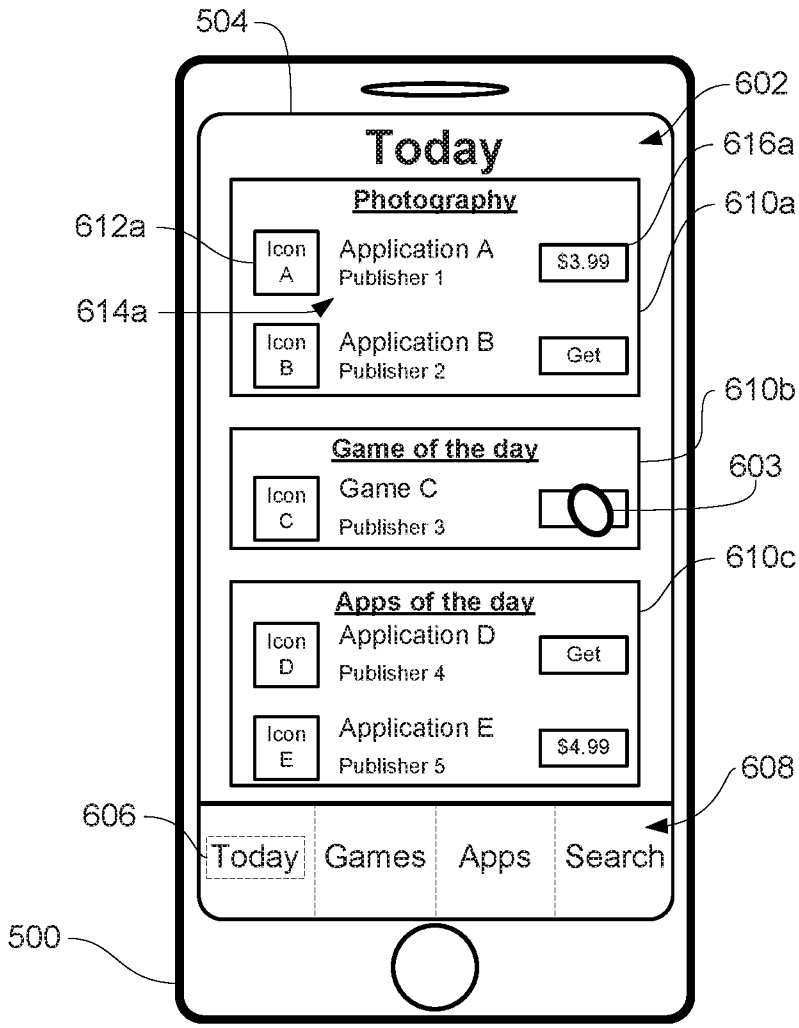
Figure 6C:
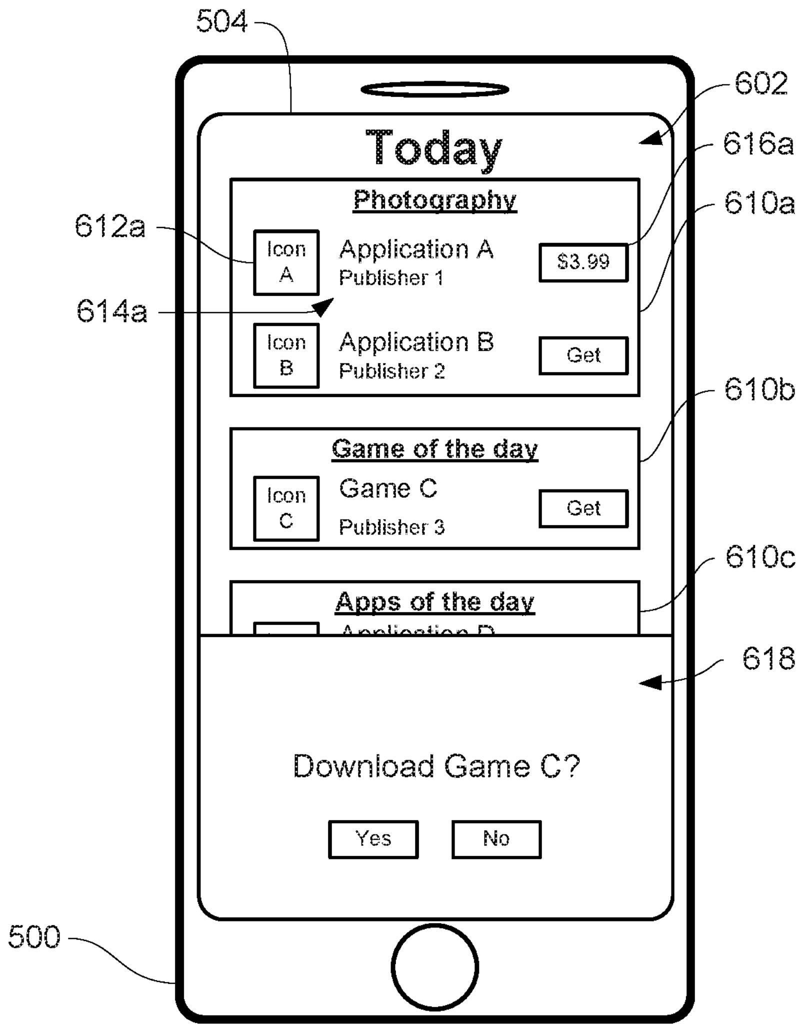

Cards 610 and/or the elements displayed by cards 610 are selectable to perform various operations as will now be described. For example, in FIG. 6B, selection of the download affordance for game C is detected (e.g., by a tap of contact 603 detected on the download affordance, as shown in FIG. 6B). In response to the selection of the download affordance for game C, because game C in FIG. 6B is a free game, device 500 displays download confirmation overlay 618 over user interface 602 as shown in FIG. 6C for confirming the user's request to download game C to device 500. If the user confirms the download request for game C (e.g., by selecting "Yes" in FIG. 6C), game C will be downloaded to device 500 without requiring payment or payment authorization. If the user does not confirm the download request for game C (e.g., by selecting "No" in FIG. 6C), game C will not be downloaded to device 500.

Figure 6D:
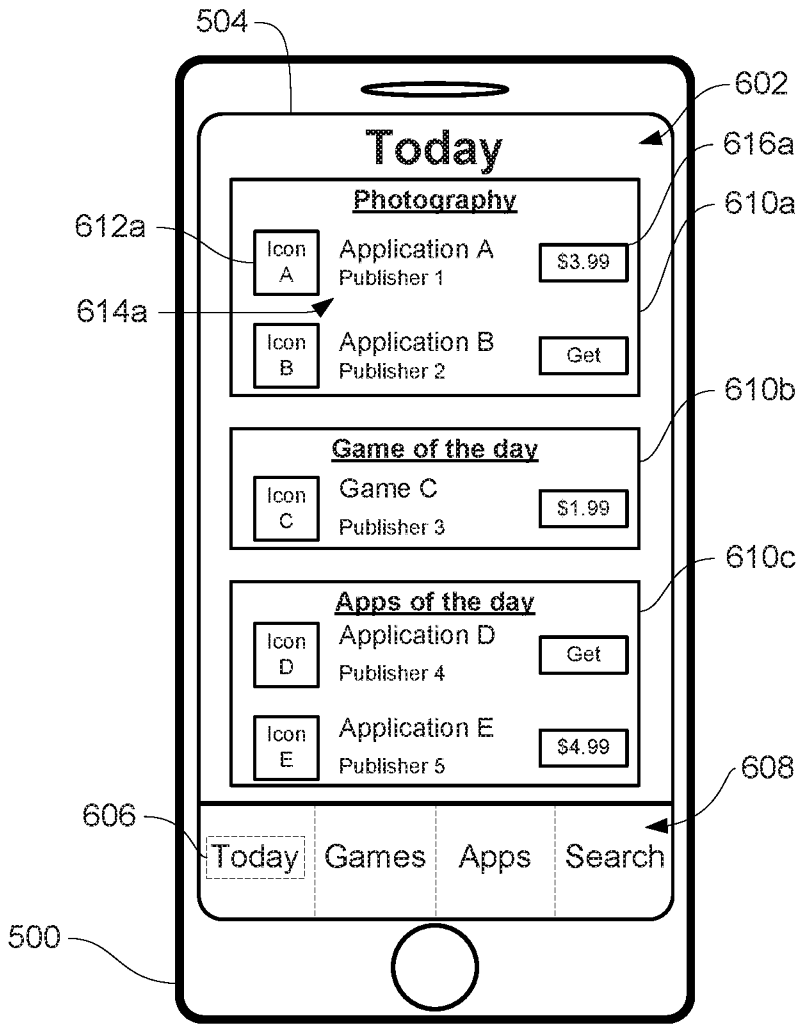
Figure 6E:
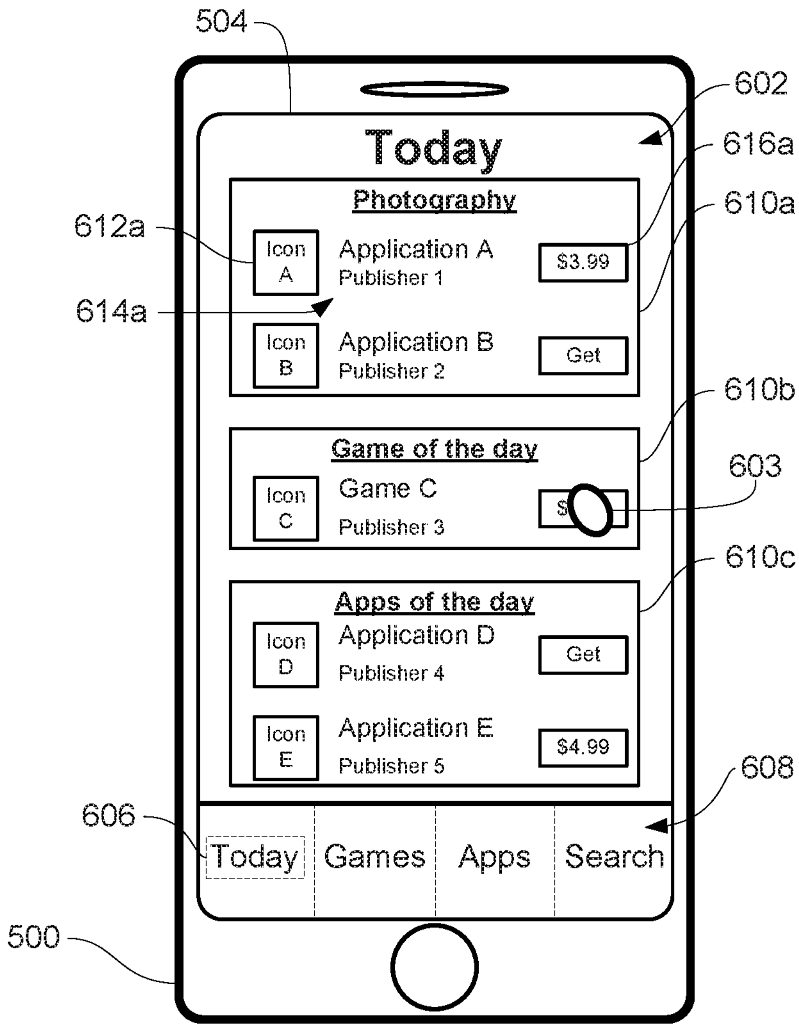
Figure 6F:
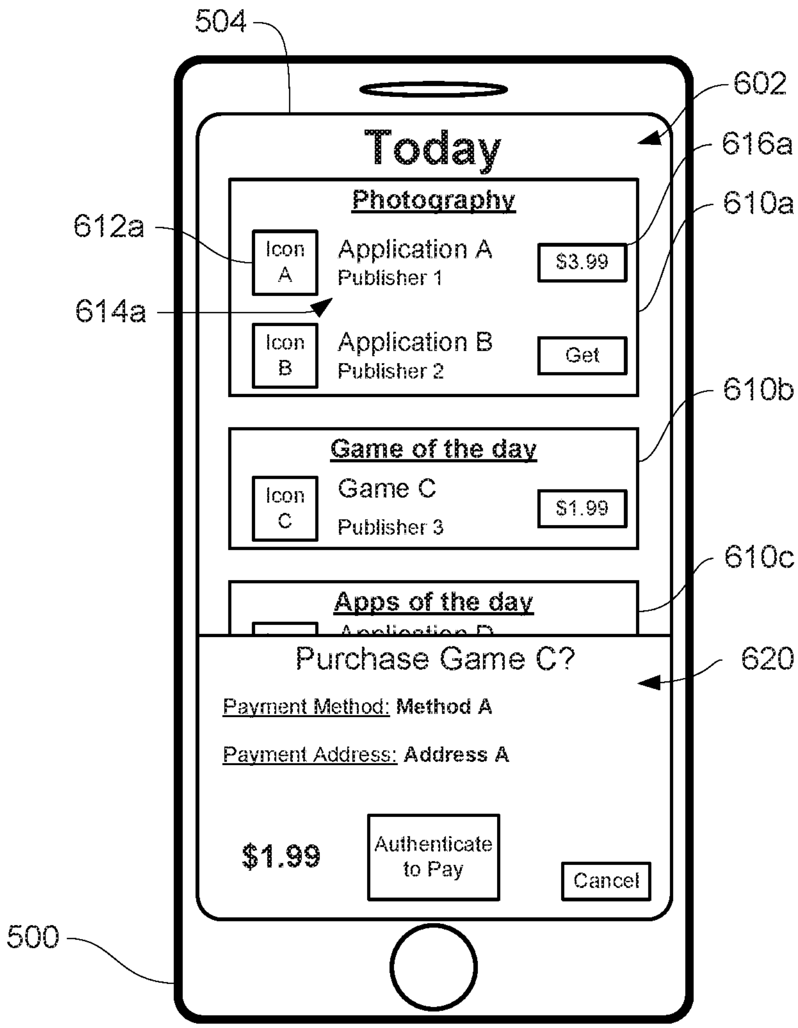

In FIG. 6D, instead of being a free game as in FIG. 6B, game C is a paid game with a price of $1.99 as indicated by the download affordance for game C. In FIG. 6E, selection of the download affordance for game C is detected. In response to the selection of the download affordance for game C, because game C in FIG. 6E is a paid game, device 500 displays payment authorization overlay 620 over user interface 602 as shown in FIG. 6F. Payment authorization overlay 620 includes information and/or instructions for purchasing game C. For example, payment authorization overlay 620 includes optionally user-changeable information about the method of payment and payment address for the purchase of game C, the price of game C, and a request for authentication of the user to authorize payment for game C. The user is optionally authenticated at device 500 in any number of ways, including by entering a username/password at device 500, fingerprint authentication at device 500, or other biometric authentication at device 500 (e.g., retinal scan and recognition, facial scan and recognition, voice scan and recognition, etc.). If the user is successfully authenticated at FIG. 6F and payment for game C is authorized, game C will be downloaded to device 500. If the user is not successfully authenticated at FIG. 6F and payment for game C is not authorized, or if the user cancels the purchase of game C, game C will not be downloaded to device 500. In some embodiments, payment authorization overlay 620 is a user interface of the operating system of device 500, and not a user interface of the app store application (e.g., the application from which the purchase of game C was requested).

Figure 6G:
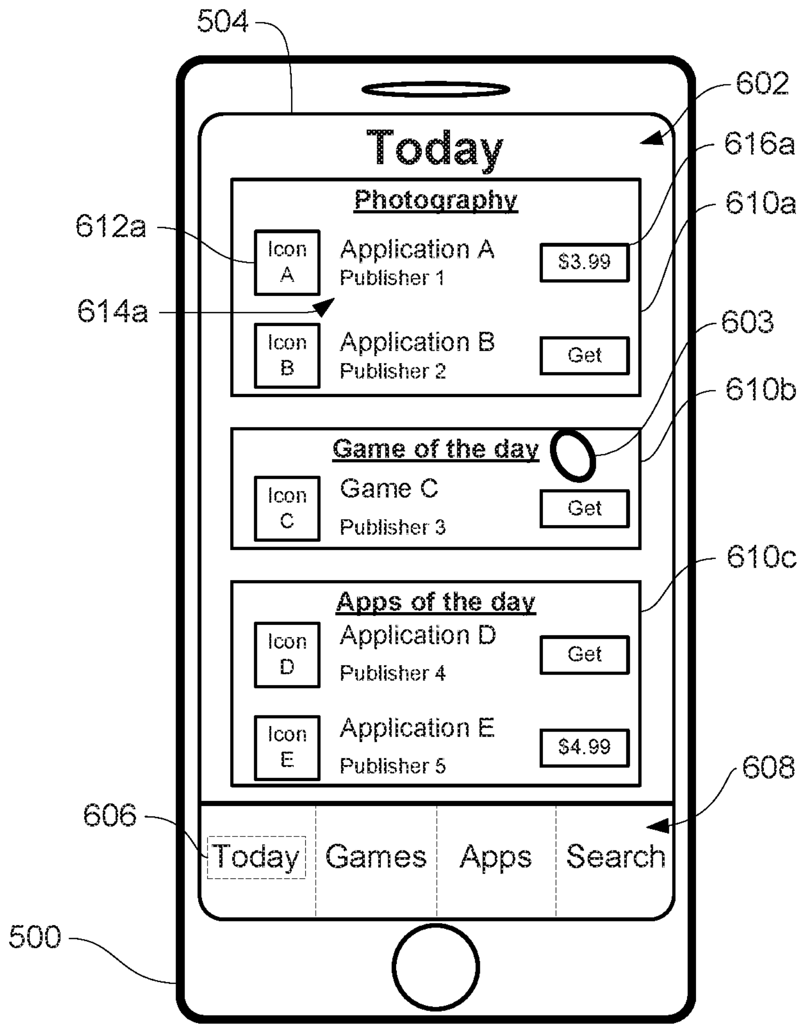
Figure 6H:
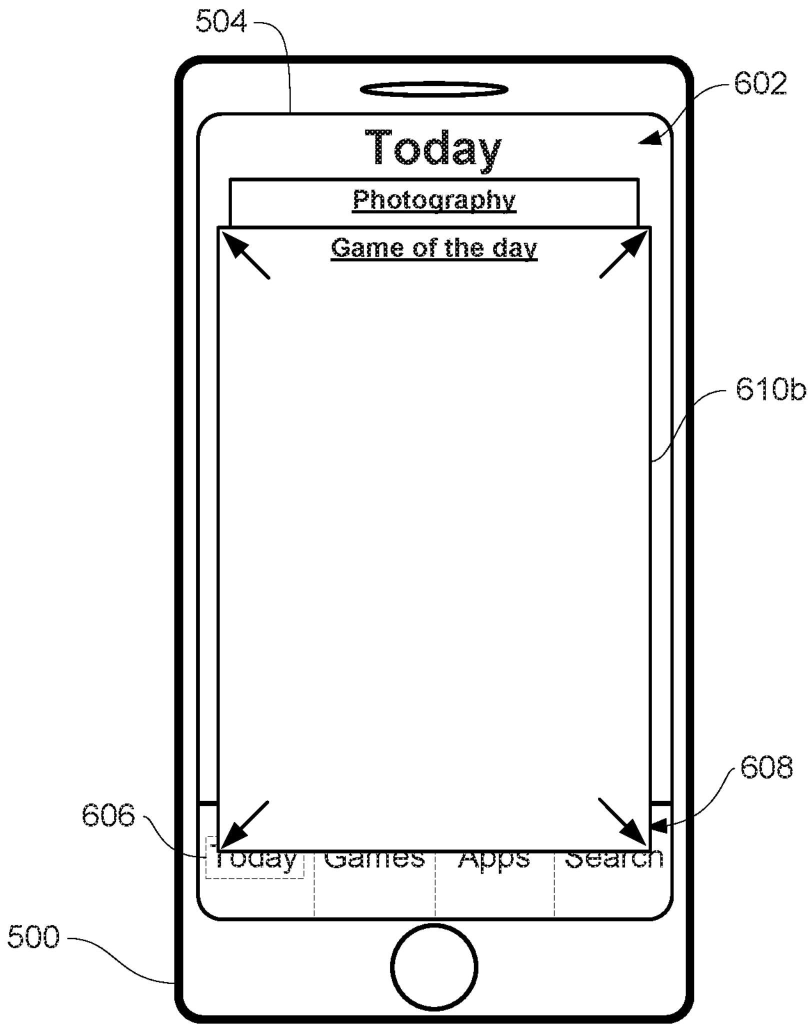
Figure 6I:
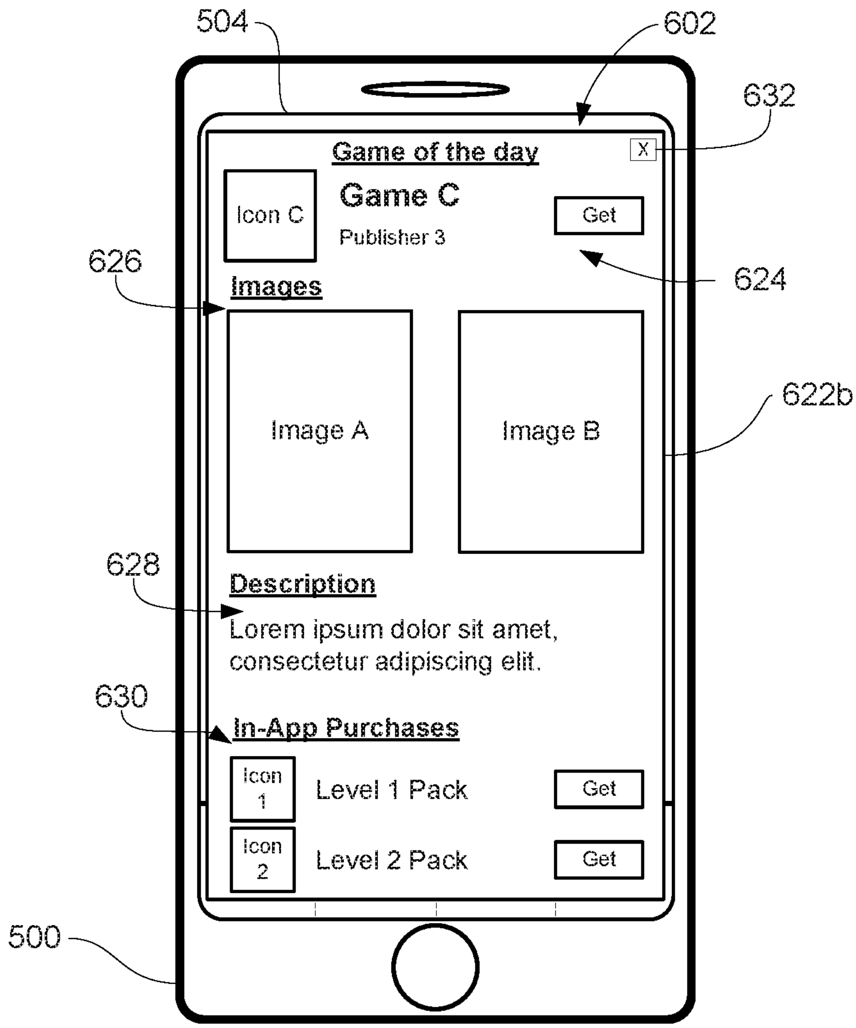

In FIG. 6G, selection of card 610*b* corresponding to game C is detected (e.g., a tap of contact 603 is detected in an area of card 610*b* other than the download affordance for game C and/or the icon for game C). In response to the selection of card 610*b*, card 610*b* visually expands as shown in FIG. 6H to become expanded card 622*b* as shown in FIG. 6I, which is displayed as overlaid over cards 610 and navigation bar 608. Notably, selection of card 610*b* in FIG. 6G optionally does not result in the downloading of game C to device 500, as did the selection of the download affordance for game C, but rather optionally displays additional information about game C in expanded card 622*b* as shown in FIG. 6I. Expanded card 622*b* continues to display an indication that game C is the "Game of the day," and continues to display the icon, name, publisher and download affordance 624 for game C (as was shown by card 610*b*). However, expanded card 622*b* also includes additional information about game C that was not displayed by card 610*b*, such as images 626 from game C, a description 628 of game C, and information 630 about in-app purchases for game C, which will be described in greater detail with reference to FIGS. 10A-10U and method 1100.

Figure 6J:
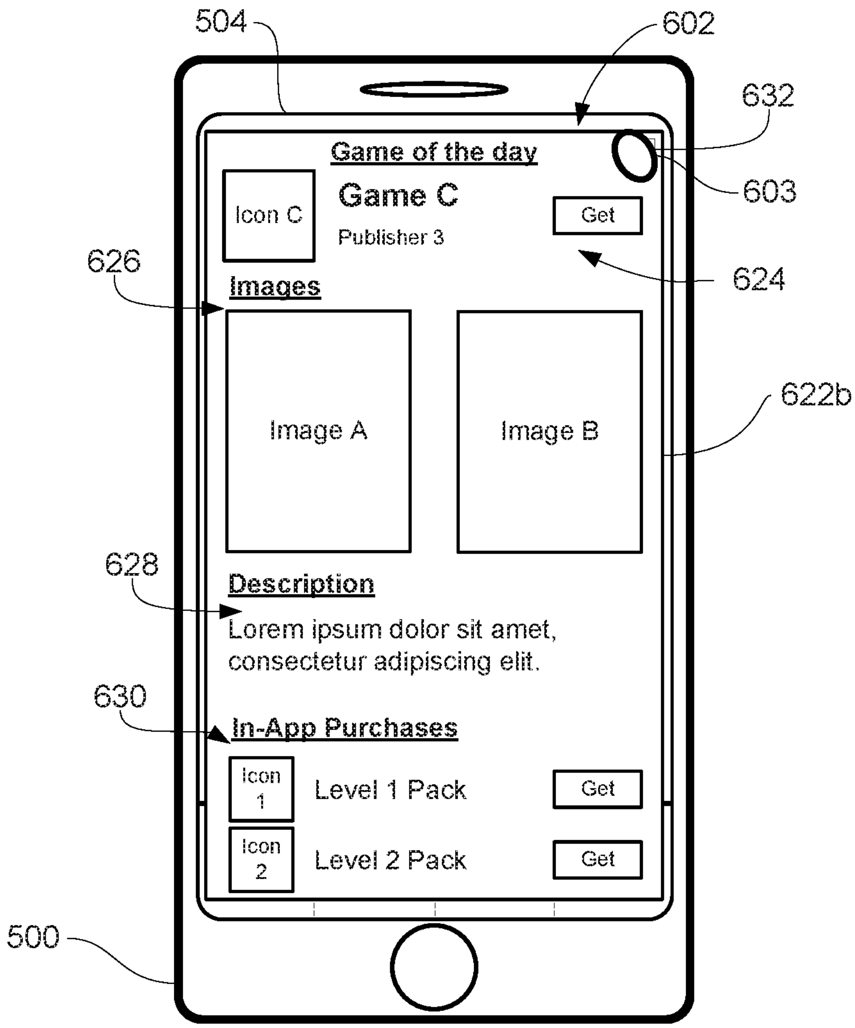
Figure 6K:
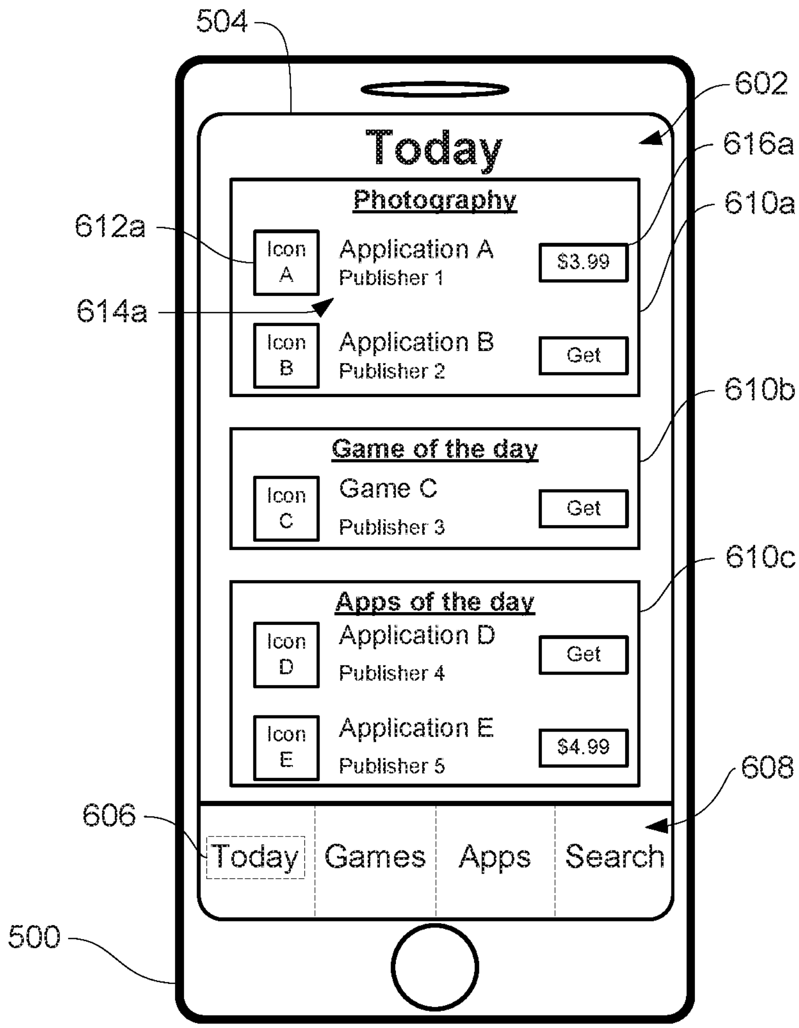

In FIG. 6J, an input dismissing expanded card 622*b* is detected (e.g., by detecting a tap on close element 632, or by detecting a swipe of expanded card 622*b* having a magnitude greater than a threshold (e.g., 1 cm, 2 cm, 3 cm) in any direction), and in response, device 500 ceases display of expanded card 622*b*, which causes cards 610 and navigation bar 608 to be redisplayed in user interface 602, as shown in FIG. 6K.

Figure 6L:
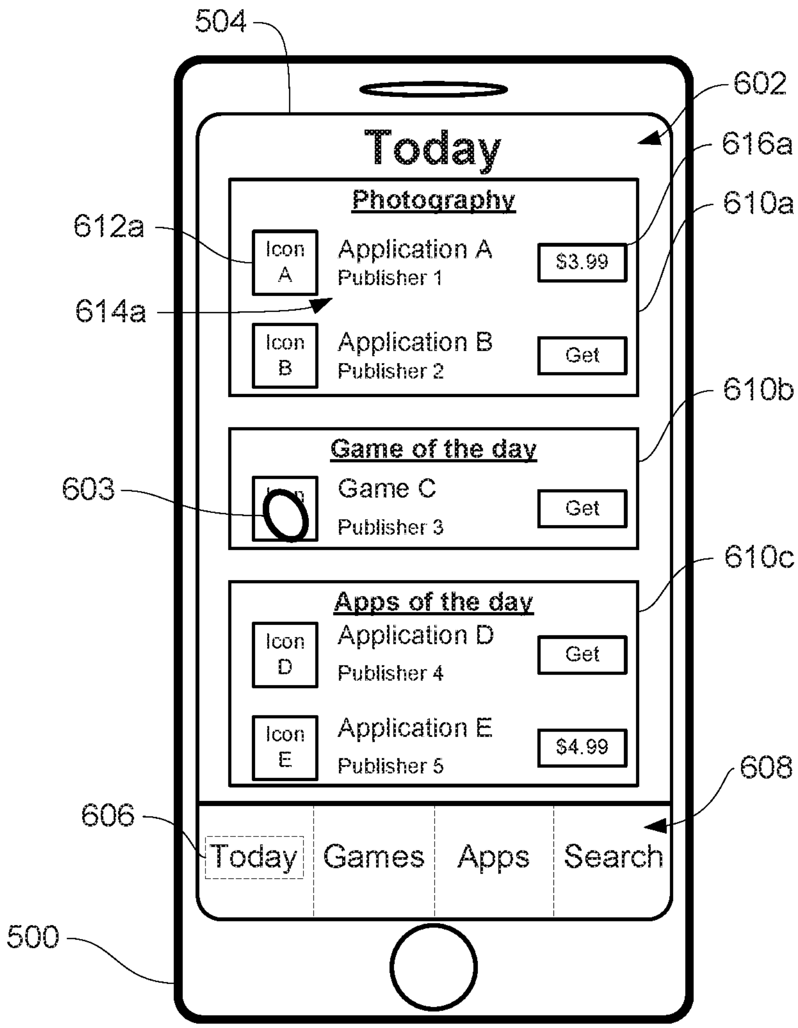
Figure 6M:
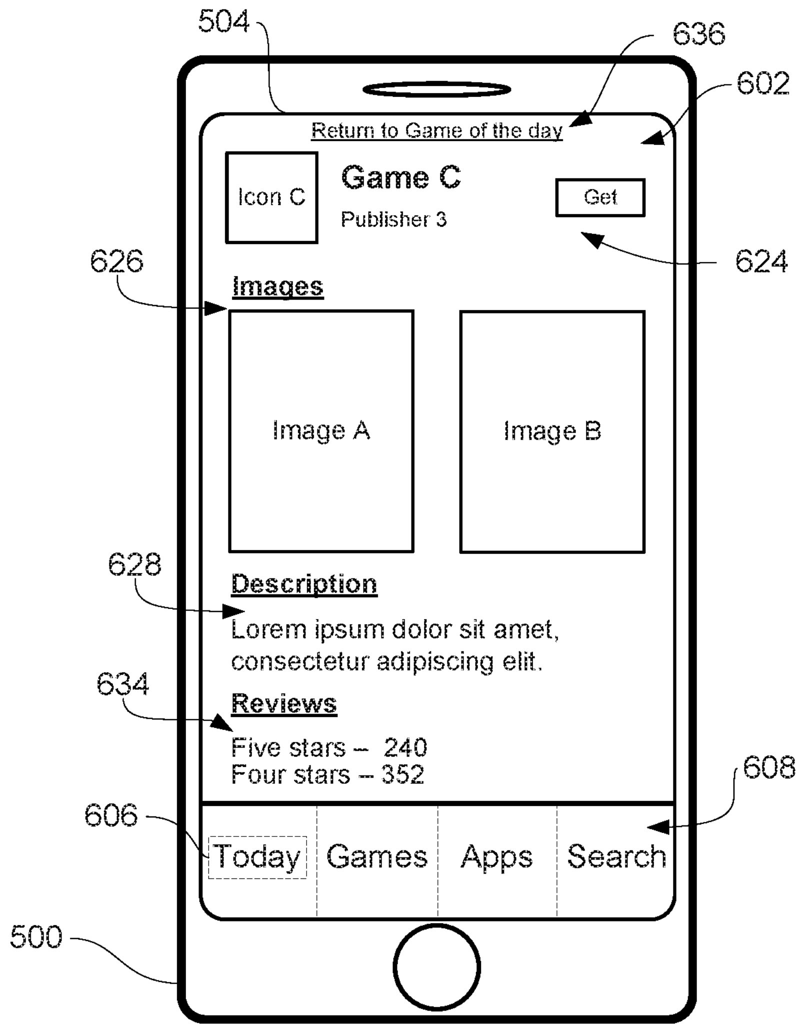

In FIG. 6L, selection of the icon for game C in card 610*b* is detected (e.g., by detecting a tap on icon C). In response, rather than expanding card 610*b* and displaying expanded card 622*b* as in FIGS. 6H-6I or downloading game C as in FIGS. 6B-6F, device 500 displays a product page for game C as shown in FIG. 6M. The product page for game C is optionally a page dedicated to game C, and includes information about game C that is optionally the same or different than the information contained in the expanded card 622*b* for game C. The product page for game C (and more generally for other applications or games available for download to device 500 from the app store application) will be described in more detail with reference to FIGS. 8Y-8LL and method 900.

Figure 6N:
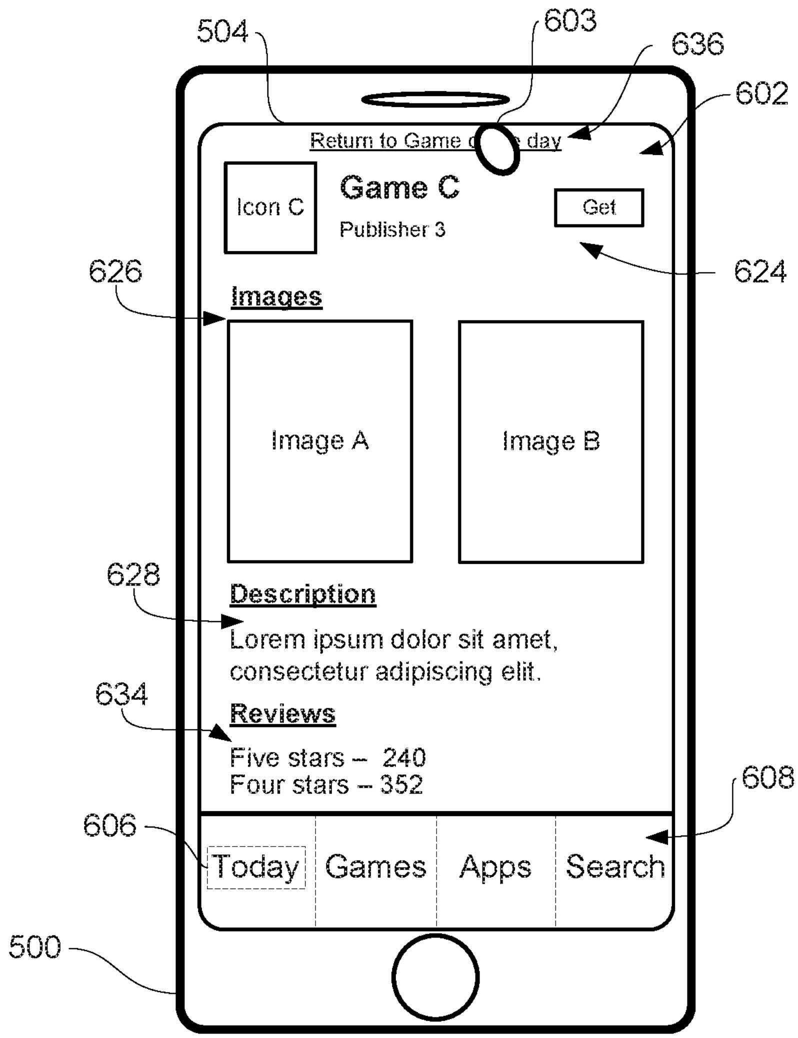
Figure 6O:
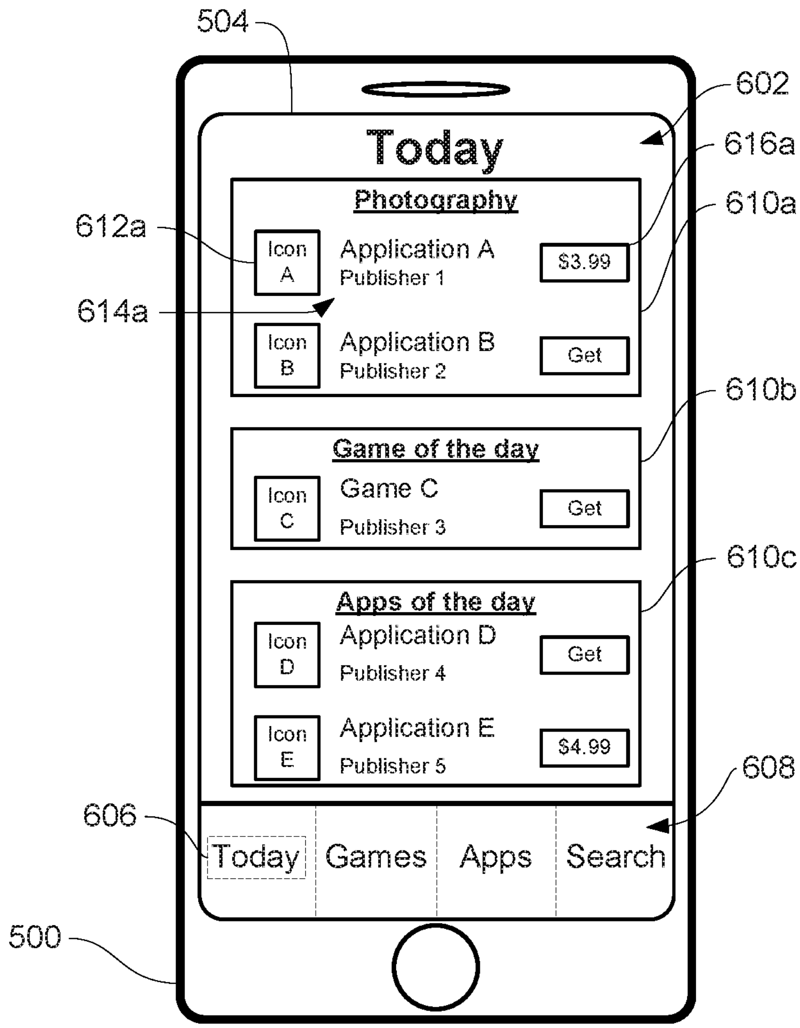
Figure 6P:
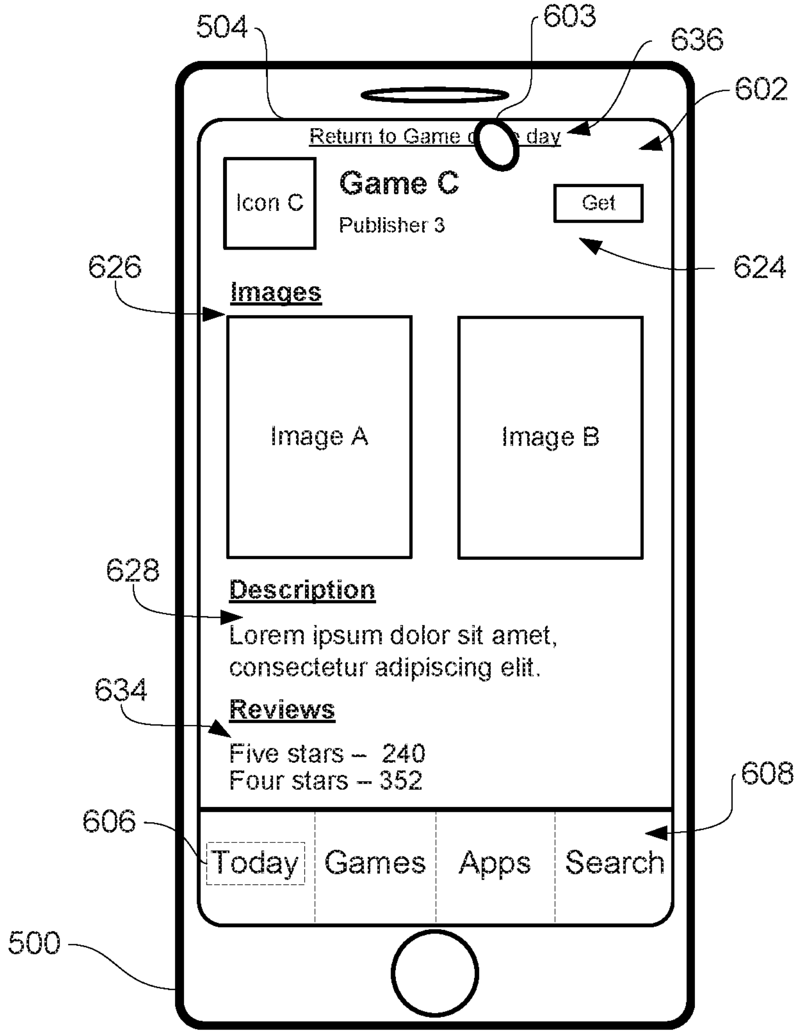
Figure 6Q:
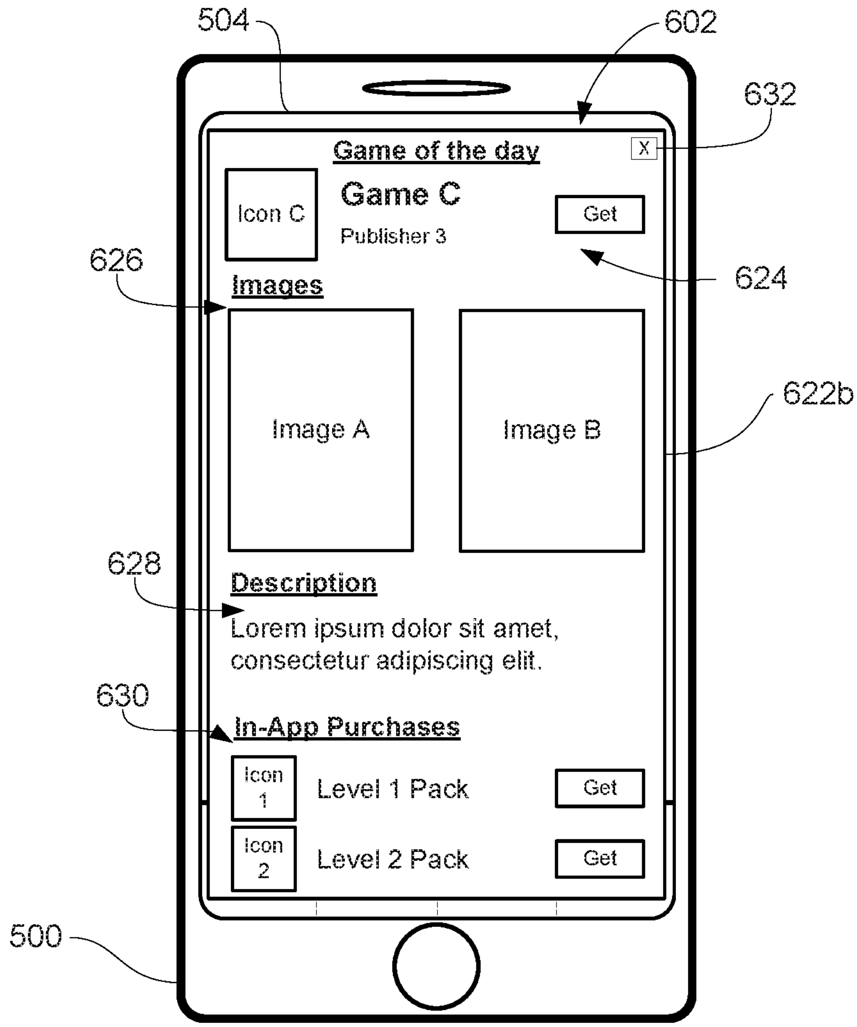

The product page for game C is optionally reachable in different ways. For example, the product page for game C is optionally displayed by device 500 in response to selection of the icon for game C on card 610*b* in user interface 602, as shown in FIGS. 6L-6M. In such circumstances where the product page for game C was displayed in response to selection of the icon for game C on card 610*b*, the product page optionally includes link 636, selection of which (as shown in FIG. 6N) returns device 500 to user interface 602 that includes card 610*b* for game C, as shown in FIG. 6O. In this way, the user is able to quickly and easily return to the card 610 from which the user viewed the product page for the corresponding application. Alternatively, in some embodiments, selection of link 636 on the product page for game C (as shown in FIG. 6P) returns device 500 to expanded card 622*b* for game C, as shown in FIG. 6Q, rather than returning to user interface 602 that includes card 610*b* for game C. In this way, the user is able to quickly and easily navigate to the expanded card corresponding to the card from which the user viewed the product page for the corresponding application.

Figure 6R:
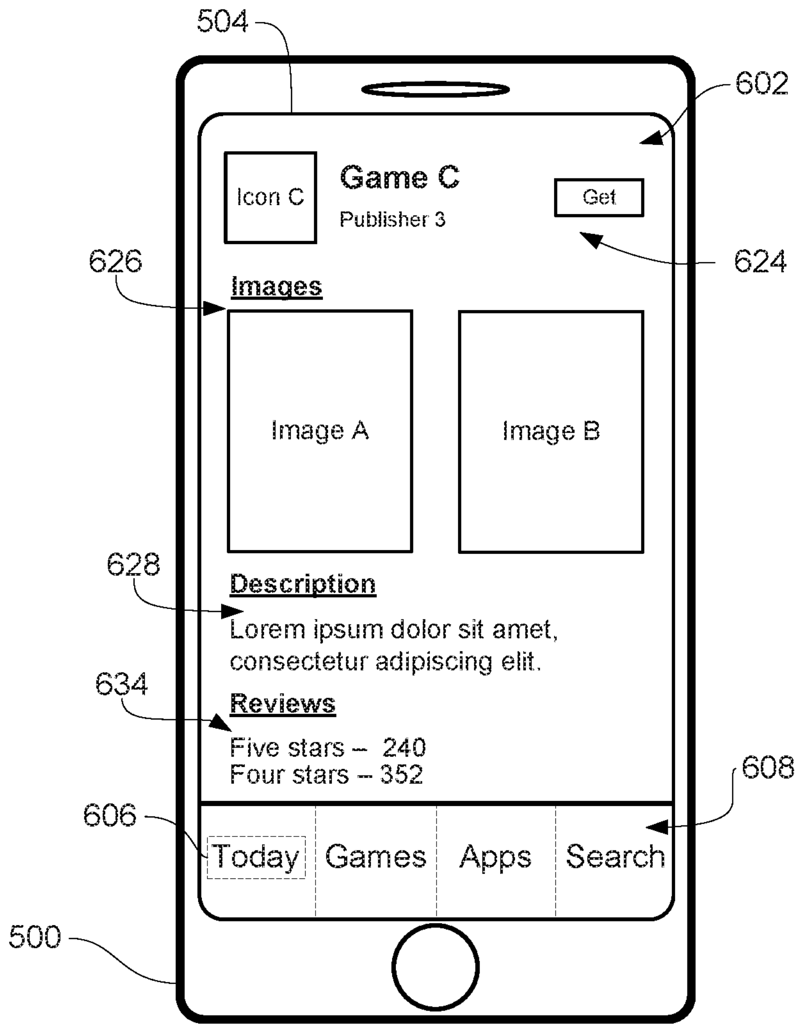

However, if the product page for game C was displayed as a result of input other than selection of the icon for game C on card 610*b* (e.g., via browsing the app store application using the "Games" element in navigation bar 608, as will be described in more detail with reference to FIGS. 8A-8LL and method 900), the product page for game C does not include a link back to the card or expanded card corresponding to game C, as shown in FIG. 6R.

Figure 6S:
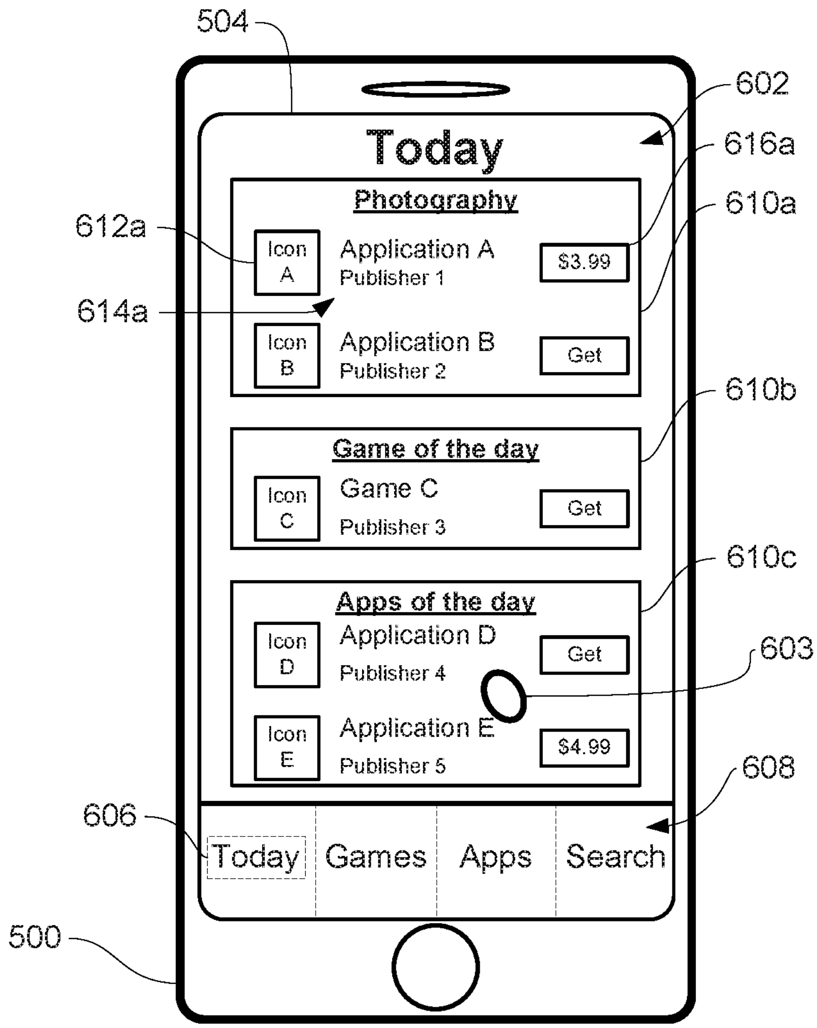
Figure 6T:
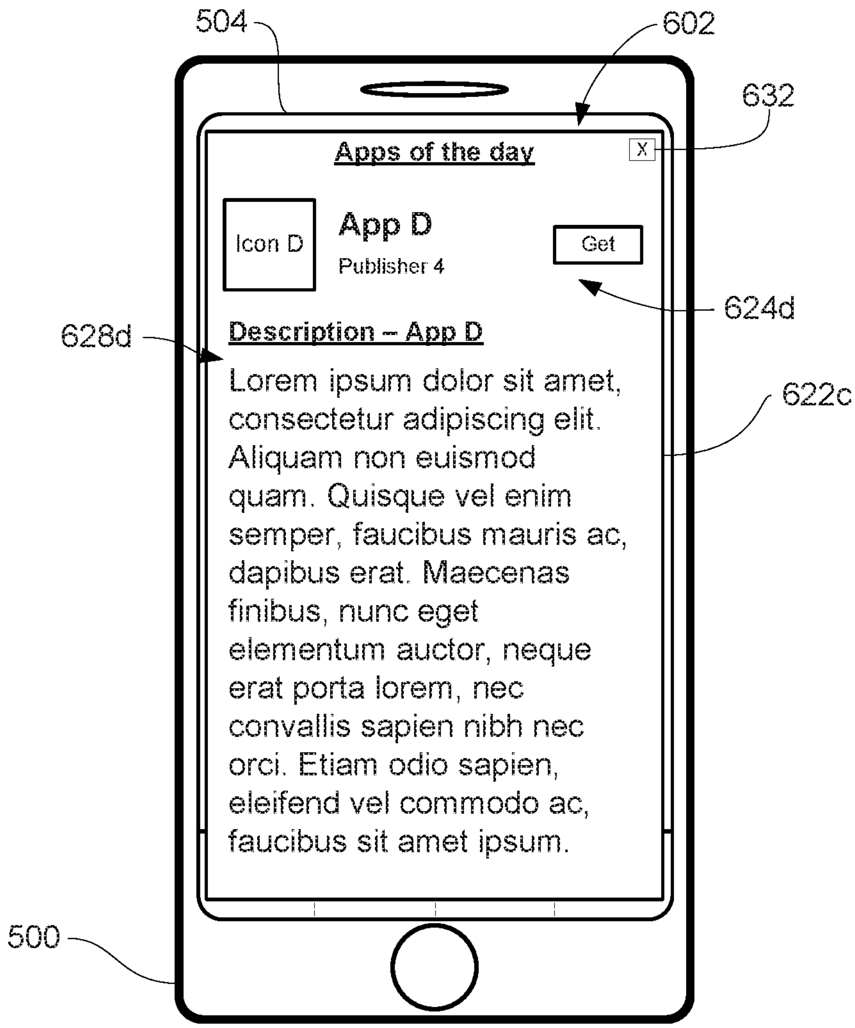

In some embodiments, a card 610 in user interface 602 corresponds to two or more games or applications. For example, in FIG. 6S, card 610*c* corresponds to applications D and E. Selection of card 610*c*, as shown in FIG. 6S, causes device 500 to display expanded card 622*c* (similar to as described with reference to FIGS. 6G-6I), which corresponds to card 610*c*. Expanded card 622*c* includes additional information (e.g., information not displayed by card 610*c*) about the applications that correspond to card 610*c*. For example, as shown in FIG. 6T, expanded card 622*c* continues to display the icon for application D, the name/publisher for application D, and the download affordance for application D. However, expanded card 622*c* also includes additional information 628*d* about application D (e.g., a description of application D). The icon for application D, the name/publisher for application D, the download affordance for application D and information 628*d* are displayed together (e.g., adjacent to each other) in expanded card 622*c*.

Figure 6U:
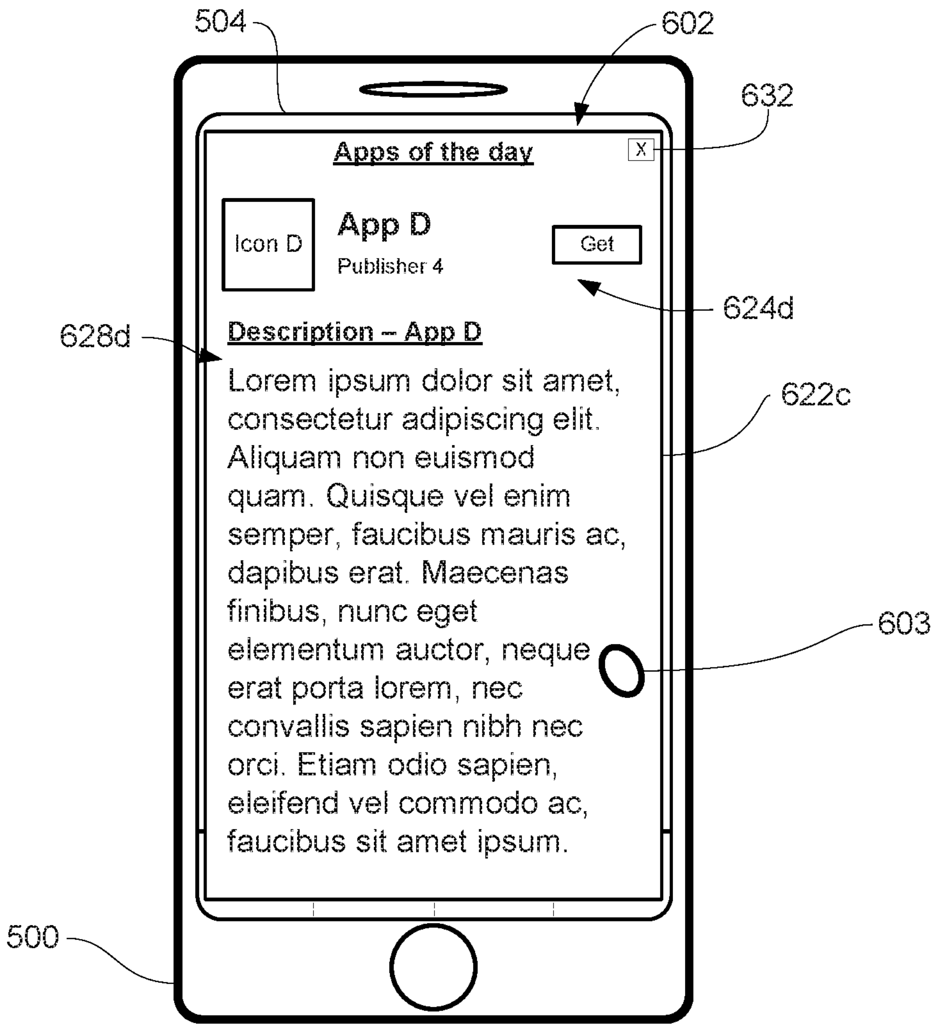
Figure 6V:
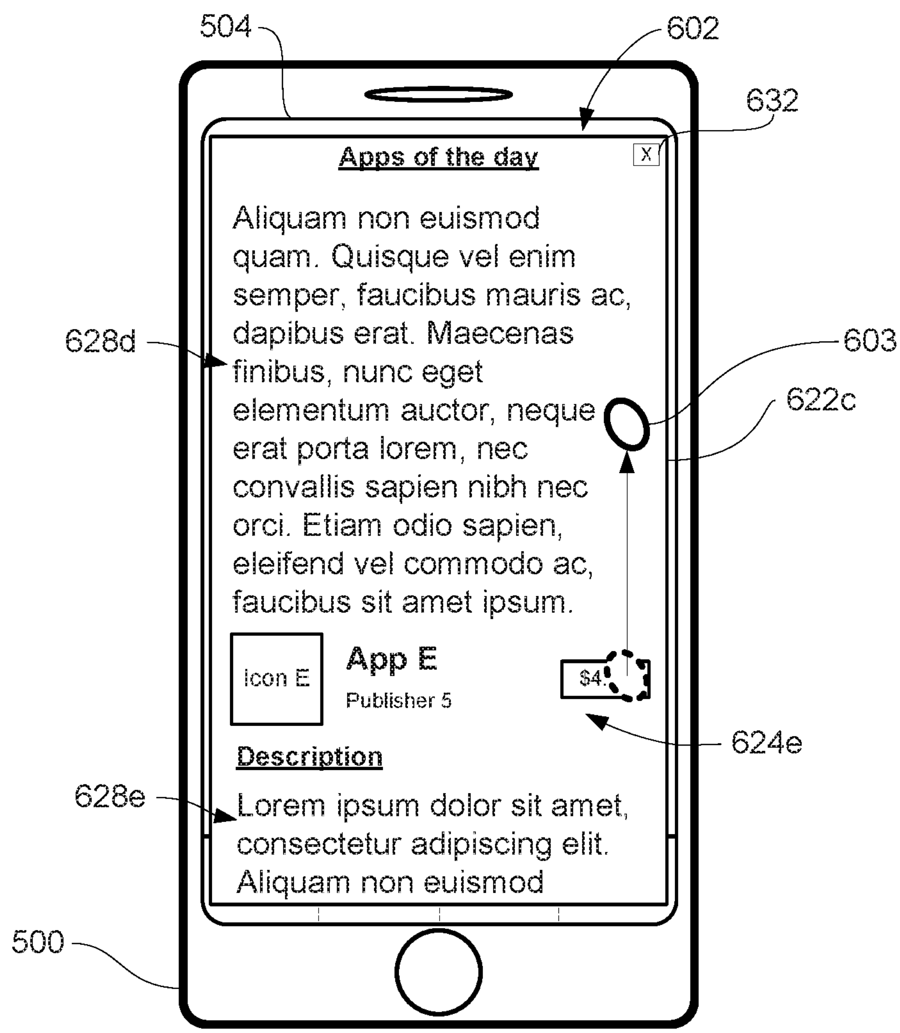

Expanded card 622*c* optionally also includes such information and elements for application E, however in FIG. 6T, such information and elements for application E are not visible due to the size of expanded card 622*c* and/or the space required for the icon for application D, the name/publisher for application D, the download affordance for application D and information 628*d* for application D. In FIGS. 6U-6V, an input for scrolling through expanded card 622*c* is detected (e.g., an upward swipe of contact 603), and in response, the icon for application E, the name/publisher for application E, the download affordance for application E and information 628*e* for application E become visible in expanded card 622*c*, as shown in FIG. 6V.

In some embodiments, selection of an icon for a particular application or game in a card corresponding to two or more applications or games causes the corresponding expanded card to be displayed with the information for the selected application or game having the focus in the expanded card. For example, in FIG. 6W, selection of the icon for application E is detected (as compared with the selection of card 610*c* other than an icon or a download/purchase affordance, as in FIG. 6S). In response, in FIG. 6X, device 500 displays expanded card 622*c* with the icon for application E, the name/publisher for application E, the download affordance for application E and information 628*e* for application E displayed (e.g., having the focus) in expanded card 622*c*. This is in contrast to expanded card 622*c* in FIG. 6T that was displayed in response to the selection of card 610*c* that was detected in FIG. 6S (rather than selection of an icon in card 610*c*), in which the icon for application D (rather than application E), the name/publisher for application D (rather than application E), the download affordance for application D (rather than application E) and information 628*d* for application D (rather than application E) were initially displayed, because such elements and information are optionally positioned first in expanded card 622*c*. Expanded card 622*c* is optionally the same as expanded card 622*c* in FIG. 6T (e.g., includes the same information as expanded card 622*c* in FIG. 6T, optionally in the same order as in FIG. 6T). As such, input for scrolling up in expanded card 622*c* (e.g., via a downward swipe of contact 603) would optionally cause the icon for application D, the name/publisher for application D, the download affordance for application D and/or information 628*d* for application D to become visible in expanded card 622*c*.

Figure 6W:
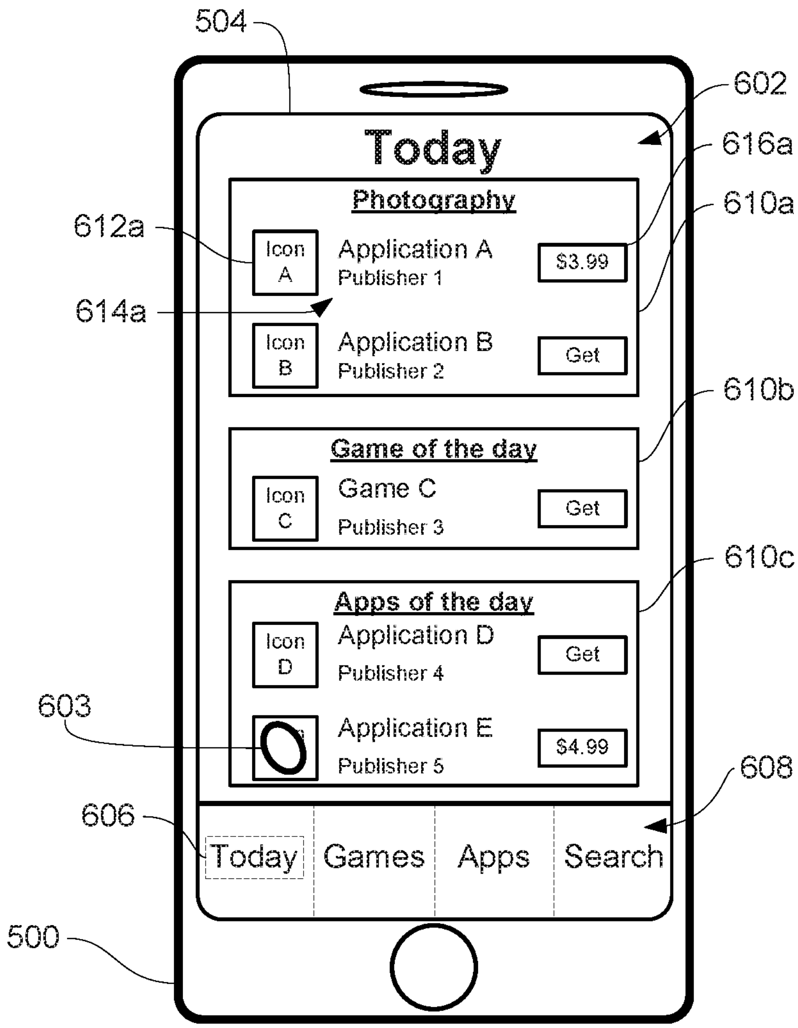
Figure 6X:
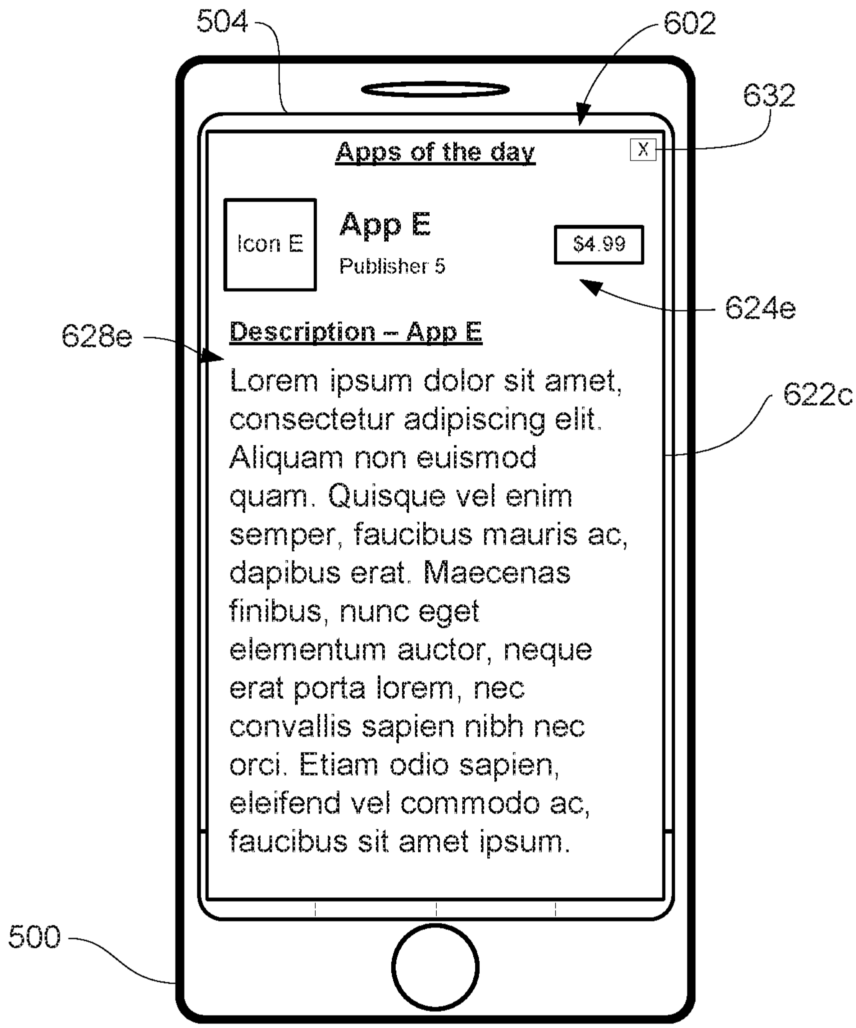
Figure 6Y:
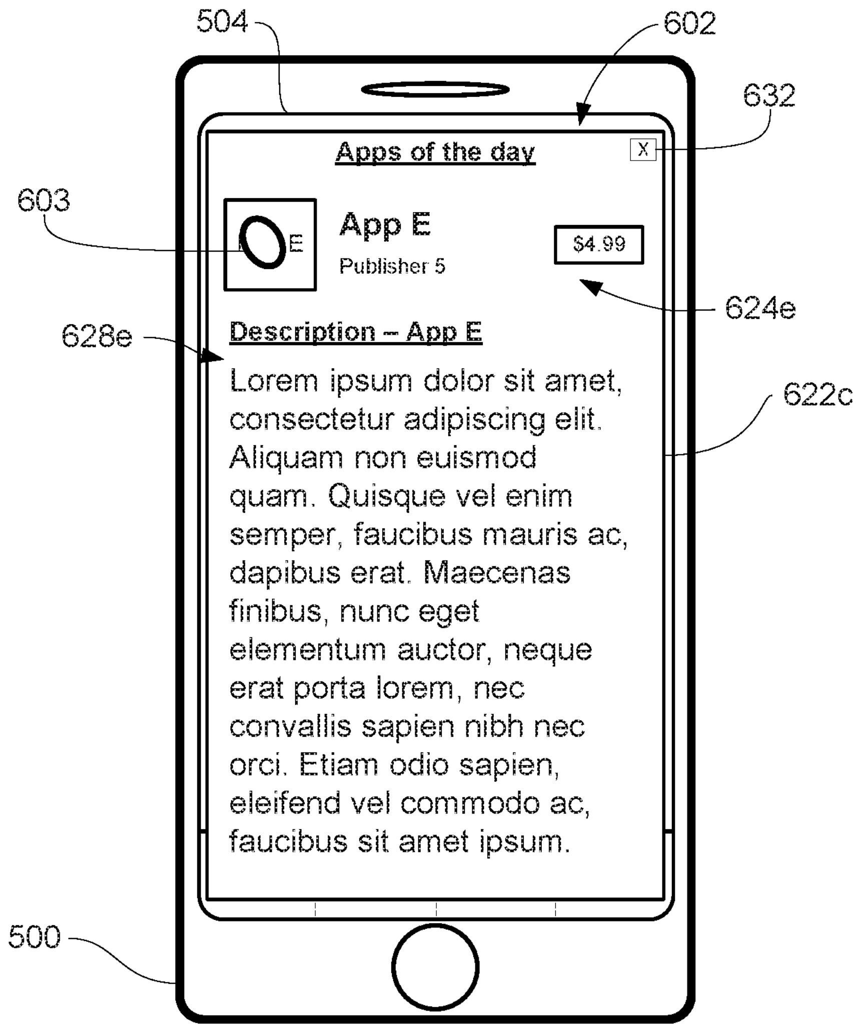
Figure 6Z:
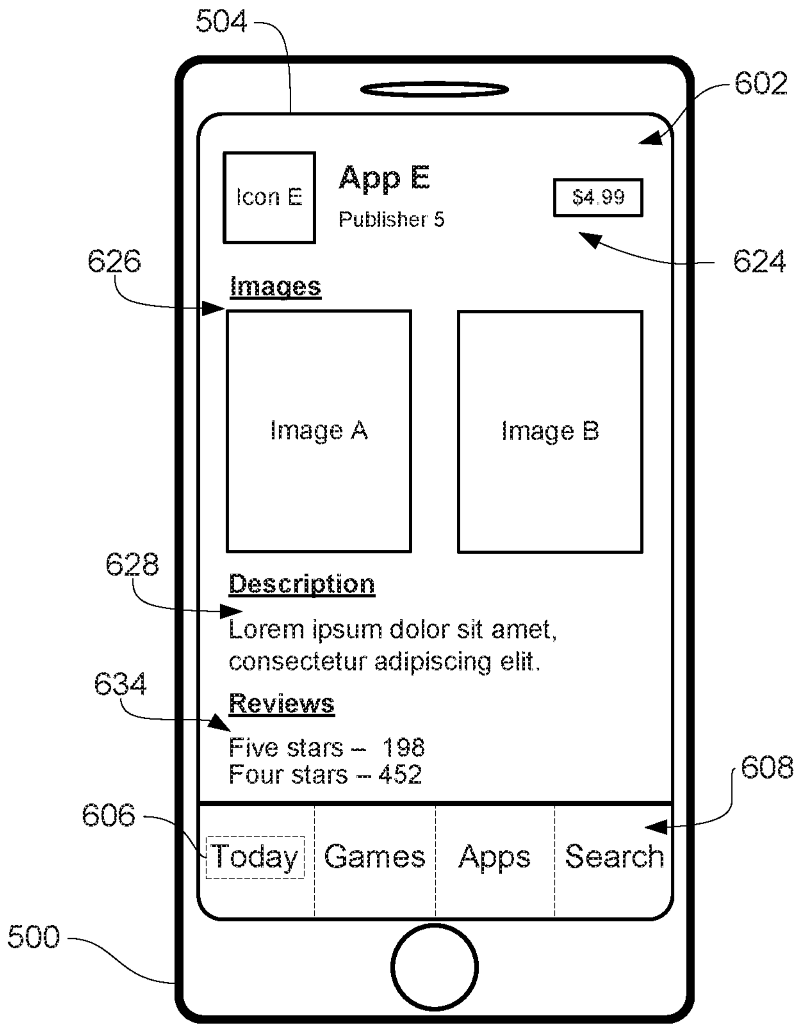
Figure 6A:
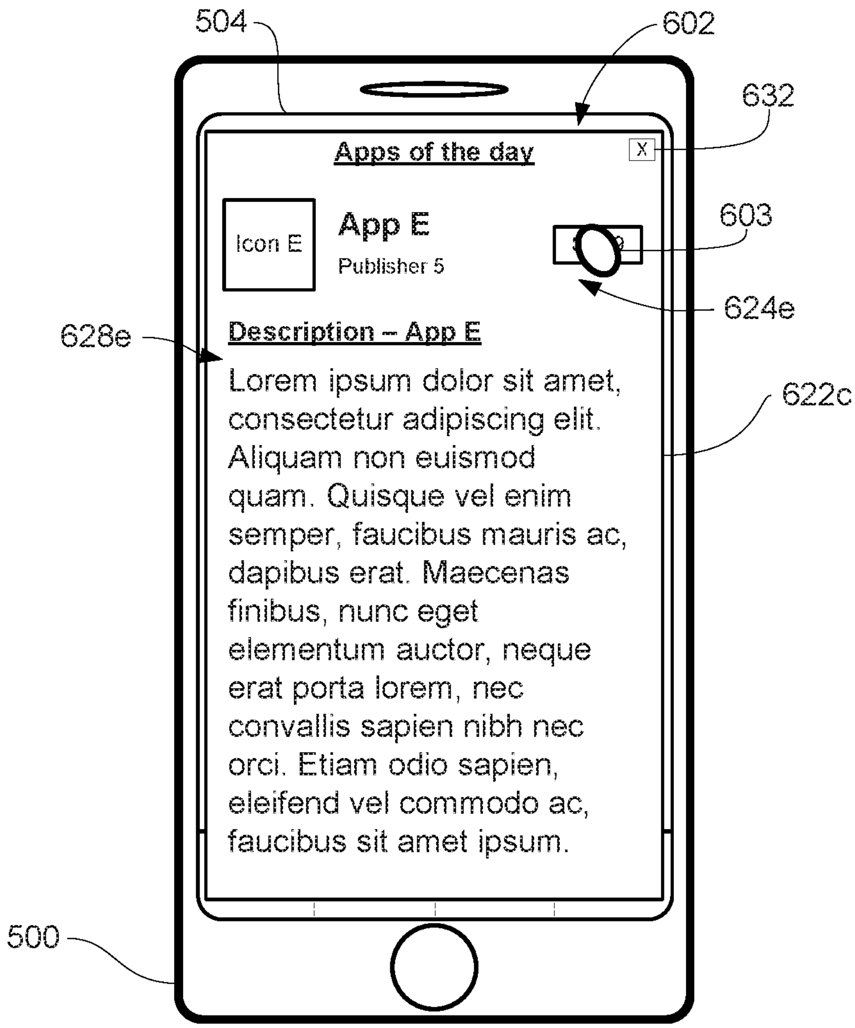
Figure 6B:
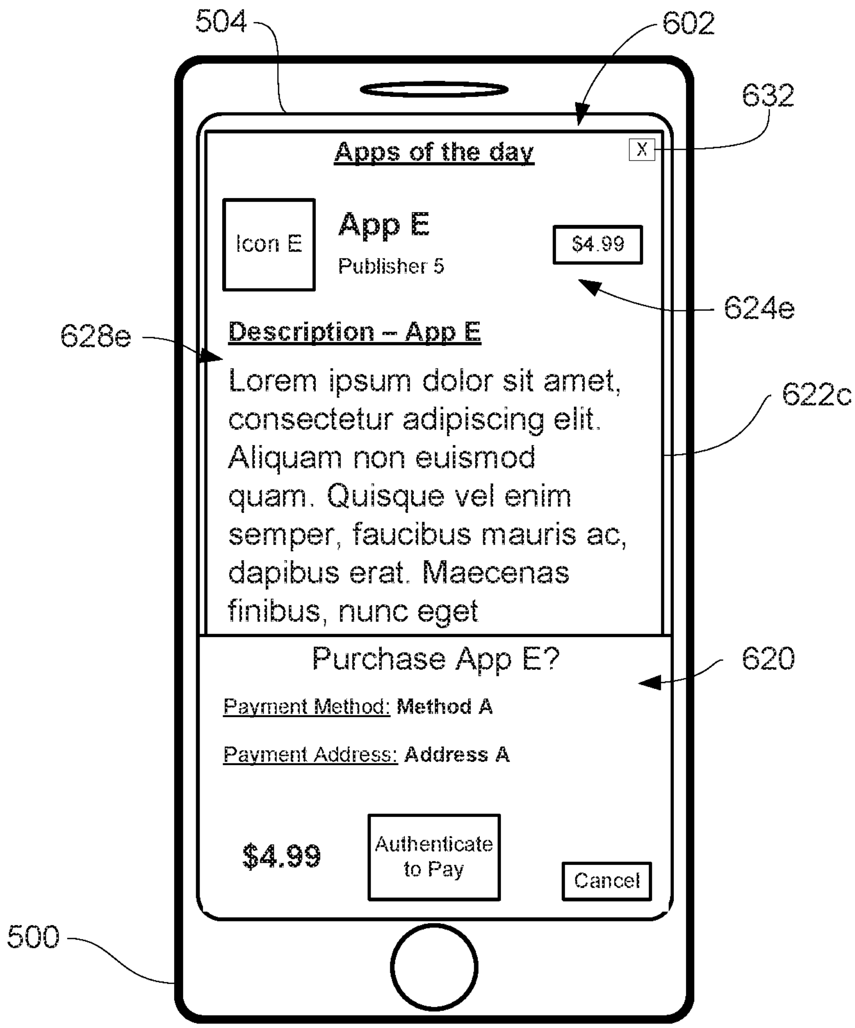
Figure 6C:
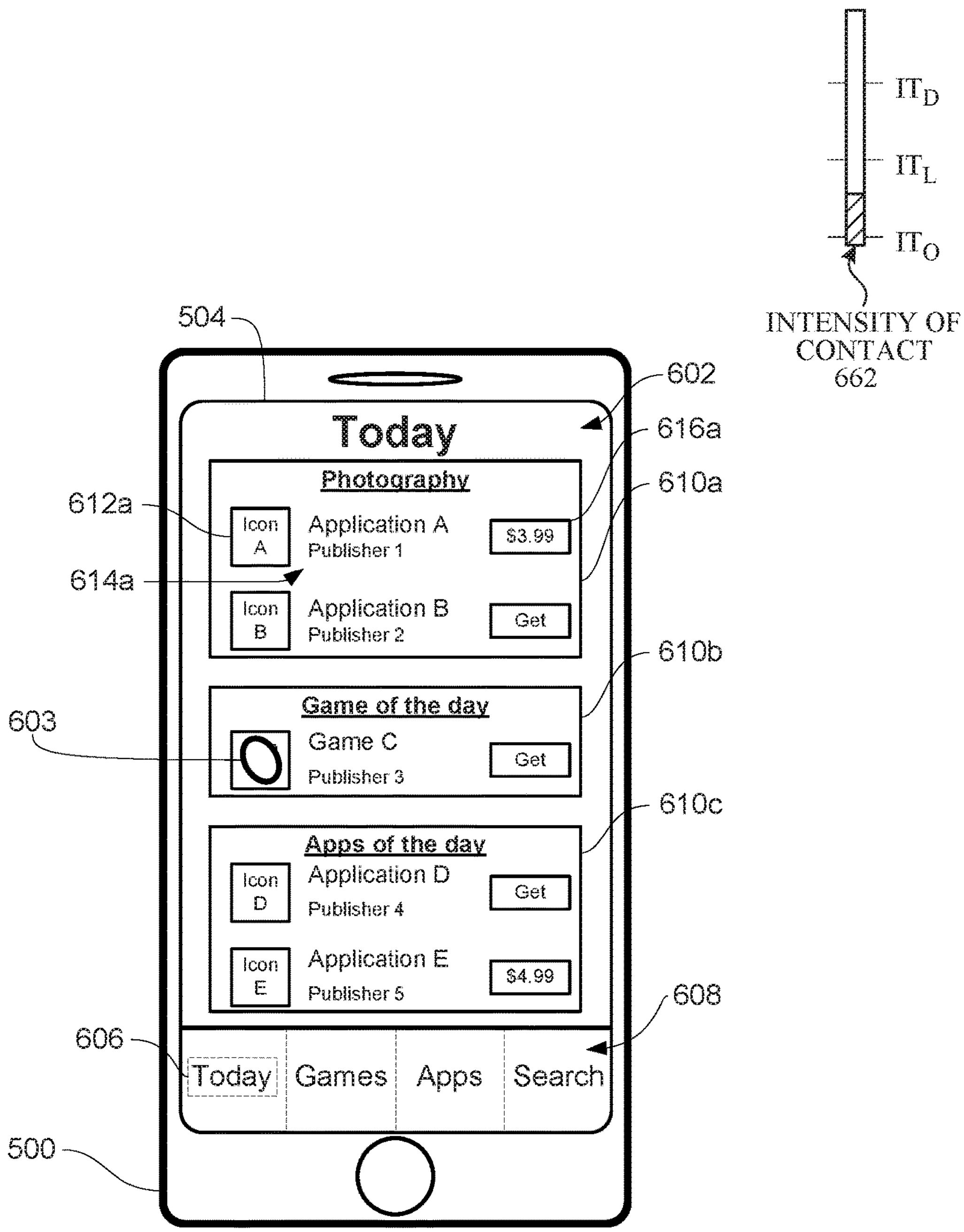
Figure 6D:
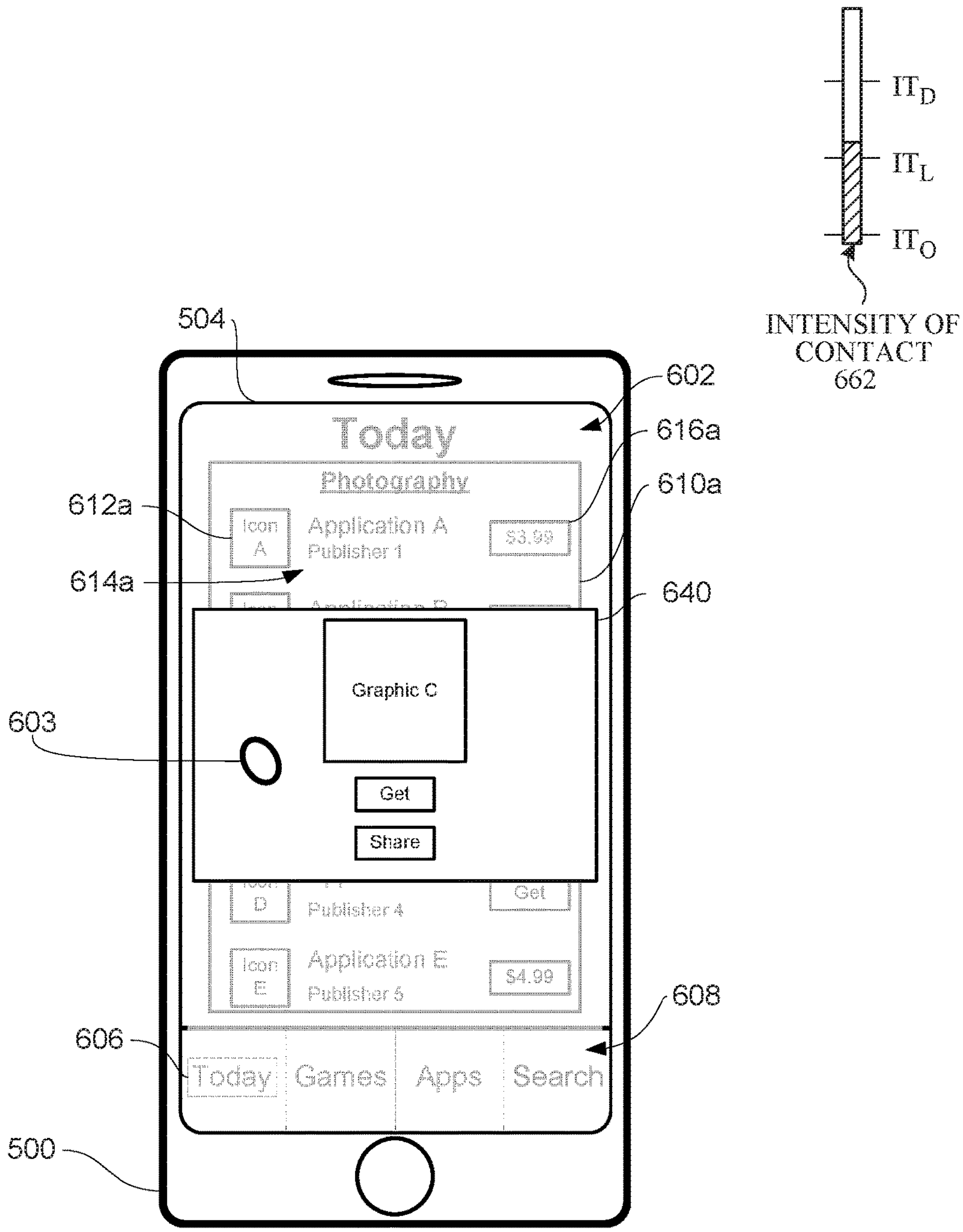
Figure 6E:
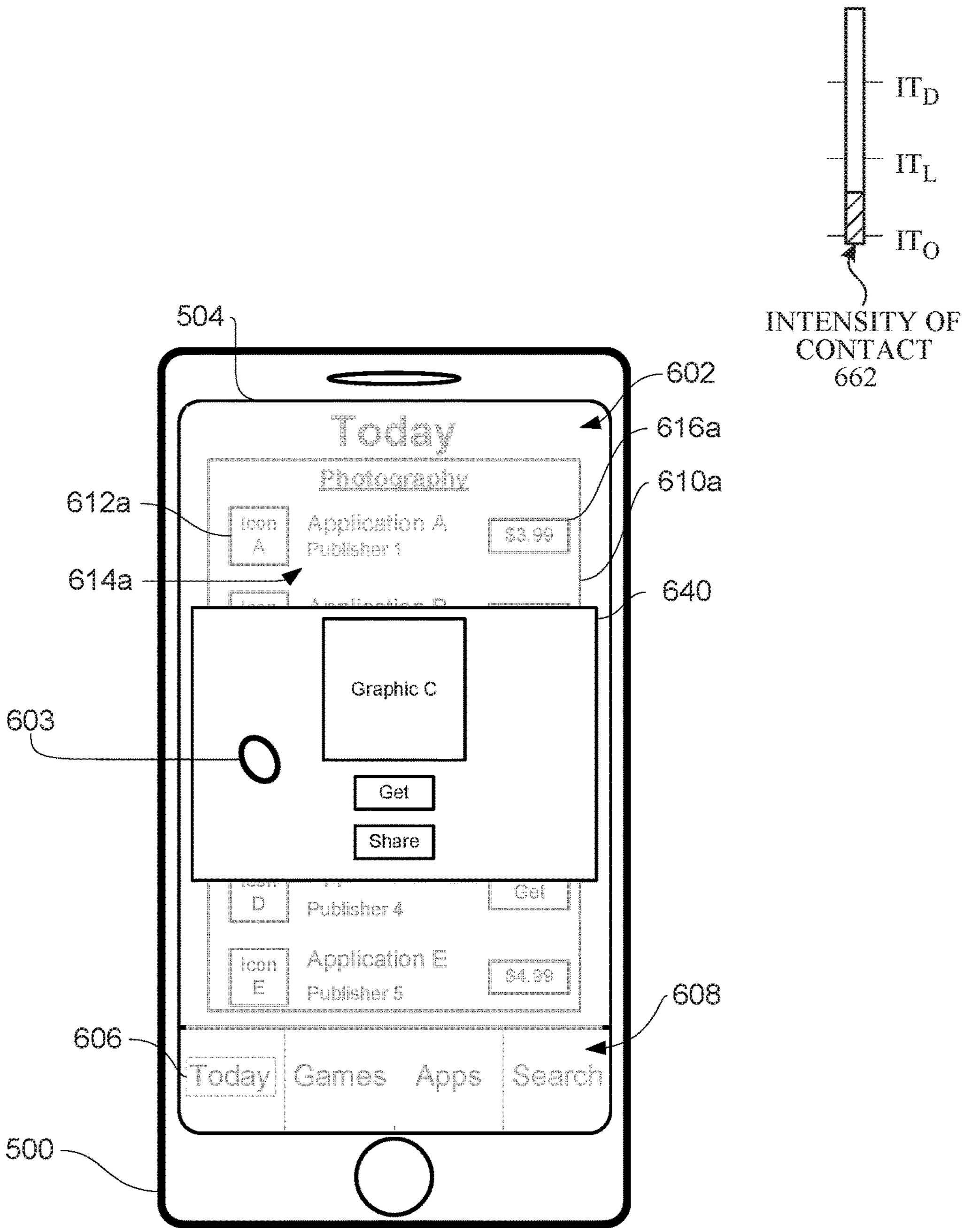
Figure 6F:
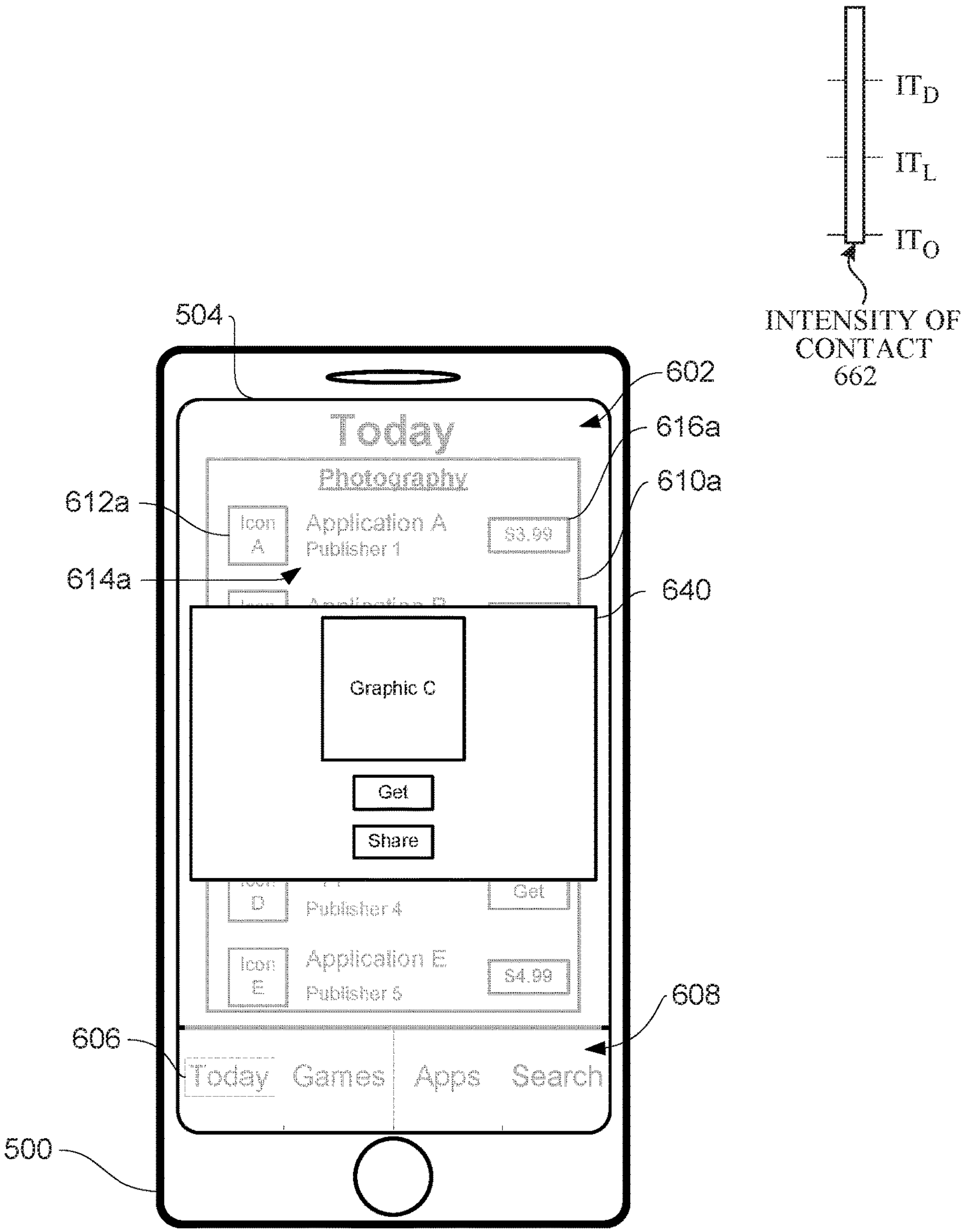
Figure 6G:
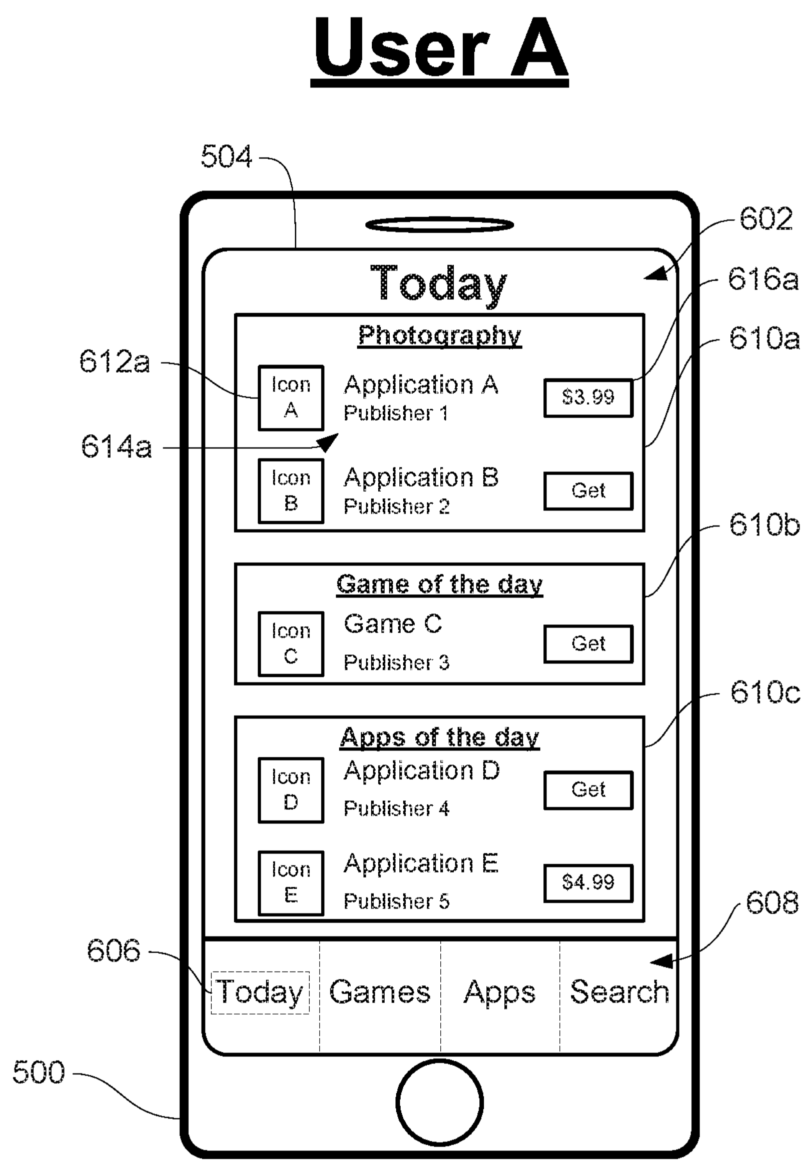
Figure 6H:
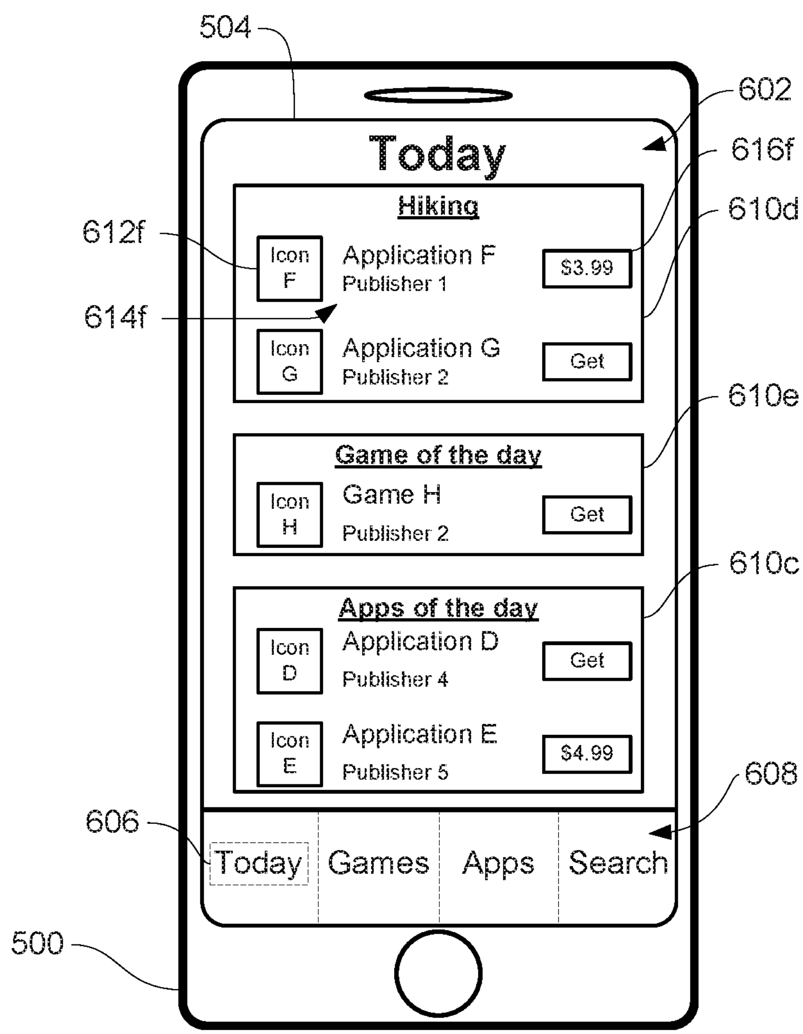
Figure 6I:
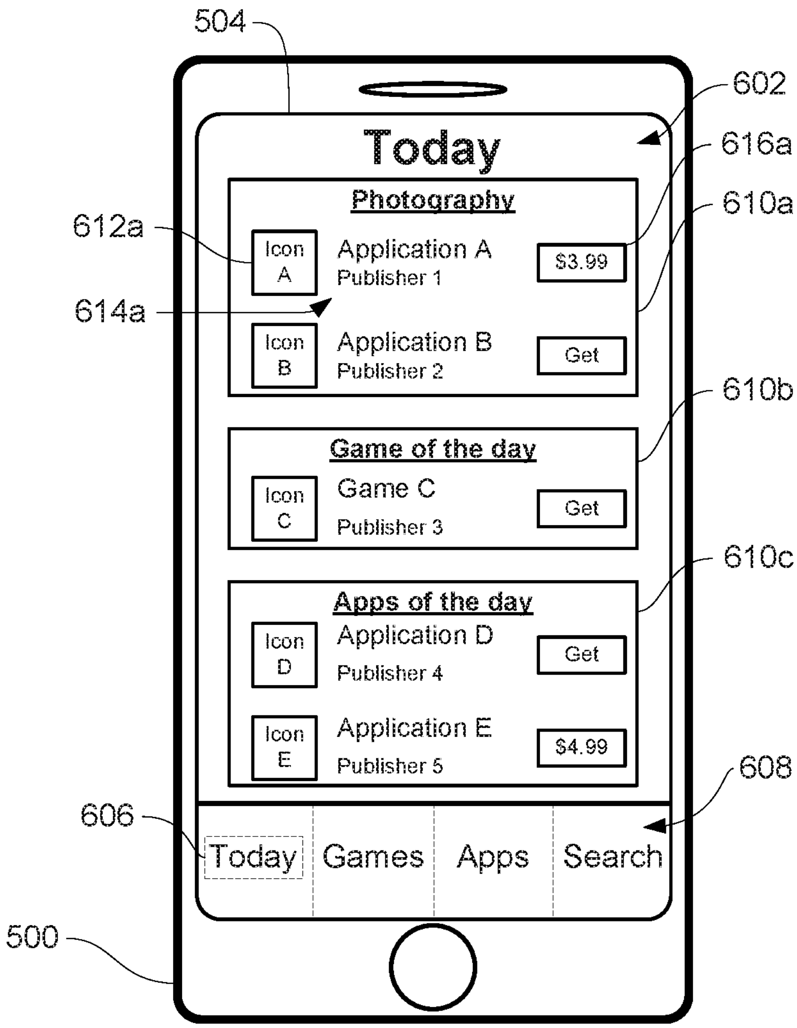
Figure 6J:
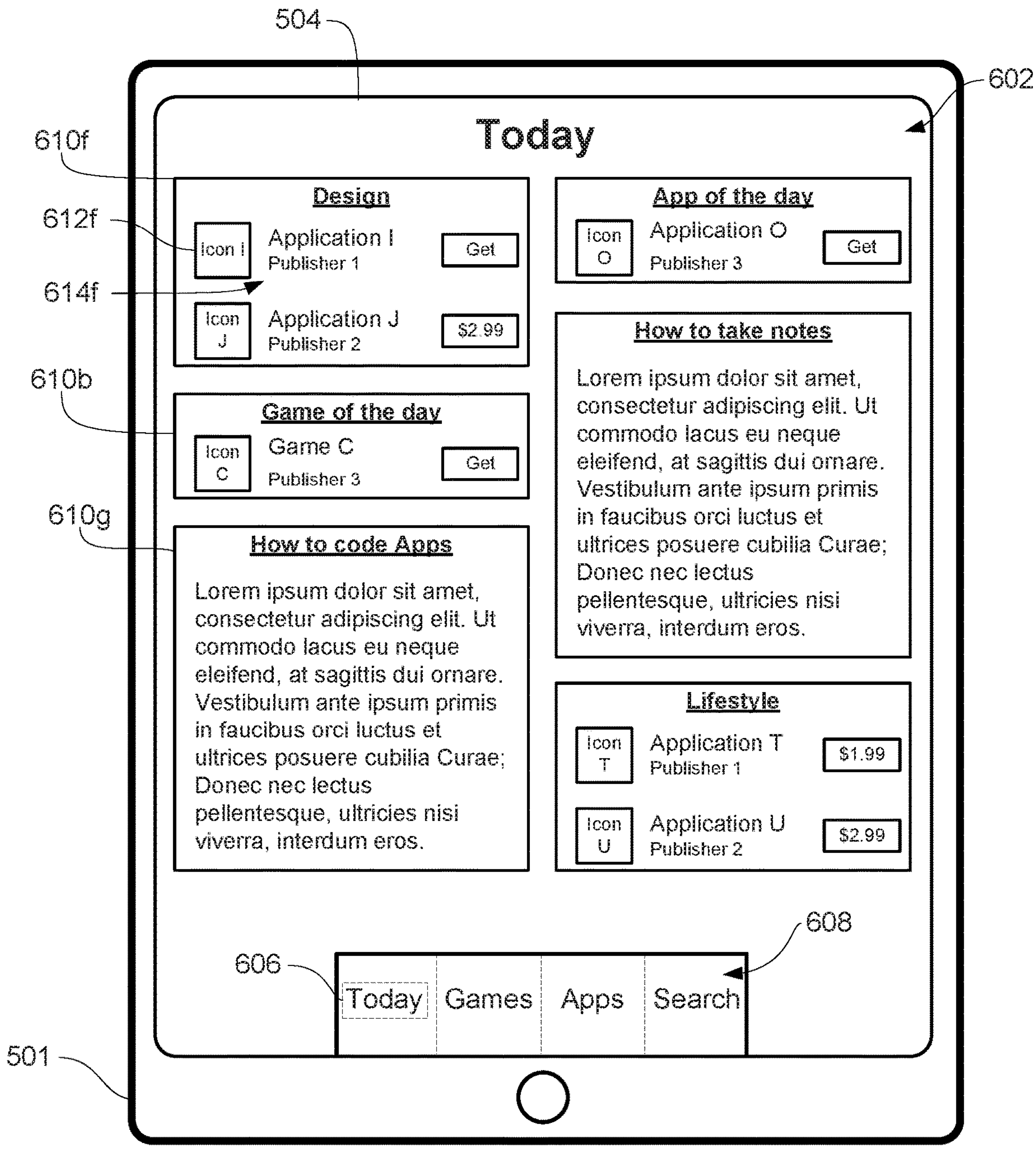
Figure 6K:
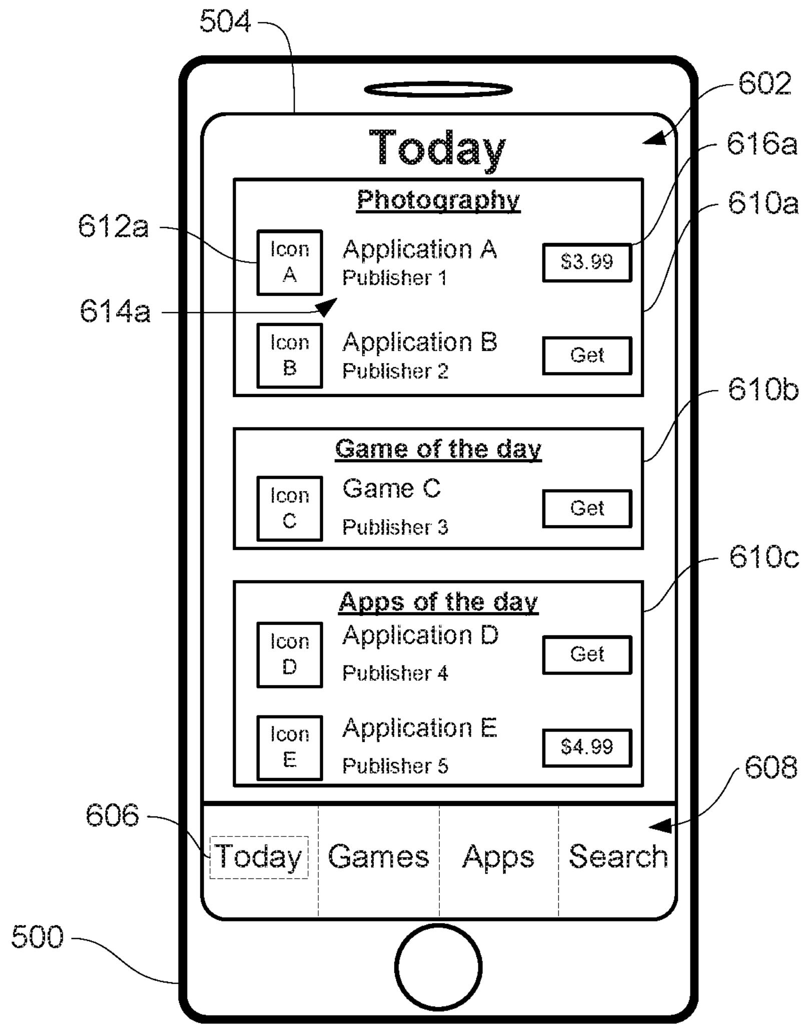
Figure 6L:
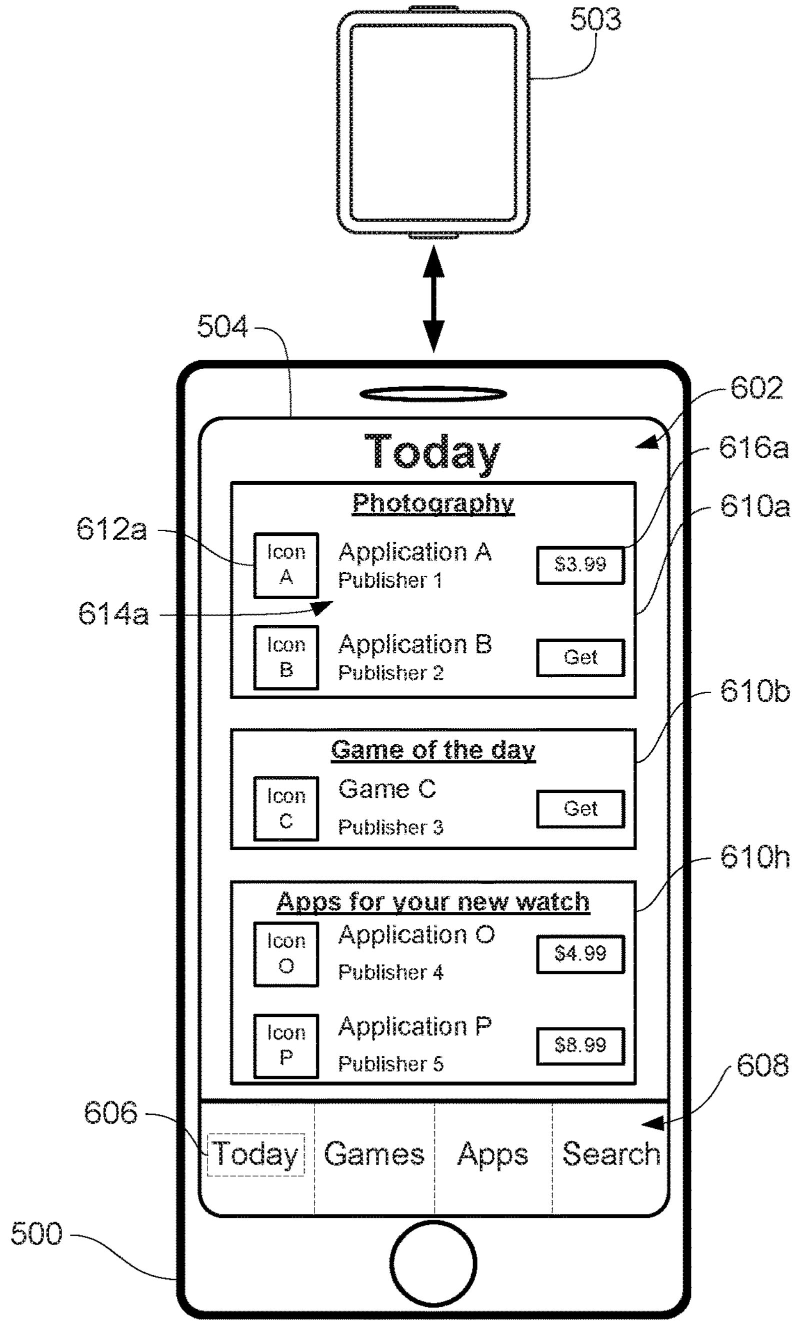
Figure 6M:
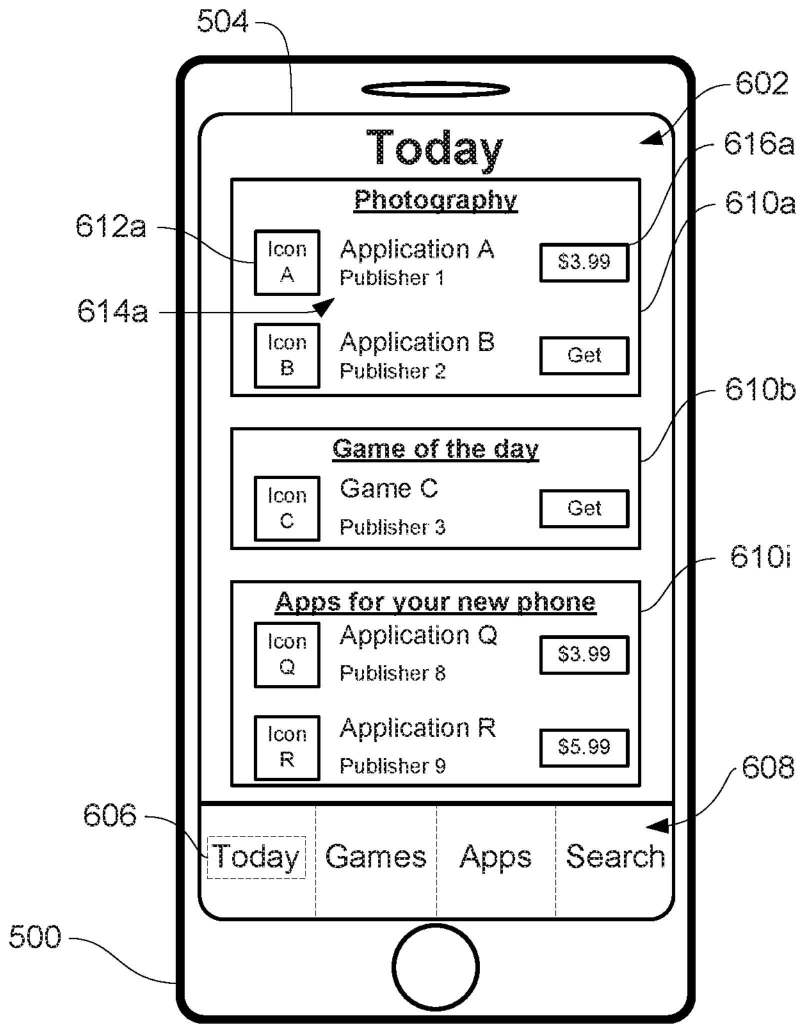
Figure 6N:
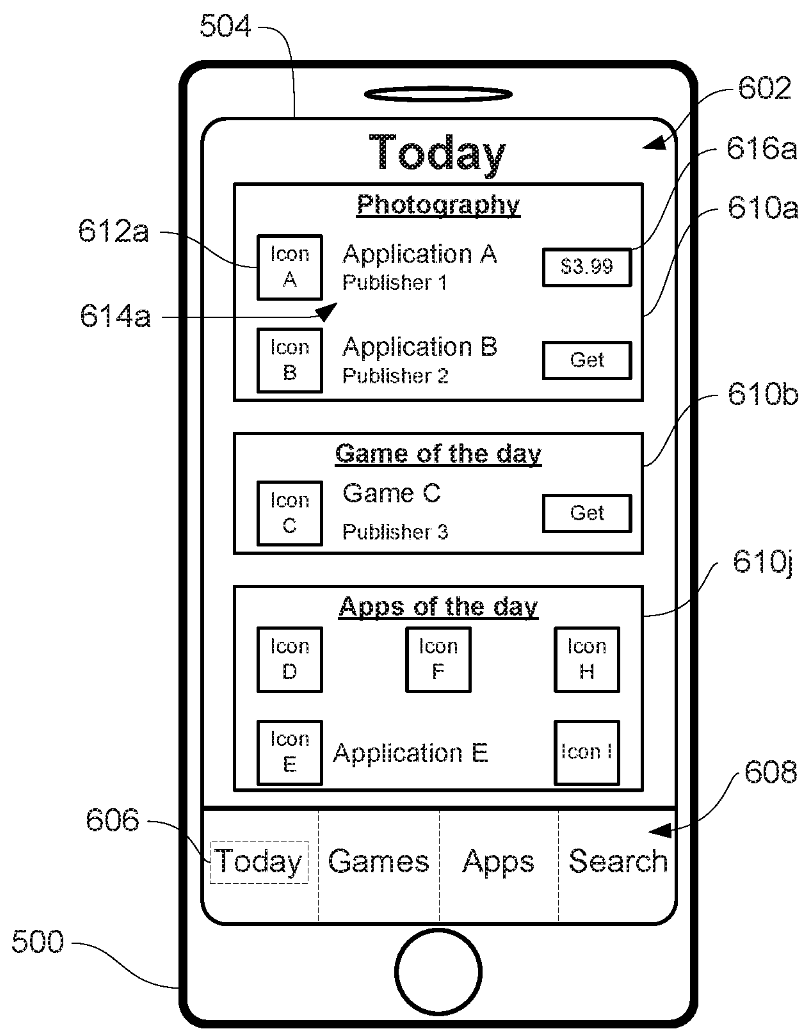
Figure 6O:
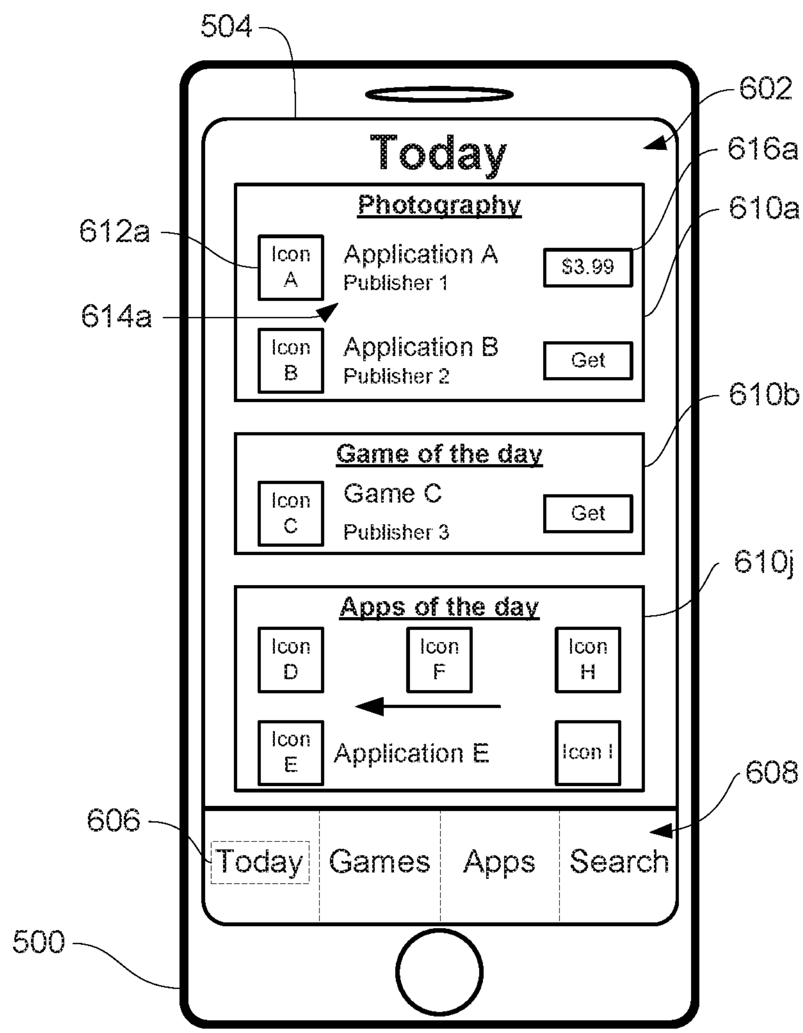
Figure 6P:
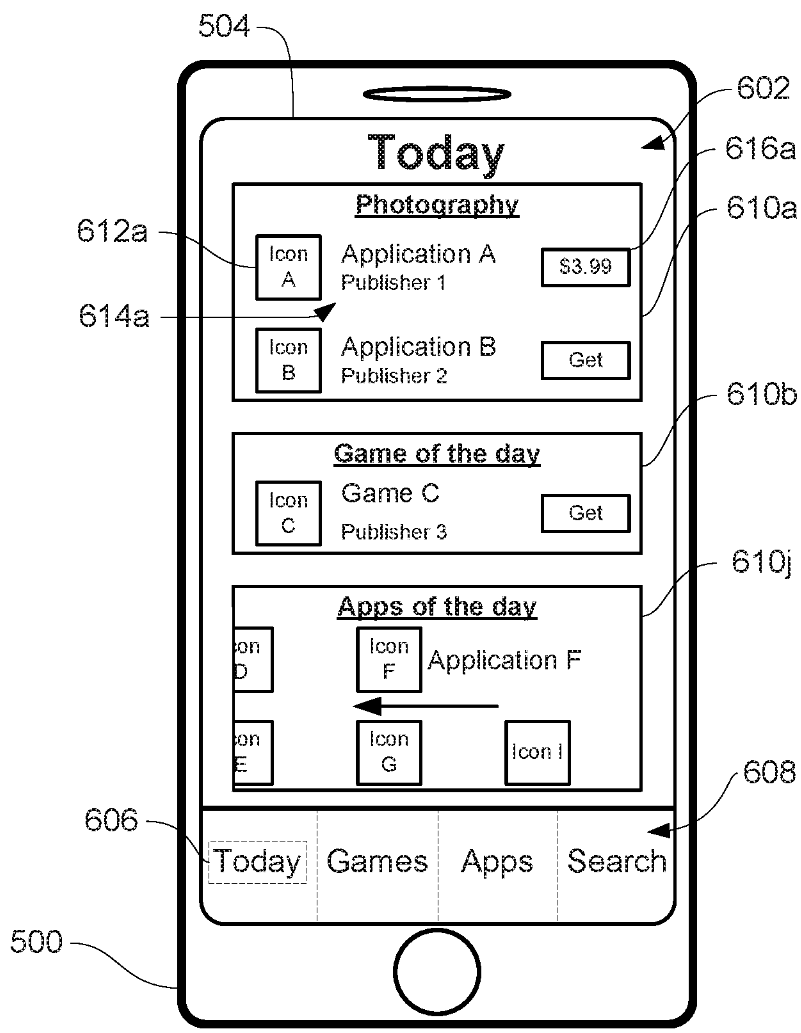
Figure 6Q:
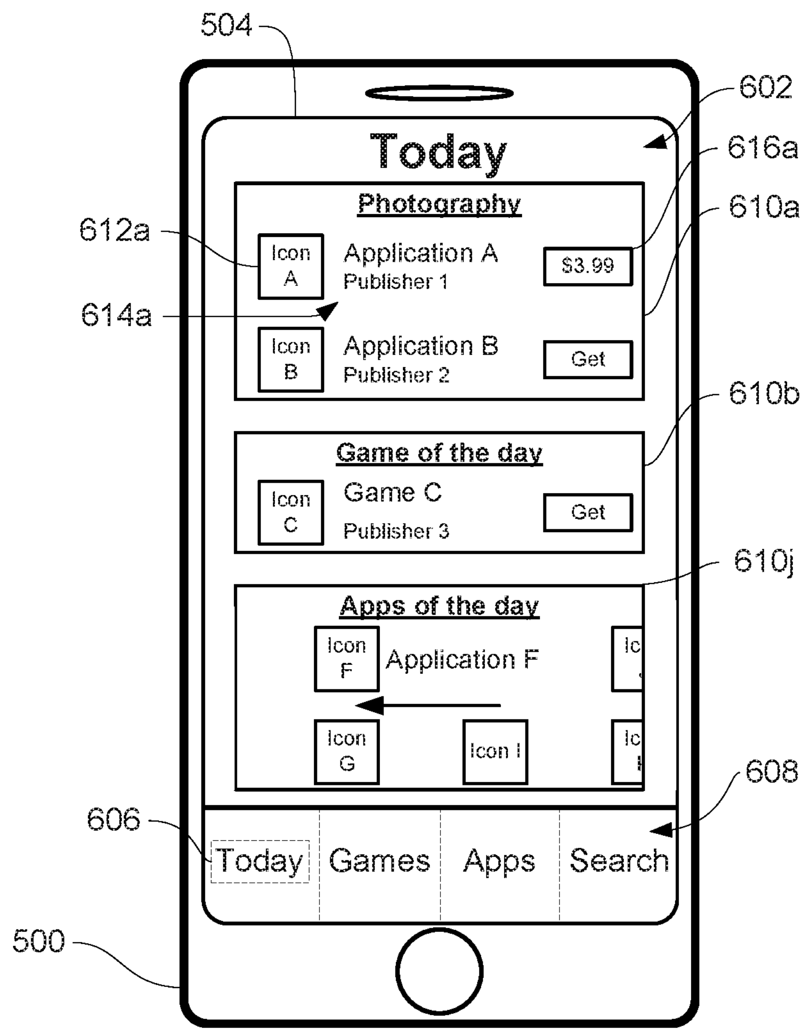
Figure 6R:
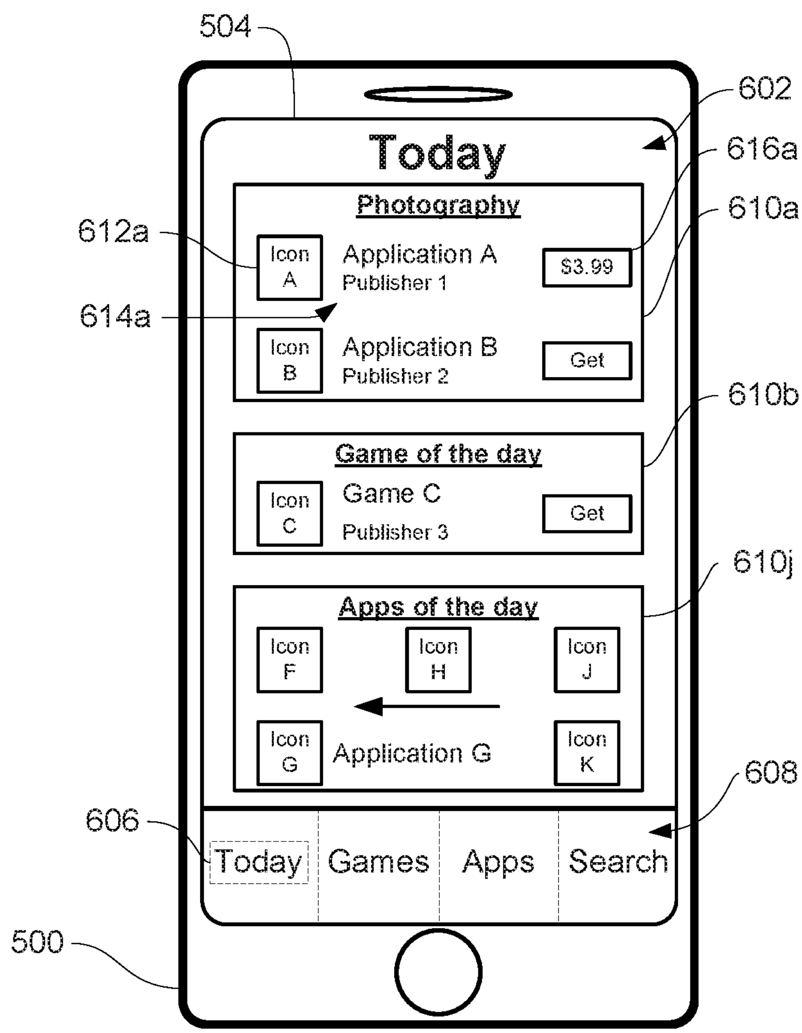
Figure 6S:
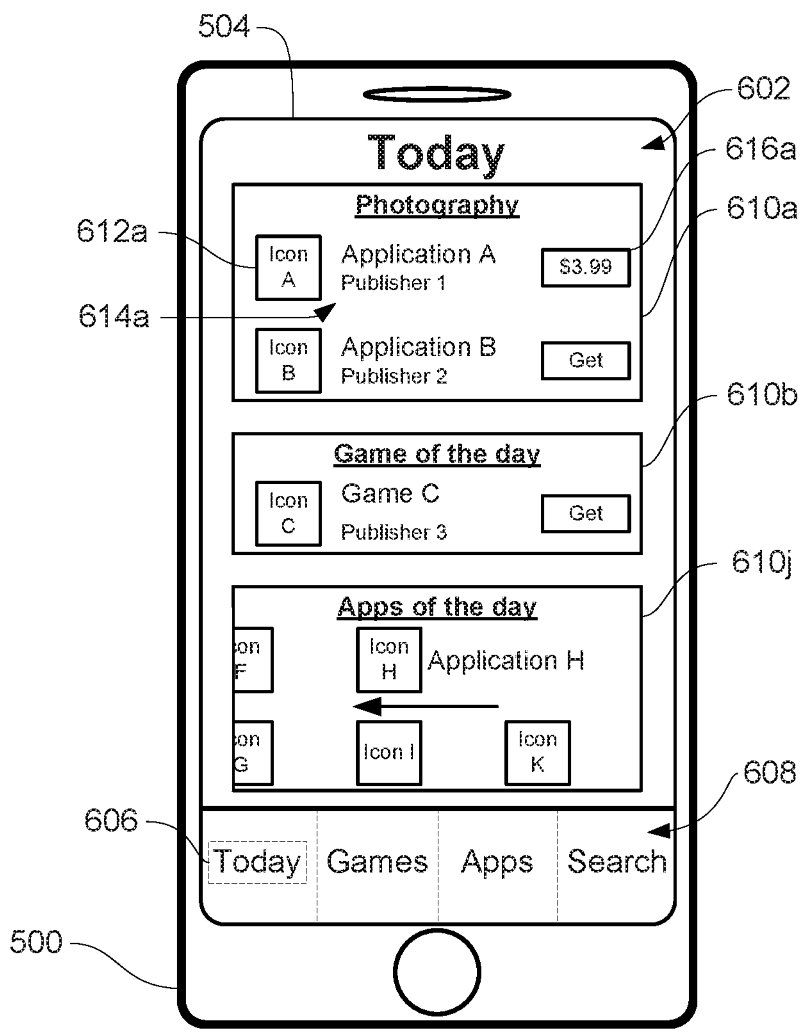
Figure 6T:
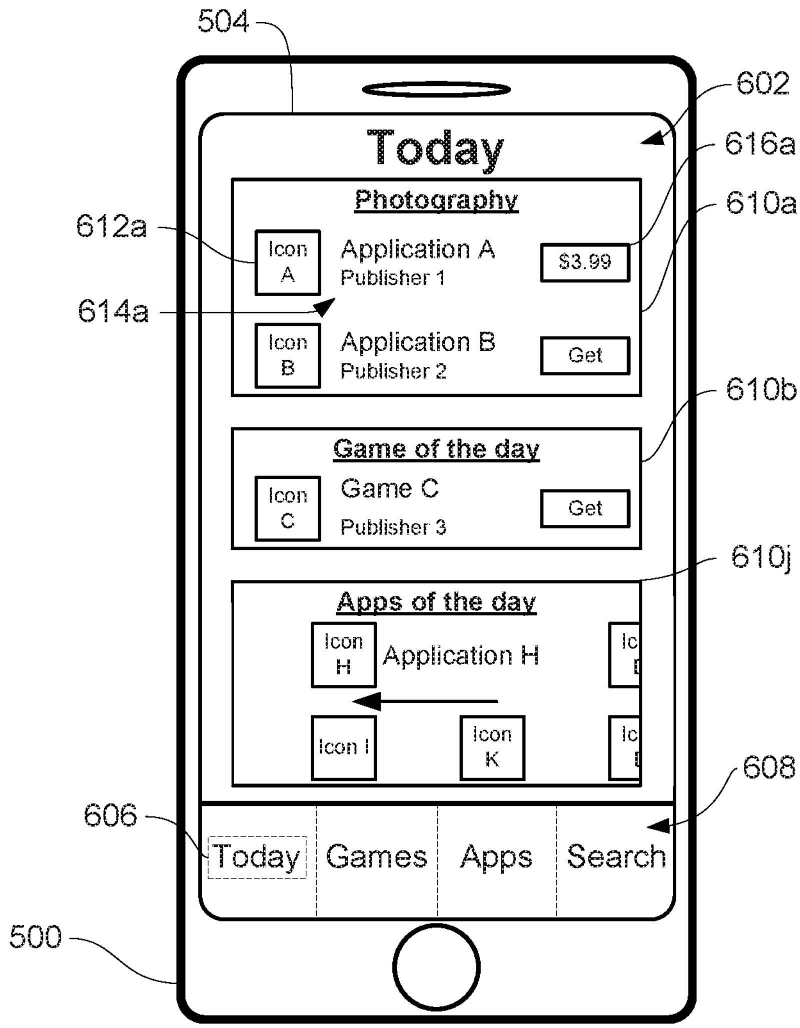
Figure 6U:
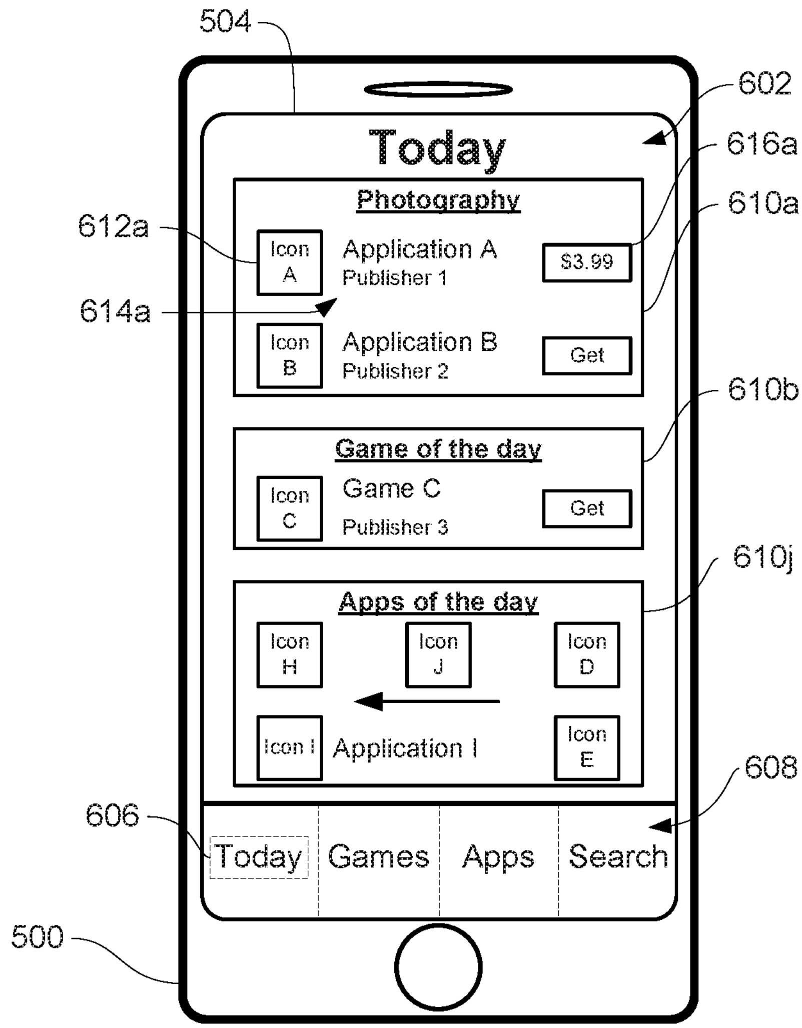
Figure 6V:
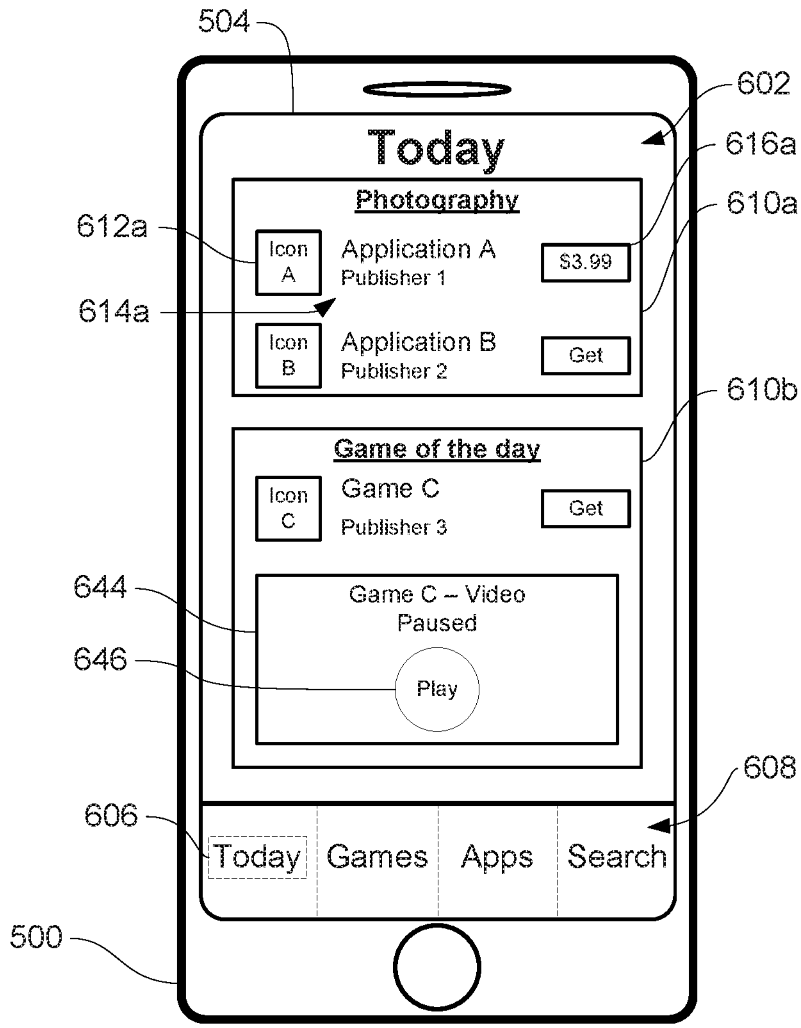
Figure 6W:
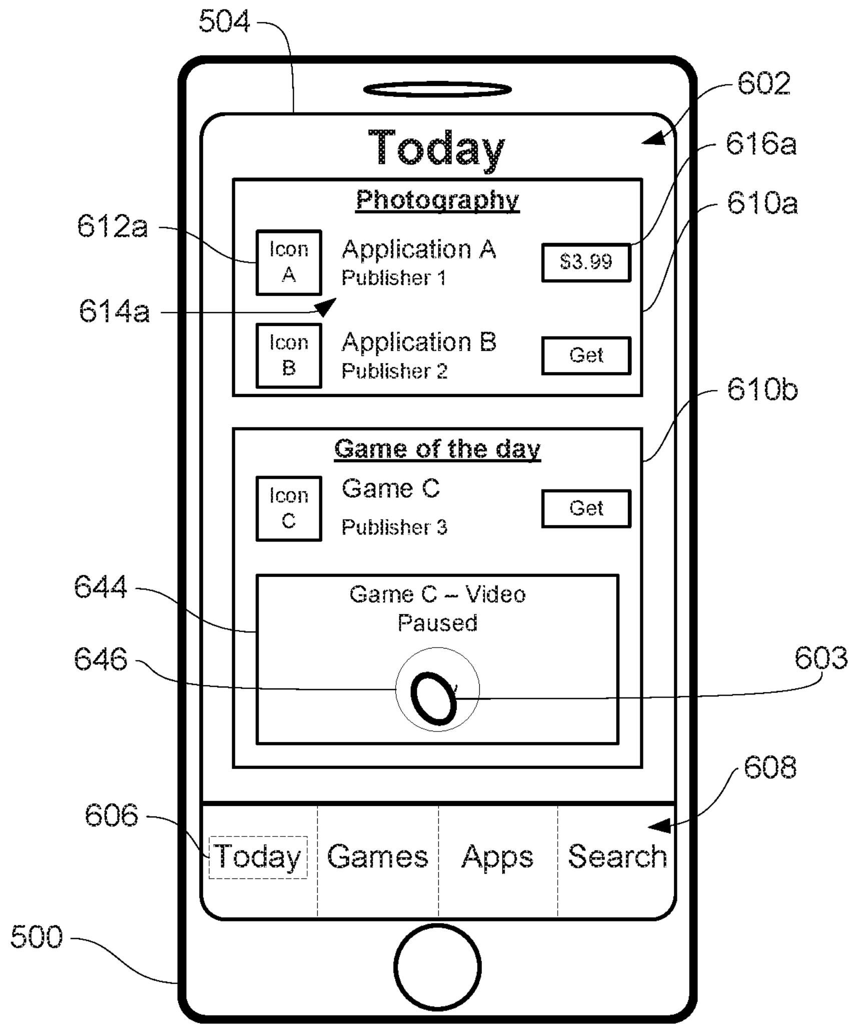
Figure 6X:
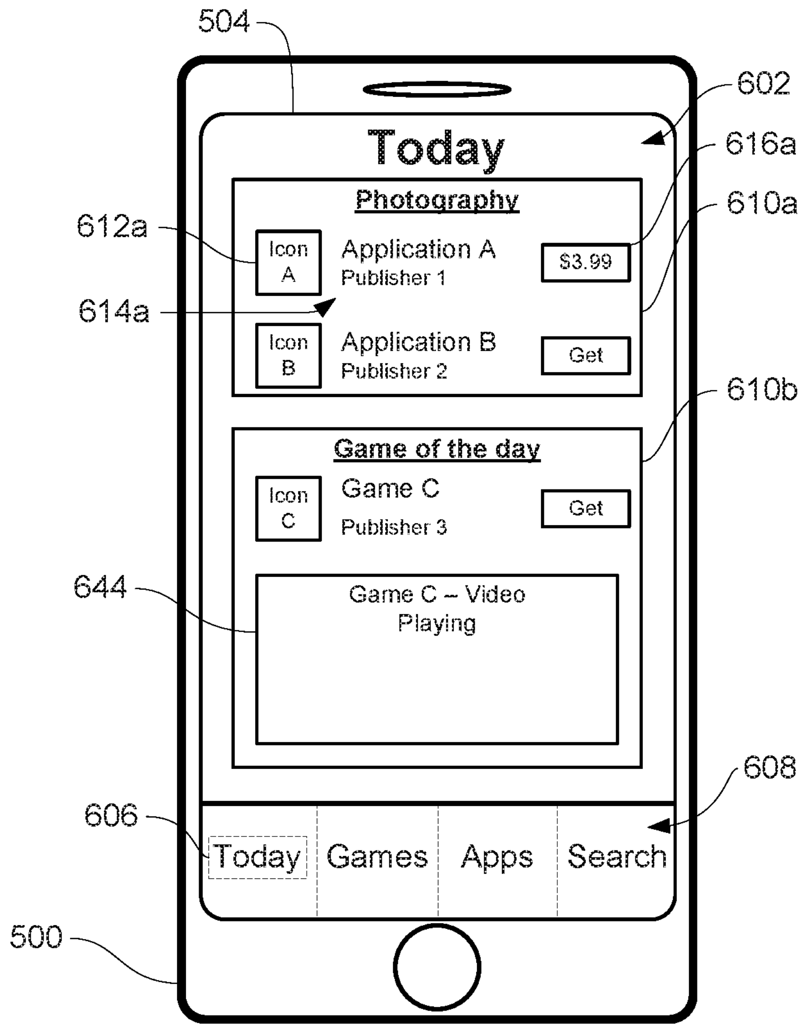
Figure 6Y:
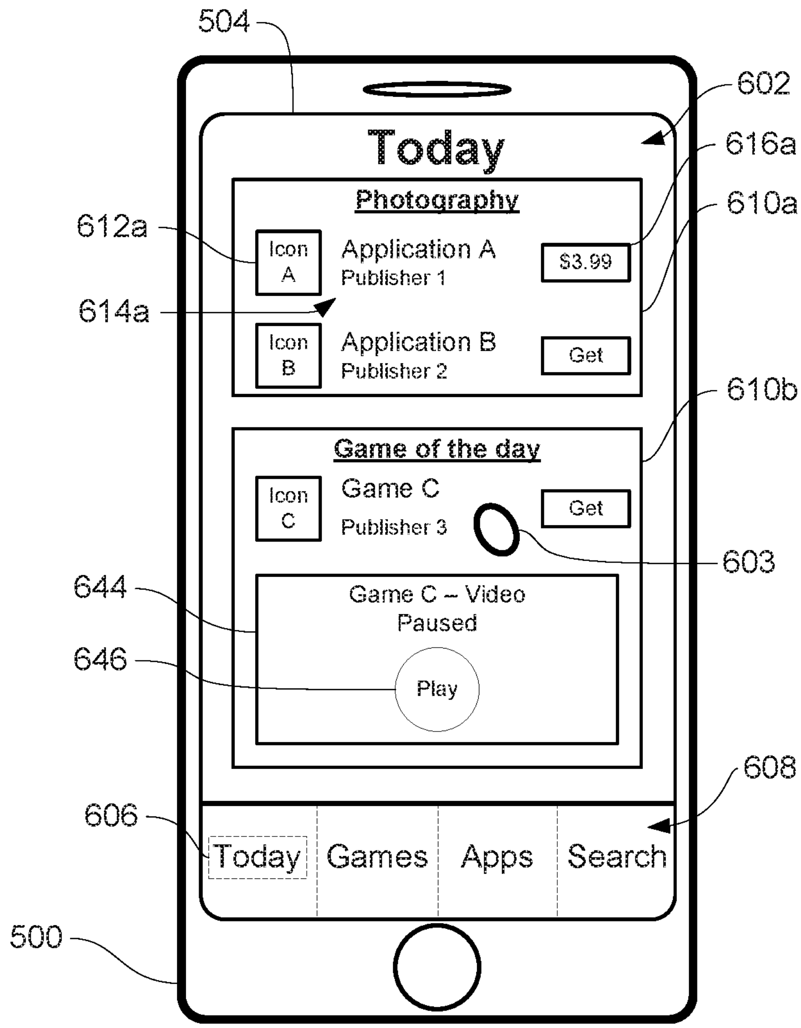
Figure 6Z:
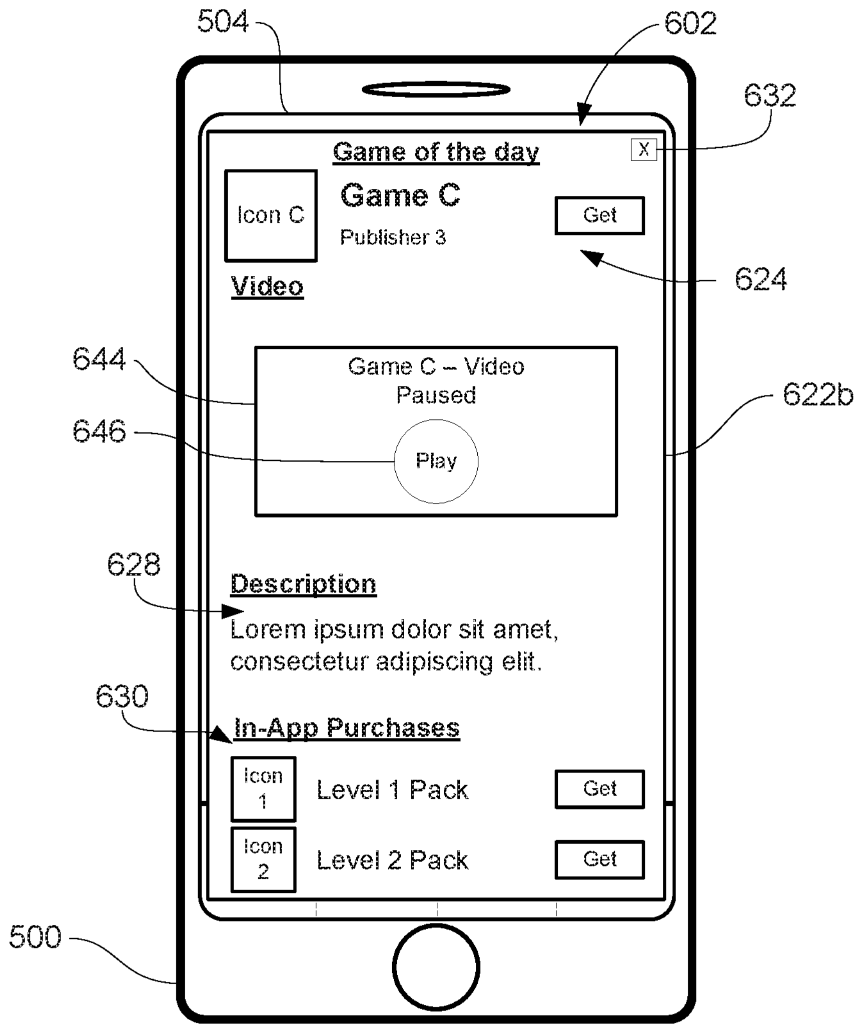

Various operations relating to applications D and/or E are performable from expanded card 622*c*. For example, in FIG. 6Y, selection of the icon for application E in expanded card 622*c* is detected. In response, device 500 displays the product page for application E, as shown in FIG. 6Z. As another example, in FIG. 6AA, selection of the download affordance for application E in expanded card 622*c* is detected. In response, device 500 initiates a process for purchasing/downloading application E, as shown in FIG. 6BB.

Returning to user interface 602 corresponding to the "Today" element in navigation bar 608 that displays various cards 610 as shown in FIG. 6CC, in some embodiments, a contact with an intensity greater than an intensity threshold detected on an application or game icon in a card 610 causes a different result than a normal tap (e.g., a tap with an intensity less than the intensity threshold) detected on the icon. For example, in FIG. 6CC, contact 603 with an intensity less than intensity threshold $IT_L$ is detected on the icon for game C. In FIG. 6DD, an increase in the intensity of contact 603 to above intensity threshold $IT_L$ is detected, and in response, device 500 displays overlay 640 over cards 610 that includes an image associated game C, a download affordance selectable for initiating a process to purchase/download game C to device 500, and/or a sharing affordance selectable for initiating a process to share (e.g., via text message, email, etc.) the name, information about and/or link to download game C with another electronic device. In some embodiments, overlay 640 is "persistent" in that even if the intensity of contact 603 falls below intensity threshold $IT_L$ and/or contact 603 lifts-off from touch screen 504, overlay 640 remains displayed by device, as shown in FIGS. 6EE and 6FF. In FIG. 6FF, the user is able to select the download affordance or the sharing affordance for game C to initiate the corresponding processes described above.

In some embodiments, the cards 610 displayed in user interface 602 (and thus, the games and/or applications that are featured in the "Today" user interface) are different depending on the user account with which device 500 is configured (e.g., logged into). For example, in FIG. 6GG, device 500 is configured with the user account for User A, and in FIG. 6HH, device 500 is configured with the user account for User B. User interface 602 in FIG. 6GG includes card 610*a* corresponding to photography (and including information about applications A and B relating to photography), and user interface 602 in FIG. 6HH includes, instead, card 610*d* corresponding to hiking (and including information about applications F and G relating to hiking). Thus, device 500 optionally displays different cards 610 for different users based on, for example, past application downloads/purchases by those users, such that the displayed applications are more likely to be of interest to the user that is currently logged into device 500.

In some embodiments, the cards 610 displayed in user interface 602 (and thus, the games and/or applications that are featured in the "Today" user interface) are different depending on the type of device that is displaying user interface 602. For example, device 500 optionally displays cards/applications in user interface 602 that are better suited for a smart phone if device 500 is a smartphone (e.g., applications better suited to a smaller display), and displays cards/applications in user interface 602 that are better suited for a tablet computer if device 500 is a tablet computer (e.g., applications better suited to a larger display). For example, in FIG. 6II, device 500 is a smartphone, and displays card 610*a* corresponding to photography and applications D and E as "Apps of the day." In contrast, in FIG. 6JJ, device 501 is a tablet computer, and displays card 610*f* corresponding to design instead of card 610*a* corresponding to photography (as in FIG. 6II), because a tablet computer is optionally better suited for design tasks such as sketching, whereas a smart phone is optionally better suited for photography. Further, in FIG. 6JJ, device 501 displays application O as the "App of the day" instead of applications D and E (as in FIG. 6II), because application O is optionally better suited for the tablet computer than are applications D and E. Other differences between the cards and/or applications displayed by devices 500 and 501 are optionally also attributable to the factors discussed above.

In some embodiments, device 500 displays cards and/or applications in user interface 602 based on whether a peripheral (e.g., a smart watch, a stylus or pen, etc.) was recently paired with device 500. For example, device 500 optionally displays cards/applications in user interface 602 that are for use with the recently paired peripheral, if such a peripheral exists. In FIG. 6KK, for example, no peripheral has recently been paired with device 500, and device 500 displays cards 610*a*, 610*b* and 610*c* in user interface 602 featuring applications A-B and D-E and game C. However, in FIG. 6LL, smart watch 503 has recently (e.g., within a threshold time of the current time at device 500, such as one, five, ten or thirty days) been paired with device 500. As a result, device 500 displays card 610*h* with information about applications for use with smart watch 503, rather than displaying card 610*c* that was displayed in FIG. 6KK. Card 610*h* was optionally not displayed in user interface 602 in FIG. 6KK.

Similarly, if device 500 is new (e.g., has been configured with or logged into a user account for less than a threshold time, such as one, five, ten or thirty days), device 500 optionally displays different cards and/or applications in user interface 602 than it does if it is not new (e.g., has been configured with or logged into a user account for more than the threshold time). For example, in FIG. 6MM, device 500 is new, and as a result, device 500 displays card 610*i* with information about applications useful for use with a new device (e.g., useful for setting up the new device, useful for learning/utilizing features of the new device, etc.), rather than displaying card 610*c* that was displayed in FIG. 6KK, which was optionally not a new device.

In some embodiments, one or more cards 610 in user interface include an animation that displays information about the application(s) corresponding to those cards. For example, in FIG. 6NN, card 610*j* corresponds to applications D-K. In FIGS. 6OO-6UU, card 610*j* includes an animation in which the icons for applications D-K move to the left across card 610*j* over time such that not all of the icons for applications D-K are visible at any one moment in time, but over time, each icon will have been visible at some point in time. For example, in FIG. 6OO, only icons D, E, F, H and I are visible on card 610*j*, while icons G, J and K are not. As the icons move to the left across card 610*j*, as shown in FIG. 6PP, icons D, E, F, G and H become visible, while icons H, J and K are not. As the icons continue to move to the left across card 610*j*, as shown in FIG. 6QQ, icons F, G, I, J and K become visible, while icons D, E and H are not. As the icons continue to move to the left across card 610*j*, as shown in FIG. 6RR, icons F, G, H, J and K become visible, while icons D, E and I are not. As the icons continue to move to the left across card 610*j*, as shown in FIG. 6SS, icons F, G, H, I and K become visible, while icons D, E and J are not. As the icons continue to move to the left across card 610*j*, as shown in FIG. 6TT, icons H, I, K, D and E become visible, while icons F, G and J are not. Finally, as the icons continue to move to the left across card 610*j*, as shown in FIG. 6UU, icons H, I, J, D and E become visible, while icons F, G and K are not. In some embodiments, such animation continues so that all of the icons for all of the applications to which card 610*j* corresponds eventually become visible at some point in time on card 610*j*.

In addition to displaying different application icons at different times, the animation included in card 610*j* optionally displays different additional information about applications to which card 610*j* corresponds at different times. For example, in FIG. 6OO, the name of application E is displayed adjacent to icon E (e.g., in place of where icon G would be displayed if the name of application E were not displayed). As the icons move to the left across card 610*j*, as shown in FIG. 6PP, the name of application E is no longer displayed (and as a result, icon G is displayed in place of the name of application E), but the name of application F is displayed adjacent to icon F (e.g., in place of where icon H would be displayed if the name of application F were not displayed). As the icons continue to move to the left across card 610*j*, as shown in FIG. 6QQ, the name of application F continues to be displayed adjacent to icon F (e.g., in place of where icon H would be displayed if the name of application F were not displayed). As the icons continue to move to the left across card 610*j*, as shown in FIG. 6RR, the name of application F is no longer displayed (and as a result, icon H is displayed in place of the name of application F), but the name of application G is displayed adjacent to icon G (e.g., in place of where icon I would be displayed if the name of application G were not displayed). As the icons continue to move to the left across card 610*j*, as shown in FIG. 6SS, the name of application G is no longer displayed (and as a result, icon I is displayed in place of the name of application G), but the name of application H is displayed adjacent to icon H (e.g., in place of where icon J would be displayed if the name of application H were not displayed). As the icons continue to move to the left across card 610*j*, as shown in FIG. 6TT, the name of application H continues to be displayed adjacent to icon H (e.g., in place of where icon J would be displayed if the name of application H were not displayed). As the icons continue to move to the left across card 610*j*, as shown in FIG. 6UU, the name of application H is no longer displayed (and as a result, icon J is displayed in place of the name of application H), but the name of application I is displayed adjacent to icon I (e.g., in place of where icon K would be displayed if the name of application I were not displayed). In some embodiments, such animation continues so that all of the names for all of the applications to which card 610*j* corresponds eventually become visible at some point in time on card 610*j*.

In some embodiments, one or more cards 610 in user interface 602 include a video corresponding to an application or game (e.g., a video including content from that application or game). For example, in FIG. 6VV, card 610*b* corresponding to game C includes video 644. Video 644 is currently paused in FIG. 6VV, and includes element 646 that is selectable to start playback of video 644. In FIG. 6WW, selection of element 646 is detected, and in FIG. 6XX, video 644 starts playing in response. As shown in FIG. 6XX, video 644 is playing within card 610*b* while device 500 continues to display card 610*b* as well as card 610*a*.

Video 644 is also playable from within an expanded card corresponding to card 610*b*. For example, in FIG. 6YY, selection of card 610*b* is detected (e.g., via a tap of contact 603 detected in an area of card 610*b* other than the download affordance for game C, video 644 and/or the icon for game C). In response, as shown in FIG. 6ZZ, device 500 displays expanded card 622*b* corresponding to card 610*b*. Expanded card 622*b* also includes video 644. Selection of element 646 in expanded card 622*b* is detected in FIG. 6AAA, and in FIG. 6BBB, video 644 starts playing from within expanded card 622*b* in response. As shown in FIG. 6BBB, video 644 is playing within expanded card 622*b* while device 500 continues to display expanded card 622*b* and the other elements within expanded card 622*b* (e.g., description 628, in-app purchases 630, the purchase/download affordance for game C, etc.).

Video 644 is also playable in a full screen mode. For example, in FIG. 6CCC, selection of video 644 is detected (e.g., via a tap of contact 603 detected in an area of video 644 other than element 646). In response, as shown in FIG. 6DDD, device 500 displays video 644 in a full screen mode (e.g., in a mode in which expanded card 622*b* is no longer displayed). In FIG. 6EEE, selection of element 646 is detected, and in FIG. 6FFF, video 644 starts playing in the full screen mode in response.

In some embodiments, user interface 602 (e.g., the "Today" user interface that includes information about featured games or applications available for device 500) displays games/applications as well as in-app purchases for games/applications. An in-app purchase for a game/application is optionally one or more features of that game/application that require separate, external authorization (e.g., received from a server external to device 500) for accessing such features before device 500, when running that game/application, is able to access those features. This external authorization is optionally separate from (and occurs after) an external authorization that was optionally received for accessing the game/application itself, or is optionally separate from (and occurs after) the purchase/download of the game/application itself. For example, when a user purchases or downloads a game, that initial purchase/download optionally gives the user access to a standard set of features for that game (e.g., the user is able to play levels 1 through 10 of a racing game with a standard set of vehicles that are made available with a standard or initial purchase of the game). However, in some embodiments, the publisher of the game (or another relevant party) may offer, as additional purchases, additional features for the game that the user must purchase separately before being able to access those features when playing the game. Access to such additional features optionally requires the user to purchase those additional features, which causes the publisher of the game (or some other relevant party) to give external authorization to device 500 to access those purchased features of the game when running the game. For example, in the case of the above-mentioned racing game, additional vehicles may be made available as in-app purchases for the game that a user is able to purchase to "unlock" after the user has downloaded the racing game, thus making those vehicles available for racing in the game. Some in-app purchases correspond to additional content that is downloaded after the external authorization is provided. Some in-app purchases unlock existing functionality of the application without requiring additional content to be downloaded.

In some embodiments, purchasing such in-app purchases is initiated from within the application/game corresponding to the in-app purchases. However, in some embodiments, as shown in FIG. 6GGG, cards 610 corresponding to in-app purchases (e.g., card 610*k* corresponding to Level 1 pack for game B and Level 3 pack for game D) are optionally displayed alongside cards 610 corresponding applications and/or games in user interface 602. As previously mentioned, user interface 602 is a user interface of an app store application, and is separate from either of games B and D (the games to which the in-app purchases in card 610*k* correspond), and is not a user interface of games B or D. As will be described in more detail with reference to FIGS. 12A-12QQ and method 1300, a user is able to initiate a process to purchase/download Level 1 pack for game B and/or Level 3 pack for game D by selecting the purchase/download affordances for those in-app purchases from user interface 602 within the app store application.

In some embodiments, user interface 602 includes a card corresponding to a given topic. For example, in FIG. 6HHH, user interface 602 includes card 610*g*, which is a card that is related to the topic of coding apps. In FIG. 6HHH, card 610*g* optionally displays text relating to the topic of coding apps (e.g., an excerpt from one or more articles about coding apps), and optionally does not include any icons, selectable purchase/download affordances or other identifying information for the applications to which card 610*g* relates (though in some embodiments, card 610*g* does include one or more of the above). In FIG. 6III, selection of card 610*g* is detected, and in response, device 500 displays expanded card 622*g* in FIG. 6JJJ. Expanded card 622*g* includes articles 628*k* and 628*l* about the topic "how to code apps," as well as purchase/download affordances selectable for purchasing/downloading applications that perform one or more functions corresponding to the topic of coding apps. For example, in FIG. 6JJJ, expanded card 622*g* includes article 628*k* about learning the basic theory of coding apps. Article 628*k* is displayed alongside the icon and purchase/download affordance for application K, which is optionally an application that is useful for learning the basic theory of coding apps. Expanded card 622*g* also includes article 628*l* about the importance of using a robust programming application for coding apps. Article 628*l* is displayed alongside the icon and purchase/download affordance for application L, which is optionally an application that is featured by device 500 as a robust programming application for coding apps. Excerpts of text from one or more of articles 628*k* and 628*l* are optionally displayed in card 610*g*.

Figure 7A:
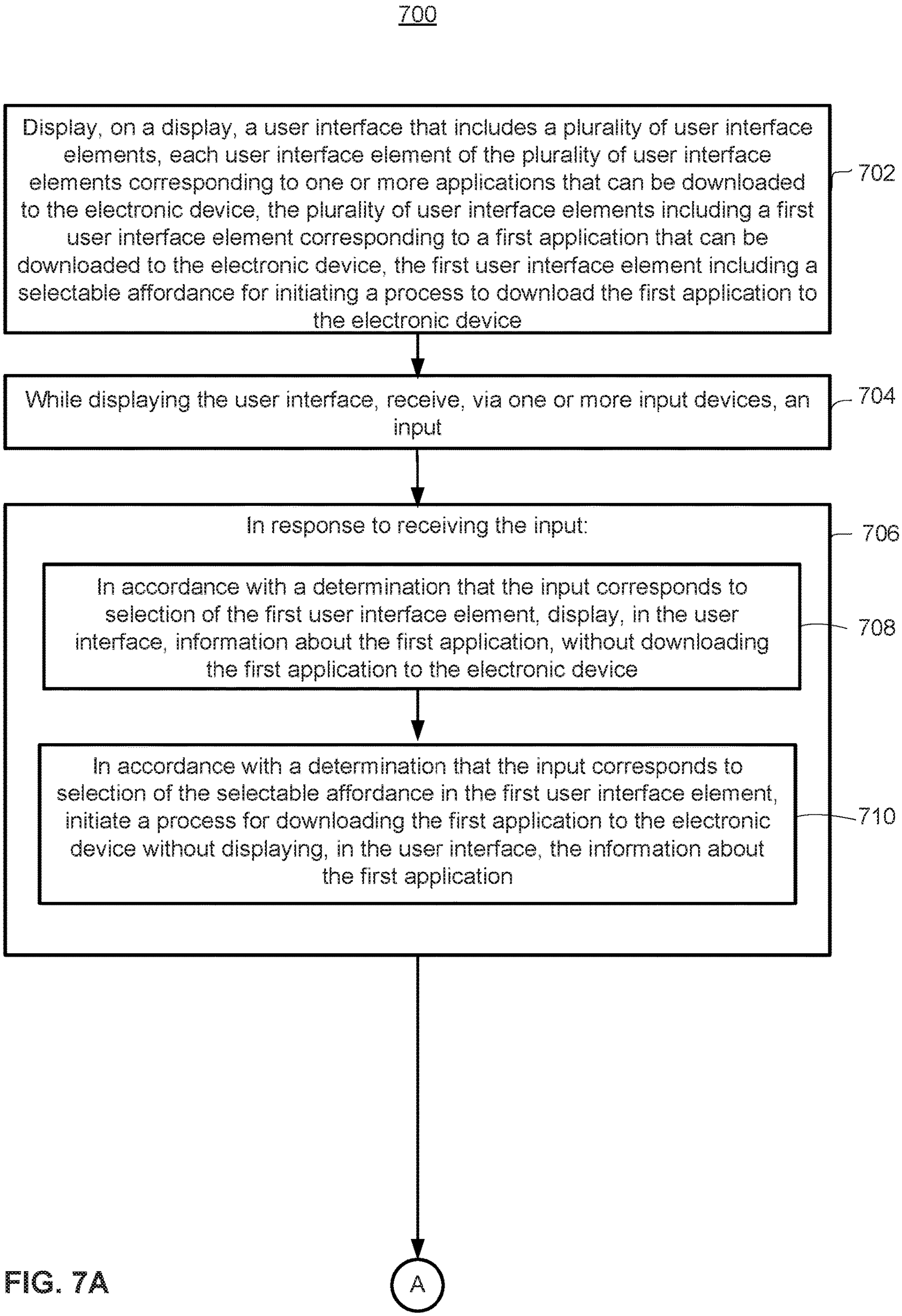
FIGS. 7A-7O are flow diagrams illustrating a method of presenting information about, and facilitating downloading of, featured applications in an app store application in accordance with some embodiments of the disclosure.
Figure 7B:
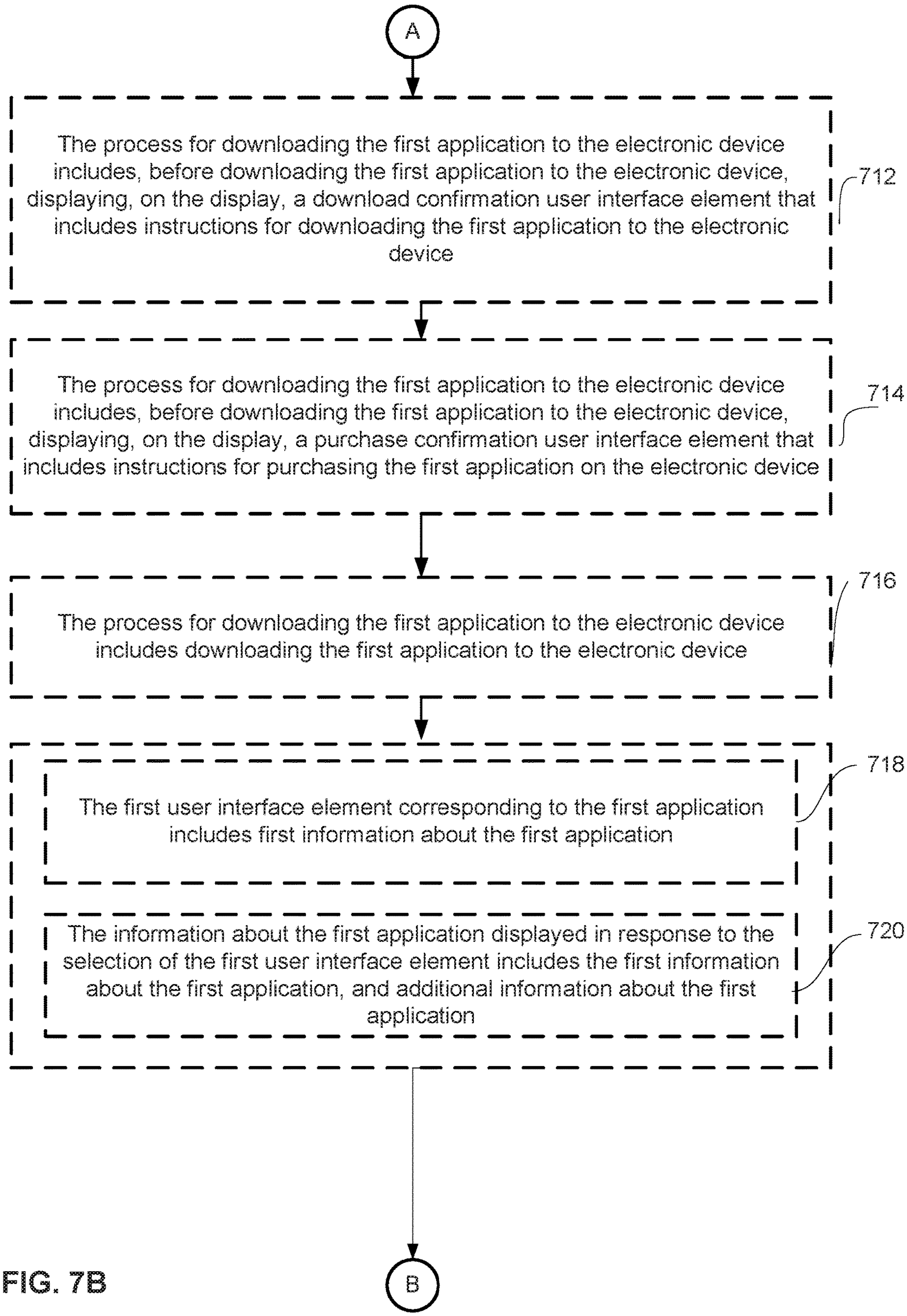
Figure 7C:
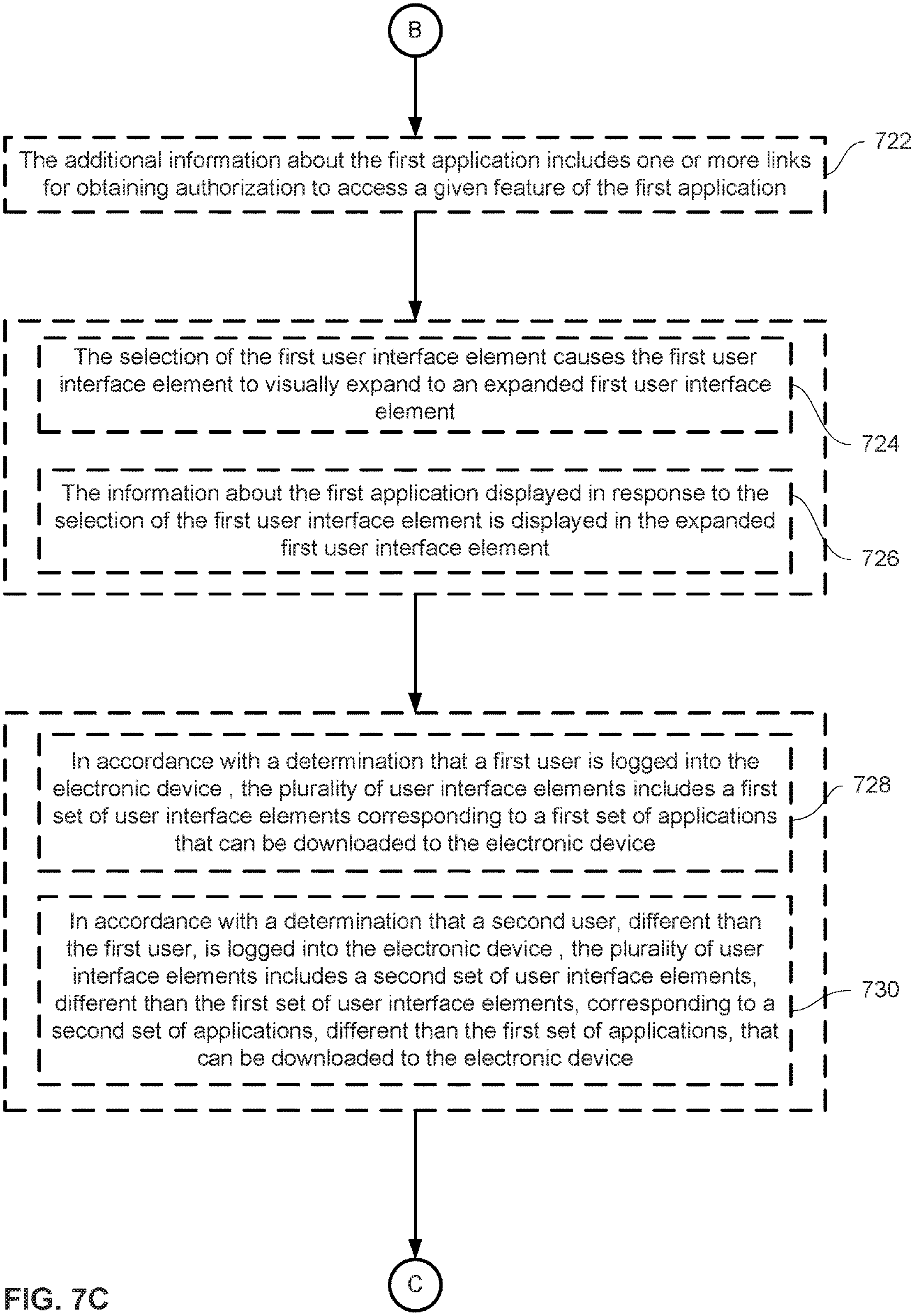
Figure 7F:
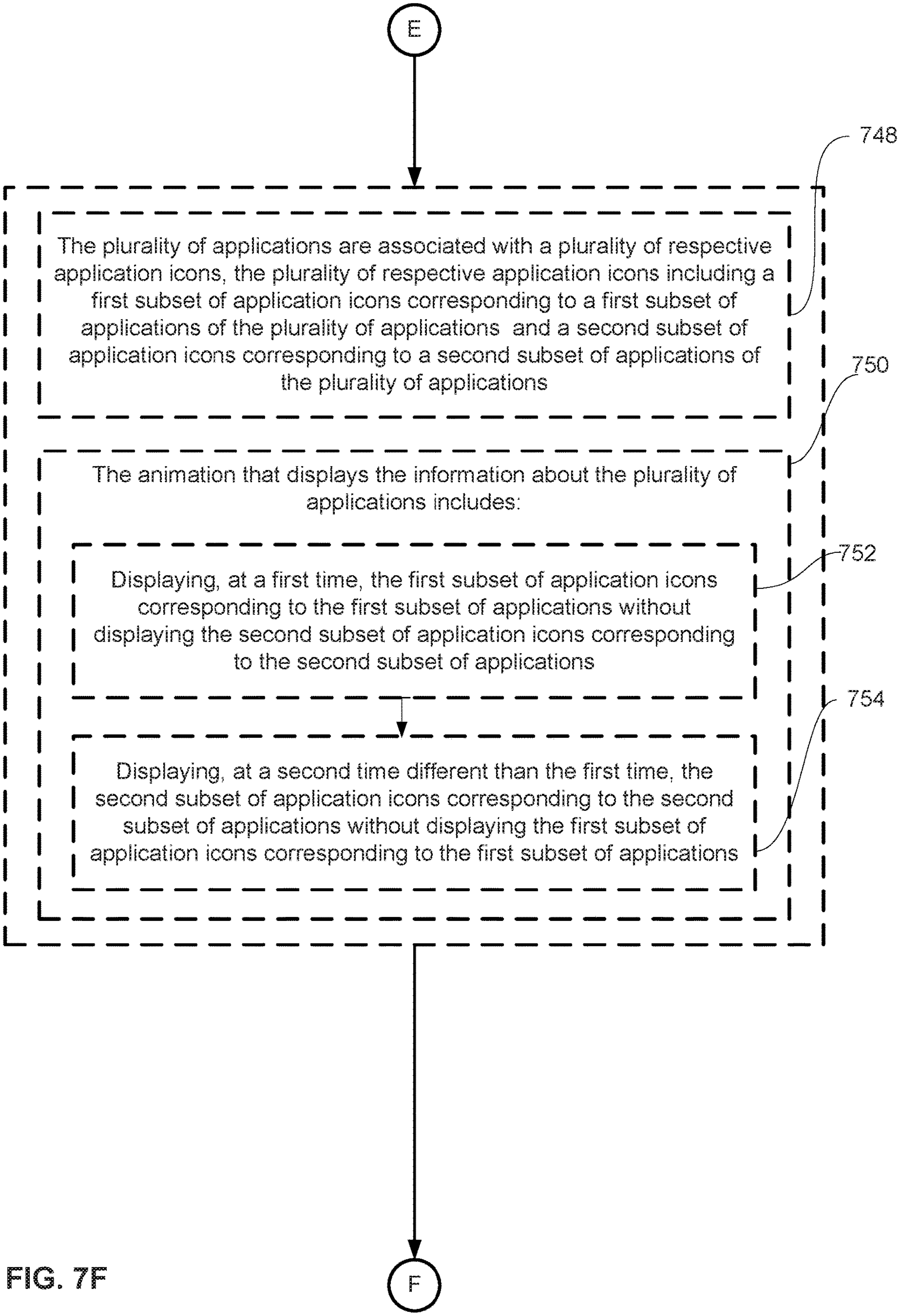
Figure 7G:
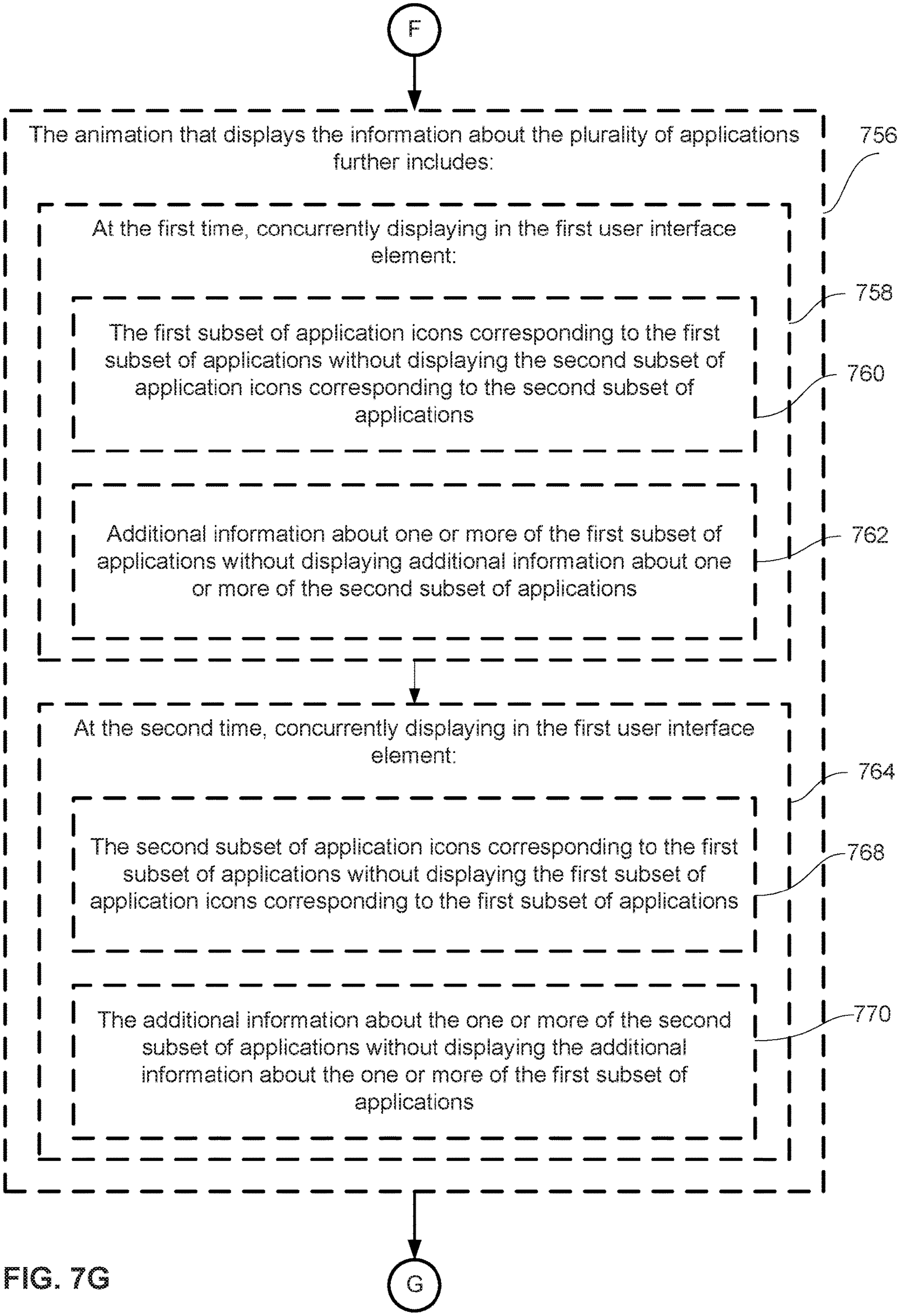
Figure 7H:
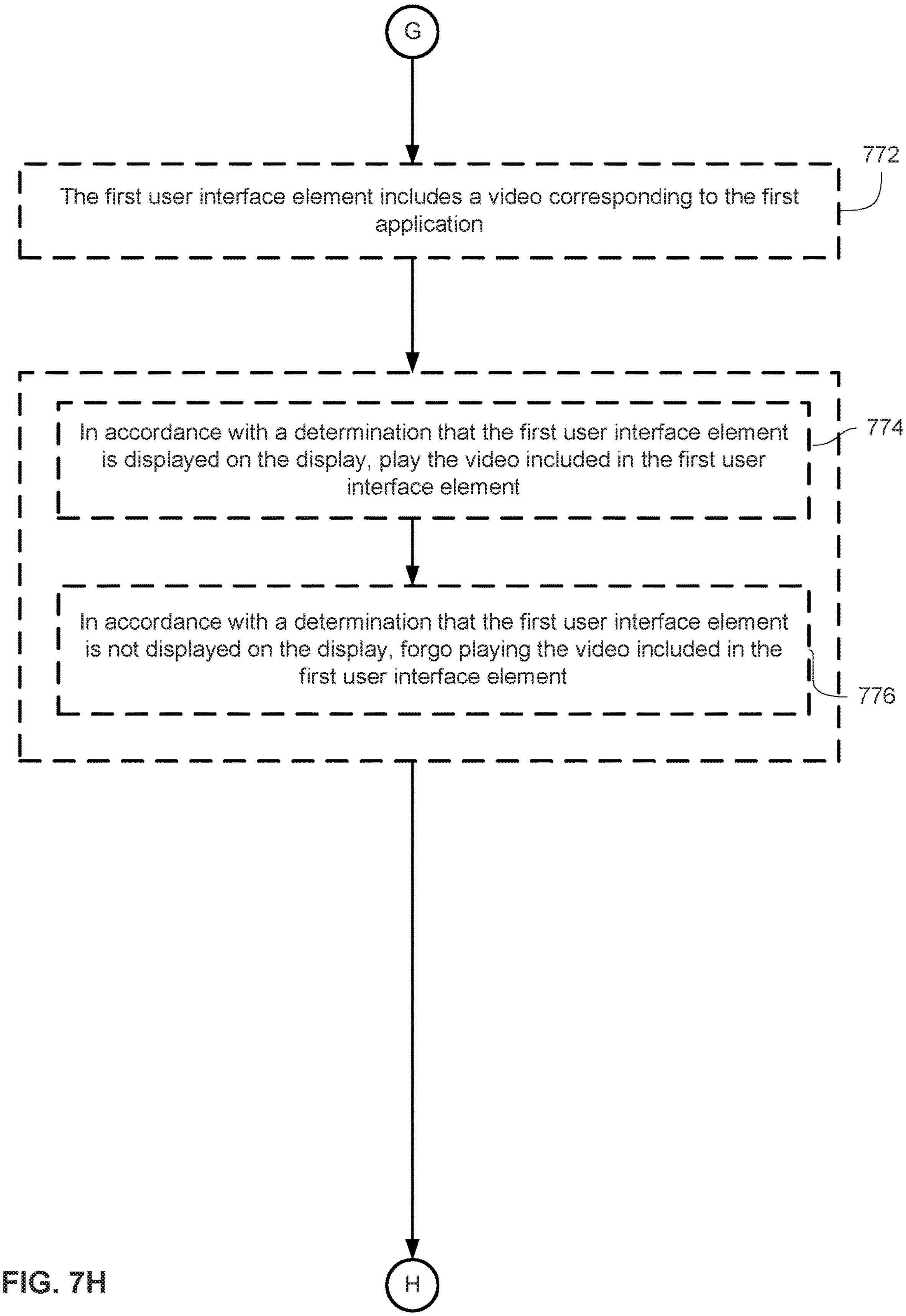
Figure 7I:
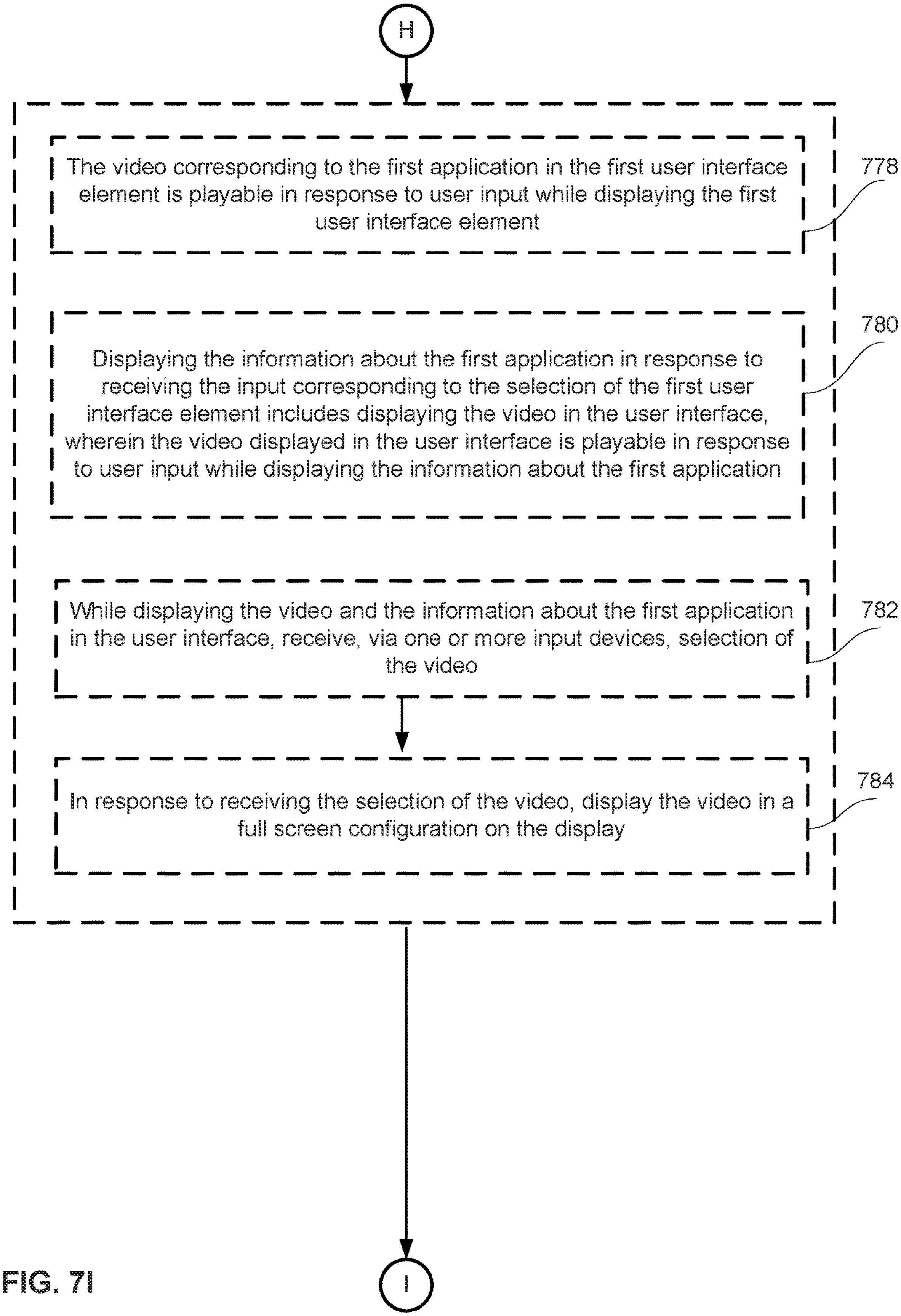
Figure 7J:
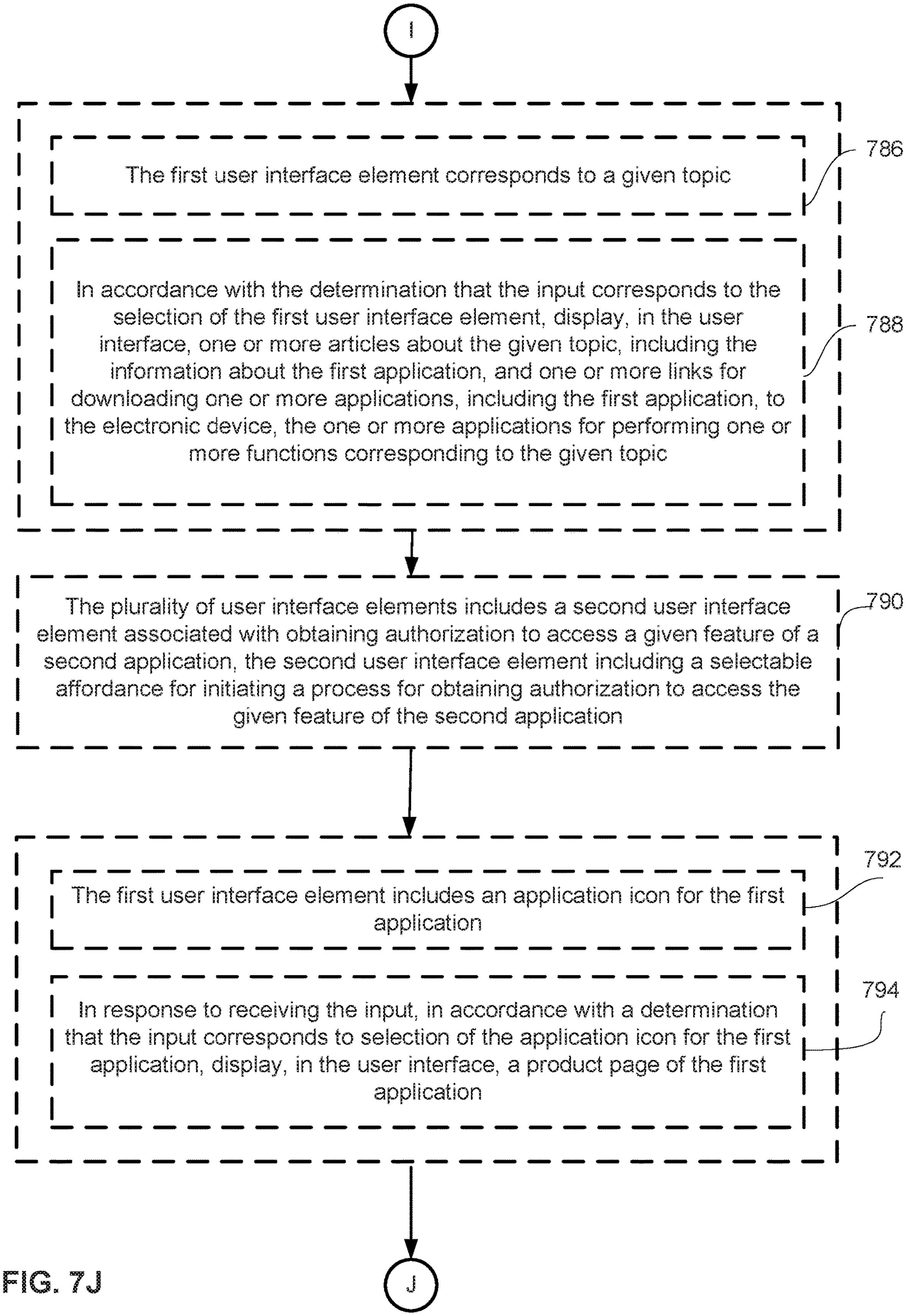
Figure 7K:
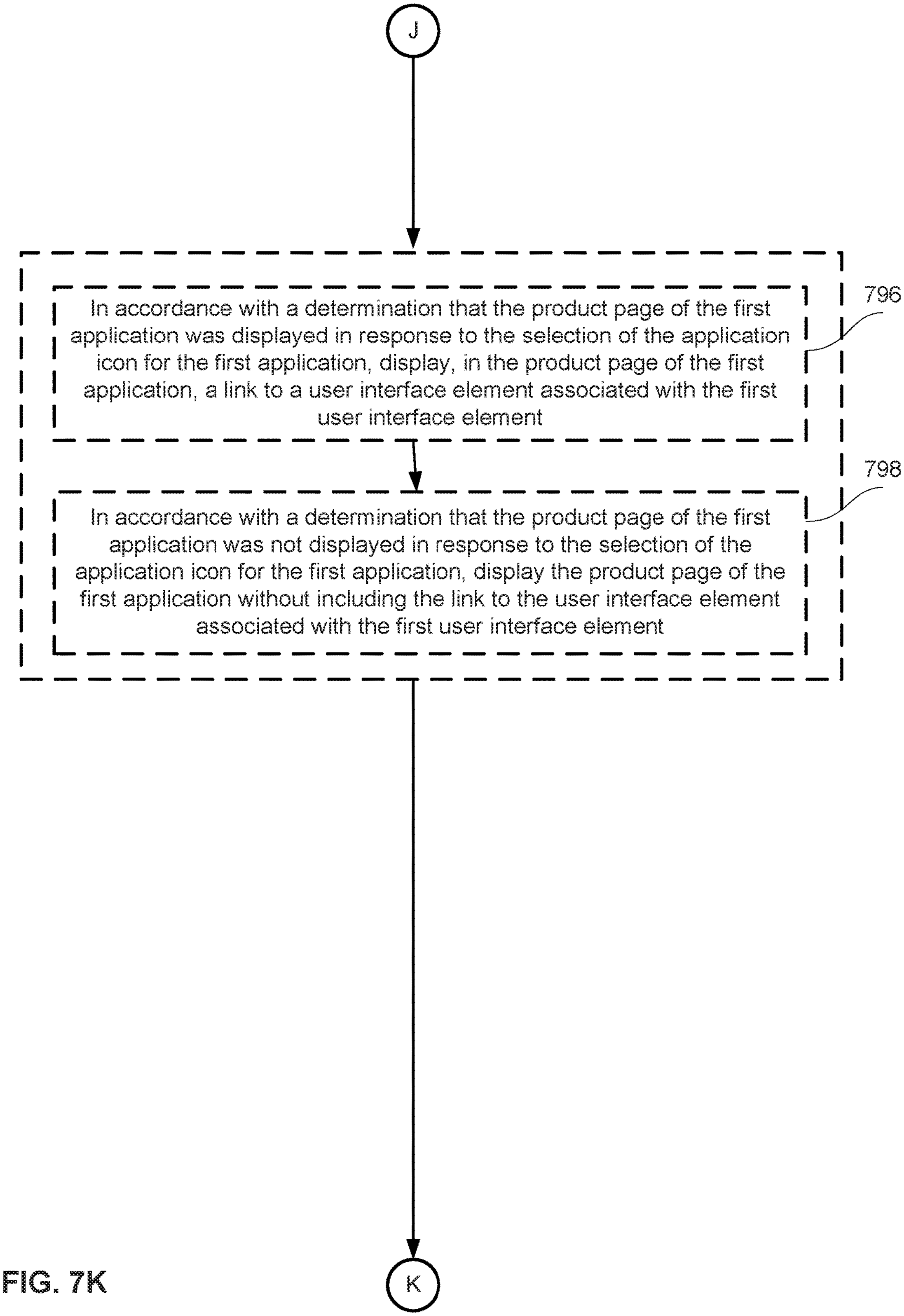
Figure 7L:
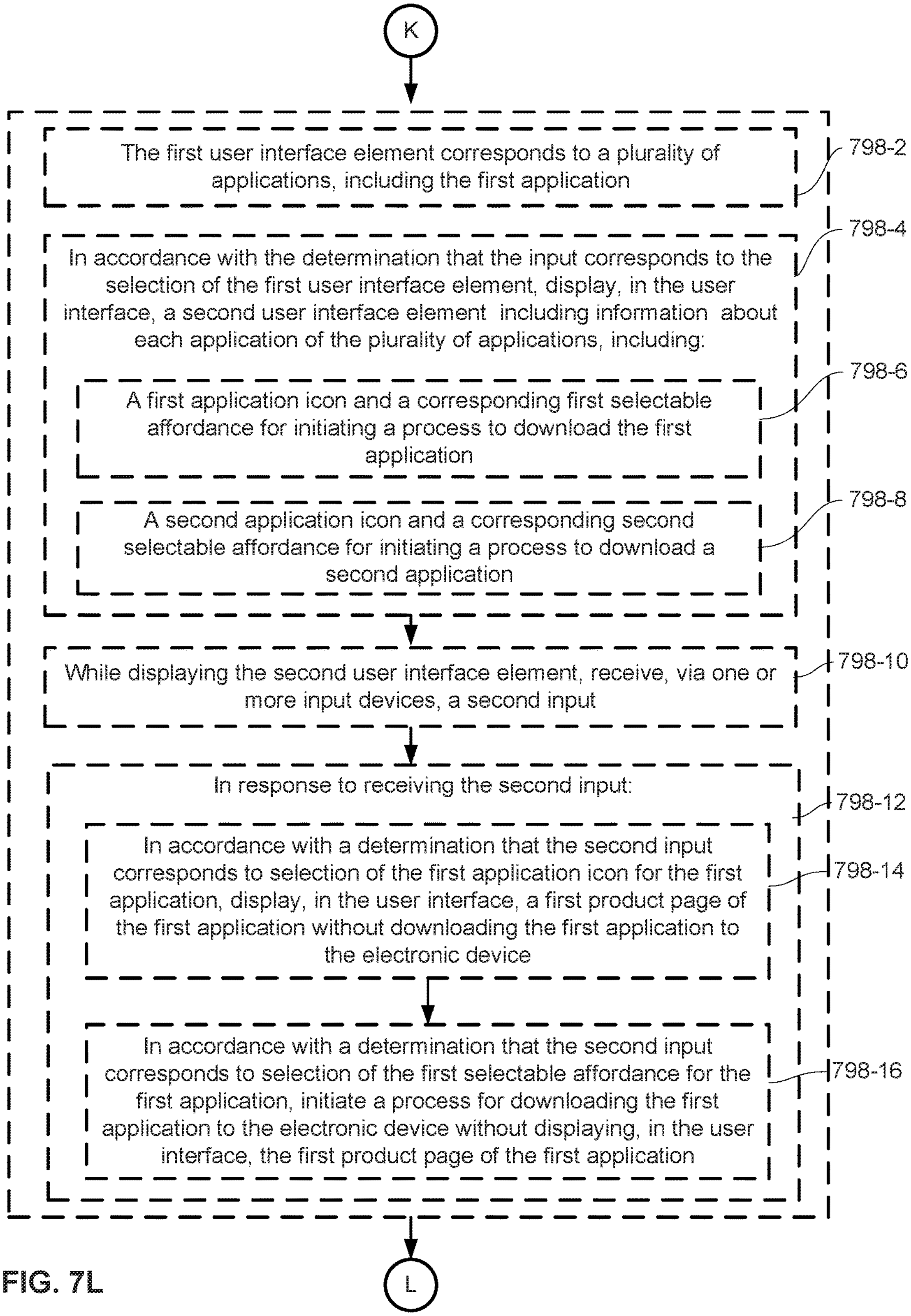
Figure 7M:
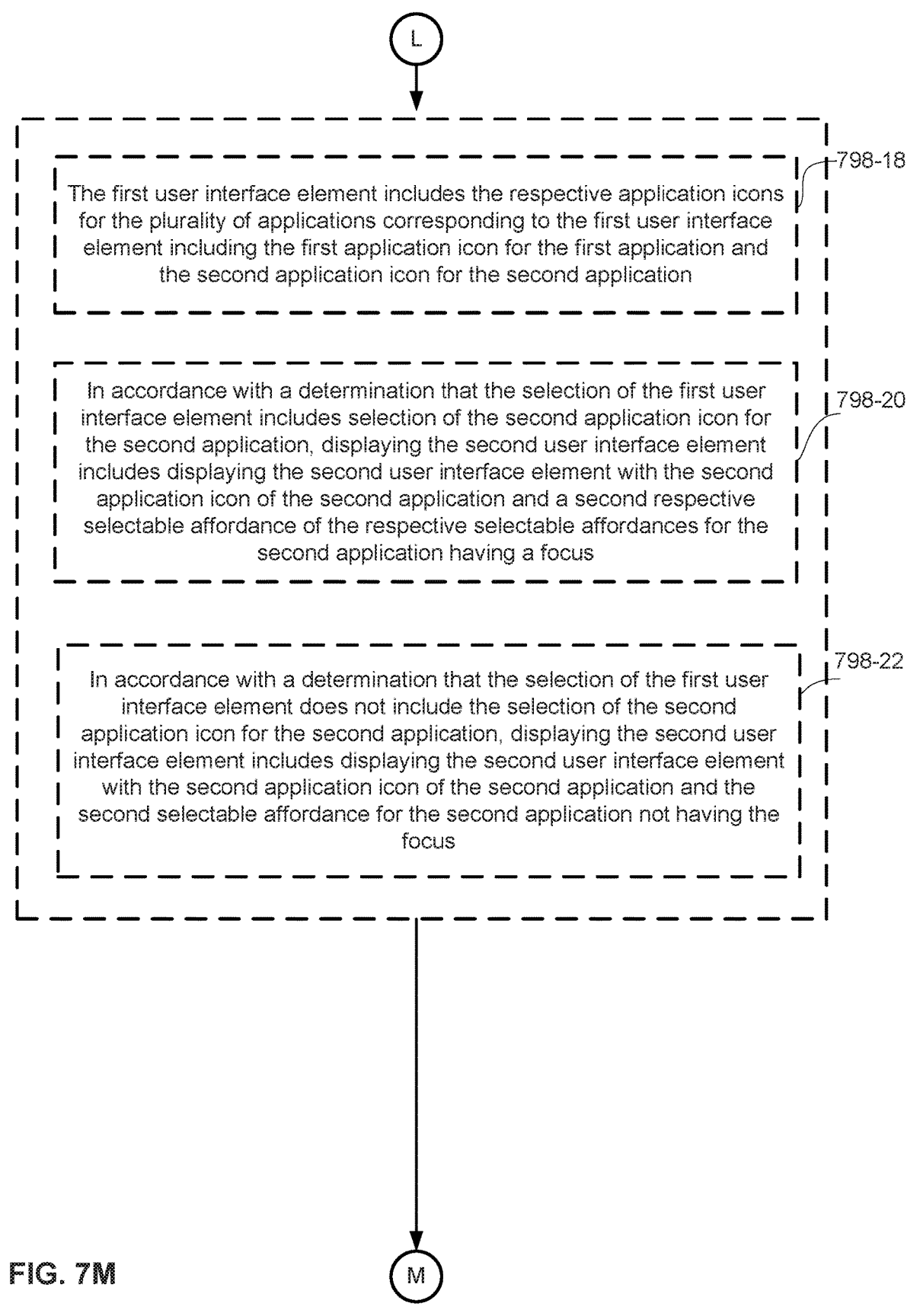
Figure 7N:
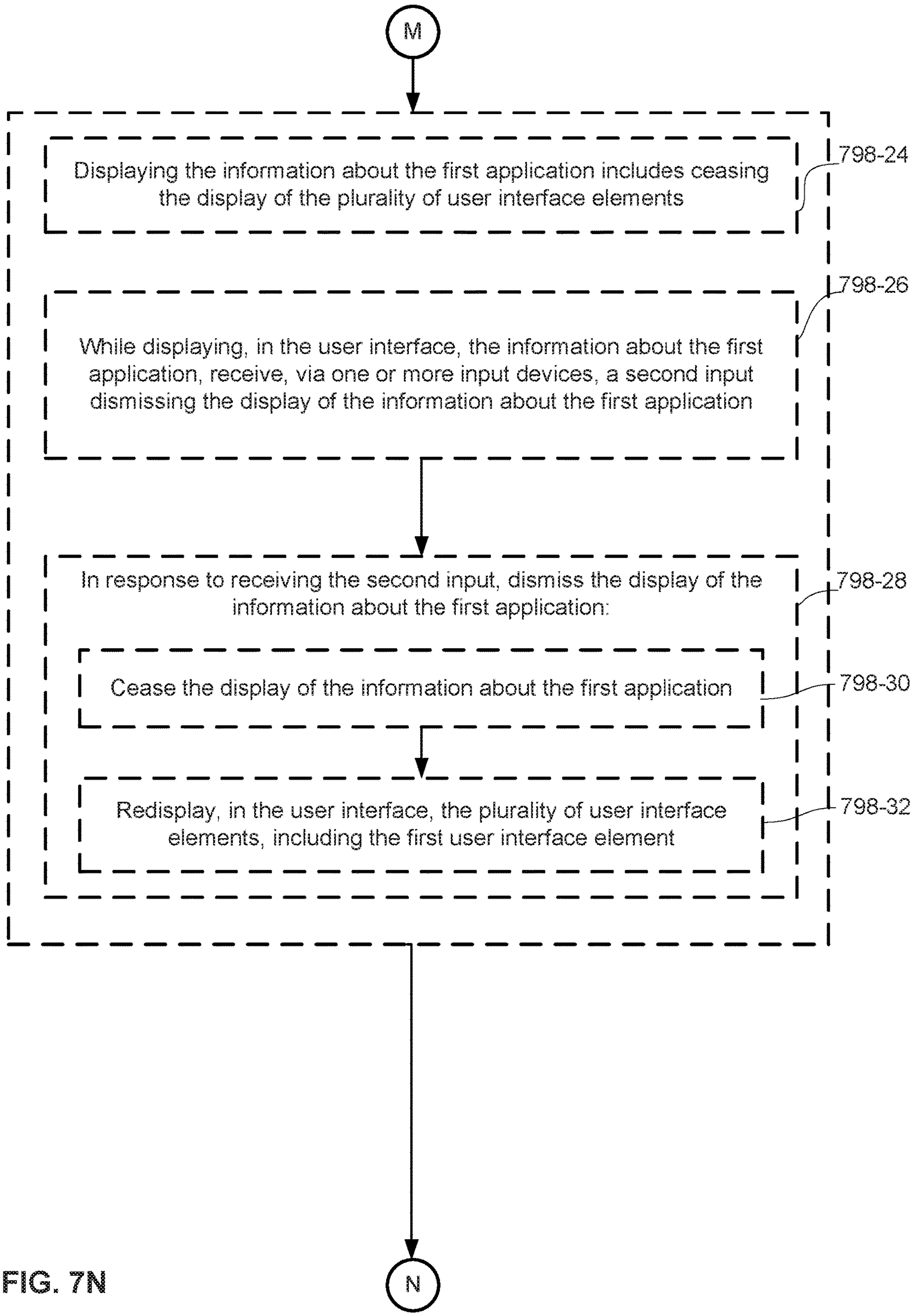
Figure 7O:
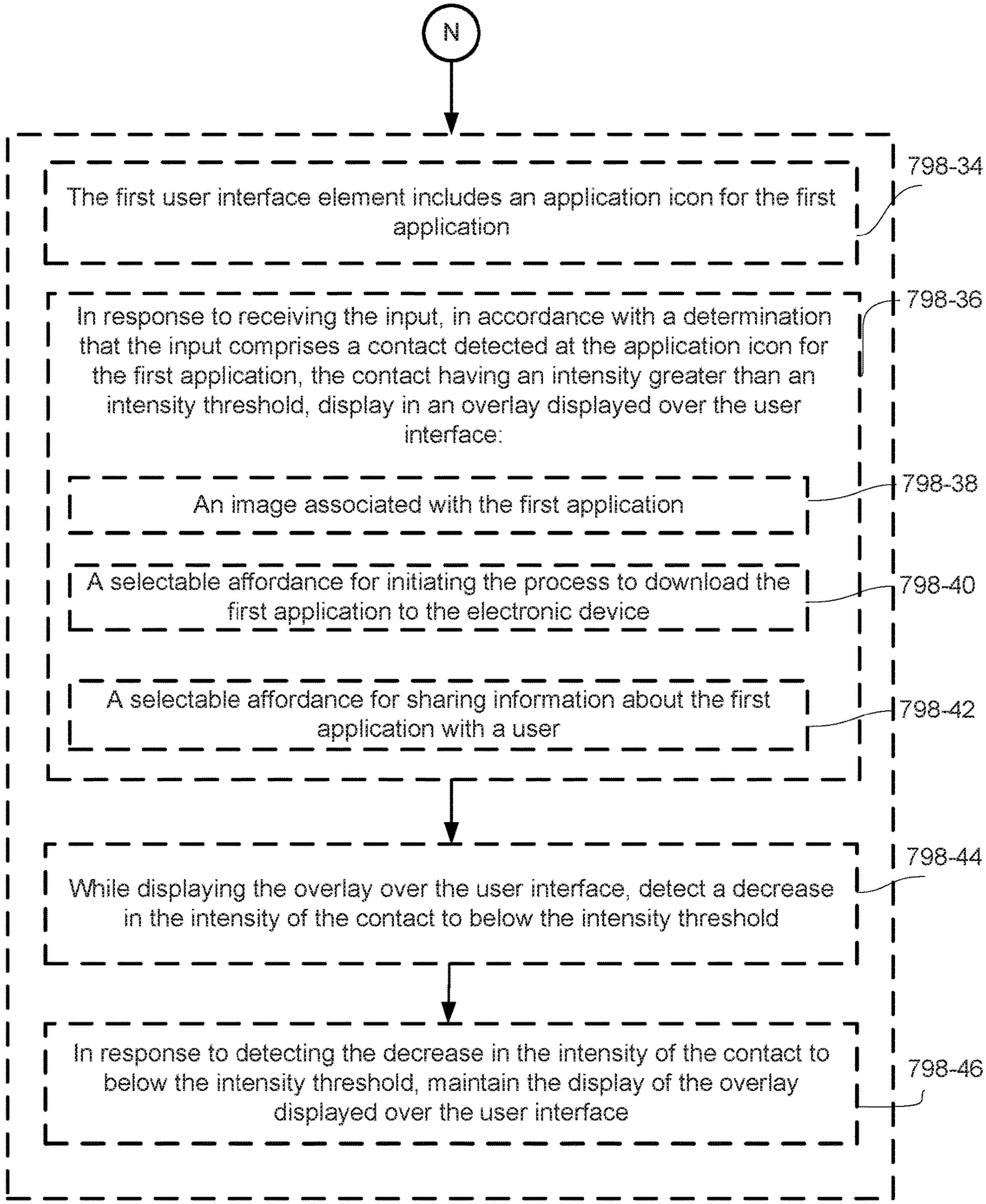

FIGS. 7A-7O are flow diagrams illustrating a method 700 of presenting information about, and facilitating downloading of, featured applications in an app store application in accordance with some embodiments of the disclosure. The method 700 is optionally performed at an electronic device such as device 100, device 300 or device 500 as described above with reference to FIGS. 1A-1B, 2-3, 4A-4B and 5A-5H. Some operations in method 700 are, optionally, combined and/or the order of some operations is, optionally, changed.

As described below, the method 700 provides ways of presenting information about, and facilitating downloading of, featured applications in an app store application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) in communication with a display (e.g., a television, a display of the electronic device, a touch screen of the electronic device, such as touch screen 504) and one or more input devices (e.g., a touch screen of the electronic device, such as touch screen 504, a remote control of the set-top box), displays (702), on the display, a user interface (e.g., a user interface of an app store application from which a user is able to browse, purchase and/or download applications to the electronic device) that includes a plurality of user interface elements (e.g., cards, boxes, or other user interface elements that include one or more images, one or more videos, text and/or other content), such as in FIG. 6A. Each user interface element of the plurality of user interface elements optionally corresponds to one or more applications available for download to the electronic device (e.g., each user interface element includes content, such as images, text and/or videos, relating to one or more applications that can be downloaded to the electronic device, and/or a selectable link for viewing information relating to the one or more applications and/or a selectable link for downloading the one or more applications to the electronic device), such as in FIG. 6A. The plurality of user interface elements optionally includes a first user interface element corresponding to a first application that can be downloaded to the electronic device, such as card 610*c* in FIG. 6A. The first user interface element optionally includes a selectable affordance for initiating a process to download the first application to the electronic device, such as in card 610*c* in FIG. 6A (e.g., at least one user interface element is displayed that includes a selectable button, selection of which initiates a process for downloading the first application to the electronic device).

While displaying the user interface, the electronic device optionally receives (704), via the one or more input devices, an input, such as in FIG. 6B (e.g., a tap on a touch screen of the electronic device, a touch input with an intensity greater than an intensity threshold on the touch screen of the electronic device, a click input detected on a remote control device). In some embodiments, in response to receiving the input (706), in accordance with a determination that the input corresponds to selection of the first user interface element, such as in FIG. 6G (e.g., a tap on the first user interface element, a touch input with an intensity greater than an intensity threshold on the first user interface element, a click input detected on a remote control while the first user interface element has a current focus in the user interface), the electronic device optionally displays (708), in the user interface, information about the first application (e.g., expanding the selected user interface element to display an expanded user interface element or expanded "card" that displays additional information about the first application that corresponds to the user interface element that was selected), without downloading the first application to the electronic device, such as in FIGS. 6H-6I (e.g., selecting the first user interface element, other than the selectable affordance included in the first user interface element, does not cause the first application corresponding to the first user interface element to be downloaded to the electronic device). In some embodiments, the additional information is distinct from an app information page (e.g., a product page) for the first application in the app store. In some embodiments, the additional information includes editorial content describing the application or uses of the application or grouping the application with related applications, such as in FIGS. 6U-6V.

In some embodiments, in response to receiving the input, in accordance with a determination that the input corresponds to selection of the selectable affordance in the first user interface element, such as in FIG. 6B (e.g., a tap on the selectable affordance, a click input detected on a remote control while the selectable affordance has a current focus in the user interface), the electronic device initiates (710) a process for downloading the first application to the electronic device (e.g., displaying a purchase/download confirmation dialog that includes instructions for purchasing/downloading the application, or downloading the application) without displaying, in the user interface, the information about the first application, such as in FIGS. 6C and 6F (e.g., selecting the selectable affordance starts a process for downloading the first application to the electronic device without expanding the first user interface element, and thus, without displaying the information about the first application that would otherwise be shown in the expanded first user interface element.). The above-described manner of allowing a user to, from the same user interface element, either download an application directly from the user interface element, or view more information about the application, allows the electronic device to simplify the presentation of information to the user and interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the first application to the electronic device includes, before downloading the first application to the electronic device, displaying, on the display, a download confirmation user interface element that includes instructions for downloading the first application to the electronic device (712), such as in FIG. 6C (e.g., an overlay displayed over the user interface that includes a selectable button and requests, from the user, confirmation of the request to download the first application.). Selection of the selectable button in the overlay optionally starts the downloading of the first application to the electronic device. In some embodiments, the first application is a free application, and thus, selection of the selectable button downloads the first application to the electronic device without requiring payment authorization for the first application. The above-described manner of requiring user confirmation before downloading the first application to the electronic device allows the electronic device to present information to the user in a manner consistent with the user's inputs to the electronic device (e.g., only download the first application if the user's interest in doing so is confirmed), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the first application to the electronic device includes, before downloading the first application to the electronic device, displaying, on the display, a purchase confirmation user interface element that includes instructions for purchasing the first application on the electronic device, such as in FIG. 6F (e.g., if the first application is a paid application, the electronic device displays a purchase confirmation overlay displayed over the user interface that includes a selectable button and requests, from the user, confirmation of the request to purchase the first application.) For example, selection of the selectable button in the overlay optionally displays a payment authorization overlay before the downloading of the first application to the electronic device is started. The payment authorization overlay optionally includes information about the purchase price, payment method (and option to change it), etc., and requests authentication of the user (e.g., via fingerprint, username/password, retinal, other biometric means), such as in FIG. 6F. In some embodiments, the payment authorization overlay is a user interface of the operating system of the electronic device, different than the user interface from which the purchase of the first application was requested. If the payment is successfully authorized (e.g., because the user was successfully authenticated), the downloading of the first application optionally begins. The above-described manner of requiring user purchase confirmation before downloading the first application to the electronic device allows the electronic device to present information to the user in a manner consistent with the user's inputs to the electronic device (e.g., only purchase/download the first application if the user's interest in doing so is confirmed), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the first application to the electronic device includes downloading the first application to the electronic device (716). In some embodiments, the first user interface element corresponding to the first application includes first information about the first application (718) (e.g., the name of the first application, an icon of the first application, a publisher of the first application, etc.), such as in FIG. 6G. The information about the first application displayed in response to the selection of the first user interface element optionally includes the first information about the first application, and additional information about the first application (720), such as in FIG. 6I (e.g., the additional information, in addition to the name of the first application, an icon of the first application, a publisher of the first application, includes information such as user reviews of the first application, images from content from the first application, in-app purchases available for the first application, etc.). The above-described manner of displaying initial information about the first application, and then displaying more information about the first application in response to user input, allows the electronic device to present progressive amounts of information to the user based on user inputs to the electronic device, which enhances the operability of the device and makes the user-device interface more efficient (e.g., by only displaying additional information if user input indicates such additional information is desired), which, additionally, reduces power usage and improves battery life of the device by enabling the user to use the device more quickly and efficiently.

In some embodiments, the additional information about the first application includes one or more links for obtaining authorization to access a given feature of the first application (722), such as in FIG. 6I (e.g., the additional information displayed about the first application includes information and selectable buttons for purchasing in-app purchases for the first application.). Selection of a given selectable button for a given in-app purchase optionally initiates a process for obtaining the given in-app purchase, as described below with reference to methods 1100 and 1300. An in-app purchase for a game/application is optionally one or more features of that game/application that require separate, external authorization (e.g., received from a server external to the electronic device) for accessing such features before the electronic device, when running that game/application, is able to access those features.). This external authorization is optionally separate from (and occurs after) an authorization that was optionally received for accessing the game/application itself, or is optionally separate from (and occurs after) the purchase/download of the game/application itself. For example, when a user purchases or downloads a game, that initial purchase/download optionally gives the user access to a standard set of features for that game (e.g., the user is able to play levels 1 through 10 of a racing game with a standard set of vehicles that are made available with a standard or initial purchase of the game). However, in some circumstances, the publisher of the game (or another relevant party) offers, as additional purchases, additional features for the game that the user must purchase separately before being able to access those features when playing the game. Access to such additional features optionally requires the user to purchase those additional features, which causes the publisher of the game (or some other relevant party) to give external authorization to the device to access those purchased features of the game when running the game. For example, in the case of the above-mentioned racing game, additional vehicles may be made available as in-app purchases for the game that a user is able to purchase to "unlock" after the user has downloaded the racing game, thus making those vehicles available for racing in the game. The above-described manner of displaying information about in-app purchases for the first application allows the electronic device to provide quick and easy access to in-app purchases to the user, which enhances the operability of the device and makes the user-device interface more efficient (e.g., by reducing the number of user inputs needed to access the in-app purchases), which, additionally, reduces power usage and improves battery life of the device by enabling the user to use the device more quickly and efficiently.

In some embodiments, the selection of the first user interface element causes the first user interface element to visually expand to an expanded first user interface element (724), such as in FIGS. 6G-6I (e.g., an animation that shows the first user interface element expanding from the initial first user interface element to a larger final expanded user interface element). The information about the first application displayed in response to the selection of the first user interface element is optionally displayed in the expanded first user interface element (726). The above-described manner of expanding the selected user interface element to display information about the first application allows the electronic device to provide consistent presentation of information to the user and maintain consistent interactions with the user (e.g., by providing visual feedback to the user that the displayed information is related to the user interface element the user selected), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, in accordance with a determination that a first user is logged into the electronic device (e.g., the electronic device is configured based on a user account of the first user with an application distribution server, from which the first user is able to download/purchase applications to the electronic device using the user account of the first user), the plurality of user interface elements includes a first set of user interface elements corresponding to a first set of applications that can be downloaded to the electronic device (728), such as in FIG. 6GG. In some embodiments, in accordance with a determination that a second user, different than the first user, is logged into the electronic device (e.g., the electronic device is configured based on a user account of the second user with the application distribution server, from which the second user is able to download/purchase applications to the electronic device using the user account of the second user), the plurality of user interface elements includes a second set of user interface elements, different than the first set of user interface elements, corresponding to a second set of applications, different than the first set of applications, that can be downloaded to the electronic device (730), such as in FIG. 6HH (e.g., cards and/or corresponding applications displayed in the user interface are different depending on which user is logged into the electronic device.). For example, the electronic device optionally displays cards/applications in the user interface based on past application downloads/purchases made by the user that is logged into the electronic device, such that the displayed applications are likely to be of interest to the user that is logged into the electronic device based on their past downloads/purchases. The above-described manner of displaying applications based on the user logged into the electronic device allows the electronic device to display information likely to be of interest to the user logged into the electronic device, which enhances the operability of the device and makes the user-device interface more efficient (e.g., by reducing the number of user inputs needed to find desired applications), which, additionally, reduces power usage and improves battery life of the device by enabling the user to use the device more quickly and efficiently.

In some embodiments, in accordance with a determination that the electronic device is a first type of device (e.g., a smart phone, a smart watch, etc.), the plurality of user interface elements includes a first set of user interface elements corresponding to a first set of applications that can be downloaded to the electronic device (732), such as in FIG. 6II. In some embodiments, in accordance with a determination that the electronic device is a second type of device, different than the first type of device (e.g., a tablet computer as opposed to a smart phone or a smart watch, a set-top box as opposed to a smart phone or a smart watch, etc.), the plurality of user interface elements includes a second set of user interface elements, different than the first set of user interface elements, corresponding to a second set of applications, different than the first set of applications, that can be downloaded to the electronic device (734), such as in FIG. 6JJ (e.g., cards and/or corresponding applications displayed in the user interface are different depending on the kind of device the electronic device is). For example, the electronic device displays cards/applications in the user interface that are better suited for a smart phone if the electronic device is a smartphone (e.g., applications better suited to a smaller display), and displays cards/applications in the user interface that are better suited for a tablet computer if the electronic device is a tablet computer (e.g., applications better suited to a larger display). The above-described manner of displaying applications based on what type of device the electronic device is allows the electronic device to display information likely to be more relevant to the current electronic device, which enhances the operability of the device and makes the user-device interface more efficient (e.g., by reducing the number of user inputs needed to find desired applications), which, additionally, reduces power usage and improves battery life of the device by enabling the user to use the device more quickly and efficiently.

In some embodiments, in accordance with a determination that a peripheral was paired with the electronic device (e.g., headphones paired with the electronic device, a stylus paired with a tablet computer, a smart watch paired with the electronic device, etc.) within a time threshold of a current time at the electronic device (e.g., within the last week, two weeks or month), the plurality of user interface elements includes a first set of user interface elements corresponding to a first set of applications related to the peripheral (736), such as in FIG. 6LL. In some embodiments, in accordance with a determination that the peripheral was not paired with the electronic device within the time threshold of the current time at the electronic device, the plurality of user interface elements does not include the first set of user interface elements corresponding to the first set of applications related to the peripheral (738), such as in FIG. 6KK (e.g., cards and/or corresponding applications displayed in the user interface are different depending on whether a peripheral was recently paired with the electronic device.). For example, the electronic device displays cards/applications in the user interface that are for use with recently paired headphones if headphones were recently paired with the electronic device, and displays cards/applications in the user interface that are for use with a recently paired smart watch if a smart watch was recently paired with the electronic device, thus facilitating discovery of applications related to those peripherals. The above-described manner of displaying applications based on recently paired peripherals allows the electronic device to display information likely to be more relevant to the current electronic device, which enhances the operability of the device and makes the user-device interface more efficient (e.g., by reducing the number of user inputs needed to find desired applications), which, additionally, reduces power usage and improves battery life of the device by enabling the user to use the device more quickly and efficiently.

In some embodiments, in accordance with a determination that the electronic device has been configured with a user account (e.g., the electronic device is logged into or otherwise configured based on a user account with an application distribution server, from which the first user is able to download/purchase applications to the electronic device using the user account) for less than a time threshold (e.g., one week, two weeks, one month), the plurality of user interface elements includes a first set of user interface elements corresponding to a first set of applications that can be downloaded to the electronic device (740), such as in FIG. 6MM. In some embodiments, in accordance with a determination that the electronic device has been configured with the user account for greater than the time threshold (e.g., one week, two weeks, one month), the plurality of user interface elements includes a second set of user interface elements, different than the first set of user interface elements, corresponding to a second set of applications, different than the first set of applications, that can be downloaded to the electronic device (742), such as in FIG. 6KK (e.g., if the electronic device is new, or otherwise newly setup with the current user account, the electronic device optionally displays applications that are useful for new devices or newly-setup devices.). For example, the electronic device optionally displays an application for teaching a user about features of the electronic device. However, if the electronic device has been setup with the current user account for a while, the electronic device optionally does not display such an application, as it is more likely that the user already knows about the features of the electronic device. The above-described manner of displaying applications based on how long the electronic device has been configured with the current user account allows the electronic device to display information likely to be more relevant to the current electronic device, which enhances the operability of the device and makes the user-device interface more efficient (e.g., by reducing the number of user inputs needed to find desired applications, or by conveying information to the user for more fully operating the electronic device), which, additionally, reduces power usage and improves battery life of the device by enabling the user to use the device more quickly and efficiently.

In some embodiments, the first user interface element corresponds to a plurality of applications, including the first application (744), such as in FIG. 6OO (e.g., the first user interface element includes icons for a plurality of applications, information about the plurality of information and/or selectable buttons for the plurality of applications for downloading the applications to the electronic device). In some embodiments, the first user interface element includes an animation that displays information about the plurality of applications that correspond to the first user interface element and the information about the plurality of applications changes over time (746), such as in FIG. 6OO (e.g., the content of the first user interface element is not static, but rather is animated such that at different times, different content (e.g., icons, information, names, etc.) about the plurality of applications is displayed by the first user interface element.). In this way, the electronic device is able to display more information about the plurality of applications using a given amount of space in the user interface (e.g., because that given amount of space in the user interface is usable to display different information at different times). The above-described manner of displaying animated information about the plurality of applications allows the electronic device to display information about those applications while utilizing less space in the user interface, which enhances the operability of the device and makes the user-device interface more efficient (e.g., by allowing the saved space in the user interface to be used for other purposes), which, additionally, reduces power usage and improves battery life of the device by enabling the user to use the device more quickly and efficiently.

In some embodiments, the plurality of applications are associated with a plurality of respective application icons (e.g., each of the plurality of application has its own application icon, graphic, etc.). The plurality of respective application icons optionally include a first subset of application icons corresponding to a first subset of applications of the plurality of applications (e.g., a first subset of one or more applications corresponding to the first user interface element) and a second subset of application icons corresponding to a second subset of applications of the plurality of applications (748) (e.g., a second subset of one or more applications corresponding to the first user interface element). In some embodiments, the animation that displays the information about the plurality of applications includes (750) displaying, at a first time, the first subset of application icons corresponding to the first subset of applications without displaying the second subset of application icons corresponding to the second subset of applications (752), such as in FIGS. 6OO-6UU (e.g., at the first time, a first subset, less than all, of the application icons of the applications that correspond to the first user interface element are displayed on the display). In some embodiments, the animation that displays the information about the plurality of applications includes displaying, at a second time different than the first time, the second subset of application icons corresponding to the second subset of applications without displaying the first subset of application icons corresponding to the first subset of applications (754), such as in FIGS. 6OO-6UU (e.g., at the second time, a second subset, less than all, of the application icons of the applications that correspond to the first user interface element are displayed on the display, where the second subset is different from the first subset.)

In some embodiments, the above-described animation result is achieved by animating the application icons of the applications across the first user interface element such that some of the application icons are initially not visible on the display, then move onto the first user interface element from off the first user interface element, move across the first user interface element while visible on the display, and then drop off the first user interface element and again become not visible on the display, such as in FIGS. 6OO-6UU. The above-described manner of displaying animated icons for the plurality of applications allows the electronic device to display the icons for more of the applications than can fit on the user interface element at one point in time by displaying the icons at different points in time while utilizing less space in the user interface, which enhances the operability of the device and makes the user-device interface more efficient (e.g., by allowing the saved space in the user interface to be used for other purposes), which, additionally, reduces power usage and improves battery life of the device by enabling the user to use the device more quickly and efficiently.

In some embodiments, the animation that displays the information about the plurality of applications further includes (756), at the first time, concurrently displaying in the first user interface element (758), the first subset of application icons corresponding to the first subset of applications without displaying the second subset of application icons corresponding to the second subset of applications (760), such as in FIGS. 6OO-6UU. In some embodiments, the animation that displays the information about the plurality of applications further includes, at the first time, concurrently displaying in the first user interface element, additional information (e.g., name, publisher, genre, etc.) about one or more of the first subset of applications without displaying additional information about one or more of the second subset of applications (762), such as in FIGS.

6OO-6UU (e.g., while the first subset of applications icons is displayed in the first user interface element, the name of an application associated with at least one of those application icons is displayed in the first user interface element.). In some embodiments, the names of only a subset of the first subset of applications are displayed at any given moment in time. Thus, in some embodiments, the name of a first application is displayed for a predetermined amount of time (e.g., one, three or five seconds), then ceases to be displayed and the name of a second application is displayed for the predetermined amount of time, and so on.

In some embodiments, the animation that displays the information about the plurality of applications further includes, at the second time, concurrently displaying in the first user interface element (764), the second subset of application icons corresponding to the first subset of applications without displaying the first subset of application icons corresponding to the first subset of applications (768), such as in FIGS. 6OO-6UU. In some embodiments, the animation that displays the information about the plurality of applications further includes, at the second time, concurrently displaying in the first user interface element, the additional information (e.g., name, publisher, genre, etc.) about the one or more of the second subset of applications without displaying the additional information about the one or more of the first subset of applications (770), such as in FIGS. 6OO-6UU (e.g., while the second subset of applications icons is displayed in the first user interface element, the name of an application associated with at least one of those application icons is displayed in the first user interface element.). In some embodiments, the names of only a subset of the second subset of applications are displayed at any given moment in time. Thus, in some embodiments, the name of a first application is displayed for a predetermined amount of time (e.g., one, three or five seconds), then ceases to be displayed and the name of a second application is displayed for the predetermined amount of time, and so on. The above-described manner of sequentially displaying the additional information for the plurality of applications allows the electronic device to display such information for all of the applications at different points in time while utilizing less space in the user interface, which enhances the operability of the device and makes the user-device interface more efficient (e.g., by allowing the saved space in the user interface to be used for other purposes), which, additionally, reduces power usage and improves battery life of the device by enabling the user to use the device more quickly and efficiently.

In some embodiments, the first user interface element includes a video corresponding to the first application (772), such as in FIG. 6VV (e.g., a video of gameplay from the first application, a video of one or more functions of the first application, a video advertisement for the first application, or any other video that includes content from the first application or otherwise includes information about the first application.). The above-described manner of displaying a video corresponding to the first application in the first user interface element allows the electronic device to display additional information about first application while utilizing less space in the user interface, which enhances the operability of the device and makes the user-device interface more efficient (e.g., by allowing the saved space in the user interface to be used for other purposes), which, additionally, reduces power usage and improves battery life of the device by enabling the user to use the device more quickly and efficiently.

In some embodiments, in accordance with a determination that the first user interface element is displayed on the display (e.g., the first user interface element is currently visible on the display, and is not off the display), the electronic device plays (774) the video included in the first user interface element. In some embodiments, in accordance with a determination that the first user interface element is not displayed on the display (e.g., the first user interface element is not currently visible on the display), the electronic device forgoes playing (776) the video included in the first user interface element. For example, in some embodiments, the video in the first user interface element autoplays (e.g., without user input for playing the video) when the first user interface element is displayed on the display (e.g., when the user interface is scrolled such that the first user interface element becomes visible on the display), and stops playing (e.g., without user input for stopping the playback of the video) when the first user interface element is not displayed on the display (e.g., when the user interface is scrolled such that the first user interface element is no longer visible on the display). The above-described manner of automatically playing or stopping the playback of the video allows the electronic device to control such playback without specific user input to do so, which enhances the operability of the device and makes the user-device interface more efficient (e.g., by requiring fewer user input to control the playback of the video), which, additionally, reduces power usage and improves battery life of the device by enabling the user to use the device more quickly and efficiently.

In some embodiments, the video corresponding to the first application in the first user interface element is playable in response to user input while displaying the first user interface element (778), such as in FIGS. 6VV-6XX (e.g., the video is playable directly from the first user interface element in response to selection (e.g., a tap) of a play button overlaid on the video). In some embodiments, displaying the information about the first application in response to receiving the input corresponding to the selection of the first user interface element includes displaying the video in the user interface (780), such as in FIG. 6ZZ. The video displayed in the user interface is optionally playable in response to user input while displaying the information about the first application (780), such as in FIGS. 6ZZ-6BBB (e.g., the video is also displayed in the expanded first user interface element, and is playable from the expanded first user interface element in response to selection (e.g., a tap) of a play button overlaid on the video).

While displaying the video and the information about the first application in the user interface, the electronic device optionally receives (782), via the one or more input devices, selection of the video, such as in FIG. 6CCC (e.g., a tap input detected on the video displayed in the expanded card, other than a tap detected on the play button overlaid on the video). In some embodiments, in response to receiving the selection of the video, the electronic device displays (784) the video in a full screen configuration on the display, such as in FIG. 6DDD (e.g., and ceases display of the information about the first application, because the video is now occupying the entire space of the display.). In some embodiments, the video begins playing automatically once it is displayed in the full screen configuration, and in some embodiments, further user input (e.g., selection of a play button overlay) is required to play the video once it is displayed in the full screen configuration, such as in FIGS. 6EEE-6FFF. The above-described manner of allowing non-full screen playback of the video, and then progressing to full screen playback of the video, allows the electronic device to dynamically adjust the amount of the display occupied by the video based on user inputs, which enhances the operability of the device and makes the user-device interface more efficient (e.g., by only showing the video full screen if user input indicates such action is desired), which, additionally, reduces power usage and improves battery life of the device by enabling the user to use the device more quickly and efficiently.

In some embodiments, the first user interface element corresponds to a given topic (786), such as in FIG. 6HHH (e.g., the first user interface element is an element with information relating to how to edit photos with the electronic device, how to create music with the electronic device, or other topics). In some embodiments, in accordance with the determination that the input corresponds to the selection of the first user interface element (e.g., a tap input on the first user interface element, other than on the selectable affordance in the first user interface element for initiating the process to download the first application to the electronic device), the electronic device displays (788), in the user interface, one or more articles about the given topic, including the information about the first application, and one or more links for downloading one or more applications, including the first application, to the electronic device, the one or more applications for performing one or more functions corresponding to the given topic, such as in FIG. 6JJJ (e.g., expanding the first user interface element and displaying one or more articles about editing photos on the electronic device, making music on the electronic device, optionally along with editorial instructions for using the one or more applications to achieve some effect or function related to the articles and/or topic.). For example, if the first user interface element corresponds to how to edit photos on the electronic device, selection of the first user interface element optionally expands the first user interface element and displays, in the expanded element, articles about how to edit photos on the electronic device, along with links to a plurality of applications relating to photo editing on the electronic device and editorial instructions about how to use those applications. The above-described manner of displaying articles, links to applications and/or editorial instructions for using the applications allows the electronic device to provide quick and easy access to applications to the user, along with guiding the user through which applications to use and how to use them, which enhances the operability of the device and makes the user-device interface more efficient (e.g., by reducing the number of user inputs needed to access the information and their corresponding information), which, additionally, reduces power usage and improves battery life of the device by enabling the user to use the device more quickly and efficiently.

In some embodiments, the plurality of user interface elements includes a second user interface element associated with obtaining authorization to access a given feature of a second application, such as in FIG. 6Q (e.g., an in-app purchase for the second application, as described below with reference to methods 1100 and 1300). The second user interface element optionally includes (790) a selectable affordance for initiating a process for obtaining authorization to access the given feature of the second application, such as in FIG. 6Q (e.g., the second user interface element is displayed with a selectable button, selection of which initiates a process for obtaining/purchasing the in-app purchase for the second application, as described below with reference to methods 1100 and 1300.). The above-described manner of displaying in-app purchases alongside applications allows the electronic device to present additional potentially relevant information to a user of the electronic device when the user is browsing applications, which enhances the operability of the device and makes the user-device interface more efficient (e.g., by facilitating more immediate presentation of information relevant to user), which, additionally, reduces power usage and improves battery life of the device by enabling the user to use the device more quickly and efficiently.

In some embodiments, the first user interface element includes an application icon for the first application (792), such as in FIG. 6K. In some embodiments, in response to receiving the input, in accordance with a determination that the input corresponds to selection of the application icon for the first application (e.g., a tap detected on the application icon in the first user interface element), the electronic device displays (794), in the user interface, a product page of the first application, such as in FIGS. 6L-6M (e.g., a page dedicated to the first application, as described below with reference to method 900). The above-described manner of allowing a user to access the product page of the first application directly from the first user interface element allows the electronic device to more immediately present additional information about the first application (e.g., shown on the product page) to the user of the electronic device when the user is browsing applications, which enhances the operability of the device and makes the user-device interface more efficient (e.g., by reducing the number of user inputs required to view the additional information), which, additionally, reduces power usage and improves battery life of the device by enabling the user to use the device more quickly and efficiently.

In some embodiments, in accordance with a determination that the product page of the first application was displayed in response to the selection of the application icon for the first application, the electronic device displays (796), in the product page of the first application, a link to a user interface element associated with the first user interface element, such as in FIG. 6M. For example, if the product page of the first application was accessed by selection of the application icon displayed in the first user interface element, the product page optionally includes a link back to the first user interface element or the expanded first user interface element (as described previously). Specifically, selection of the link optionally navigates directly back to the first user interface element or the expanded first user interface element, such as in FIGS. 6N-6O. In some embodiments, in accordance with a determination that the product page of the first application was not displayed in response to the selection of the application icon for the first application, the electronic device displays (798) the product page of the first application without including the link to the user interface element associated with the first user interface element, such as in FIG. 6R. For example, if the product page of the first application was not accessed from the first user interface element, the product page optionally does not include a link back to the first user interface element or the expanded first user interface element. Optionally, if the user reached the product page via another pathway of application browsing in the app store application (e.g., selection of an application entry displayed while browsing games in the app store), the product page would not have a link back to the first user interface element or the expanded first user interface element. By including such a link, the user is able to quickly and easily return to the first user interface element or the expanded first user interface element to continue browsing the elements or their contents. The above-described manner of allowing a user to quickly and easily return to the first user interface element or the expanded first user interface element directly from the product page allows the electronic device to facilitate quick navigation through the user interface, which enhances the operability of the device and makes the user-device interface more efficient (e.g., by reducing the number of user inputs required to perform such navigation), which, additionally, reduces power usage and improves battery life of the device by enabling the user to use the device more quickly and efficiently.

In some embodiments, the first user interface element corresponds to a plurality of applications, including the first application (798-2), such as in FIG. 6S (e.g., the first user interface element includes information about and/or access to multiple applications). In some embodiments, in accordance with the determination that the input corresponds to the selection of the first user interface element (e.g., a tap detected on the first user interface element), the electronic device displays (798-4), in the user interface, a second user interface element (e.g., an expanded first user interface element) including information (e.g., images, publishers, ratings, genre, details about use, etc.) about each application of the plurality of applications, including a first application icon and a corresponding first selectable affordance for initiating a process to download the first application (798-6) and a second application icon and a corresponding second selectable affordance for initiating a process to download a second application (798-8), such as in FIGS. 6T-6V. For example, the expanded first user interface element displays the icons for each of the plurality of applications associated with the first user interface element and the expanded first user interface element includes selectable buttons for each of the plurality of applications associated with the first user interface element, selection of which initiates a process to download (e.g., as described with reference to FIGS. 6A-6F) the application corresponding to the selected button.

In some embodiments, while displaying the second user interface element, the electronic device receives (798-10), via the one or more input devices, a second input (e.g., a tap input). In response to receiving the second input (798-12), in accordance with a determination that the second input corresponds to selection of the first application icon for the first application, such as in FIG. 6Y (e.g., one of the application icons is selected in the expanded first user interface element), the electronic device optionally displays (798-14), in the user interface, a first product page of the first application without downloading the first application to the electronic device, such as in FIG. 6Z. For example, selection of an application icon from the expanded first user interface element displays a product page (e.g., as described below with reference to method 900) for the application corresponding to the selected icon. In some embodiments, in response to receiving the second input, in accordance with a determination that the second input corresponds to selection of the first selectable affordance for the first application (e.g., one of the selectable buttons for downloading an application is selected), the electronic device initiates (798-16) a process for downloading the first application to the electronic device without displaying, in the user interface, the first product page of the first application, such as in FIGS. 6AA-6BB. For example, selection of a selectable application download button from the expanded first user interface element initiates the process for downloading the application (e.g., as described with reference to FIGS. 6A-6F corresponding to the selected button. The above-described manner of allowing a user to, from the same expanded user interface element, either download an application directly from the expanded user interface element, or view a product page for the application, allows the electronic device to simplify the presentation of information to the user and interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the first user interface element includes the respective application icons for the plurality of applications corresponding to the first user interface element including the first application icon for the first application and the second application icon for the second application (798-18), such as in FIG. 6W (e.g., the first user interface element, itself (e.g., before being expanded), displays the icons of the applications to which it corresponds). In some embodiments, in accordance with a determination that the selection of the first user interface element includes selection of the second application icon for the second application, such as in FIG. 6W (e.g., one of the application icons displayed by the first user interface element was selected when the first user interface element was displayed in the user interface), displaying the second user interface element includes displaying the second user interface element with the second application icon of the second application and a second respective selectable affordance of the respective selectable affordances for the second application having a focus (798-20), such as in FIG. 6X. For example, the expanded first user interface element is displayed with the portion of the expanded first user interface element corresponding to the second respective application displayed. Optionally, if the expanded first user interface element includes an article that discusses, at different locations in the article, different ones of the plurality of applications, when the icon for the second respective application in the first user interface element (before it is expanded) is selected, the expanded first user interface element is displayed, and the article is automatically scrolled to the location of the portion of the article associated with the second respective application, such that that portion of the article is displayed in the expanded first user interface element, such as in FIG. 6X.

In some embodiments, in accordance with a determination that the selection of the first user interface element does not include the selection of the second application icon for the second application (e.g., the second respective application icon is not selected from the first user interface element), displaying the second user interface element includes displaying the second user interface element with the second application icon of the second application and the second selectable affordance for the second application not having the focus (798-22), such as in FIGS. 6S-6T. For example, if an application icon other than the second respective application icon is selected, or if no application icon is selected but rather a non-icon, non-button portion of the first user interface element is selected, then the expanded first user interface element is displayed without automatically scrolling to (or having focus on) the portion of the expanded first user interface element corresponding to the second respective application. The above-described manner of automatically displaying the portion of the expanded first user interface element corresponding to a particular application allows the electronic device to simplify and streamline the presentation of information to the user and interactions with the user, which enhances the operability of the device and makes the user-device interface more efficient (e.g., by reducing the number of user inputs required to navigate to certain information), which, additionally, reduces power usage and improves battery life of the device by enabling the user to use the device more quickly and efficiently.

In some embodiments, displaying the information about the first application includes ceasing the display of the plurality of user interface elements (798-24), such as in FIGS. 6G-6I (e.g., the information about the first application is displayed in an expanded first user interface element that is displayed in place of the plurality of user interface elements on the display). In some embodiments, while displaying, in the user interface, the information about the first application (e.g., in the expanded first user interface element), the electronic device receives (798-26), via the one or more input devices, a second input dismissing the display of the information about the first application, such as in FIG. 6J (e.g., an input closing the expanded first user interface element, such as a swipe input downward on the expanded first user interface element). In some embodiments, in response to receiving the second input, the electronic device dismisses (798-28) the display of the information about the first application, such as in FIG. 6K. The electronic device optionally ceases (798-30) the display of the information about the first application (e.g., closing the expanded first user interface element, or otherwise ceasing to display the expanded first user interface element) and redisplays (798-32), in the user interface, the plurality of user interface elements, including the first user interface element, such as in FIG. 6K. For example, the expanded first user interface element is displayed over the plurality of user interface elements, and occludes the plurality of user interface elements so that they are not visible on the display, such that when the expanded first user interface element is closed and ceases to be displayed, the plurality of user interface elements are again displayed (e.g., revealed) on the display. The above-described manner of allowing a user to dismiss the expanded first user interface element and drop back into the plurality of user interface elements allows the electronic device to provide consistent presentation of information to the user and maintain consistent interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the first user interface element includes an application icon for the first application (798-34), such as in FIG. 6CC. In some embodiments, in response to receiving the input, in accordance with a determination that the input comprises a contact detected at the application icon for the first application, the contact having an intensity greater than an intensity threshold, such as in FIG. 6DD (e.g., the selection of the application icon is provided with an intensity greater than an intensity threshold. In other words, the input is optionally a touch input on the application icon with enough intensity to trigger the resulting actions described here, including the display of the below-described overlay. In some examples, if the intensity of the touch input is less than the intensity threshold (e.g., a tap on the application icon with intensity less than the intensity threshold), the below-described overlay is not displayed), the electronic device displays (798-36) in an overlay displayed over the user interface, such as in FIG. 6DD (e.g., the overlay does not occupy the entire user interface, but rather is an overlay smaller than the size of the entire user interface, and is displayed over the plurality of user interface elements), an image associated with the first application (798-38) (e.g., a large application icon for the first application, an image of content from the first application, a video from the first application, etc.), a selectable affordance for initiating the process to download the first application to the electronic device (798-40) (e.g., a button is displayed in the overlay, and is selectable to start a process to download the first application to the electronic device, as described with reference to FIGS. 6A-6F), and a selectable affordance for sharing information about the first application with a user (798-42) (e.g., a button is displayed in the overlay, and is selectable to share (e.g., via text message, email, etc.) the name, information about and/or link to download the first application with another electronic device).

While displaying the overlay over the user interface, the electronic device detects (798-44) a decrease in the intensity of the contact to below the intensity threshold, such as in FIG. 6EE (e.g., the intensity of the touch input selecting the application icon is decreased and eventually the contact is lifted off from the touch screen). In some embodiments, in response to detecting the decrease in the intensity of the contact to below the intensity threshold (e.g., once the contact lifts off from the touch screen), the electronic device maintains (798-46) the display of the overlay displayed over the user interface, such as in FIGS. 6EE-6FF (e.g., even though the intensity of the contact has fallen below the intensity threshold, the overlay that was displayed as a result of the touch input continues to be displayed in the user interface so that the user is able to then select one of the two selectable affordances displayed in the overlay). Such continued display behavior in response to a decrease in the intensity of an input to below an intensity threshold is optionally different than the behavior in other contexts where the result of the touch input having intensity (e.g., displaying a pop-up or overlay) is reversed upon the intensity of the touch input falling below the intensity threshold. For example, when browsing pictures on the electronic device in a photos application, providing such a touch input having an intensity above the intensity threshold on a photo optionally causes the photo to be displayed as a pop-up or overlay over the other photos in the photos application; however, when the intensity of the touch input falls below the intensity threshold, the pop-up or overlay optionally ceases to be displayed, in contrast to the behavior described above. In some embodiments, the intensity threshold described here is the light press intensity threshold described with reference to FIGS. 5C-5H, the deep press intensity threshold described with reference to FIGS. 5C-5H, or another intensity threshold lower than the light press intensity threshold or higher than the deep press intensity threshold. The above-described manner of allowing a user to download or share the first application using the overlay displayed in response to the touch input having intensity greater than the intensity threshold allows the electronic device to simplify and streamline interactions with the user while maintaining the context of the user's navigation through the user interface, which enhances the operability of the device and makes the user-device interface more efficient (e.g., by helping the user to provide proper inputs, reducing user mistakes when operating/interacting with the device and reducing the number of user inputs needed to perform certain tasks), which, additionally, reduces power usage and improves battery life of the device by enabling the user to use the device more quickly and efficiently.

It should be understood that the particular order in which the operations in FIGS. 7A-7O have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, 1500 and 1700) are also applicable in an analogous manner to method 700 described above with respect to FIGS. 7A-7O. For example, the user interfaces, user interface elements, processes for downloading applications, processes for purchasing applications, product pages, selectable affordances, etc., described above with reference to method 700 optionally have one or more of the characteristics of the user interfaces, user interface elements, processes for downloading applications, processes for purchasing applications, product pages, selectable affordances, etc. described herein with reference to other methods described herein (e.g., methods 900, 1100, 1300, 1500 and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7O are, optionally, implemented by components depicted in FIGS. 1A-1B. For example, displaying operations 702 and 708, receiving operation 704 and initiating operation 710 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Category-Based Application/Game Browsing User Interface

Users interact with electronic devices in many different manners, including browsing applications that may be available (e.g., available for purchase and/or download) on the electronic devices. For example, a user may browse applications in an app store application for downloading applications to an electronic device. The user may desire to browse such applications by category (e.g., games, non-game applications, sports games, news applications, etc.). The embodiments described below provide ways in which an electronic device facilitates browsing of applications and games by category, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8LL illustrate exemplary ways in which an electronic device facilitates browsing of applications and games by category in accordance with some embodiments of the disclosure. The embodiments in these figures are used to illustrate the processes described below, including the processes described with reference to FIGS. 9A-9J.

Figure 8A:
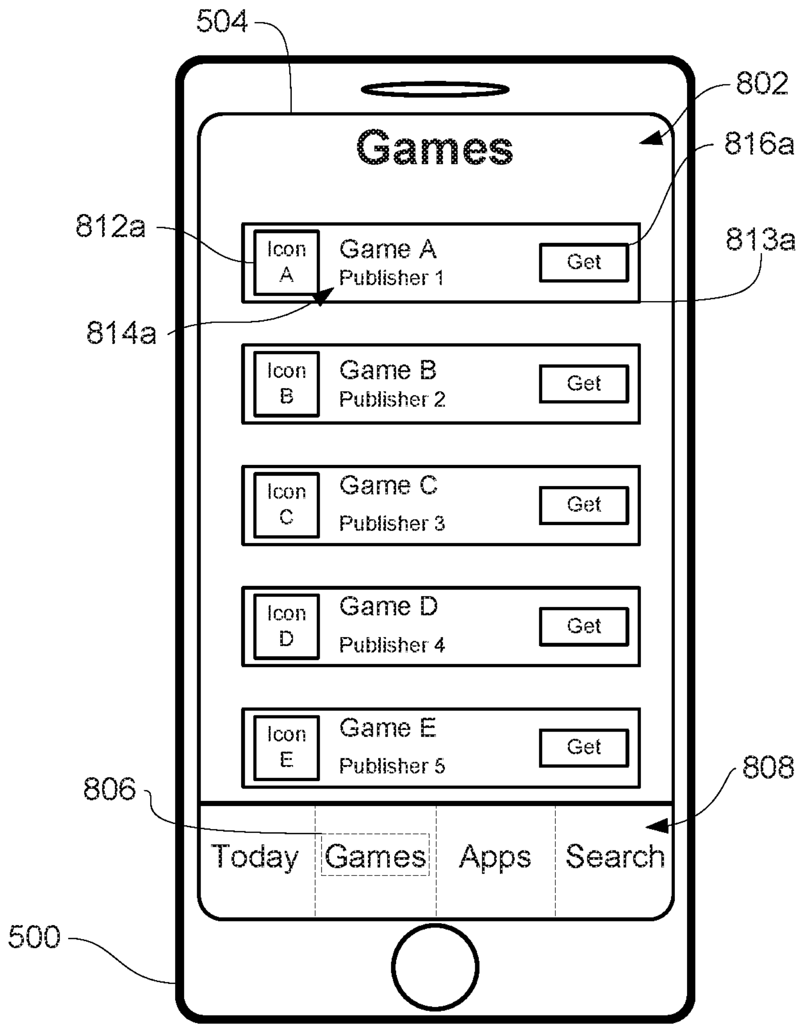
FIGS. 8A-8LL illustrate exemplary ways in which an electronic device facilitates browsing of applications and games by category in accordance with some embodiments of the disclosure.
Figure 8B:
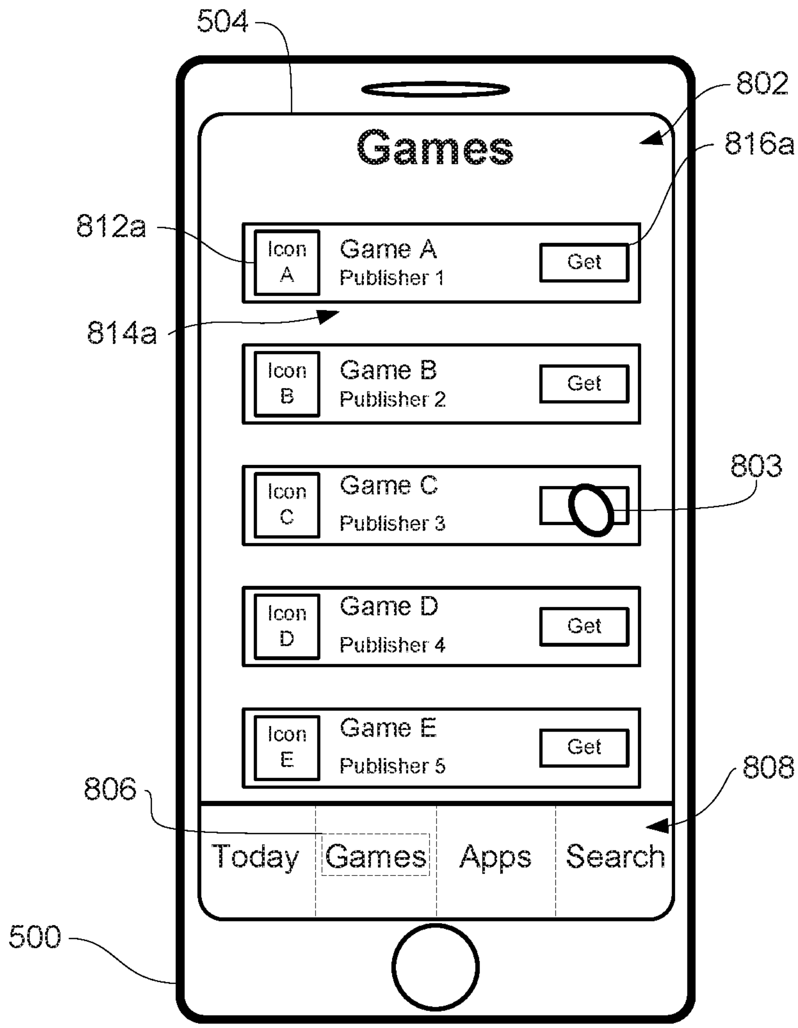

FIG. 8A illustrates exemplary device 500 with touch screen 504, such as described with reference to FIGS. 5A-5H. Touch screen 504 optionally displays one or more user interfaces that include various content. In the example illustrated in FIG. 8A, touch screen 504 displays an app store application for browsing applications available for download to device 500 that is running on device 500, such as described with reference to FIGS. 6A-6JJJ. In FIG. 8A, the app store application displays application browsing user interface 802, which includes a navigation bar 808. The "Games" element is currently selected, and as a result, user interface 802 displays various user interface elements for browsing games available for download to device 500. For example, user interface 802 includes different user interface elements 813 corresponding to different games, such as element **813*a* corresponding to game A. As shown in FIG. 8A, elements 813 display various information relating to the games to which they correspond. For example, element 813*a* corresponds to game A, and displays icon 812*a* for game A, information 814*a* for game A (e.g., the name of game A, the publisher of game A, etc.) and affordance 816*a*, which is selectable to initiate a process to download game A to device 500. Other elements in user interface 802** similarly display corresponding information and elements for games B, C, D and E.

As mentioned above, selection of a purchase/download affordance for a given game optionally initiates a process to download that game. For example, in FIG. 8B, selection of the purchase/download affordance for game C is detected, and in response in FIG. 8C, device 500 initiates a process to download game C to device 500 (e.g., by displaying download confirmation overlay 818). The details of the purchase and/or download processes initiated by selection of the download/purchase affordances in FIGS. 8A-8LL are analogous to those described with reference to FIGS. 6A-6JJJ, except as otherwise indicated.

Figure 8C:
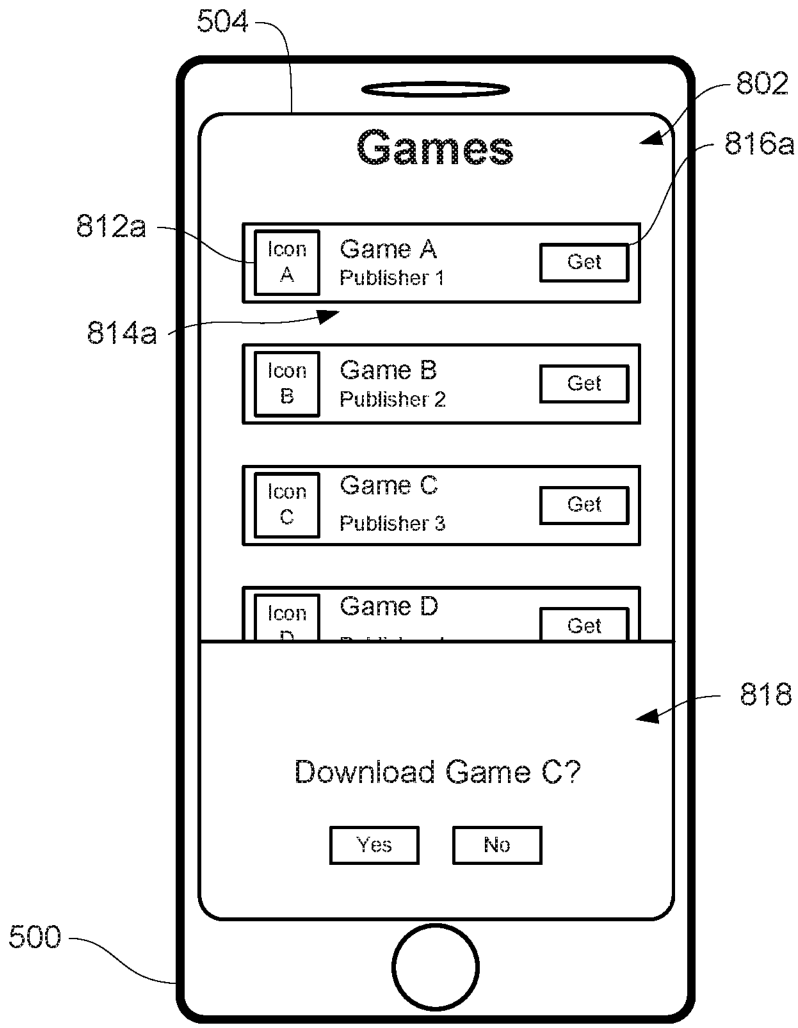
Figure 8D:
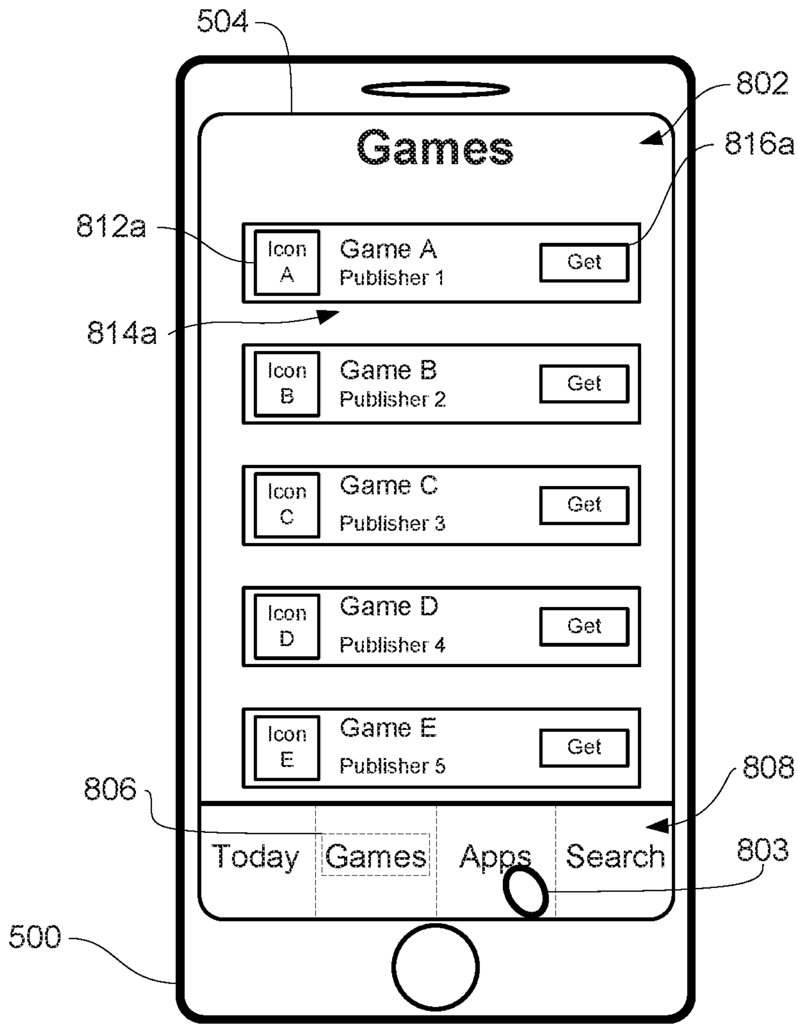
Figure 8E:
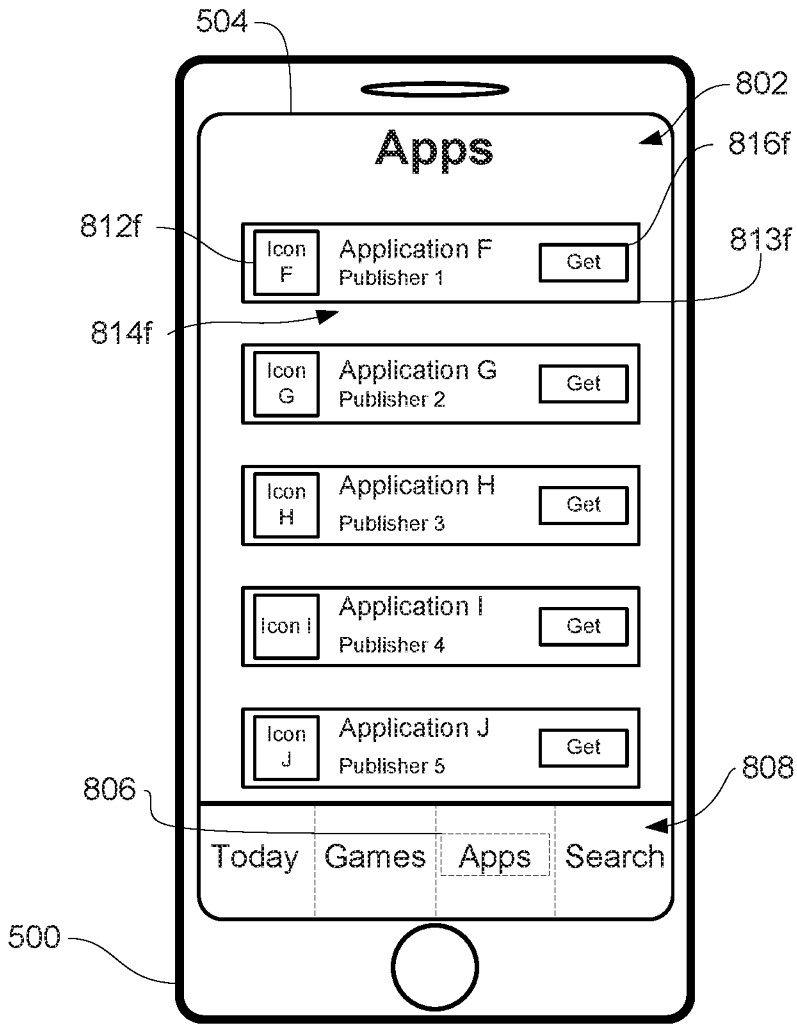

In FIG. 8D, selection of the "Apps" element in navigation bar 808 is detected, and in response, device 500 replaces elements 813 corresponding to games with elements 813 corresponding to non-game applications ("apps") while maintaining the display of navigation bar 808, as shown in FIG. 8E. For example, element **813*f* corresponds to application F, and displays icon 812*f* for application F, information 814*f* for application F (e.g., the name of application F, the publisher of application F, etc.) and affordance 816*f*, which is selectable to initiate a process to download application F to device 500. Other elements in user interface 802** similarly display corresponding information and elements for applications G, H, I and J.

As mentioned above, selection of a purchase/download affordance for a given application initiates a process to download that application. For example, in FIG. 8F, selection of the purchase/download affordance for application H is detected, and in response in FIG. 8G, device 500 initiates a process to download application H to device 500 (e.g., by displaying download confirmation overlay 818). The details of the purchase and/or download processes initiated by selection of the download/purchase affordances in FIGS. 8A-8LL are analogous to those described with reference to FIGS. 6A-6JJJ, except as otherwise indicated.

Figure 8F:
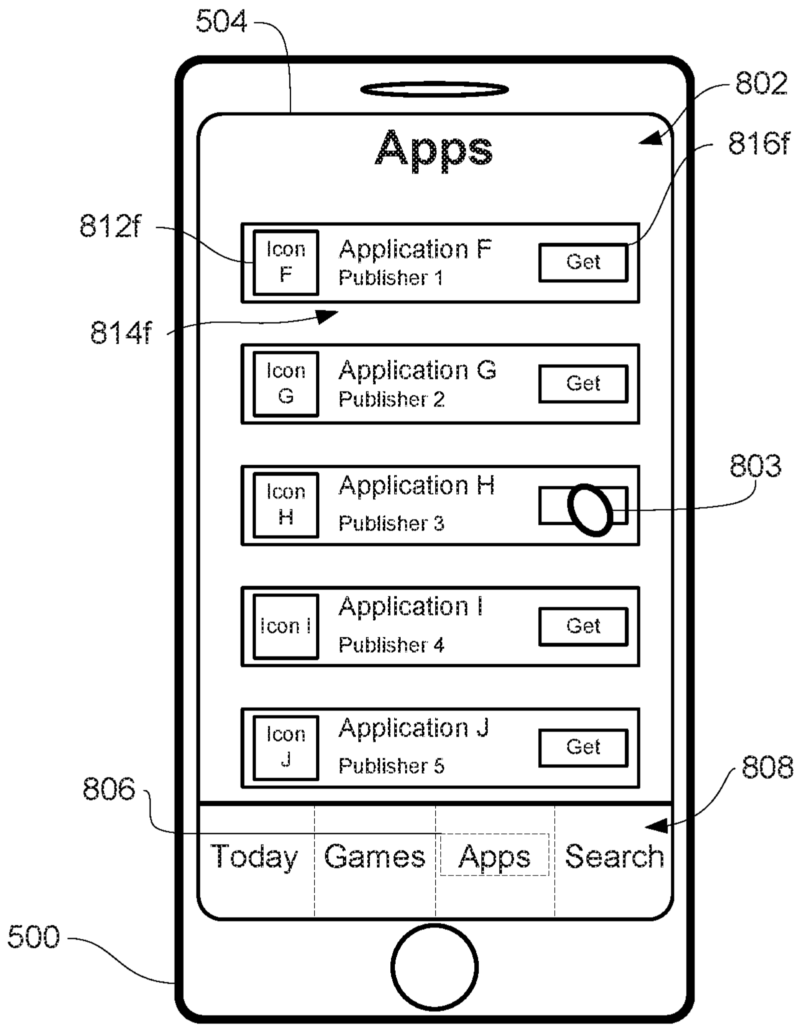
Figure 8G:
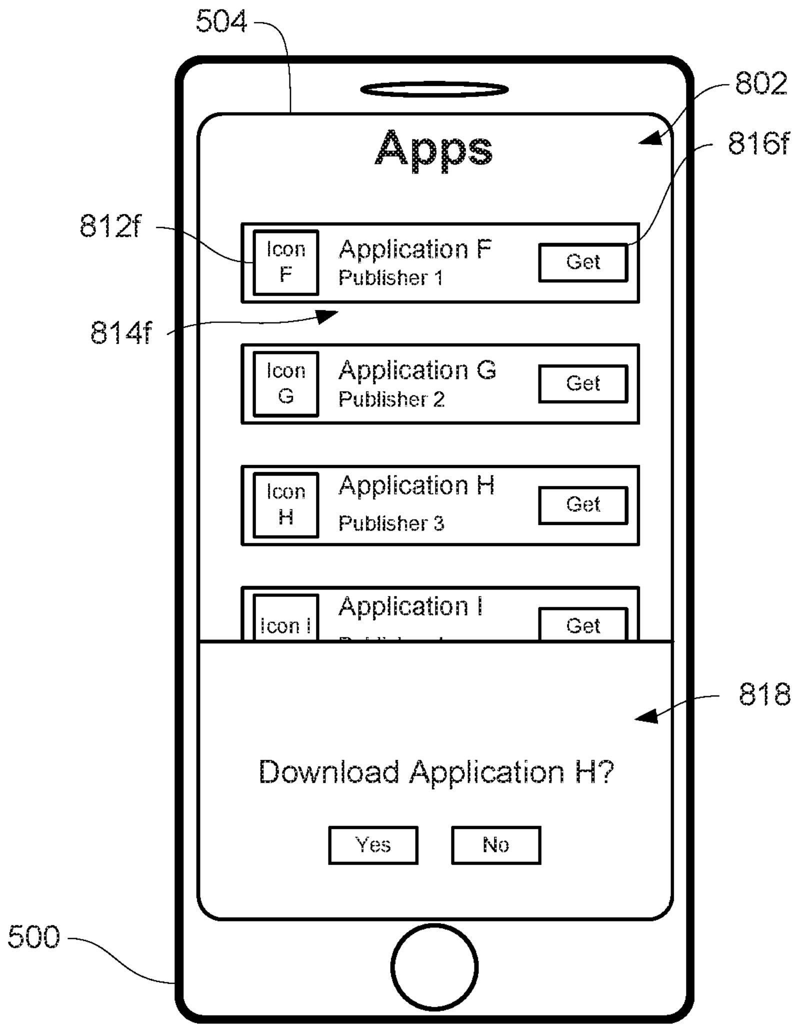
Figure 8H:
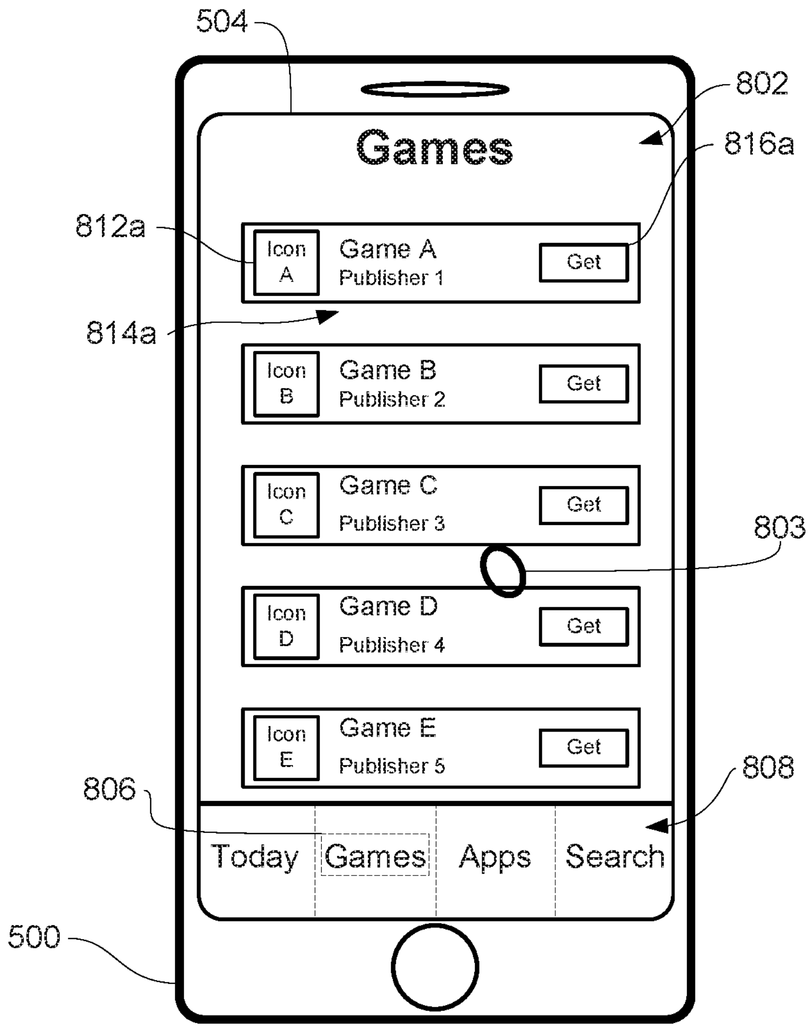
Figure 8I:
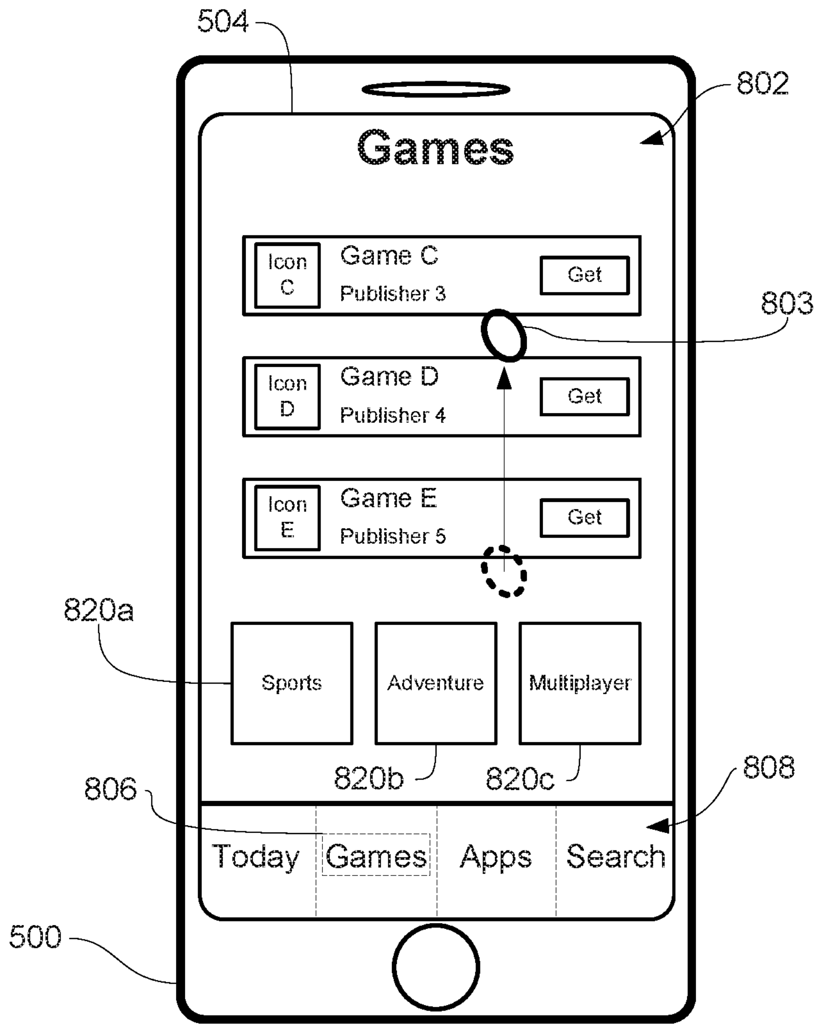
Figure 8J:
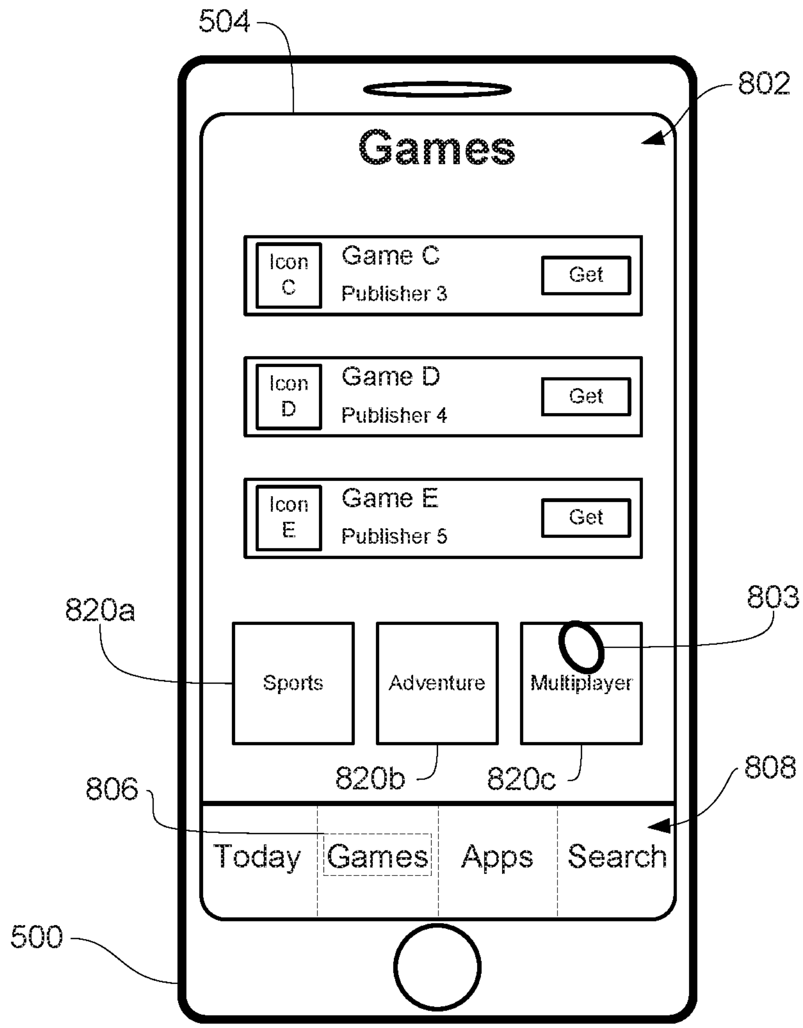
Figure 8K:
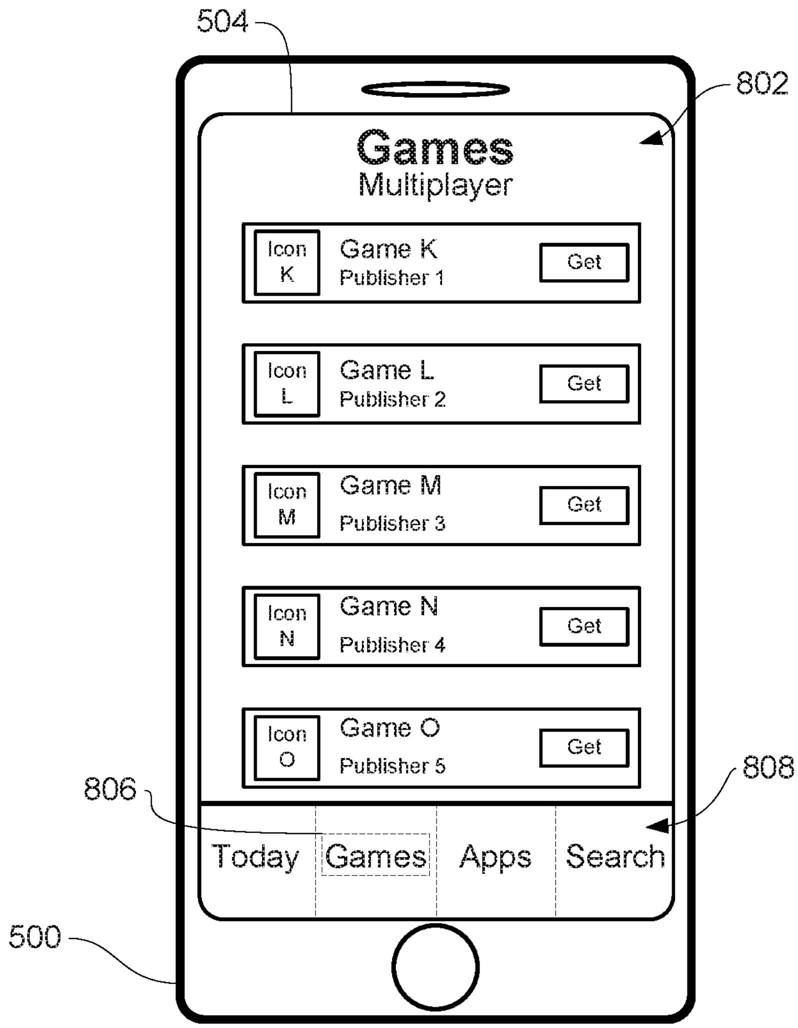

In some embodiments, device 500 first displays suggested games or applications when the user selects the "Games" or "Apps" elements, respectively, in navigation bar 808, but allows the user to scroll through the suggested games or applications to browse games or applications by category. For example, in FIG. 8H, device 500 is displaying suggested games A-E in user interface 802. Games are optionally "suggested games" in accordance with being some of the highest-earning games, most popular paid games, most popular free games, etc. In FIG. 8I, device 500 detects a downward scrolling of user interface 802 (e.g., via an upward swipe of contact 803 detected on touch screen 504), and in response, displays category elements 820 corresponding to different categories of games available for browsing in the app store application. For example, in FIG. 8I, device 500 displays a sports category element 820*a* corresponding to sports games, an adventure category element 820*b* corresponding to adventure games, and a multiplayer category element 820*c* corresponding to multiplayer games. Selection of a category element optionally causes device 500 to display games of the selected category in user interface 802. For example, in FIG. 8J, selection of the multiplayer category element 820*c* is detected, and in response, device 500 displays games K-O in user interface 802 as shown in FIG. 8K. Games K-O are optionally multiplayer games, in correspondence to the selection of multiplayer category element 820*c*.

Device 500 optionally similarly displays category elements for applications available for download to device 500. For example, in FIG. 8L, device 500 is displaying suggested applications F-J in user interface 802. Applications are optionally "suggested applications" in accordance with being some of the highest-earning applications, most popular paid applications, most popular free applications, etc. In FIG. 8M-8N, device 500 detects a downward scrolling of user interface 802 (e.g., via an upward swipe of contact 803 detected on touch screen 504), and in response, displays category elements 820 corresponding to different categories of applications available for browsing in the app store application. For example, in FIG. 8N, device 500 displays a news category element 820*d* corresponding to news applications, a finance category element 820*e* corresponding to finance applications, and a shopping category element 820*f* corresponding to shopping applications. Selection of a category element optionally causes device 500 to display applications of the selected category in user interface 802, analogous to as described with reference to FIGS. 8J-8K.

In some embodiments, device 500 displays one or more videos associated with games or applications concurrently with games or applications, themselves, in user interface 802. These videos optionally play content (e.g., audio, video, images) from one or more games or applications available in the app store application. For example, in FIG. 8O, device 500 is displaying video 844*c* playable (e.g., via selection of element 846*c*) to view content from game C alongside games A-C in user interface 802 when the "Games" element of navigation bar 808 is selected. Similarly, in FIG. 8P, device 500 is displaying video 844*h* playable (e.g., via selection of element 846*h*) to view content from application H alongside applications F-H in user interface 802 when the "Apps" element of navigation bar 808 is selected.

Navigation bar 808 also includes "Search" element that is selectable to facilitate searching of content (e.g., games, applications, etc.) available through the app store application. In FIG. 8Q, selection of the "Search" element of navigation bar 808 is detected, and in response, device 500 replaces applications F-H and video 844*h* in user interface 802 with an app store application search user interface including a search text entry field, as shown in FIG. 8R. In FIG. 8S, device 500 receives a search input in the text entry field (e.g., "programming"), and displays content related to "programming" in user interface 802. This content includes applications K and L, which are optionally applications relating to programming or coding. In some examples, the search results displayed by device 500 are not limited to just games or applications, but also include stories or articles that are relevant to the search term. For example, in FIG. 8S, device 500 is also displaying search result 822 in response to the "programming" search term, which corresponds to an article relevant to "programming" (e.g., "How to code Apps"). Search result 822 optionally has one or more characteristics of card 610*g* described with reference to FIG. 6HHH. In FIG. 8T, selection of search result 822 is detected, and in response, device 500 displays the "How to code Apps" article 826 corresponding to search result 822, as shown in FIG. 8U. This article 826 optionally includes information about, and links to purchase/download, one or more applications relevant to coding apps, as described with reference to FIGS. 6HHH-6JJJ.

The app store application running on device 500 optionally also displays product pages corresponding to applications or games, the product pages being displayed by device 500 in response to selection of a given application or game. For example, in FIG. 8V, device 500 is displaying applications F-J while the "Apps" element in navigation bar 808 is selected. In FIG. 8W, selection of application H is detected (e.g., via a tap of contact 803 detected in an area corresponding to application H other than the purchase/download affordance for application H or the icon for application H), and in response, device 500 displays the product page for application H, as shown in FIG. 8X. This product page in FIG. 8X optionally corresponds to the product pages described with reference to FIGS. 6M, 6P, 6R and/or 6Z. The product page in FIG. 8X includes the icon, name, publisher and purchase/download affordance 832 for application H, images 834 for application H, a description 836 for application H, and reviews 838 for application H, though the product page optionally includes additional or alternative information for application H as well or instead. For example, in some embodiments, if a ranking of a game or application is within a certain threshold (e.g., ranked within the top 10, 20 or 30 games or applications), the product page for that game or application includes information about such ranking, but if the ranking is not within the threshold, the product page for that game or application does not include the information about such ranking. For example, in FIG. 8Y, application H is optionally within the top 10 for coding applications, and as a result, device 500 displays information 833 about the ranking of application H in the product page for application H.

As previously mentioned, the product page for application H also includes a purchase/download affordance for purchasing/downloading application H to device 500. For example, in FIG. 8Z, application H is a free application (e.g., the download affordance for application H indicates no price, and instead indicates "Get"). In FIG. 8Z, selection of the download affordance for application H in the product page of application H is detected, and in response, device 500 displays download confirmation overlay 818 over the product page for application H, as shown in FIG. 8AA, from which confirmation or cancellation of the download request is detectable, and in response to which application H is or is not downloaded to device 500, respectively. As another example, in FIG. 8BB, application H is a paid application (e.g., the download affordance for application H indicates a price of $1.99). In FIG. 8CC, selection of the download affordance for application H in the product page of application H is detected, and in response, device 500 displays purchase confirmation/authentication overlay 819 over the product page for application H, as shown in FIG. 8DD, from which the purchase/payment is authorized or canceled, and in response to which application H is or is not downloaded to device 500, respectively.

In some embodiments, the product page for application H is scrollable to reveal additional information related to application H in user interface 802. For example, in FIG. 8EE-8FF, a downward scroll of the product page is detected (e.g., via an upward swipe of contact 803 on touch screen 504). In response, device 500 scrolls through the product page for application H in accordance with the detected scroll input, revealing, as shown in FIG. 8FF, an in-app purchase element 854 for application H (e.g., "Feature 1 Pack") from which the user is able to purchase the in-app purchase (e.g., via selection of the purchase/download affordance for the in-app purchase). Further scrolling through the product page for application H reveals an additional in-app purchase element 854 for application H (e.g., "Feature 2 Pack"), as well as a link to an article (e.g., "How to code Apps") 856 in which application H is mentioned, as shown in FIG. 8GG. Additional details about purchasing in-app purchases from the app store application are described with reference to FIGS. 10A-10V and 12A-12MM, and methods 1100 and 1300.

Not only does scrolling through the product page for application H reveal additional information relevant to application H in the product page, it optionally also causes device 500 to change the display of the icon, name and/or purchase/download affordance for application H. For example, in FIG. 8EE, the icon, name and purchase/download affordance for application H are displayed at a location 832 in the product page for application H, as part of the product page for application H. However, if scroll input through the product page is detected that will cause location 832 to become hidden (e.g., such that the icon, name and/or purchase/download affordance for application H become not visible on touch screen 504), device 500 will display the icon, name and/or purchase/download affordance for application H as an overlay over the product page, such that the icon, name and/or purchase/download affordance remain visible and displayed at a fixed location in response to further scrolling through the product page. For example, in FIG. 8FF, scrolling that hides location 832 of the product page is detected, and in response, device 500 displays overlay 852 over the product page at a fixed location (e.g., at the top of touch screen 504), where overlay 852 includes the icon, name and/or purchase/download affordance for application H. In FIG. 8GG, further downward scrolling through the product page is detected, and device 500 continues to display overlay 852 at the same fixed location on touch screen 504. The purchase/download affordance for application H in overlay 852 remains selectable to initiate a process to purchase/download application H (e.g., as described with reference to FIGS. 8Z-8DD), such as by a tap of contact 803*a* (illustrated in FIG. 8GG) detected on the purchase/download affordance in overlay 852.

While overlay 852 is described above as being displayed in response to a scrolling input that scrolls the purchase/download affordance for an application off of touch screen 504, overlay 852 is optionally displayed in other contexts as well (e.g., in response to scrolling past other locations in the user interface). For example, selection of an article card or any other card that corresponds to one or more applications/games (e.g., as described with reference to FIG. 6III) optionally results in the display of an expanded card that corresponds to those one or more applications (e.g., as described with reference to FIG. 6JJJ). In some embodiments, the expanded card is initially displayed with a graphic corresponding to the one or more applications at the top of the expanded card, and other content corresponding to the one or more applications below the graphic in the expanded card (e.g., an article related to the one or more applications, descriptions of the one or more applications, etc.). Optionally, no purchase/download affordance for the one or more applications is displayed in the expanded card at this point.

In some embodiments, user input that scrolls past the top graphic in the expanded card (e.g., an upward swipe that scrolls the top graphic off the top of expanded card) causes device 500 to display an overlay 852 at a particular location over the expanded card, the overlay including one or more of the icon, name and/or purchase/download affordance for at least one of the one or more applications associated with the expanded card. The content of the expanded card (e.g., what is displayed in the expanded card underneath or below overlay 852) optionally continues to not include the icon, name and/or purchase/download affordance for the one or more applications. Overlay 852 optionally remains fixed over the particular location in the expanded card as the user continues to scroll through the expanded card, unless the user provides input to scroll the top graphic back into view in the expanded card, at which point device 500 optionally ceases to display overlay 852 over the expanded card. Device 500 optionally displays overlay 852 over any location of the expanded card, such as the top of the expanded card, the bottom of the expanded card, etc. In this way, device 500 is able to provide the icon, name and/or purchase/download affordance for an application to the user, without such icon, name and/or purchase/download affordance occupying space in the actual content of the expanded card. In some embodiments, if the expanded card does, at a particular location in its content, include a purchase/download affordance for an application (e.g., the same application displayed in the overlay), device 500 optionally hides the overlay when that particular location in the expanded card is reached via a scrolling input (e.g., when that particular location becomes displayed in the expanded card), and redisplays the overlay when that particular location in the expanded card is scrolled out of view in the expanded card.

In some embodiments, the purchase/download affordance displayed in an overlay over a non-product page user interface (e.g., an expanded article card) is displayed with a different visual characteristic than a purchase/download affordance displayed in an overlay over a product page user interface. For example, the purchase/download affordance displayed over a non-product page is optionally less emphasized (e.g., is more translucent and/or has less intense color) than the purchase/download affordance displayed over a product page (e.g., is more opaque and/or has more intense color), based on an assumption that a user viewing a product page is likely more interested in purchasing/downloading an application than a user that is viewing a non-product page. The above-described manner of displaying the icon, name and/or purchase/download affordance for an application as an overlay over a user interface in response to a scrolling input that scrolls past a trigger location in the user interface is optionally applicable to any of the user interfaces, and to any trigger location, described herein.

As mentioned above, the product page for application H includes a link 856 to an article in which application H is included or mentioned (e.g., "How to code Apps"), such as shown in FIG. 8GG. In FIG. 8HH, selection of the link to view the "How to code Apps" article is detected, and in response, device 500 displays the "How to code Apps" article in which application H is included or mentioned, as shown in FIG. 8II. The details of the "How to code Apps" article are optionally as described with reference to FIG. 8U.

In some embodiments, the order in which different informational entries about a game or application that are included in the product page for that game or application differs depending on whether that game or application is downloaded to device 500, such that device 500 displays information more likely to be relevant to the user higher up in the product page depending on whether that game or application is downloaded to device 500 (e.g., if the user has already downloaded the game or application, the user is optionally more interested in seeing information about in-app purchases for the game or application than if the user has not yet downloaded the game or application). For example, in accordance with what was previously described, the product page for application H optionally includes information such as: images from application H, a description of application H, rating information for application H, in-app purchase information for application H and/or links to articles in which application H is mentioned. In FIG. 8JJ, application H is not already downloaded to device 500 (e.g., purchase/download affordance 835 indicates "Get"), and the product page displays the above information for application H in the following order: images, description, ratings, in-app purchase and articles (e.g., as was illustrated in FIGS. 8EE-8GG). In contrast, in FIG. 8KK, application H is downloaded to device 500 (e.g., purchase/download affordance 835 indicates "Open"), and the product page displays the above information for application H in the following order: in-app purchases, images, description, articles and ratings (e.g., in accordance with what is shown in FIGS. 8KK-8LL).

FIGS. 9A-9J are flow diagrams illustrating a method 900 of facilitating browsing of applications and games by category in accordance with some embodiments of the disclosure. The method 900 is optionally performed at an electronic device such as device 100, device 300, or device 500 as described above with reference to FIGS. 1A-1B, 2-3, 4A-4B and 5A-5H. Some operations in method 900 are, optionally, combined and/or the order of some operations is, optionally, changed.

As described below, the method 900 provides ways to facilitate browsing of applications and games by category. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) in communication with a display (e.g., a television, a display of the electronic device, a touch screen of the electronic device, such as touch screen 504) and one or more input devices (e.g., a touch screen of the electronic device, such as touch screen 504, a remote control of the set-top box), displays (902), on the display, an application browsing user interface (e.g., a user interface of an app store application from which a user is able to browse, purchase and/or download applications to the electronic device) that includes a navigation user interface element, such as in FIG. 8A (e.g., a navigation bar along an edge of the application browsing user interface, such as along the bottom edge of the application browsing user interface). The navigation user interface element optionally includes a games indicator corresponding to a plurality of games available for download to the electronic device (904), such as in FIG. 8A (e.g., the navigation bar includes a selectable button for browsing games that are downloadable to the electronic device) and an apps indicator corresponding to a plurality of applications, other than games, available for download to the electronic device (906), such as in FIG. 8A (e.g., the navigation bar also includes a selectable button for browsing non-game applications that are downloadable to the electronic device).

While the games indicator is currently selected, the electronic device concurrently displays (908), in the application browsing user interface, the navigation user interface element (910) and a first plurality of user interface elements corresponding to the plurality of games available for download to the electronic device (912), such as in FIG. 8A (e.g., cards, boxes, or other user interface elements that include one or more images, one or more videos, text and/or other content, each user interface element including content, such as images, text and/or videos, about a game that can be downloaded to the electronic device, and/or a selectable link for downloading the game to the electronic device). A first respective user interface element of the first plurality of user interface elements is optionally selectable to initiate a process to download a first game of the plurality of games to the electronic device (e.g., at least one user interface element is displayed that includes a selectable button, selection of which initiates a process for downloading the first game to the electronic device), such as in FIGS. 8B-8C.

While displaying the first plurality of user interface elements corresponding to the plurality of games available for download to the electronic device, the electronic device receives (914), via the one or more input devices, an input corresponding to selection of the apps indicator, such as in FIG. 8D (e.g., a tap on the apps indicator, a click input detected on a remote control while the apps indicator has a current focus in the user interface). In some embodiments, in response to receiving the input corresponding to the selection of the apps indicator, the electronic device updates (916) the application browsing user interface by maintaining the display of the navigation user interface element in the application browsing user interface (918) and replacing the first plurality of user interface elements corresponding to the plurality of games available for download to the electronic device with a second plurality of user interface elements corresponding to the plurality of applications, other than games, available for download to the electronic device (920), such as in FIG. 8E (e.g., cards, boxes, or other user interface elements that include one or more images, one or more videos, text and/or other content, each user interface element including content, such as images, text and/or videos, about a non-game application that can be downloaded to the electronic device, and/or a selectable link for downloading the non-game application to the electronic device). A second respective user interface element of the second plurality of user interface elements is optionally selectable to initiate a process to download a first application of the plurality of applications to the electronic device, such as in FIGS. 8F-8G. For example, at least one user interface element is displayed that includes a selectable button, selection of which initiates a process for downloading the first application to the electronic device (e.g., displaying a purchase/download confirmation dialog that includes instructions for purchasing/downloading the application, or downloading the application).

The above-described manner of allowing a user to switch from browsing non-game applications to browsing games while maintaining the presentation of the navigation bar in the user interface, allows the electronic device to provide consistent presentation of information to the user and maintain consistent interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the first plurality of user interface elements corresponding to the plurality of games available for download to the electronic device is a plurality of user interface elements corresponding to a plurality of suggested games available for download to the electronic device (922), such as in FIG. 8H (e.g., highest-earning games, most popular paid games, most popular free games, etc.). While displaying the plurality of user interface elements corresponding to the plurality of suggested games, the electronic device receives (924), via the one or more input devices, a navigation input corresponding to a request to scroll through the plurality of user interface elements corresponding to the plurality of suggested games, such as in FIGS. 8H-8I (e.g., a swipe input detected on a touch-sensitive surface of the one or more input devices for causing a current focus to move from one of the user interface elements to another of the user interface elements in accordance with the magnitude and/or direction of the swipe input, or in the case of an implementation without a current focus, a swipe input detected on the touch-sensitive surface/touch screen for causing the displayed plurality of user interface elements to scroll in accordance with the magnitude and/or direction of the swipe input). In some embodiments, in response to receiving the navigation input, the electronic device scrolls (926) through the plurality of user interface elements corresponding to the plurality of suggested games to reveal, in the application browsing user interface, a plurality of game-category user interface elements corresponding to categories of games of suggested games, such as in FIG. 8I (e.g., a user interface element corresponding to action games, a user interface element corresponding to sports games, a user interface element corresponding to multiplayer games, a user interface element corresponding to strategy games, etc.).

In some embodiments, prior to receiving the navigation input, the plurality of user interface elements corresponding to the plurality of suggested games was displayed without displaying the game-category user interface elements, such as in FIG. 8H. In some embodiments, the user interface elements corresponding to the categories of suggested games are displayed with the same spatial layout in the application browsing user interface as the user interface elements corresponding to the suggested games (e.g., as visual blocks in rows of visual blocks). The above-described manner of initially displaying suggested games followed by displaying categories of games in response to user input to scroll through the initial suggested games allows the electronic device to initially present games that are likely to be of interest to a user, but allow the user to explore additional games if desired, which enhances the operability of the device and makes the user-device interface more efficient (e.g., by reducing the number of user inputs needed to interact with the electronic device in browsing games), which, additionally, reduces power usage and improves battery life of the device by enabling the user to use the device more quickly and efficiently.

Figure 8L:
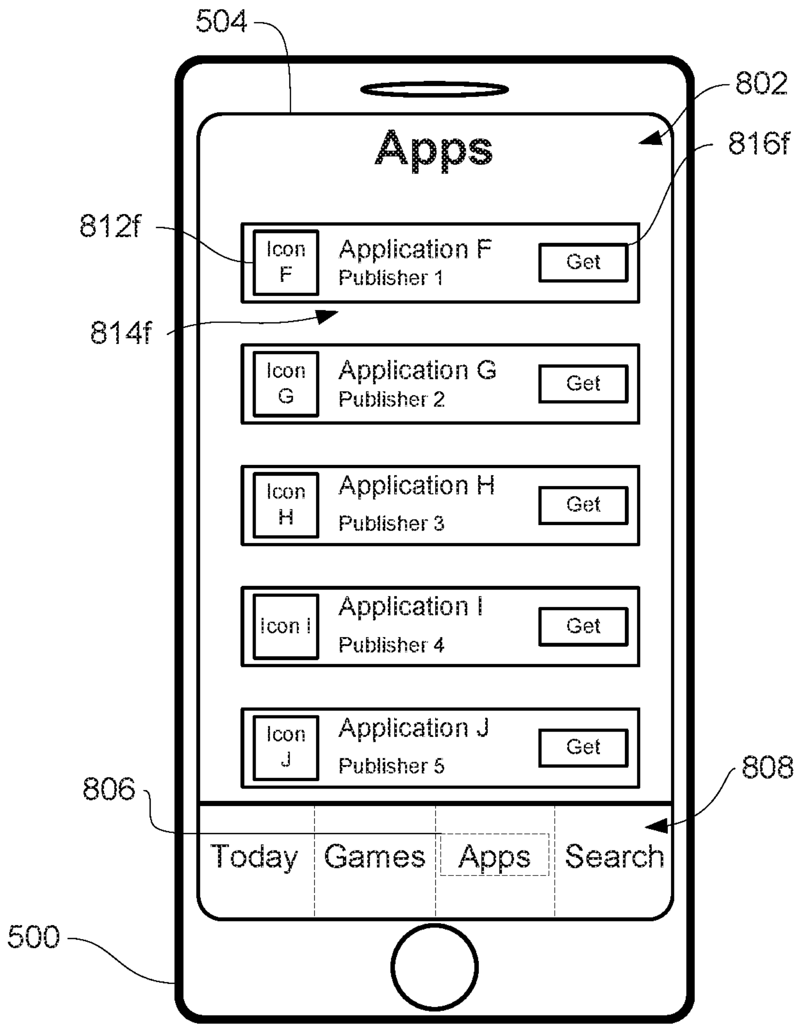
Figure 8M:
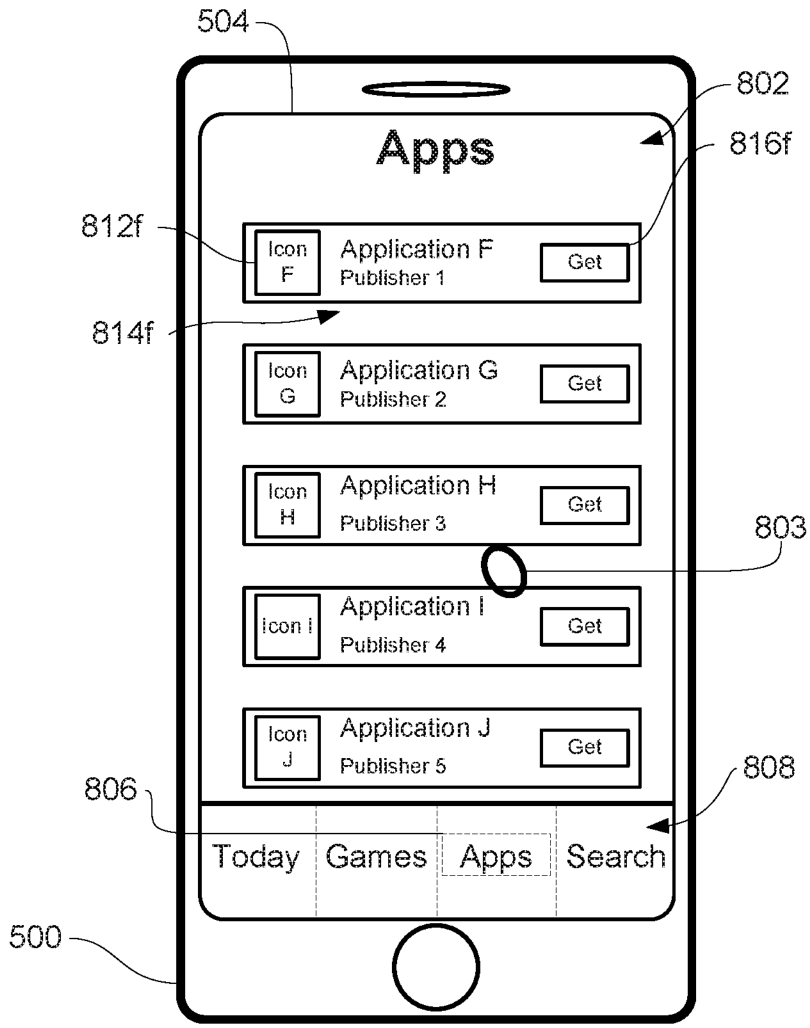
Figure 8N:
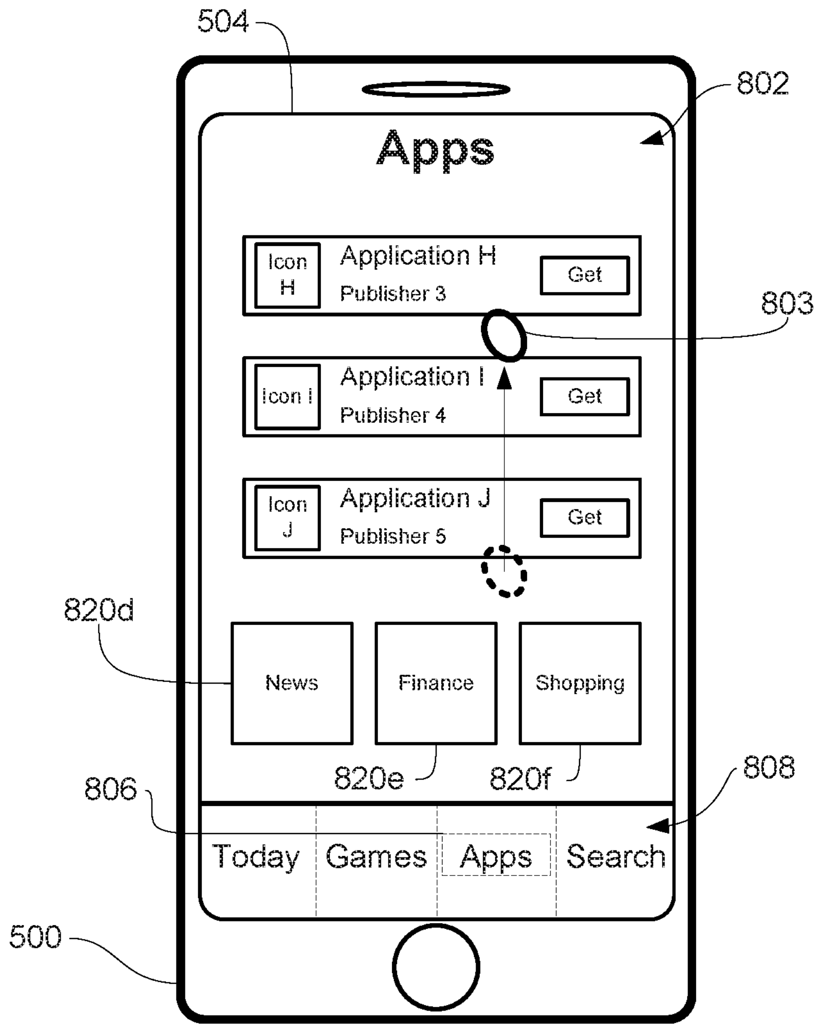

In some embodiments, the second plurality of user interface elements corresponding to the plurality of applications, other than games, available for download to the electronic device is a plurality of user interface elements corresponding to a plurality of suggested applications, other than games, available for download to the electronic device (928), such as in FIG. 8L (e.g., highest-earning applications, most popular paid applications, most popular free applications, etc.). While displaying the plurality of user interface elements corresponding to the plurality of suggested applications, the electronic device receives (930), via the one or more input devices, a navigation input corresponding to a request to scroll through the plurality of user interface elements corresponding to the plurality of suggested applications, such as in FIGS. 8M-8N (e.g., a swipe input detected on a touch-sensitive surface of the one or more input devices for causing a current focus to move from one of the user interface elements to another of the user interface elements in accordance with the magnitude and/or direction of the swipe input, or in the case of an implementation without a current focus, a swipe input detected on the touch-sensitive surface/touch screen for causing the displayed plurality of user interface elements to scroll in accordance with the magnitude and/or direction of the swipe input). In some embodiments, in response to receiving the navigation input, the electronic device scrolls (932) through the plurality of user interface elements corresponding to the plurality of suggested applications to reveal, in the application browsing user interface, a plurality of application-category user interface elements corresponding to categories of applications of suggested applications, such as in FIG. 8N (e.g., a user interface element corresponding to news applications, a user interface element corresponding to sports applications, a user interface element corresponding to productivity applications, a user interface element corresponding to financial applications, etc.).

In some embodiments, prior to receiving the navigation input, the plurality of user interface elements corresponding to the plurality of suggested applications was displayed without displaying the application-category user interface elements, such as in FIG. 8M. In some embodiments, the user interface elements corresponding to the categories of suggested applications are displayed with the same spatial layout in the application browsing user interface as the user interface elements corresponding to the suggested applications (e.g., as visual blocks in rows of visual blocks). The above-described manner of initially displaying suggested applications followed by displaying categories of applications in response to user input to scroll through the initial suggested applications allows the electronic device to initially present applications that are likely to be of interest to a user, but allow the user to explore additional applications if desired, which enhances the operability of the device and makes the user-device interface more efficient (e.g., by reducing the number of user inputs needed to interact with the electronic device in browsing applications), which, additionally, reduces power usage and improves battery life of the device by enabling the user to use the device more quickly and efficiently.

Figure 8O:
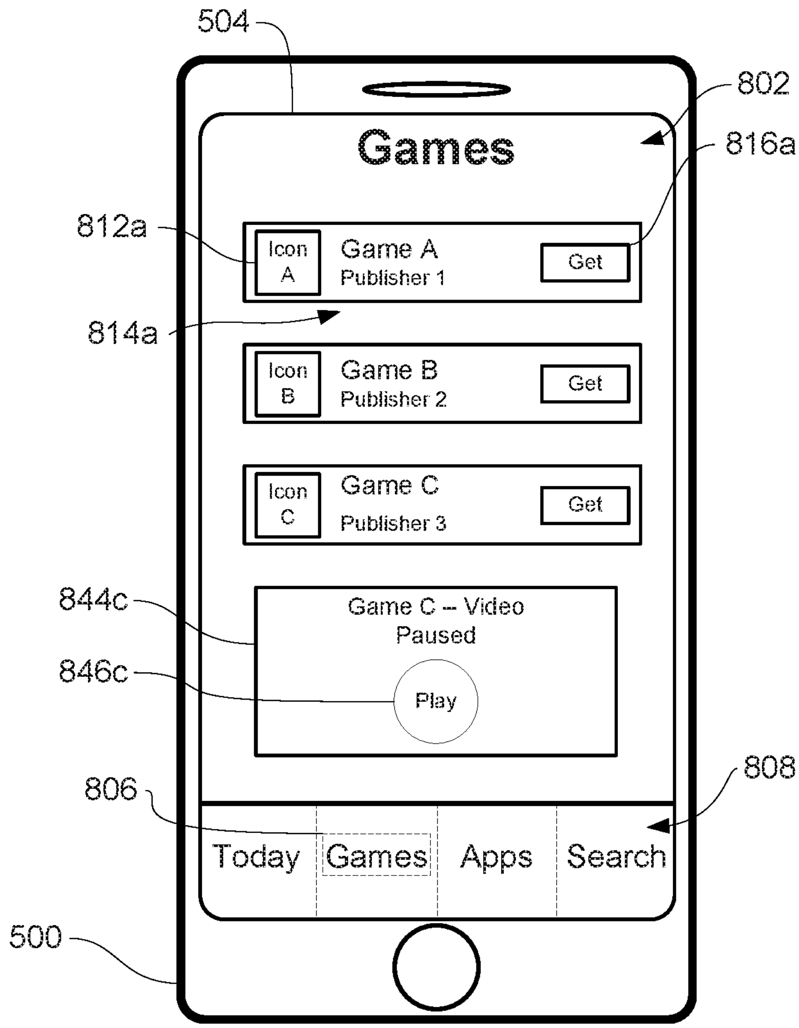
Figure 8P:
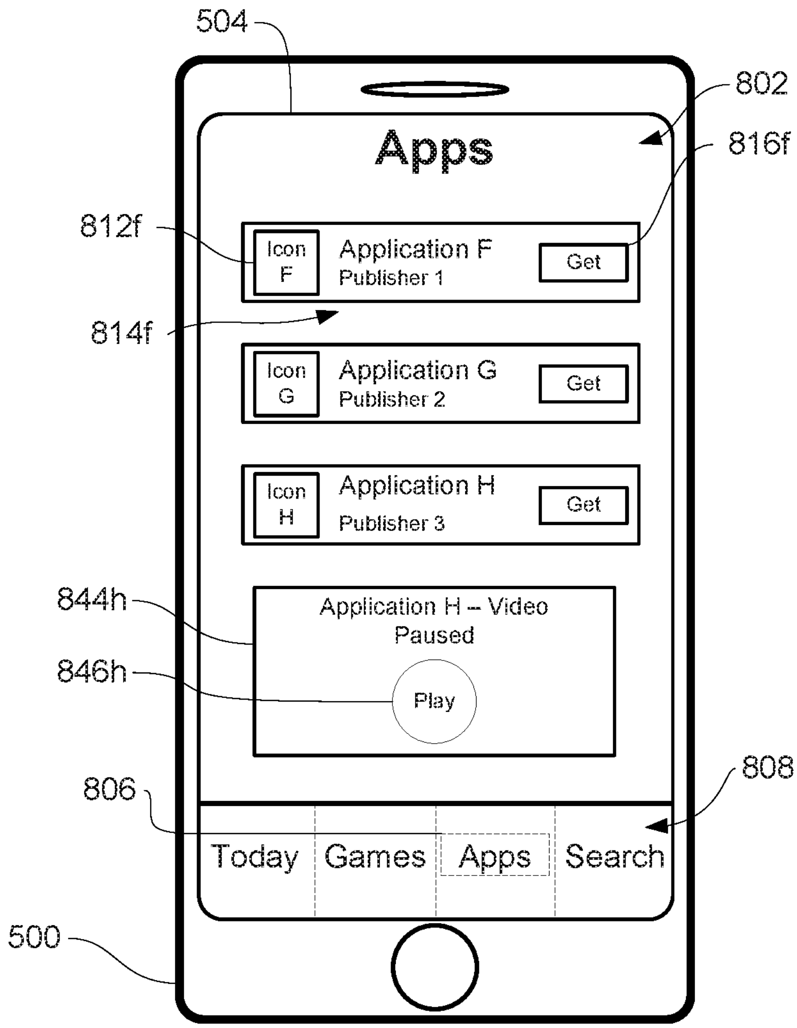
Figure 8Q:
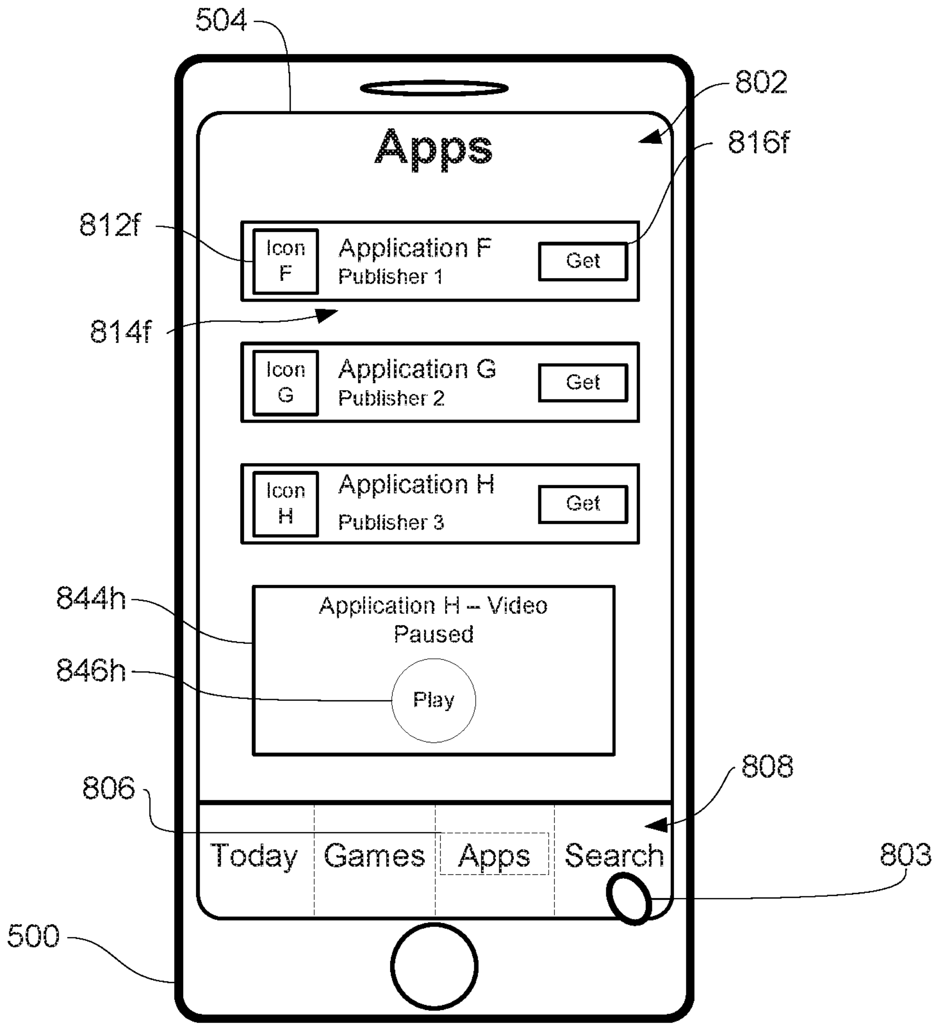
Figure 8R:
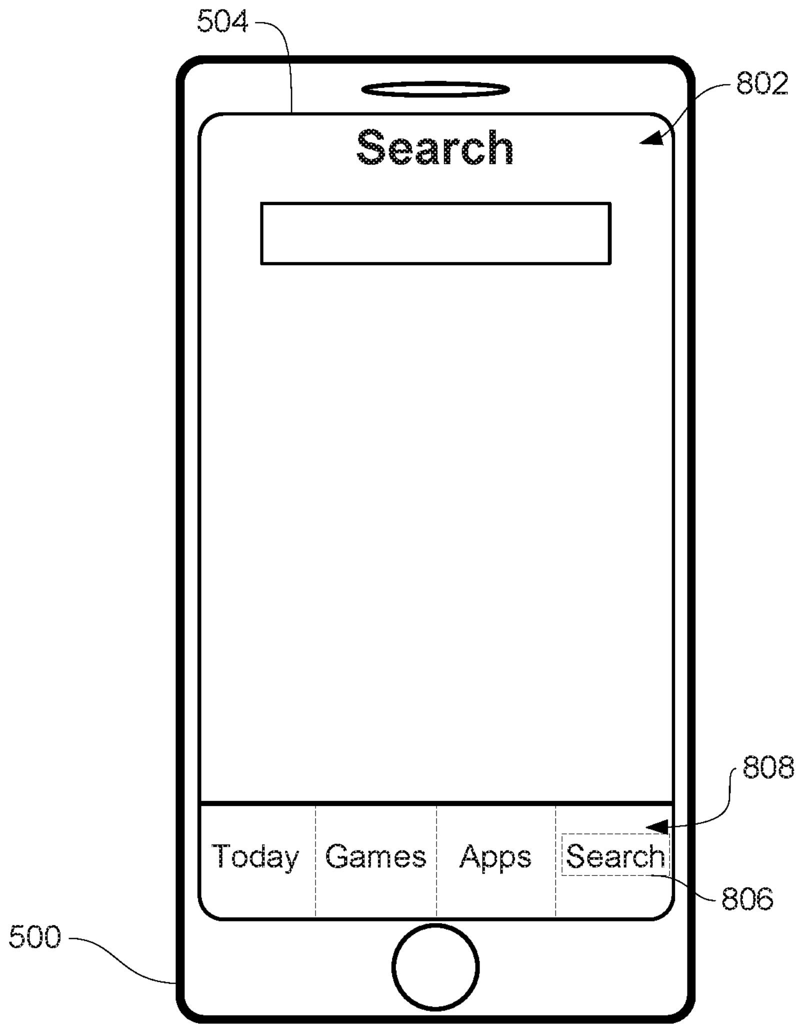
Figure 8S:
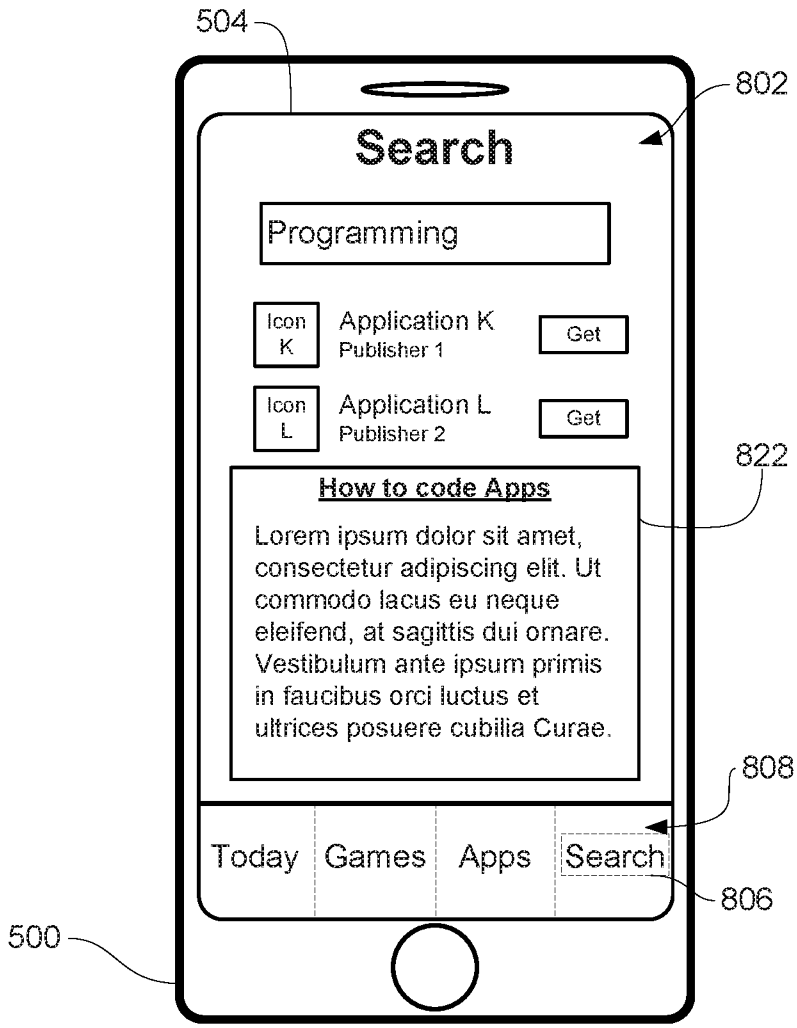
Figure 8T:
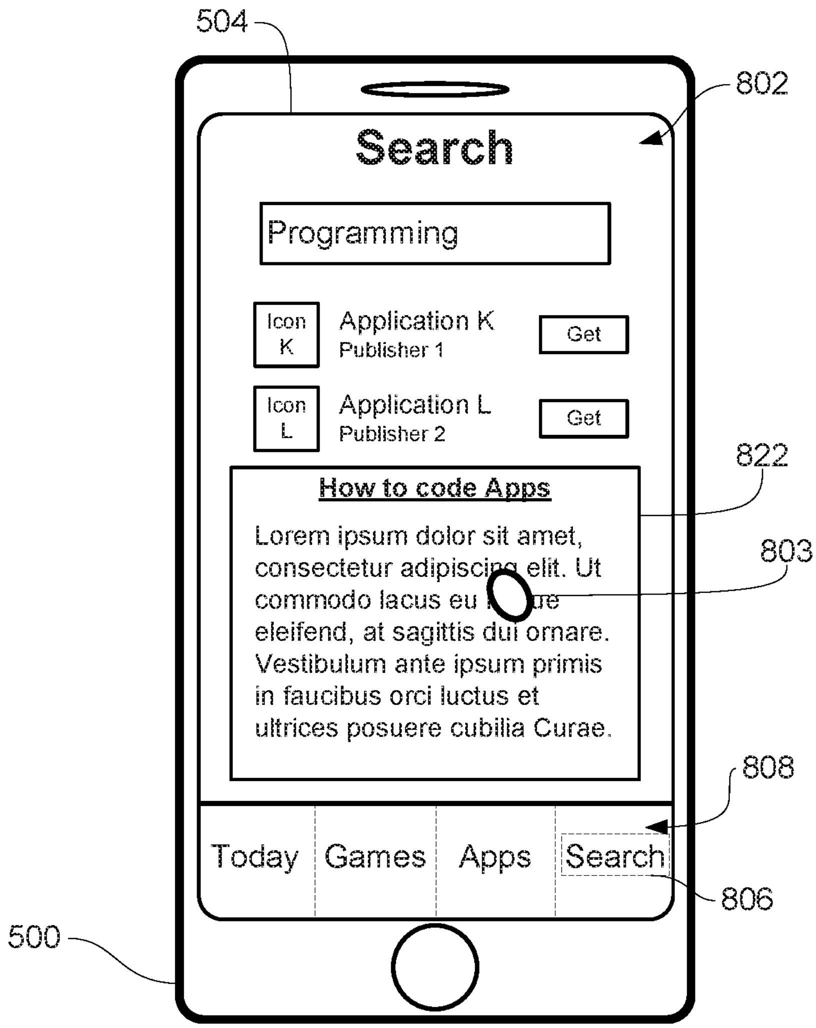
Figure 8U:
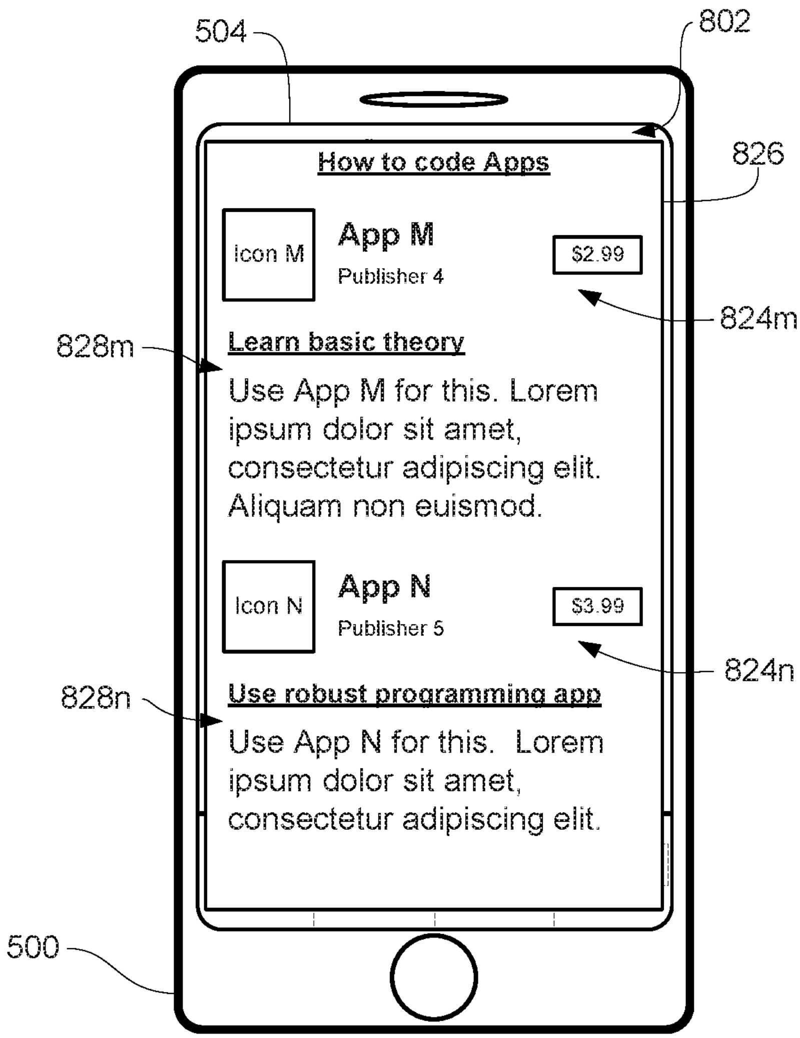
Figure 8V:
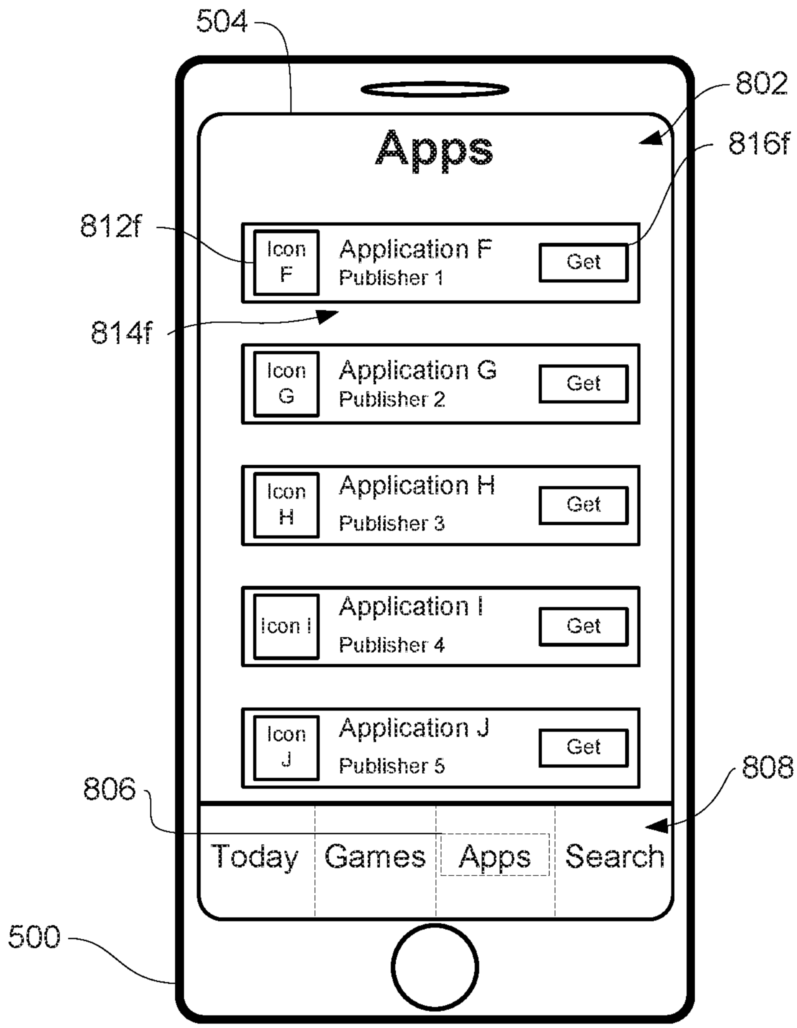
Figure 8W:
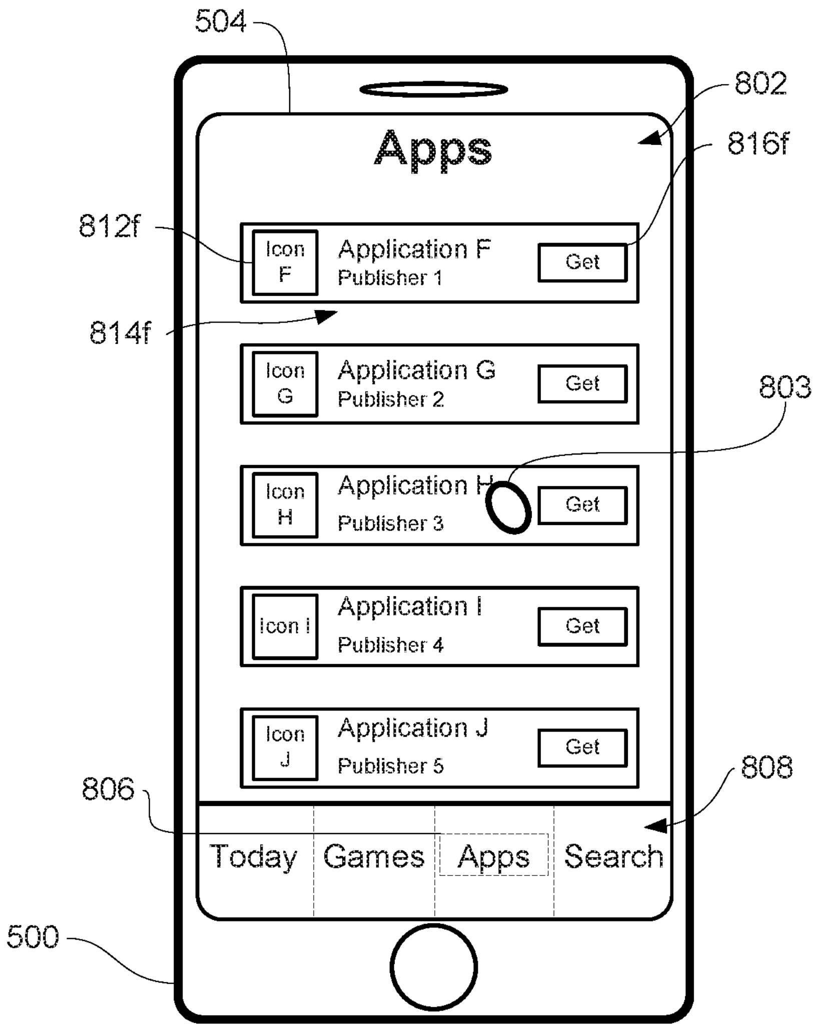
Figure 8X:
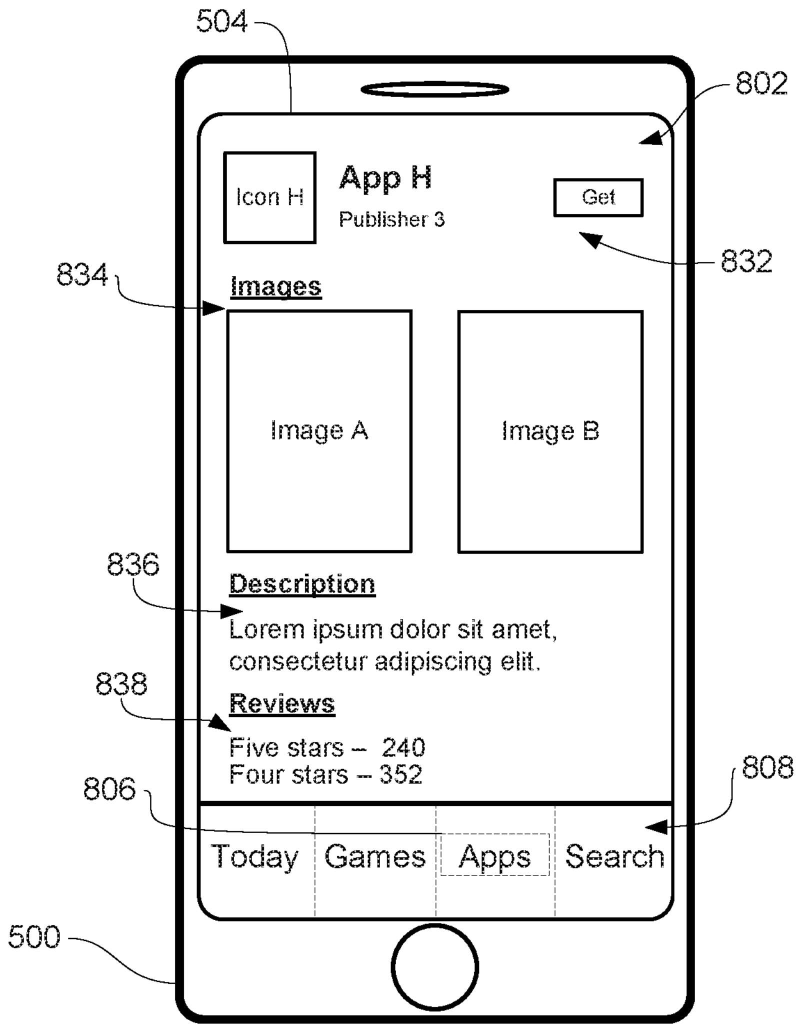

In some embodiments, while the games indicator is currently selected, the electronic device concurrently displays (934), in the application browsing user interface the navigation user interface element (936), the first plurality of user interface elements corresponding to the plurality of games available for download to the electronic device (938), and a video including content from a respective game available for download to the electronic device (940), such as in FIG. 8O. For example, one or more videos that play content (e.g., audio, video, images, etc.) from given games are displayed alongside other games-related user interface elements when the games indicator in the navigation bar is selected. In some embodiments, while the apps indicator is currently selected, the electronic device concurrently displays (942), in the application browsing user interface the navigation user interface element (944), the second plurality of user interface elements corresponding to the plurality of applications, other than games, available for download to the electronic device (946), and a video including content from a respective application, other than a game, available for download to the electronic device (948) (e.g., one or more videos that play content, such as in FIG. 8P (e.g., audio, video, images, etc.) from given applications are displayed alongside other application-related user interface elements when the apps indicator in the navigation bar is selected). The above-described manner of displaying videos of games/applications alongside other game/application user interface elements allows the electronic device to increase the amount of content from games/applications displayed to the user while browsing games/applications, which enhances the operability of the device and makes the user-device interface more efficient (e.g., by reducing the number of user inputs needed to interact with the electronic device in browsing and learning about games/applications), which, additionally, reduces power usage and improves battery life of the device by enabling the user to use the device more quickly and efficiently.

In some embodiments, the navigation user interface element includes a search indicator for searching content available for download to the electronic device (950), such as in FIG. 8Q (e.g., the navigation bar also includes a selectable button for searching games and non-game applications that are downloadable to the electronic device). In some embodiments, the electronic device receives (952), via the one or more input devices, a sequence of one or more inputs corresponding to selection of the search indicator and a search input, such as in FIGS. 8Q-8S (e.g., a tap selecting the search indicator in the navigation bar, followed by inputting one or more search terms into a search text entry field displayed in a search page displayed in response to selection of the search indicator in the navigation bar via spoken input or selection of keys on a physical or virtual keyboard). In response to receiving the search input, the electronic device optionally displays (954), in the application browsing user interface, a search result corresponding to an article relevant to the search input, such as in FIG. 8S (e.g., searching via the search page searches games and non-game applications that are downloadable to the electronic device based on a search term.). In some embodiments, the search displays games and non-game applications as search results—the search results optionally include at least one search result that is for an article related to the search term and one or more games and non-game applications downloadable to the electronic device, where selection of the article search result optionally displays a page with that article, and one or more links for downloading one or more games or non-game applications related to the article to the electronic device, such as in FIGS. 8T-8U (e.g., as described in greater detail above with reference to method 700). The above-described manner of displaying articles as search results alongside games and non-game applications as search results allows the electronic device to present additional potentially relevant information to a user of the electronic device when the user is searching for games or non-game applications, which enhances the operability of the device and makes the user-device interface more efficient (e.g., by facilitating more immediate presentation of information relevant to the search), which, additionally, reduces power usage and improves battery life of the device by enabling the user to use the device more quickly and efficiently.

In some embodiments, the electronic device receives (956), via the one or more input devices, an input corresponding to selection of a respective user interface element of the first plurality of user interface elements corresponding to the plurality of games or the second plurality of user interface elements corresponding to the plurality of applications, other than games, such as in FIG. 8W. In some embodiments, the respective user interface element corresponds to a respective game or application (e.g., a tap of a game user interface element displayed while the games indicator is currently selected, or a tap of a non-game user interface element displayed while the apps indicator is currently selected). In response to receiving the input corresponding to the selection of the respective user interface element, the electronic device optionally displays (958), in the application browsing user interface, a product page corresponding to the respective game or application, such as in FIG. 8X. The product page optionally includes information about the respective game or application and one or more links to one or more articles in which the respective game or application is included, such as in FIGS. 8X-8HH (e.g., selection of a game or non-game user interface element causes the electronic device to display a dedicated product page for that game or non-game application.). The product page for game or non-game application optionally includes the icon for the application, a title for the application, a button to purchase/download the application, user reviews of the application, images from the application, etc., such as in FIGS. 8X-8HH. In some embodiments, the application is included in or mentioned in one or more articles accessible from the application browsing user interface (e.g., top 10 lists, "how to" articles, etc.—as described in greater detail above with reference to method 700)—in such embodiments, the product page for the application optionally also includes one or more links to such articles in which the application is mentioned, selection of such links causing those articles to be displayed by the electronic device. The above-described manner of including links to articles in which an application was mentioned on the product page of the application allows the electronic device to provide the user with quick and efficient access to such articles, which enhances the operability of the device and makes the user-device interface more efficient (e.g., by reducing the number of user inputs required for a user to find such articles), which, additionally, reduces power usage and improves battery life of the device by enabling the user to use the device more quickly and efficiently.

In some embodiments, the product page corresponding to the respective game or application further includes a respective user interface element associated with obtaining authorization to access a respective feature of the respective game or application (960), such as in FIG. 8GG (e.g., the respective user interface element is for an in-app purchase for the game or application.). For example, the electronic device optionally has authorization to access a first set of features of the game or application and does not have authorization to access a second set of features of the game or application, and the respective feature is optionally in the second set of features. The respective user interface element optionally includes information indicating that it is for purchasing access to the respective feature (e.g., as described in greater detail above with reference to methods 1100 and 1300). The above-described manner of including a user interface element for obtaining access to an in-app purchase on the product page of a game or application allows the electronic device to provide the user with quick and efficient access to such in-app purchases, which enhances the operability of the device and makes the user-device interface more efficient (e.g., by reducing the number of user inputs required for a user to complete such in-app purchases), which, additionally, reduces power usage and improves battery life of the device by enabling the user to use the device more quickly and efficiently.

Figure 8Y:
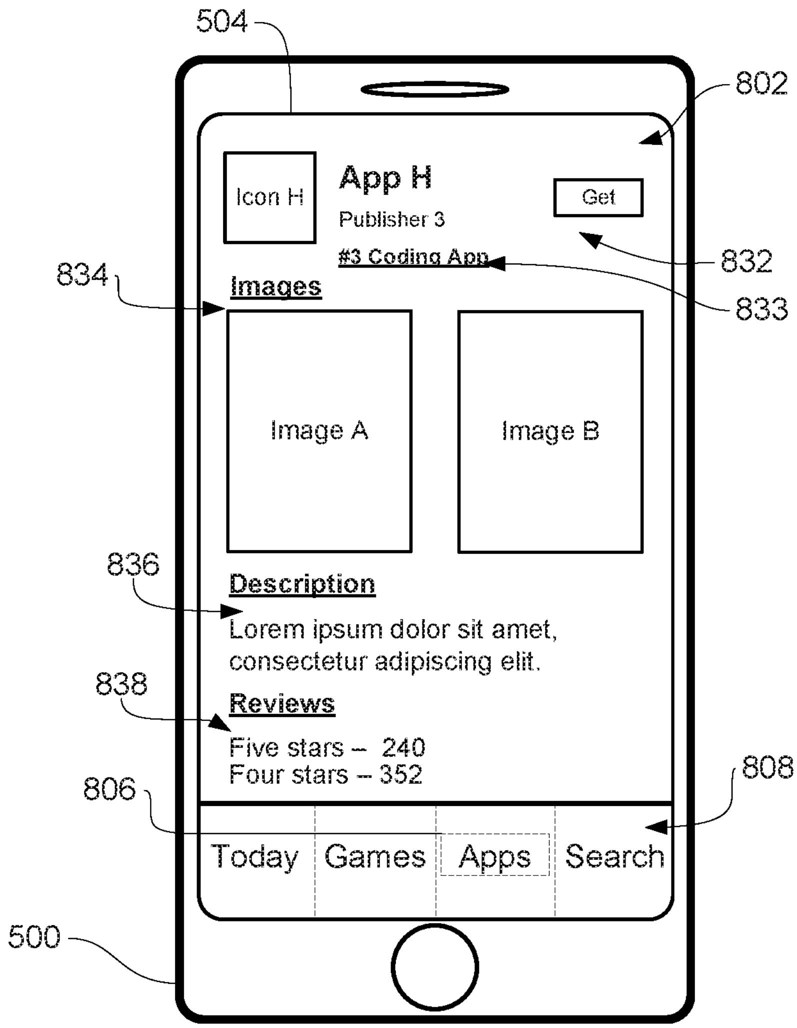
Figure 8Z:
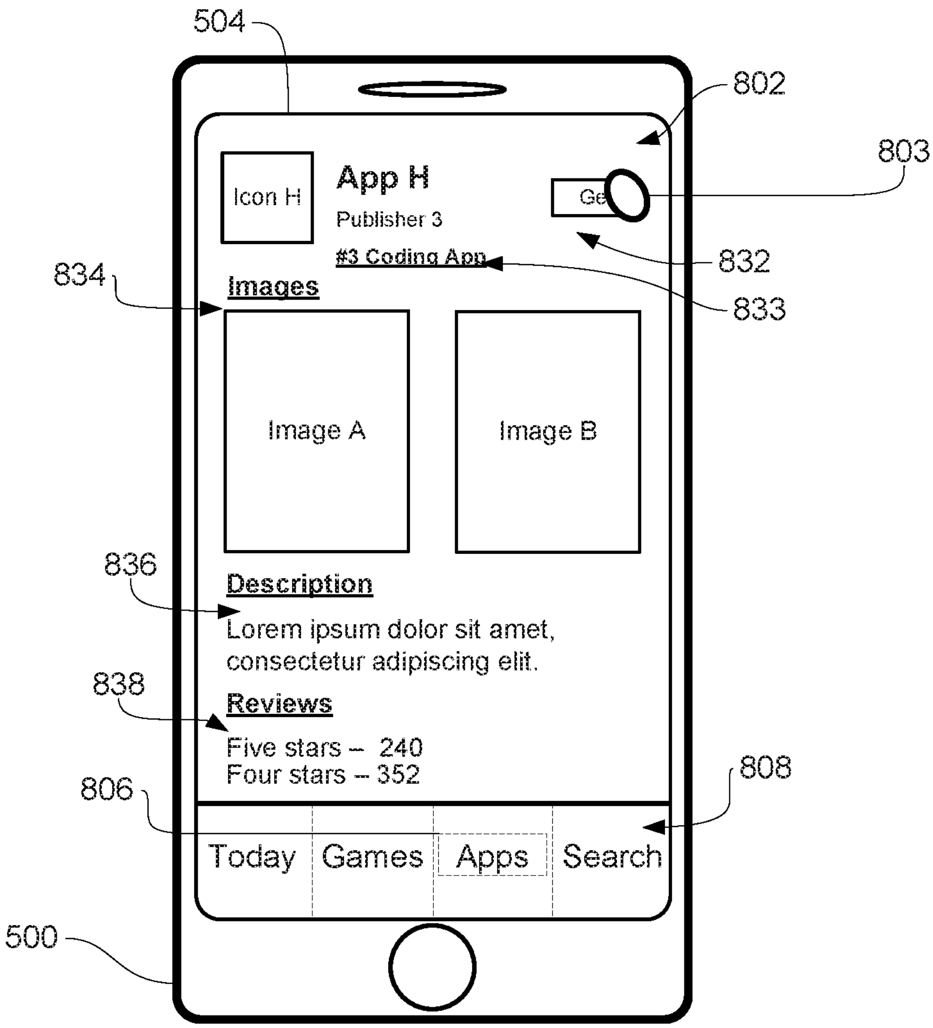
Figure 8A:
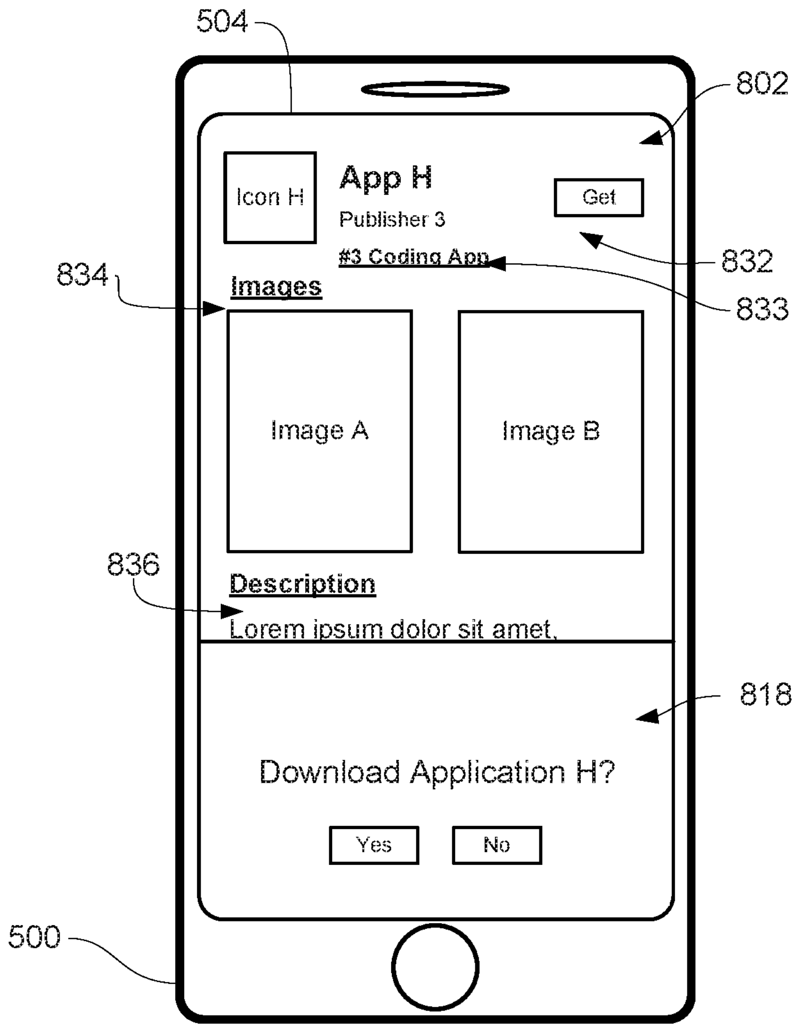
Figure 8B:
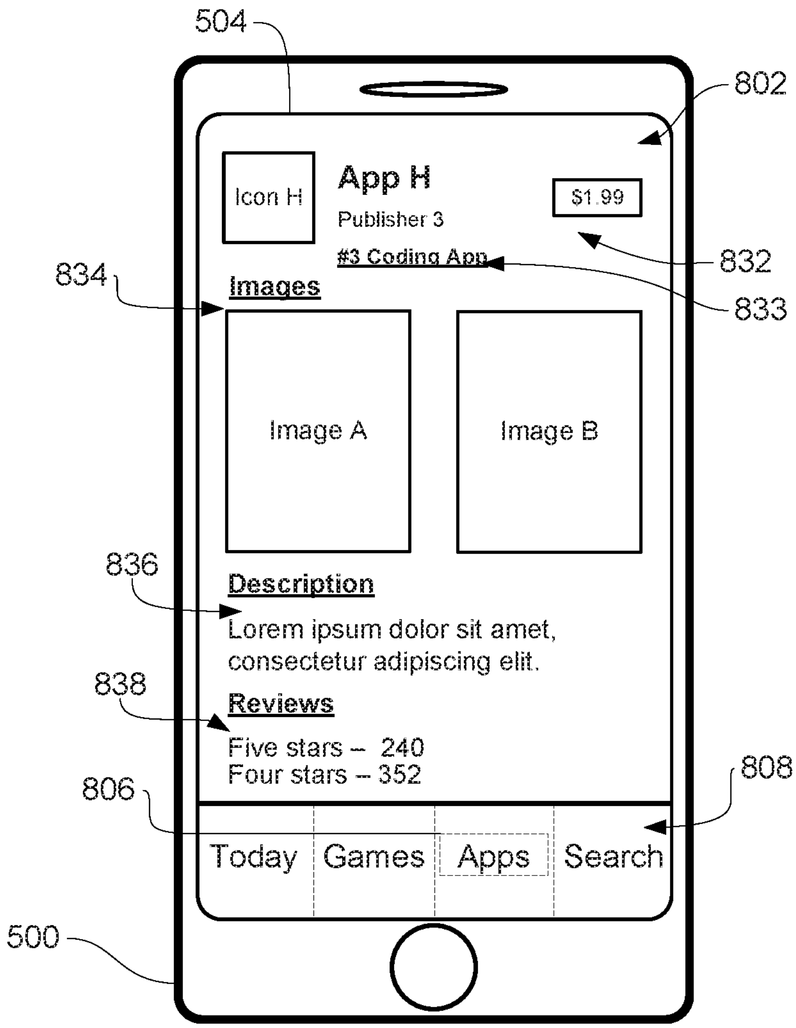
Figure 8C:
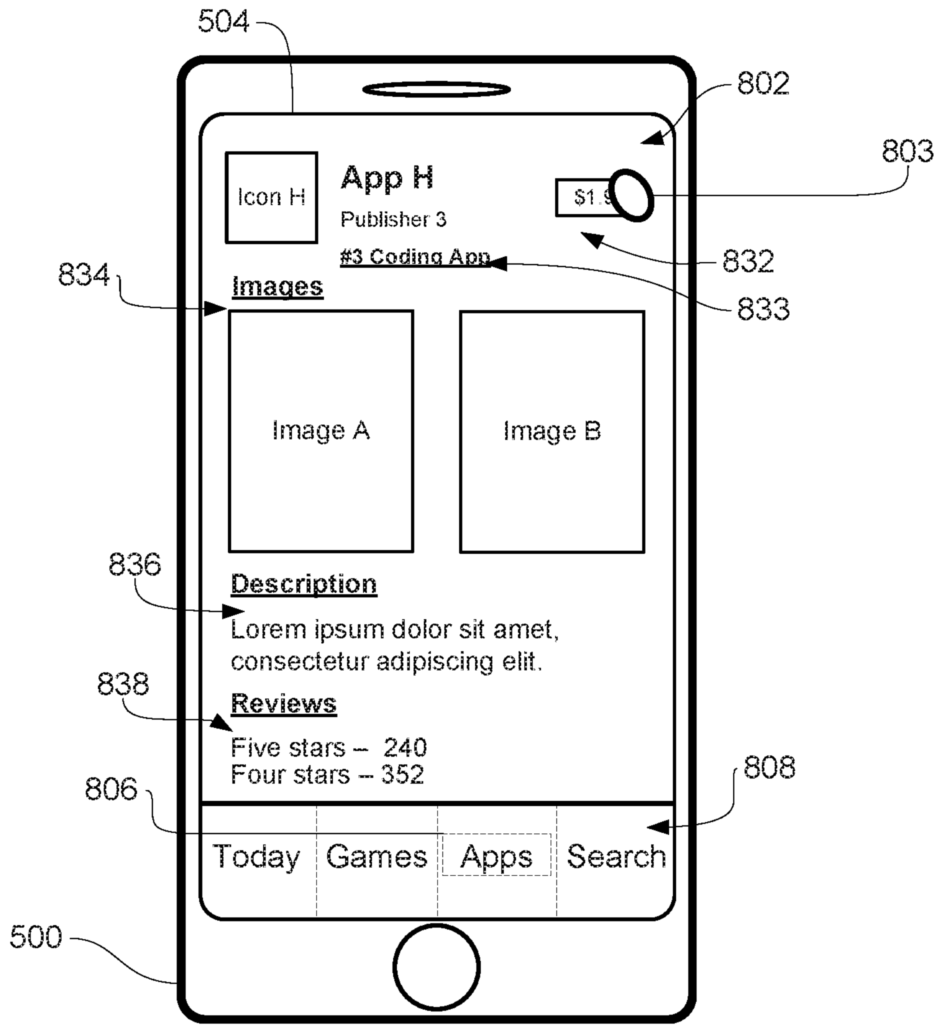
Figure 8D:
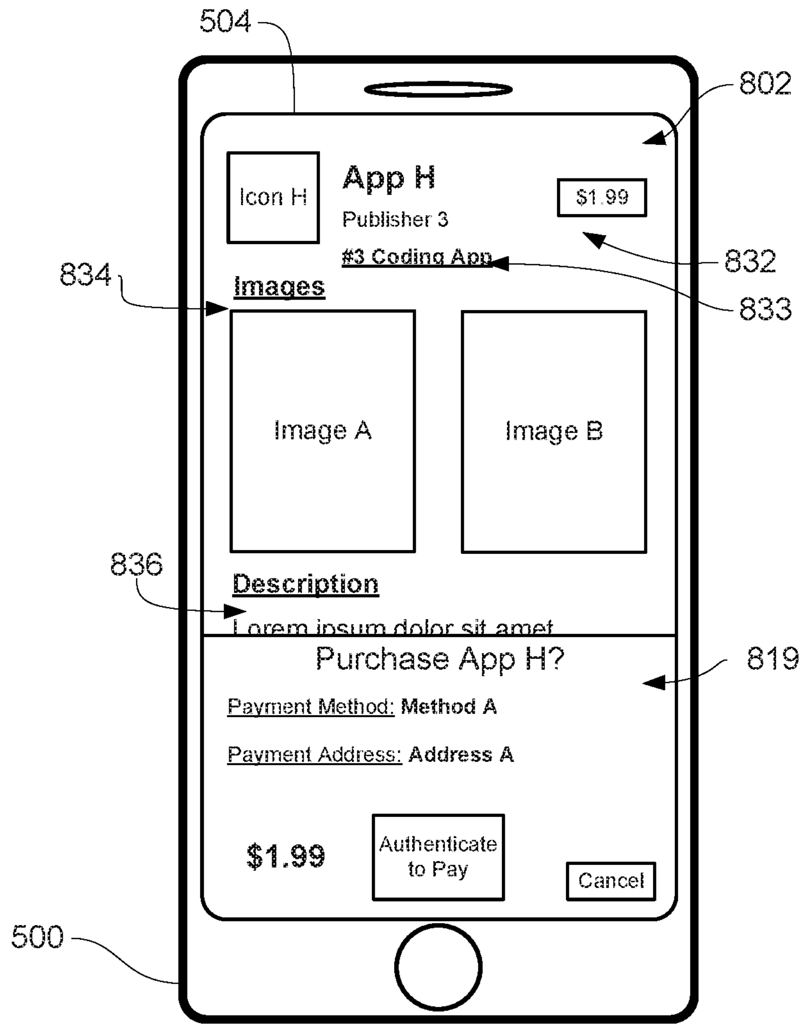
Figure 8E:
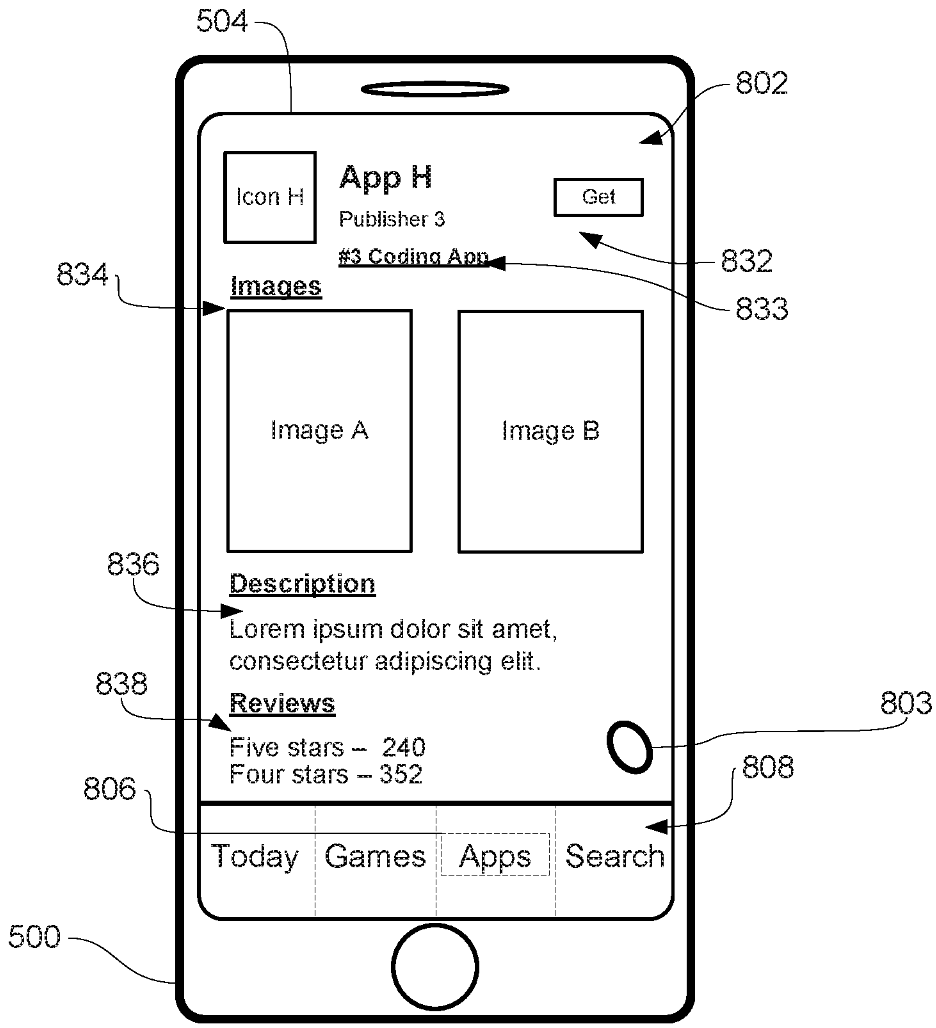
Figure 8F:
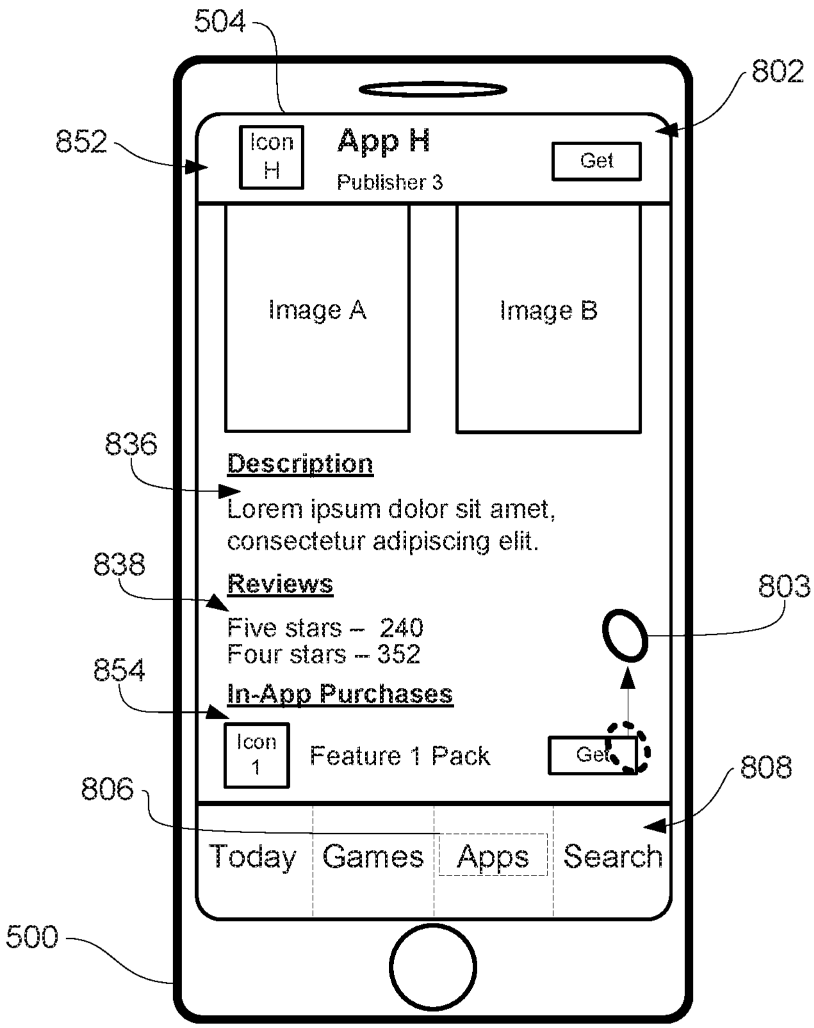
Figure 8G:
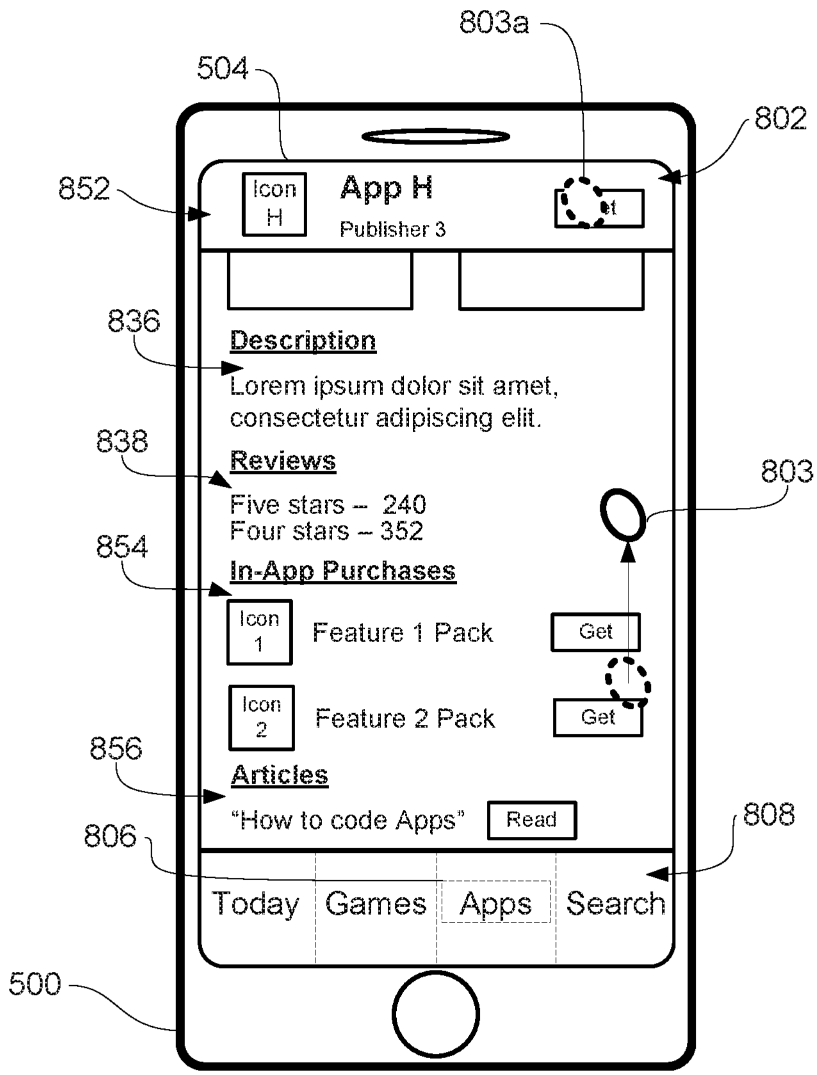
Figure 8H:
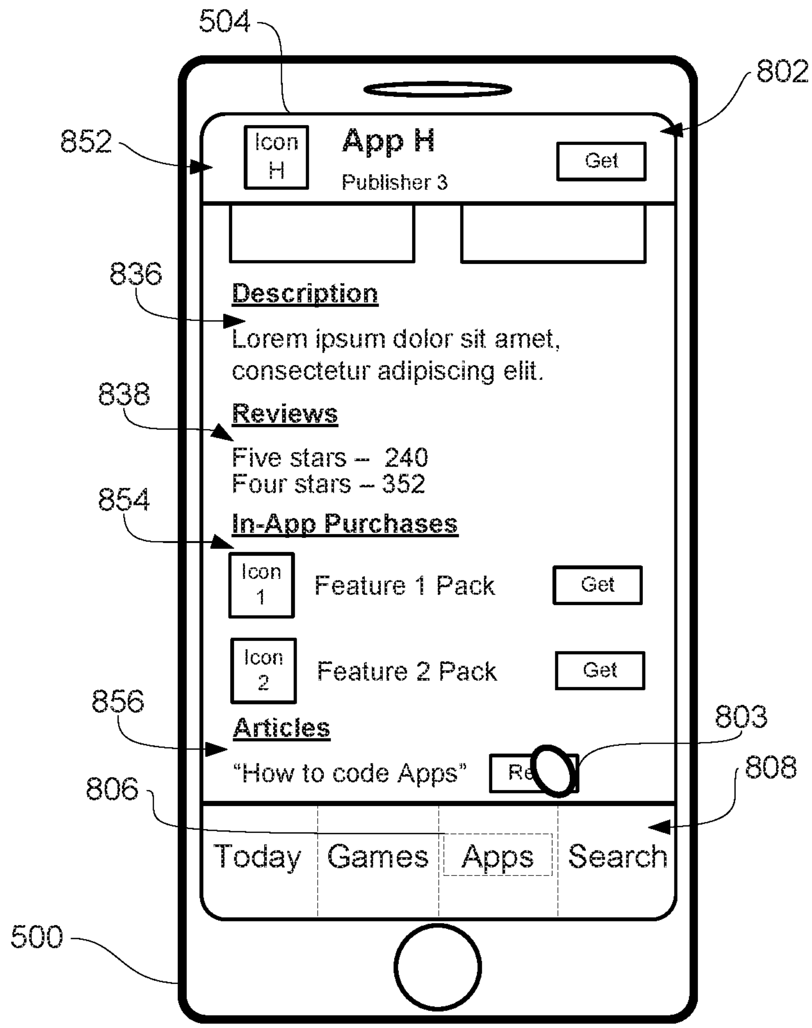
Figure 8I:
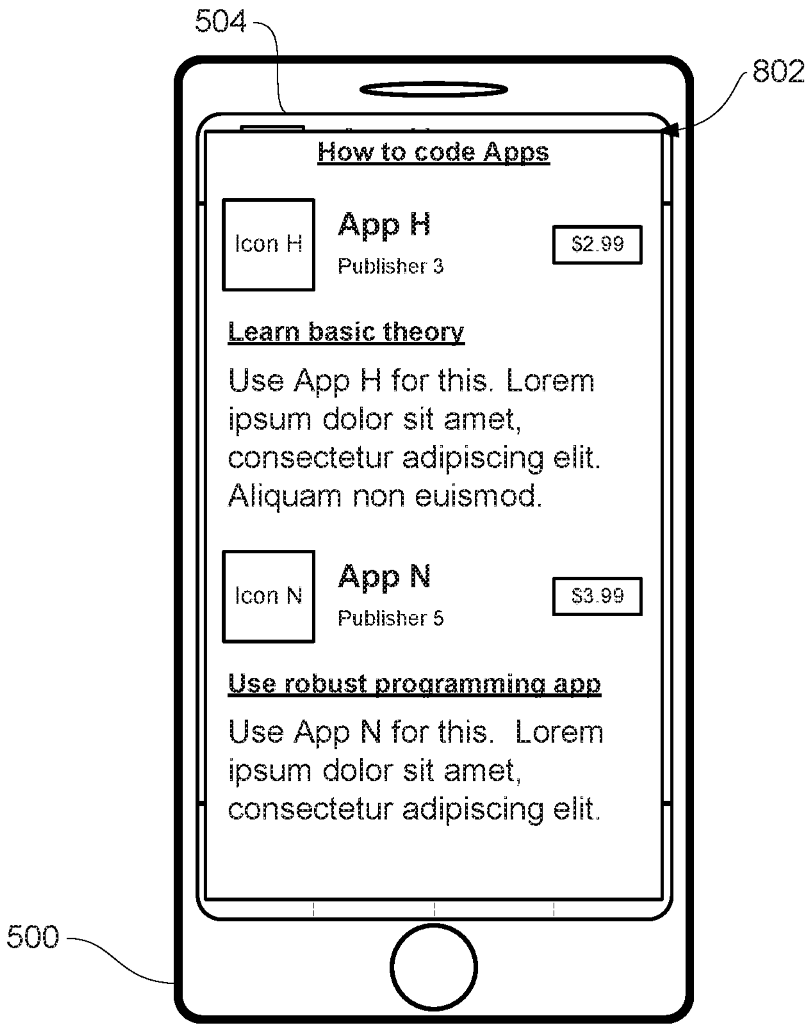
Figure 8J:
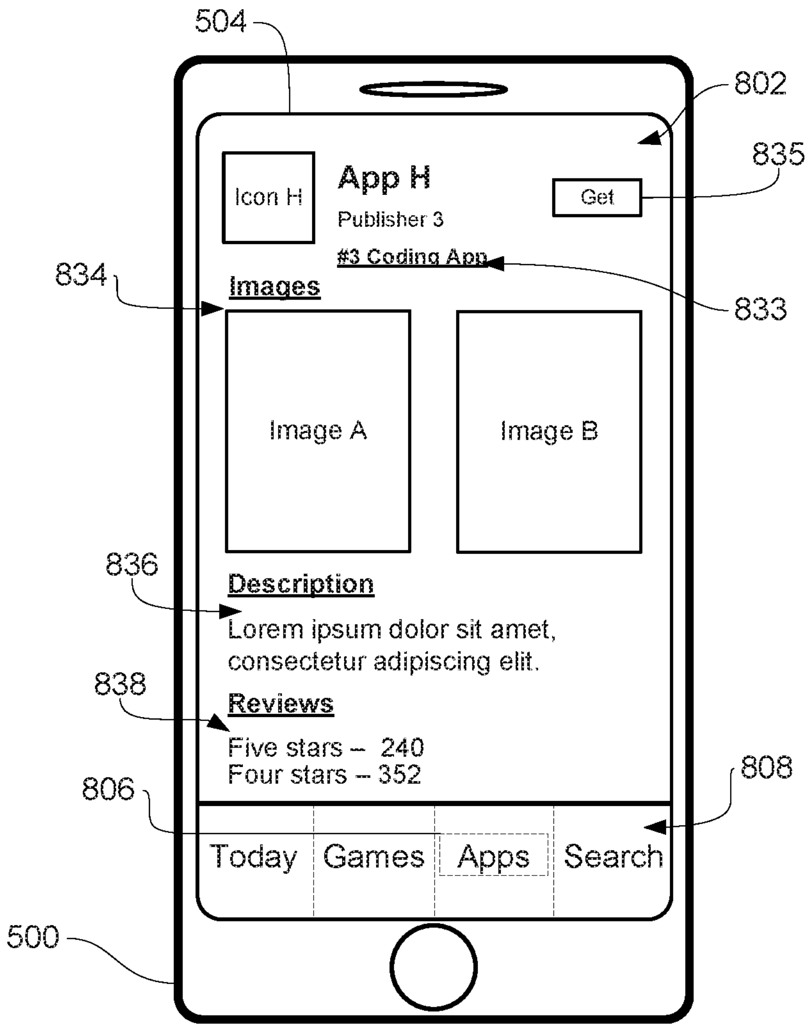
Figure 8K:
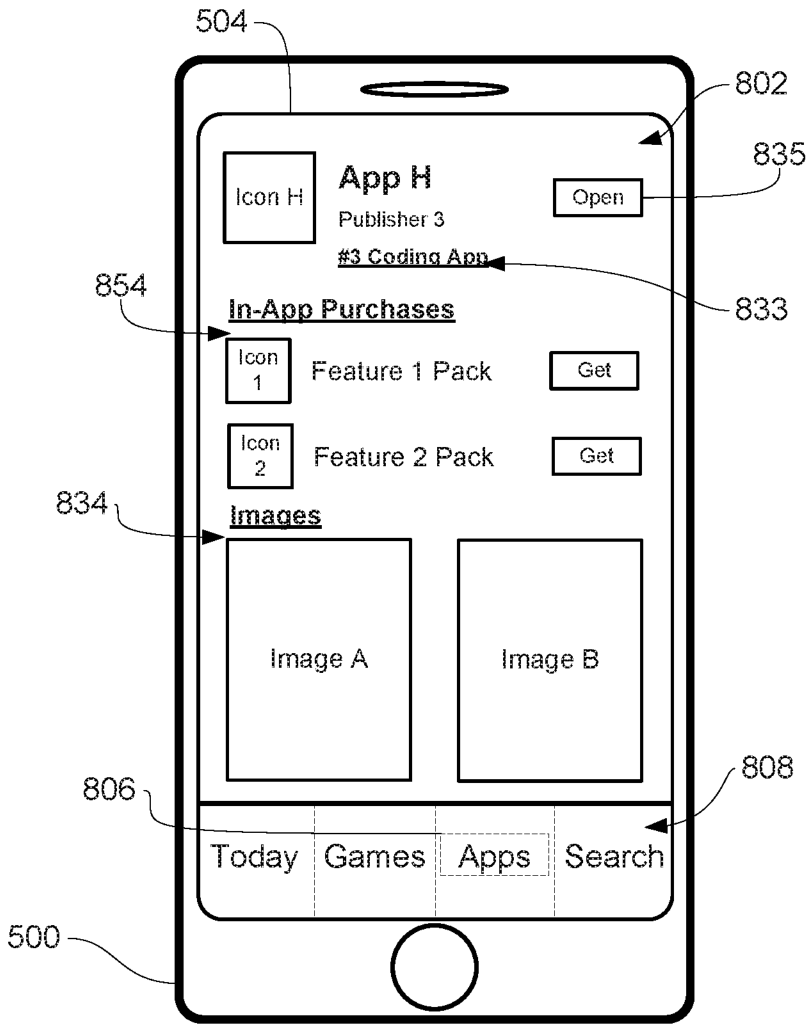
Figure 8L:
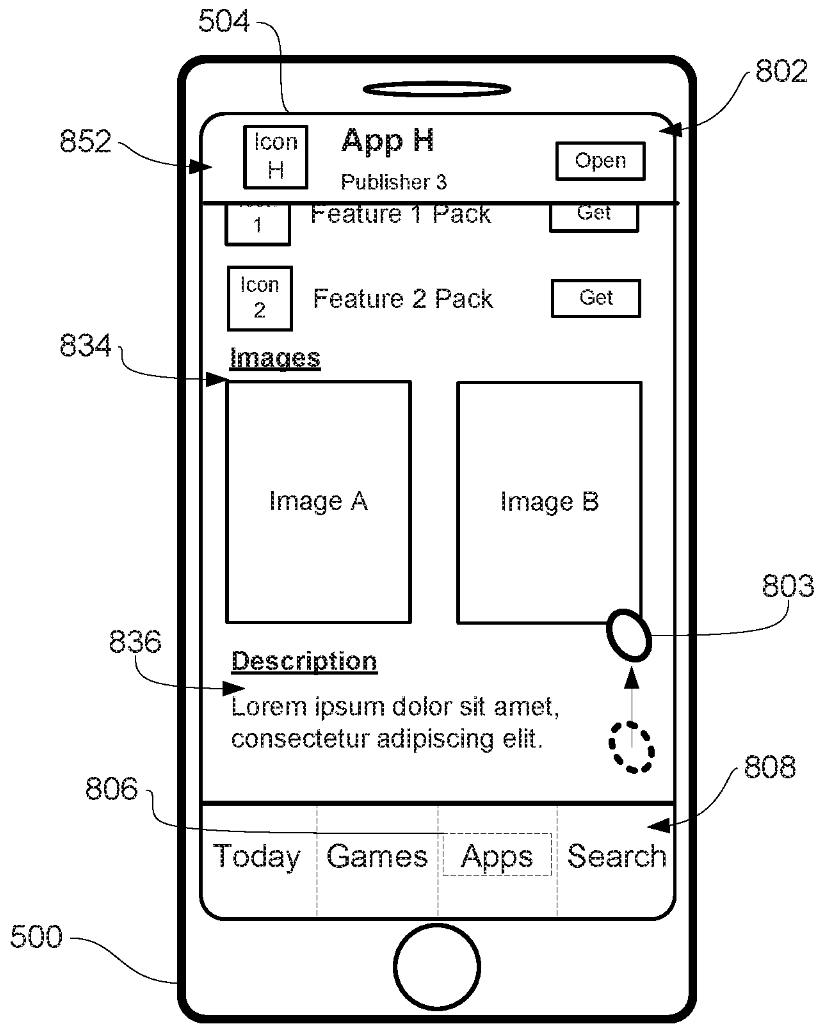
Figure 9A:
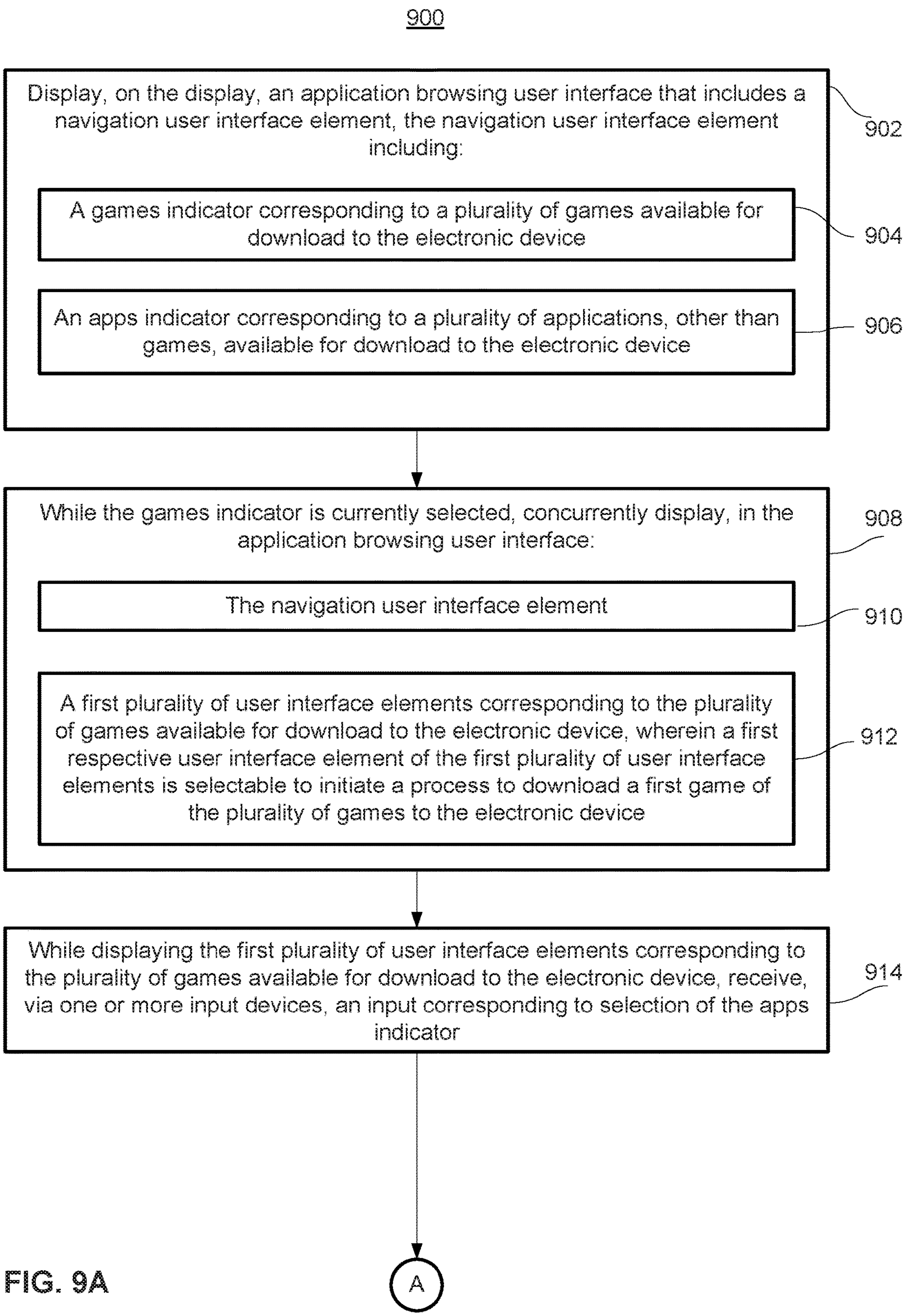
FIGS. 9A-9J are flow diagrams illustrating a method of facilitating browsing of applications and games by category in accordance with some embodiments of the disclosure.
Figure 9B:
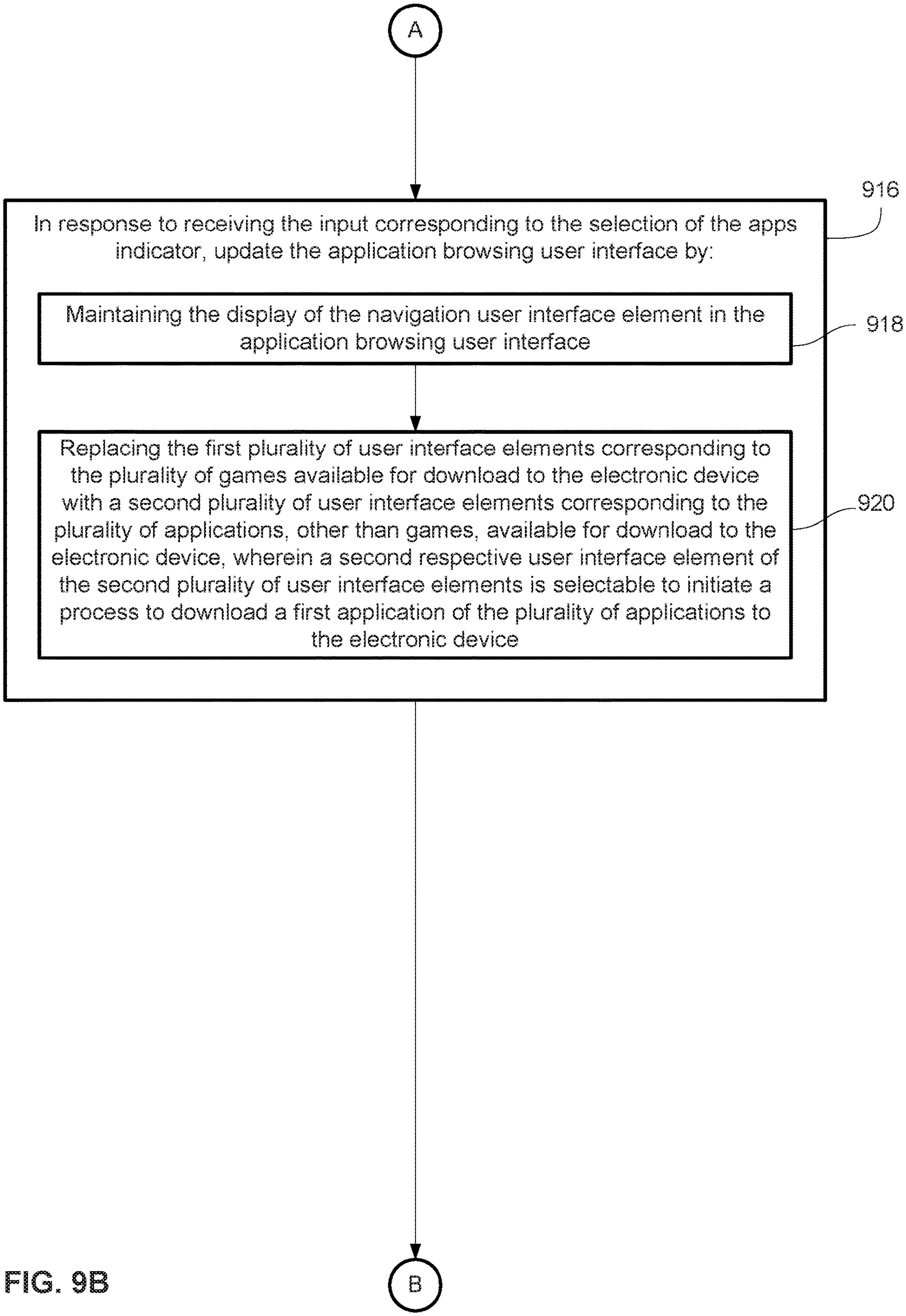
Figure 9C:
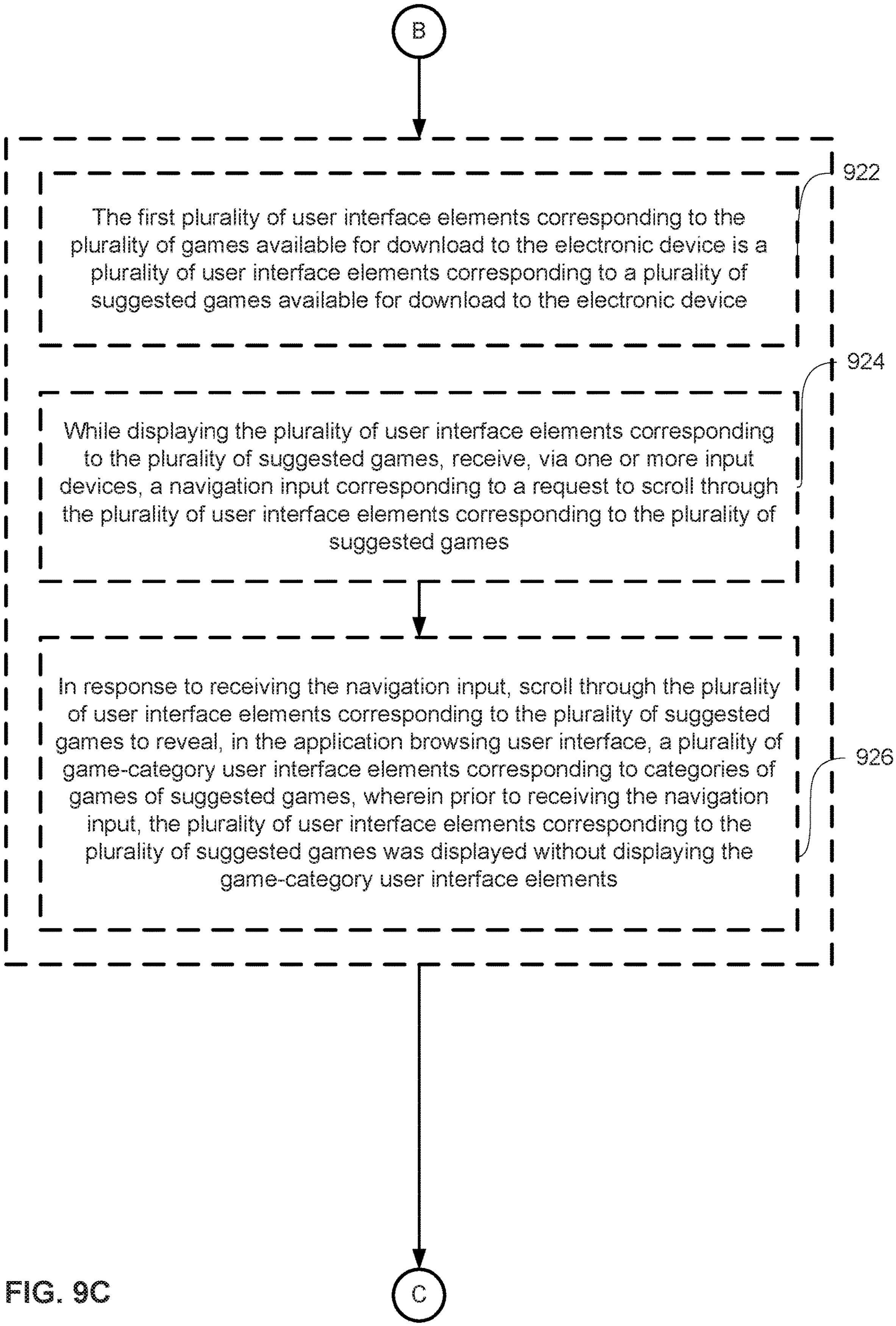
Figure 9D:
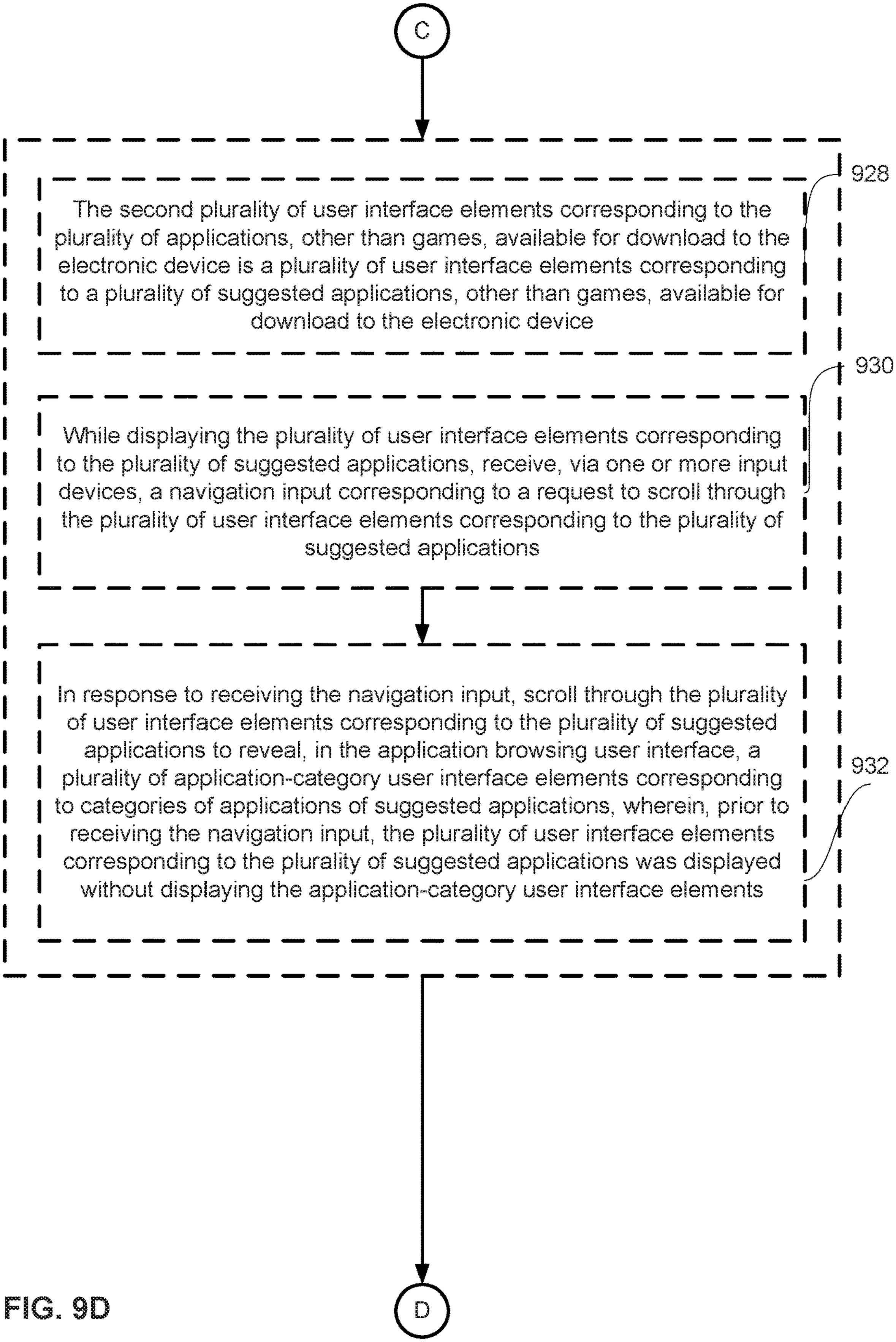
Figure 9E:
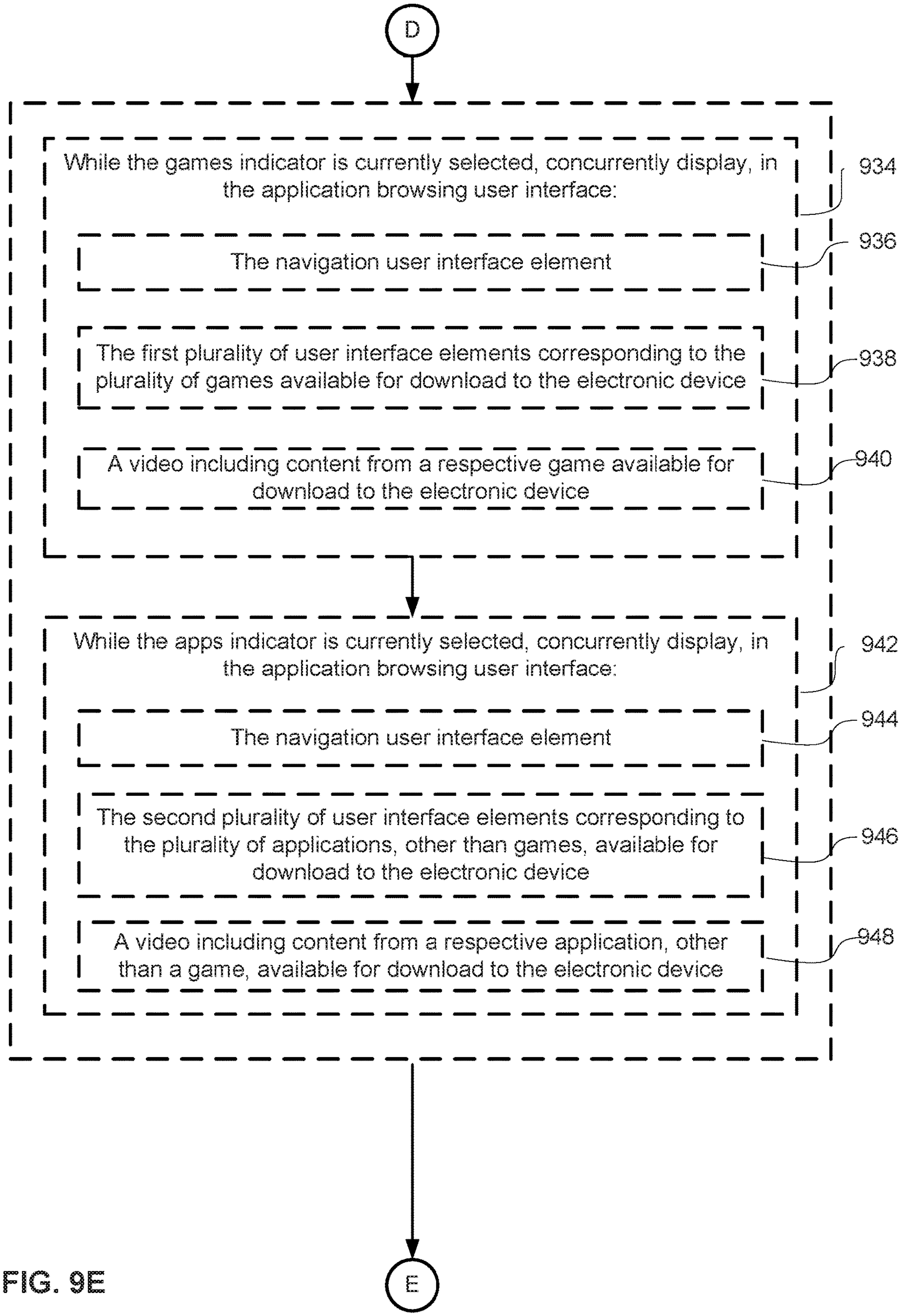
Figure 9F:
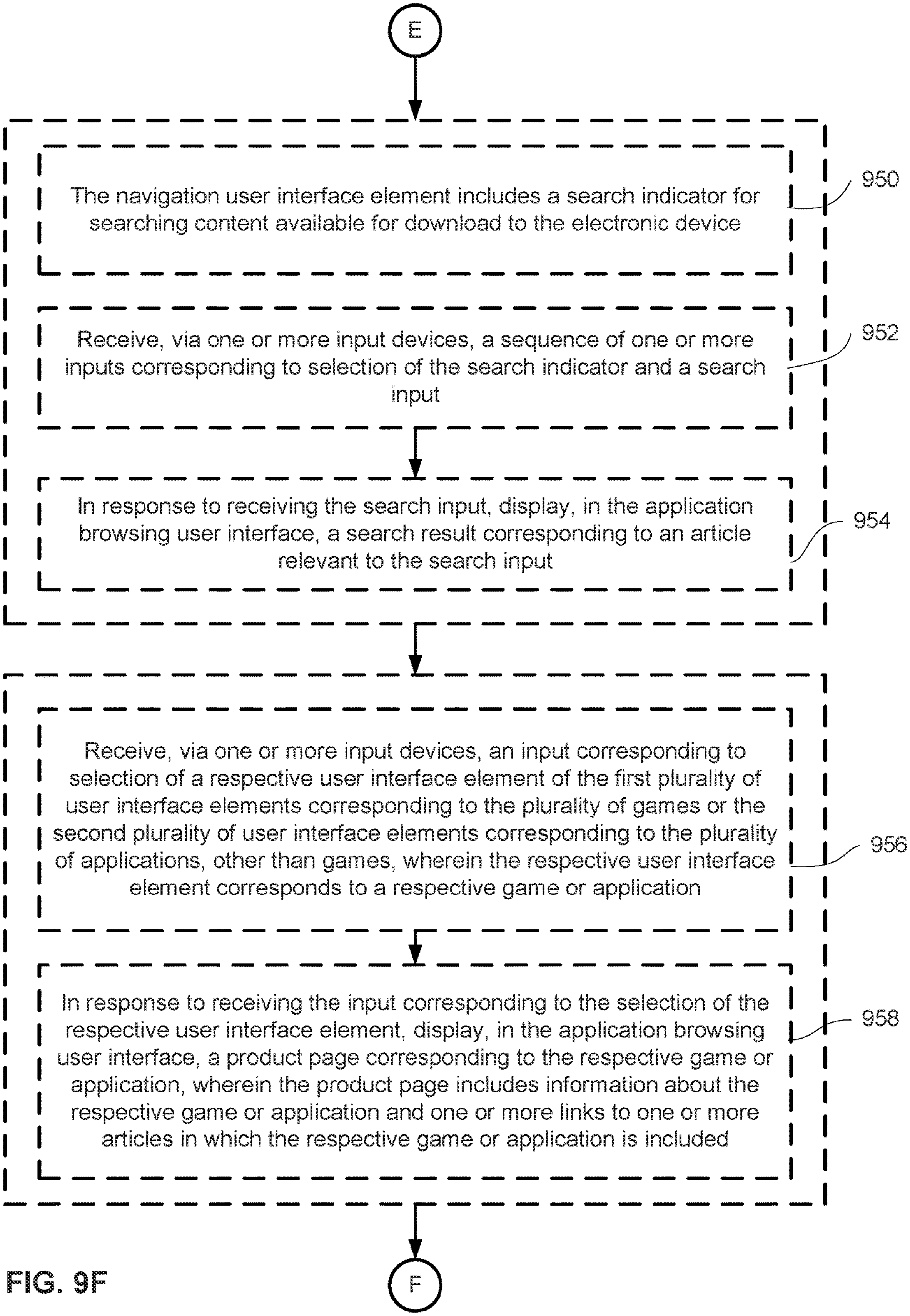
Figure 9G:
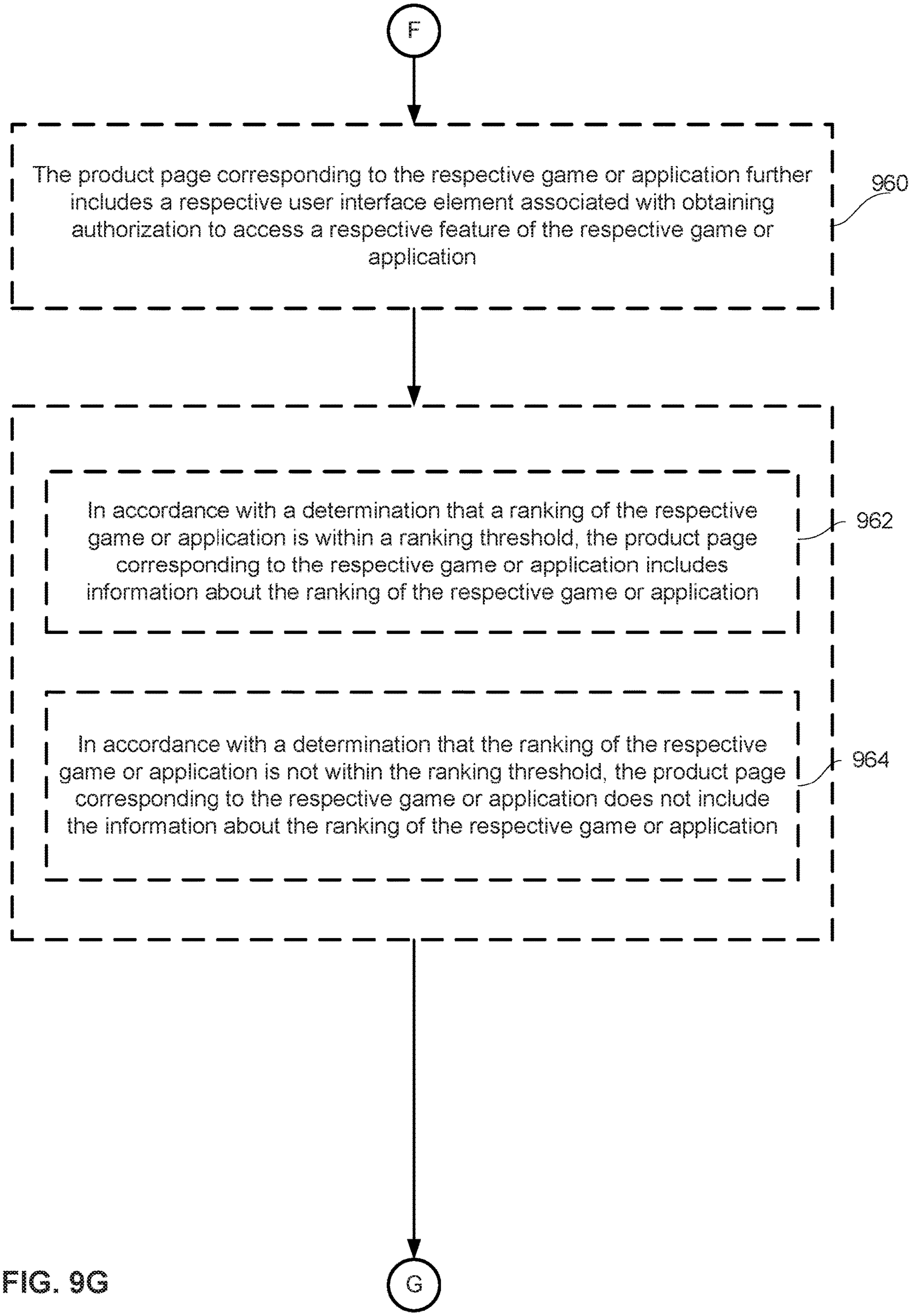
Figure 9H:
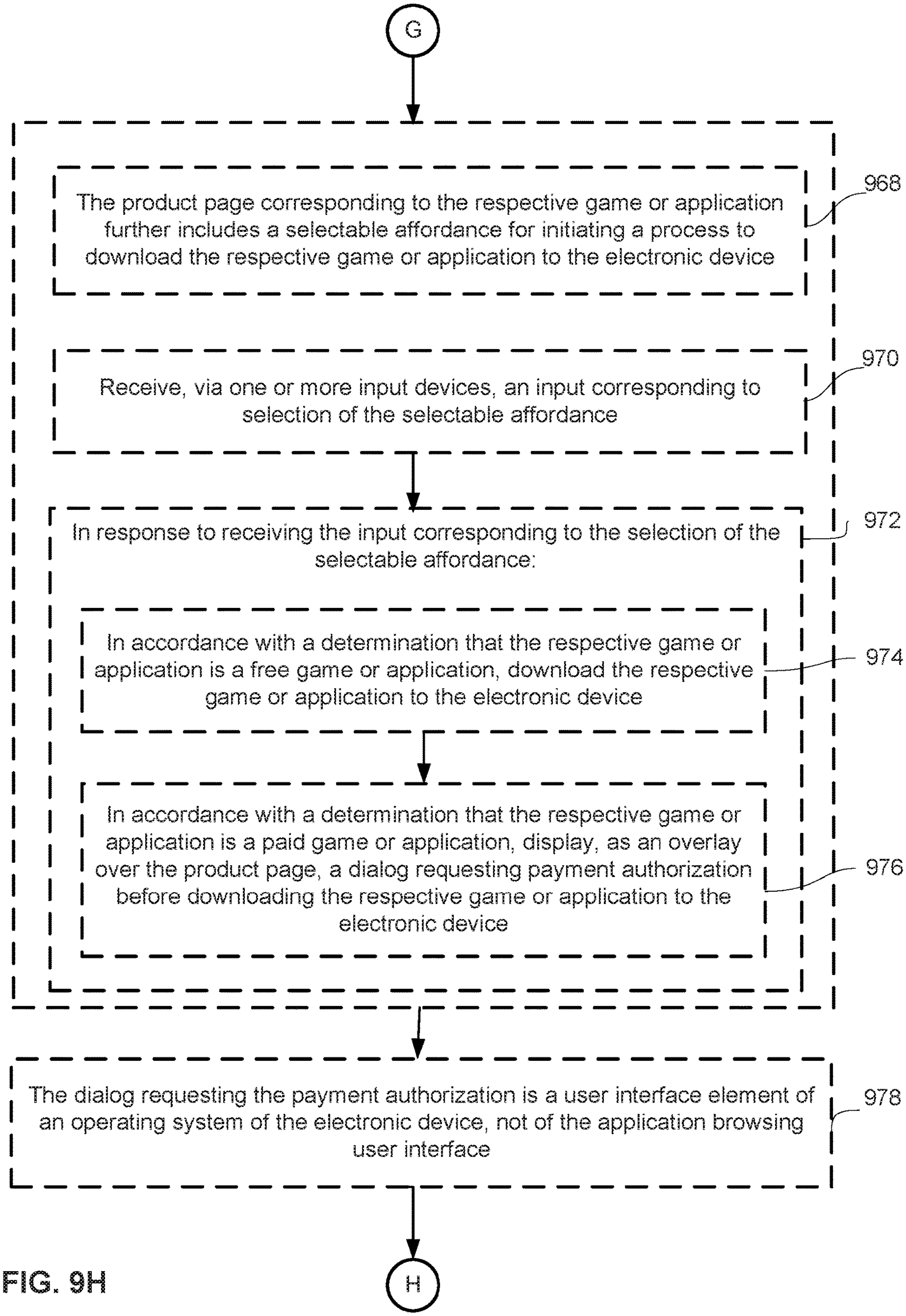
Figure 9I:
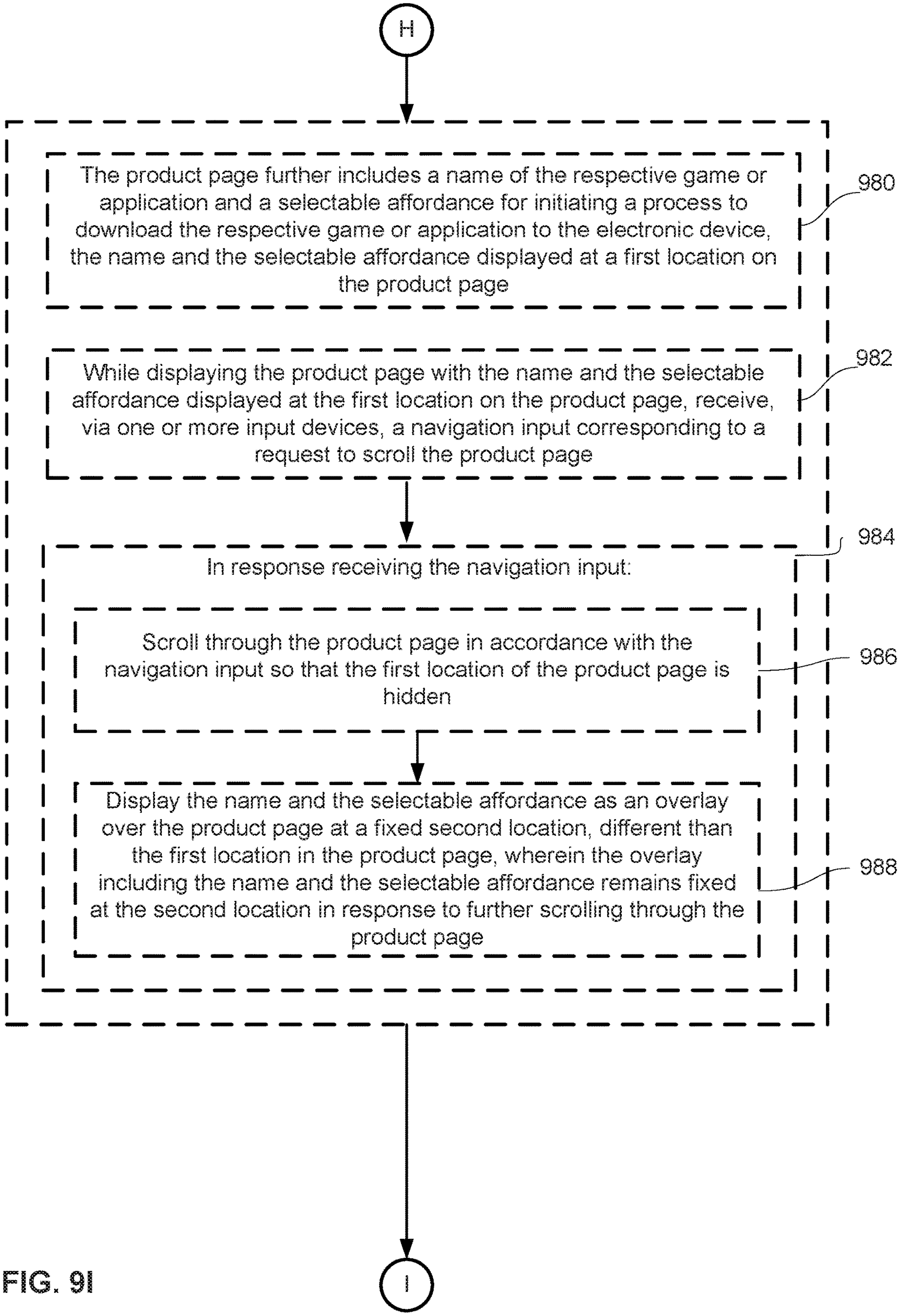
Figure 9J:
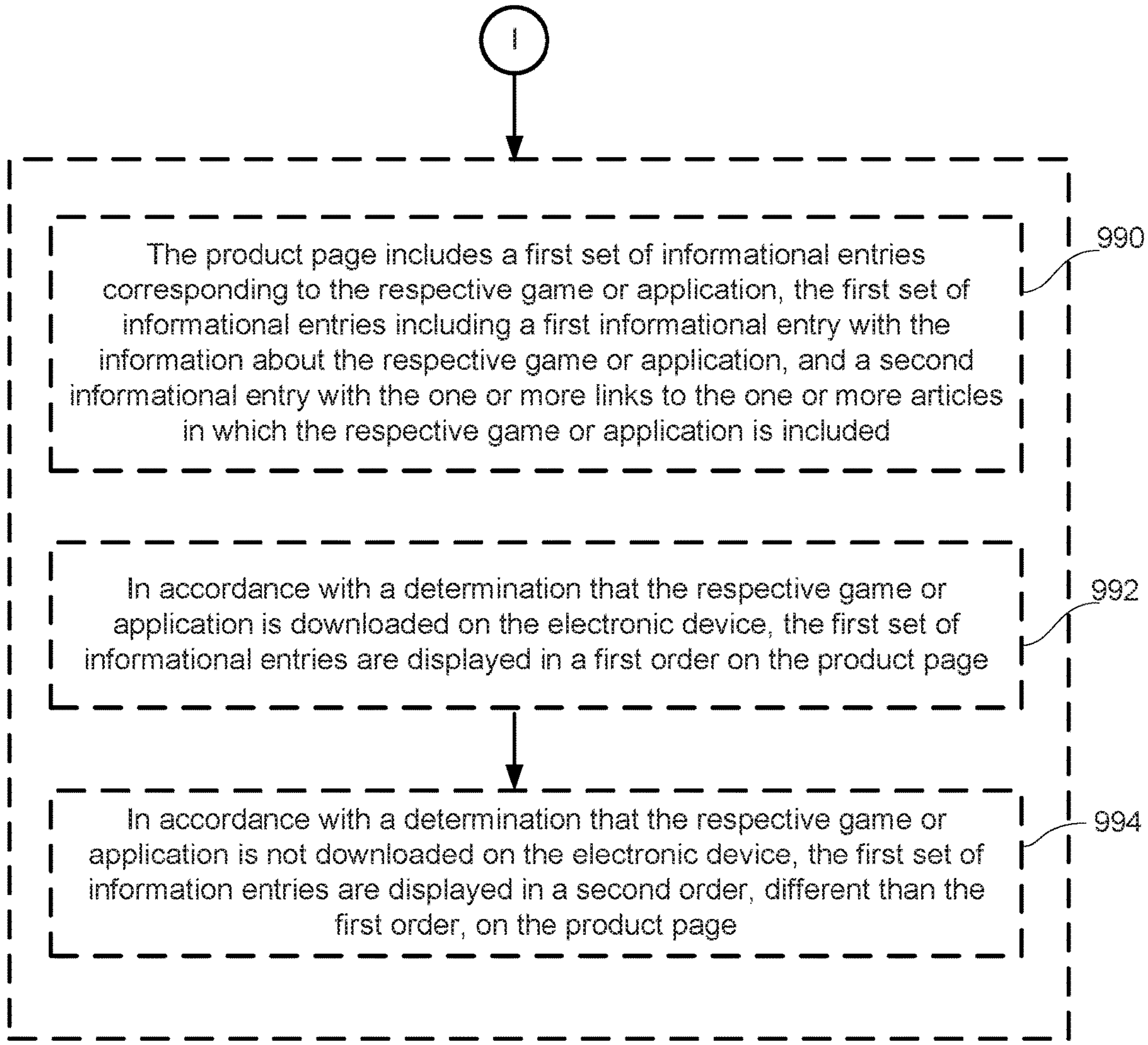

In some embodiments, in accordance with a determination that a ranking of the respective game or application is within a ranking threshold (e.g., the game or application is ranked within the top 10, 20 or 30 paid games or applications, free games or applications, etc., or the game or application simply has a ranking), the product page corresponding to the respective game or application includes information about the ranking of the respective game or application (962), such as in FIG. 8Y (e.g., the ranking of the game or application is displayed along the top of the product page, along with the name of the game or application, a user review rating of the game or application, etc.). In some embodiments, in accordance with a determination that the ranking of the respective game or application is not within the ranking threshold (e.g., the game or application is not ranked within the top 10, 20 or 30 paid games or applications, free games or applications, etc., or the game or application has no ranking), the product page corresponding to the respective game or application does not include the information about the ranking of the respective game or application (964), such as in FIG. 8X (e.g., the ranking of the game or application is not displayed along the top of the product page, along with the name of the game or application, a user review rating of the game or application, etc.). The above-described manner of selectively including ranking information for the game or application on the product page of the game or application allows the electronic device to emphasize the presentation of well-ranked games or applications, which enhances the operability of the device and makes the user-device interface more efficient (e.g., by clearly displaying such ranking information when that information is more likely to be relevant to the user), which, additionally, reduces power usage and improves battery life of the device by enabling the user to use the device more quickly and efficiently.

In some embodiments, the product page corresponding to the respective game or application further includes a selectable affordance for initiating a process to download the respective game or application to the electronic device (968), such as in FIG. 8Z (e.g., a selectable button, selection of which initiates a process for downloading the game or application to the electronic device). The electronic device optionally receives (970), via the one or more input devices, an input corresponding to selection of the selectable affordance, such as in FIG. 8Z (e.g., a tap detected on the button for downloading the game or application to the electronic device). In response to receiving the input corresponding to the selection of the selectable affordance (972), in accordance with a determination that the respective game or application is a free game or application (e.g., a game or application that requires no payment at this time to download to the electronic device), the electronic device downloads (974) the respective game or application to the electronic device, such as in FIG. 8AA (e.g., in the case that the game or application requires no payment to download to the electronic device, selection of the button optionally immediately starts downloading the game or application to the electronic device). In some embodiments, in response to receiving the input corresponding to the selection of the selectable affordance, in accordance with a determination that the respective game or application is a paid game or application (e.g., a game or application that does require payment at this time before downloading to the electronic device), the electronic device displays (976), as an overlay over the product page, a dialog requesting payment authorization before downloading the respective game or application to the electronic device, such as in FIG. 8DD (e.g., a payment overlay that includes information about the purchase price, payment method (and option to change it), etc., and requests authentication of the user (e.g., via fingerprint, username/password, face scan, retinal scan, other biometric means). If the payment is successfully authorized (e.g., because the user was successfully authenticated), the downloading of the game or application optionally begins.). The above-described manner of only displaying the payment authorization overlay when payment is required allows the electronic device to skip the performance of unnecessary actions, which enhances the operability of the device and makes the user-device interface more efficient (e.g., by reducing the number of user-device interactions when payment is not required), which, additionally, reduces power usage and improves battery life of the device by enabling the user to use the device more quickly and efficiently.

In some embodiments, the dialog requesting the payment authorization is a user interface element of an operating system of the electronic device, not of the application browsing user interface (978), such as in FIG. 8DD (e.g., the payment authorization overlay is optionally not generated by the application browsing user interface/application, but rather is generated by the operating system of the electronic device.). As such, in some embodiments, the same payment authorization overlay is displayed when payment is required in other contexts, such as when purchasing a product from a shopping application that is separate from the application browsing user interface/application. The above-described manner of using operating system-based payment authorization dialogs allows the electronic device to provide consistent presentation of information to the user and maintain consistent interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the product page further includes a name of the respective game or application and a selectable affordance for initiating a process to download the respective game or application to the electronic device, the name and the selectable affordance displayed at a first location on the product page (980), such as in FIG. 8EE (e.g., the name of the game or application and the button for downloading/purchasing the game or application are displayed as part of the product page displayed on the display, the current scroll position in the product page informing where on the display the name and button are positioned). While displaying the product page with the name and the selectable affordance displayed at the first location on the product page (and is not displayed as an overlay over the product page at a fixed second location on the display), the electronic device optionally receives (982), via the one or more input devices, a navigation input corresponding to a request to scroll the product page, such as in FIGS. 8EE-8GG (e.g., a swipe input detected on the touch-sensitive surface/touch screen for causing the product page to scroll in accordance with the magnitude and/or direction of the swipe input, where the magnitude and/or direction is such that the product page will be scrolled beyond the name and button that are on the product page).

In some embodiments, in response receiving the navigation input (984), the electronic device scrolls (986) through the product page in accordance with the navigation input so that the first location of the product page is hidden, such as in FIGS. 8FF-8GG. In some embodiments, in response receiving the navigation input, the electronic device displays (988) the name and the selectable affordance as an overlay over the product page at a fixed second location, different than the first location in the product page, such as in FIGS. 8FF-8GG. The overlay including the name and the selectable affordance optionally remains fixed at the second location in response to further scrolling through the product page, such as in FIG. 8GG (e.g., if a user scrolls past the name and button on the product page, the name and button are displayed as an overlay at the top of the display, where they were not so displayed before the user scrolled past them on the product page.) The overlay optionally remains displayed on the display at the same location in response to additional scrolling through the product page. Thus, when the portion of the product page at which the name and button are located is displayed on the display, the name and button are not displayed as an overlay over the product page, but when the portion of the product page at which the name and button are located is not displayed on the display, the name and button are displayed as an overlay over the product page. The above-described manner of displaying the name and button when a user scrolls past the name and button on the product page allows the electronic device to provide persistent presentation of the name and button on the display, which enhances the operability of the device and makes the user-device interface more efficient (e.g., by facilitating access to the name and button at all times on the product page, regardless of the current scroll position in the product page), which, additionally, reduces power usage and improves battery life of the device by enabling the user to use the device more quickly and efficiently.

In some embodiments, the product page includes a first set of informational entries corresponding to the respective game or application, such as in FIG. 8JJ (e.g., an informational entry relating to user reviews of the game or application, an informational entry relating to in-app purchases for the game or application, an informational entry relating to videos of the game or application, an informational entry relating to what's new for the game or application, an informational entry with information about the game or application, an informational entry with one or more links to one or more articles in which the game or application is included or mentioned, etc.), the first set of informational entries including a first informational entry with the information about the respective game or application, and a second informational entry with the one or more links to the one or more articles in which the respective game or application is included (990). In some embodiments, in accordance with a determination that the respective game or application is downloaded on the electronic device (e.g., the game or application is currently downloaded or installed on the electronic device), the first set of informational entries are displayed in a first order on the product page (992), such as in FIG. 8KK. In some embodiments, in accordance with a determination that the respective game or application is not downloaded on the electronic device (e.g., the game or application is not currently downloaded or installed on the electronic device), the first set of information entries are displayed in a second order, different than the first order, on the product page (994), such as in FIG. 8JJ (e.g., the electronic device displays the information on the product page in a different order (e.g., from top to bottom) depending on whether or not the game or application is currently downloaded or installed on the electronic device.).

For example, if the game or application is not currently downloaded on the electronic device, the electronic device optionally displays the informational entry for in-app purchases for the game or application at the end or bottom of the product page. However, if the game or application is currently downloaded or installed on the electronic device, the electronic device optionally displays the informational entry for in-app purchases for the game or application at or near the beginning or top of the product page, such as in FIG. 8KK. The above-described manner of displaying the information on the product page in a different order depending on whether the application is downloaded on the electronic device allows the electronic device to emphasize display of information that is likely to be more relevant when the application is downloaded or not, which enhances the operability of the device and makes the user-device interface more efficient (e.g., by facilitating access to such information by the user with fewer required inputs), which, additionally, reduces power usage and improves battery life of the device by enabling the user to use the device more quickly and efficiently.

It should be understood that the particular order in which the operations in FIGS. 9A-9J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, 1500 and 1700) are also applicable in an analogous manner to method 900 described above with respect to FIGS. 9A-9J. For example, the application browsing user interfaces, navigation user interface element, user interface elements, processes for downloading applications, processes for purchasing applications, product pages, selectable affordances, etc., described above with reference to method 900 optionally have one or more of the characteristics of the application browsing user interfaces, navigation user interface element, user interface elements, processes for downloading applications, processes for purchasing applications, product pages, selectable affordances, etc. described herein with reference to other methods described herein (e.g., methods 700, 1100, 1300, 1500 and 1700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9J are, optionally, implemented by components depicted in FIGS. 1A-1B. For example, displaying operations 902, 908, 918 and 920, and receiving operation 914 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In-App Purchase User Interface

Users interact with electronic devices in many different manners, including browsing applications that may be available (e.g., available for purchase and/or download) on the electronic devices. In some circumstances, in-app purchases (e.g., one or more features of a game or application that are available for purchase, separate from the game or application, itself) are available for the games or applications that are available on the electronic devices. The embodiments described below provide ways in which an electronic device facilitates presentation of information about, and thus purchase of, in-app purchases for a game or application in an app store application, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
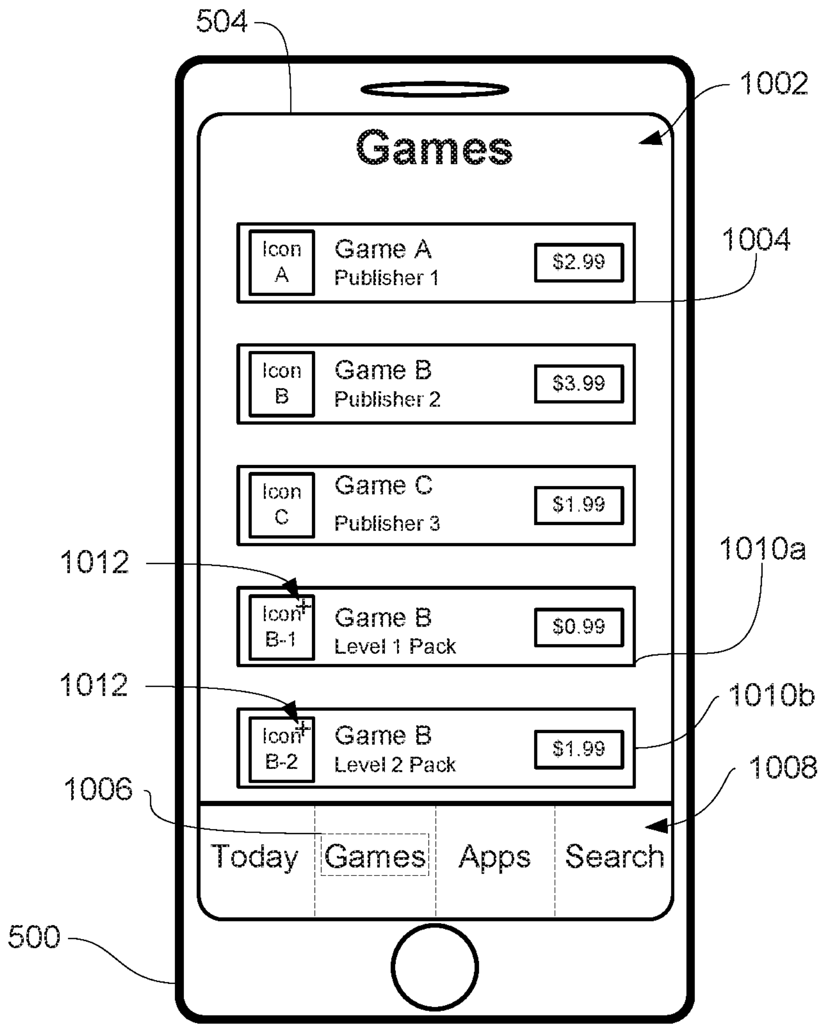
FIGS. 10A-10V illustrate exemplary ways in which an electronic device facilitates presentation of information about, and thus purchase of, in-app purchases for a game or application in an app store application in accordance with some embodiments of the disclosure.
Figure 10B:
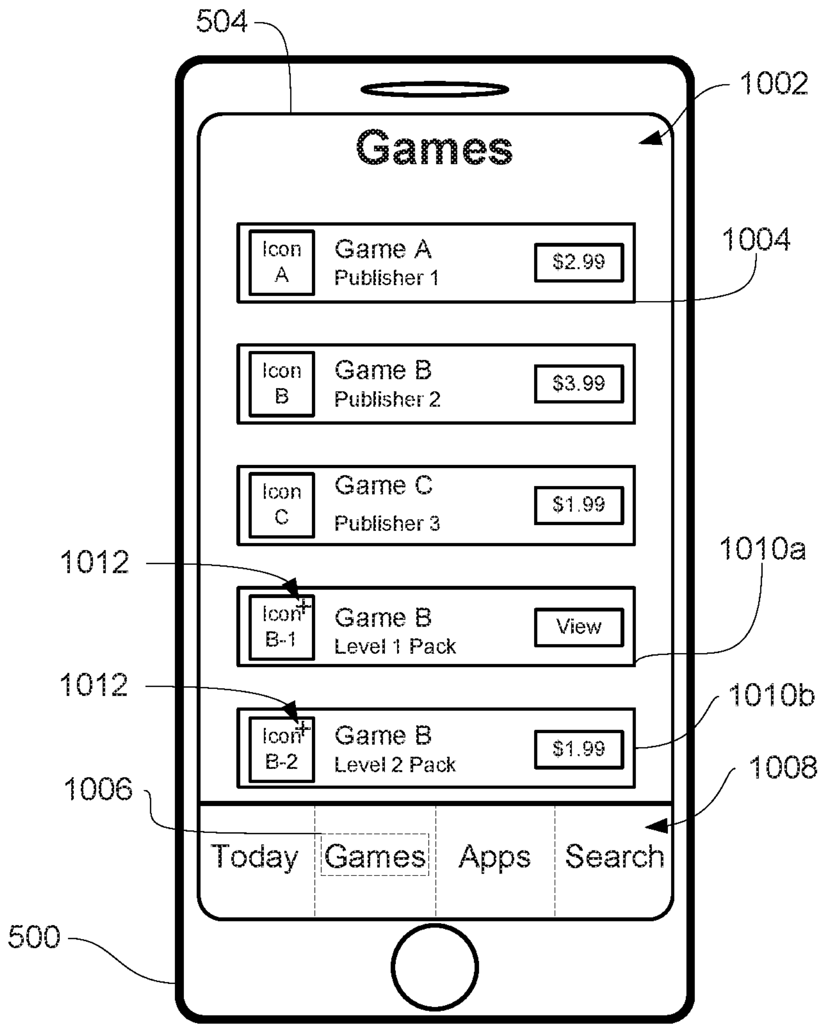
Figure 10C:
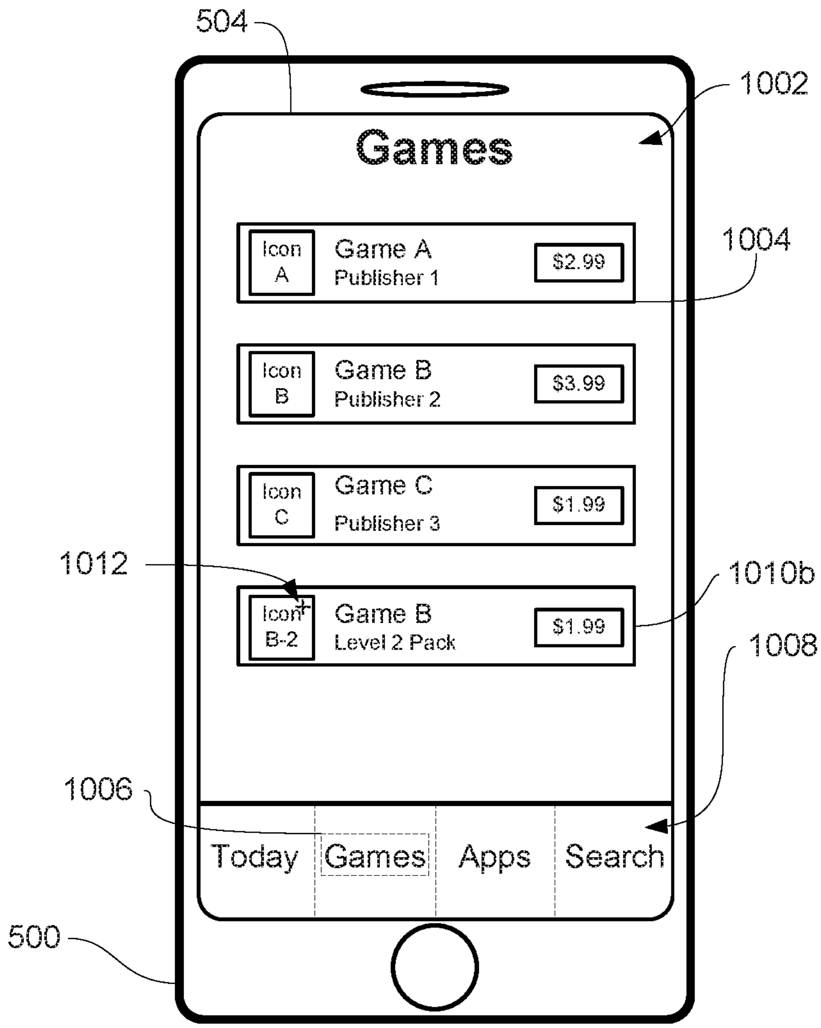
Figure 10D:
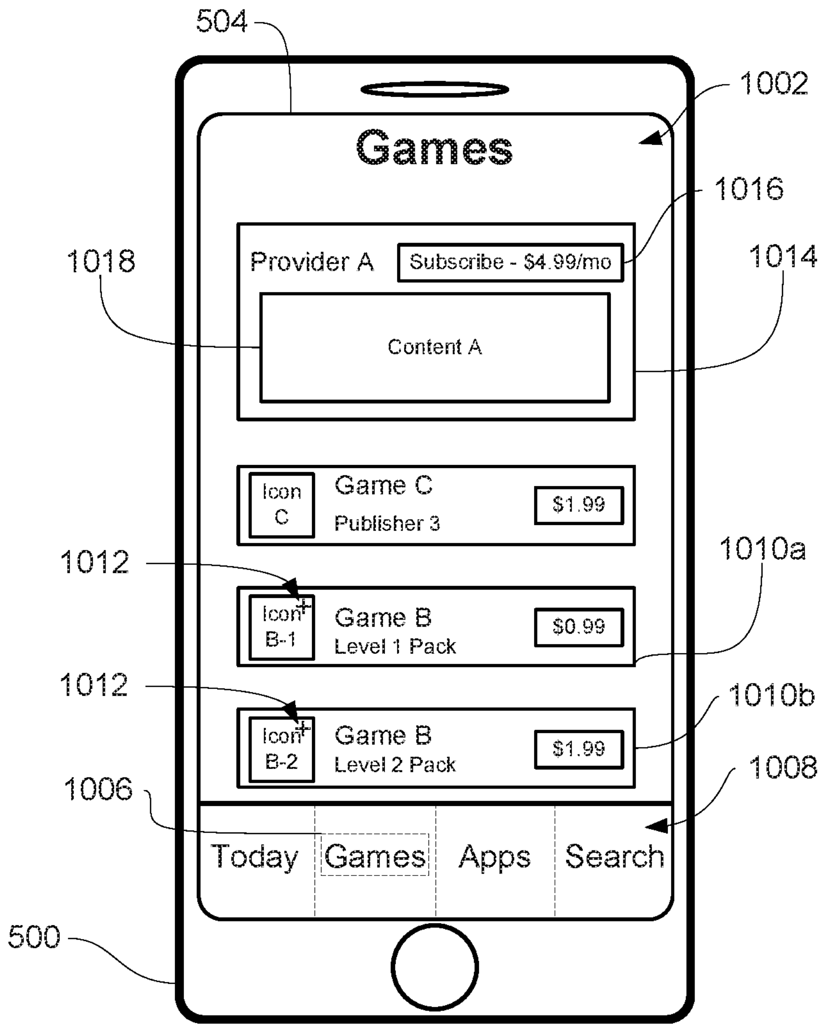
Figure 10E:
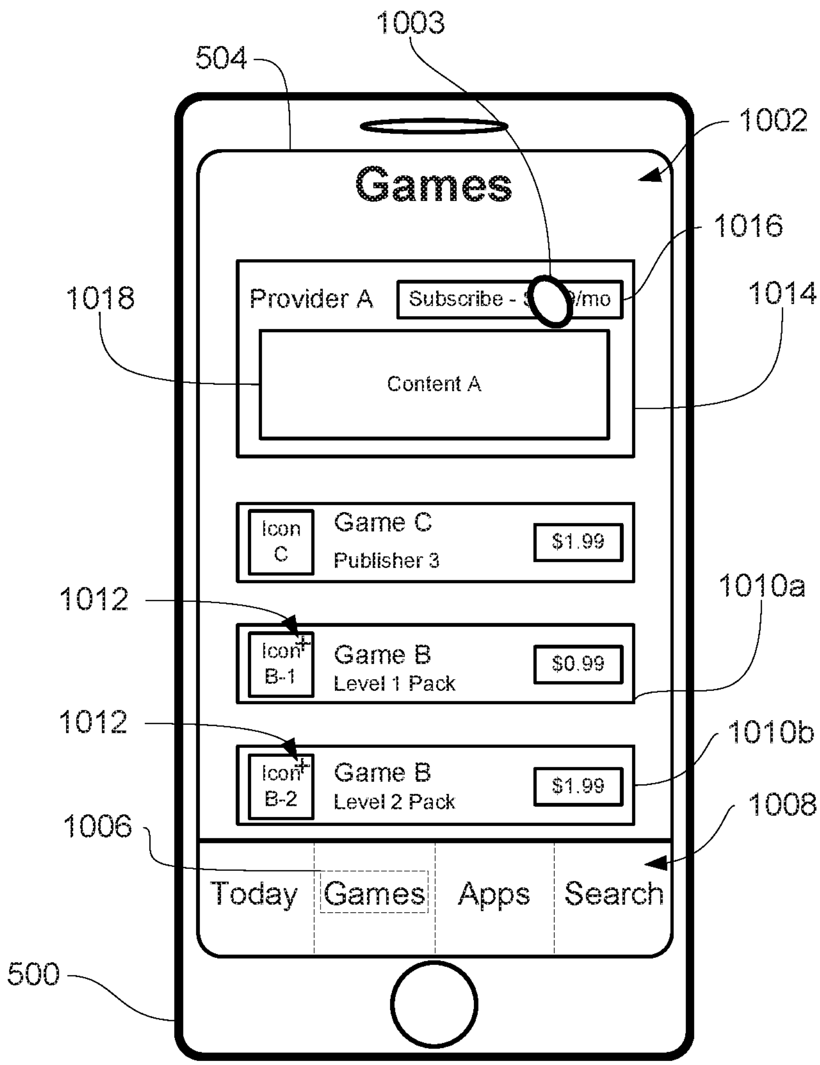
Figure 10F:
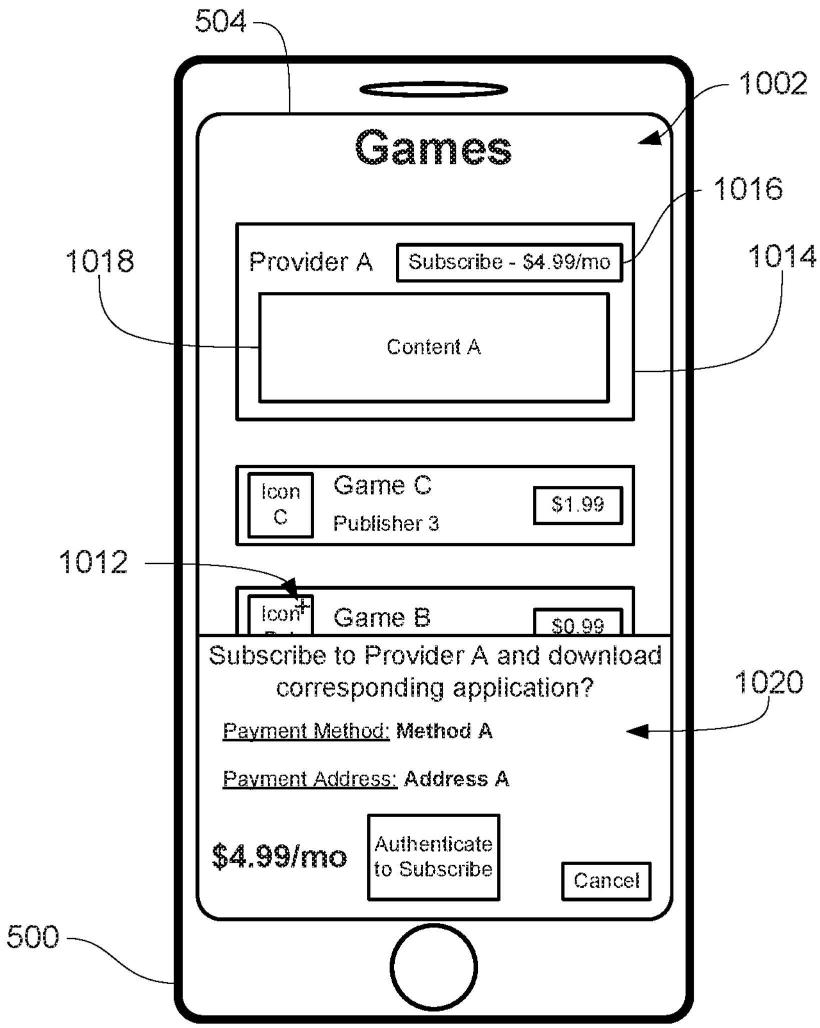
Figure 10G:
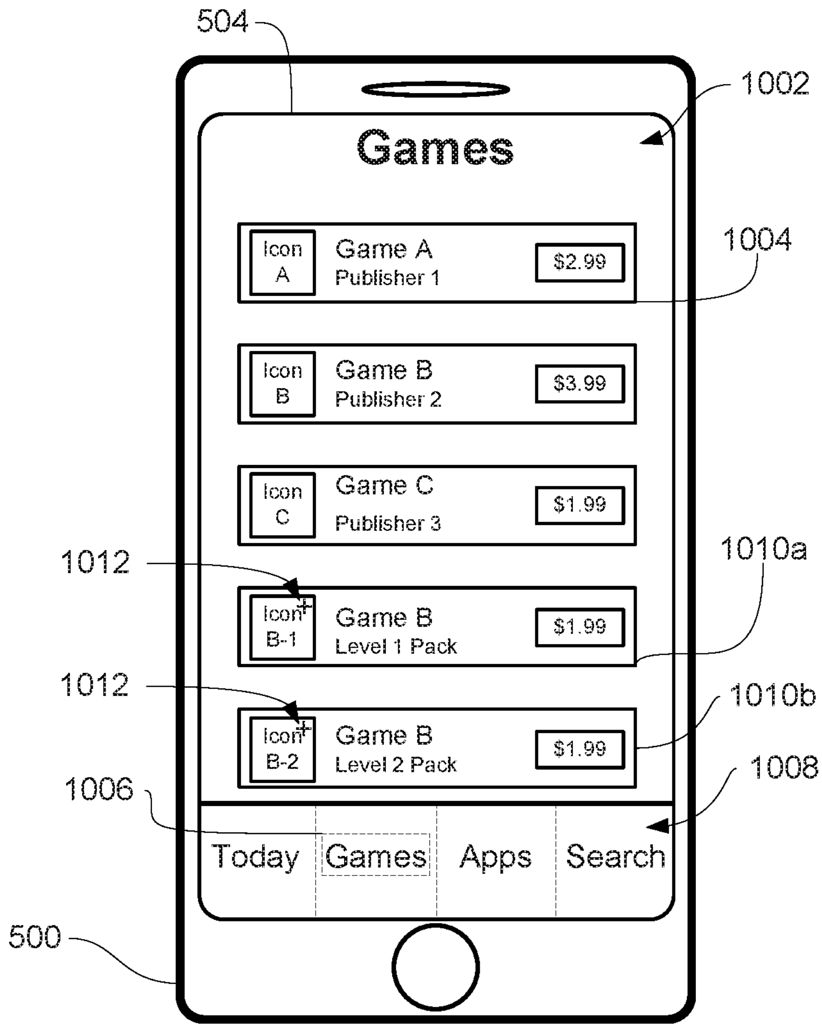
Figure 10H:
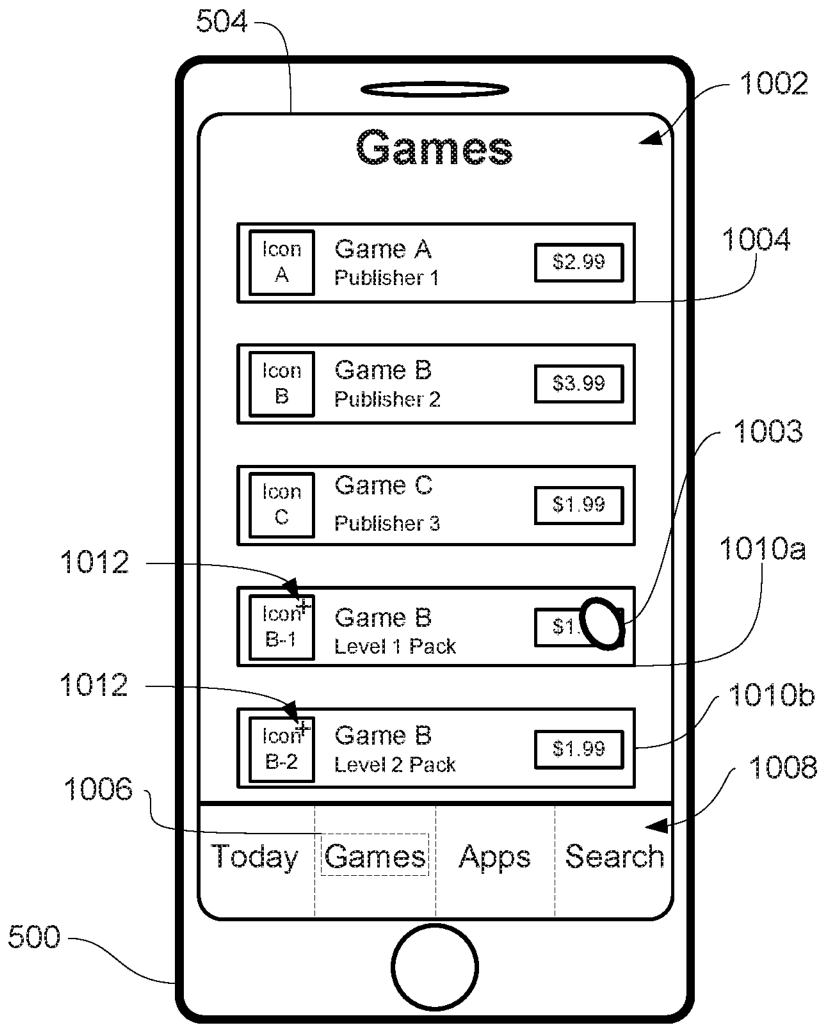
Figure 10I:
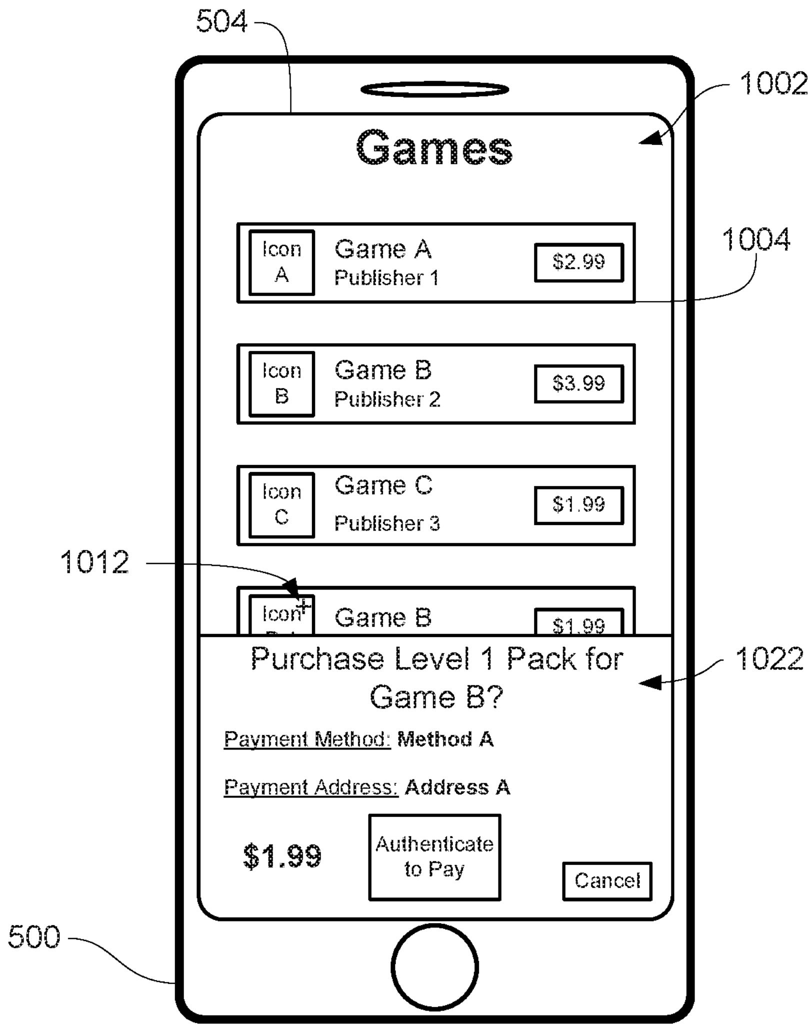
Figure 10J:
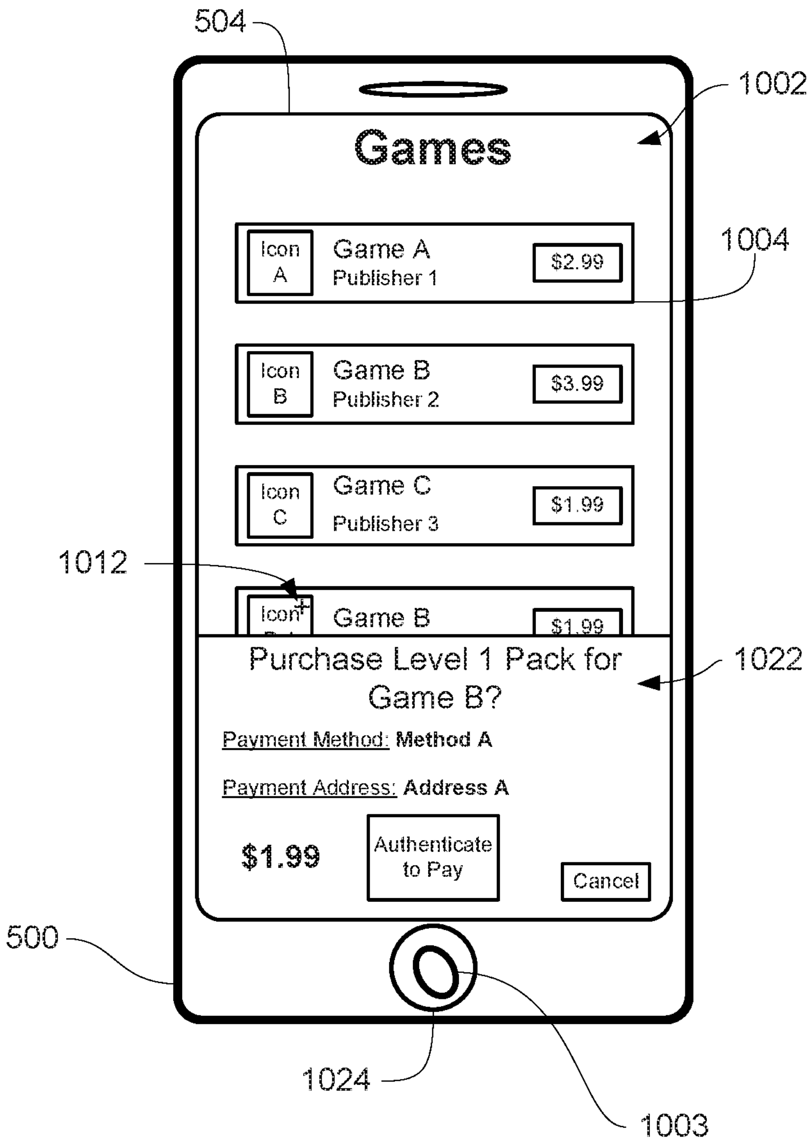
Figure 10K:
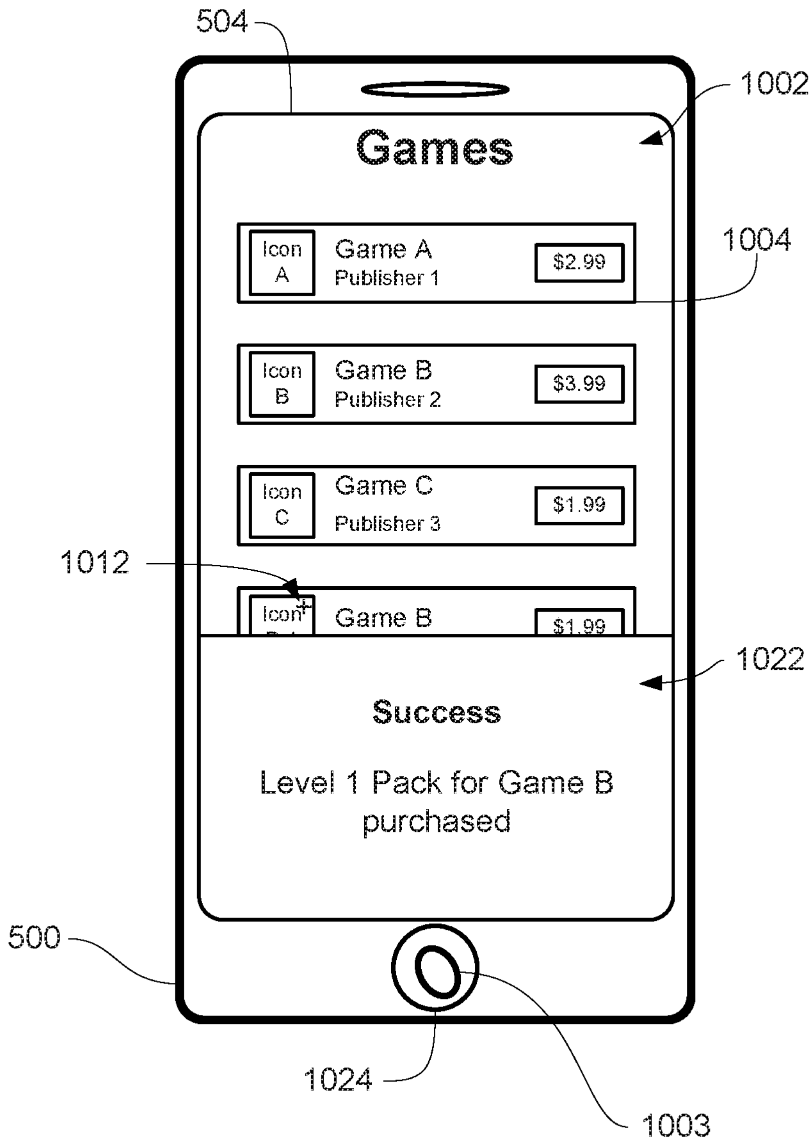
Figure 10L:
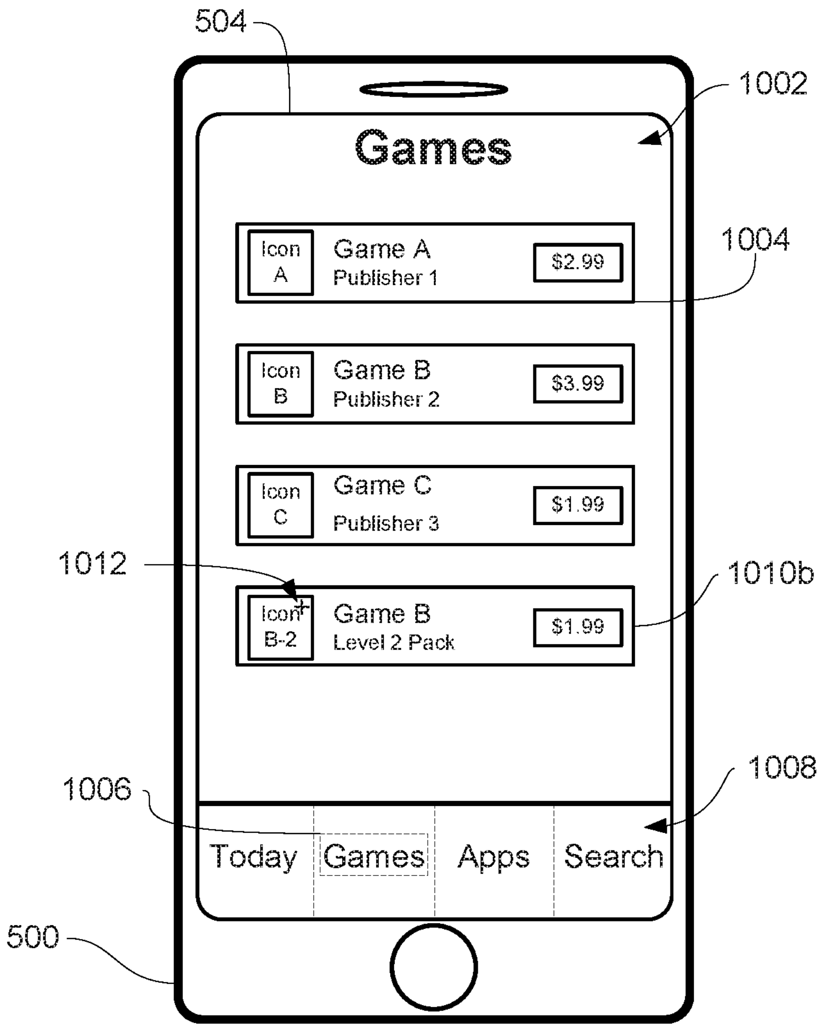
Figure 10M:
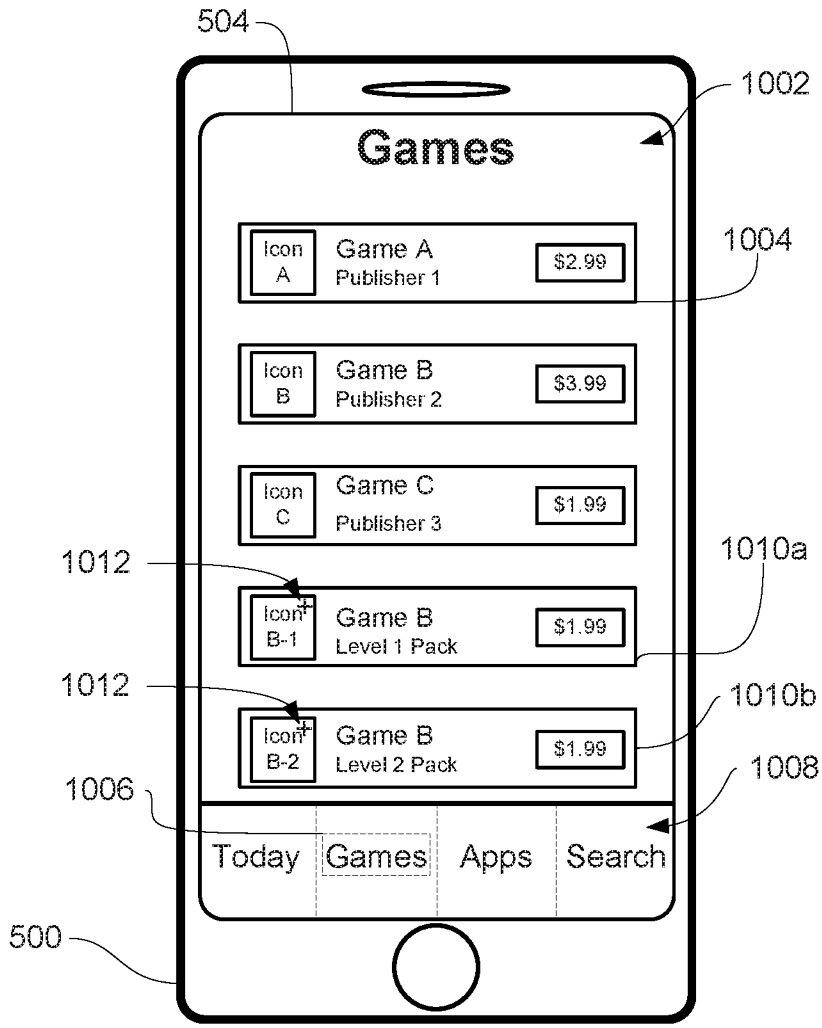
Figure 10N:
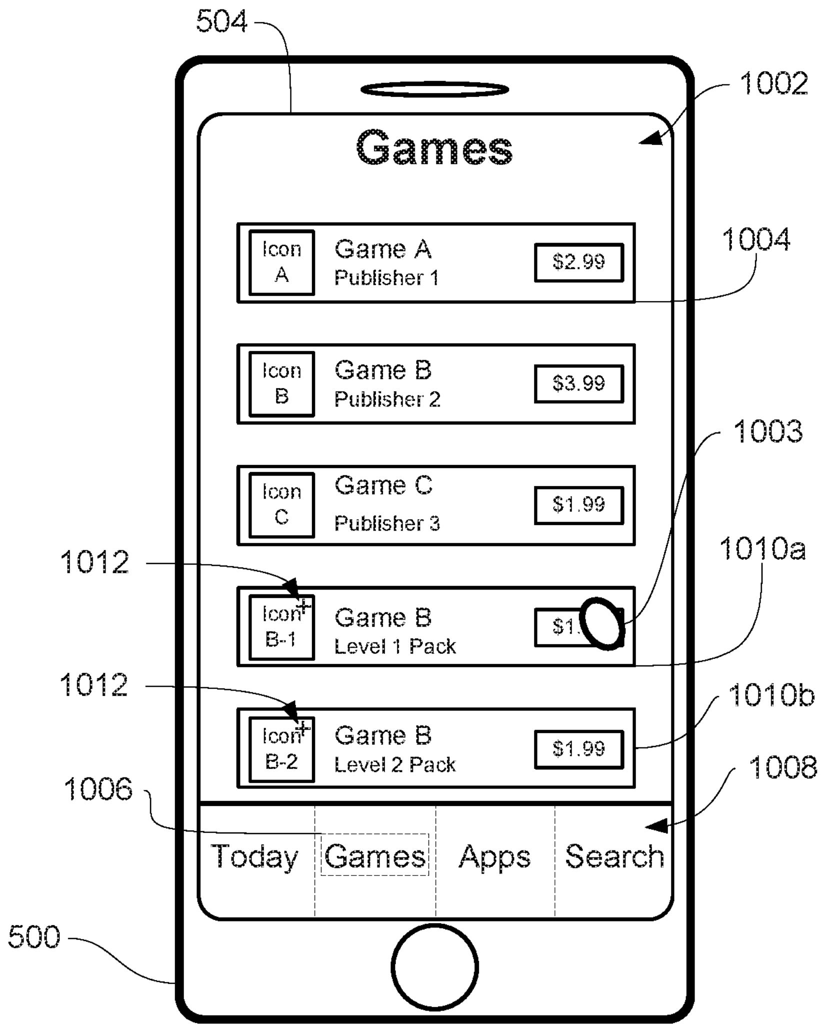
Figure 10O:
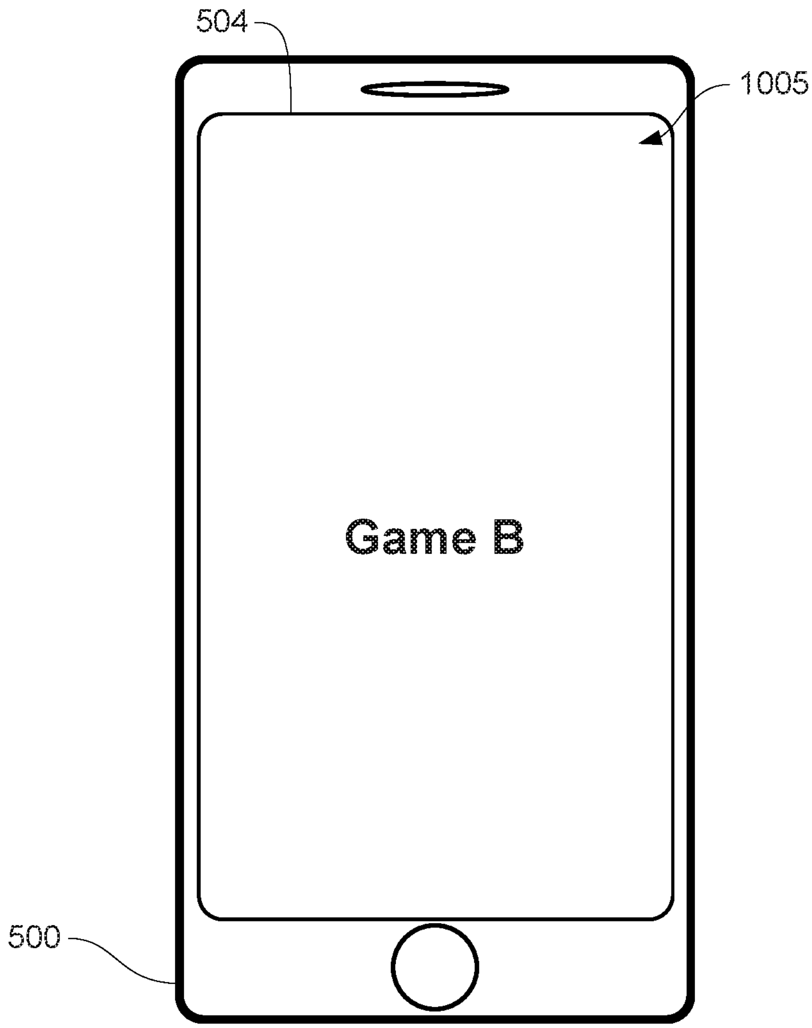
Figure 10P:
Figure 10Q:
Figure 10R:
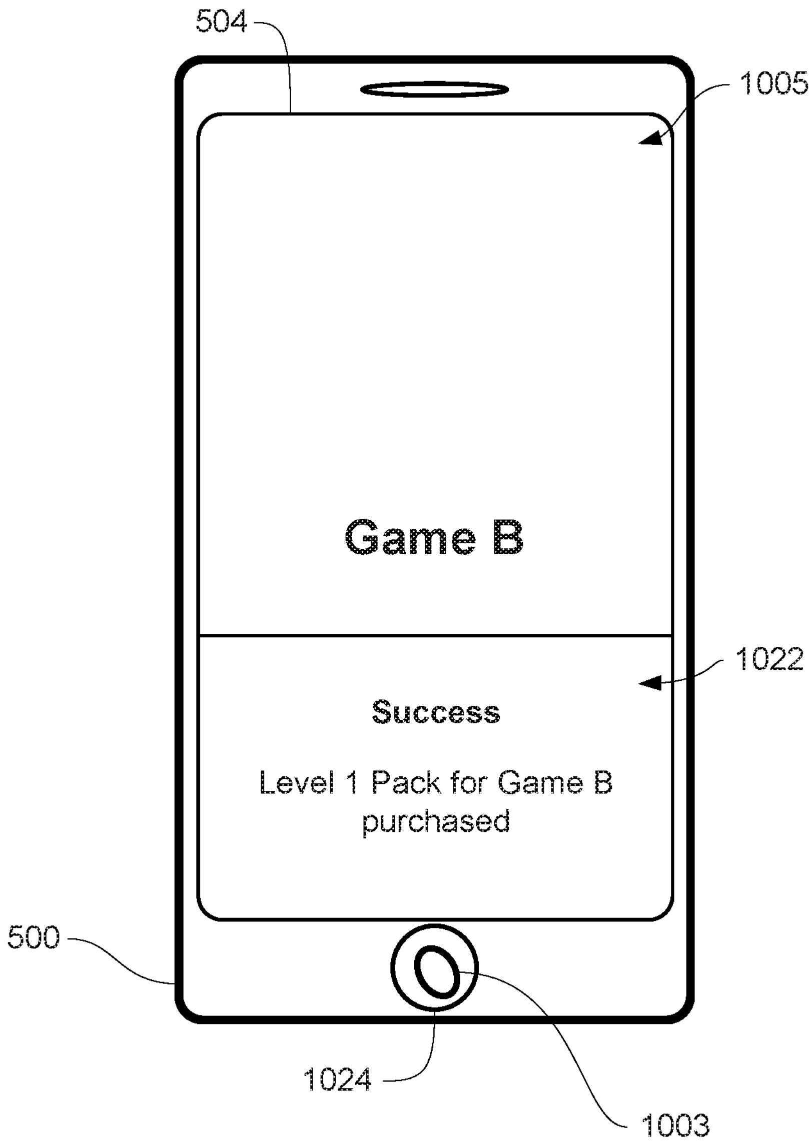
Figure 10S:
Figure 10T:
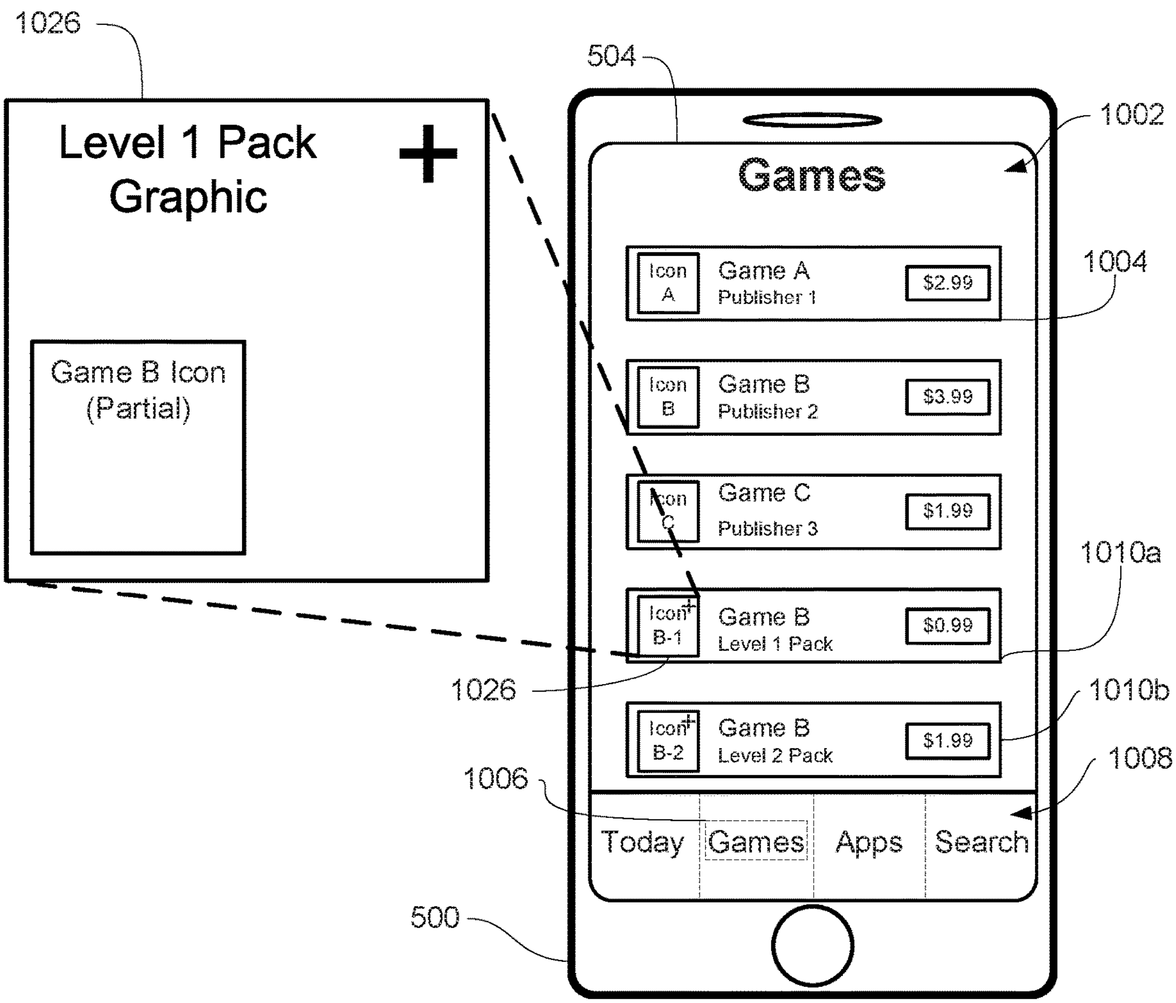
Figure 10U:
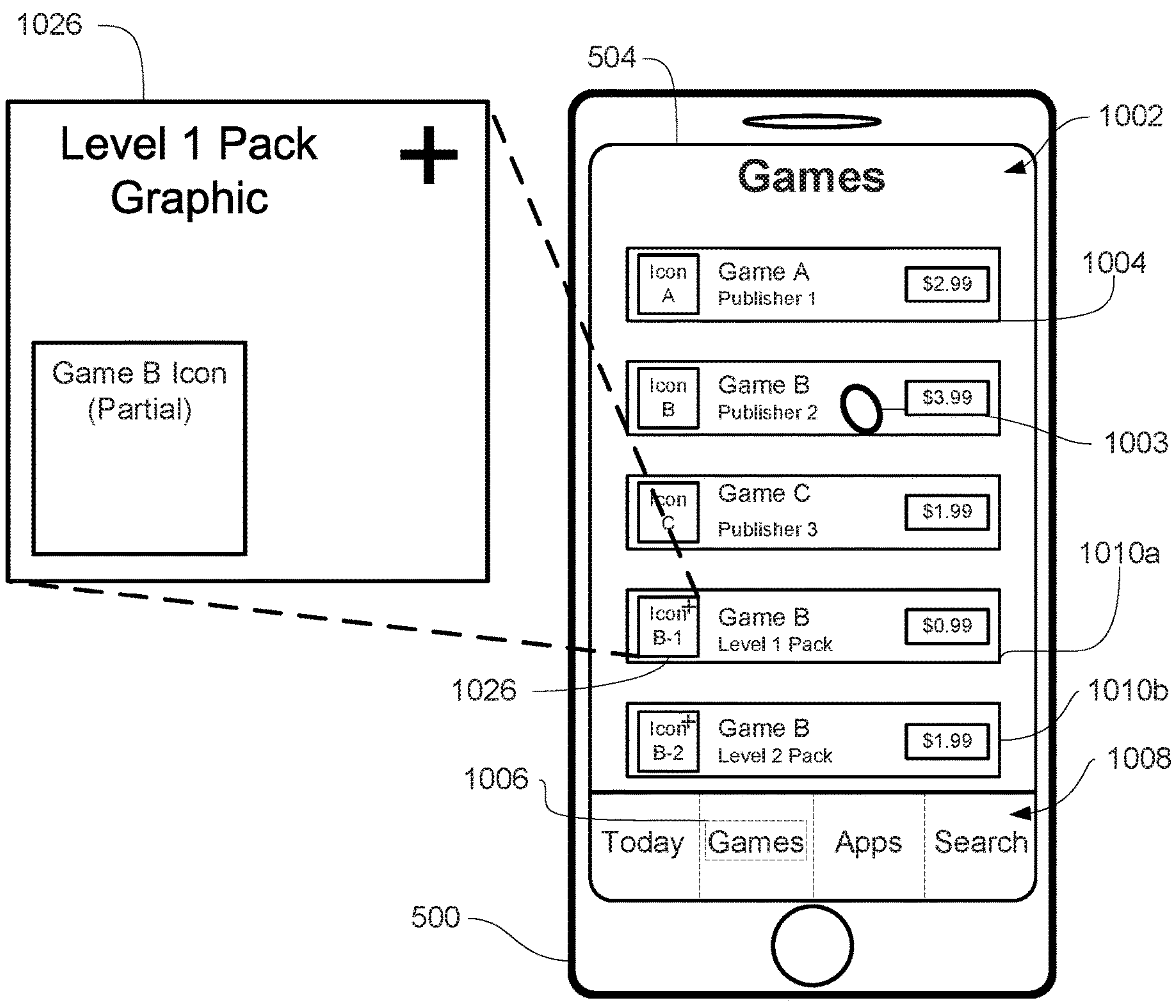
Figure 10V:
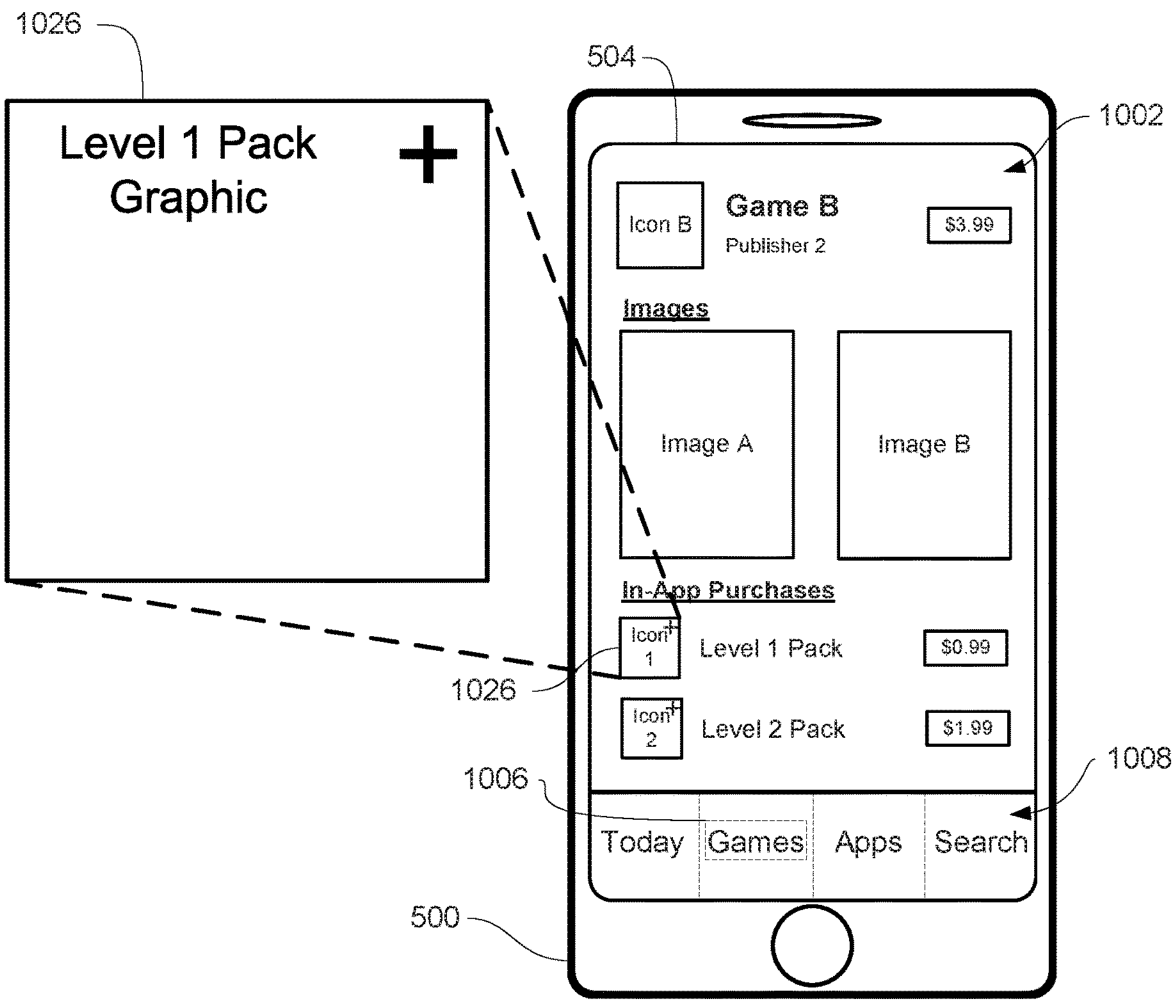
Figure 11B:
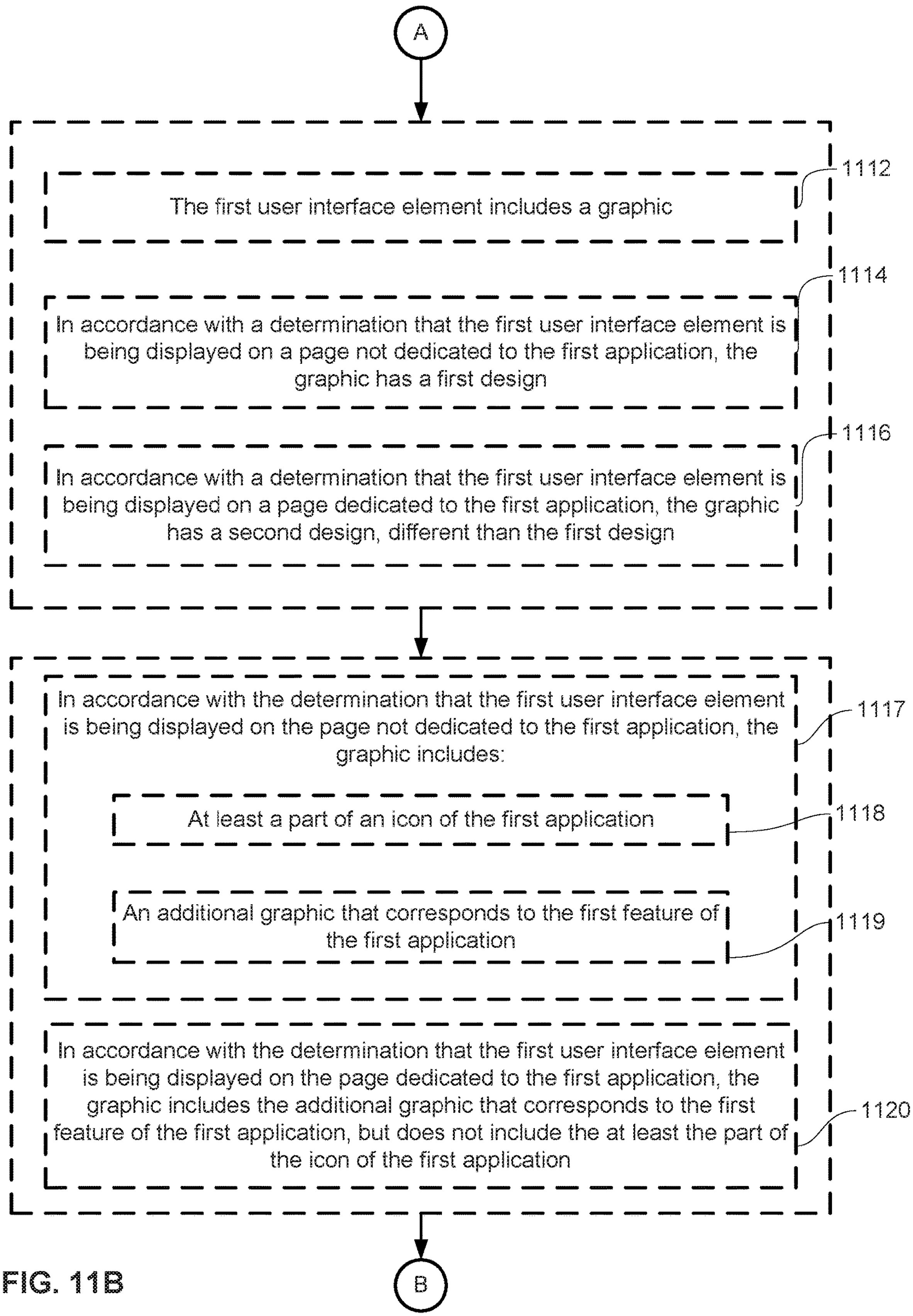
Figure 11C:
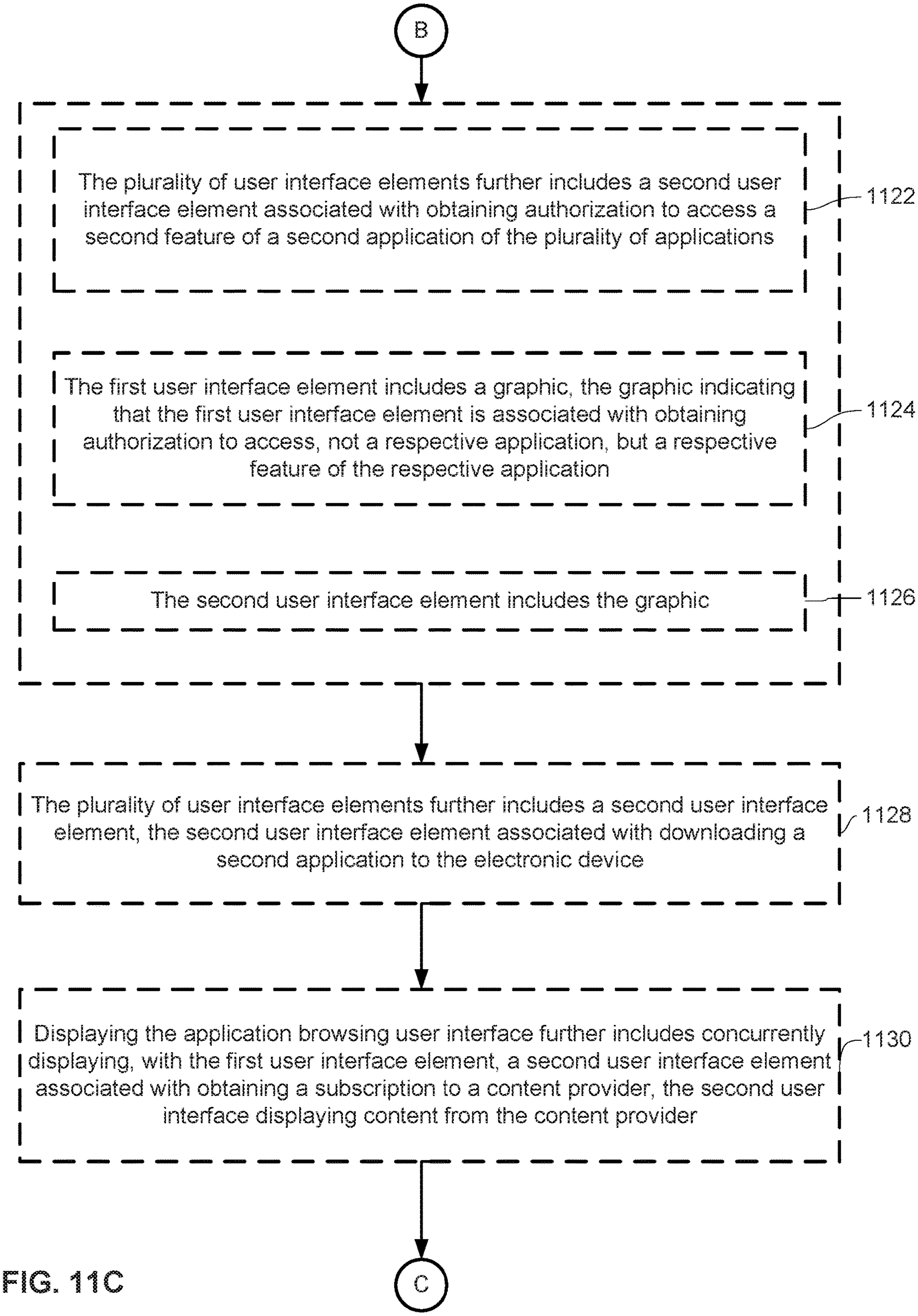
Figure 11D:
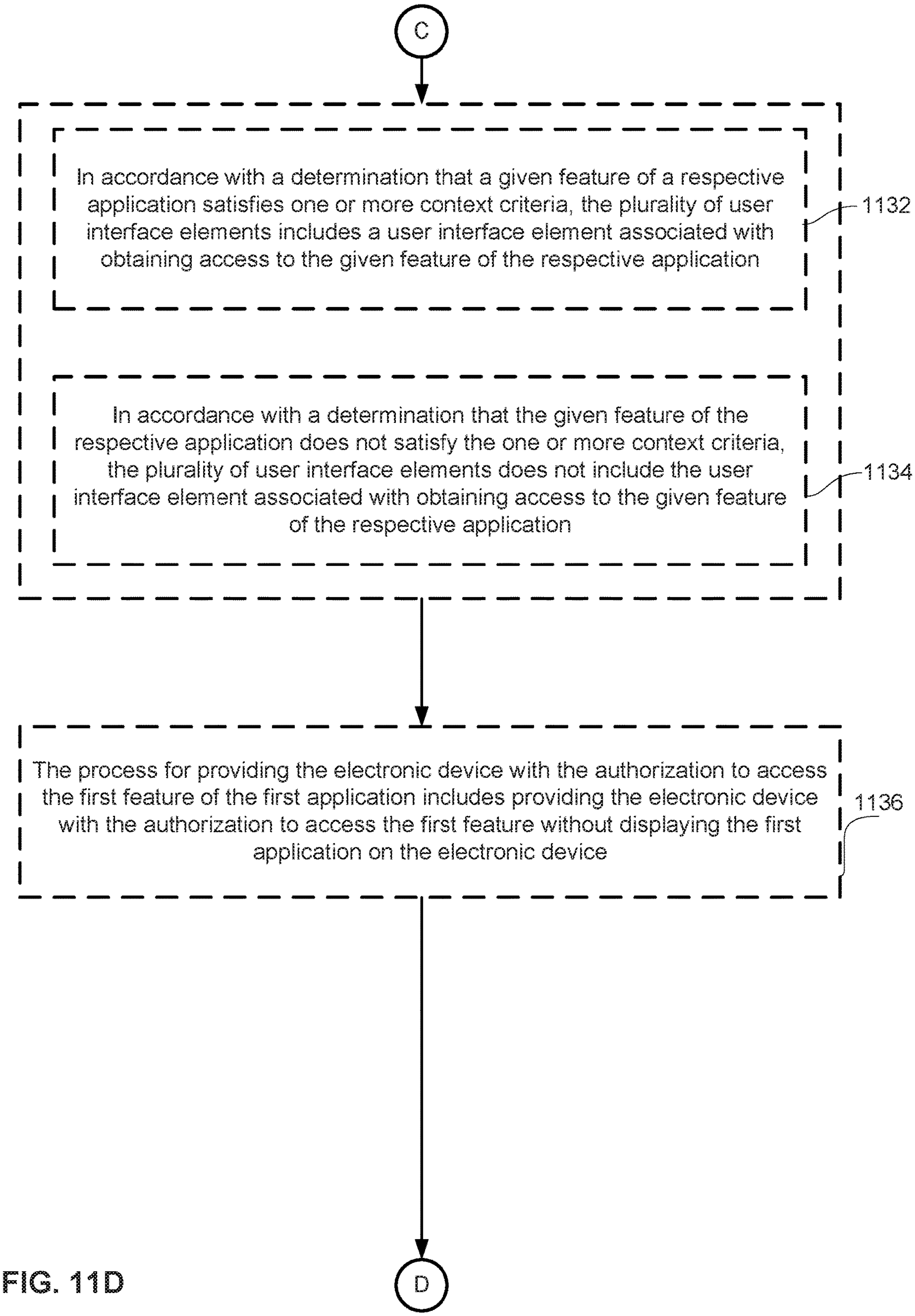
Figure 11E:
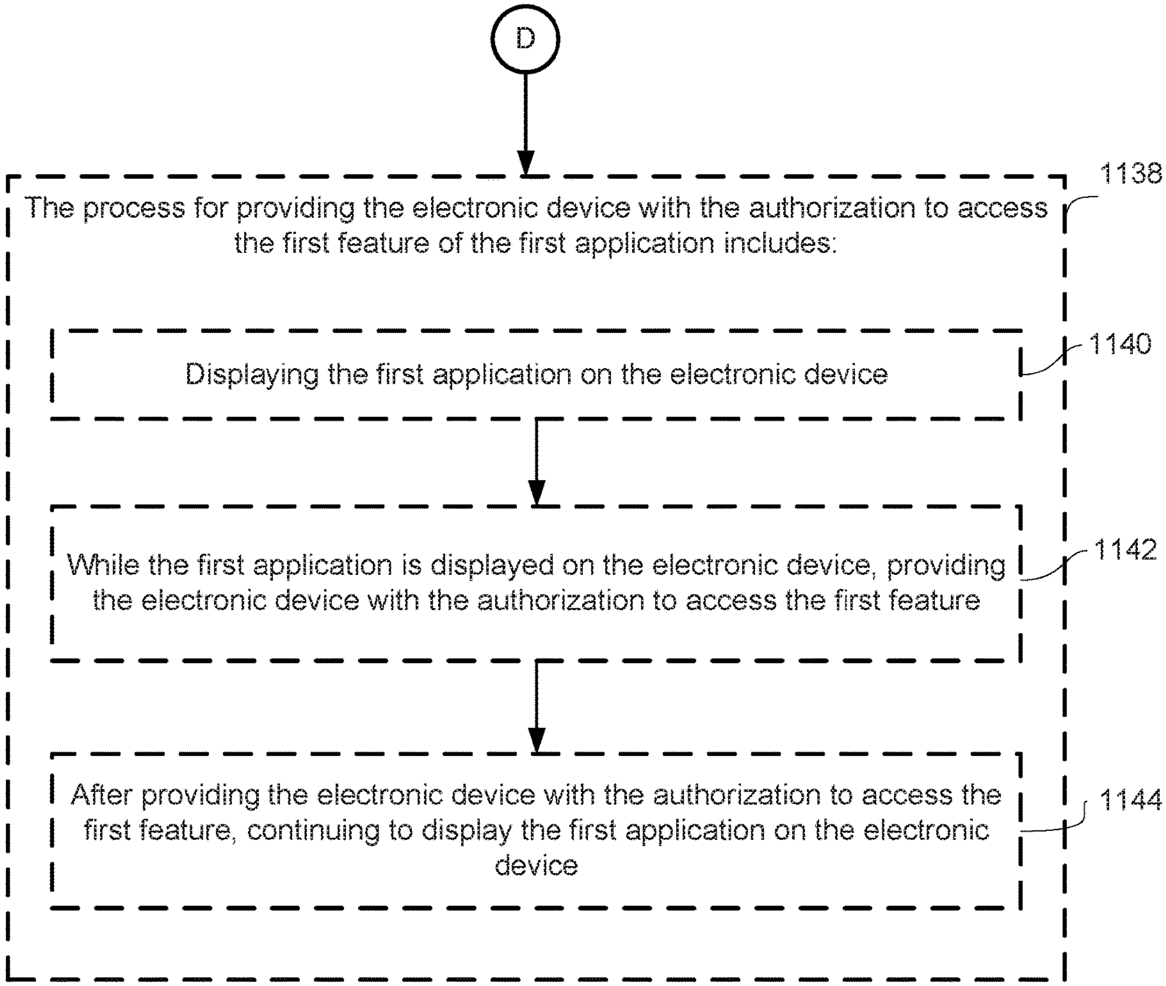

FIGS. 10A-10V illustrate exemplary ways in which an electronic device facilitates presentation of information about, and thus purchase of, in-app purchases for a game or application in an app store application in accordance with some embodiments of the disclosure. The embodiments in these figures are used to illustrate the processes described below, including the processes described with reference to FIGS. 11A-11E.

FIG. 10A illustrates exemplary device 500 with touch screen 504, such as described with reference to FIGS. 5A-5H. Touch screen 504 optionally displays one or more user interfaces that include various content. In the example illustrated in FIG. 10A, touch screen 504 displays an app store application for browsing applications available for download to device 500 that is running on device 500, such as described with reference to FIGS. 6A-6JJJ and FIGS. 8A-8LL. In FIG. 10A, the app store application displays application browsing user interface 1002, which includes a navigation bar 1008. The "Games" element is currently selected, and as a result, user interface 1002 displays various user interface elements for browsing games available for download to device 500. For example, user interface 1002 includes different user interface elements 1004 corresponding to different games. As shown in FIG. 10A, elements 1004 display various information relating to the games to which they correspond. For example, element 1004 corresponds to game A, and displays an icon for game A, information for game A (e.g., the name of game A, the publisher of game A, etc.) and a purchase/download affordance, which is selectable to initiate a process to purchase/download game A to device 500. Other elements in user interface 1002 similarly display corresponding information and elements for games B and C.

In addition to displaying information and links to purchase/download games A-C, user interface 1002 also includes information and links to purchase/download in-app purchases for games available on device 500. For example, user interface 1002 includes element 1010*a*, which corresponds to an in-app purchase for game B (e.g., "Level 1 Pack"), and element 1010*b*, which corresponds to another in-app purchase for game B (e.g., "Level 2 Pack"). Just as the user is able to purchase/download games A-C from user interface 1002, the user is able to purchase/download in-app purchases from user interface 1002. For example, element 1010*a* includes an icon or graphic for the Level 1 Pack in-app purchase for game B, a name/description of the in-app purchase for game B, and a purchase/download affordance for the in-app purchase for game B indicating the $0.99 price for the in-app purchase. Element 1010*b* similarly includes such information and elements for the Level 2 Pack in-app purchase for game B. Finally, icons for in-app purchases optionally include a graphic or other visual indication that indicates that the items with which the icons are displayed correspond to in-app purchases, and not to games or applications themselves—icons for games or applications optionally do not include such a graphic or visual indication. For example, in FIG. 10A, the icons for the in-app purchases for game B include "+" designations 1012 in their upper-right portions, such designations not included in the icons for games A-C.

In some embodiments, device 500 filters the in-app purchases displayed in user interface 1002 depending on whether the user already owns the in-app purchase, whether the user is able to utilize the in-app purchase, and/or other considerations that would indicate that the in-app purchase should or should not be displayed in user interface 1002 as available for purchase/download. For example, in FIG. 10B, the user has already purchased Level 1 Pack for game B, as indicated by the purchase/download affordance for the Level 1 Pack displaying "View" instead of the price for purchasing the Level 1 Pack. As a result, in some embodiments as shown in FIG. 10C, device 500 does not display element 1010*a* for the Level 1 Pack for game B in user interface 1002. Further, game B optionally has other in-app purchases that are available for purchase/download. For example, game B optionally has a Level 3 Pack available for purchase. However, the user's progress in game B is optionally such that the user is currently on Level 1 of game B, and thus cannot utilize the Level 3 Pack just yet. As a result, device 500 optionally does not display the Level 3 Pack in user interface 1002. Device 500 displays the Level 2 Pack for game B in user interface 1002, because the user is optionally able to utilize the Level 2 Pack soon upon completion of level 1 in game B.

In some embodiments, in addition to displaying information and elements for purchasing/downloading games, applications and/or in-app purchases in user interface 1002, device 500 displays information and elements for subscribing to content providers that provide content (e.g., music, movies, videos, games, etc.) to device 500. For example, in FIG. 10D, user interface 1002 includes element 1014 corresponding to content provider A. Element 1014 includes images or video 1018 from content available from content provider A, and affordance 1016 that is selectable to initiate a process to subscribe to content provider A, where affordance 1016 indicates the cost of such subscription being $4.99 per month. Content provider A optionally provides content to device 500 via a corresponding application that must be downloaded to device 500 to be able to access such content, as will be described below.

In FIG. 10E, selection of affordance 1016 for subscribing to content provider A is detected, and in response, device 500 displays subscription payment and authorization overlay 1020 over user interface 1002. Overlay 1020 request confirmation of the user's request to subscribe to content provider A, indicates that an application corresponding to content provider A is going to be downloaded to device 500 if the user subscribes to content provider A, and the price for subscribing to content provider A (as well as other payment information previously described). Overlay 1020 also requests authorization (e.g., biometric or otherwise) for making the payment-subscription to content provider A. If authentication of the user is successful and payment-subscription to content provider A is authorized, device 500 subscribes to content provider A and downloads the application for viewing content from content provider A (if this application is not already downloaded to device 500).

The processes for purchasing an in-app purchase from user interface 1002 will now be described. In FIG. 10G, Level 1 Pack for game B is a paid in-app purchase (e.g., $1.99 cost). In FIG. 10H, selection of the purchase/download affordance for the Level 1 Pack for game B is detected, and in response, device 500 displays payment confirmation overlay 1022 in FIG. 10I. In FIG. 10J, the user provides fingerprint authentication for making the $1.99 payment for purchasing the Level 1 Pack for game B (e.g., via placing a finger 1003 on button 1024, which optionally includes fingerprint reading capabilities, though it is understood that other forms of authentication could be used instead, such as facial recognition, iris recognition, voice recognition, username/password, etc.). In FIG. 10K, the payment authentication is successful and the purchase of the Level 1 Pack is complete, and in FIG. 10L after the purchase of the Level 1 Pack for game B is complete, device 500 stops displaying overlay 1022, and also stops displaying Level 1 Pack for game B in user interface 1002 (e.g., because the user has already purchased Level 1 Pack for game B). Notably, the in-app purchase of FIGS. 10G-10L is completed while device 500 continues to display user interface 1002 of the app store application that is running on device 500. In other words, device 500 does not leave or close the app store application to complete the in-app purchase for game B in FIGS. 10G-10L.

In contrast, in some embodiments, device 500 displays or launches game B before completing the in-app purchase for game B (e.g., because the in-app purchase for game B must be completed from within game B). For example, in FIG. 10M-10N, device 500 displays, and then detects selection of, the purchase/download affordance for the Level 1 Pack for game B. In response, device 500 displays or launches game B (e.g., closes or stops displaying the app store application), as shown in FIG. 10O. Then, while displaying game B, device 500 displays payment confirmation overlay 1022 over game B, as shown in FIG. 10P. In FIG. 10Q, the user provides fingerprint authentication for making the $1.99 payment for purchasing the Level 1 Pack for game B (e.g., via placing a finger 1003 on button 1024, which optionally includes fingerprint reading capabilities, though it is understood that other forms of authentication could be used instead, such as facial recognition, iris recognition, voice recognition, username/password, etc.). In FIG. 10R, the payment authentication is successful and the purchase of the Level 1 Pack is complete, and in FIG. 10S after the purchase of the Level 1 Pack for game B is complete, device 500 stops displaying overlay 1022 over game B, and remains in game B (e.g., continues displaying game B) with the Level 1 Pack now accessible in game B. Notably, the in-app purchase of FIGS. 10M-10S is completed while device 500 is running or displaying game B, and not from within the app store application from which the in-app purchase was initiated. In other words, device 500 leaves or closes the app store application to complete the in-app purchase for game B from within game B in FIGS. 10M-10S.

In some embodiments, the icon displayed for an in-app purchase for a game or application is different depending on where that icon is being displayed (e.g., displayed on a page that is not dedicated to the game or application corresponding to that in-app purchase, or displayed on a page that is dedicated to the game or application corresponding to that in-app purchase). For example, FIG. 10T shows further detail of icon B-1 that is displayed for the Level 1 Pack for game B in user interface 1002. User interface 1002 in FIG. 10T is, as previously described, a user interface that device 500 displays when the "Games" element in navigation bar 1008 is selected, and is for browsing games and/or in-app purchases available for download/purchase on device 500. User interface 1002 in FIG. 10T is optionally not a user interface dedicated to game B. In particular, icon B-1 1026 in FIG. 10T includes the "+" indication for in-app purchases that was previously described, and a graphic that corresponds, specifically, to the Level 1 Pack of game B (as opposed to corresponding to game B more generally). The lower-left portion of the specific Level 1 Pack graphic is overlaid by at least a portion of the icon for game B more generally (e.g., at least a portion of the same icon displayed in user interface 1002 within the game B element—icon B in FIG. 10T). For example, the upper-right quadrant of the icon for game B more generally is optionally overlaid over the lower-left portion of the specific Level 1 Pack graphic to form icon 1026 for the Level 1 Pack for game B. Thus, icon 1026 indicates that it corresponds to an in-app purchase rather than to a game or application more generally (e.g., via the "+" indication), indicates some content specific to the Level 1 Pack (e.g., via the Level 1 Pack graphic), and indicates that it is an in-app purchase for game B (e.g., via the at least portion of the icon for game B in the lower-left portion of icon 1026). The icon for the Level 2 Pack for game B (and similarly the icons for other in-app purchases) displayed in user interface 1002 optionally has a structure analogous to that described above.

As mentioned above, the icon displayed for the Level 1 Pack for game B is optionally different if it is being displayed on a page that is dedicated to game B, such as a product page for game B. In FIG. 10U, selection of the element corresponding to game B in user interface 1002 is detected, and in response, device 500 displays the product page for game B, as shown in FIG. 10V. The product page for game B includes icons for two in-app purchases for game B (e.g., icon 1026 for the Level 1 Pack for game B, and an icon for the Level 2 Pack for game B). However, because icon 1026 for the Level 1 Pack for game B is being displayed on the product page for game B, it does not include the at least the portion of the icon for game B itself, as it did in FIGS. 10T-10S. The icon for Level 2 Pack for game B similarly does not include such a portion of the icon for game B itself. Displaying such portions of the icon for game B in the in-app purchase icons displayed on the product page for game B is optionally redundant, and thus not done by device 500, because the association between the in-app purchases and game B is optionally clear by virtue of the fact that the in-app purchases are being displayed on the product page for game B. As such, the icons for in-app purchases displayed on a product page indicate that they correspond to in-app purchases rather than to games or applications more generally (e.g., via the "+" indication), and indicate some content specific to the in-app purchases (e.g., via the graphics specific to the in-app purchases).

FIGS. 11A-11E are flow diagrams illustrating a method 1100 of facilitating presentation of information about, and thus purchase of, in-app purchases for a game or application in an app store application in accordance with some embodiments of the disclosure. The method 1100 is optionally performed at an electronic device such as device 100, device 300, or device 500 as described above with reference to FIGS. 1A-1B, 2-3, 4A-4B and 5A-5H. Some operations in method 1100 are, optionally, combined and/or the order of some operations is, optionally, changed.

As described below, the method 1100 provides ways of facilitating presentation of information about, and thus purchase of, in-app purchases for a game or application in an app store application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) in communication with a display (e.g., a television, a display of the electronic device, a touch screen of the electronic device, such as touch screen 504) and one or more input devices (e.g., a touch screen of the electronic device, such as touch screen 504, a remote control of the set-top box), displays (1102), on the display, an application browsing user interface for obtaining applications, for use on the electronic device, that are not already available on the electronic device, such as in FIG. 10A (e.g., a user interface of an app store application from which a user is able to browse, purchase and/or download applications to the electronic device, or similarly browse, purchase and/or download individual features of applications to the electronic device). In some embodiments, the application browsing user interface includes a product page for a single application from which a user is able to browse, purchase and/or download applications to the electronic device, or similarly browse, purchase and/or download individual features of applications to the electronic device. For example, the application browsing user interface optionally allows a user to browse individual features—such as level one of a four level game, or levels one and two or a four level game—of an application to which the user is able to purchase access directly from the application browsing user interface, optionally without launching the application corresponding to the individual features. These individual features optionally must otherwise be purchased from within the application corresponding to the individual features, and are optionally referred to as in-app purchases.

Displaying the application browsing user interface optionally includes concurrently displaying a plurality of user interface elements (e.g., cards, boxes, or other user interface elements that include one or more images, one or more videos, text and/or other content) corresponding to one or more applications accessible on the electronic device that are different from the application browsing user interface, such as in FIG. 10A, the plurality of user interface elements including a first user interface element, the first user interface element associated with obtaining authorization to access a first feature of a first application of the plurality of applications, such as in FIG. 10A (e.g., the first user interface element is for an in-app purchase for the first application). For example, the electronic device optionally has authorization to access a first set of features of the first application and does not have authorization to access a second set of features of the first application, and the first feature is optionally in the second set of features. The first user interface element optionally includes information indicating that it is for purchasing access to the first feature.

While displaying the application browsing user interface, the electronic device optionally receives (1104), via the one or more input devices, an input at the first user interface element corresponding to a request to obtain authorization to access the first feature of the first application, such as in FIG. 10H (e.g., the first user interface element optionally includes a selectable affordance for initiating a process to purchase access to the first feature of the first application). The input is optionally a tap on the selectable affordance, a click input detected on a remote control while the selectable affordance has a current focus in the user interface, etc. In some embodiments, in response to receiving the input at the first user interface element corresponding to the request to obtain the authorization to access the first feature of the first application, the electronic device initiates (1106) a process for providing the electronic device with the authorization to access the first feature of the first application, such as in FIGS. 10I-10K (e.g., displaying an information page with additional information about the first feature of the first application, displaying a prompt confirming the user's request to purchase the first feature of the first application, requesting payment authorization for paying for the first feature of the first application, launching the first application and then requesting payment authorization for paying for the first feature of the first application, etc.). Upon completion of this process, the electronic device optionally has access to the first feature of the first application when running the first application. The above-described manner of allowing a user to purchase access to a feature of an application from outside of the application itself allows the electronic device to simplify interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the first user interface element includes a graphic (1112), such as in FIGS. 10T-10V (e.g., an image displayed in the first user interface element, and associated with obtaining authorization to access the in-app purchase to which the first user interface element corresponds). In some embodiments, in accordance with a determination that the first user interface element is being displayed on a page not dedicated to the first application (e.g., the first user interface element is displayed, not on a product page for the first application, but another page of the application browsing user interface. For example, a page for browsing multiple applications available for download to the electronic device, such as a page listing multiple games or non-game applications, a listing of search results that includes the first application and other applications, etc.), the graphic has a first design (1114), such as in FIG. 10T. In some embodiments, in accordance with a determination that the first user interface element is being displayed on a page dedicated to the first application (e.g., a product page for the first application), the graphic has a second design, different than the first design (1116), such as in FIG. 10V. The above-described manner of displaying the graphic of the first user interface element differently depending on where that first user interface element is displayed allows the electronic device to simplify display interactions with the user, which enhances the operability of the device and makes the user-device interface more efficient (e.g., by reducing the information that the electronic device needs to display in certain circumstances), which, additionally, reduces power usage and improves battery life of the device by enabling the user to use the device more quickly and efficiently.

In some embodiments, in accordance with the determination that the first user interface element is being displayed on the page not dedicated to the first application, the graphic includes (1117), at least a part of an icon of the first application (1118) (e.g., an upper-right corner of the icon for the first application, or any other portion of the icon of the first application), and an additional graphic that corresponds to the first feature of the first application (1119), such as in FIG. 10T. For example, in the case that the first user interface element is not displayed on a page dedicated to the first application, the graphic displayed in the first user interface element includes a portion of the icon of the first application—so that the graphic relates, visually and directly, to the first application—and another portion of the graphic includes an image or graphic that is specific, not to the first application, but the specific first feature of the first application. For example, the graphic is optionally the image specific to the first feature, with the upper-right corner of the icon for the first application being overlaid on the lower-left region of the image specific to the feature, such as in FIG. 10T. The image specific to the first feature is optionally larger in displayed size than the portion of the icon of the first application.

In some embodiments, in accordance with the determination that the first user interface element is being displayed on the page dedicated to the first application, the graphic includes the additional graphic that corresponds to the first feature of the first application, but does not include the at least the part of the icon of the first application (1120), such as in FIG. 10V. For example, in the case that the first user interface element is displayed on a page dedicated to the first application, the graphic displayed in the first user interface element optionally includes the image or graphic that is specific, not to the first application, but the specific first feature of the first application, but does not include any portion of the icon of the first application. In such a circumstance, there is optionally no need for the graphic to include or otherwise identify the first application, because the first user interface element is already being displayed on a page dedicated to the first application—thus, its association with the first application is already clearly displayed. The above-described manner of displaying the graphic of the first user interface element differently depending on where that first user interface element is displayed allows the electronic device to simplify display interactions with the user, which enhances the operability of the device and makes the user-device interface more efficient (e.g., by reducing the information that the electronic device needs to display in certain circumstances), which, additionally, reduces power usage and improves battery life of the device by enabling the user to use the device more quickly and efficiently.

In some embodiments, the plurality of user interface elements further includes a second user interface element associated with obtaining authorization to access a second feature of a second application of the plurality of applications (1122), such as in FIG. 10A (e.g., the first user interface element for a first in-app purchase is displayed with a second user interface element for a second in-app purchase in the application browsing user interface). In some embodiments, the first user interface element includes a graphic, the graphic indicating that the first user interface element is associated with obtaining authorization to access, not a respective application, but a respective feature of the respective application (1124), such as in FIG. 10A (e.g., a graphical indication displayed in the first user interface element, such as a "+" overlay over the upper-right of an image displayed in the first user interface element, the image identifying the content or substance of the in-app purchase. The graphical indication is optionally a universal indication that a given user interface element is for an in-app purchase rather than being for an application, itself). In some embodiments, the second user interface element includes the graphic (1126), such as in FIG. 10A. For example, the second user interface element, which is for a second in-app purchase, is also displayed with the "+" overlay in the upper-right of the image of the second user interface element, thus indicating that the second user interface element is also for an in-app purchase rather than being for an application, itself. The above-described manner of displaying the same in-app purchase graphical indication on images for in-app purchases allows the electronic device to display such in-app purchases in a consistent manner, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the plurality of user interface elements further includes a second user interface element, the second user interface element associated with downloading a second application to the electronic device (1128), such as in FIG. 10A (e.g., rather than obtaining authorization to access a respective feature of the second application). For example, user interface elements for applications, themselves, and user interface elements for in-app purchases are optionally displayed together and alongside one another in the application browsing user interface. The above-described manner of displaying in-app purchases alongside applications allows the electronic device to present additional potentially relevant information to a user of the electronic device when the user is browsing games or non-game applications, which enhances the operability of the device and makes the user-device interface more efficient (e.g., by facilitating more immediate presentation of information relevant to user), which, additionally, reduces power usage and improves battery life of the device by enabling the user to use the device more quickly and efficiently.

In some embodiments, displaying the application browsing user interface further includes concurrently displaying, with the first user interface element, a second user interface element associated with obtaining a subscription to a content provider, where the second user interface element displays content from the content provider, such as in FIG. 10D (e.g., a content provider that provides content to the electronic device via an application for that content provider that is downloaded on the electronic device). For example, user interface elements for content subscriptions and user interface elements for in-app purchases are optionally displayed together and alongside one another in the application browsing user interface, such as in FIG. 10D. Completing a subscription to a content provider in this context optionally includes downloading an application corresponding to that content provider to the electronic device, the content from that content provider available for viewing on the electronic device via that application. The above-described manner of displaying in-app purchases alongside subscription elements allows the electronic device to present additional potentially relevant information to a user of the electronic device when the user is browsing games or non-game applications, which enhances the operability of the device and makes the user-device interface more efficient (e.g., by facilitating more immediate presentation of information relevant to user), which, additionally, reduces power usage and improves battery life of the device by enabling the user to use the device more quickly and efficiently.

In some embodiments, in accordance with a determination that a given feature of a respective application satisfies one or more context criteria (e.g., the user is able to access the given feature or in-app purchase in the respective application based on the user's progress in the respective application; the user has not already purchased or otherwise obtained access to the given feature or in-app purchase; or both), the plurality of user interface elements includes a user interface element associated with obtaining access to the given feature of the respective application (1132), such as in FIG. 10A. In some embodiments, in accordance with a determination that the given feature of the respective application does not satisfy the one or more context criteria (e.g., the user is not able to access the given feature or in-app purchase in the respective application based on the user's progress in the respective application; the user has already purchased or otherwise obtained access to the given feature or in-app purchase), the plurality of user interface elements does not include the user interface element associated with obtaining access to the given feature of the respective application (1134), such as in FIG. 10C (e.g., the user's progress in the respective application is optionally such that the user is only able to utilize some features of the respective application but not others.). As such, in some embodiments, the electronic device displays user interface elements for obtaining authorization to access those features that the user is able to utilize. In some embodiments, the electronic device does not display user interface elements for obtaining authorization to access others of the features, because the user is not able to access those features at the user's current progress in the respective application. For example, if the user is currently on level three of a nine level game, the user optionally is only able to access features relating to level three of the game, and possibly level four of the game, but cannot access features relating to levels five through nine of the game. In such circumstances, the electronic device optionally only displays features for levels three and four, but not features for levels five through nine.

Similarly, the electronic device optionally does not display user interface elements for features that the user's progress in the respective application renders moot or unnecessary. For example, if the user has progressed to level three of a nine level game, features relating to levels one and two are optionally not displayed by the electronic device. In some embodiments, the electronic device filters the features displayed for the respective application depending on whether the user has already purchased or otherwise obtained access to those features. In some embodiments, the electronic device will not display features that the user has already purchased or obtained access to, such as in FIG. 10C. The above-described manner of filtering in-app purchases so as to only display those that the user is able to access based on their progress in the relevant application, or to only display those that the user has not already purchased, allows the electronic device to present more focused and relevant information to a user of the electronic device when the user is browsing such in-app purchases, which enhances the operability of the device and makes the user-device interface more efficient (e.g., by facilitating more immediate presentation of information relevant to the user, and thus reducing the number of user inputs needed to display such relevant information), which, additionally, reduces power usage and improves battery life of the device by enabling the user to use the device more quickly and efficiently.

In some embodiments, the process for providing the electronic device with the authorization to access the first feature of the first application includes providing the electronic device with the authorization to access the first feature without displaying (e.g., without launching, waking, or otherwise running) the first application on the electronic device (1136), such as in FIGS. 10H-10L. For example, in some embodiments, selection of a selectable affordance in the first user interface element for initiating a process to purchase access to the first feature of the first application starts a process whereby one or more of a prompt confirming the user's request to purchase the first feature of the first application is displayed, payment authorization for paying for the first feature of the first application is requested, and upon the payment being authorized, the electronic device is provided access to the first feature of the first application (e.g., the in-app purchase has been completed), all without launching, opening, waking, etc. the first application. Thus, in some embodiments, the in-app purchase is completed from outside of the first application, without displaying the first application. The above-described manner of allowing a user to purchase access to a feature of an application from outside of the application itself allows the electronic device to simplify interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for providing the electronic device with the authorization to access the first feature of the first application includes (1138), displaying (e.g., launching, waking, or otherwise running) the first application on the electronic device (1140), such as in FIGS. 10N-10S (e.g., selection of a selectable affordance in the first user interface element for initiating a process to purchase access to the first feature of the first application optionally launches, wakes, displays or otherwise runs the first application on the electronic device). While the first application is displayed on the electronic device, the process optionally includes providing (1142) the electronic device with the authorization to access the first feature, such as in FIGS. 10P-10R. For example, providing the electronic device with the authorization to access the first feature optionally includes displaying, as an overlay over the first application, a dialog confirming that the user wishes to access the in-app purchase (e.g., if the in-app purchase is free) and/or displaying a payment authorization overlay displayed over the first application that requests payment authorization for the in-app purchase (e.g., if the in-app purchase is paid). If the in-app purchase is confirmed or if payment is authorized, the in-app purchase is optionally complete and the electronic device is optionally authorized to access the first feature of the first application.

After providing the electronic device with the authorization to access the first feature, the process optionally includes continuing (1144) to display the first application on the electronic device, such as in FIG. 10S (e.g., once the in-app purchase or authorization process is completed, the electronic device optionally drops into the first application from which the user is able to access the content of the in-app purchase). The above-described manner of facilitating the purchase or authorization of an in-app purchase from within the corresponding application itself allows the electronic device to provide more immediate access to the content of the in-app purchase, which enhances the operability of the device and makes the user-device interface more efficient (e.g., by reducing the number of user inputs needed to access the content of the in-app purchase), which, additionally, reduces power usage and improves battery life of the device by enabling the user to use the device more quickly and efficiently.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, 1500 and 1700) are also applicable in an analogous manner to method 1100 described above with respect to FIGS. 11A-11E. For example, the user interfaces, user interface elements, processes for downloading applications, processes for purchasing applications, product pages, selectable affordances, requests to obtain authorization to access a feature of an application, processes for providing the electronic device with the authorization to access the feature of the application, etc., described above with reference to method 1100 optionally have one or more of the characteristics of the user interfaces, user interface elements, processes for downloading applications, processes for purchasing applications, product pages, selectable affordances, requests to obtain authorization to access a feature of an application, processes for providing the electronic device with the authorization to access the feature of the application, etc. described herein with reference to other methods described herein (e.g., methods 700, 900, 1300, 1500 and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 11A-11E are, optionally, implemented by components depicted in FIGS. 1A-1B. For example, displaying operation 1102, receiving operation 1104 and initiating operation 1106 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In-App Purchase Process

Users interact with electronic devices in many different manners, including browsing applications that may be available (e.g., available for purchase and/or download) on the electronic devices. In some circumstances, in-app purchases (e.g., one or more features of a game or application that are available for purchase, separate from the game or application, itself) are available for the games or applications that are available on the electronic devices. The embodiments described below provide ways in which an electronic device facilitates the purchase of in-app purchases for the games or applications that are available on the electronic device, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12MM illustrate exemplary ways in which an electronic device facilitates the purchase of in-app purchases for the games or applications that are available on the electronic device in accordance with some embodiments of the disclosure. The embodiments in these figures are used to illustrate the processes described below, including the processes described with reference to FIGS. 13A-13I.

Figure 12A:
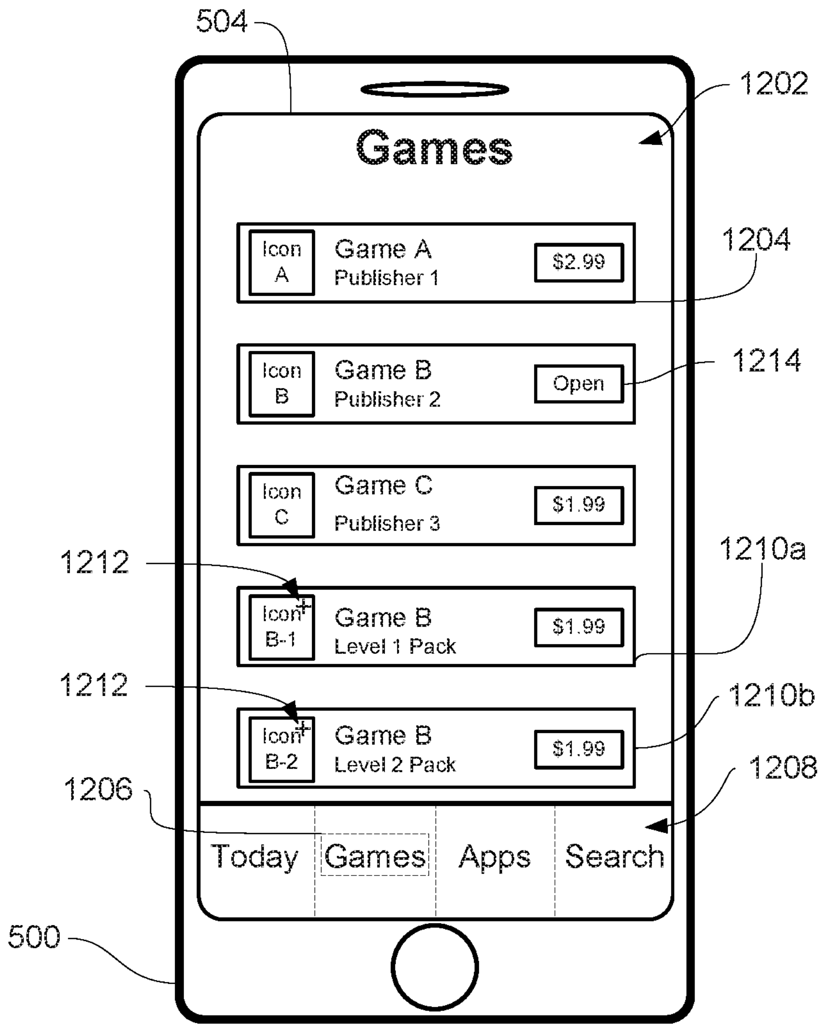
FIGS. 12A-12MM illustrate exemplary ways in which an electronic device facilitates the purchase of in-app purchases for the games or applications that are available on the electronic device in accordance with some embodiments of the disclosure.

FIG. 12A illustrates exemplary device 500 with touch screen 504, such as described with reference to FIGS. 5A-5H. Touch screen 504 optionally displays one or more user interfaces that include various content. In the example illustrated in FIG. 12A, touch screen 504 displays an app store application for browsing applications available for download to device 500 that is running on device 500, such as described with reference to FIGS. 6A-6JJJ, FIGS. 8A-8LL and FIGS. 10A-10V. In FIG. 12A, the app store application displays application browsing user interface 1202, which includes a navigation bar 1208. The "Games" element is currently selected, and as a result, user interface 1202 displays various user interface elements for browsing games available for download to device 500. For example, user interface 1202 includes different user interface elements 1204 corresponding to different games. As shown in FIG. 12A, elements 1204 display various information relating to the games to which they correspond. For example, element 1204 corresponds to game A, and displays an icon for game A, information for game A (e.g., the name of game A, the publisher of game A, etc.) and a purchase/download affordance, which is selectable to initiate a process to purchase/download game A to device 500. Other elements in user interface 1202 similarly display corresponding information and elements for games B and C. User interface 1202 also includes information and links to purchase/download in-app purchases for games available on device 500. For example, user interface 1202 includes element 1210*a*, which corresponds to an in-app purchase for game B (e.g., "Level 1 Pack"), and element 1210*b*, which corresponds to another in-app purchase for game B (e.g., "Level 2 Pack"). Just as the user is able to purchase/download games A-C from user interface 1202, the user is able to purchase/download in-app purchases from user interface 1202. For example, element 1210*a* includes an icon or graphic for the Level 1 Pack in-app purchase for game B, a name/description of the in-app purchase for game B, and a purchase/download affordance for the in-app purchase for game B indicating the $1.99 price for the in-app purchase. Element 1210*b* similarly includes such information and elements for the Level 2 Pack in-app purchase for game B. Finally, icons for in-app purchases optionally include a graphic or other visual indication that indicates that the items with which the icons are displayed correspond to in-app purchases, and not to games or applications themselves—icons for games or applications optionally do not include such a graphic or visual indication. For example, in FIG. 12A, the icons for the in-app purchase for game B include "+" designations 1212 in their upper-right portions, such designations not included in the icons for games A-C.

Figure 12B:
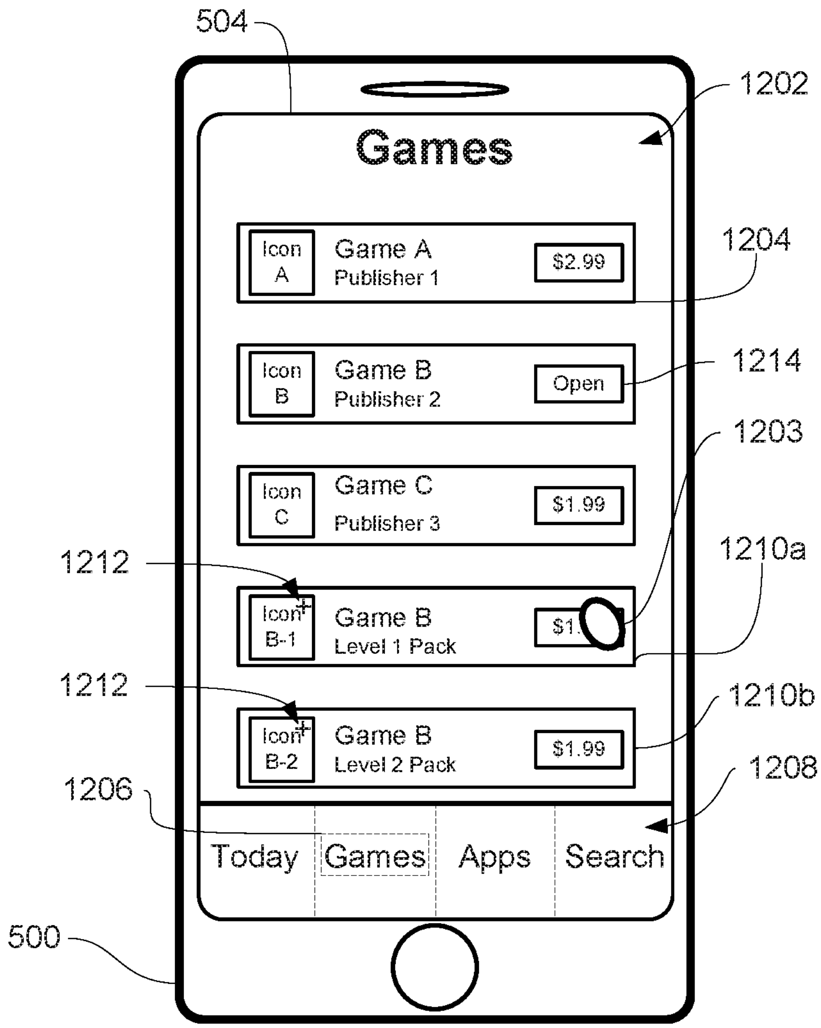

When a user selects the affordance for purchasing/downloading an in-app purchase, device 500 optionally responds differently depending on whether the in-app purchase is a free or paid in-app purchase, whether the game or application corresponding to the in-app purchase is downloaded on device 500, and whether the game or application corresponding to the in-app purchase is a free or paid game or application. For example, in FIG. 12A, game B is already downloaded on device 500 (e.g., as indicated by affordance 1214 for game B displaying "Open" rather than "Get" or a price). In FIG. 12B, selection of the affordance for purchasing the Level 1 Pack for game B is detected, the Level 1 Pack for game B costing $1.99. In response, because the Level 1 Pack for game B requires payment, device 500 displays payment confirmation overlay 1222 for confirming payment for the Level 1 Pack for game B, as shown in FIG. 12C, from which the user is able to complete or cancel the purchase of the Level 1 Pack for game B.

Figure 12C:
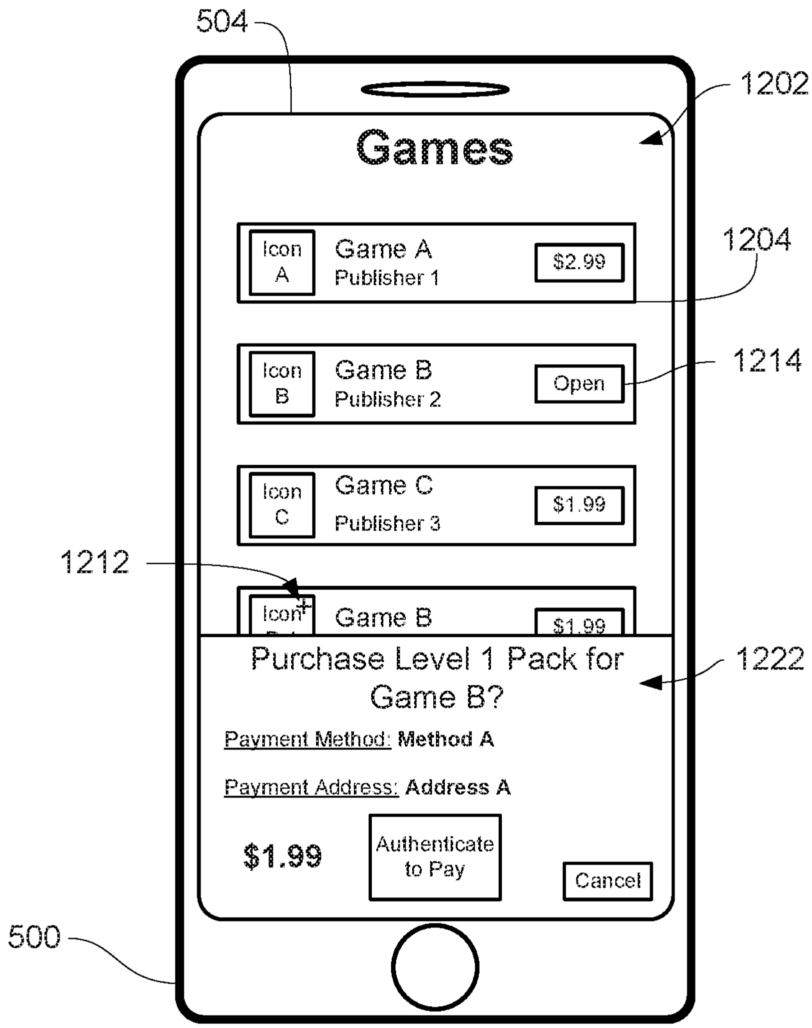
Figure 12D:
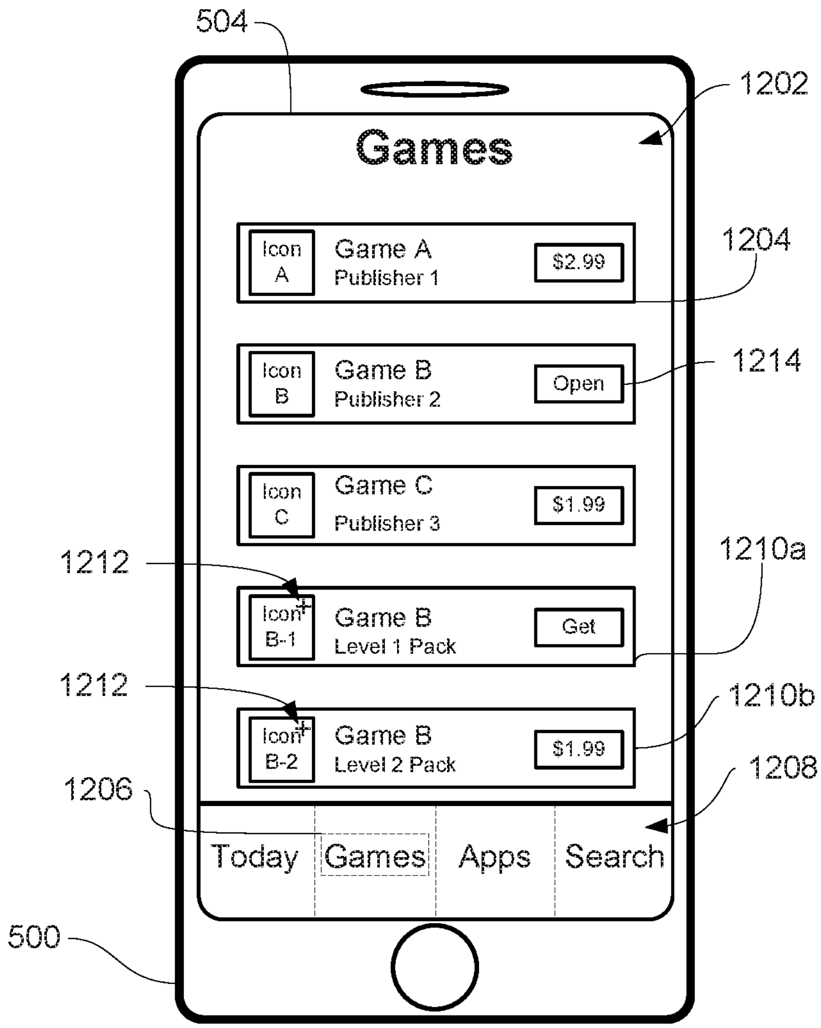
Figure 12E:
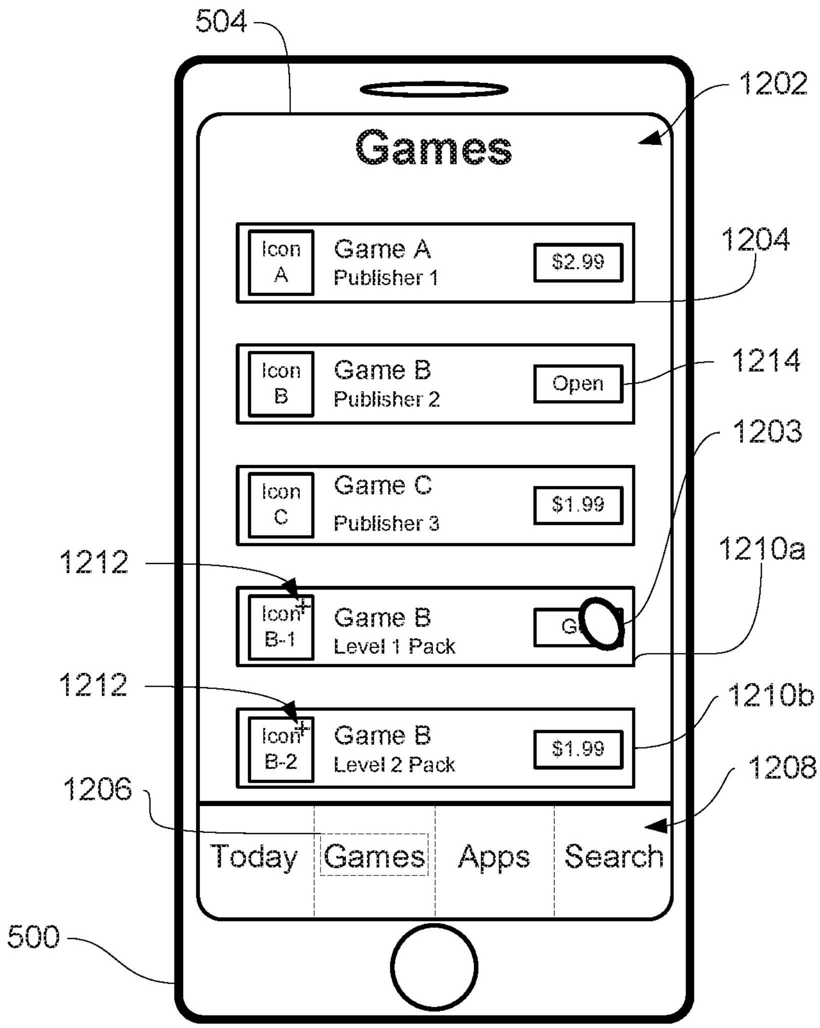
Figure 12F:
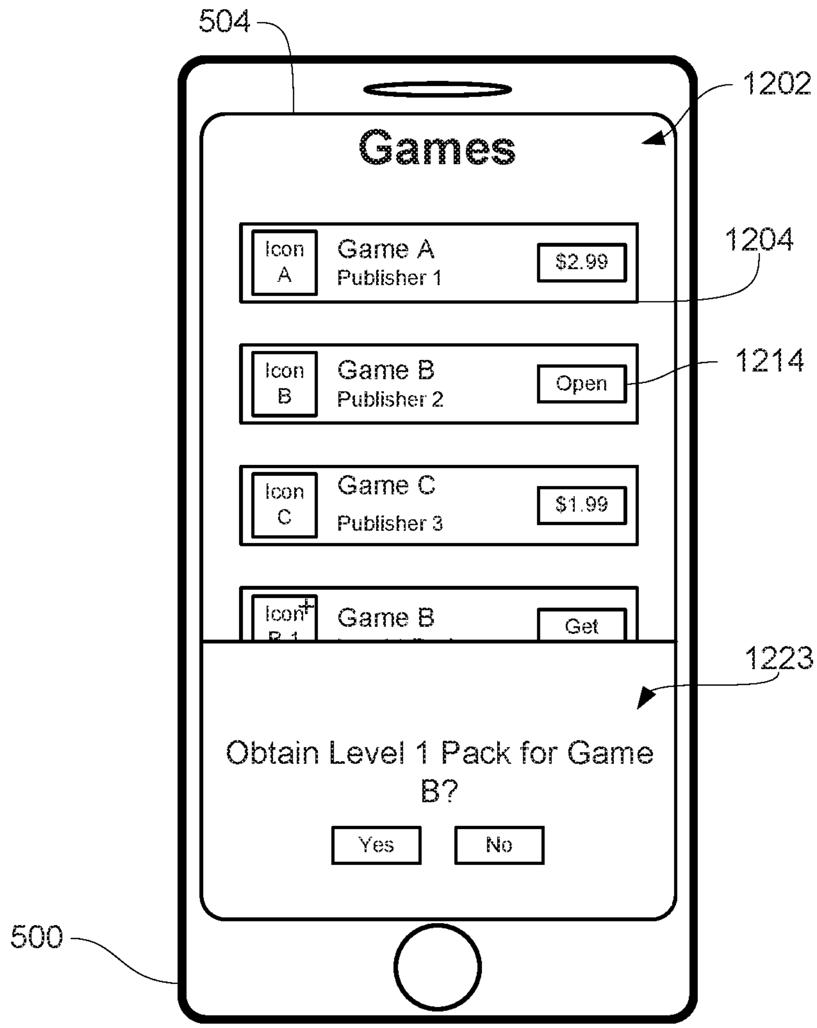

FIG. 12D illustrates another example in which game B is already downloaded on device 500, but the Level 1 Pack for game B is a free in-app purchase (e.g., promotional content, or previously purchased in-app content) rather than a paid in-app purchase as in FIGS. 12A-12C. In FIG. 12E, selection of the affordance for obtaining access to the Level 1 Pack for game B is detected. In response, because the Level 1 Pack for game B does not require payment, device 500 displays confirmation overlay 1223, as shown in FIG. 12F, for confirming the user's request to obtain the Level 1 Pack for game B from which the user is able to complete or cancel the request for the Level 1 Pack for game B, without displaying payment confirmation overlay 1222 shown in FIG. 12C.

In some embodiments, device 500 must first launch or display game B before an in-app purchase for game B is completed (e.g., because game B requires that in-app purchases be processed or completed from within game B). For example, in FIG. 12G, selection of the affordance for obtaining access to the Level 1 Pack for game B is detected. In response, device 500 launches or displays game B (e.g., exits or closes the app store application), and displays payment confirmation overlay 1222 over game B for confirming payment for the Level 1 Pack for game B, as shown in FIG. 12H.

Figure 12G:
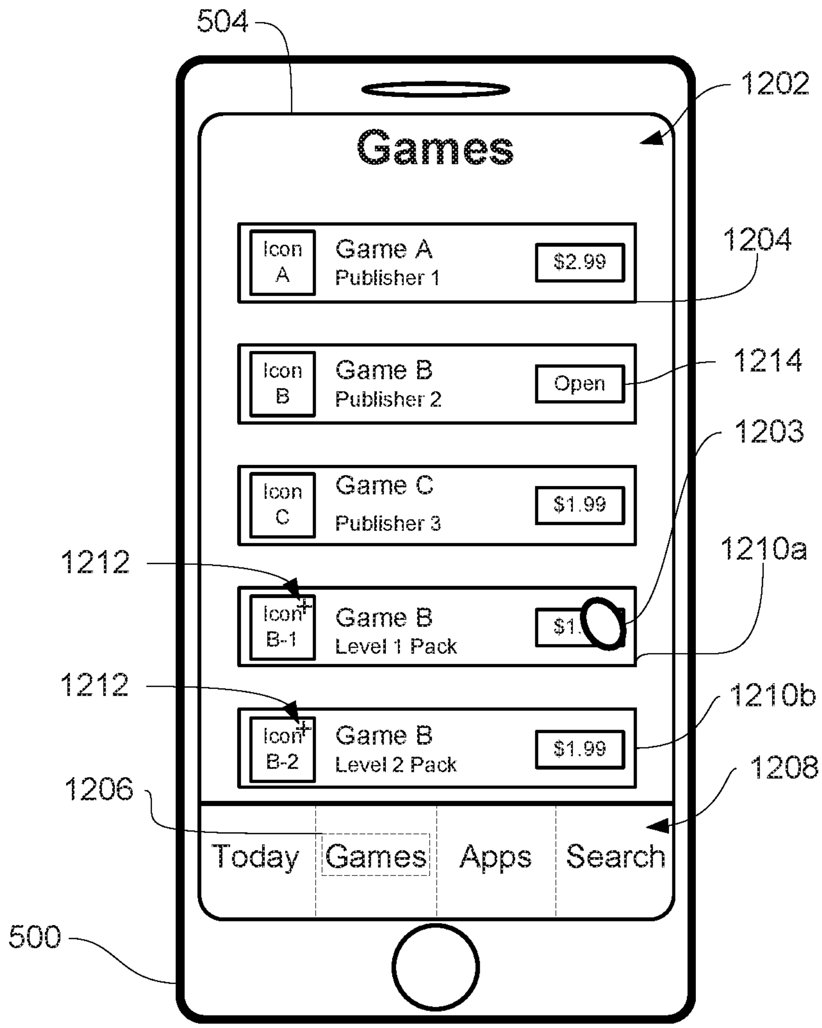
Figure 12H:
Figure 12I:
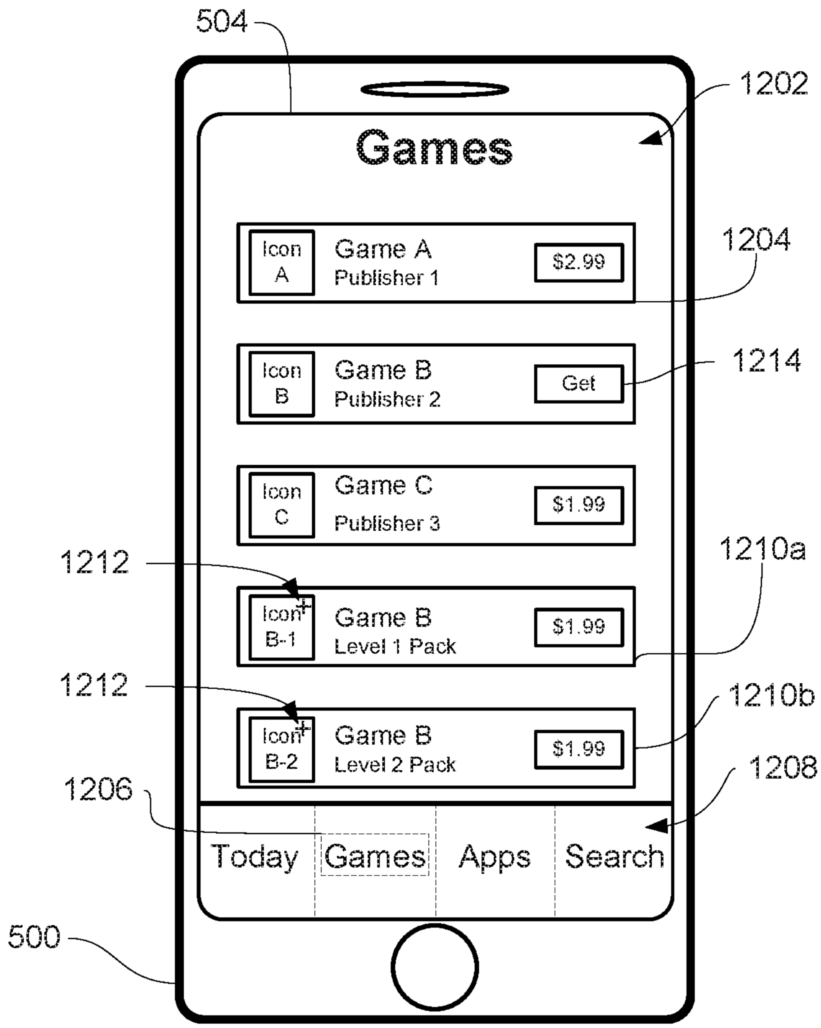
Figure 12J:
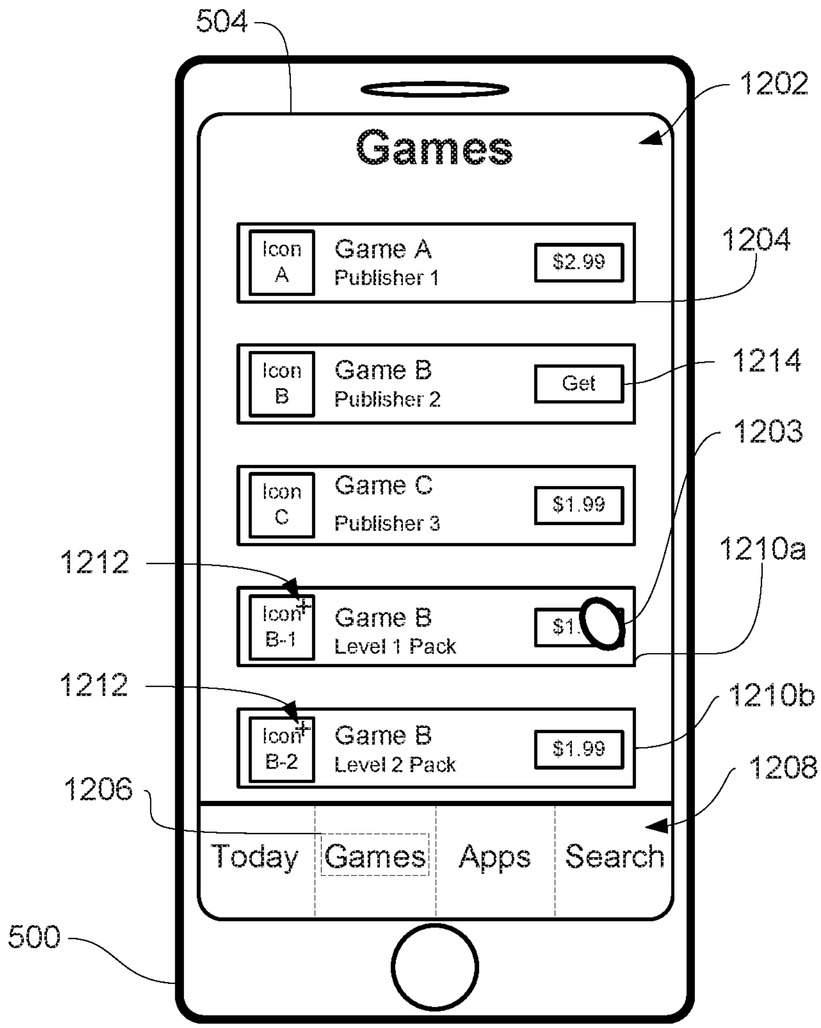
Figure 12K:
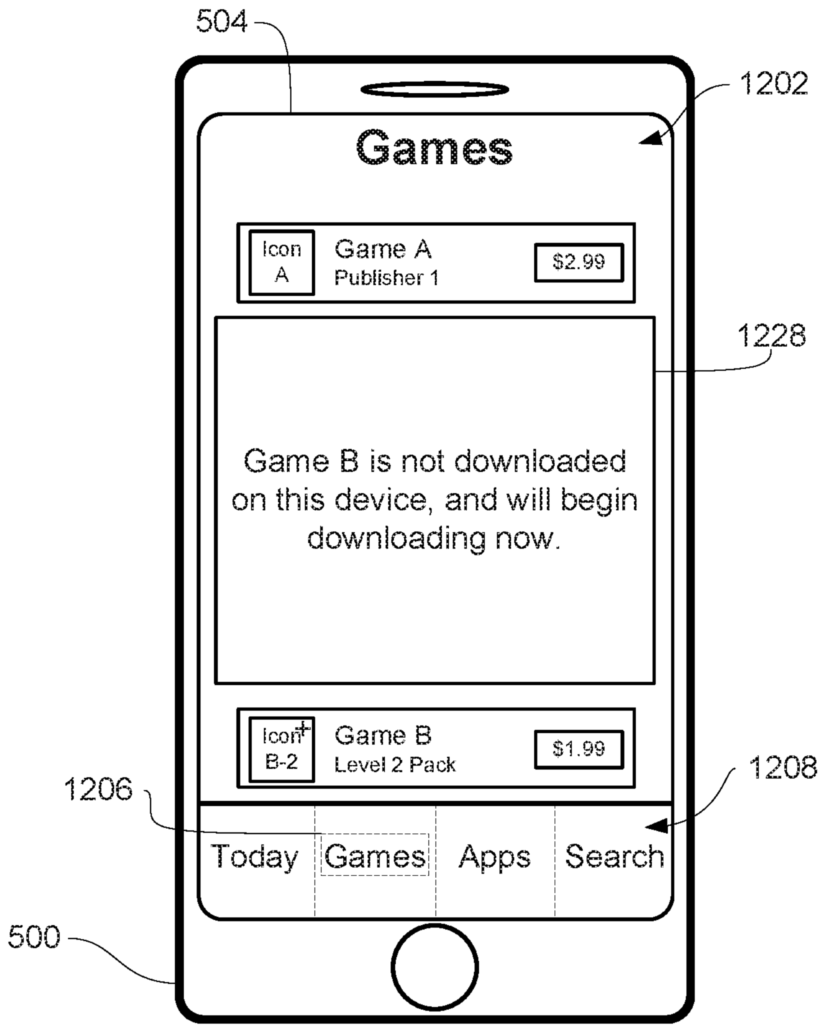
Figure 12L:
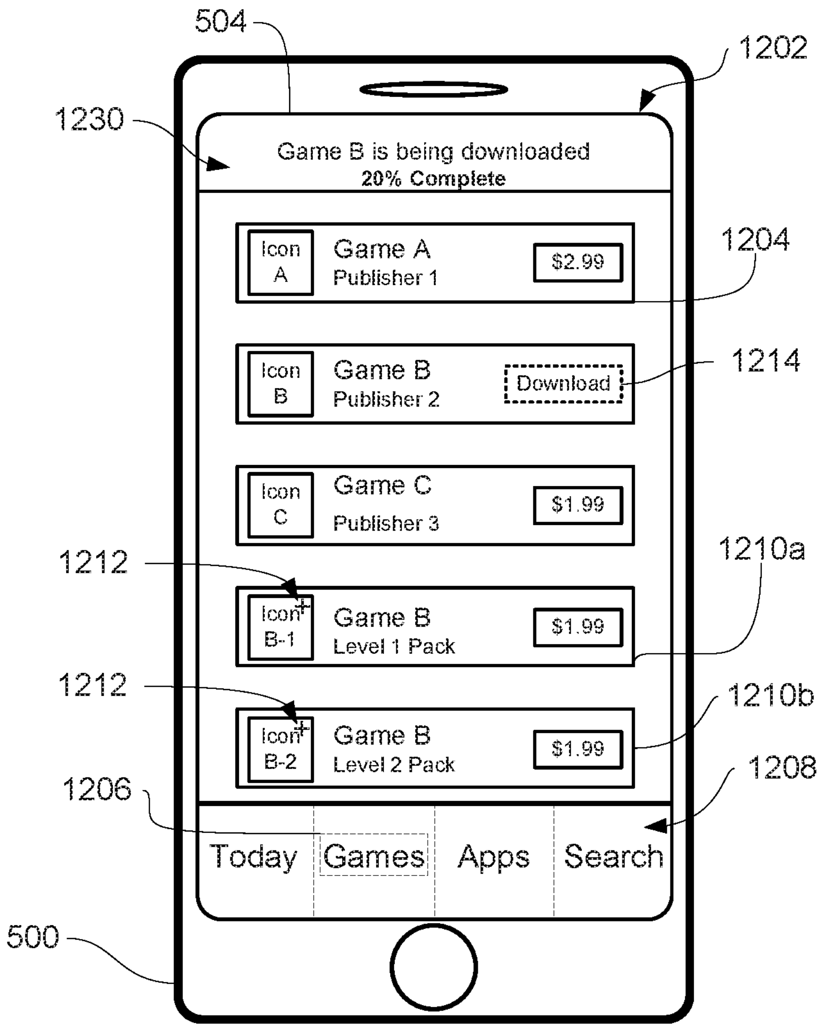

FIGS. 12I-12QQ illustrate examples in which an in-app purchase is requested by the user when the game or application corresponding to that in-app purchase is not yet downloaded on device 500. For example, in FIG. 12I, game B is not downloaded to device 500 and is a free game, as indicated by affordance 1214. In FIG. 12J, selection of the affordance for obtaining access to the Level 1 Pack for game B is detected. In response, device 500 displays overlay 1228 over user interface 1202 that indicates that game B is not yet downloaded on device 500, as shown in FIG. 12K, and begins automatically downloading game B to device 500, as shown in FIG. 12L (e.g., as indicated by the "Download" displayed by affordance 1214 for game B, and by notification 1230 displayed by device 500 over user interface 1202 when it begins downloading game B). Thus, if the game or application corresponding to the in-app purchase requested is not yet downloaded on device 500, and is a free game or application, device 500 optionally automatically downloads the game or application in response to the user's request to purchase or otherwise obtain the in-app purchase.

Figure 12M:
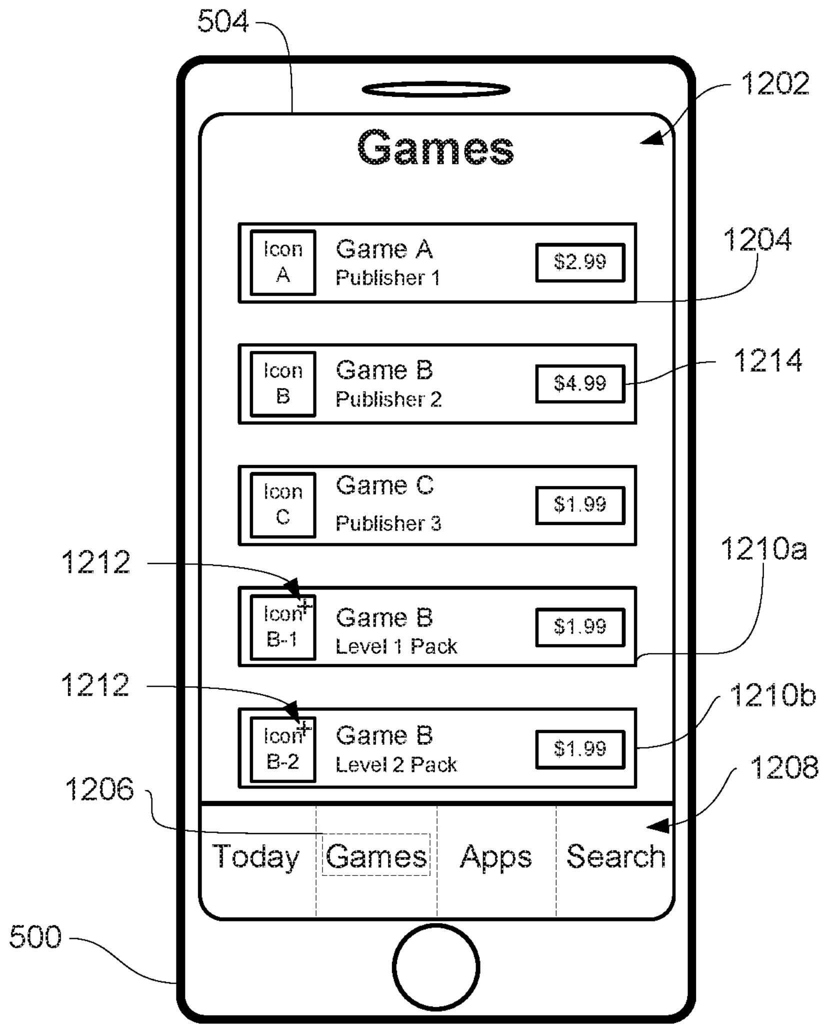
Figure 12N:
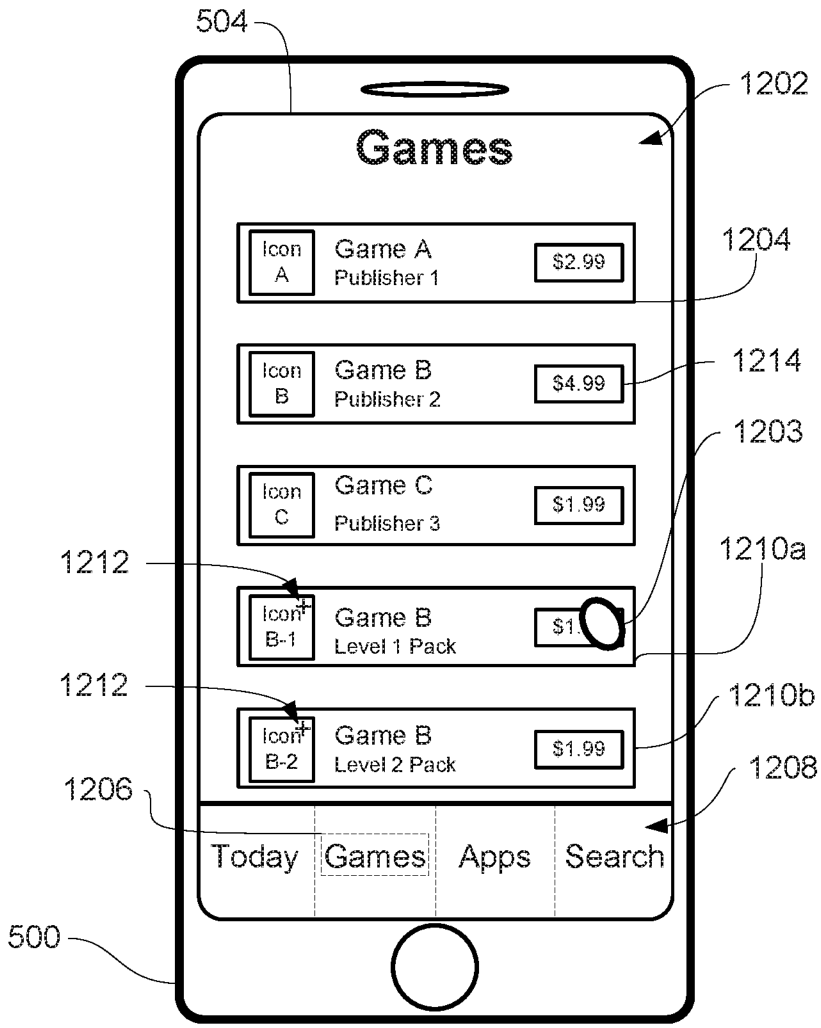
Figure 12O:
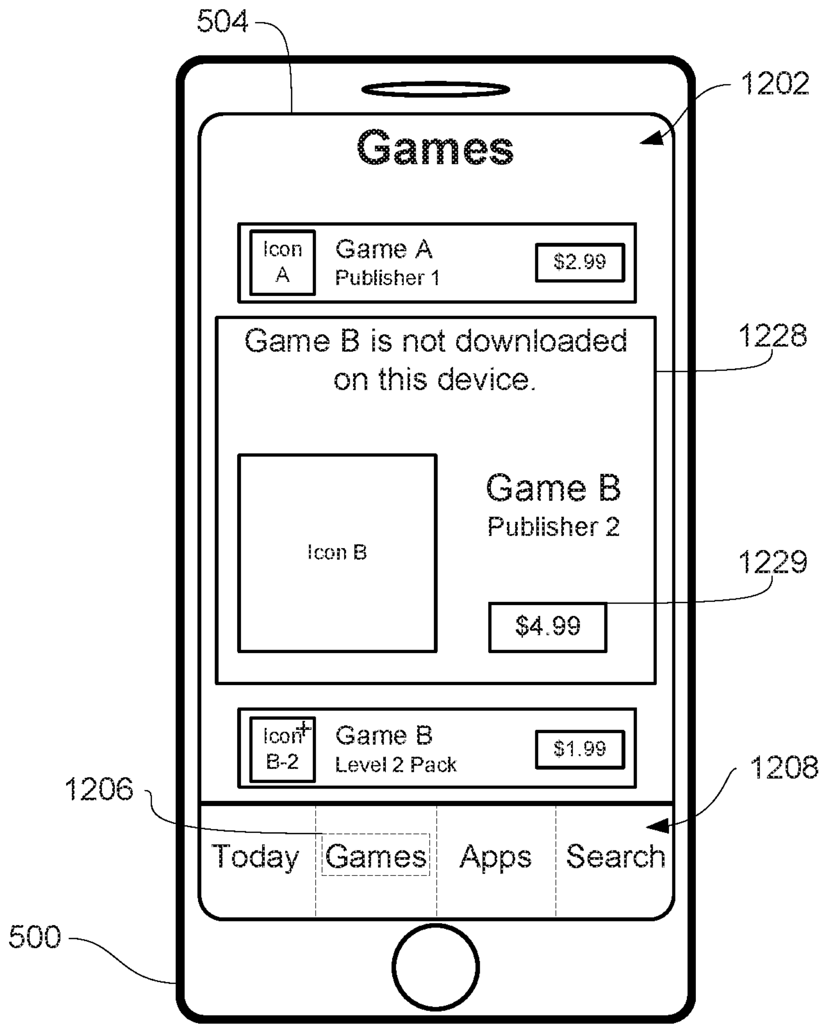
Figure 12P:
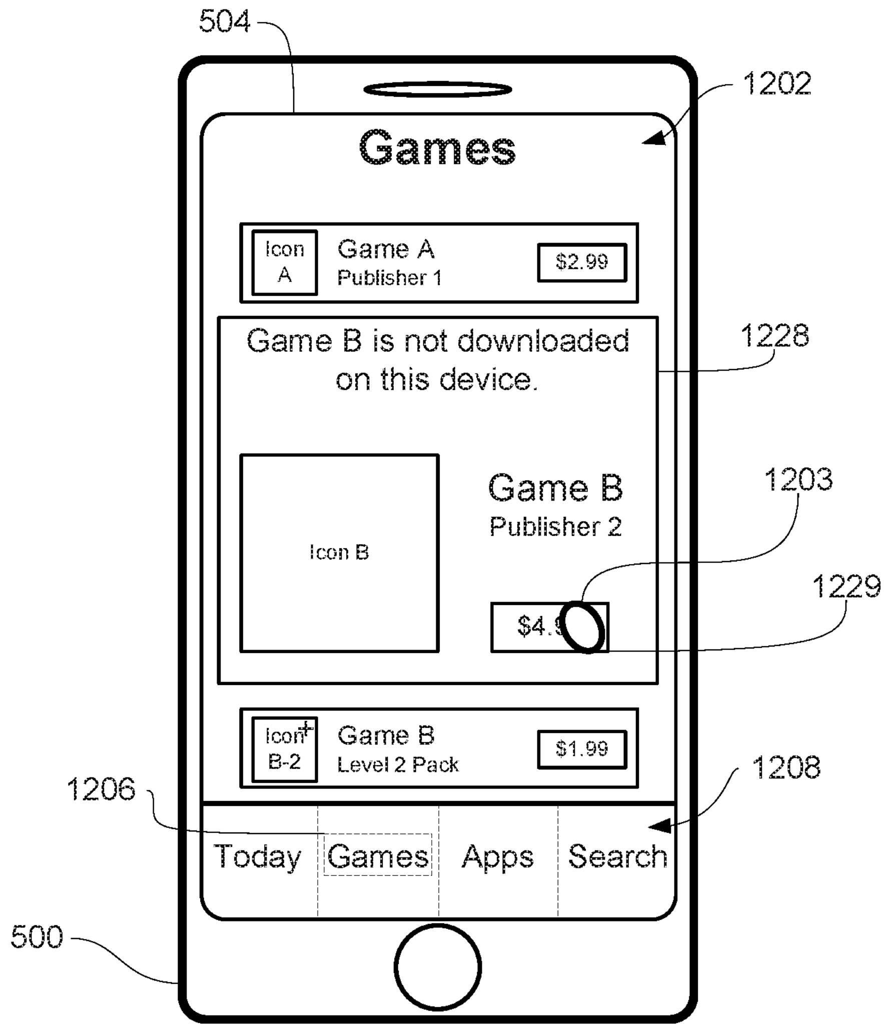
Figure 12Q:
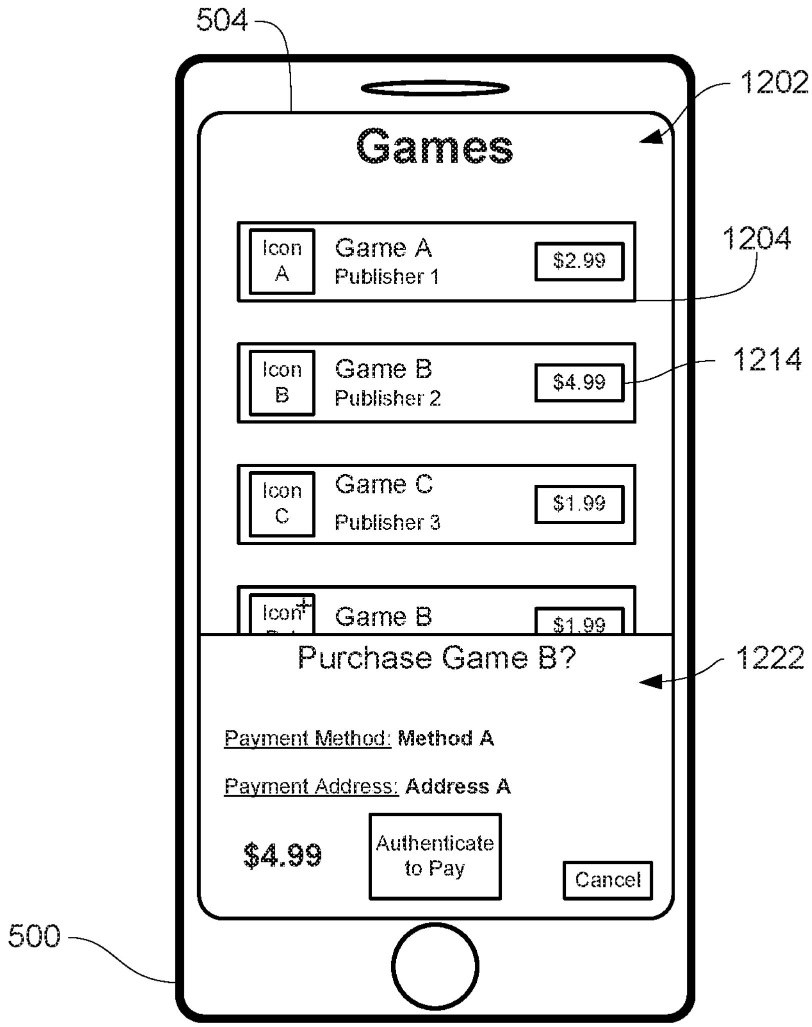
Figure 12R:
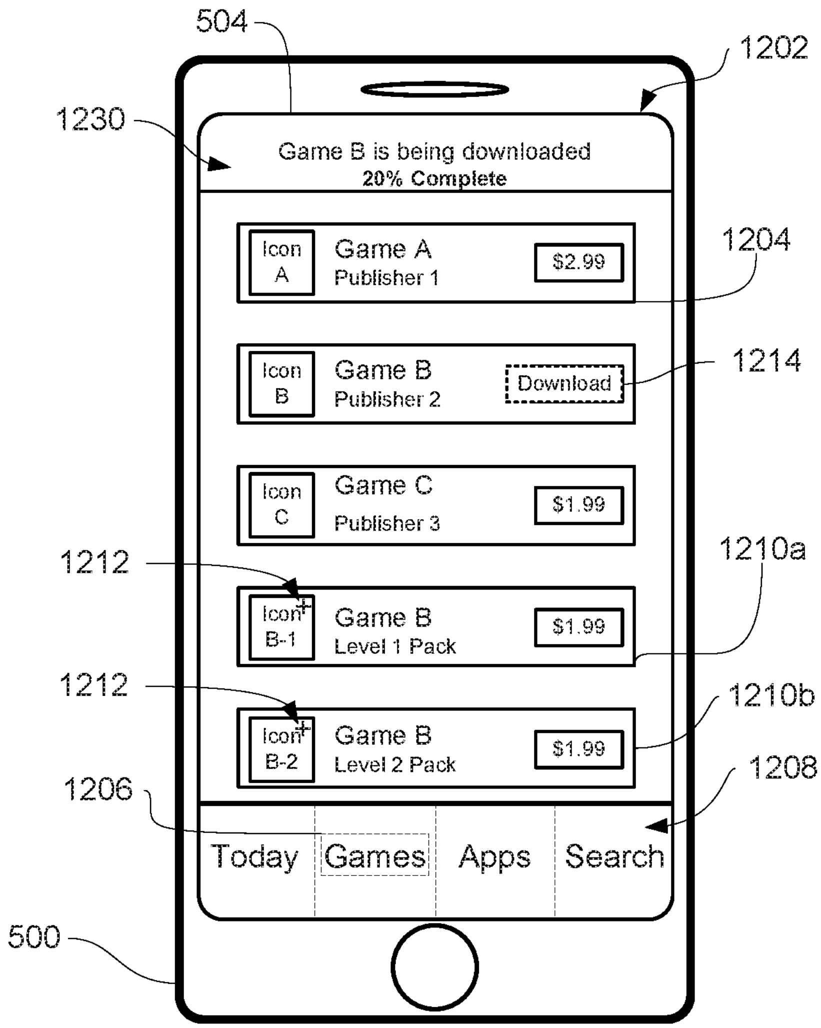

In contrast, device 500 optionally does not automatically download the game or application corresponding to a requested in-app purchase if that game or application is a paid game or application. For example, in FIG. 12M, game B is not downloaded to device 500 and is a paid game with a price of $4.99, as indicated by affordance 1214. In FIG. 12N, selection of the affordance for obtaining access to the Level 1 Pack for game B is detected. In response, device 500 displays overlay 1228 over user interface 1202 that indicates that game B is not yet downloaded on device 500, as shown in FIG. 12O, and requests confirmation to purchase game B for $4.99. In particular, overlay 1228 in FIG. 12O includes an image or icon for game B, information about game B (e.g., the name of game B, the publisher of game B, etc.), and purchase/download affordance 1229 for game B. In FIG. 12P, selection of purchase/download affordance 1229 is detected, and in response, device 500 displays payment confirmation overlay 1222 over use interface 1202, as shown in FIG. 12Q. If payment for game B is authorized, device 500 will begin downloading game B, as shown in FIG. 12R. Thus, if the game or application corresponding to the in-app purchase requested is not yet downloaded on device 500, and is a paid game or application, device 500 optionally does not automatically download the game or application in response to the user's request to purchase or otherwise obtain the in-app purchase—rather, device 500 optionally first requests confirmation of the purchase of the game or application and/or authorization for payment for the game or application before downloading the game or application.

Figure 12S:
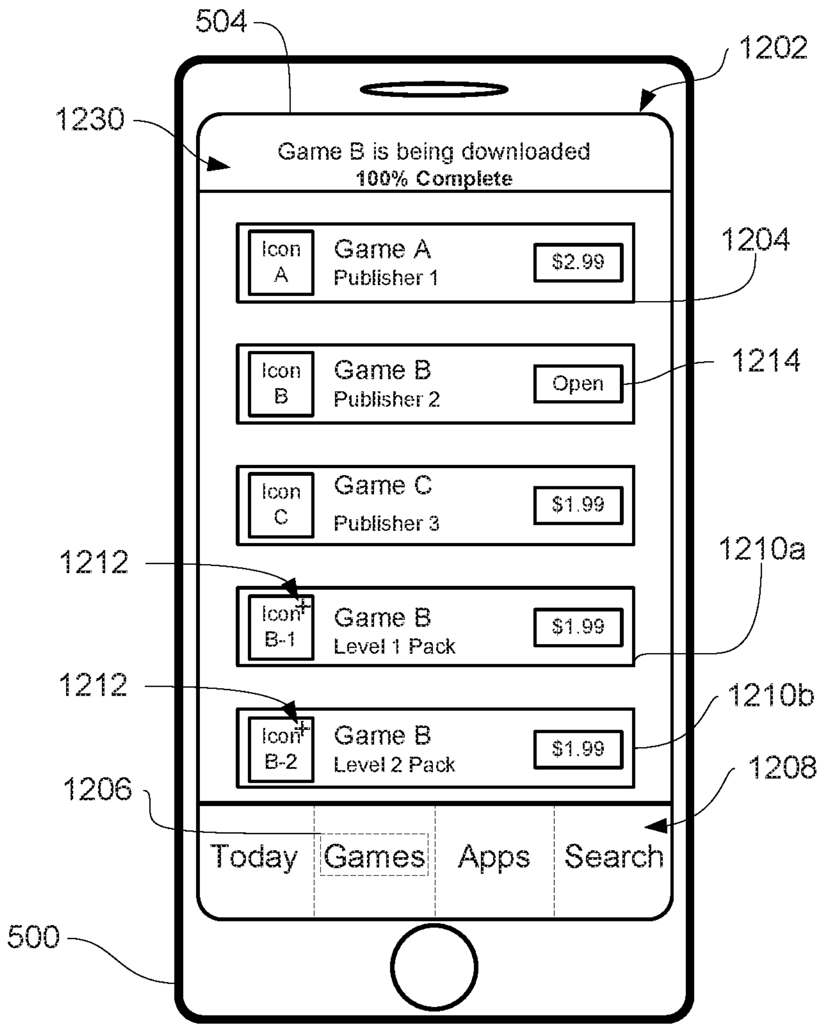
Figure 12T:
Figure 12U:
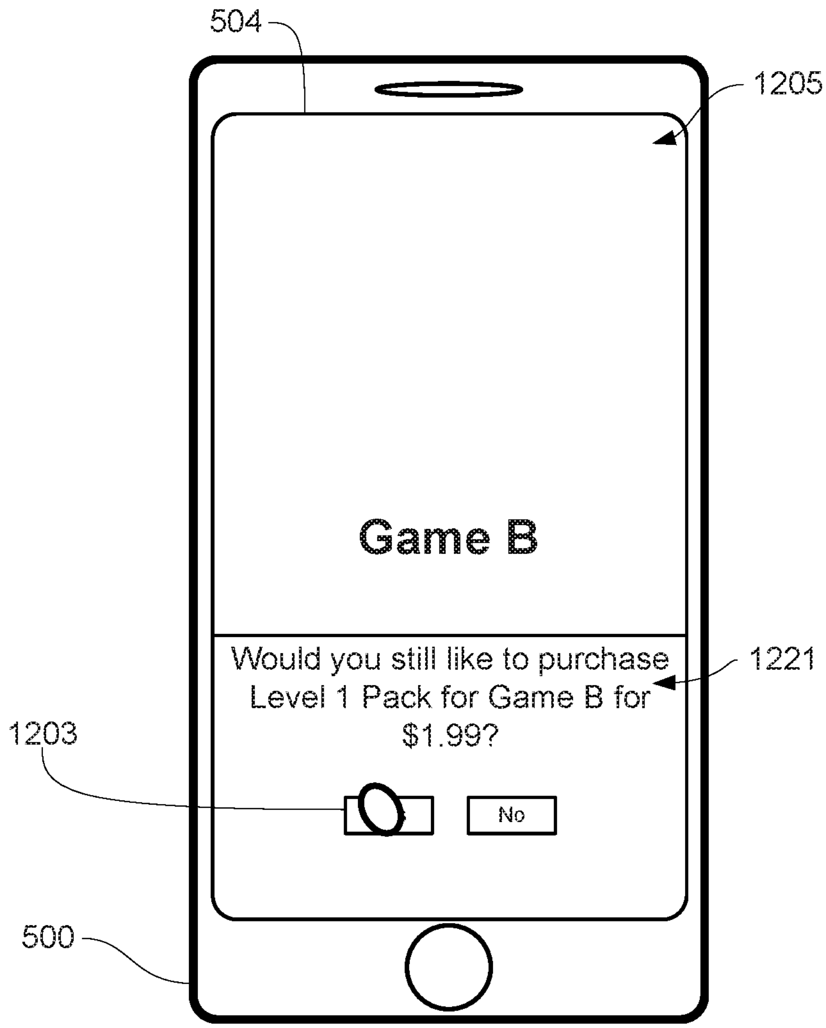
Figure 12V:

Whether game B is free or paid, once device 500 begins downloading game B in response to a request by the user to purchase or obtain an in-app purchase for game B, device 500 responds differently depending on the user's actions with respect to the downloading of game B. For example, in FIG. 12R, device 500 is downloading game B in connection with a request to obtain an in-app purchase for game B (e.g., Level 1 pack for game B), as described with reference to FIGS. 12I-12Q, and game B is currently 20% downloaded. The user optionally remains in the app store application or otherwise does not dismiss notification 1230 displayed by device 500 in the app store application, and device 500 completes downloading game B in FIG. 12S. Because the user has remained in the app store application or otherwise not dismissed notification 1230 through the entire downloading of game B, upon completion of the downloading of game B, device 500 automatically launches or displays game B as shown in FIG. 12T. Device 500 also displays overlay 1221 over game B that requests confirmation that the user would still like to purchase the in-app purchase for game B that triggered the downloading of game B to device 500 (e.g., the Level 1 Pack for game B). If the user confirms the request to purchase the Level 1 Pack for game B, as shown in FIG. 12U, device 500 displays payment confirmation overlay 1222 over game B to obtain authorization for payment for the Level 1 Pack for game B, as shown in FIG. 12V. In some embodiments, instead of displaying purchase confirmation overlay 1221 over game B before displaying payment confirmation overlay 1222 over game B, device 500 simply displays payment confirmation overlay 1222 over game B without first displaying purchase confirmation overlay 1221 upon the completion of the downloading of game B to device 500 (e.g., device 500 transitions directly from FIG. 12S to 12V).

Figure 12W:
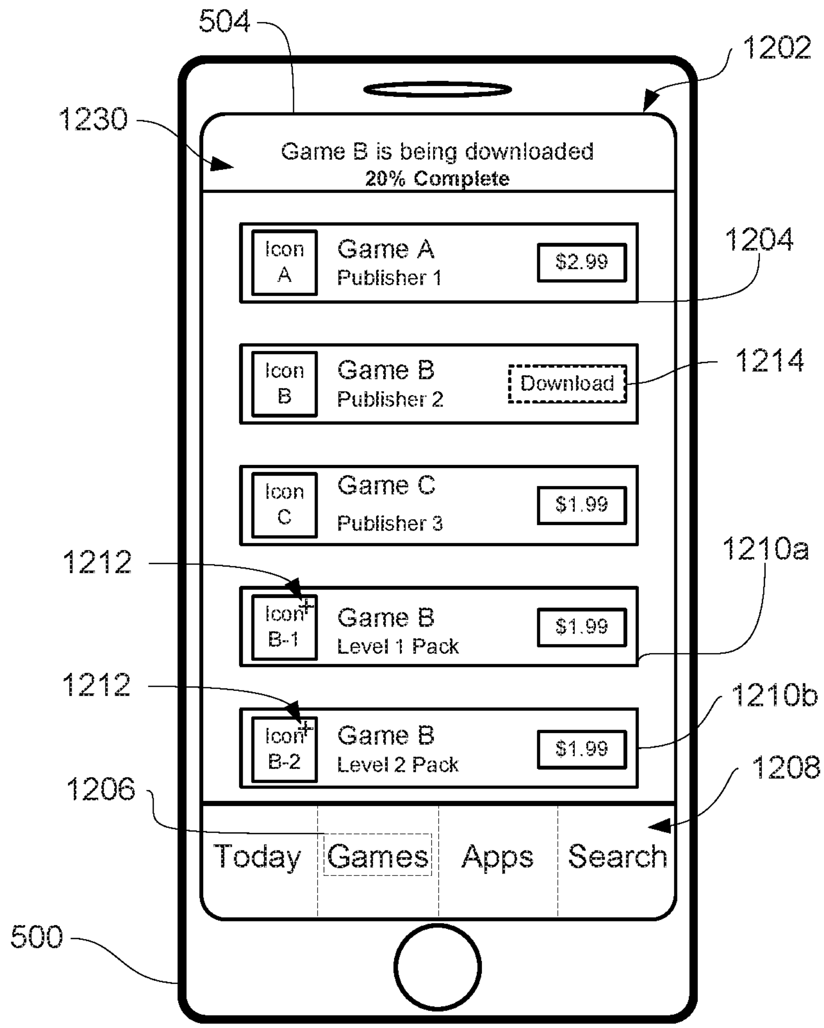
Figure 12X:
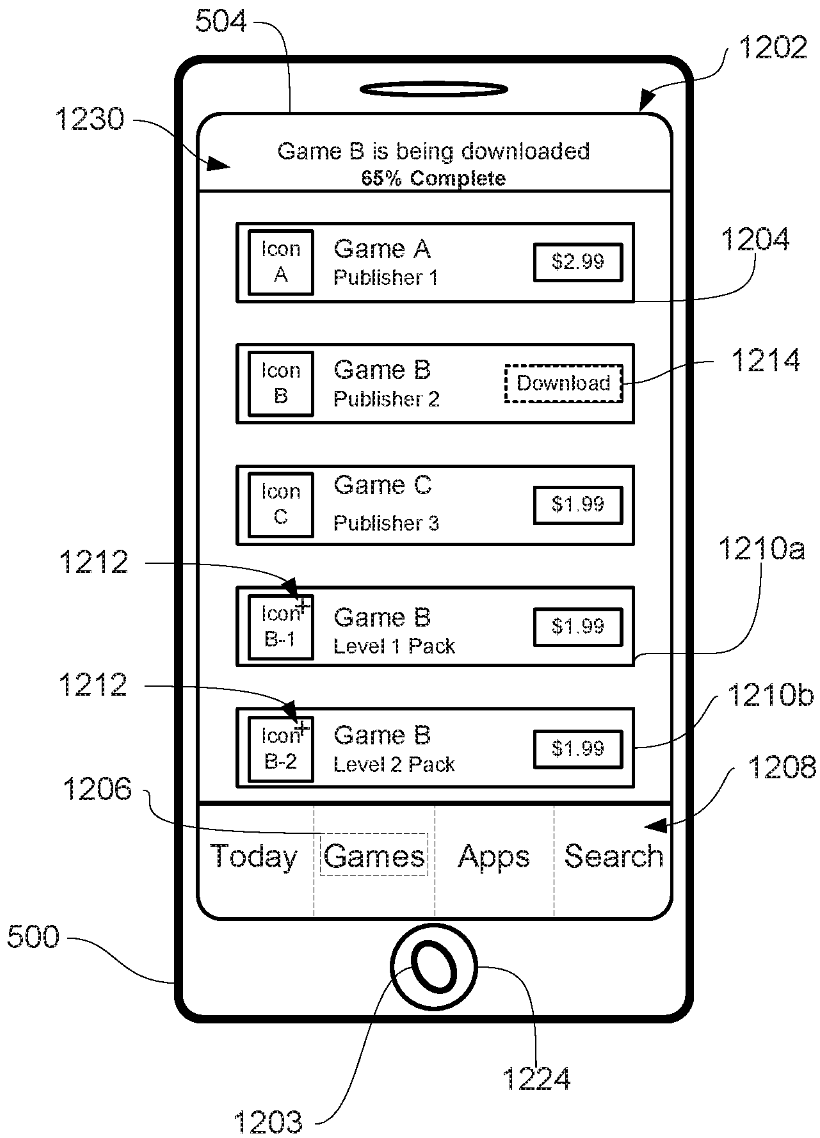
Figure 12Y:
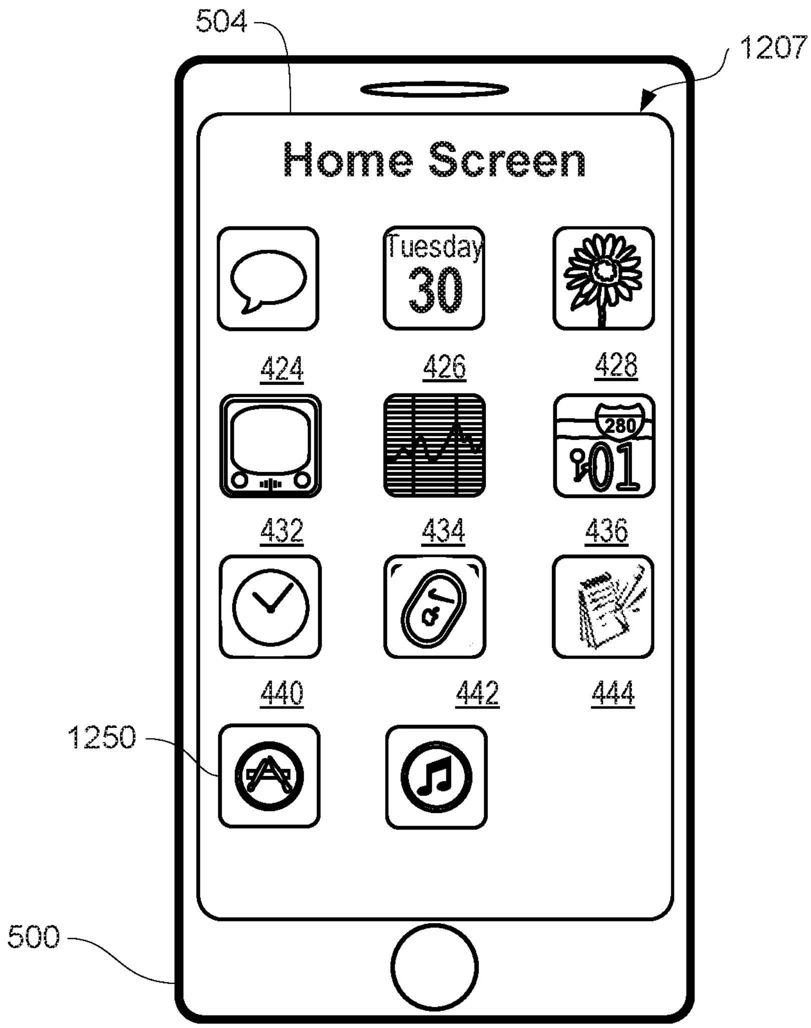

In FIG. 12W, device 500 is downloading game B in connection with a request to obtain an in-app purchase for game B (e.g., Level 1 pack for game B), as described with reference to FIGS. 12I-12Q, and game B is currently 20% downloaded. In FIG. 12X, when game B is currently 65% downloaded, input dismissing notification 1230 is detected. For example, an input clicking home button 1224 is detected while notification 1230 is displayed in user interface 1202 and game B is being downloaded to device 500. Home button 1224 is optionally a button that, when clicked or activated by the user, navigates device 500 to a main, home, or root menu or screen (e.g., such as user interface 400 in FIG. 4A) from any user interface that is displayed on device 500. For example, clicking home button 1224 while in the app store application, as in FIG. 12X, optionally causes device 500 to stop displaying the app store application (e.g., close the app store application) as well as notification 1230, and display home screen 1207, as shown in FIG. 12Y. Home screen 1207 optionally corresponds to user interface 400 in FIG. 4A, and includes icons 424, 426, 428, 432, 434, 436, 440, 442 and 444 for launching or otherwise displaying different applications on device 500, including icon 1250 for launching or otherwise displaying the app store application that device 500 just closed or stopped displaying.

Figure 12Z:
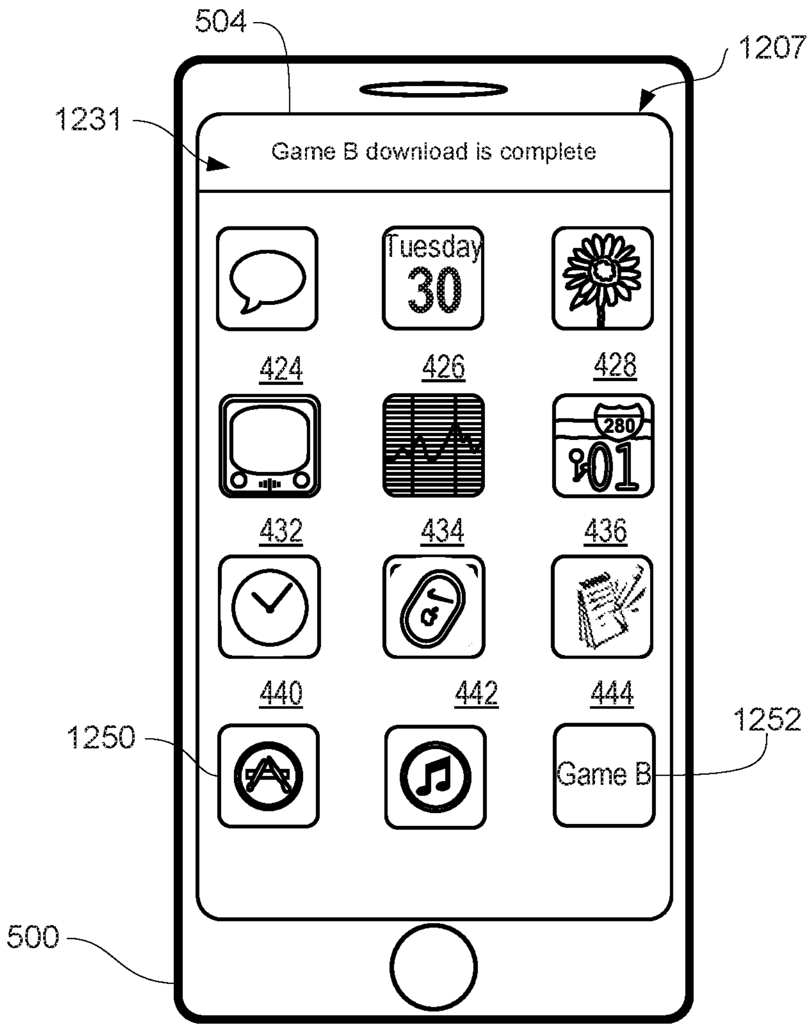
Figure 12A:
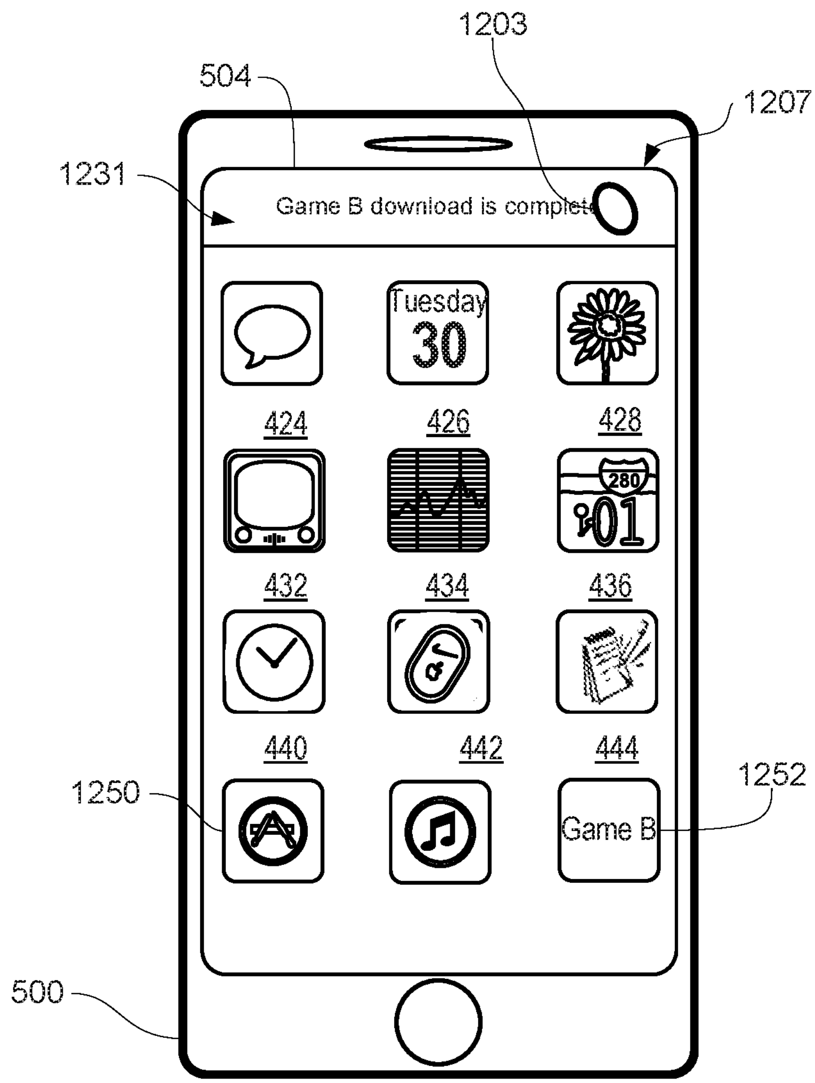
Figure 12B:
Figure 12C:
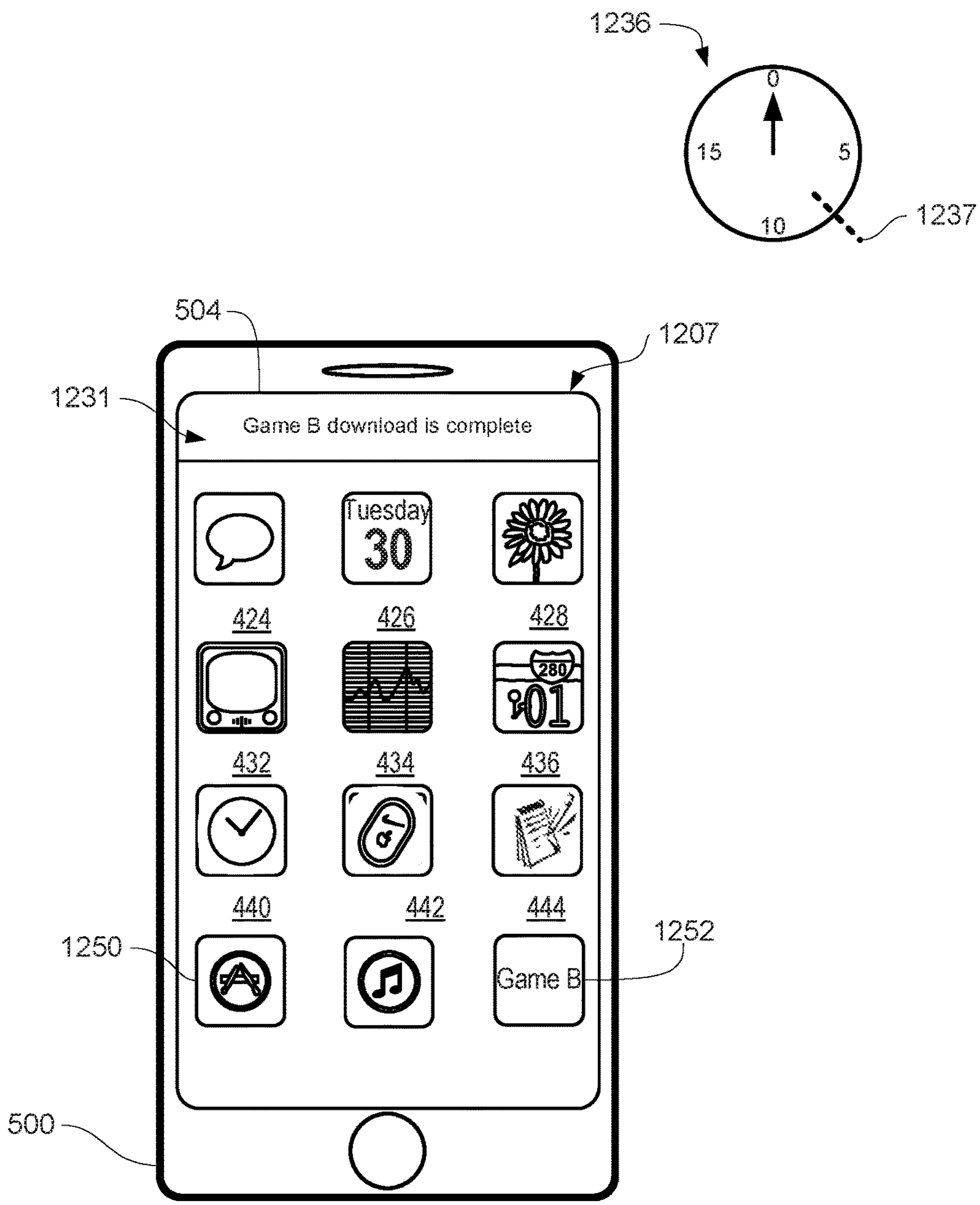
Figure 12D:
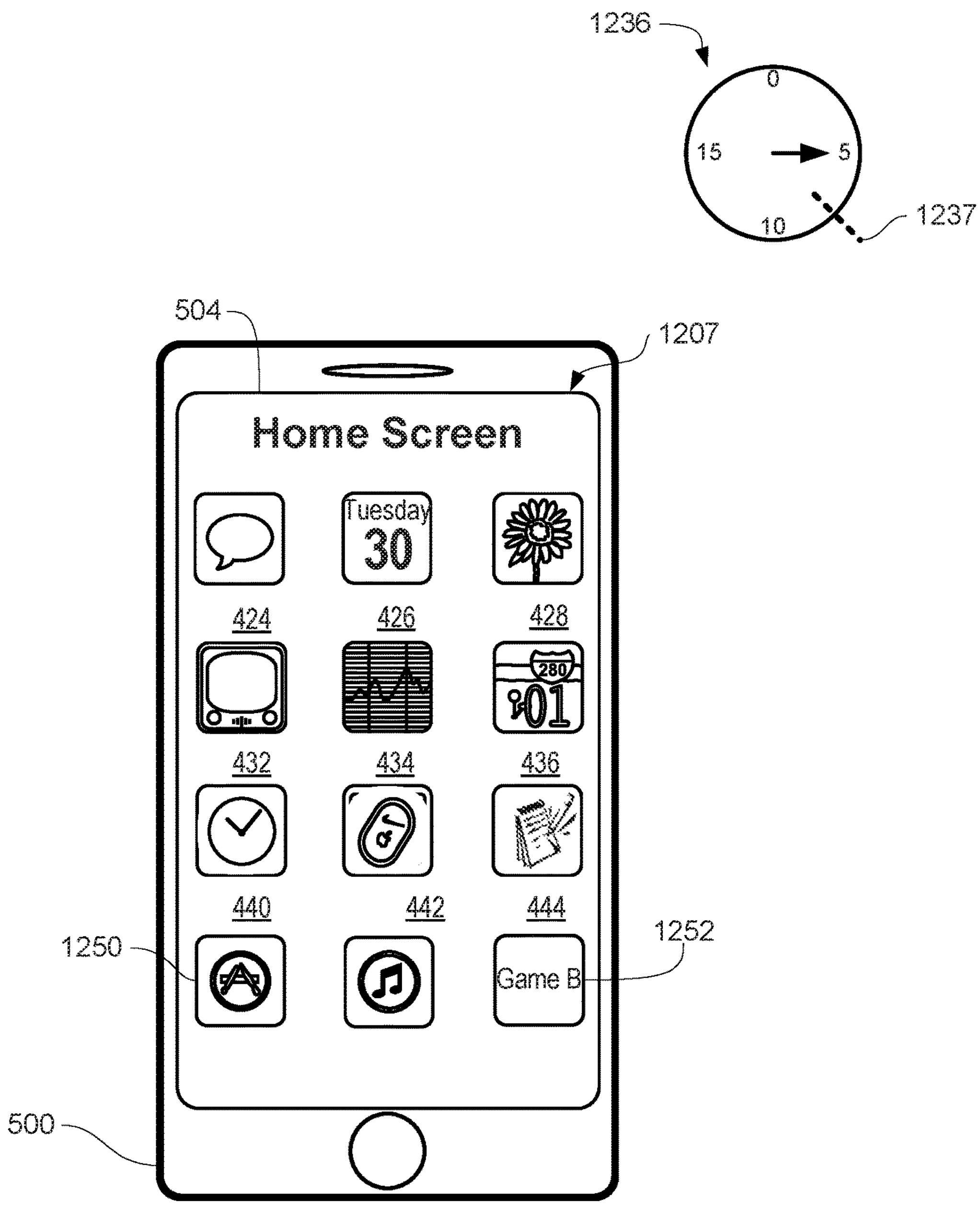
Figure 12E:
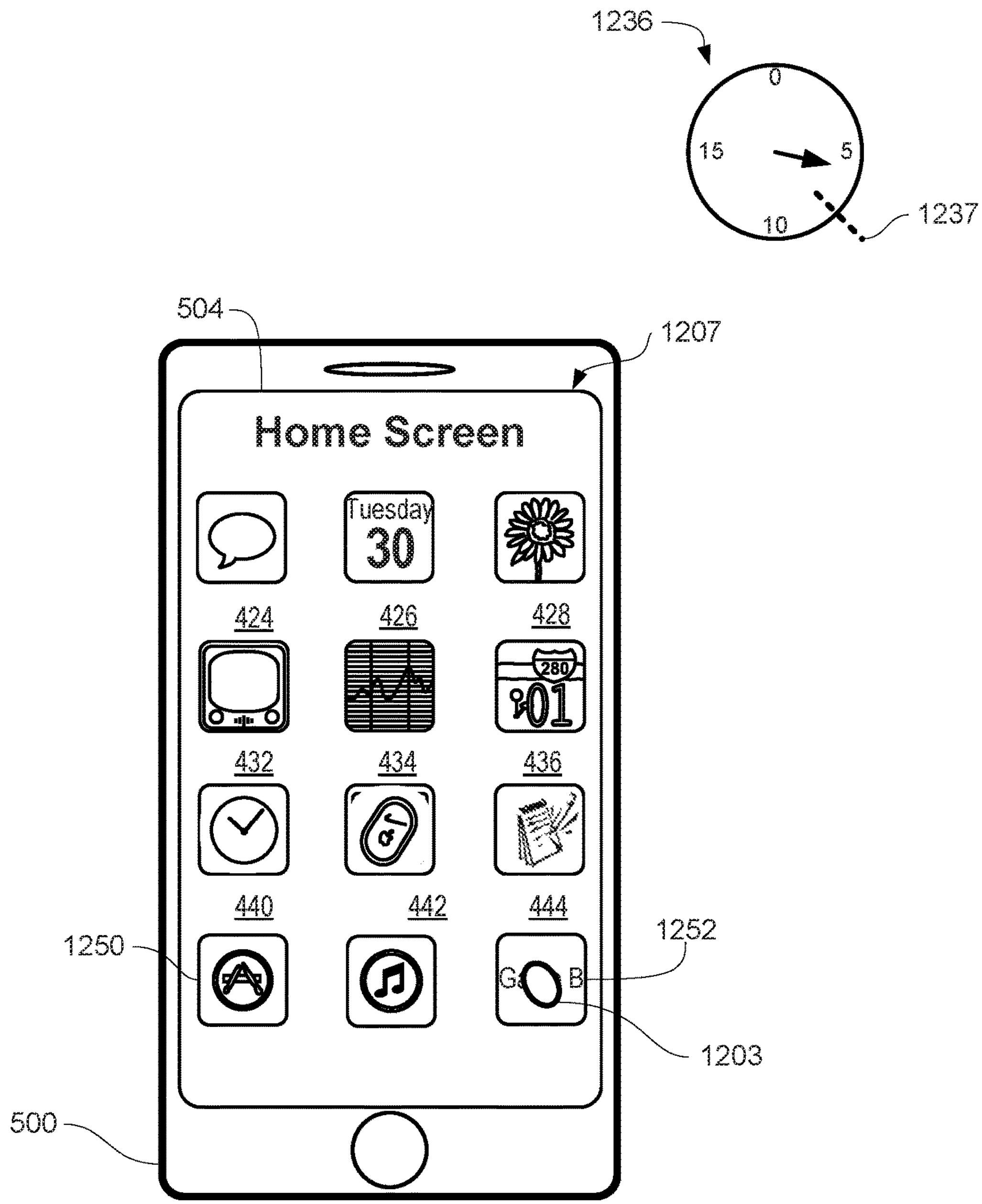
Figure 12F:
Figure 12G:
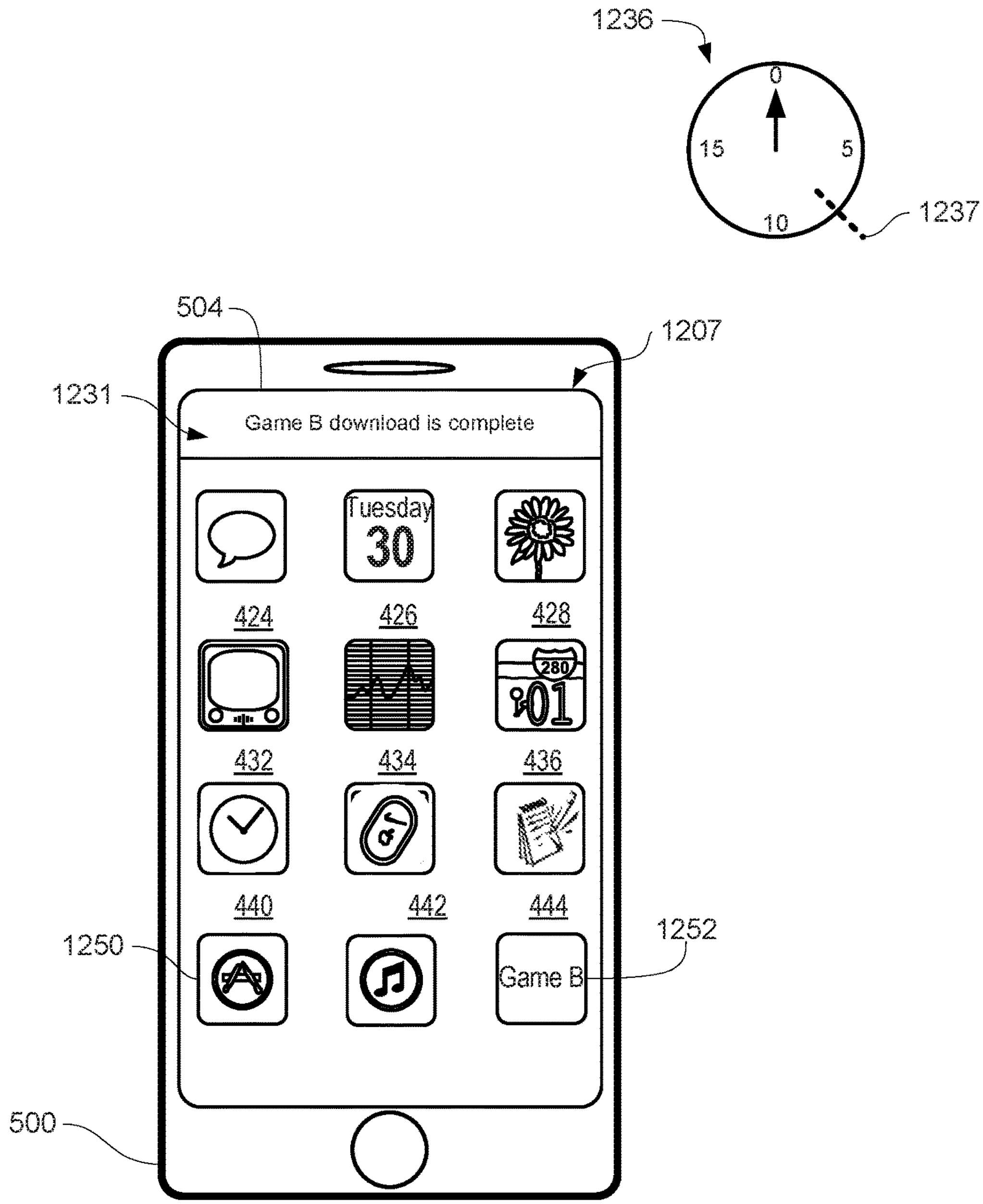
Figure 12H:
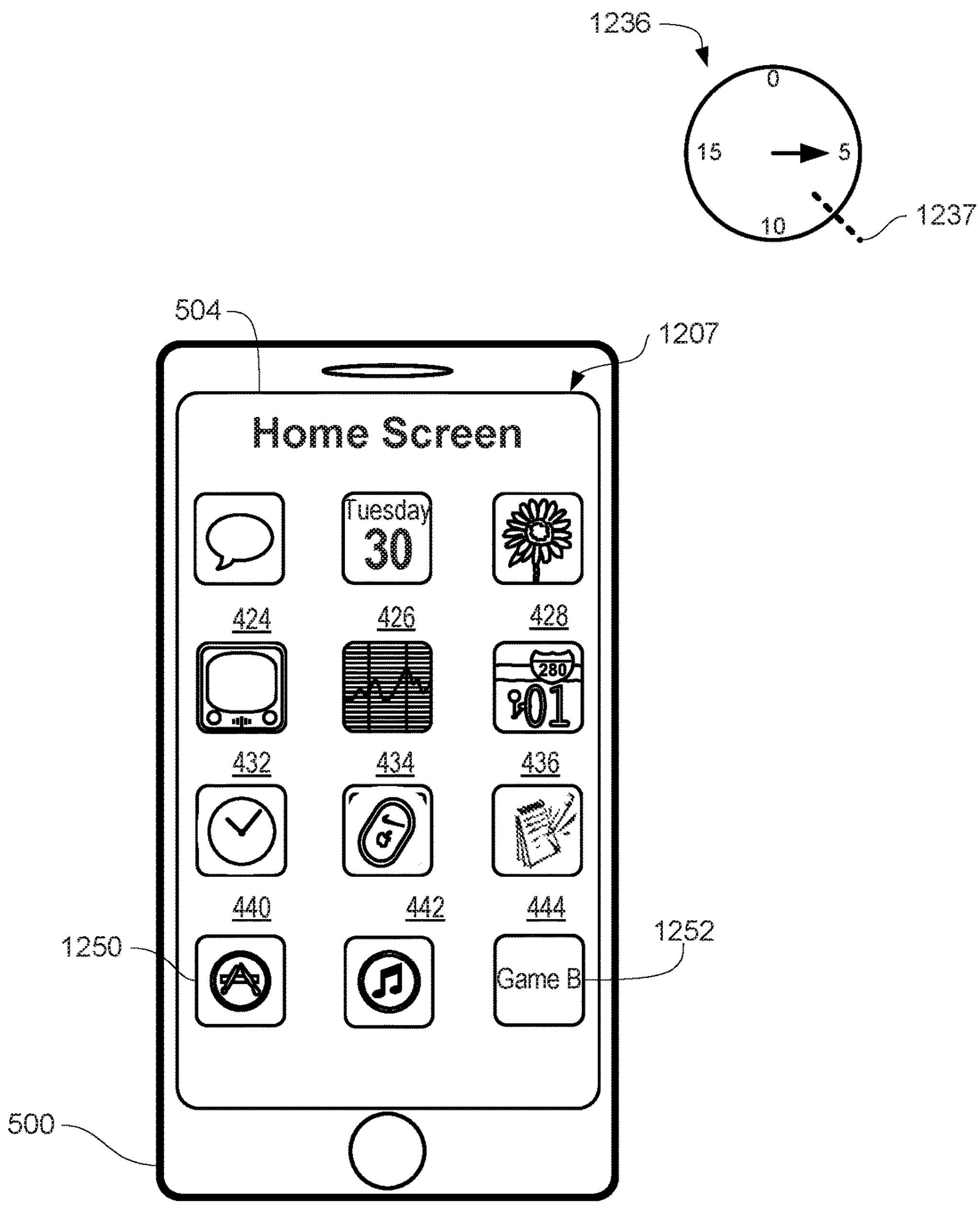
Figure 12I:
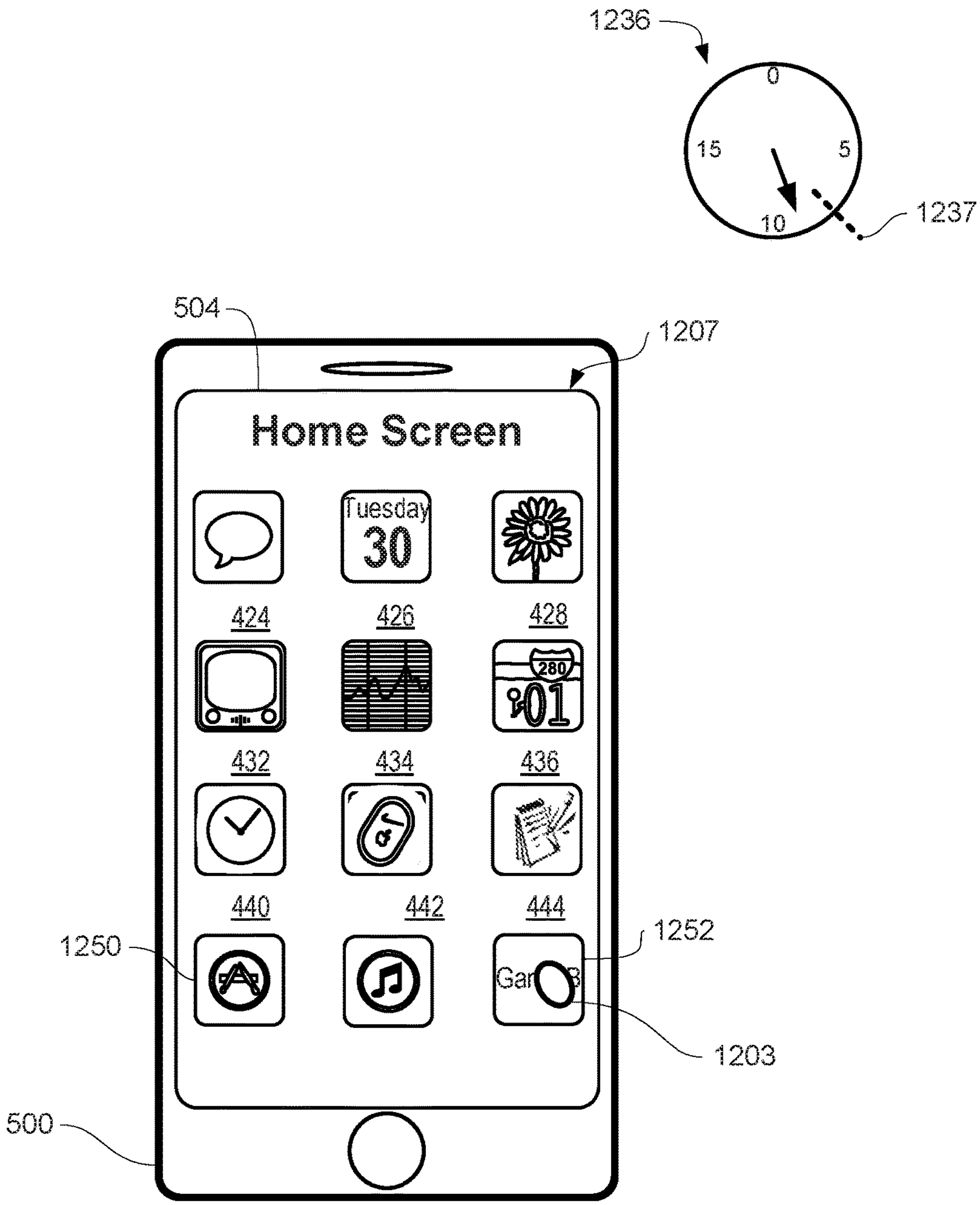
Figure 12J:
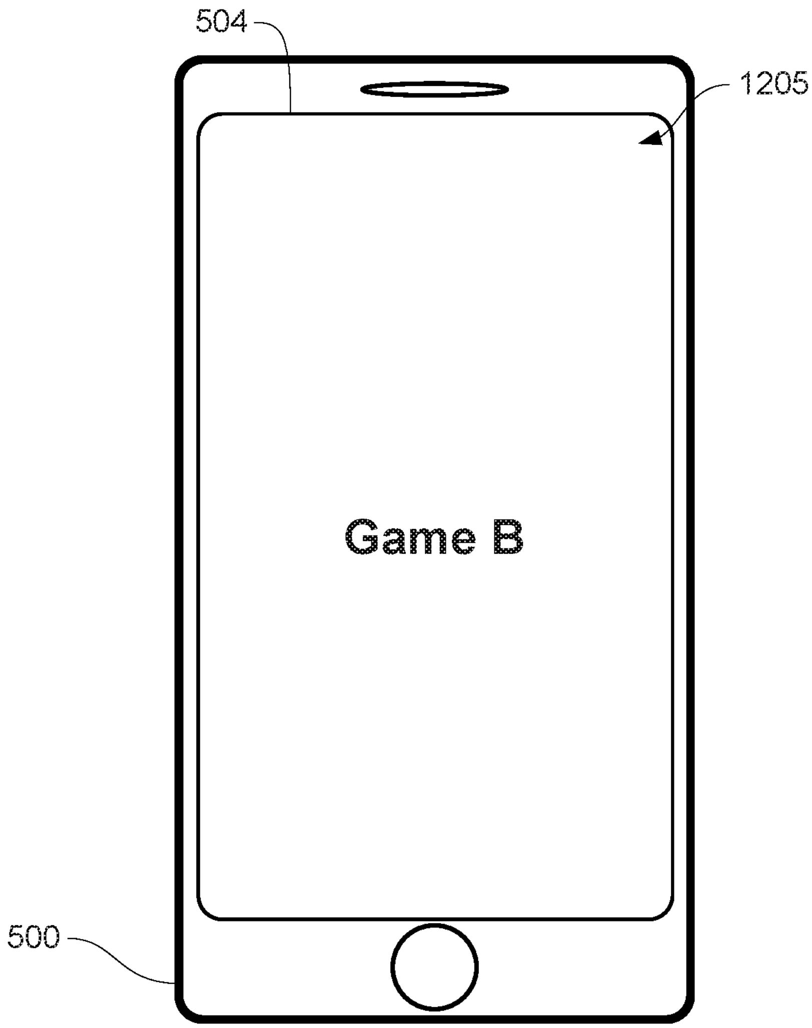
Figure 12K:
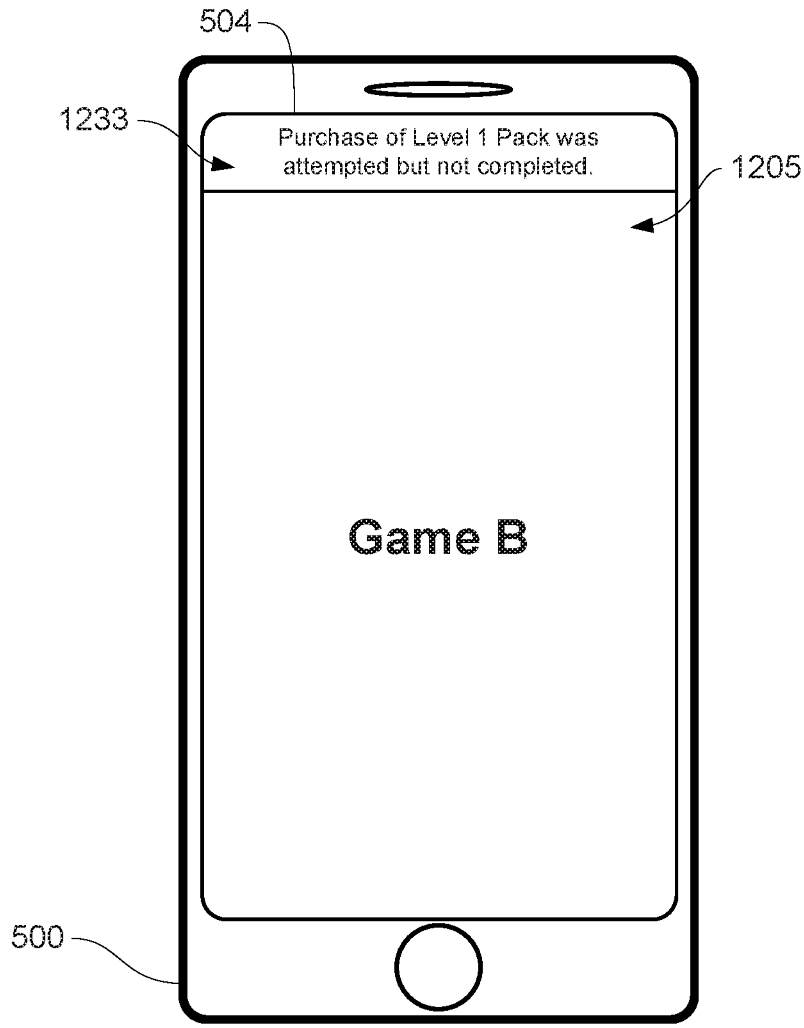
Figure 12L:
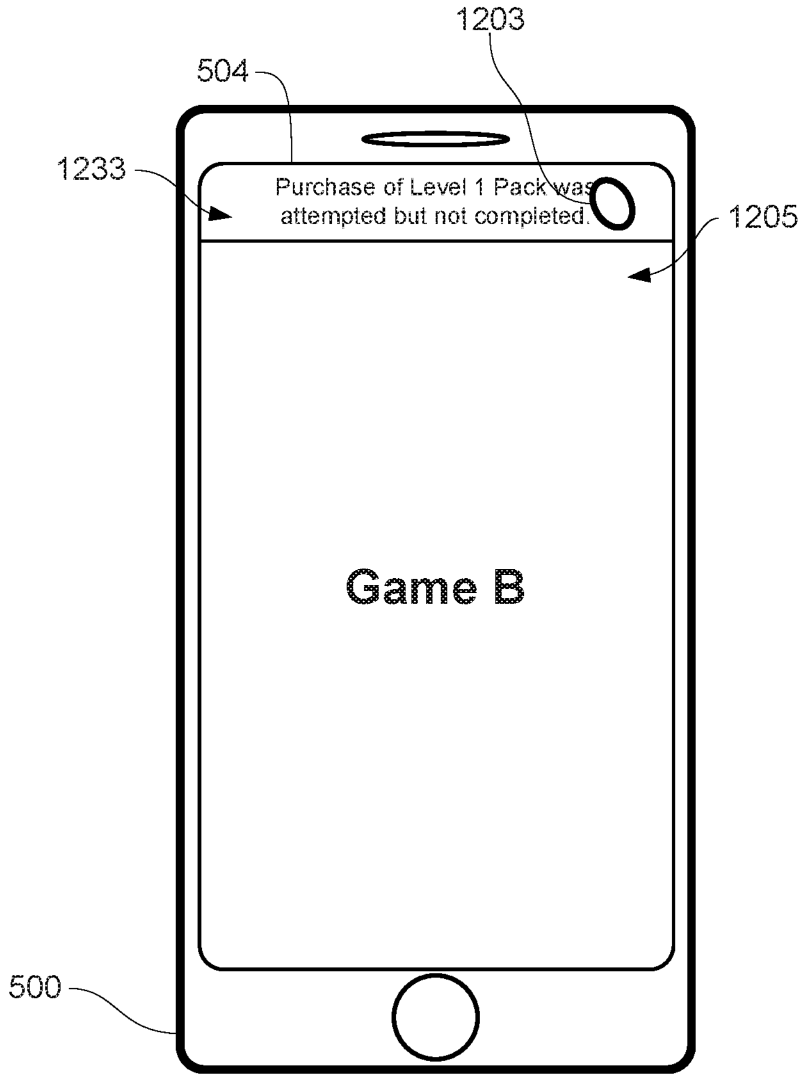
Figure 12M:
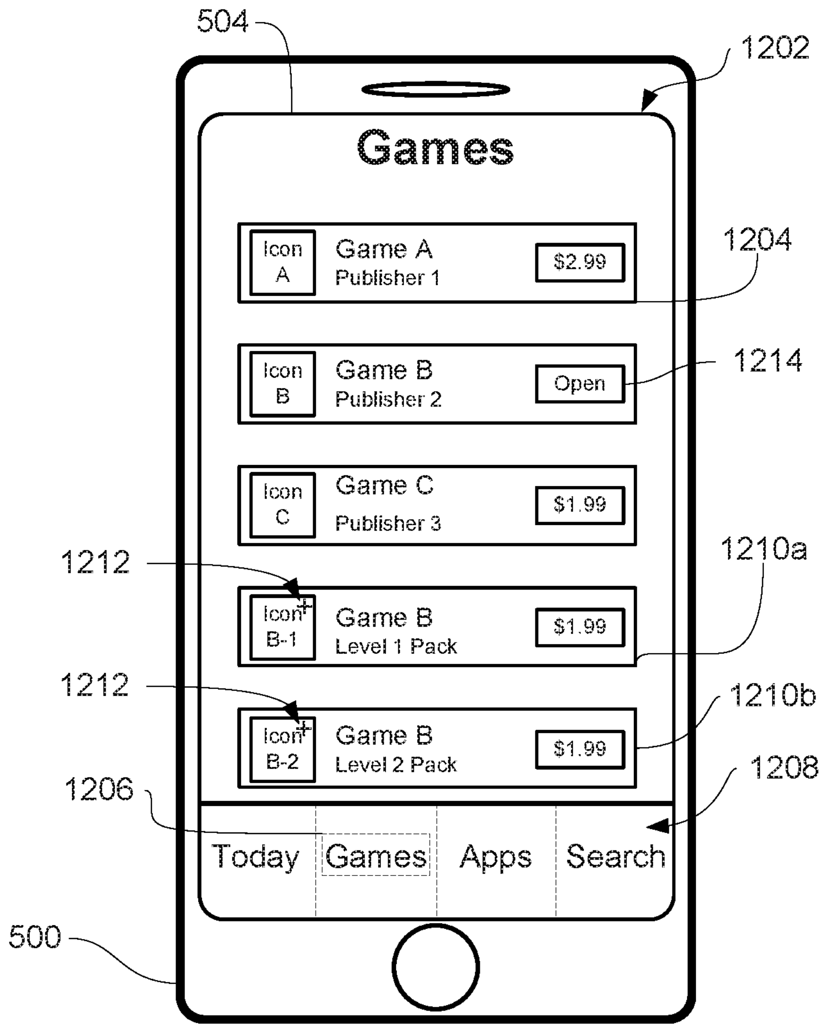
Figure 13A:
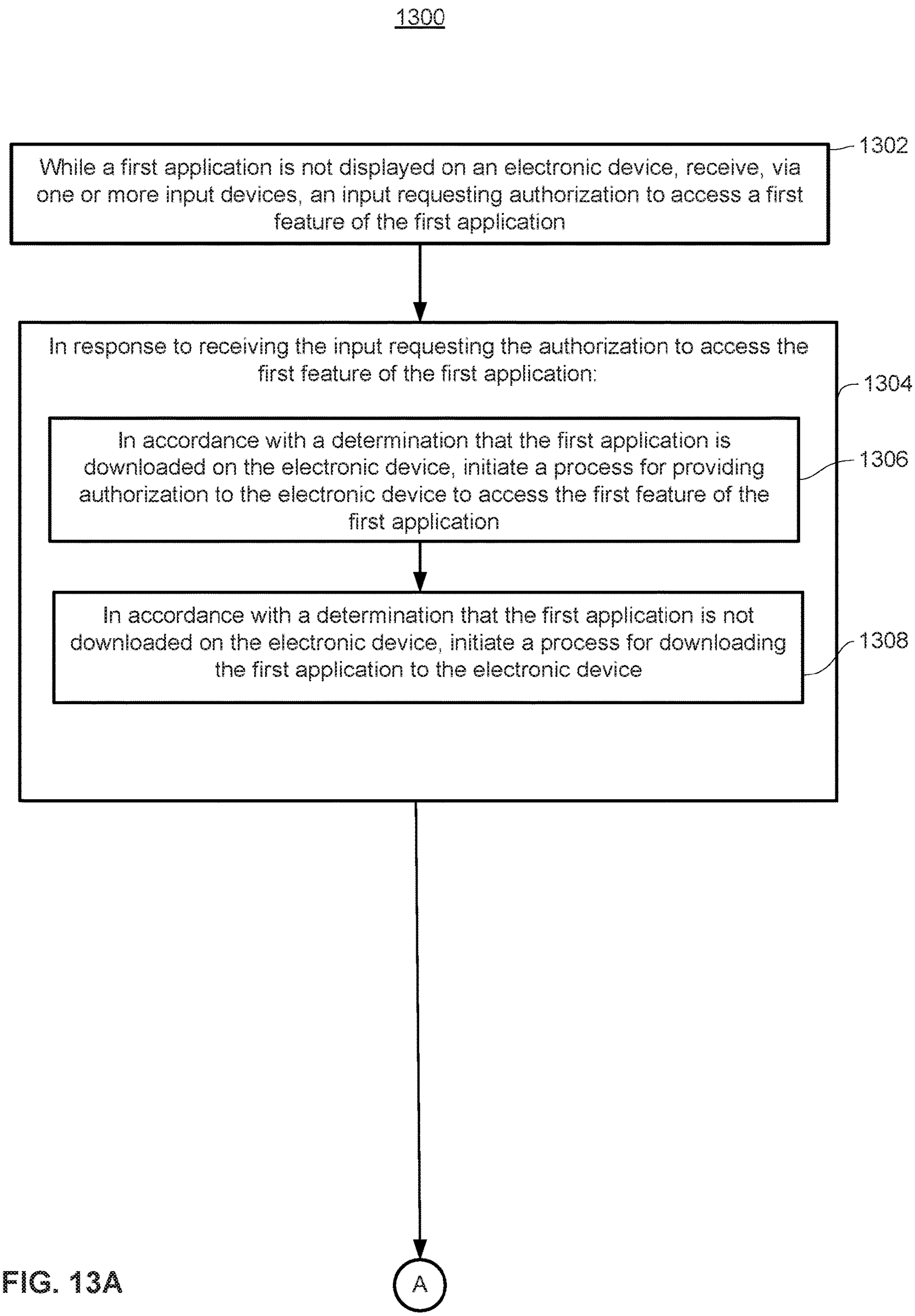
FIGS. 13A-13I are flow diagrams illustrating a method of facilitating the purchase of in-app purchases for the games or applications that are available on an electronic device in accordance with some embodiments of the disclosure.
Figure 13B:
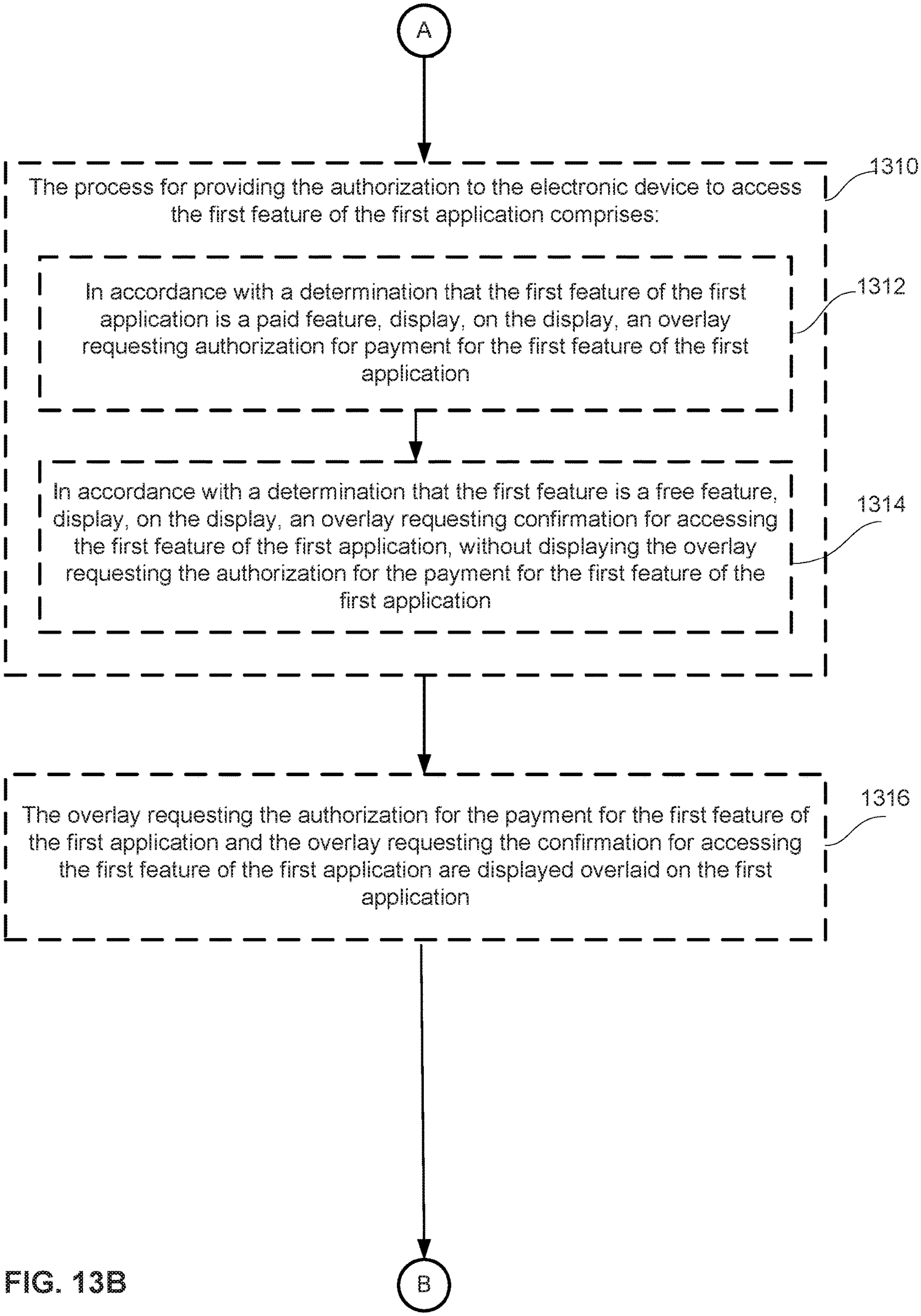
Figure 13C:
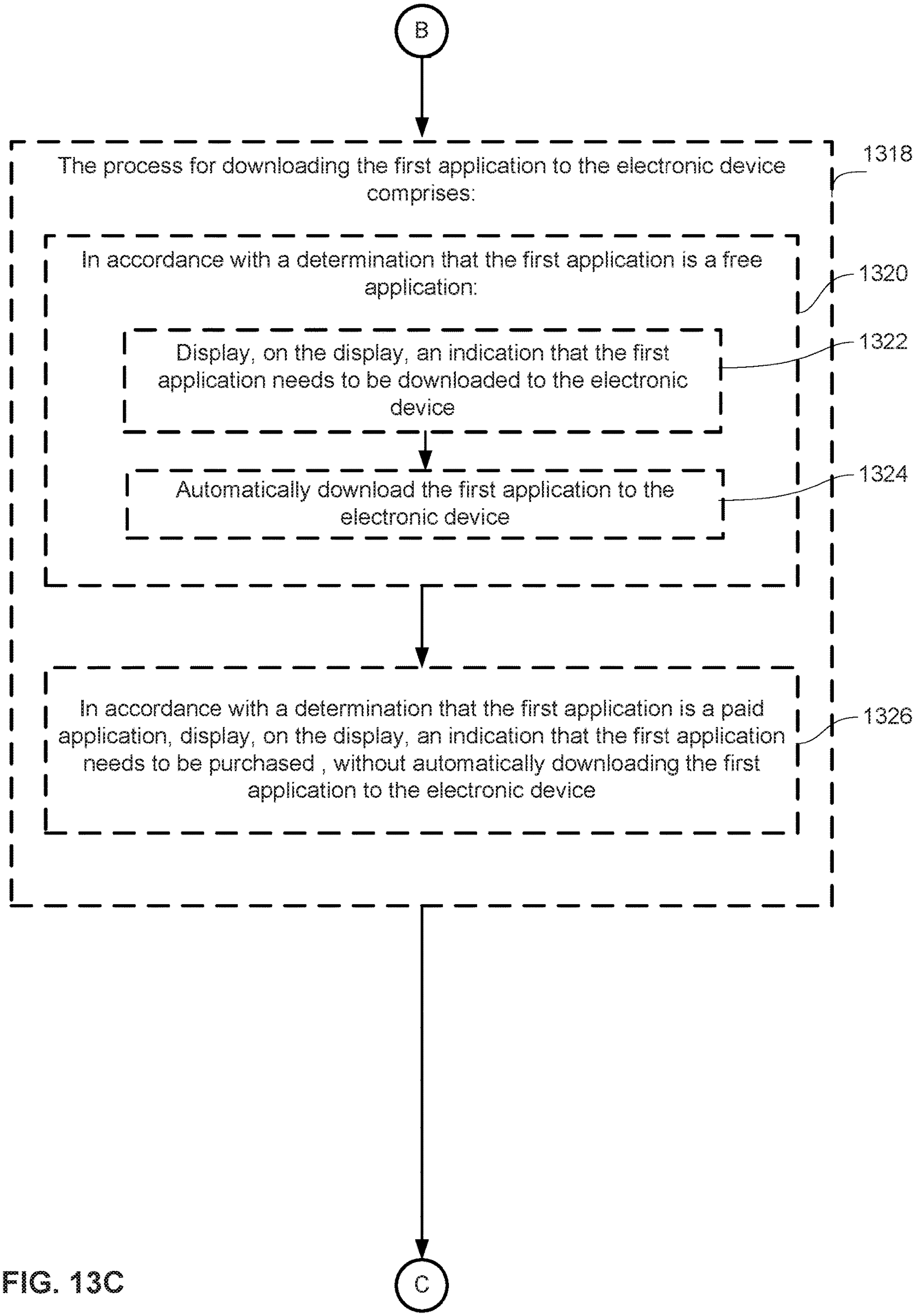
Figure 13D:
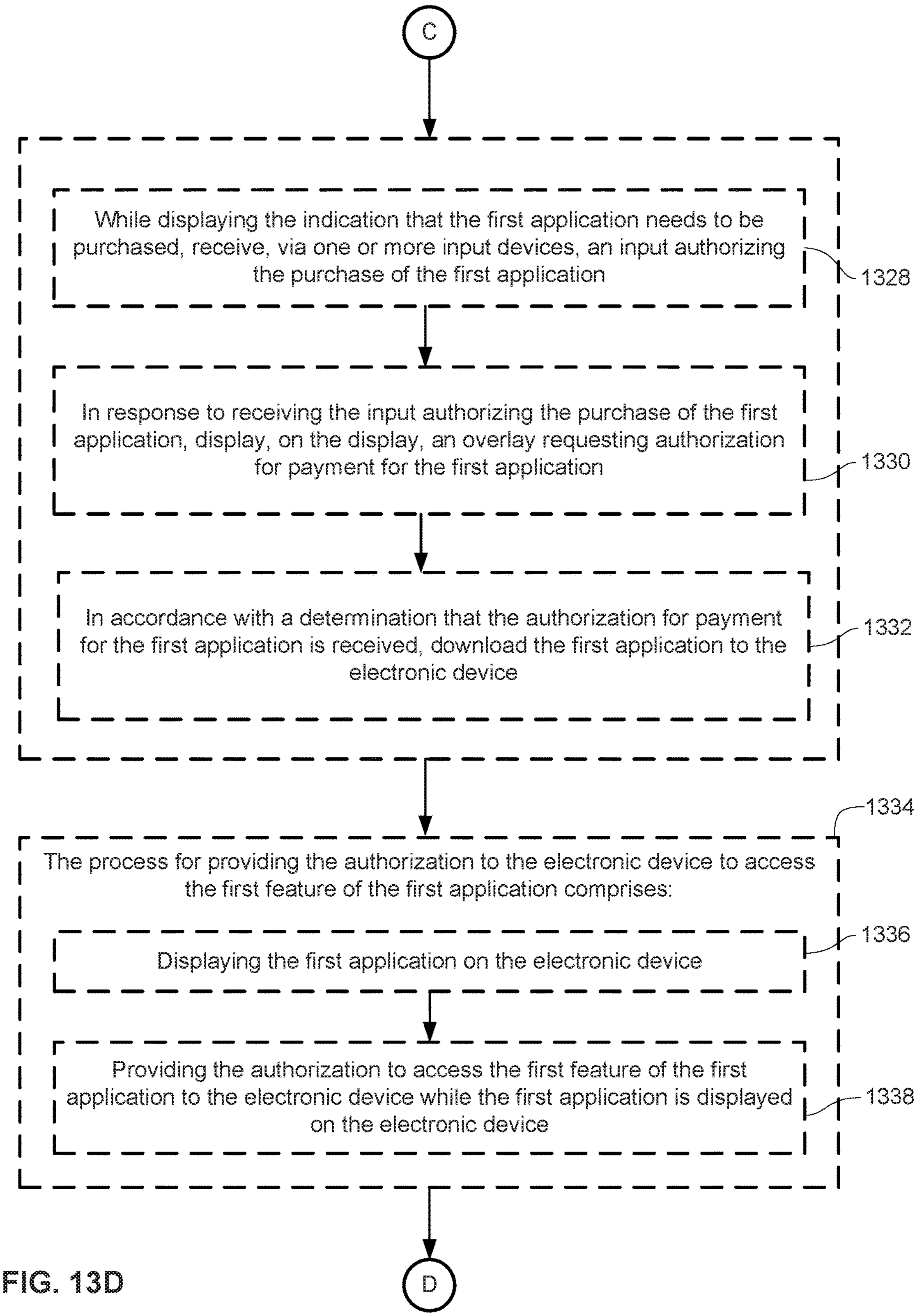
Figure 13E:
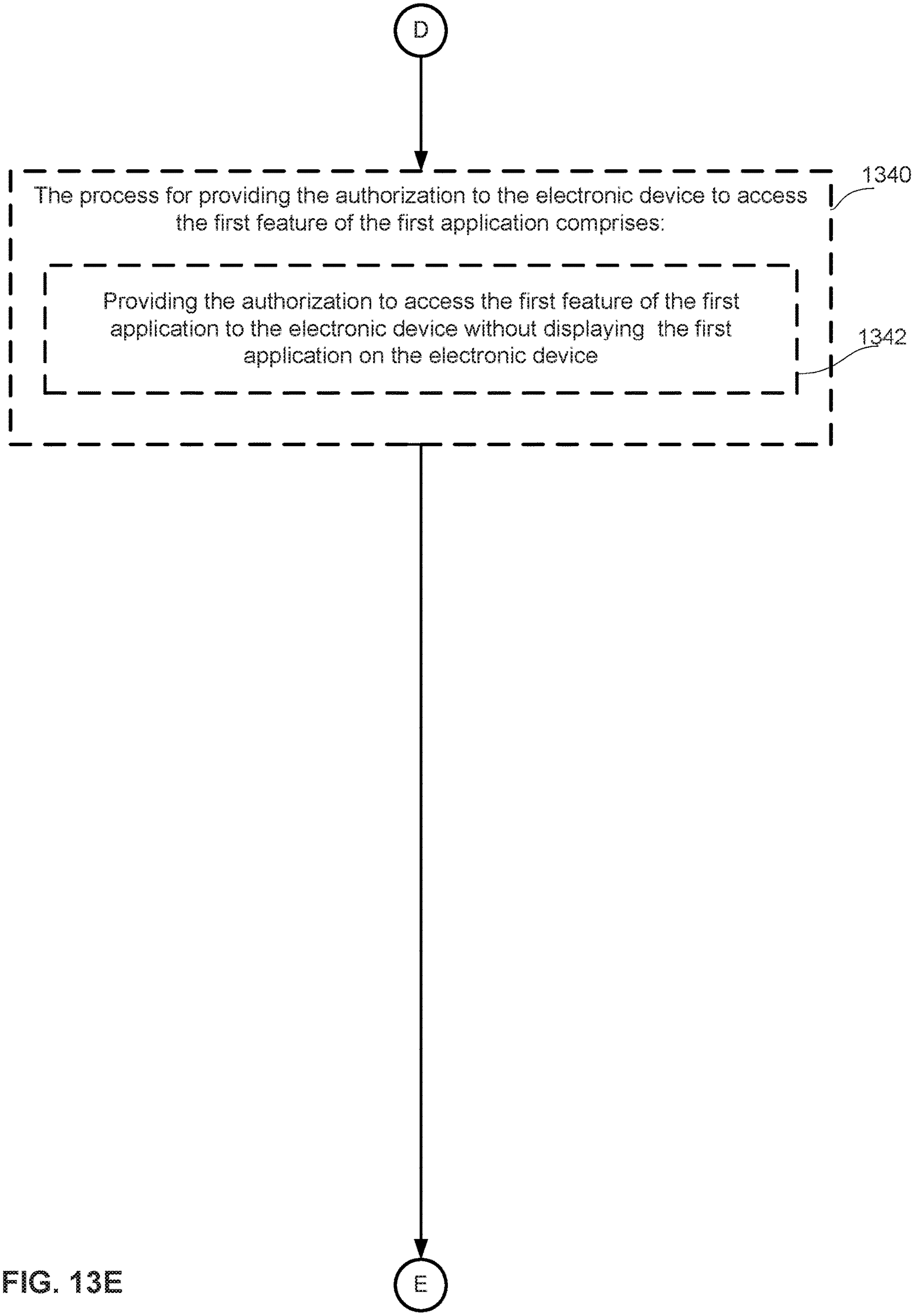
Figure 13F:
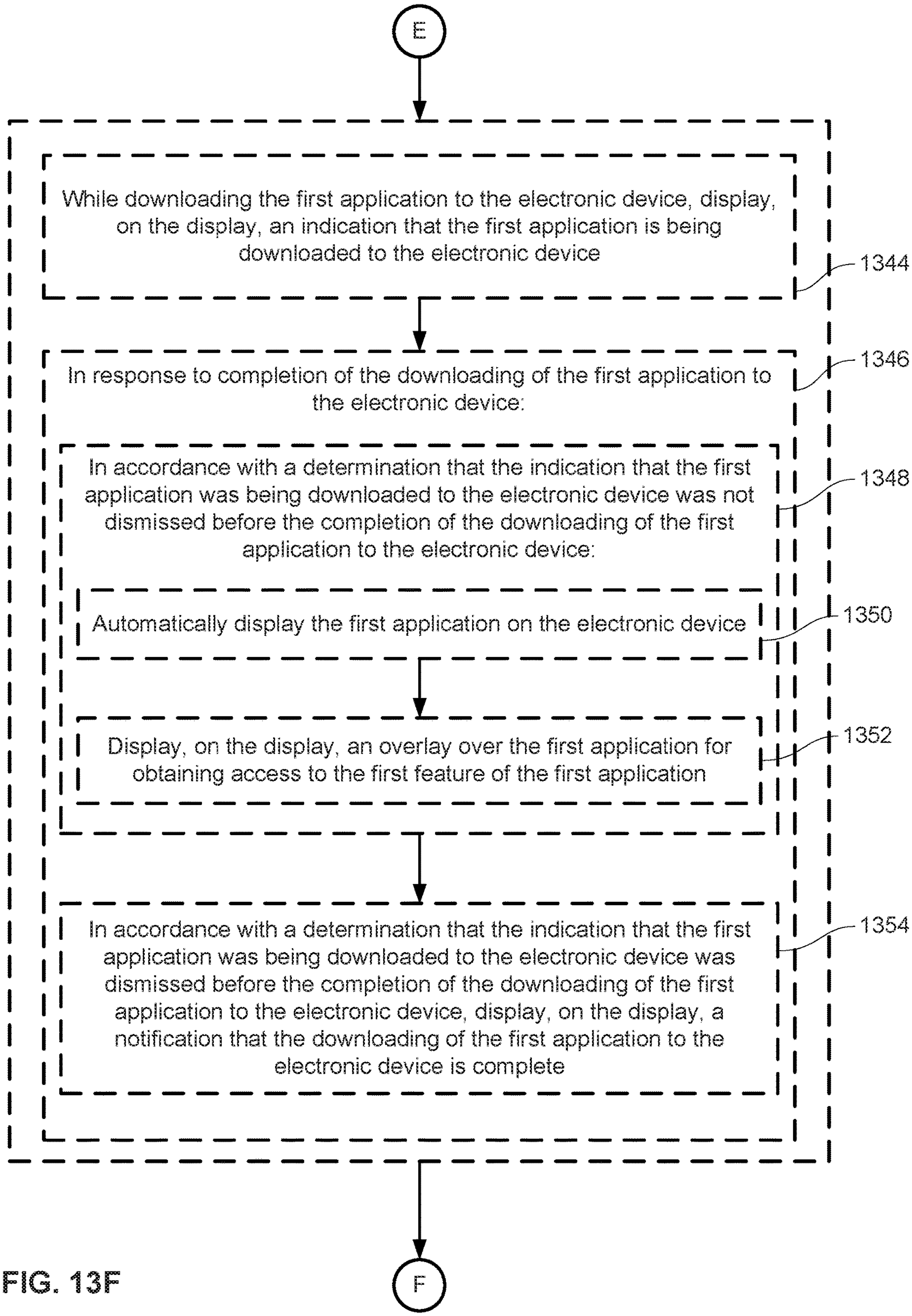
Figure 13G:
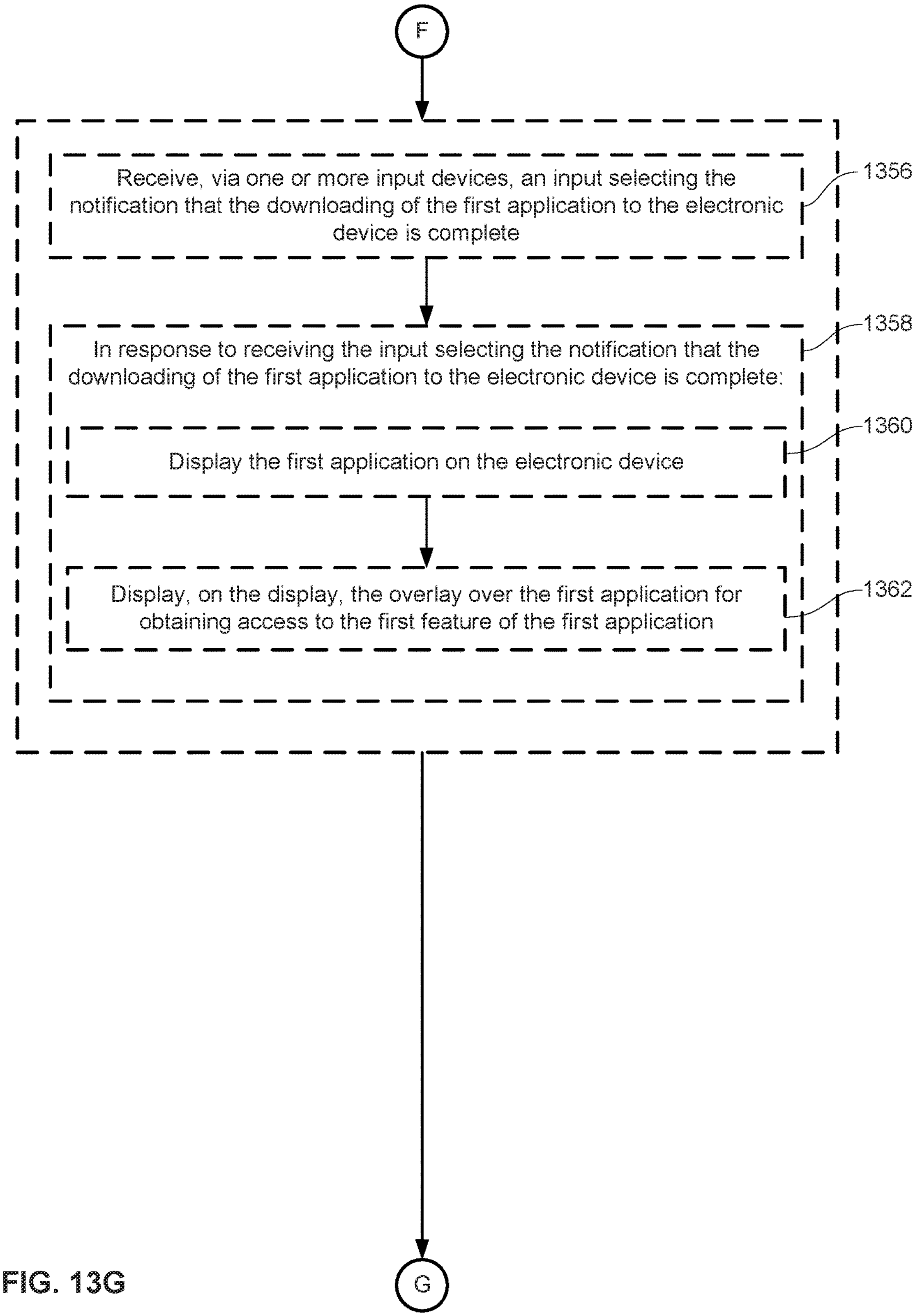
Figure 13H:
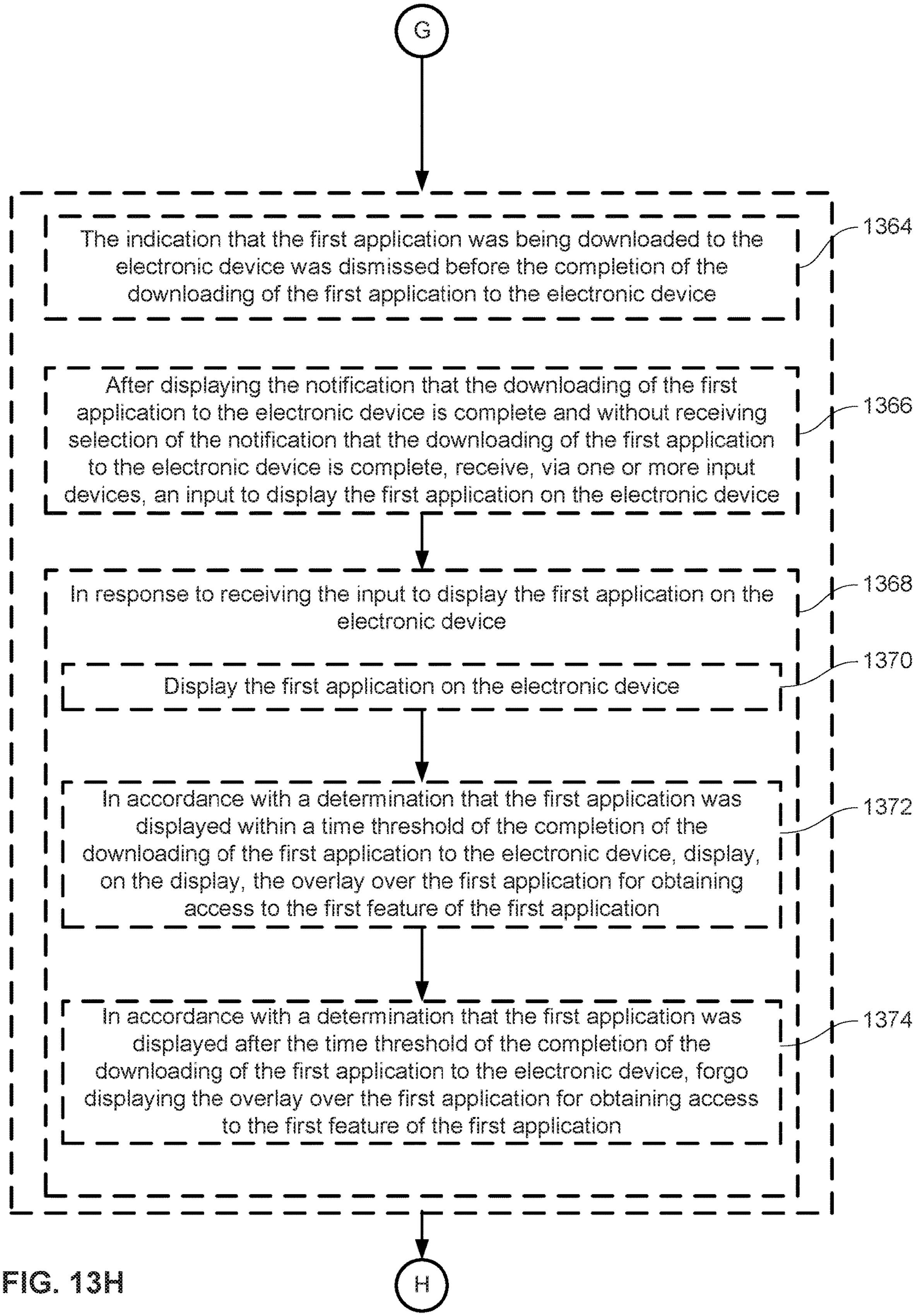
Figure 13I:
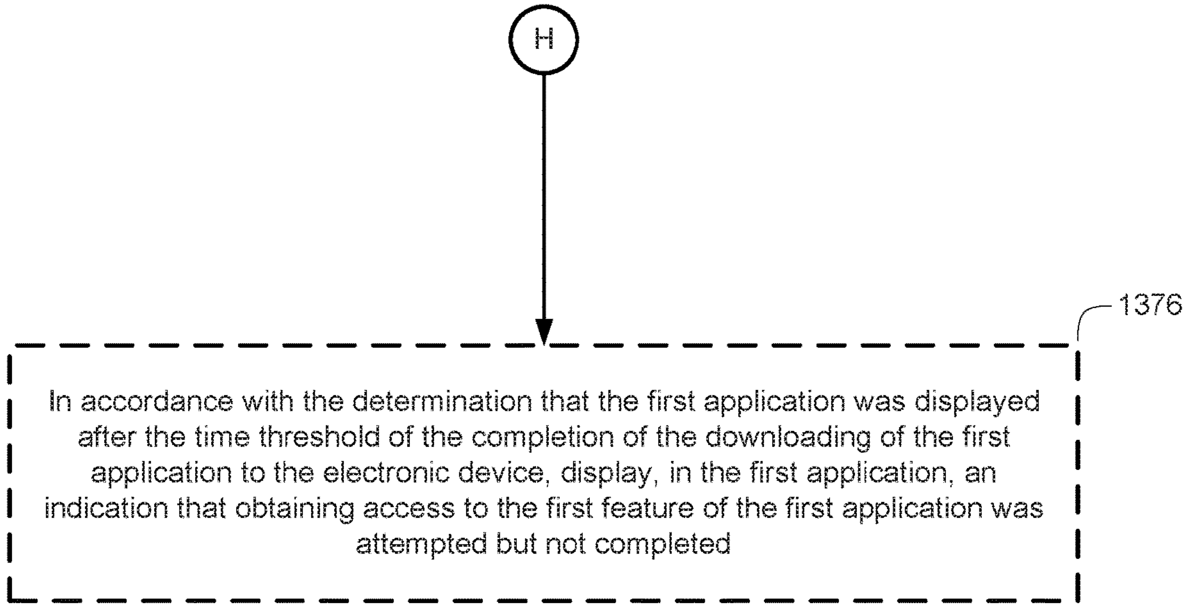

Upon completion of the downloading of game B while device is not displaying the app store application, device 500 displays notification 1231 over home screen 1207 (or whatever user interface device 500 is displaying after having closed the app store application) that indicates that the downloading of game B to device 500 has been completed, as shown in FIG. 12Z. In the example of FIG. 12Z, icon 1252 selectable to open or launch game B has also been added to home screen 1207 by device 500, which additionally indicates that game B is now downloaded and available on device 500. If selection of notification 1231 is detected, as shown in FIG. 12AA, device 500 displays or opens game B in response to such selection, as shown in FIG. 12BB, and displays payment confirmation overlay 1222 over game B for completing the purchase of the Level 1 Pack for game B (in some embodiments, after displaying purchase confirmation overlay 1221 as shown in FIG. 12T).

In some embodiments, selection of notification 1231 that is displayed outside of the app store application and that indicates that the downloading of game B to device 500 has been completed is not detected, and device 500 responds differently when game B is ultimately launched or displayed depending on whether game B was launched or displayed within or outside of a time threshold (e.g., five, ten or fifteen minutes) from when the downloading of game B to device 500 was completed. For example, in FIG. 12CC, notification 1231 is displayed that indicates that game B has now been downloaded to device 500 at time zero as indicated by 1236. The above-referenced time threshold is indicated by 1237 in the figures. Selection of notification 1231 is not detected, however, and after a predetermined amount of time (e.g., three, five or ten seconds), device 500 stops displaying notification 1231 over home screen 1207. Five minutes later, as shown in FIG. 12DD, device 500 continues to display home screen 1207 with game B not yet having been launched or displayed on device 500. In FIG. 12EE, at a time within time threshold 1237 of the completion of the downloading of game B to device 500, selection of icon 1252 for launching or displaying game B on device 500 is detected. In response, device 500 displays or opens game B, as shown in FIG. 12FF, and because game B was launched or displayed within time threshold 1237 of the completion of the downloading of game B, device 500 displays payment confirmation overlay 1222 over game B for completing the purchase of the Level 1 Pack for game B (in some embodiments, after displaying purchase confirmation overlay 1221 as shown in FIG. 12T). Thus, because game B was launched soon after its downloading was completed, it is optionally likely that the user still wishes to purchase the previously-requested in-app purchase for game B that triggered the downloading of game B, and device 500 displays overlay 1222 for completing the in-app purchase once game B is displayed.

In contrast, in FIGS. 12GG-12KK, game B is not launched soon after its downloading is completed. Specifically, in FIG. 12GG, notification 1231 is displayed that indicates that game B has now been downloaded to device 500 at time zero as indicated by 1236. As before, selection of notification 1231 is not detected, however, and after a predetermined amount of time (e.g., three, five or ten seconds), device 500 stops displaying notification 1231 over home screen 1207. Five minutes later, as shown in FIG. 12HH, device 500 continues to display home screen 1207 with game B not yet having been launched or displayed on device 500. In FIG. 12II, at a time after time threshold 1237 of the completion of the downloading of game B to device 500, selection of icon 1252 for launching or displaying game B on device 500 is detected. In response, device 500 displays or opens game B, as shown in FIG. 12JJ, but because game B was launched or displayed after time threshold 1237 of the completion of the downloading of game B, device 500 does not display payment confirmation overlay 1222 (or purchase confirmation overlay 1221 as shown in FIG. 12T) over game B for completing the purchase of the Level 1 Pack for game B. Rather, device 500 displays notification 1233 over game B, as shown in FIG. 12KK, that indicates that the purchase of the in-app purchase for game B (e.g., the "Level 1 Pack") was attempted but not completed, and does not complete the in-app purchase for game B. Thus, because game B was launched relatively long after its downloading was completed, it is optionally not likely that the user still wishes to purchase the previously-requested in-app purchase for game B that triggered the downloading of game B—as such, device 500 does not display overlay 1222 for completing the in-app purchase once game B is displayed, but rather displays notification 1233 to merely indicate such purchase was attempted.

Notification 1233 is optionally selectable to navigate back to the app store application to re-initiate the purchase of the in-app purchase for game B. For example, in FIG. 12LL, selection of notification 1233 is detected, and in response, device 500 launches or displays the app store application (e.g., closes game B), and displays user interface 1202 from which the purchase of the Level 1 Pack for game B was initiated, as shown in FIG. 12MM. From here, the user is able to re-initiate the purchase of the Level 1 Pack for game B, such as described with reference to FIGS. 12A-12H.

FIGS. 13A-13I are flow diagrams illustrating a method of facilitating the purchase of in-app purchases for the games or applications that are available on an electronic device in accordance with some embodiments of the disclosure. The method 1300 is optionally performed at an electronic device such as device 100, device 300, or device 500 as described above with reference to FIGS. 1A-1B, 2-3, 4A-4B and 5A-5H. Some operations in method 1300 are, optionally, combined and/or the order of some operations is, optionally, changed.

As described below, the method 1300 provides ways of facilitating the purchase of in-app purchases for the games or applications that are available on an electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) is in communication with a display (e.g., a television, a display of the electronic device, a touch screen of the electronic device, such as touch screen 504) and one or more input devices (e.g., a touch screen of the electronic device, such as touch screen 504, a remote control of the set-top box), while a first application is not displayed (and, optionally, suspended, closed, or otherwise not running) on the electronic device, receives (1302), via the one or more input devices, an input requesting authorization to access a first feature of the first application, such as in FIG. 12B (e.g., selection of a selectable affordance in an in-app purchase user interface element, as described herein in greater detail with respect to method 1300). The input is optionally a tap on the selectable affordance, a click input detected on a remote control while the selectable affordance has a current focus in the user interface, etc. In some embodiments, in response to receiving the input requesting the authorization to access the first feature of the first application (1304), in accordance with a determination that the first application is downloaded on the electronic device, the electronic device initiates (1306) a process for providing authorization to the electronic device to access the first feature of the first application, such as in FIGS. 12C-12H. For example, if the first application is already downloaded on the electronic device, a process for purchasing the in-app purchase for the first application is initiated. This process optionally includes displaying a prompt confirming the user's request to purchase the first feature of the first application, requesting payment authorization for paying for the first feature of the first application, launching the first application and then requesting payment authorization for paying for the first feature of the first application, etc.

In some embodiments, in response to receiving the input requesting the authorization to access the first feature of the first application, in accordance with a determination that the first application is not downloaded on the electronic device, the electronic device initiates (1308) a process for downloading the first application to the electronic device, such as in FIGS. 12I-12Q (e.g., prior to initiating a process for providing authorization to the electronic device to access the first feature of the first application). For example, if the first application is not already downloaded on the electronic device, a process for first downloading the first application is initiated. This process optionally includes displaying a prompt for downloading the first application to the electronic device. In some embodiments, after the first application is downloaded, the above-described process for purchasing the in-app purchase (e.g., as in FIGS. 12A-12H) for the first application is automatically initiated upon completion of the download and/or installation of the first application. The above-described manner of automatically determining whether an application must first be downloaded in response to a request by a user to purchase a feature of that application allows the electronic device to simplify interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for providing the authorization to the electronic device to access the first feature of the first application comprises (1310), in accordance with a determination that the first feature of the first application is a paid feature (e.g., the in-app purchase requires payment at this time before the in-app purchase is completed (e.g., before the electronic device is authorized to access the first feature of the first application)), displaying (1312), on the display, an overlay requesting authorization for payment for the first feature of the first application, such as in FIGS. 12A-12C. For example, a payment overlay that includes information about the purchase price, payment method (and option to change it), etc., and requests authentication of the user (e.g., via fingerprint, username/password, retinal, other biometric means). If the payment is successfully authorized (e.g., because the user was successfully authenticated), the authorization of the electronic device to access the first feature is optionally completed.

In some embodiments, the process for providing the authorization to the electronic device to access the first feature of the first application comprises, in accordance with a determination that the first feature is a free feature (e.g., the in-app purchase does not require payment at this time before the in-app purchase is completed (e.g., before the electronic device is authorized to access the first feature of the first application)), displaying (1314), on the display, an overlay requesting confirmation for accessing the first feature of the first application, without displaying the overlay requesting the authorization for the payment for the first feature of the first application, such as in FIGS. 12D-12F. For example, instead of a payment overlay, a confirmation overlay is displayed that requests confirmation that the user wishes to authorize the electronic device to access the first feature of the first application. If such confirmation is provided, the authorization of the electronic device to access the first feature is optionally completed. The above-described manner of only displaying the payment authorization overlay when payment is required allows the electronic device to skip the performance of unnecessary actions, which enhances the operability of the device and makes the user-device interface more efficient (e.g., by reducing the number of user-device interactions when payment is not required), which, additionally, reduces power usage and improves battery life of the device by enabling the user to use the device more quickly and efficiently.

In some embodiments, the overlay requesting the authorization for the payment for the first feature of the first application and the overlay requesting the confirmation for accessing the first feature of the first application are displayed overlaid on the first application (1316), such as in FIG. 12H (e.g., the payment/confirmation overlays are displayed as overlaid on the first application.). Thus, in some embodiments, in response to receiving the input requesting authorization to access the first feature of the first application, the first application is first opened/displayed before the payment/confirmation overlays are displayed as overlaid on the first application. The above-described manner of displaying the payment/confirmation overlays over the first application allows the electronic device to provide the context of the first application to the user while the user is providing payment authorization/confirmation (e.g., because the first application is displayed behind the payment/confirmation overlays), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the first application to the electronic device comprises (1318), in accordance with a determination that the first application is a free application (1320) (e.g., the application that needs to be downloaded before the electronic device is able to receive authorization to access the in-app purchase for that application does not require payment at this time before the download commences), displaying, on the display, an indication that the first application needs to be downloaded to the electronic device (1322), such as in FIG. 12K (e.g., a visual indication or an overlay that includes information that indicates that the application with which the in-app purchase corresponds (e.g., the first application) is not downloaded on the electronic device, and must be downloaded to the electronic device before the in-app purchase can be completed). In some embodiments, the process for downloading the first application to the electronic device comprises, in accordance with a determination that the first application is a free application, automatically downloading the first application to the electronic device (1324), such as in FIGS. 12K-12L (e.g., because the first application is a free application, the electronic device optionally does not wait for user confirmation to download the first application after the user has already provided the input that requests the authorization to access the first feature of the first application. Rather, downloading of the first application is optionally automatically initiated, without requiring further user input, upon the electronic device displaying the indication that the first application needs to be downloaded to the electronic device).

In some embodiments, the process for downloading the first application to the electronic device comprises, in accordance with a determination that the first application is a paid application (e.g., the application that needs to be downloaded before the electronic device is able to receive authorization to access the in-app purchase for that application does require payment at this time before the download commences), displaying, on the display, an indication that the first application needs to be purchased (e.g., a visual indication or an overlay that includes information that indicates that the application with which the in-app purchase corresponds (e.g., the first application) is not downloaded on the electronic device, is a paid application, and must be purchased before the in-app purchase can be completed), without automatically downloading the first application to the electronic device (1326), such as in FIG. 12O. For example, because the first application is a paid application, the electronic device optionally does not automatically start downloading the first application. Rather, the electronic device displays the indication that the first application needs to be purchased before the in-app purchase can be completed. The above-described manner of automatically downloading (or not) the first application based on whether the first application is a free or paid application allows the electronic device to more quickly provide the user with access to the first application and/or the in-app purchase when it is free, which enhances the operability of the device and makes the user-device interface more efficient (e.g., by reducing the number of user inputs needed to gain access to the in-app purchase and/or the first application), which, additionally, reduces power usage and improves battery life of the device by enabling the user to use the device more quickly and efficiently.

In some embodiments, while displaying the indication that the first application needs to be purchased, the electronic device receives (1328), via the one or more input devices, an input authorizing the purchase of the first application, such as in FIG. 12P (e.g., the indication that the first application needs to be purchased optionally includes a selectable button for initiating a process for purchasing the first application, and the input authorizing the purchase of the first application is optionally a selection of that button). In response to receiving the input authorizing the purchase of the first application, the electronic device optionally displays (1330), on the display, an overlay requesting authorization for payment for the first application, such as in FIG. 12Q (e.g., a payment authorization overlay for the first application, as described in greater detail herein with reference to methods 700 and 1100). In accordance with a determination that the authorization for payment for the first application is received (e.g., while the overlay requesting authorization for the payment for the first application is received, the electronic device receives authorization for the payment, such as user authentication using biometric (e.g., fingerprint, retinal, etc.) or other authentication methods), the electronic device optionally downloads (1332) the first application to the electronic device, such as in FIGS. 12Q-12R (e.g., upon successful authorization of payment, the first application is downloaded to the electronic device). In some embodiments, if the payment is not successfully authorized, the first application is not downloaded to the electronic device. The above-described manner of requiring payment authorization before allowing the first application to be purchased/downloaded allows the electronic device to ensure that payment is not inadvertently provided by the user, which enhances the operability of the device and makes the user-device interface more efficient (e.g., by reducing the number of erroneous application purchases made by the electronic device), which, additionally, reduces power usage and improves battery life of the device by enabling the user to use the device more quickly and efficiently.

In some embodiments, the process for providing the authorization to the electronic device to access the first feature of the first application comprises (1334), displaying the first application on the electronic device (1336), such as in FIG. 12H (e.g., launching, running, waking or otherwise displaying the first application). Thus, in some embodiments, selection of a selectable affordance in the in-app purchase user interface element for initiating a process to purchase access to the first feature of the first application optionally launches, wakes, displays or otherwise runs the first application on the electronic device. In some embodiments, the process for providing the authorization to the electronic device to access the first feature of the first application comprises providing the authorization to access the first feature of the first application to the electronic device while the first application is displayed on the electronic device (1338), such as in FIG. 12H (e.g., providing the electronic device with the authorization to access the first feature optionally includes displaying, as an overlay over the first application, a dialog confirming that the user wishes to access the in-app purchase (e.g., if the in-app purchase is free) and/or displaying a payment authorization overlay displayed over the first application that requests payment authorization for the in-app purchase (e.g., if the in-app purchase is paid)). If the in-app purchase is confirmed or if payment is authorized, the in-app purchase is optionally complete and the electronic device is optionally authorized to access the first feature of the first application. The above-described manner of facilitating the purchase or authorization of an in-app purchase from within the corresponding application itself allows the electronic device to provide more immediate access to the content of the in-app purchase, which enhances the operability of the device and makes the user-device interface more efficient (e.g., by reducing the number of user inputs needed to access the content of the in-app purchase), which, additionally, reduces power usage and improves battery life of the device by enabling the user to use the device more quickly and efficiently.

In some embodiments, the process for providing the authorization to the electronic device to access the first feature of the first application comprises (1340) providing the authorization to access the first feature of the first application to the electronic device without displaying (e.g., without launching, running, waking or otherwise displaying) the first application on the electronic device (1342), such as in FIGS. 12B-12F. For example, in some embodiments, selection of a selectable affordance in the in-app purchase user interface element for initiating a process to purchase access to the first feature of the first application optionally starts a process whereby one or more of a prompt confirming the user's request to purchase the first feature of the first application is displayed (e.g., if the first feature is a free feature), payment authorization for paying for the first feature of the first application is requested (e.g., if the first feature is a paid feature), and upon the payment being authorized, the electronic device is provided access to the first feature of the first application (e.g., the in-app purchase has been completed), all without launching, opening, waking, etc. the first application. Thus, in some embodiments, the in-app purchase is completed from outside of the first application, without displaying the first application. The above-described manner of allowing a user to purchase access to a feature of an application from outside of the application itself allows the electronic device to simplify interactions with the user, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, while downloading the first application to the electronic device (e.g., once the downloading of the first application to the electronic device has begun), the electronic device displays (1344), on the display, an indication that the first application is being downloaded to the electronic device, such as in FIG. 12R (e.g., after the downloading of the first application has begun, and before the downloading of the first application has been completed, and while the downloading of the first application is occurring, displaying an overlay over an app store application (or other user interface of the electronic device) indicating that the first application is being downloaded to the electronic device). In response to completion of the downloading of the first application to the electronic device (1346) (e.g., once the downloading of the first application to the electronic device has ended), in accordance with a determination that the indication that the first application was being downloaded to the electronic device was not dismissed before the completion of the downloading of the first application to the electronic device (1348), such as in FIG. 12S (e.g., the overlay indicating that the first application was being downloaded to the electronic device was not closed or otherwise navigated away from during the entire downloading of the first application. In some embodiments, if the overlay was displayed in the app store application on the electronic device, and the user closed the app store application while the first application was being downloaded to the electronic device, the electronic device determines that the overlay was dismissed before the completion of the downloading of the first application to the electronic device), the electronic device automatically displays (1350) (e.g., launching, running, waking or otherwise displaying) the first application on the electronic device, such as in FIG. 12T. In some embodiments, the electronic device displays (1352), on the display, an overlay over the first application for obtaining access to the first feature of the first application, such as in FIG. 12T (e.g., if the user did not dismiss the overlay indicating that the first application was being downloaded to the electronic device, upon completion of the downloading of the first application to the electronic device, the electronic device optionally automatically displays the first application (e.g., without further user input), and once the first application is displayed, displays an overlay over the first application for obtaining authorization to access the first feature of the first application that the user had requested). This overlay optionally includes information about the first feature (e.g., in-app purchase), its price (if it is a paid feature) and a selectable button, selection of which gives the electronic device authorization to access the first feature (e.g., completes the in-app purchase)—if the first feature is a paid feature, selection of the button optionally first causes the electronic device to request payment authorization before the electronic device is provided the authorization to access the first feature.

In response to completion of the downloading of the first application to the electronic device (e.g., once the downloading of the first application to the electronic device has ended), in accordance with a determination that the indication that the first application was being downloaded to the electronic device was dismissed before the completion of the downloading of the first application to the electronic device, such as in FIGS. 12X-12Y (e.g., the overlay was closed, dismissed or otherwise navigated away from during the downloading of the first application to the electronic device. For example, if the overlay was displayed in the app store application on the electronic device, and the user closed the app store application while the first application was being downloaded to the electronic device, the electronic device optionally determines that the overlay was dismissed), the electronic device displays (1354), on the display, a notification that the downloading of the first application to the electronic device is complete, such as in FIG. 12Z (e.g., without automatically displaying the first application upon completion of the download of the first application). In the circumstance where the first application download overlay was dismissed, the electronic device optionally notifies the user (e.g., via a notification overlaid on whatever user interface is being displayed on the electronic device when the download of the first application is completed which will, in some circumstances be a different application, a home screen, or a lock screen) that the download has been completed. The user is able to complete the in-app purchase once the first application has been downloaded in a number of ways, as described below. The above-described manner of responding differently based on whether the first application download overlay was dismissed or not allows the electronic device to present information to the user in a manner consistent with the user's inputs to the electronic device (e.g., automatically display the first application if the user did not dismiss the download overlay, which indicates current user interest to view the first application, and not automatically displaying the first application if the user did dismiss the download overlay, which indicates lack of user interest to view the first application), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the electronic device receives (1356), via the one or more input devices, an input selecting the notification that the downloading of the first application to the electronic device is complete, such as in FIG. 12AA (e.g., a tap detected on the notification that the downloading of the first application to the electronic device is complete). In some embodiments, in response to receiving the input selecting the notification that the downloading of the first application to the electronic device is complete (1358), the electronic device displays (1360) (e.g., launching, running, waking or otherwise displaying) the first application on the electronic device, such as in FIG. 12BB. In some embodiments, in response to receiving the input selecting the notification that the downloading of the first application to the electronic device is complete, the electronic device displays (1362), on the display, the overlay over the first application for obtaining access to the first feature of the first application, such as in FIG. 12BB (e.g., the electronic device displays an overlay over the first application for obtaining authorization to access the first feature of the first application that the user had requested). This overlay optionally includes information about the first feature (e.g., in-app purchase), its price (if it is a paid feature) and a selectable button, selection of which gives the electronic device authorization to access the first feature (e.g., completes the in-app purchase)—if the first feature is a paid feature, selection of the button optionally first causes the electronic device to request payment authorization before the electronic device is provided the authorization to access the first feature. The above-described manner of displaying the first application and completing the in-app purchase in response to user input selecting the first application download completion indication allows the electronic device to present information to the user in a manner consistent with the user's inputs to the electronic device (e.g., display the first application when the user selects the notification, which indicates current user interest to view the first application and complete the in-app purchase), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the indication that the first application was being downloaded to the electronic device was dismissed before the completion of the downloading of the first application to the electronic device (1364), such as in FIGS. 12X-12Y (e.g., the overlay was closed, dismissed or otherwise navigated away from during the downloading of the first application to the electronic device.). For example, if the overlay was displayed in the app store application on the electronic device, and the user closed the app store application while the first application was being downloaded to the electronic device, the electronic device optionally determines that the overlay was dismissed. In some embodiments, after displaying the notification that the downloading of the first application to the electronic device is complete and without receiving selection of the notification that the downloading of the first application to the electronic device is complete, the electronic device receives (1366), via the one or more input devices, an input to display (e.g., launch, run, wake or otherwise display) the first application on the electronic device, such as in FIG. 12EE (e.g., the user does not select the notification that the downloading of the first application to the electronic device is complete. Rather, the user optionally has launched the first application (e.g., by selecting the icon for the first application on a home screen of the electronic device) after the first application download has completed, and without having selected the notification that the downloading of the first application to the electronic device was completed).

In response to receiving the input to display the first application on the electronic device (1368), the electronic device optionally displays (1370) (e.g., launching, running, waking or otherwise displaying) the first application on the electronic device, such as in FIG. 12FF. In some embodiments, in accordance with a determination that the first application was displayed within a time threshold (e.g., five, ten or fifteen minutes) of the completion of the downloading of the first application to the electronic device, the electronic device displays (1372), on the display, the overlay over the first application for obtaining access to the first feature of the first application, such as in FIG. 12FF. For example, if the user has launched the first application soon after the downloading of the first application is completed (e.g., within the time threshold of the completion of the downloading of the first application), the electronic device optionally determines that the user wishes to complete the in-app purchase, and displays the overlay over the first application for completing the in-app purchase. This overlay optionally includes information about the first feature (e.g., in-app purchase), its price (if it is a paid feature) and a selectable button, selection of which gives the electronic device authorization to access the first feature (e.g., completes the in-app purchase)—if the first feature is a paid feature, selection of the button optionally first causes the electronic device to request payment authorization before the electronic device is provided the authorization to access the first feature.

In some embodiments, in accordance with a determination that the first application was displayed after the time threshold (e.g., five, ten or fifteen minutes) of the completion of the downloading of the first application to the electronic device, the electronic device forgoes displaying (1374) the overlay over the first application for obtaining access to the first feature of the first application, such as in FIGS. 12JJ-12KK. For example, if the user has launched the first application long after the downloading of the first application is completed (e.g., outside of the time threshold of the completion of the downloading of the first application), the electronic device optionally determines that the user no longer wishes to complete the in-app purchase, and does not display the overlay over the first application for completing the in-app purchase. The above-described manner of responding differently based on whether the first application was displayed soon or long after the downloading of the first application is completed allows the electronic device to present information to the user in a manner consistent with the user's inputs to the electronic device (e.g., display the overlay for completing the in-app purchase if the user displayed the first application soon after the downloading of the first application is complete, which indicates current user interest to complete the in-app purchase, and not displaying the overlay for completing the in-app purchase if the user displayed the first application long after the downloading of the first application is complete, which indicates lack of user interest to complete the in-app purchase), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, in accordance with the determination that the first application was displayed (e.g., launched, run, waked or otherwise displayed) after the time threshold (e.g., five, ten or fifteen minutes) of the completion of the downloading of the first application to the electronic device, the electronic device displays (1376), in the first application, an indication that obtaining access to the first feature of the first application was attempted but not completed, such as in FIG. 12KK. For example, in lieu of displaying the overlay for completing the in-app purchase, the electronic device displays an overlay over the first application that indicates that the in-app purchase was not completed, to indicate remind the user that the in-app purchase was previously requested. Selection of this indication optionally returns the electronic device to a user interface (e.g., app store user interface corresponding to the in-app purchase) from which the user is able to re-request the in-app purchase, such as in FIGS. 12LL-12MM. The above-described manner of displaying the in-app purchase reminder, without displaying the actual overlay for completing the in-app purchase, in the case when the user displayed the first application long after the downloading of the first application was completed allows the electronic device to present information to the user in a manner consistent with the user's inputs to the electronic device (e.g., simply reminding the user of the in-app purchase, and not putting the user directly into the in-app purchase process flow), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

It should be understood that the particular order in which the operations in FIGS. 13A-13I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1500 and 1700) are also applicable in an analogous manner to method 1300 described above with respect to FIGS. 13A-13I. For example, the requests to obtain authorization to access a feature of an application, processes for providing the electronic device with the authorization to access the feature of the application, processes for downloading an application to the electronic device, etc. described above with reference to method 1300 optionally have one or more of the characteristics of the requests to obtain authorization to access a feature of an application, processes for providing the electronic device with the authorization to access the feature of the application, processes for downloading an application to the electronic device, etc. described herein with reference to other methods described herein (e.g., methods 700, 900, 1100, 1500 and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 13A-13I are, optionally, implemented by components depicted in FIGS. 1A-1B. For example, receiving operation 1302 and initiating operations 1306 and 1308 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen 504 corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Application Downloads Outside of App Store Application

Users interact with electronic devices in many different manners, including browsing applications that may be available (e.g., available for purchase and/or download) on the electronic devices. For example, a user may browse applications in an app store application for downloading applications to an electronic device. However, in some circumstances, the user is able to browse or view such available applications from outside of the app store application. The embodiments described below provide ways in which an electronic device facilitates the download/purchase of games, applications and/or in-app purchases from outside of an app store application that is for browsing such content available on the electronic device, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 14A:
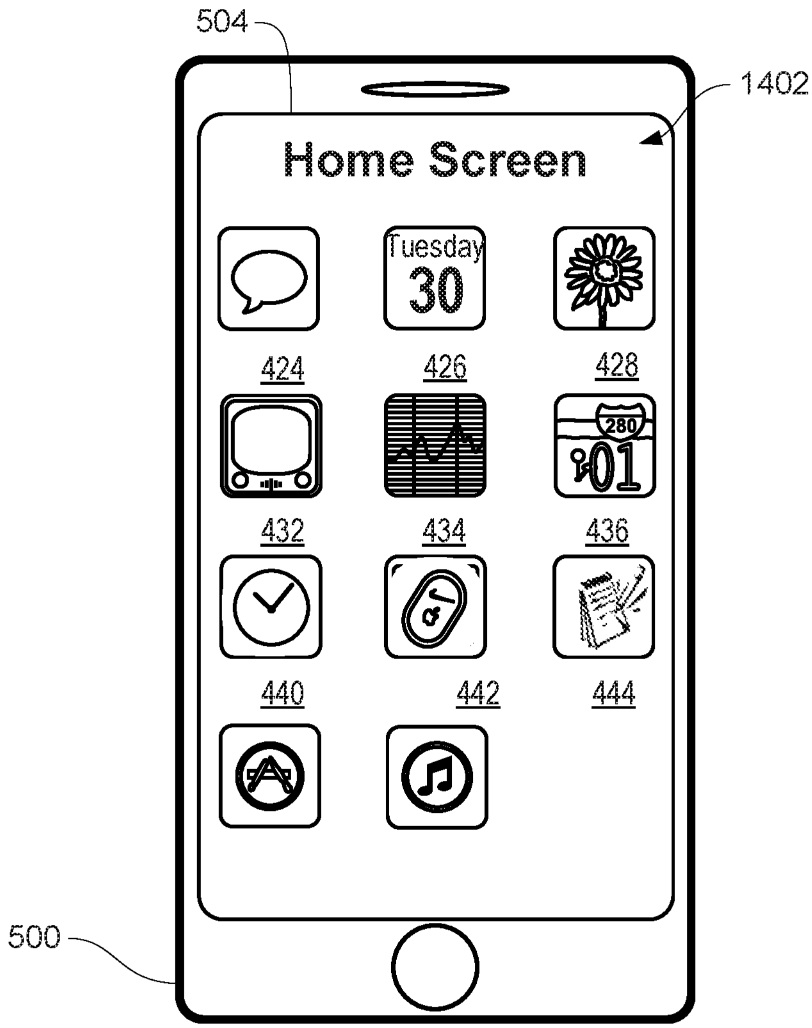
FIGS. 14A-14P illustrate exemplary ways in which an electronic device facilitates the download/purchase of games, applications and/or in-app purchases from outside of an app store application that is for browsing such content available on the electronic device in accordance with some embodiments of the disclosure.
Figure 14B:
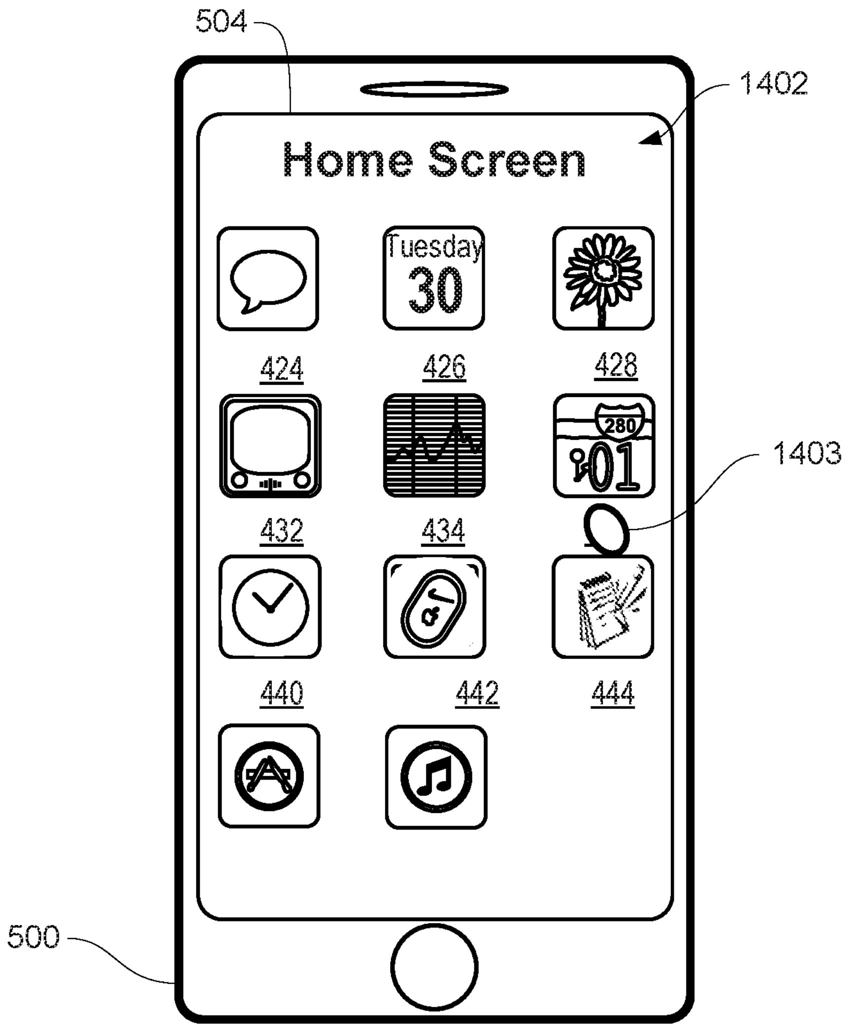
Figure 14C:
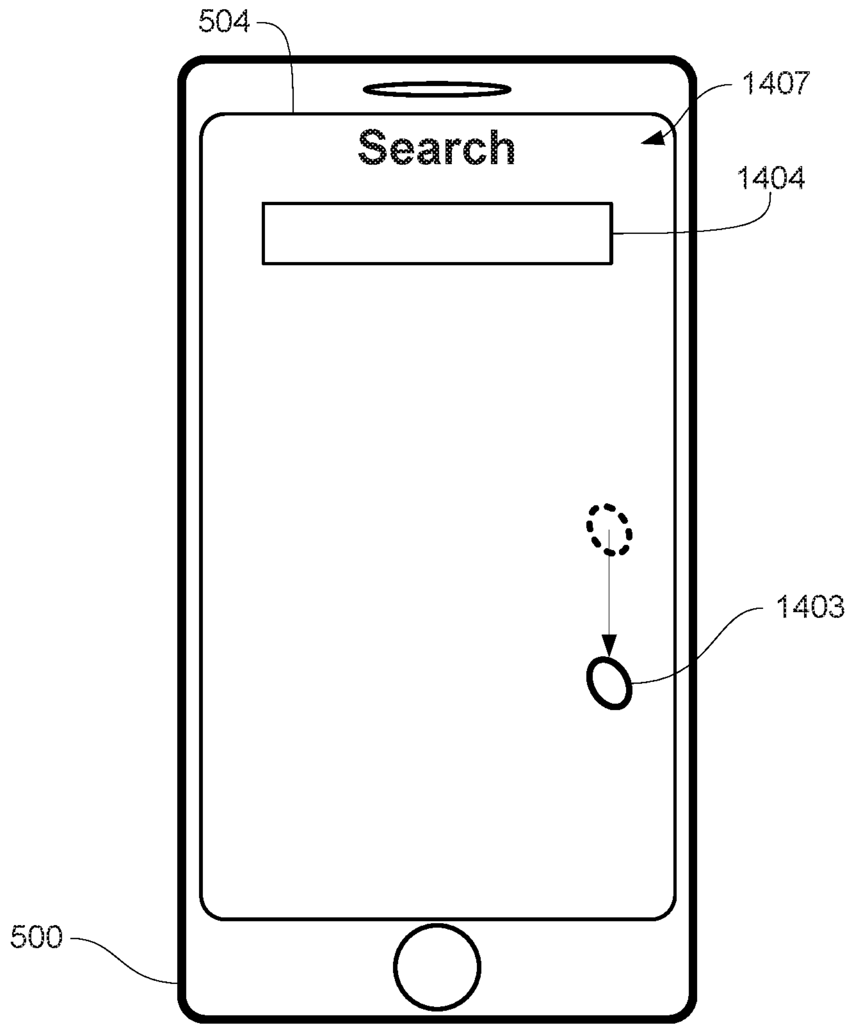
Figure 14D:
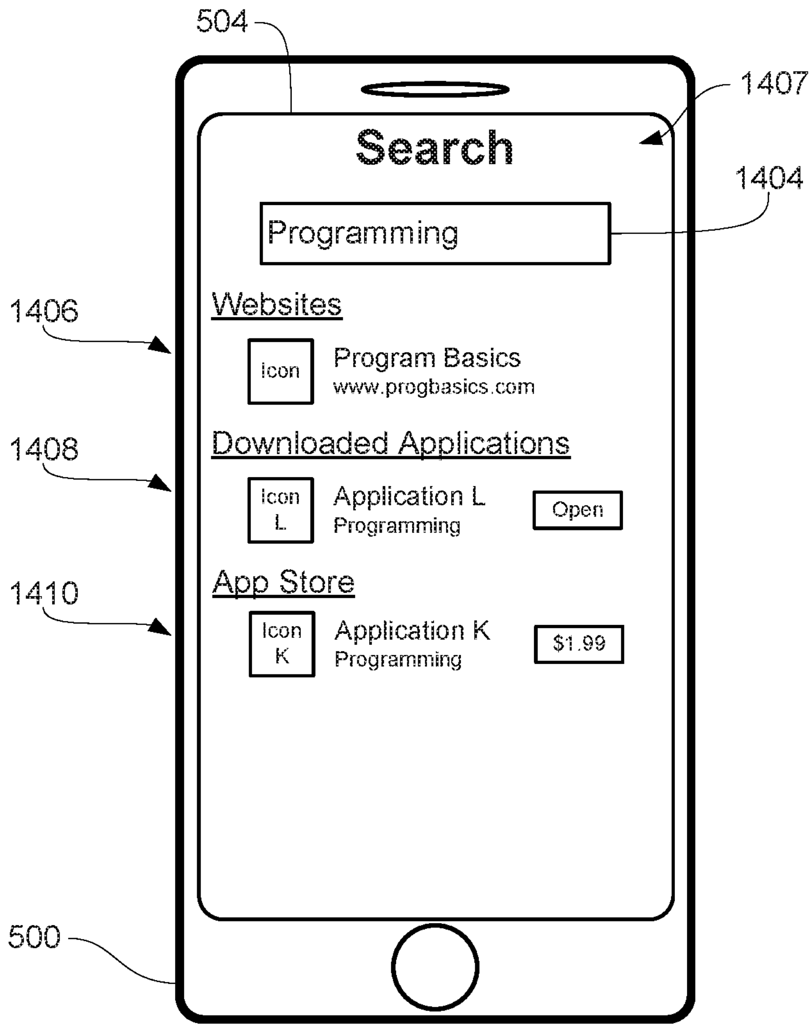
Figure 14E:
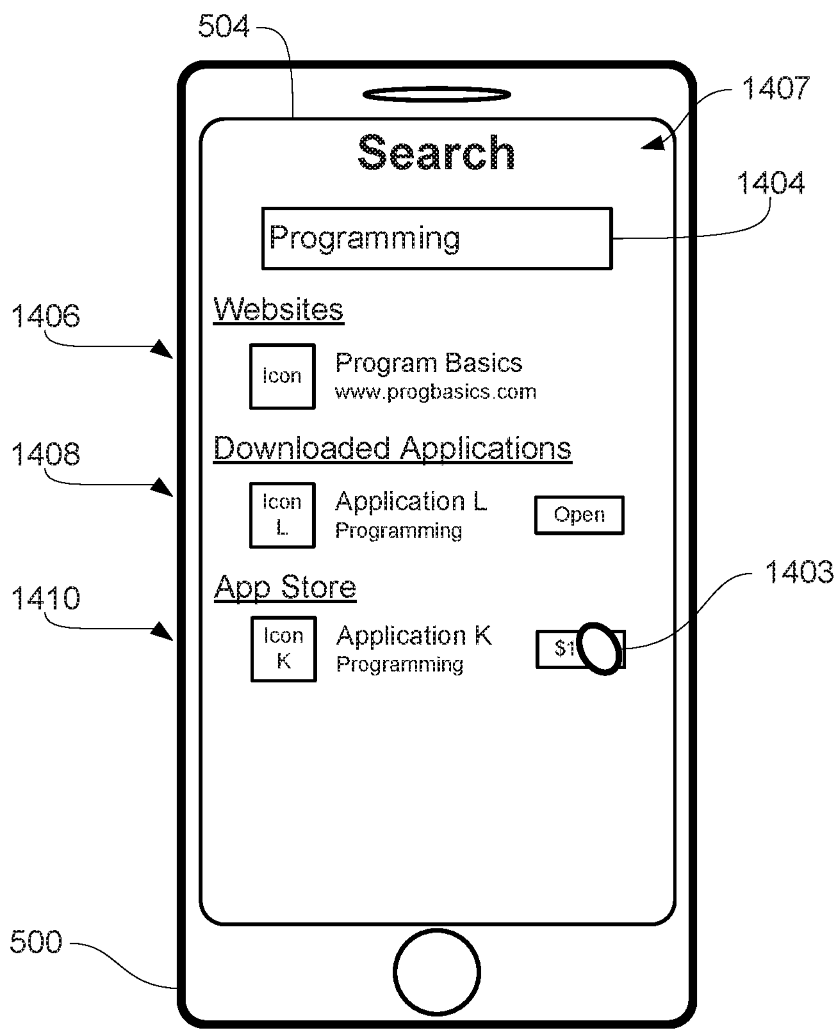
Figure 14F:
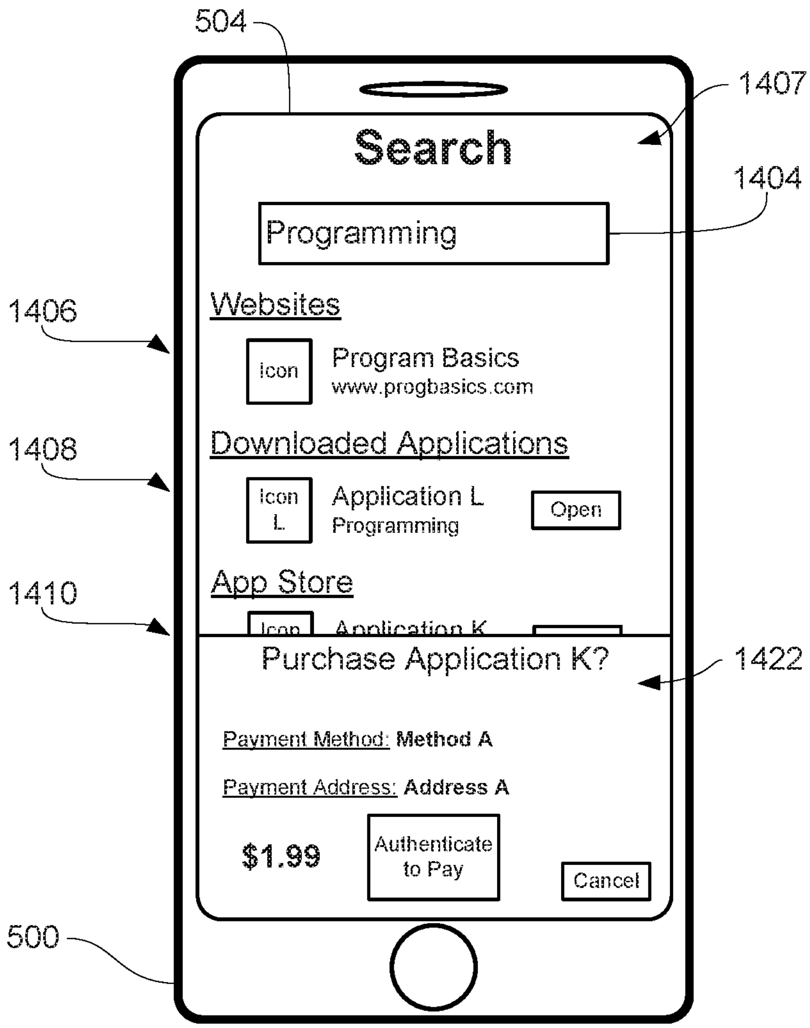
Figure 14G:
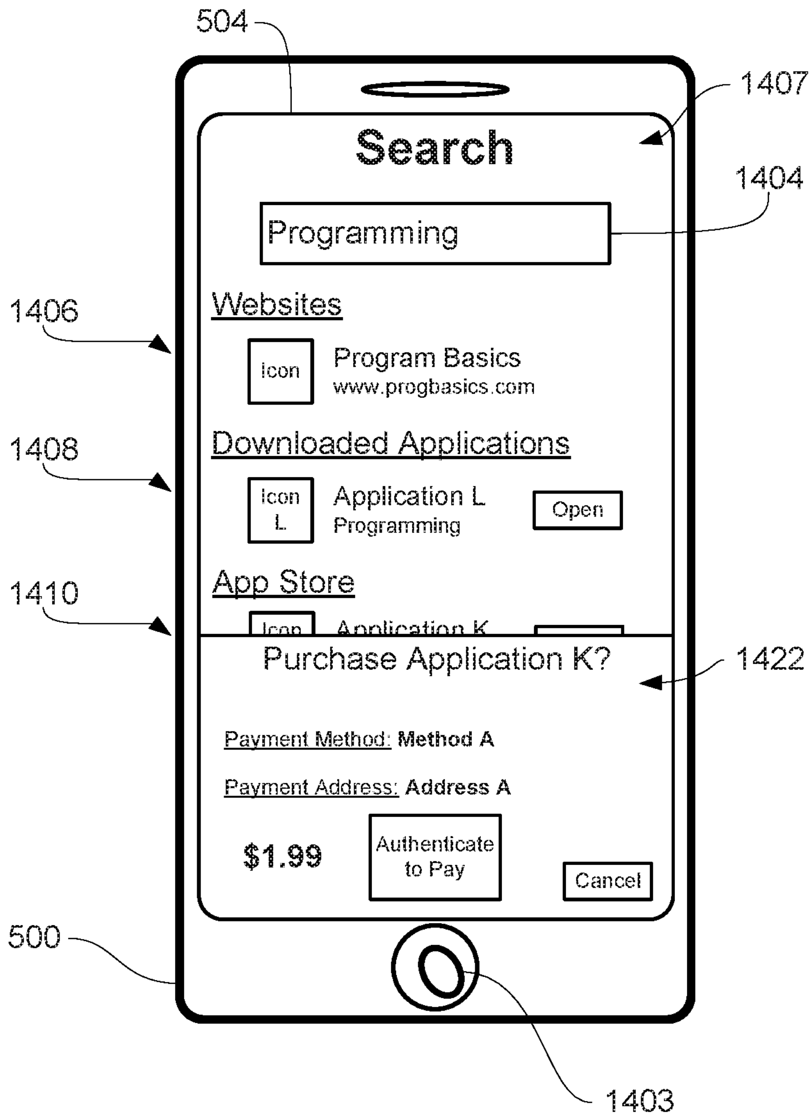
Figure 14H:
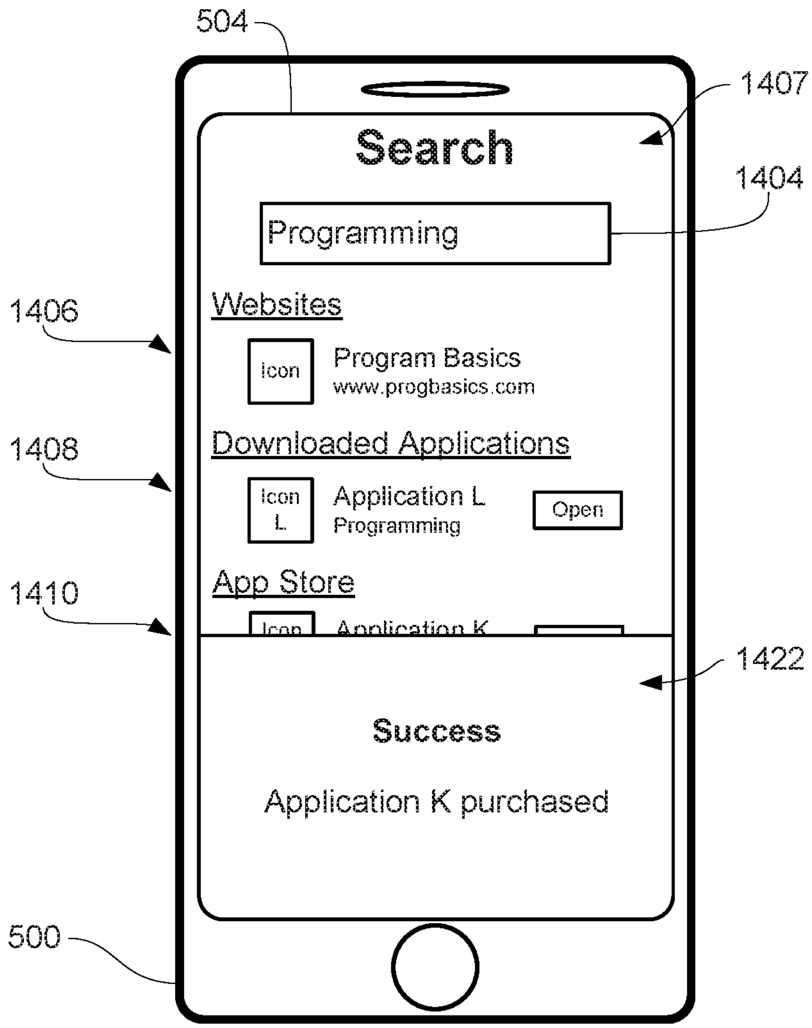
Figure 14I:
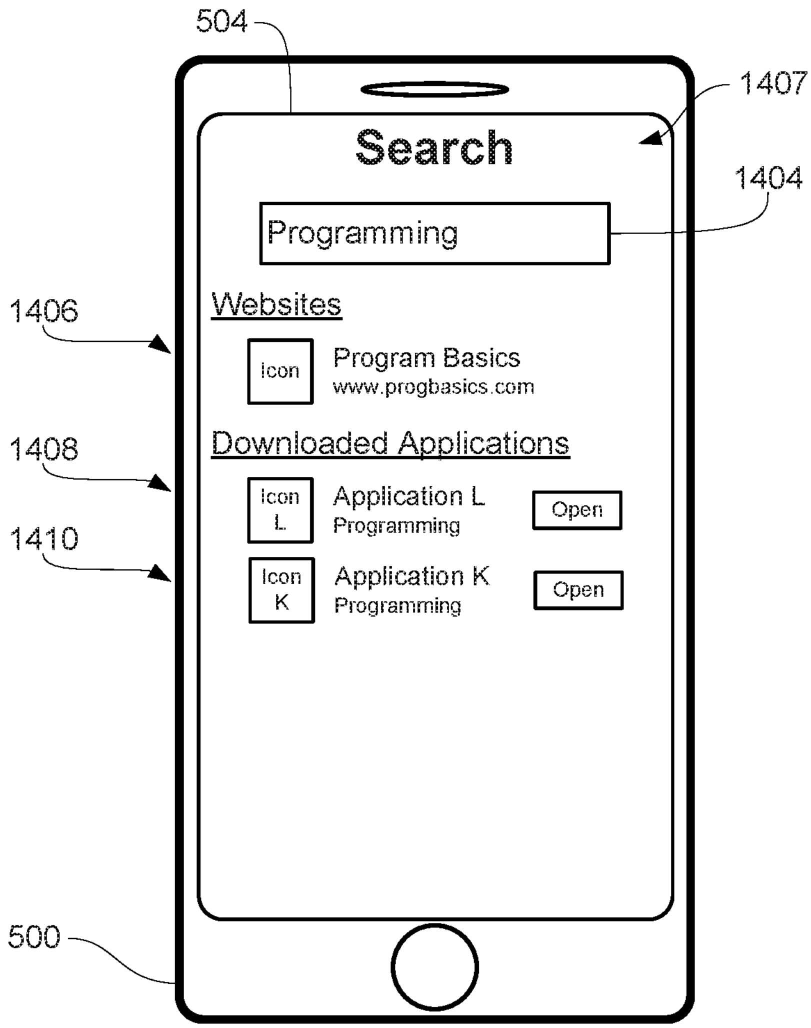
Figure 14J:
Figure 14K:
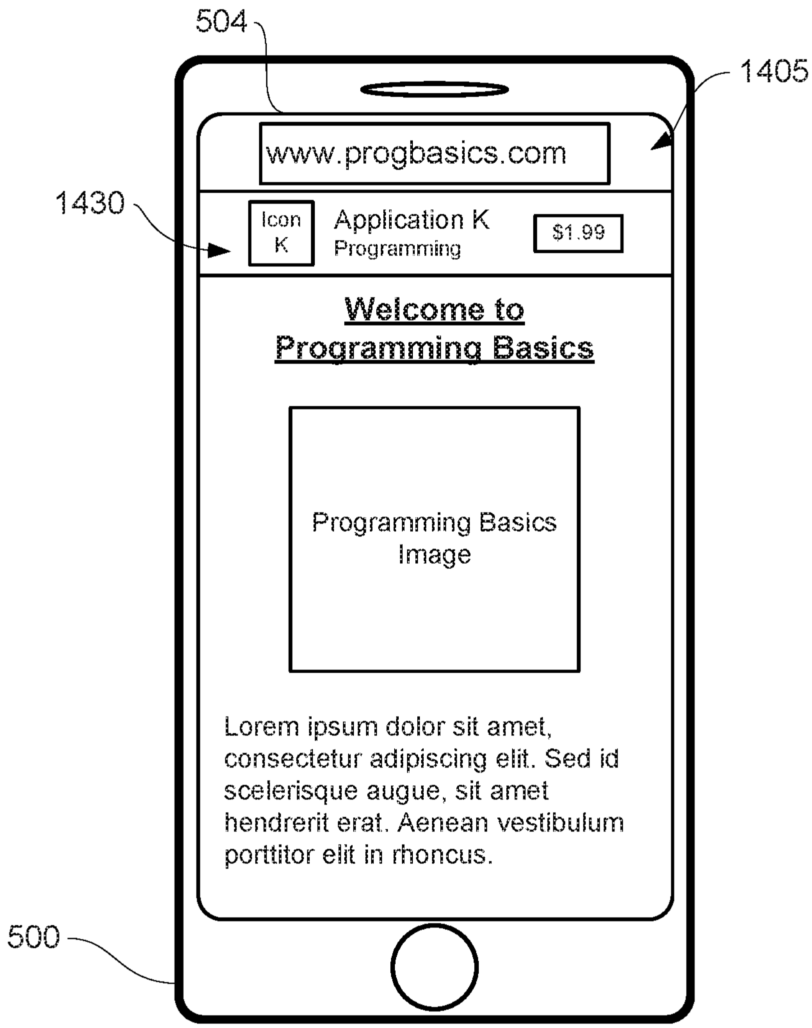
Figure 14L:
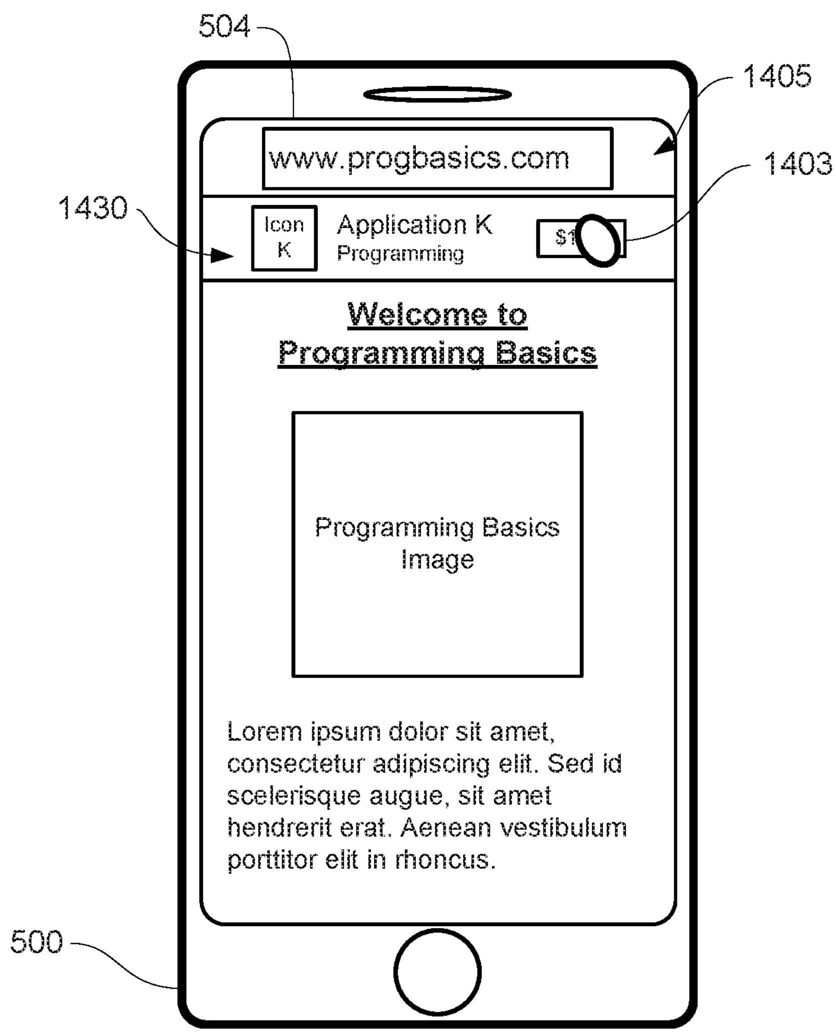
Figure 14M:
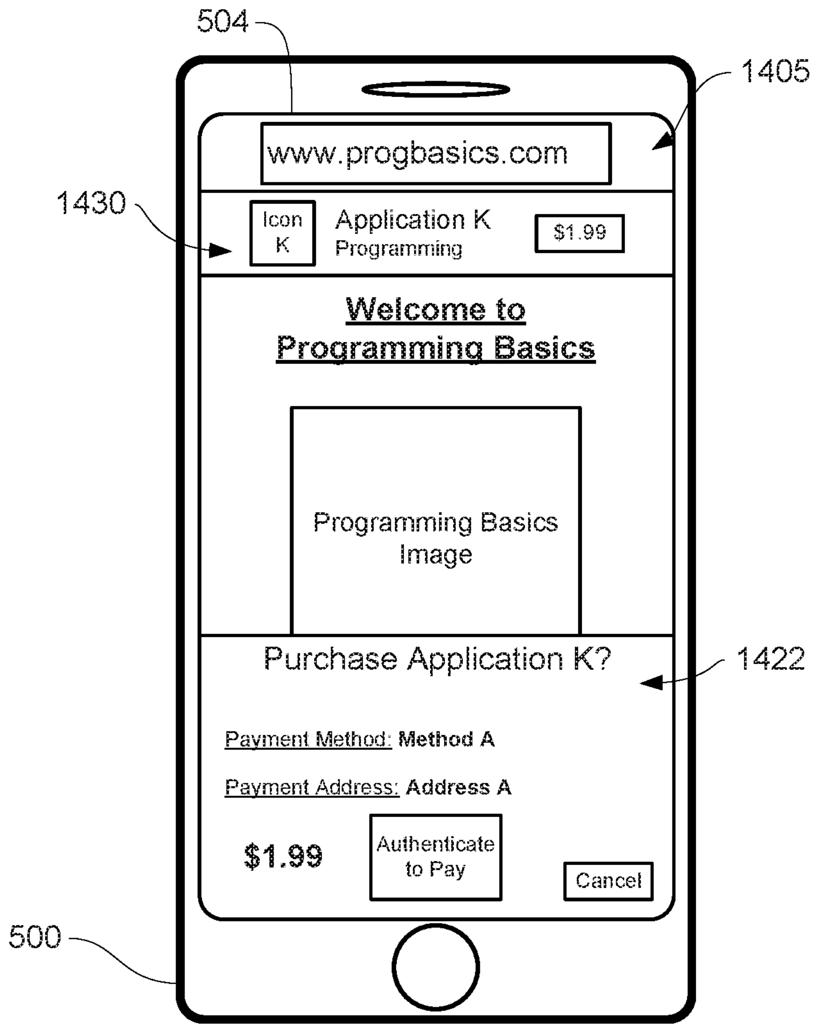
Figure 14N:
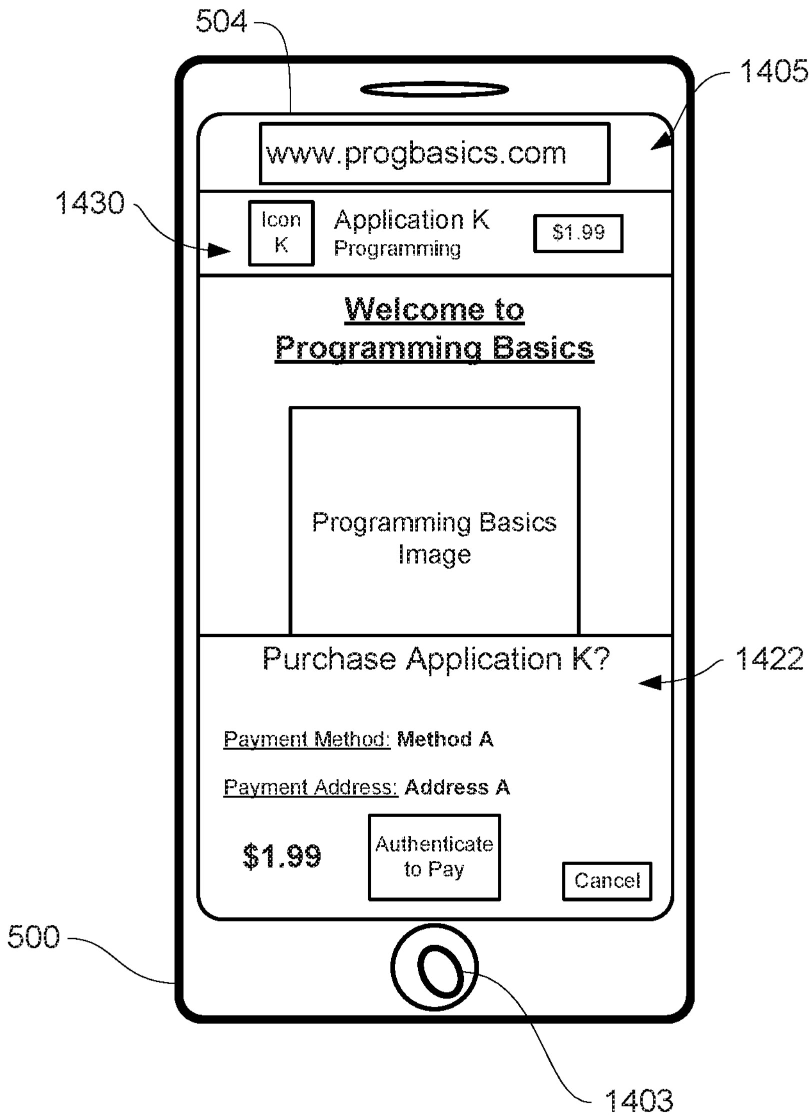
Figure 14O:
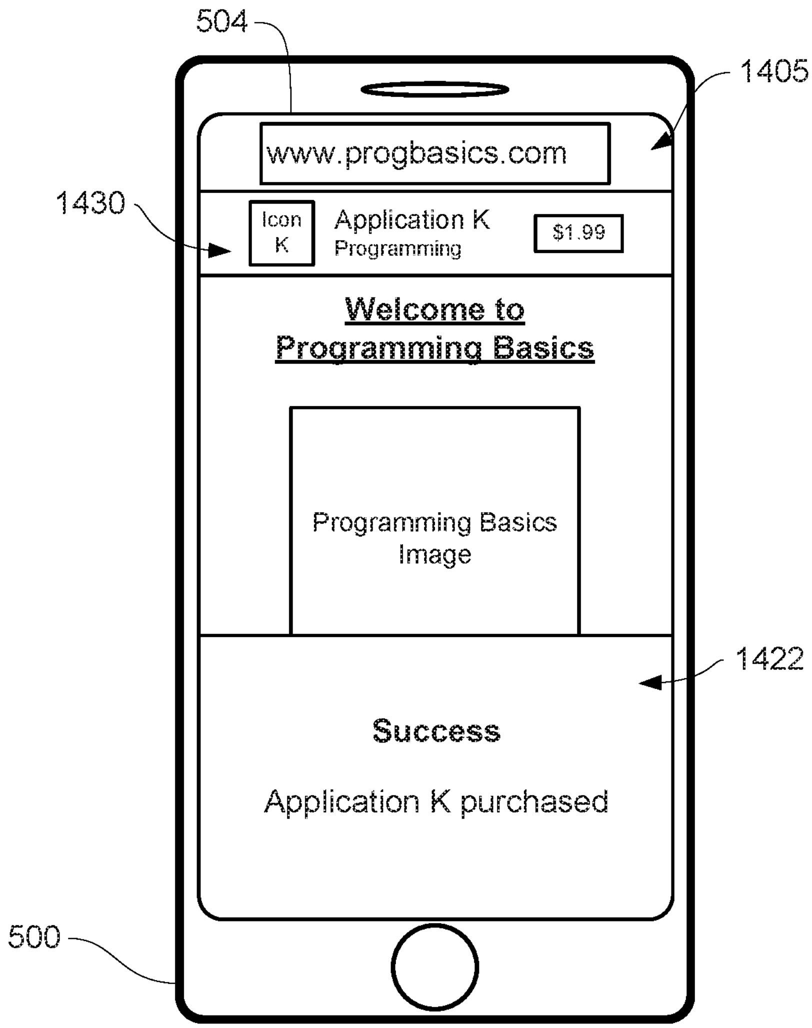
Figure 14P:
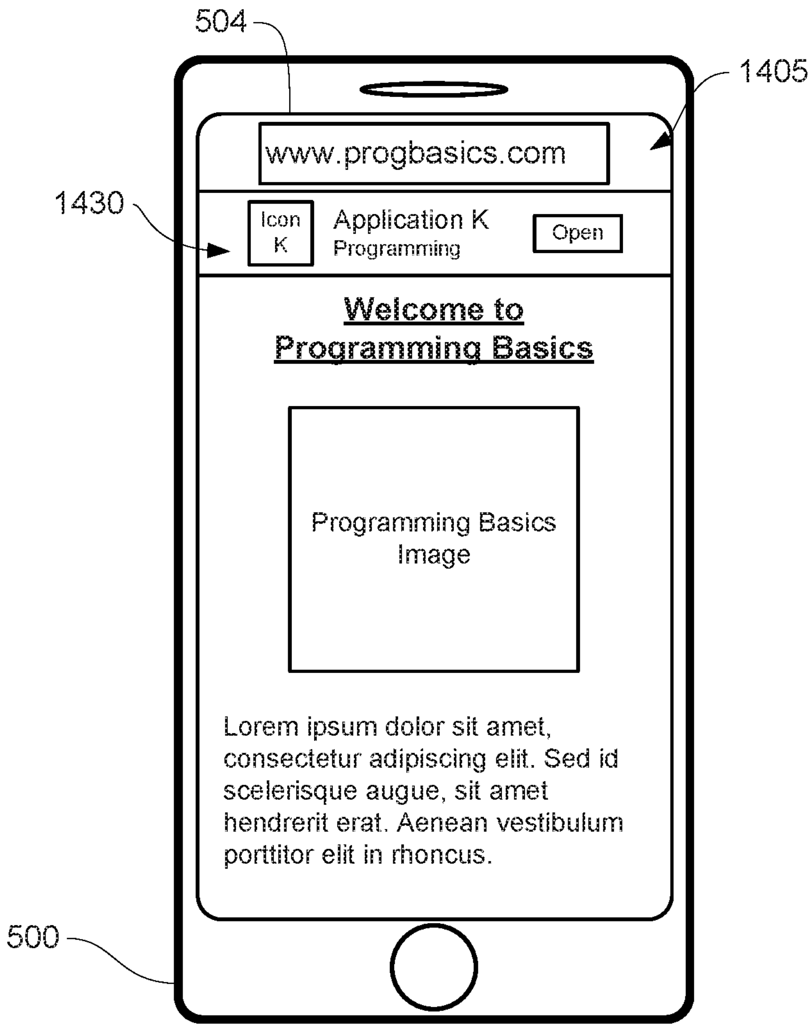
Figure 15A:
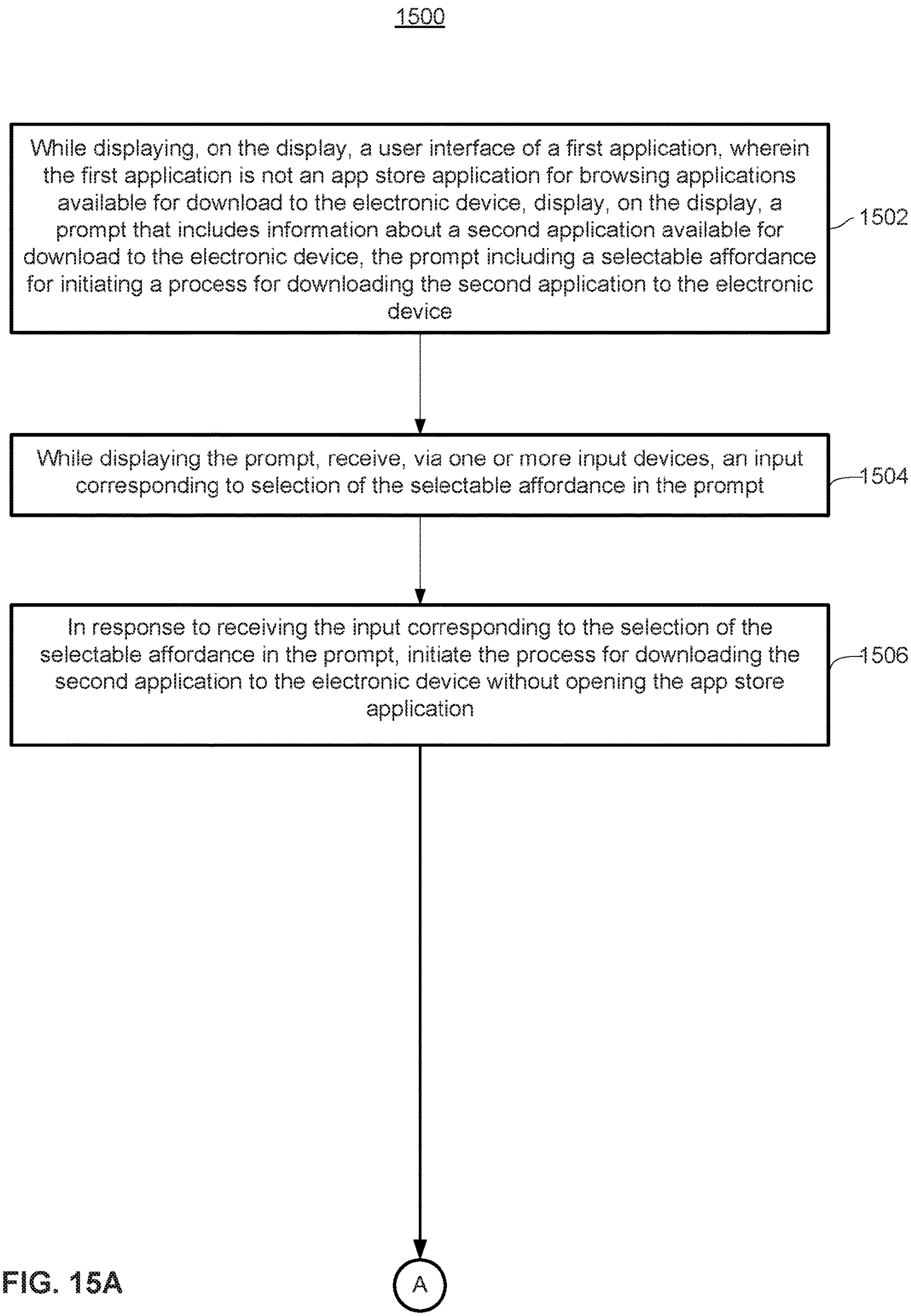
FIGS. 15A-15D are flow diagrams illustrating a method of facilitating the download/purchase of games, applications and/or in-app purchases from outside of an app store application that is for browsing such content available on an electronic device in accordance with some embodiments of the disclosure.
Figure 15B:
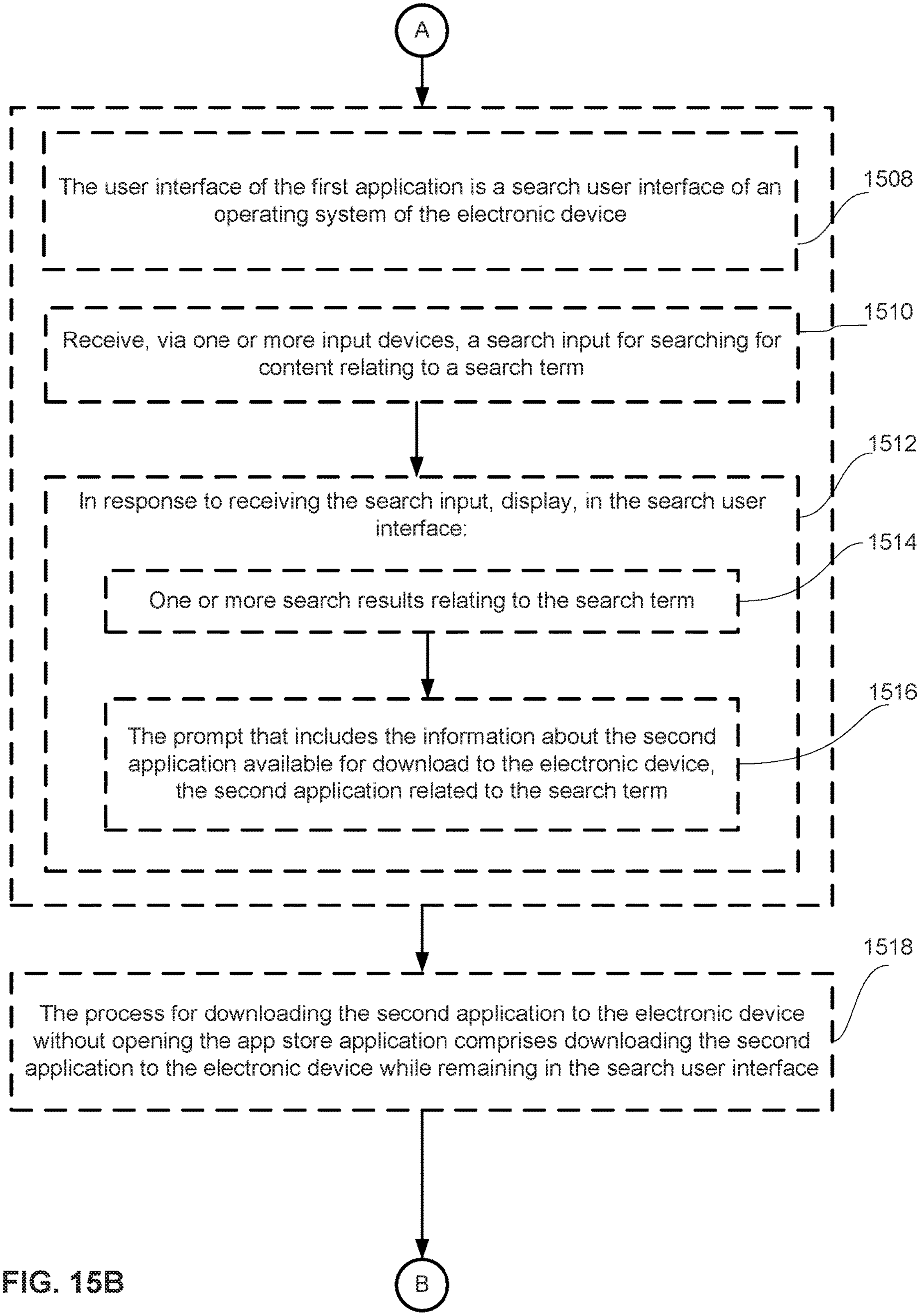
Figure 15C:
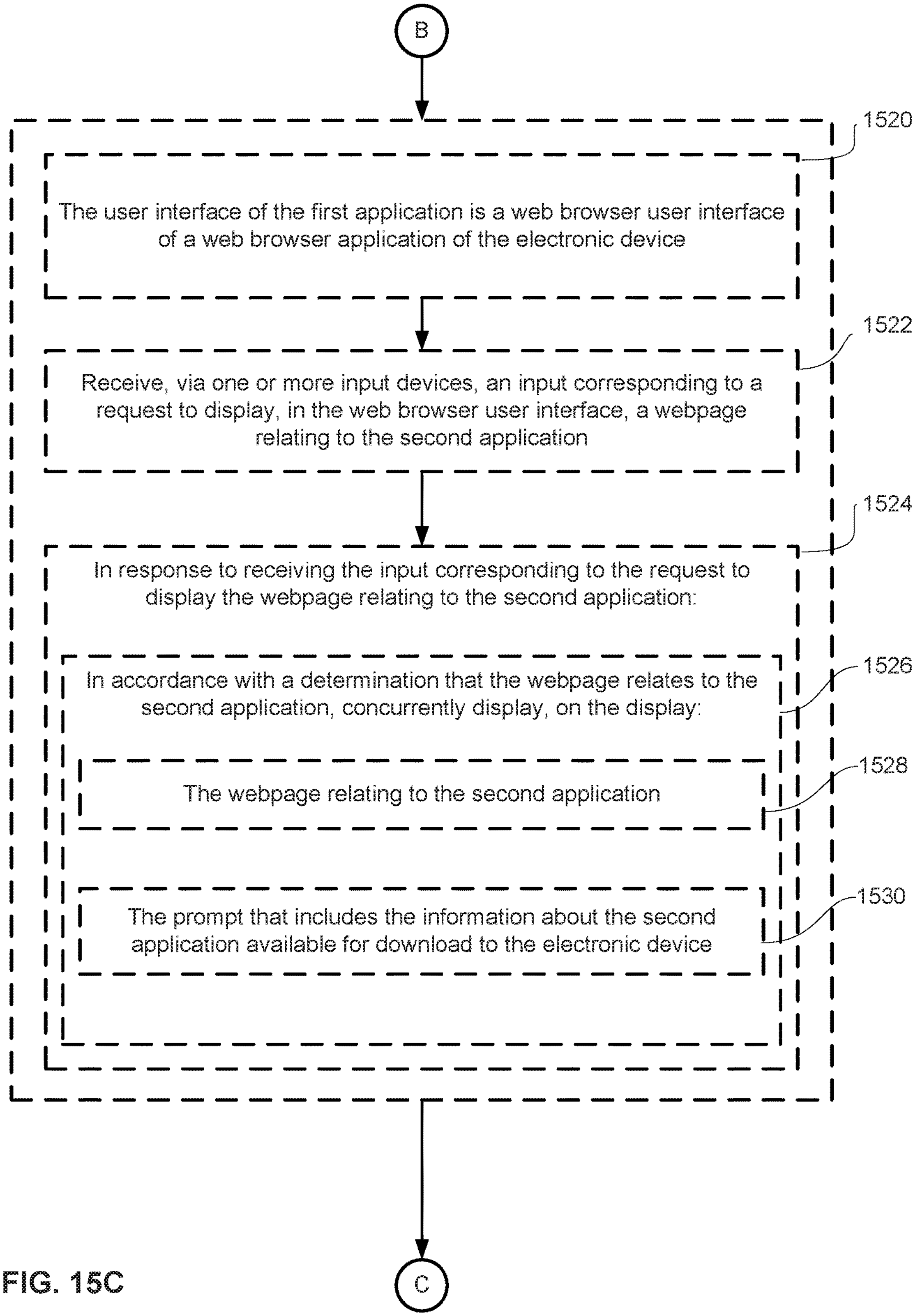
Figure 15D:
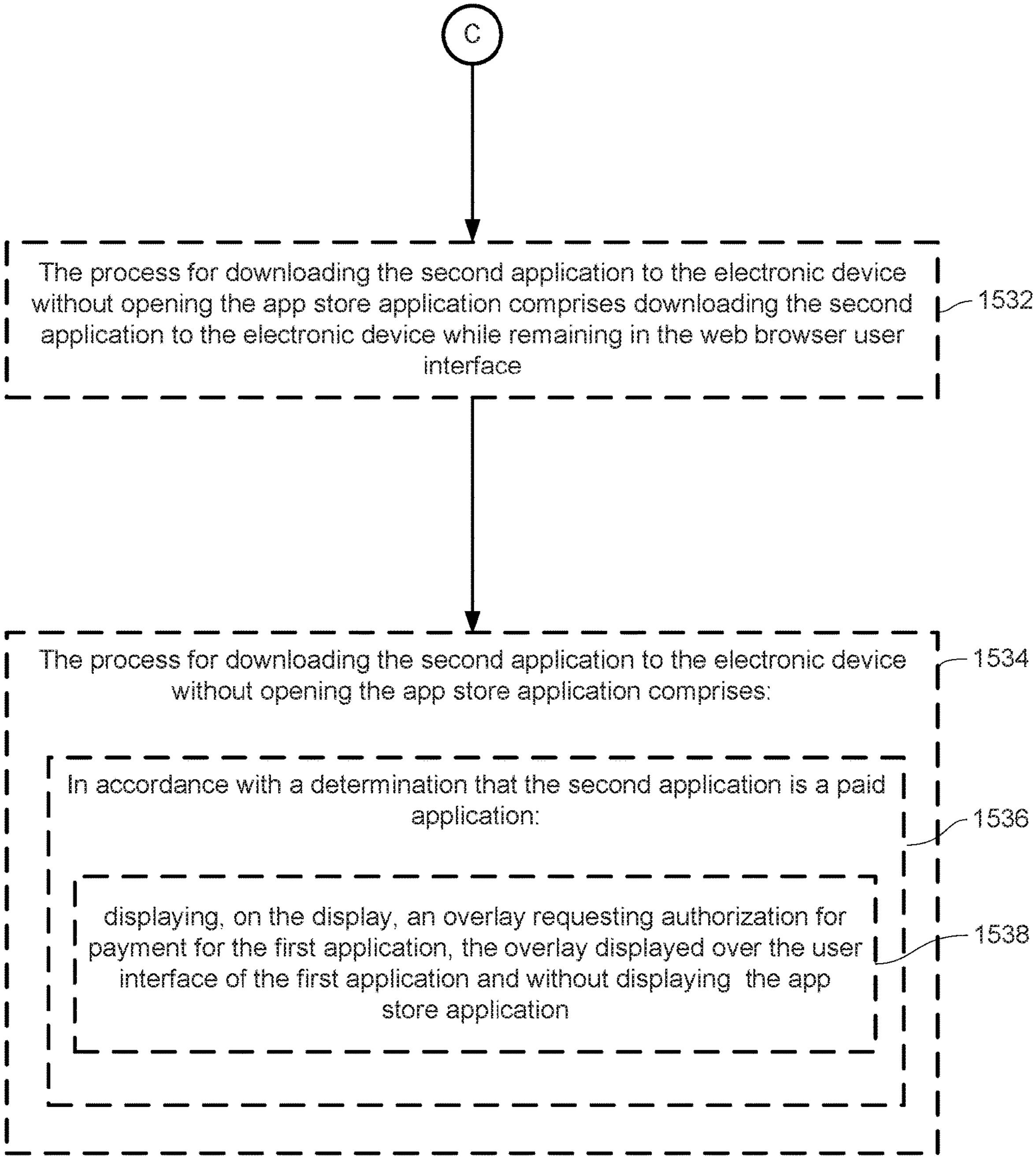

FIGS. 14A-14P illustrate exemplary ways in which an electronic device facilitates the download/purchase of games, applications and/or in-app purchases from outside of an app store application that is for browsing such content available on the electronic device in accordance with some embodiments of the disclosure. The embodiments in these figures are used to illustrate the processes described below, including the processes described with reference to FIGS. 15A-15D.

FIG. 14A illustrates exemplary device 500 with touch screen 504, such as described with reference to FIGS. 5A-5H. Touch screen 504 optionally displays one or more user interfaces that include various content. In the example illustrated in FIG. 14A, touch screen 504 displays a home screen user interface 1402 for device 500, such as described with reference to FIGS. 4A and 12Y. In FIGS. 14B-14C, a downward swipe of contact 1403 is detected on touch screen 504 while home screen 1402 is displayed, which causes device 500 to display a search user interface 1407, as shown in FIG. 14C. Search user interface 1407 is optionally a user interface of the operating system of device 500 via which content accessible from device 500 is searched (e.g., websites, news, e-mail, applications already downloaded to device 500, applications available to be downloaded to device 500, calendar entries, etc.), and is not a search user interface of an app store application on device 500 (e.g., search user interface 1407 is not the search user interface of the app store application described with reference to FIGS. 8R-8T). Search user interface 1407 includes text field 1404 for entering one or more search terms to search the content accessible from device 500.

In FIG. 14D, the user has entered the search term "programming" into text field 1404. In response, device 500 displays various search results in search user interface 1407 relating to the search term "programming." For example, device 500 displays a link 1406 to a "Programming Basics" website relating to "programming," a link 1408 to application L, which is an application related to "programming" and is already downloaded on device 500, and search result 1410 that indicates application K, which is also an application related to "programming," but is not yet downloaded on device 500—however, search user interface 1407 indicates that application K is available for purchase/download via the app store application. Search result 1410 includes an icon for application K, information about application K (e.g., the name of application K, the genre of application K, etc.), and a selectable purchase/download affordance for application K.

While application K is optionally available for purchase/download via the app store application on device 500, in some embodiments, device 500 allows application K to be purchased/downloaded directly from search user interface 1407, without the need to first open or display the app store application. For example, in FIG. 14E, selection of the purchase/download affordance for application K in search user interface 1407 is detected. In response, device 500, while remaining in search user interface 1407, displays purchase confirmation overlay 1422 over search user interface 1407 for confirming the purchase request for application K and/or for obtaining payment authorization for application K, as shown in FIG. 14F. In FIGS. 14G-14H, authentication for the payment for application K is received while device 500 continues to remain in search user interface 1407, and in FIG. 14I, once the purchase/download of application K is successfully completed, device 500 remains in search user interface 1407 and displays application K along with a link to open application K (e.g., the selectable "Open" affordance displayed in search result 1410), which has now been downloaded to device 500 from search user interface 1407.

Device 500 optionally allows games, applications and/or in-app purchases to be purchased/downloaded directly from other non-app store user interfaces as well, without the need to first open or display the app store application, such as from within non-app store applications other than the operating system. For example, in FIG. 14J, the user has requested display of a web site in web browser user interface 1405 of a web browser application on device 500, the web site being related to "programming" (e.g., www.progbasics.com). Because device 500 determines that an application related to the displayed web site is available for download to device 500 (e.g., application K), device 500 displays, in web browser user interface 1405, a prompt 1430 that includes information about that application, as shown in FIG. 14K. Prompt 1430 includes an icon for application K, information about application K (e.g., the name for application K, the genre of application K, etc.), and a selectable purchase/download affordance for application K. In FIG. 14L, selection of the purchase/download affordance for application K in web browser user interface 1405 is detected. In response, device 500, while remaining in web browser user interface 1405, displays purchase confirmation overlay 1422 over web browser user interface 1405 for confirming the purchase request for application K and/or for obtaining payment authorization for application K, as shown in FIG. 14M. In FIGS. 14N-14O, authentication for the payment for application K is received while device 500 continues to remain in web browser user interface 1405, and in FIG. 14P, once the purchase/download of application K is successfully completed, device 500 remains in web browser user interface 1405 and displays application K along with a link to open application K (e.g., the selectable "Open" affordance displayed in prompt 1430), which has now been downloaded to device 500 from web browser user interface 1405.

FIGS. 15A-15D are flow diagrams illustrating a method 1500 of facilitating the download/purchase of games, applications and/or in-app purchases from outside of an app store application that is for browsing such content available on an electronic device in accordance with some embodiments of the disclosure. The method 1500 is optionally performed at an electronic device such as device 100, device 300, or device 500 as described above with reference to FIGS. 1A-1B, 2-3, 4A-4B and 5A-5H. Some operations in method 1500 are, optionally, combined and/or the order of some operations is, optionally, changed.

As described below, the method 1500 provides ways to facilitate the download/purchase of games, applications and/or in-app purchases from outside of an app store application. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) is in communication with a display (e.g., a television, a display of the electronic device, a touch screen of the electronic device, such as touch screen 504) and one or more input devices (e.g., a touch screen of the electronic device, such as touch screen 504, a remote control of the set-top box), while displaying, on the display, a user interface of a first application, wherein the first application is not an app store application for browsing applications available for download to the electronic device, such as in FIGS. 14D and 14K (e.g., the electronic device is not running an application store application from which a user is able to browse and/or download applications to the electronic device. Rather, the first application is optionally the operating system of the electronic device, a web browser, or some other application, other than an app store application), the electronic device displays (1502), on the display, a prompt that includes information about a second application available for download to the electronic device, such as in FIGS. 14D and 14K (e.g., the second application is represented in a search result in the operating system of the electronic device as a result of a user's search input provided to the operation system, the second application is represented in a prompt displayed in a web browser when the user views a web page that is associated with the second application). The prompt optionally includes a selectable affordance for initiating a process for downloading the second application to the electronic device, such as in FIG. 14D or 14K. In some embodiments, while displaying the prompt, the electronic device receives (1504), via the one or more input devices, an input corresponding to selection of the selectable affordance in the prompt, such as in FIGS. 14E and 14L (e.g., a tap on the selectable affordance, a click input detected on a remote control while the selectable affordance has a current focus in the user interface, etc.).

In response to receiving the input corresponding to the selection of the selectable affordance in the prompt, the electronic device optionally initiates (1506) the process for downloading the second application to the electronic device without opening (e.g., without waking, running, launching, or otherwise displaying) the app store application, such as in FIGS. 14F-14H and 14M-14O (e.g., the second application is optionally able to be downloaded to the electronic device without first opening the app store application on the electronic device). In some embodiments, the second application is downloaded to the electronic device without leaving the first application or the user interface of the first application from which the selectable affordance was selected. The above-described manner of allowing a user to download an application without first launching the app store application allows the electronic device to simplify interactions with the user and provide the user with a consistent user experience (e.g., because the electronic device need not take the user out of the user interface from which the user requested download of the application), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the user interface of the first application is a search user interface of an operating system of the electronic device (1508), such as in FIG. 14D (e.g., a user interface of the operating system from which a user is able to search for websites related to a search term, news related to a search term, applications available for download to the electronic device related to the search term, applications already downloaded to the electronic device related to the search term, e-mail on the electronic device related to the search term, calendar entries on the electronic device related to the search term, etc.). The electronic device optionally receives (1510), via the one or more input devices, a search input for searching for content relating to a search term, such as in FIG. 14D (e.g., from the search user interface of the operating system, a text/voice/etc. input received via the one or more input devices that provides the search term to the search functionality of the electronic device). In some embodiments, in response to receiving the search input, the electronic device displays, in the search user interface (1512) one or more search results relating to the search term (1514), such as in FIG. 14D (e.g., websites related to a search term, news related to a search term, applications already downloaded to the electronic device related to the search term, e-mail on the electronic device related to the search term, calendar entries on the electronic device related to the search term, etc.).

In some embodiments, in response to receiving the search input, the electronic device displays, in the search user interface the prompt that includes the information about the second application available for download to the electronic device (1516), such as in FIG. 14D. The second application is optionally related to the search term (e.g., the prompt for downloading the second application to the electronic device is optionally displayed as a search result in the search user interface of the operating system, because the second application is related to the search term). In some embodiments, a user is able to download the second application to the electronic device from this prompt, without opening an app store application from which applications available for download to the electronic device are browsed, such as in FIGS. 14E-14I. The above-described manner of displaying application download prompts within search results allows the electronic device to simplify interactions with the user and provide the user with a consistent user experience, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the second application to the electronic device without opening the app store application comprises downloading the second application to the electronic device while remaining in the search user interface (1518), such as in FIGS. 14E-14I. For example, in response to receiving selection of the button displayed in the prompt in the search results for downloading the second application to the electronic device, the electronic device starts a process where the second application is downloadable to the electronic device without the electronic device navigating away from the search user interface. In some embodiments, a payment authorization request is displayed by the electronic device during this process before the second application is downloaded if the application is a paid application. The above-described manner of allowing a user to download an application while remaining in the search result user interface allows the electronic device to simplify interactions with the user and provide the user with a consistent user experience (e.g., because the electronic device need not take the user out of the user interface from which the user requested download of the application), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the user interface of the first application is a web browser user interface of a web browser application of the electronic device (1520), such as in FIG. 14J. In some embodiments, the electronic device receives (1522), via the one or more input devices, an input corresponding to a request to display, in the web browser user interface, a webpage relating to the second application, such as in FIG. 14J (e.g., entry of a URL for the webpage in the web browser, selection of a link displayed on the electronic device for navigating to the webpage, the link displayed in the web browser or in an application or user interface different than the web browser (e.g., an e-mail application on the electronic device), etc.). In response to receiving the input corresponding to the request to display the webpage relating to the second application (1524), in accordance with a determination that the webpage relates to the second application, the electronic device concurrently displays, on the display (1526) the webpage relating to the second application (1528) and the prompt that includes the information about the second application available for download to the electronic device (1530), such as in FIG. 14K.

For example, in some embodiments, if a user navigates to a webpage that is related to an application available for download to the electronic device (e.g., the source of content of the webpage also has an application available for download to the electronic device via which content from the source is accessible on the electronic device), the electronic device displays the webpage concurrently with a prompt with information about that related application and a selectable button for initiating downloading of the related application to the electronic device. If the webpage is not related to an application available for download to the electronic device, the electronic device optionally does not display the overlay. The user is optionally able to initiate the process for downloading the related application to the electronic device by selecting the button displayed in the overlay while viewing the webpage in the web browser user interface. The above-described manner of displaying application download prompts within a web browser user interface allows the electronic device to simplify interactions with the user and provide the user with a consistent user experience, which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the second application to the electronic device without opening the app store application comprises downloading the second application to the electronic device while remaining in the web browser user interface (1532), such as in FIGS. 14M-14P (e.g., in response to receiving selection of the button displayed in the prompt in the web browser user interface for downloading the second application to the electronic device, the electronic device starts a process where the second application is downloadable to the electronic device without the electronic device navigating away from the web page or the web browser user interface.). In some embodiments, a payment authorization request is displayed by the electronic device during this process before the second application is downloaded if the application is a paid application. The above-described manner of allowing a user to download an application while remaining in the web browser user interface allows the electronic device to simplify interactions with the user and provide the user with a consistent user experience (e.g., because the electronic device need not take the user out of the user interface from which the user requested download of the application), which enhances the operability of the device and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for downloading the second application to the electronic device without opening the app store application comprises (1534), in accordance with a determination that the second application is a paid application (1536) (e.g., the second application is a game or application that requires payment at this time before downloading to the electronic device), displaying, on the display, an overlay requesting authorization for payment for the first application, the overlay displayed over the user interface of the first application and without displaying (e.g., without waking, running, launching, or otherwise displaying) the app store application (1538), such as in FIG. 14M. For example, a payment overlay displayed over the first application (e.g., search result user interface, web browser user interface) that includes information about the purchase price, payment method (and option to change it), etc., and requests authentication of the user (e.g., via fingerprint, username/password, retinal, other biometric means). In some embodiments, the payment overlay is a user interface of the operating system of the electronic device, different than the first application or the second application. If the payment is successfully authorized (e.g., because the user was successfully authenticated), the downloading of the application optionally begins. Thus, the payment overlay is optionally displayed and interacted with while overlaid over the first application, and without displaying the app store application. The above-described manner of allowing payment authorization to occur while displaying the first application and without displaying the app store application allows the electronic device to quickly and efficiently receive payment authorization from the user without interrupting the user's current interactions with the electronic device (e.g., in the web browser or search user interfaces), which enhances the operability of the device and makes the user-device interface more efficient, which, additionally, reduces power usage and improves battery life of the device by enabling the user to use the device more quickly and efficiently.

It should be understood that the particular order in which the operations in FIGS. 15A-15D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300 and 1700) are also applicable in an analogous manner to method 1500 described above with respect to FIGS. 15A-15D. For example, the app store applications, selectable affordances, processes for downloading applications to the electronic device, etc. described above with reference to method 1500 optionally have one or more of the characteristics of the app store applications, selectable affordances, processes for downloading applications to the electronic device, etc. described herein with reference to other methods described herein (e.g., methods 700, 900, 1100, 1300 and 1700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 15A-15D are, optionally, implemented by components depicted in FIGS. 1A-1B. For example, displaying operation 1502, receiving operation 1504 and initiating operation 1506 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen 504 corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Autoplaying Media Content Corresponding to Applications

Users interact with electronic devices in many different manners, including browsing applications/games/etc. that may be available (e.g., available for purchase and/or download) on the electronic devices. For example, a user may browse applications in an app store application for downloading applications to an electronic device. In some circumstances, browsing such applications/games/etc. includes browsing media content (e.g., videos) from those applications/games/etc., such as preview videos of content available in those applications/games/etc. The embodiments described below provide ways in which an electronic device autoplays media content corresponding to applications (e.g., games, non-game applications, etc.) in an app store application so as to facilitate the ordered presentation of the media content to the user, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 16A:
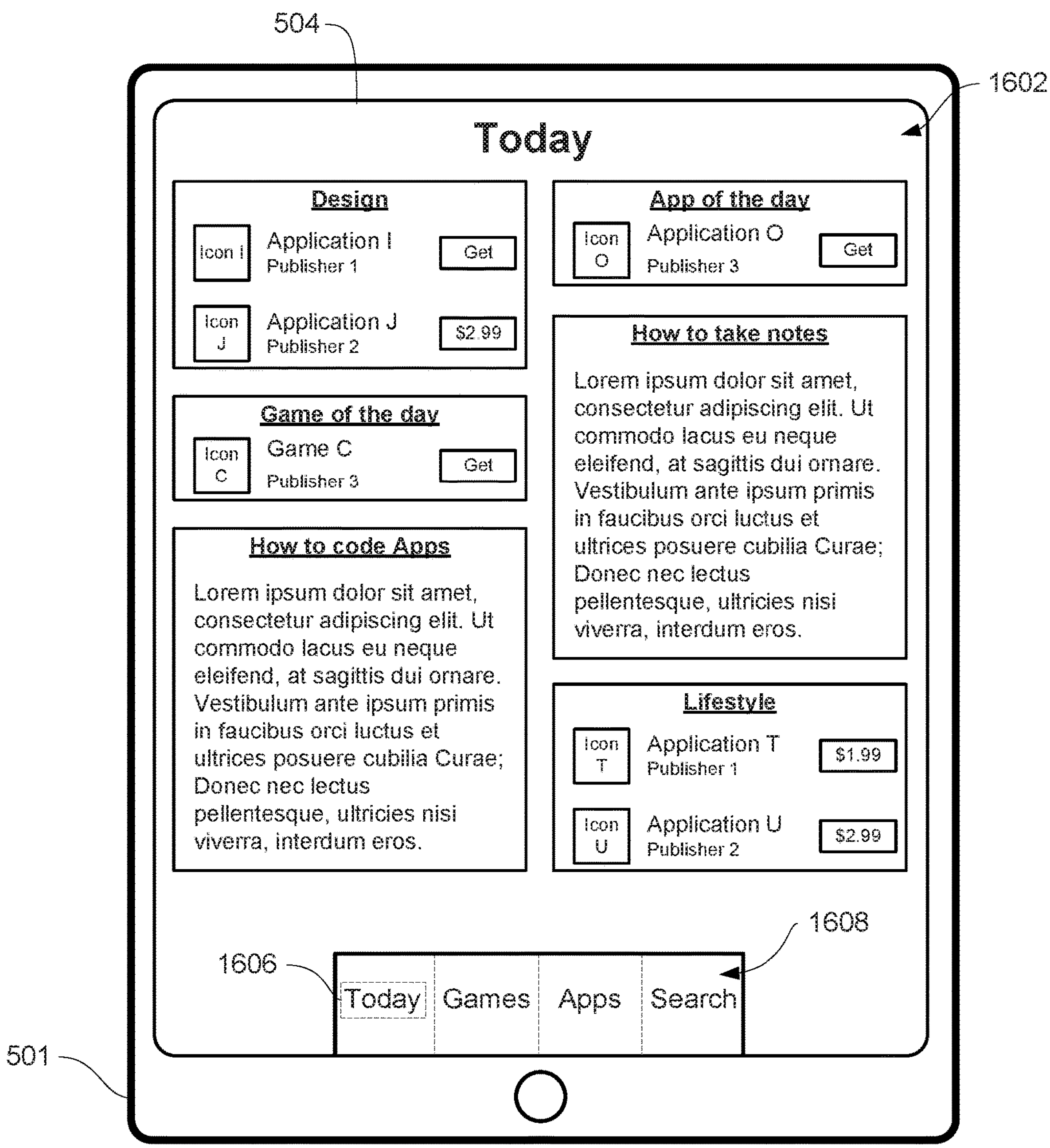
FIGS. 16A-16W illustrate exemplary ways in which an electronic device autoplays media content corresponding to applications (e.g., games, non-game applications, etc.) in an app store application so as to facilitate the ordered presentation of the media content to the user in accordance with some embodiments of the disclosure.
Figure 16B:
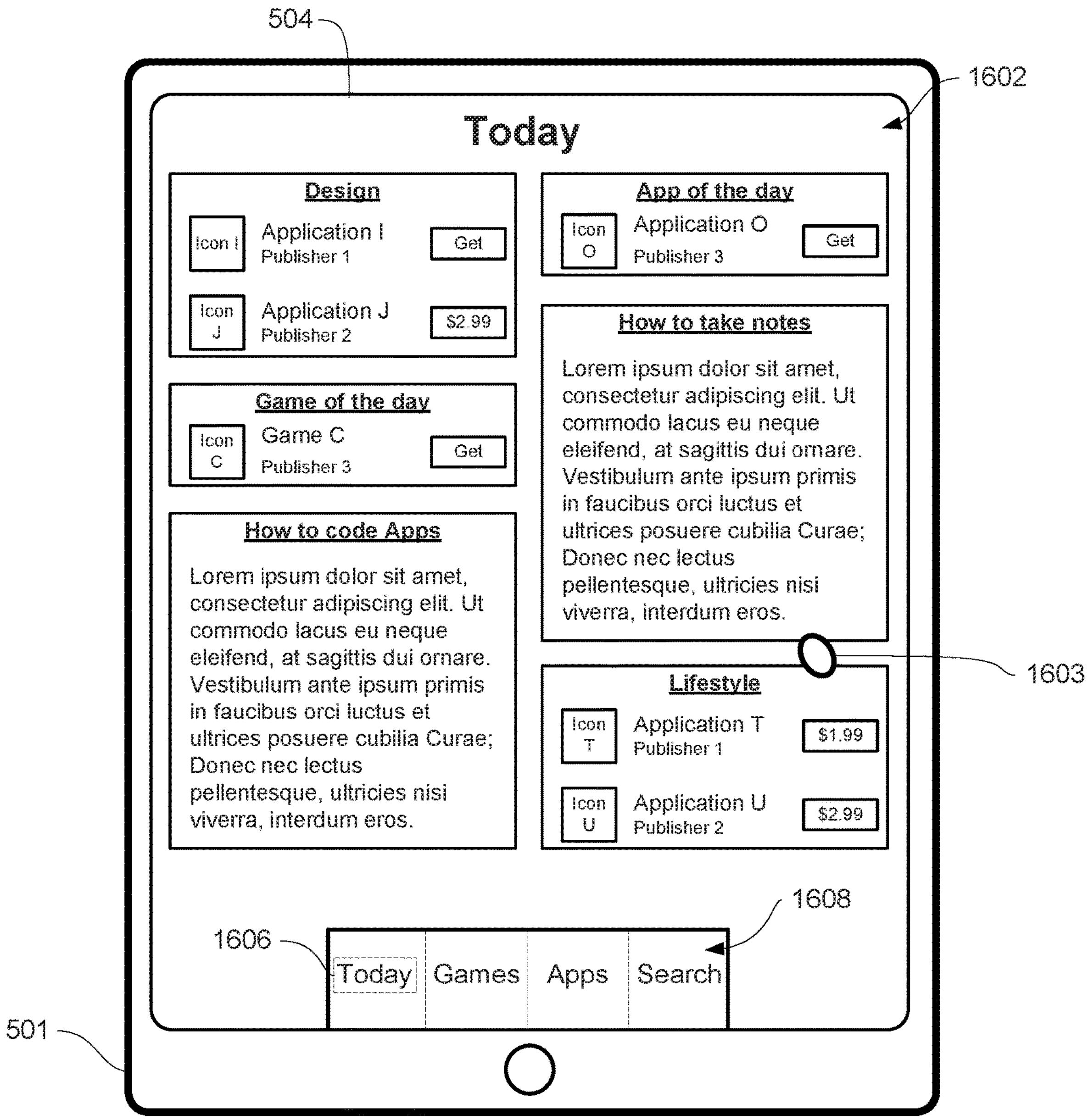
Figure 16C:
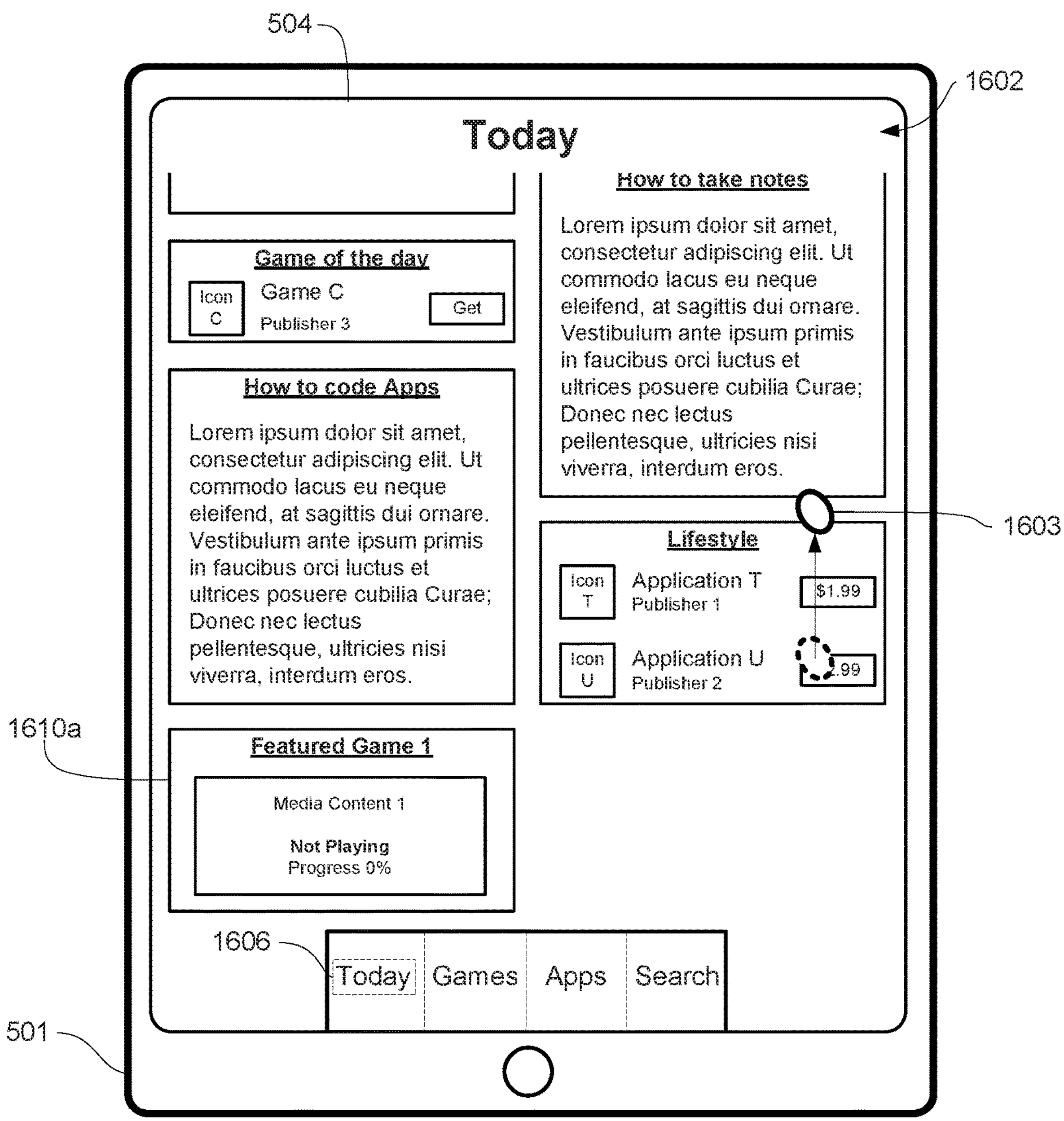
Figure 16D:
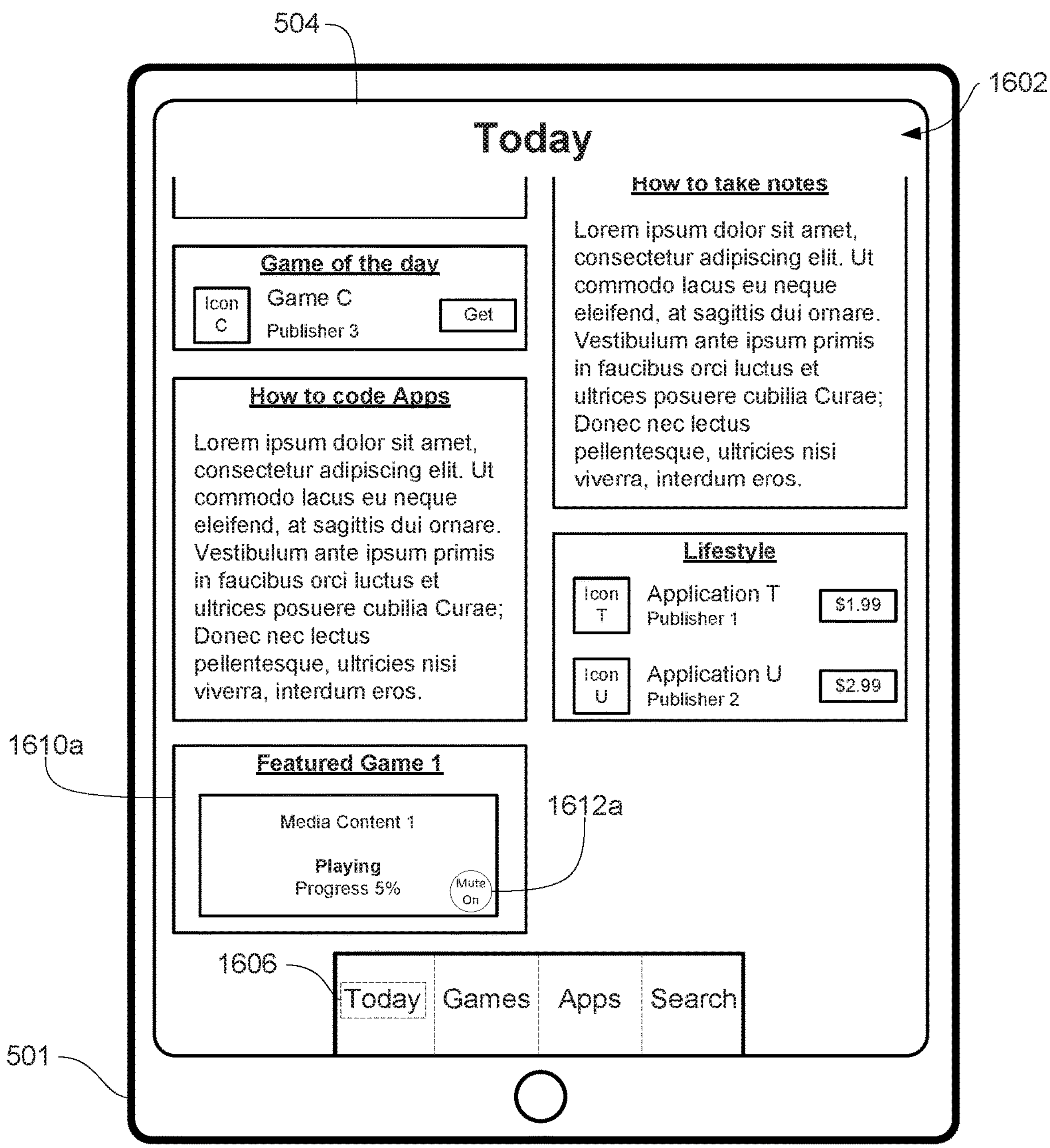
Figure 16E:
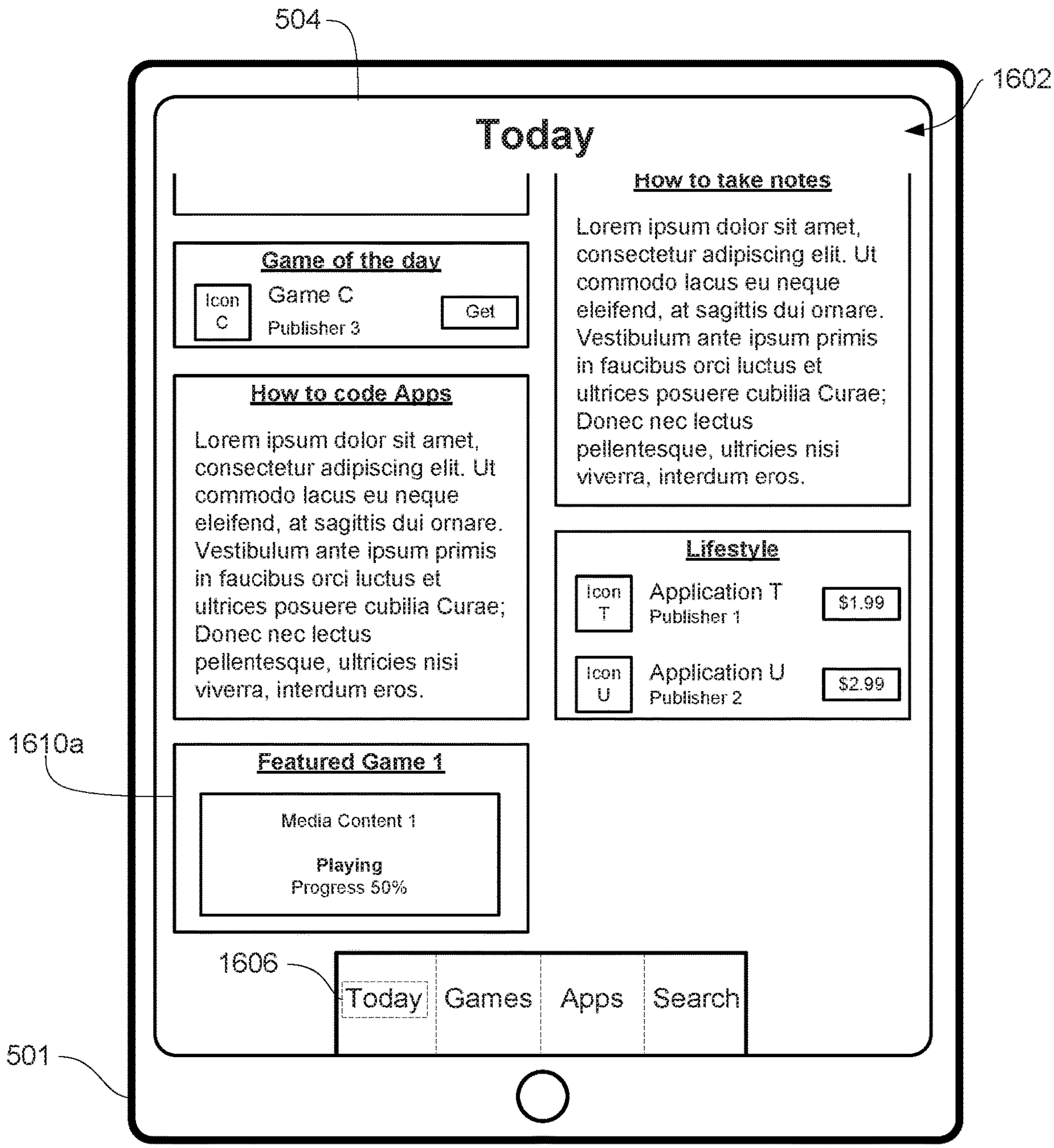
Figure 16F:
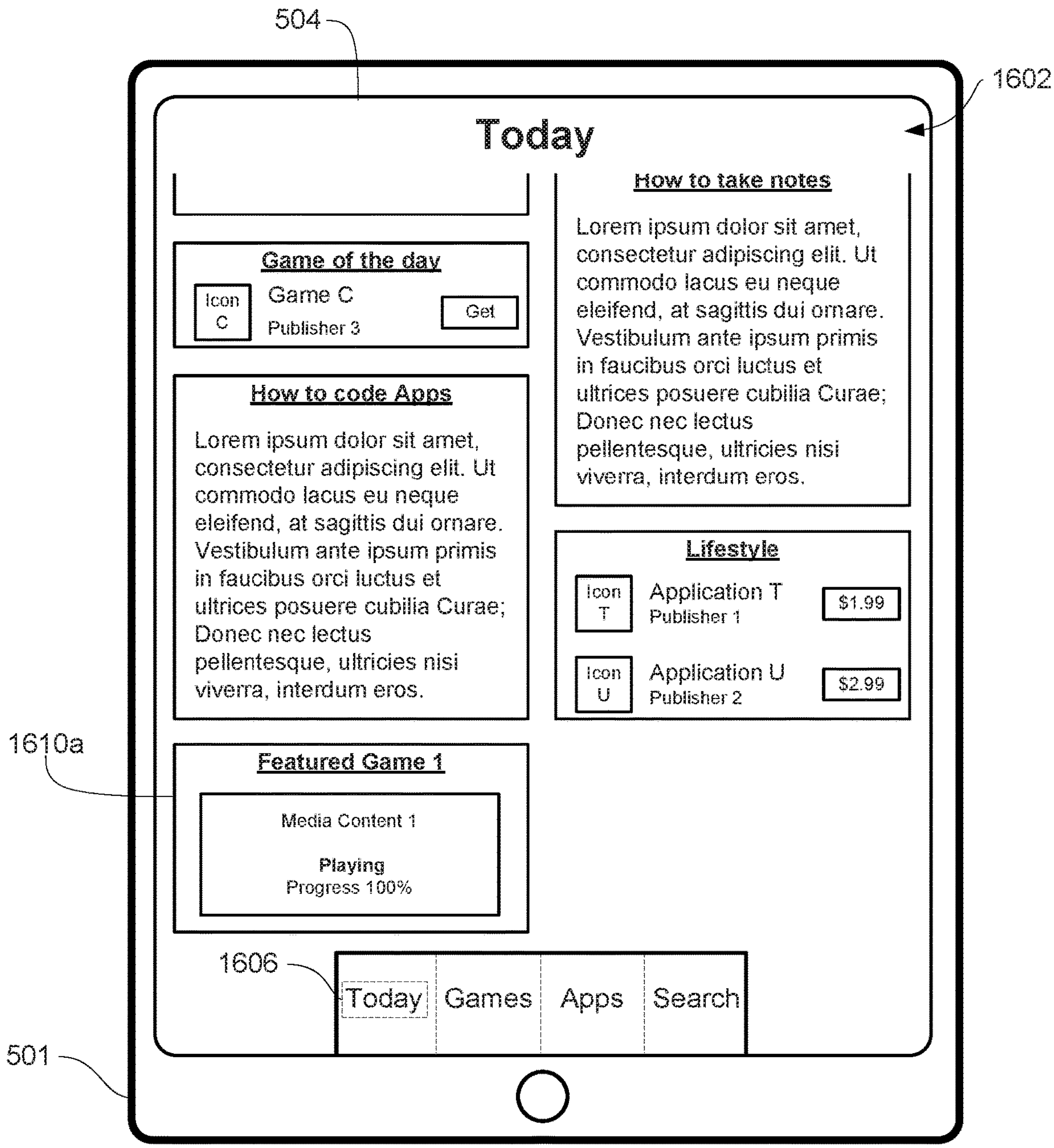
Figure 16G:
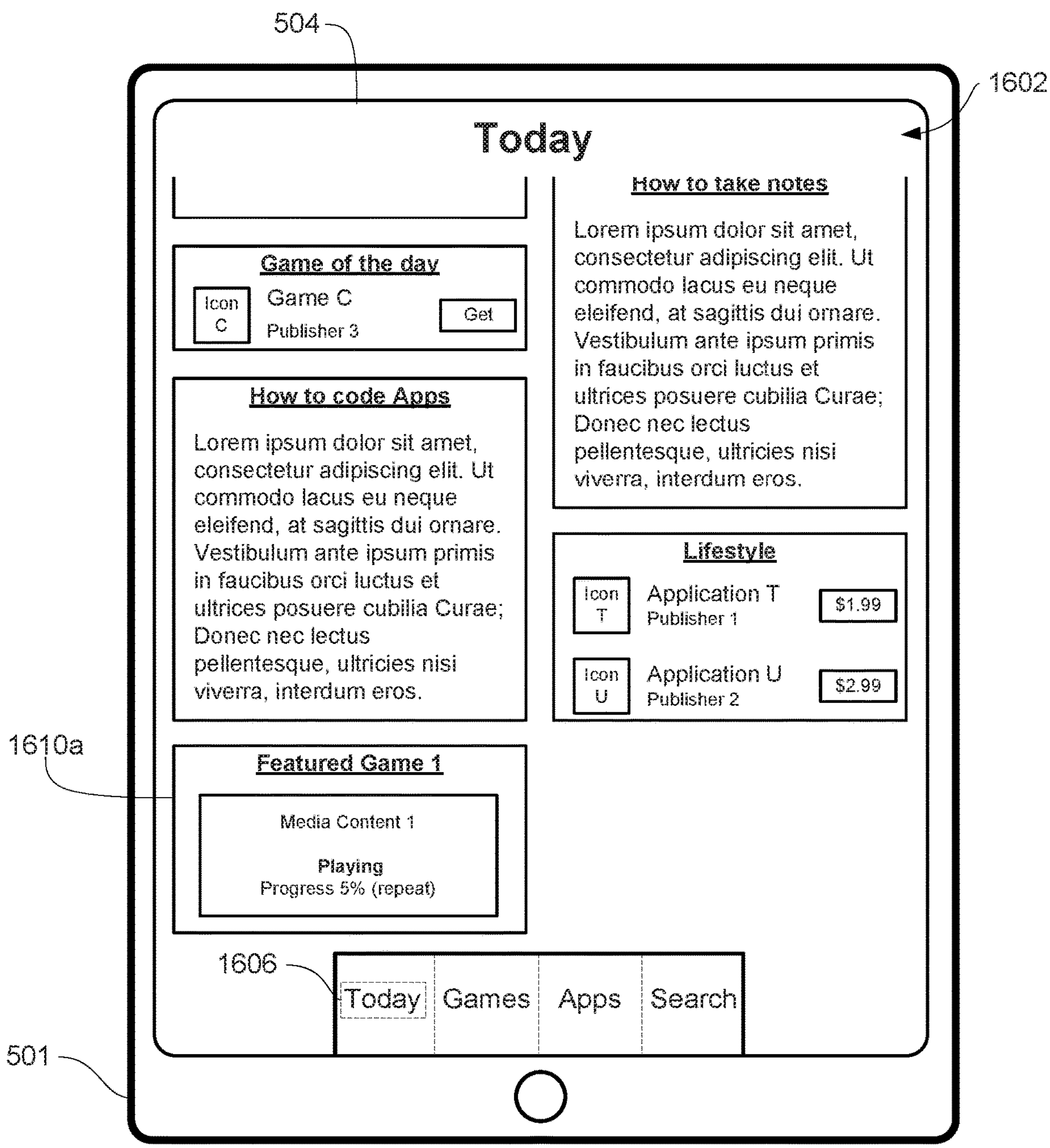
Figure 16H:
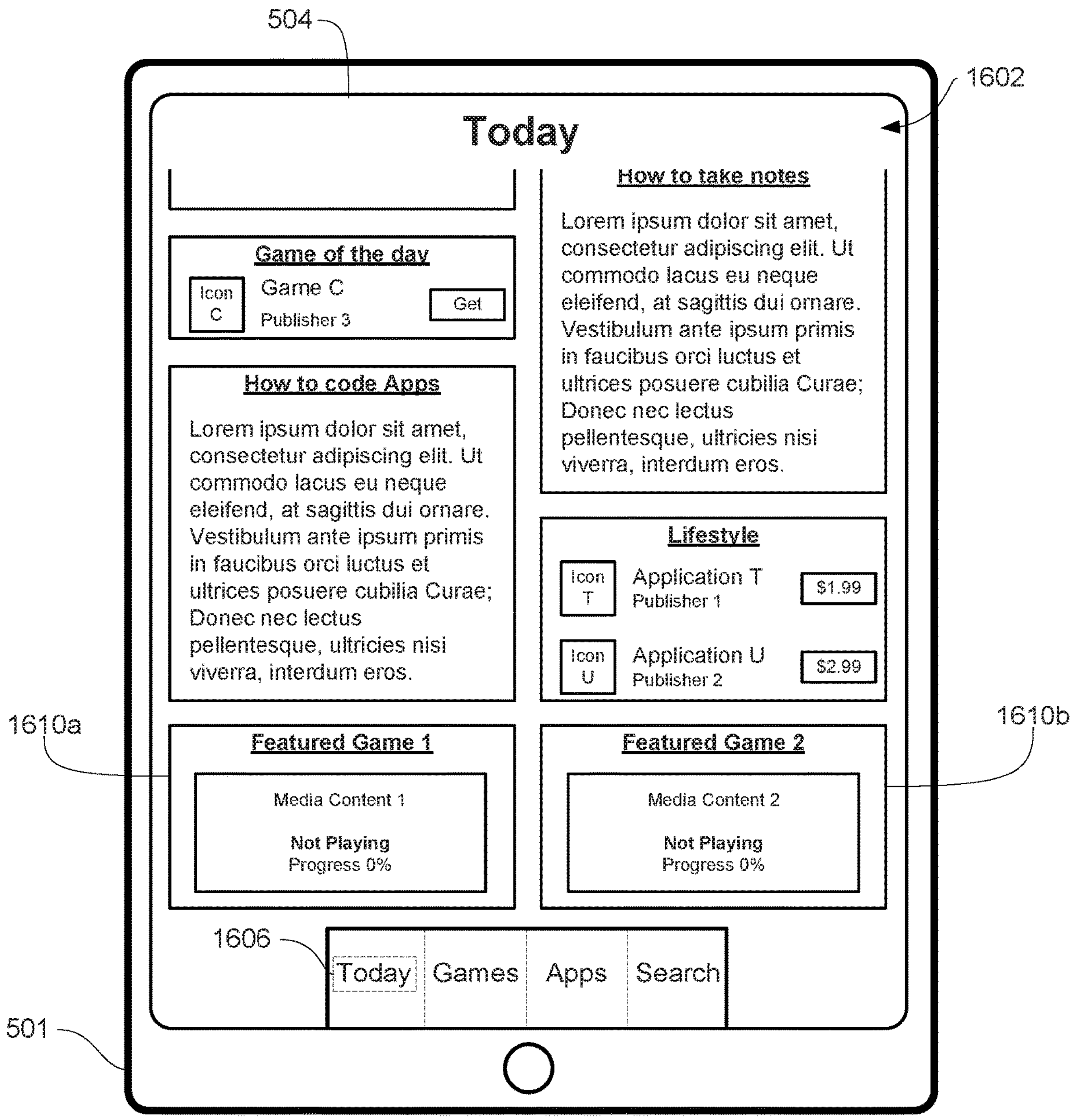
Figure 16I:
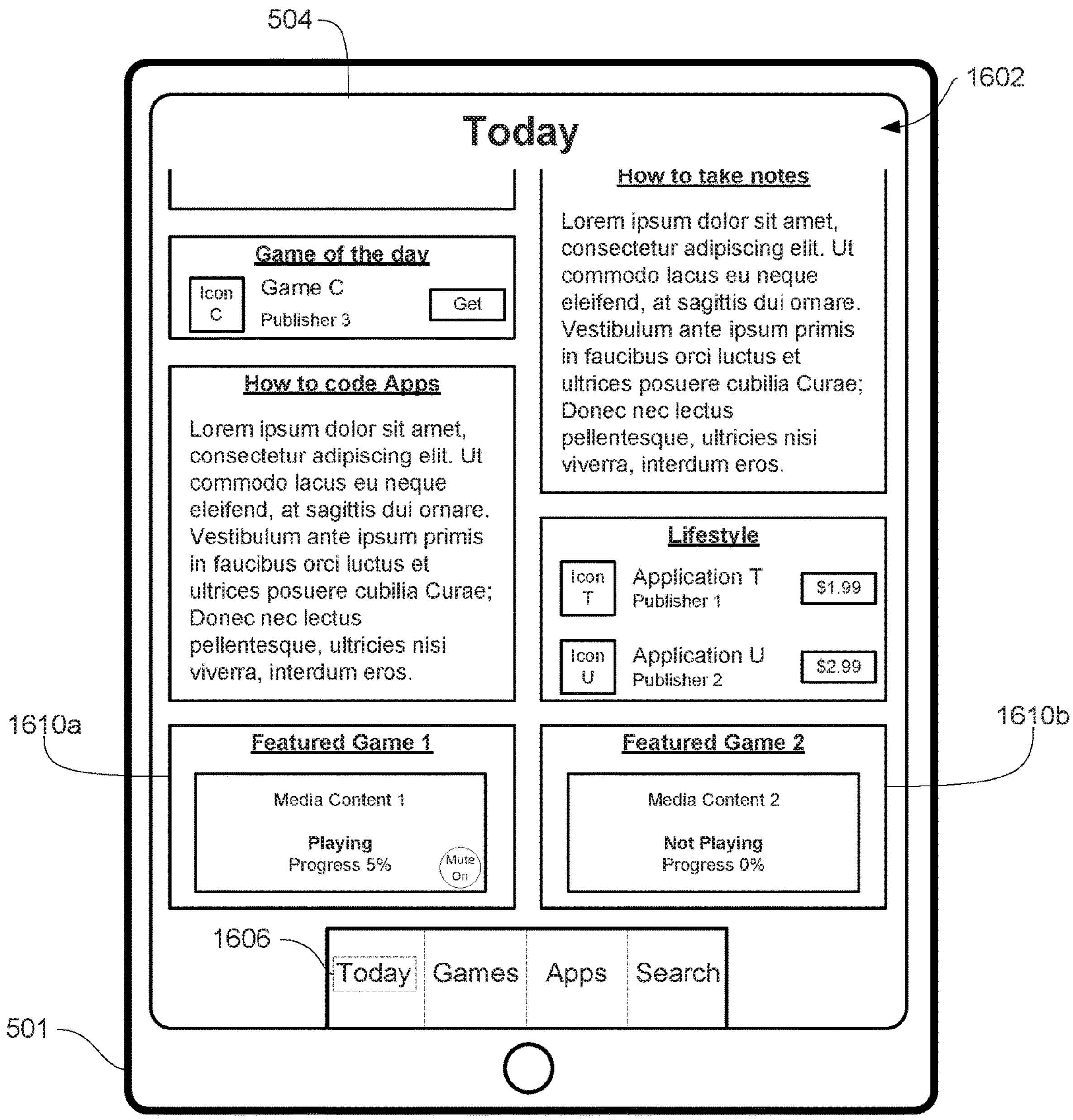
Figure 16J:
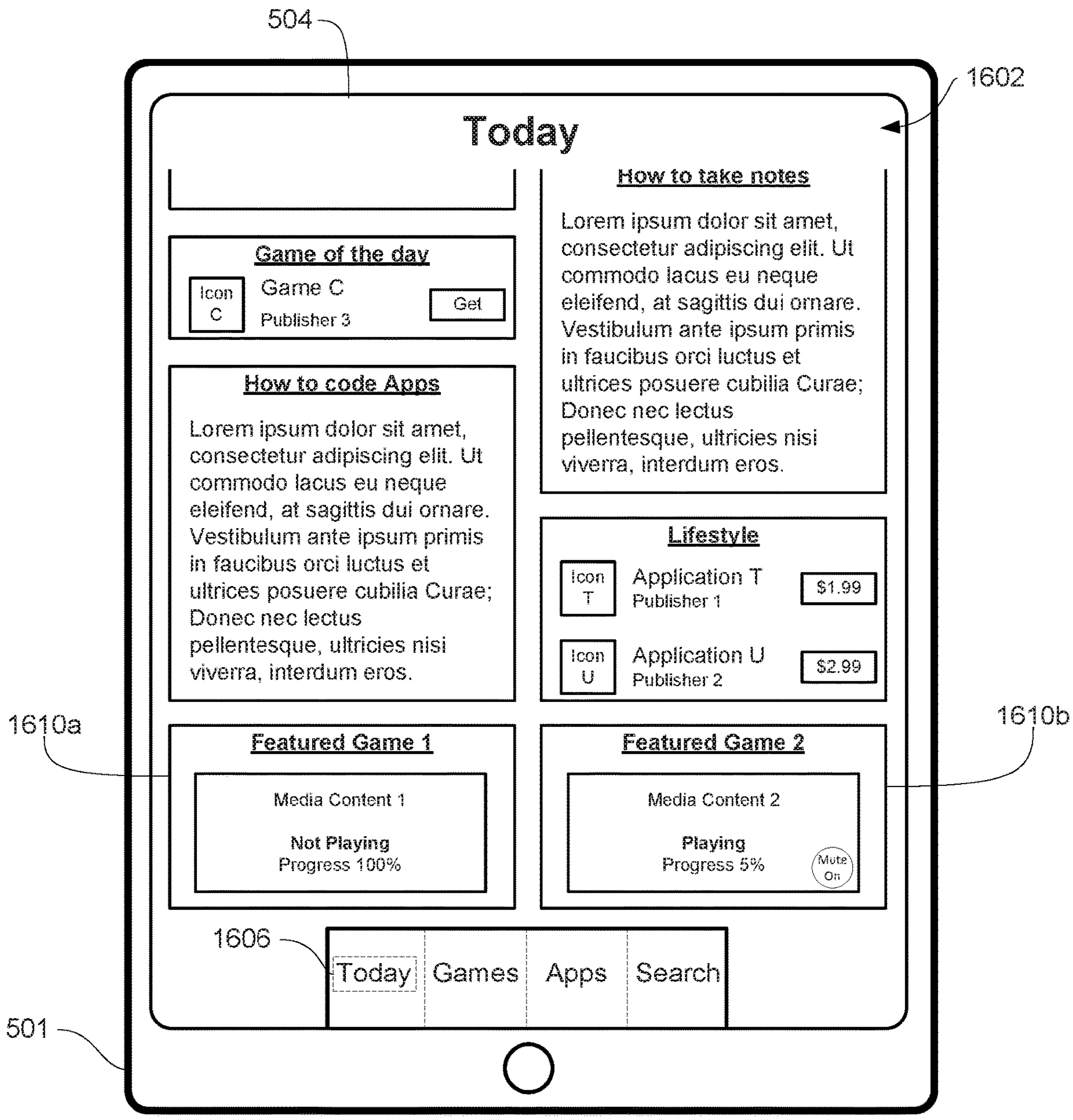
Figure 16K:
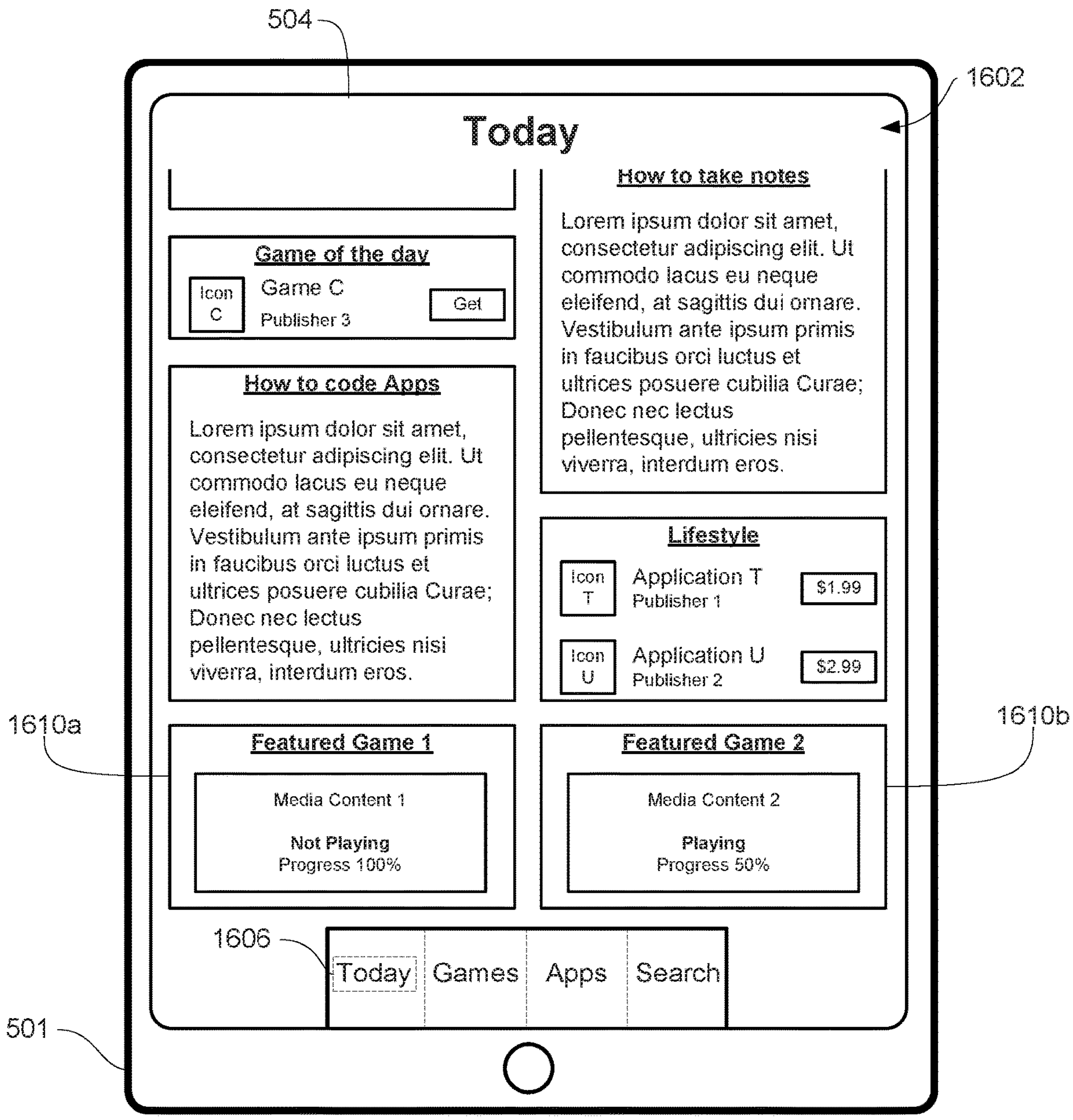
Figure 16L:
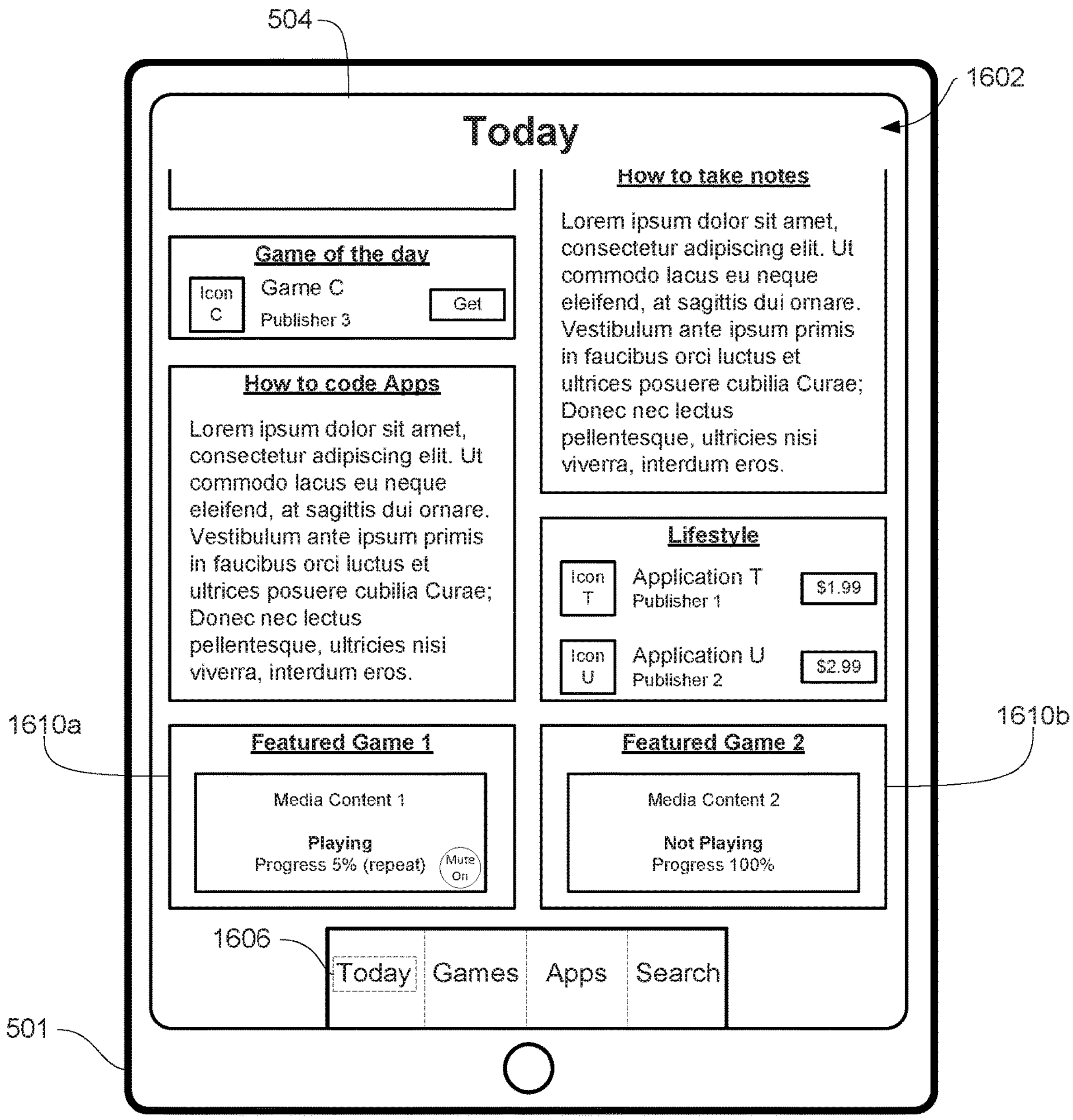
Figure 16M:
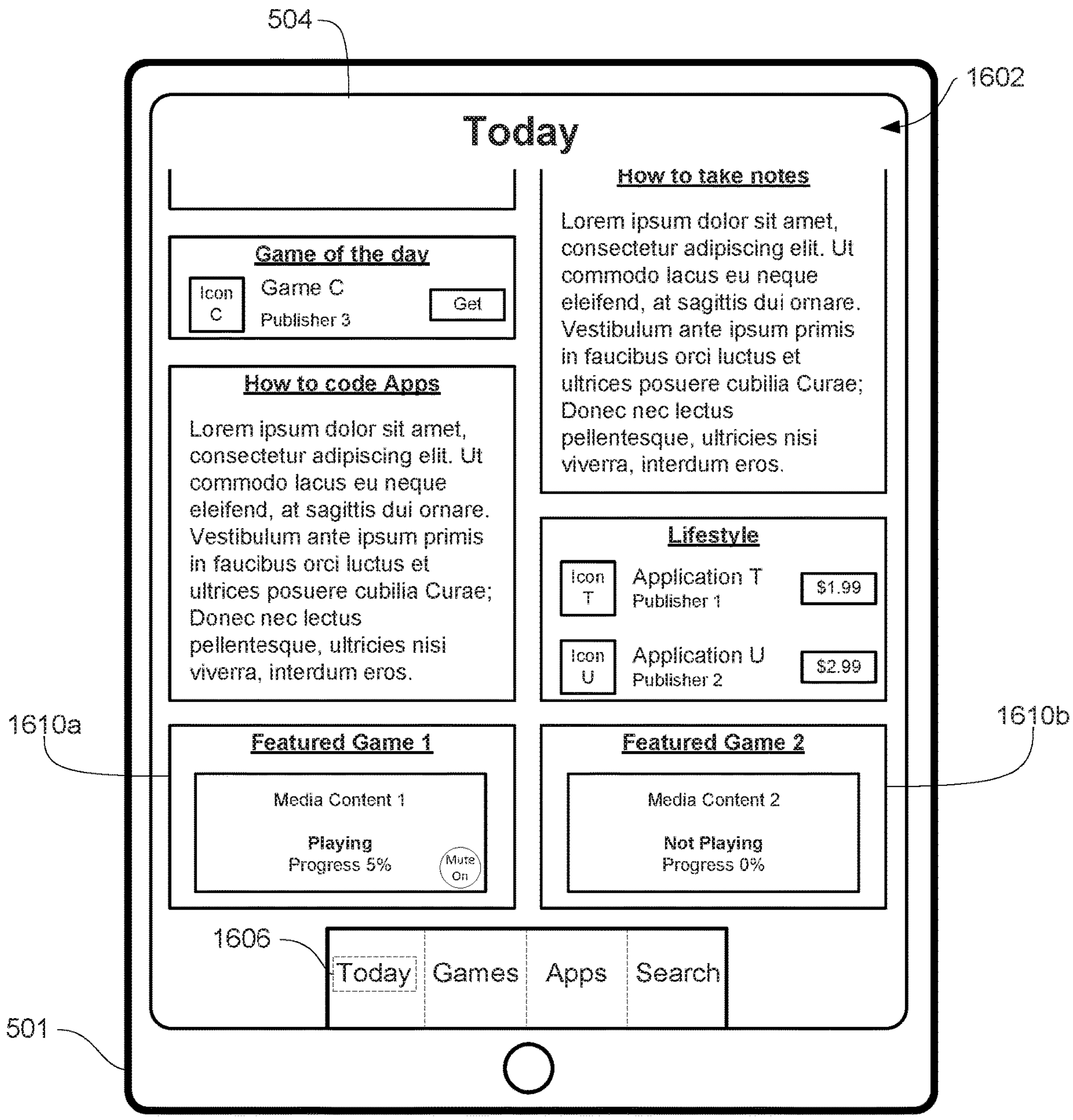
Figure 16N:
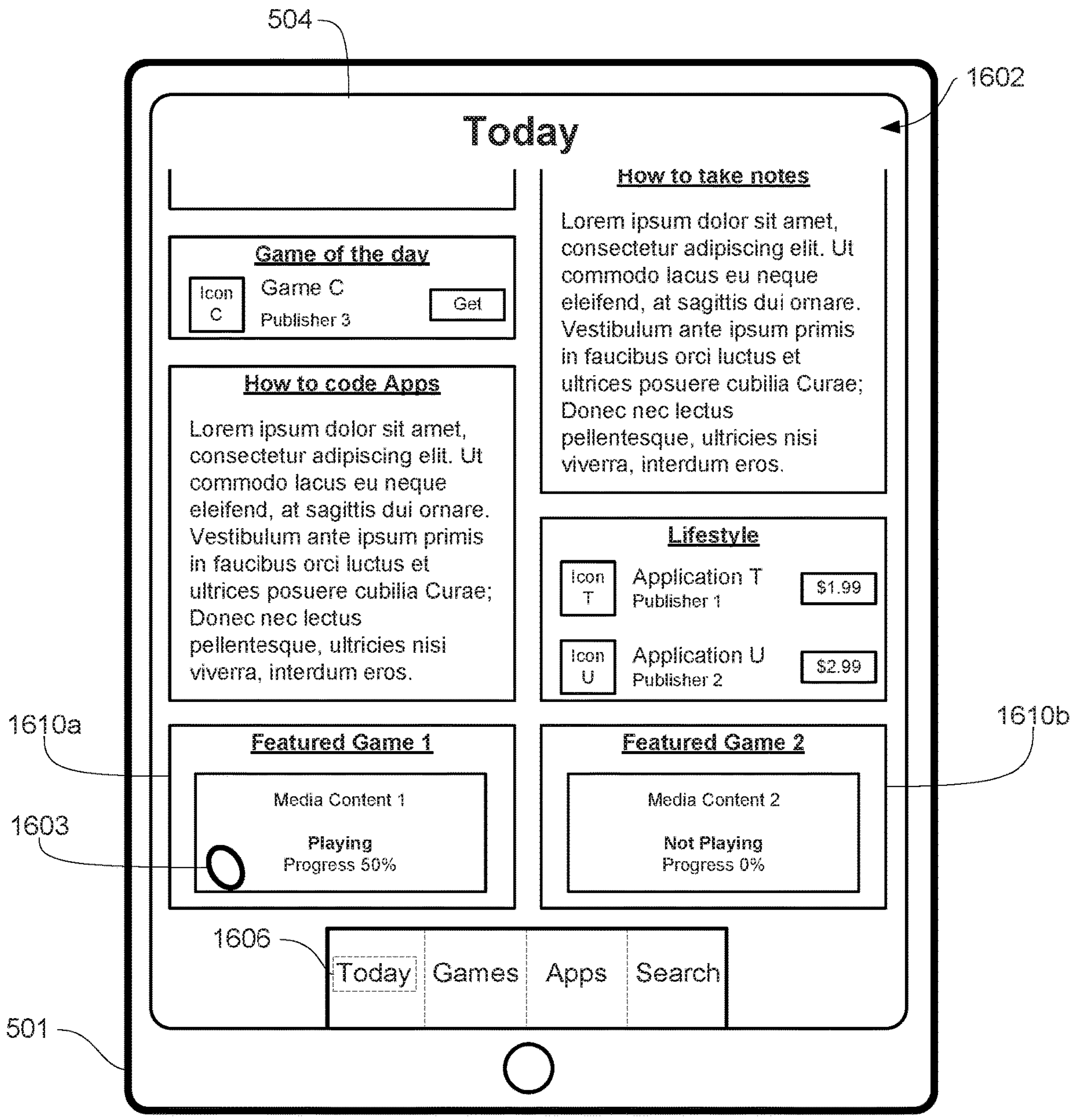
Figure 16O:
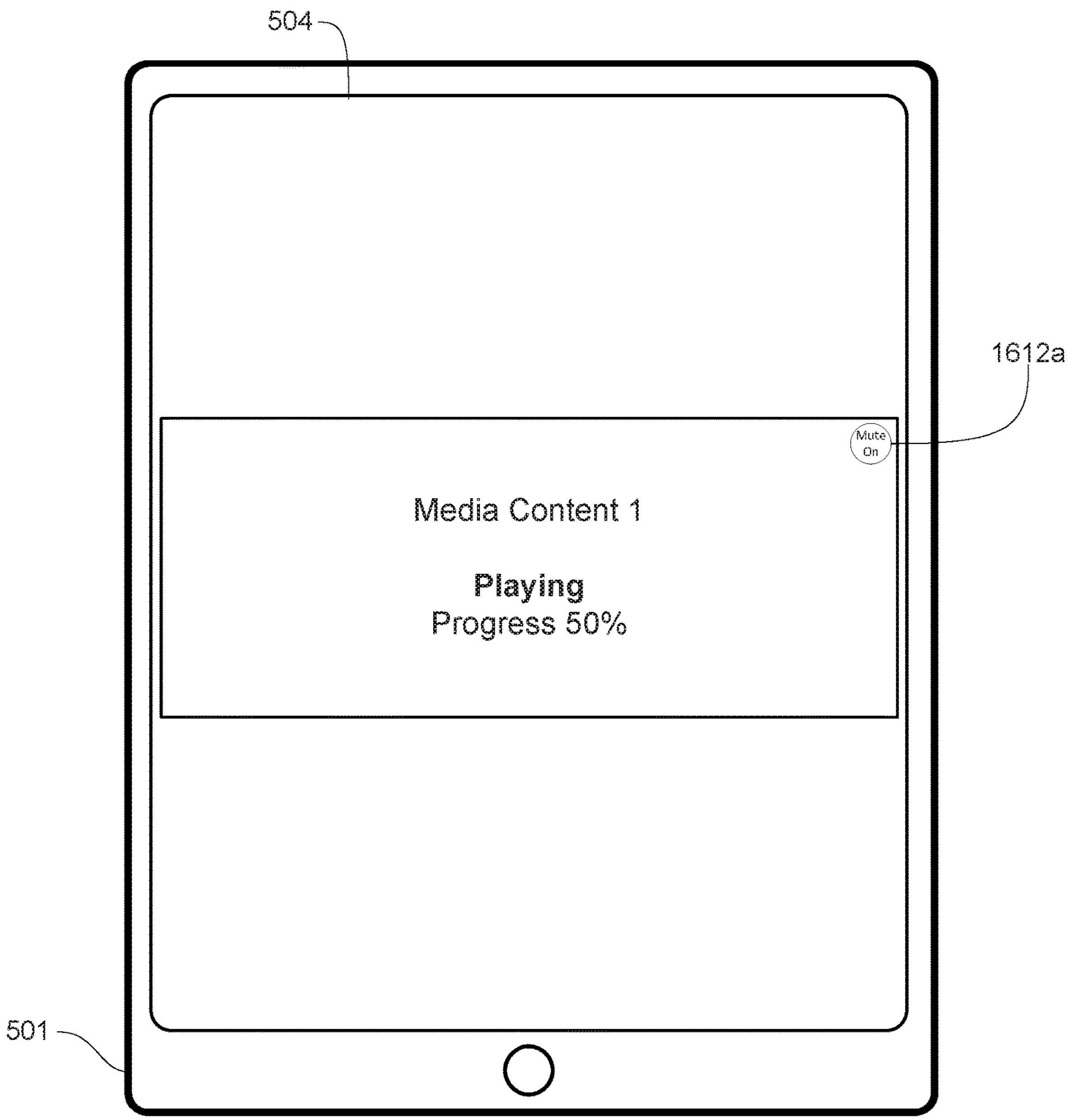
Figure 16P:
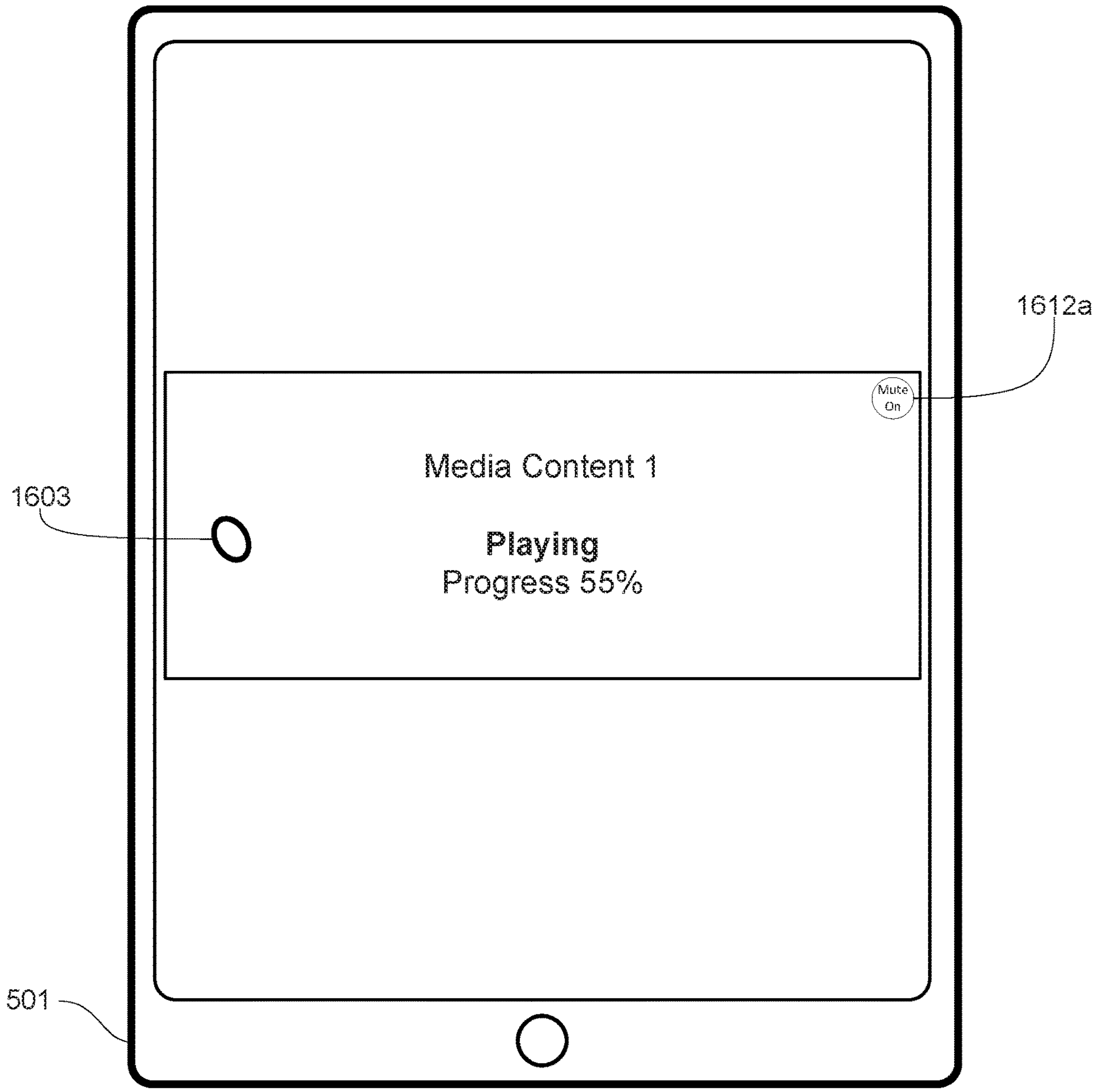
Figure 16Q:
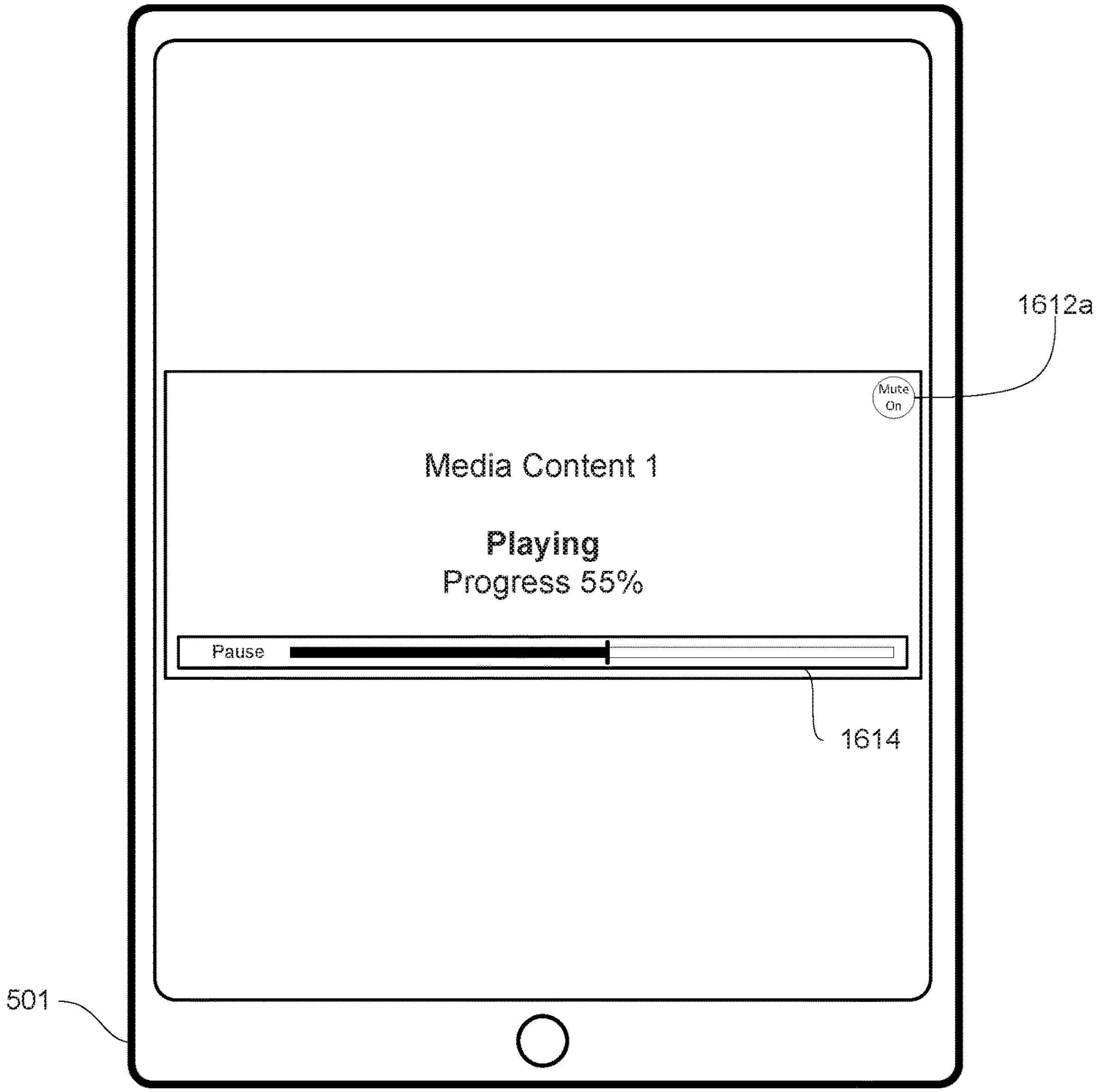
Figure 16R:
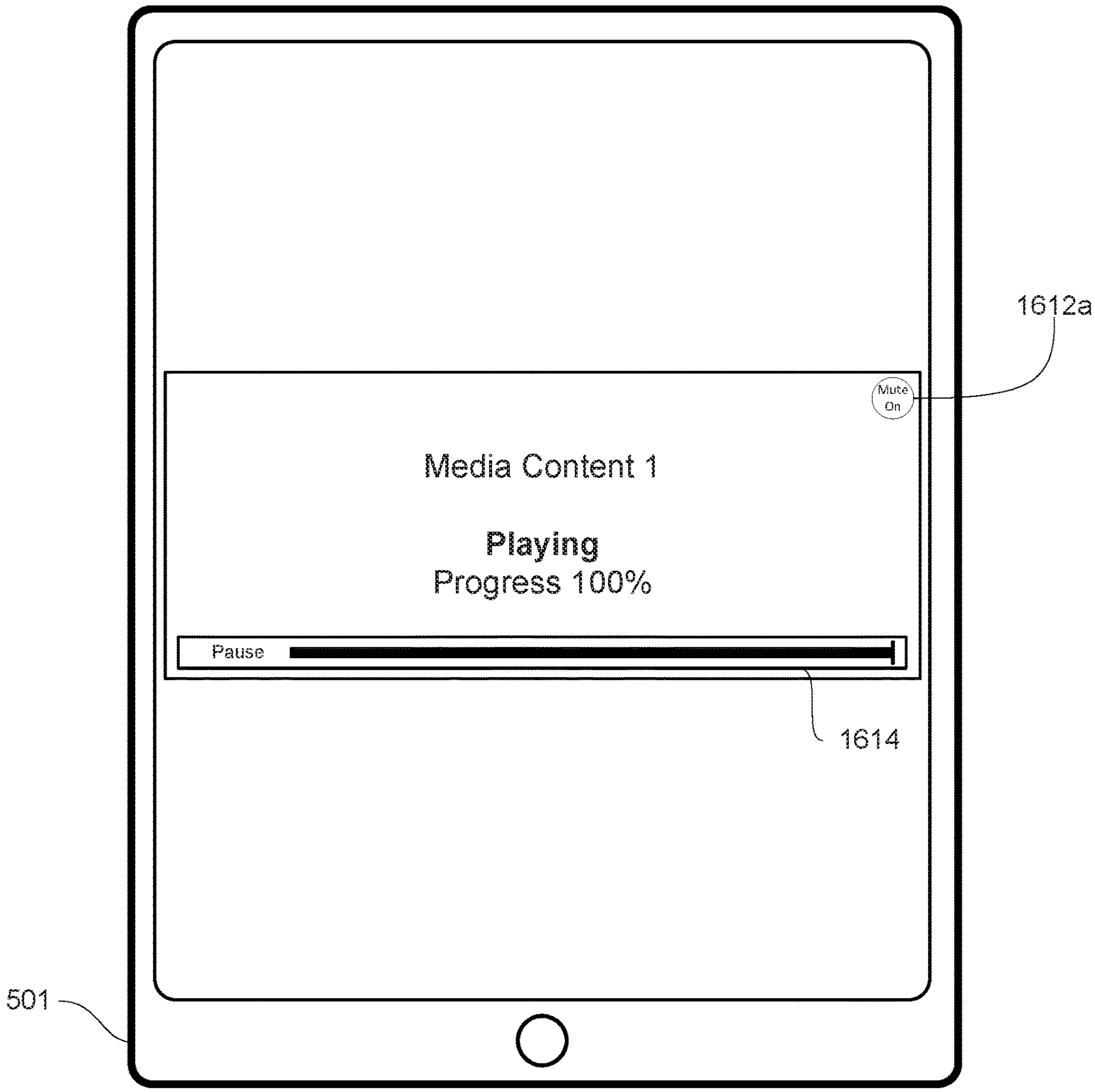
Figure 16S:
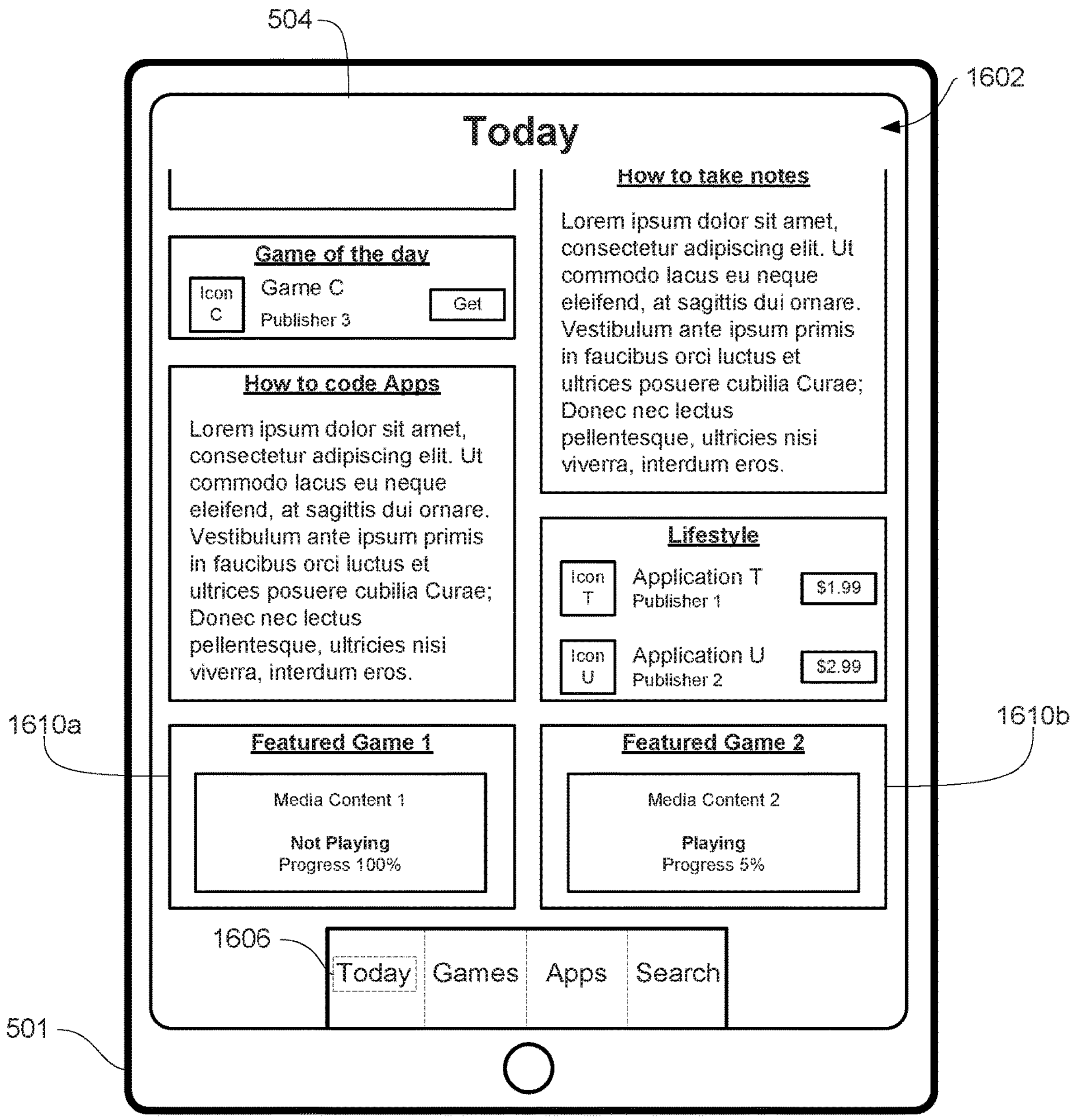
Figure 16T:
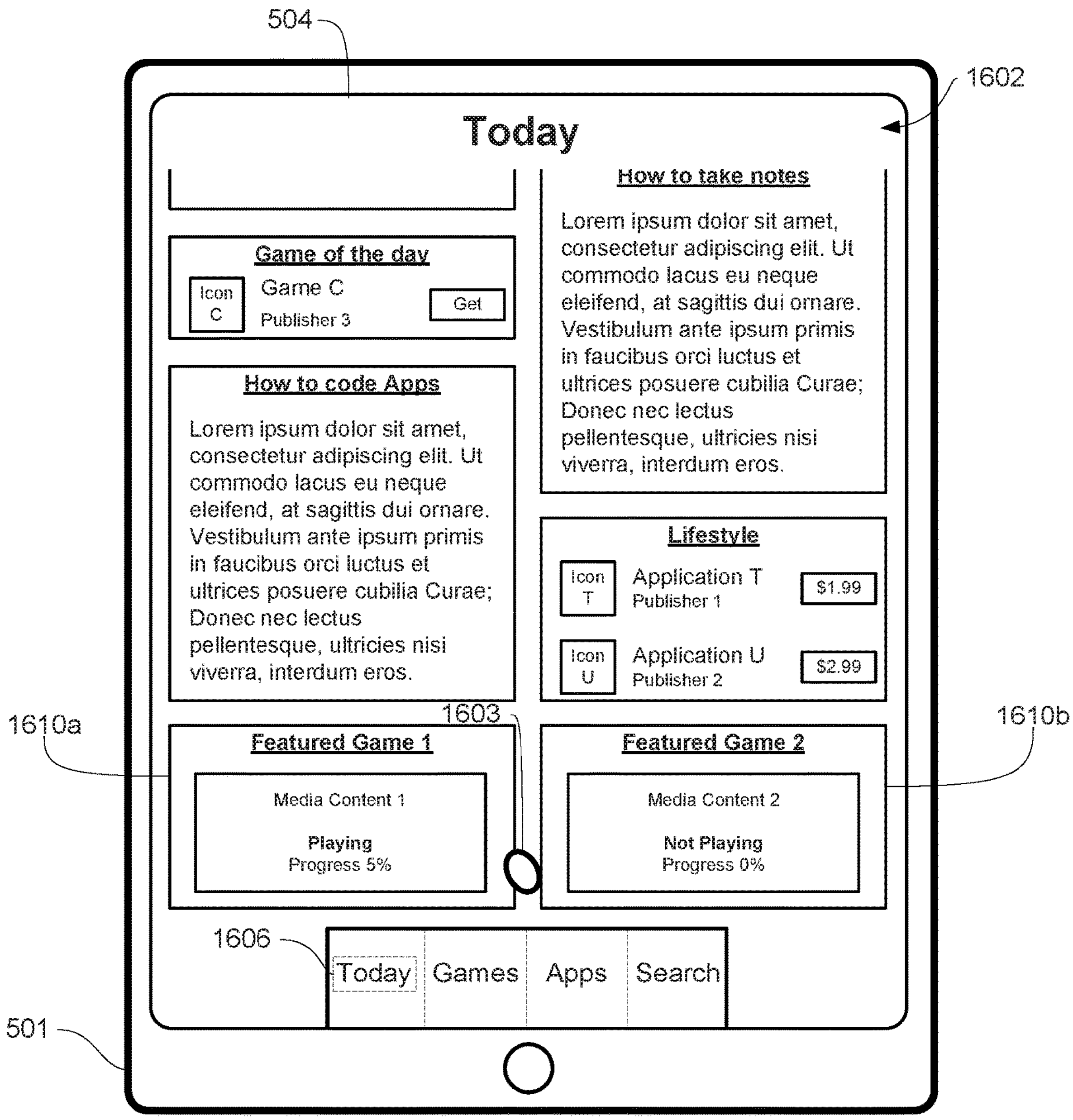
Figure 16U:
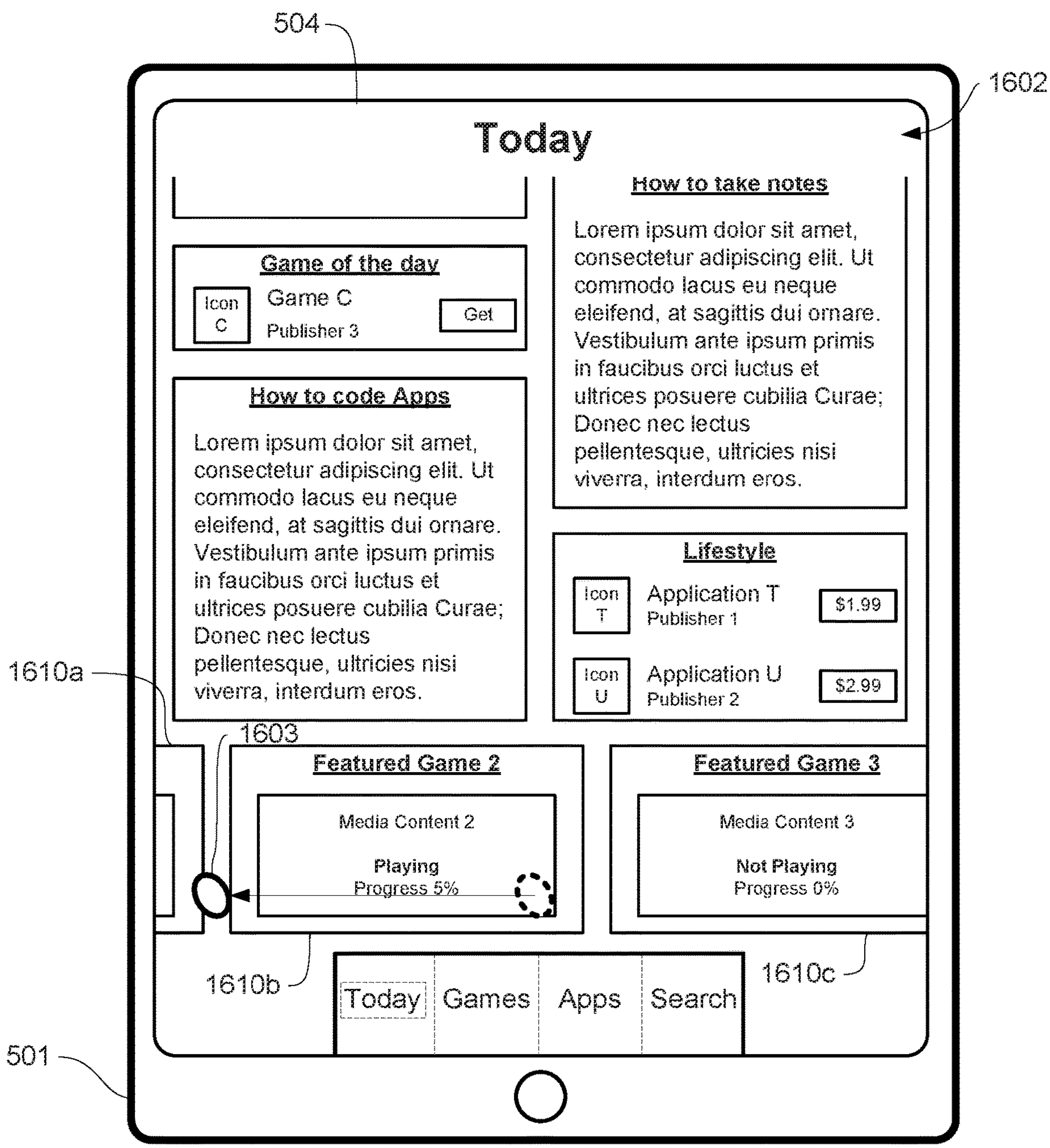
Figure 16V:
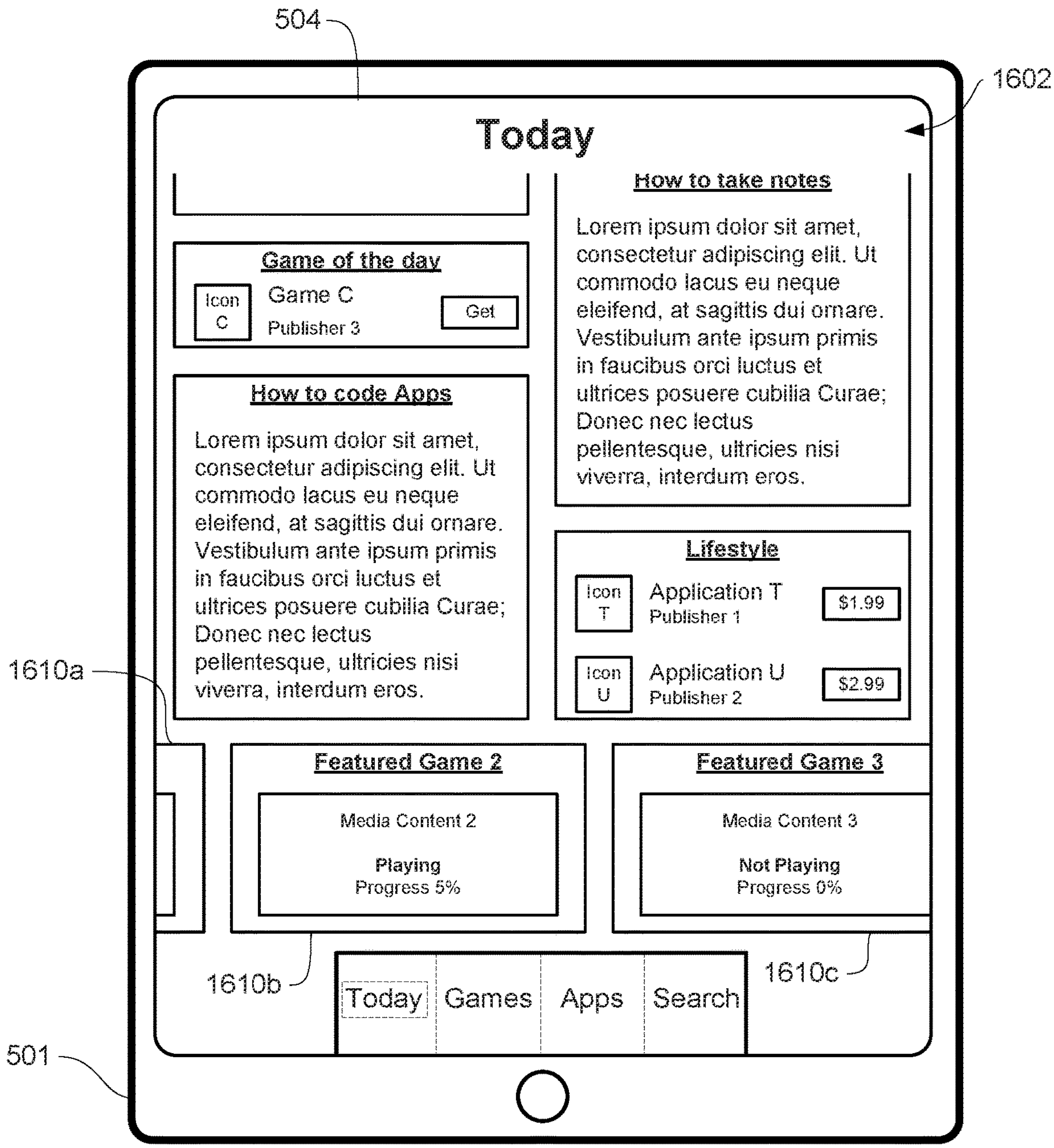
Figure 16W:
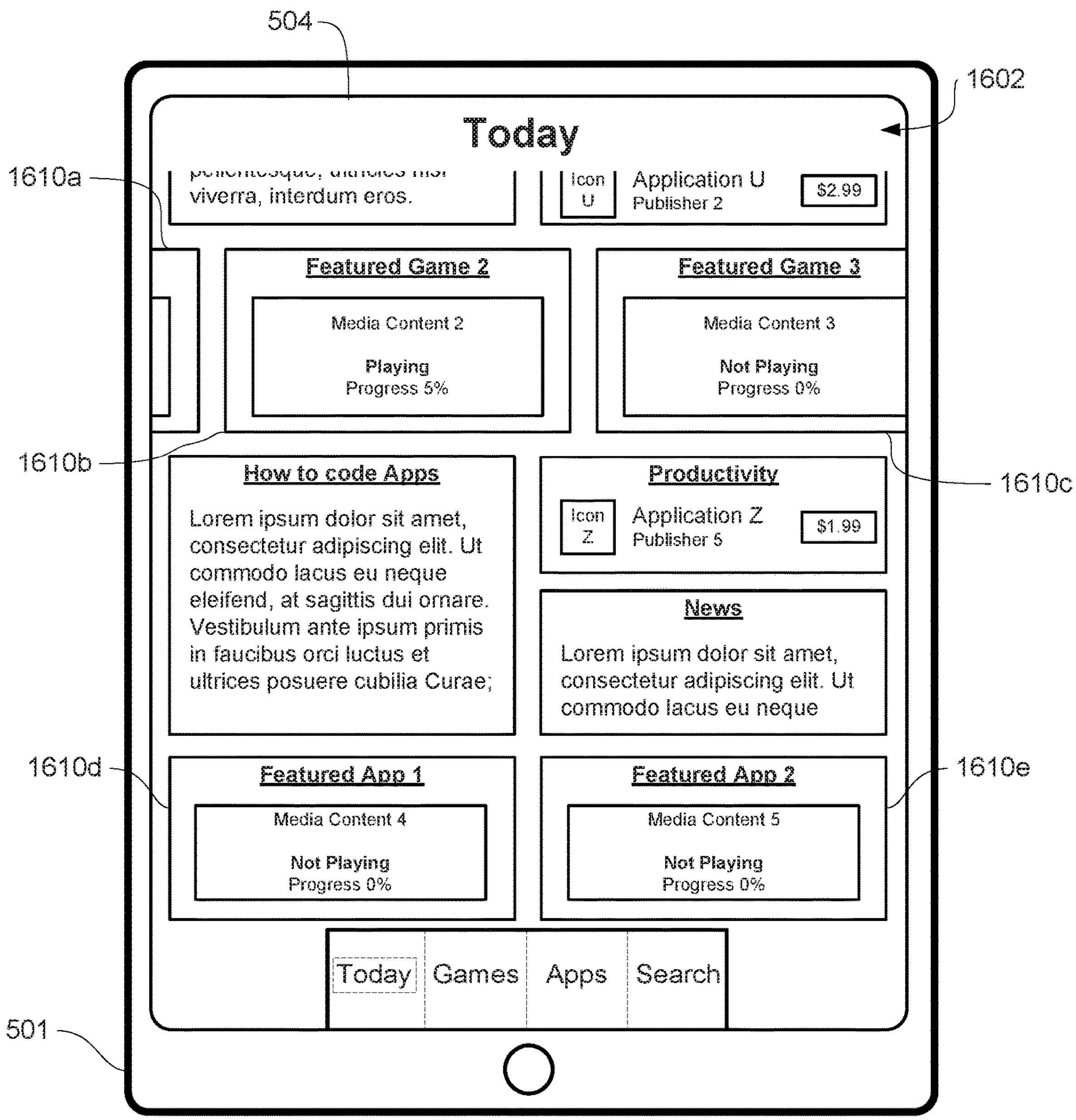
Figure 17A:
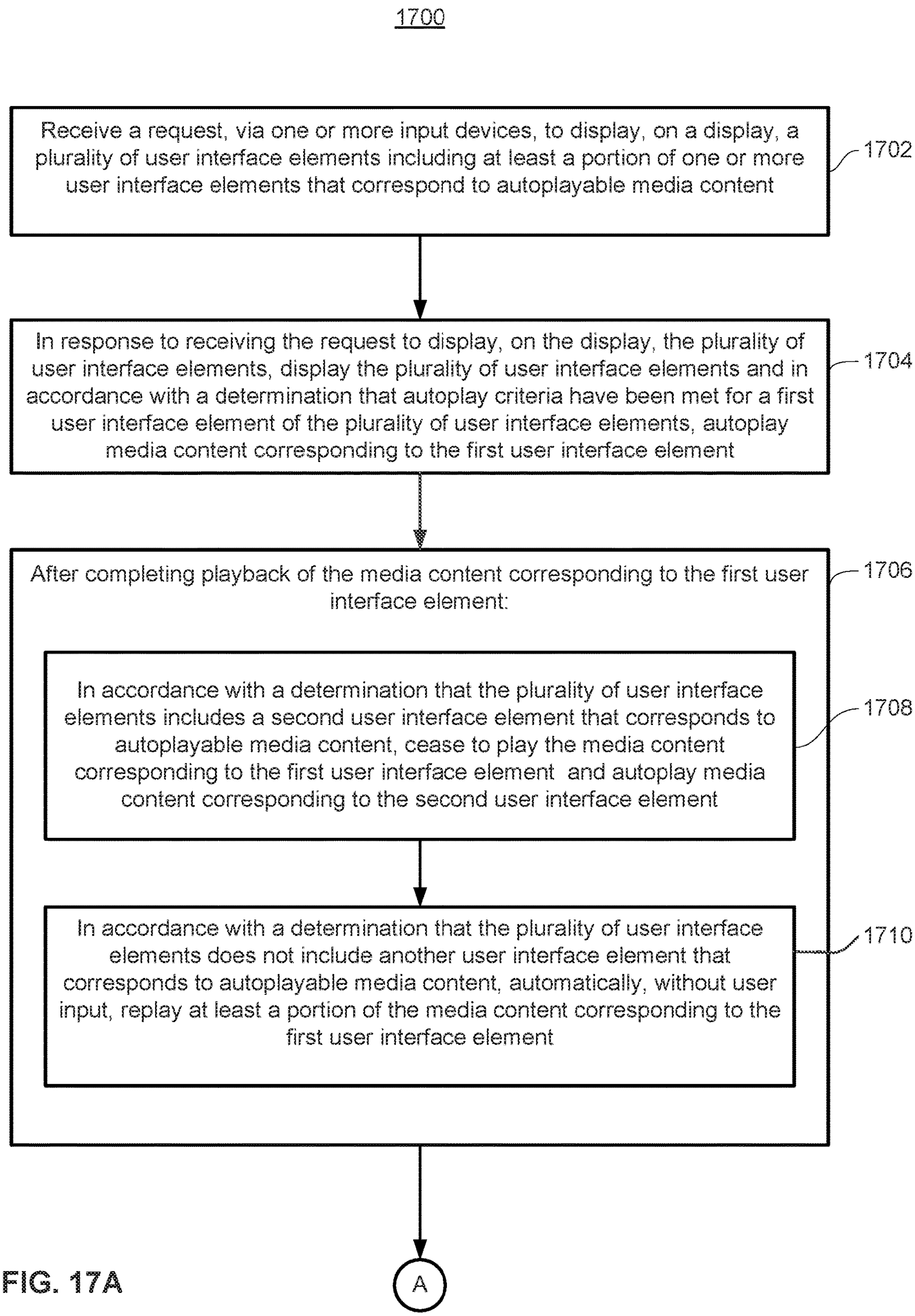
FIGS. 17A-17G are flow diagrams illustrating a method of autoplaying media content corresponding to applications (e.g., games, non-game applications, etc.) in an app store application so as to facilitate the ordered presentation of the media content to the user in accordance with some embodiments of the disclosure.
Figure 17B:
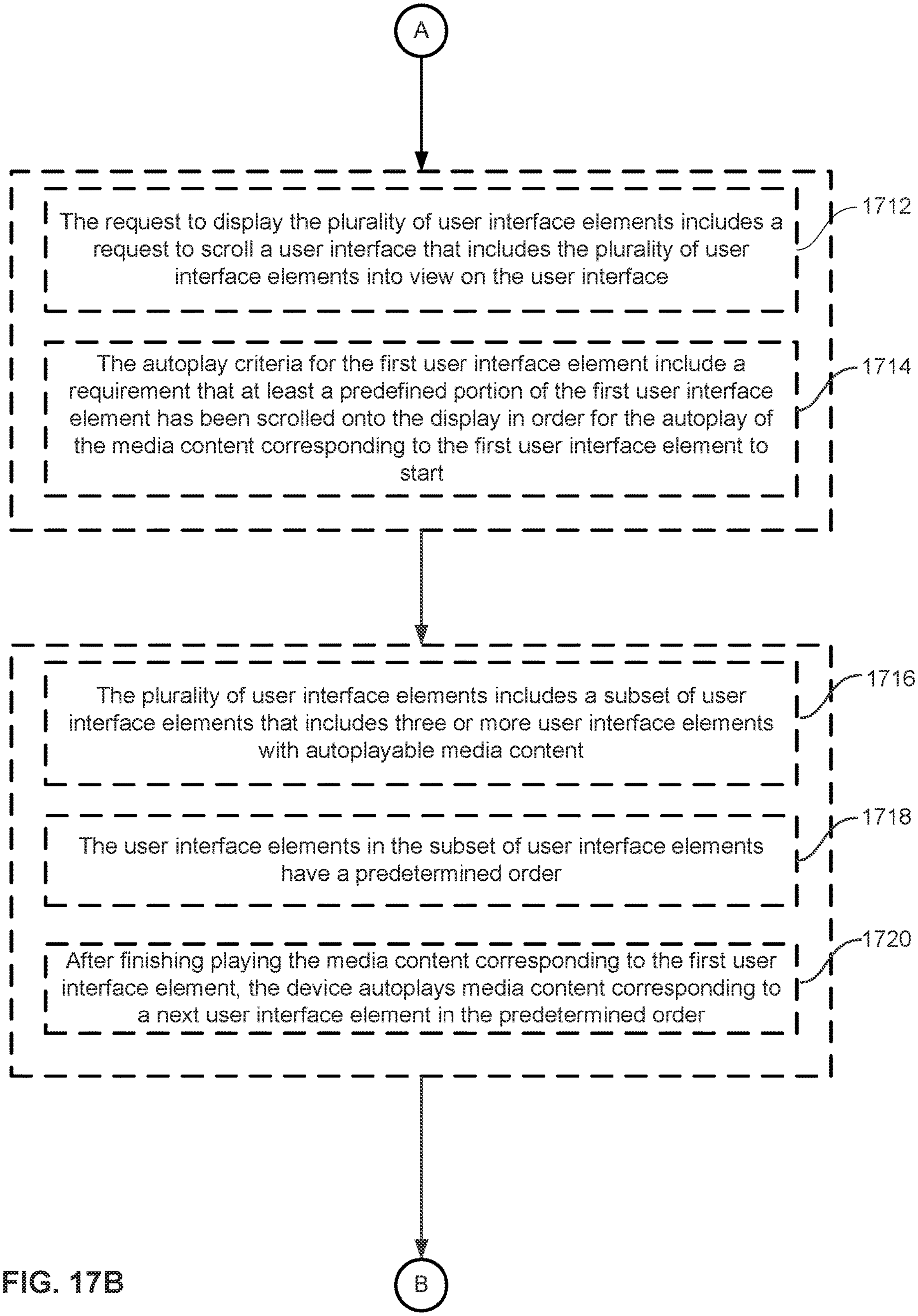
Figure 17C:
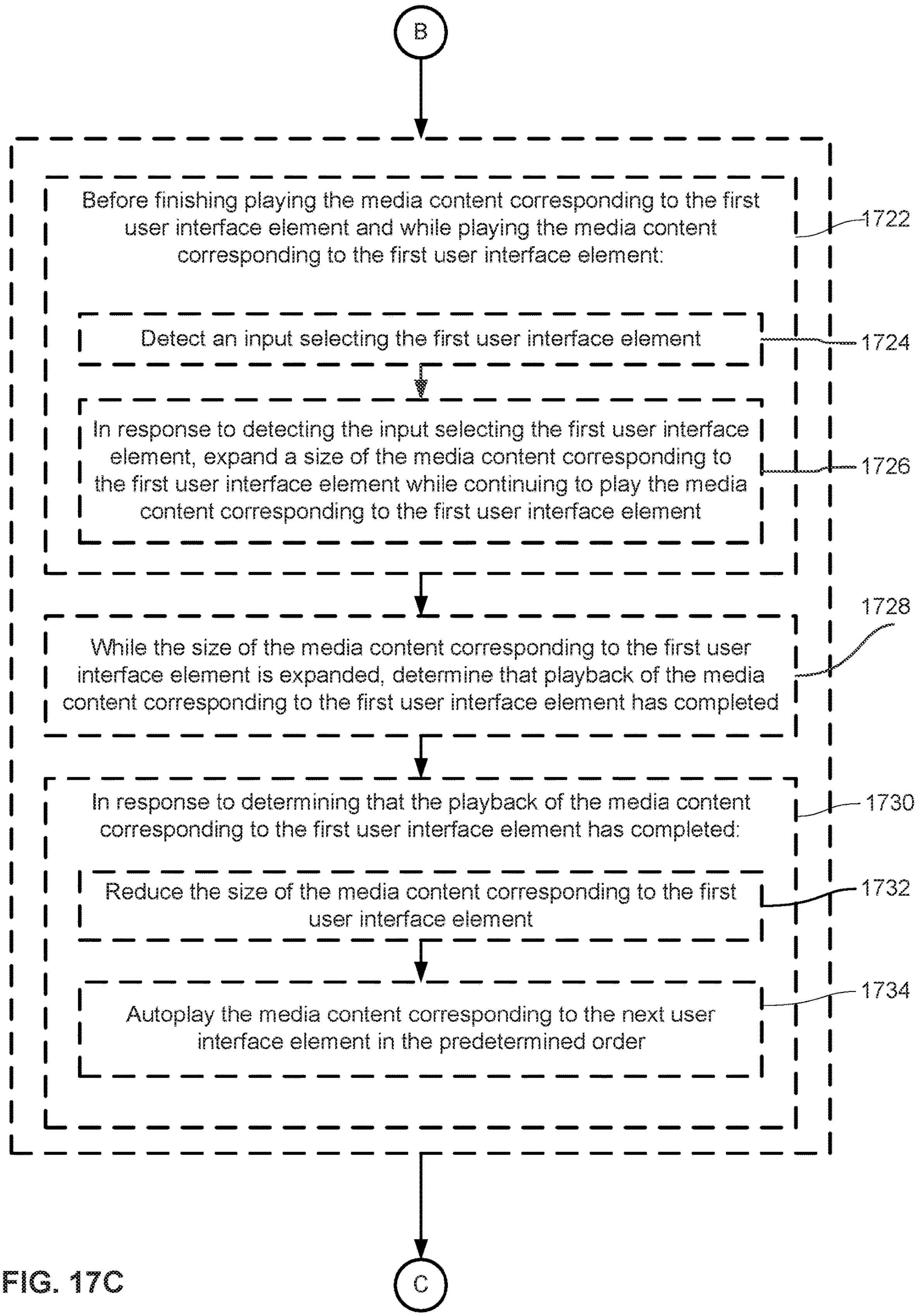
Figure 17D:
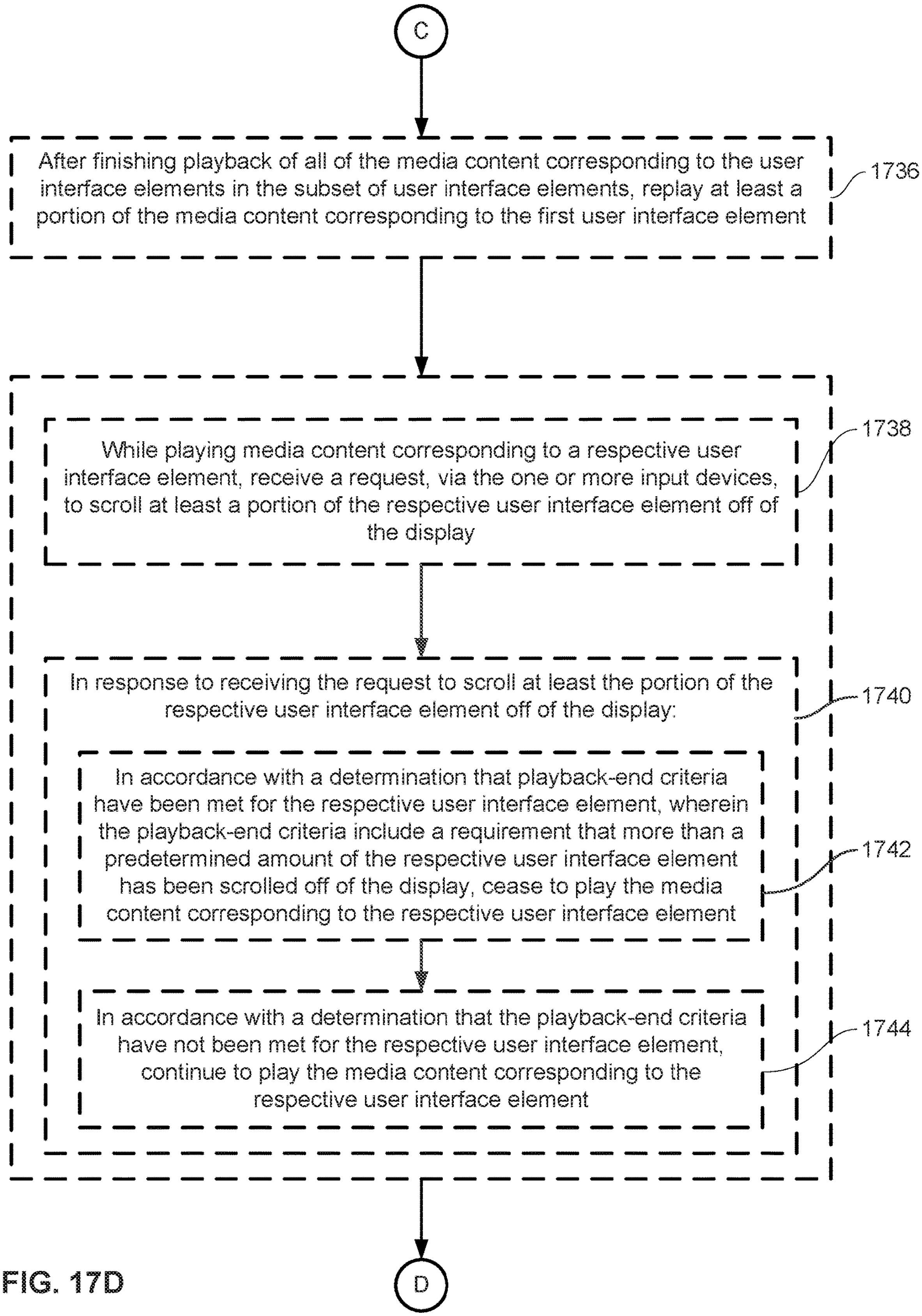
Figure 17E:
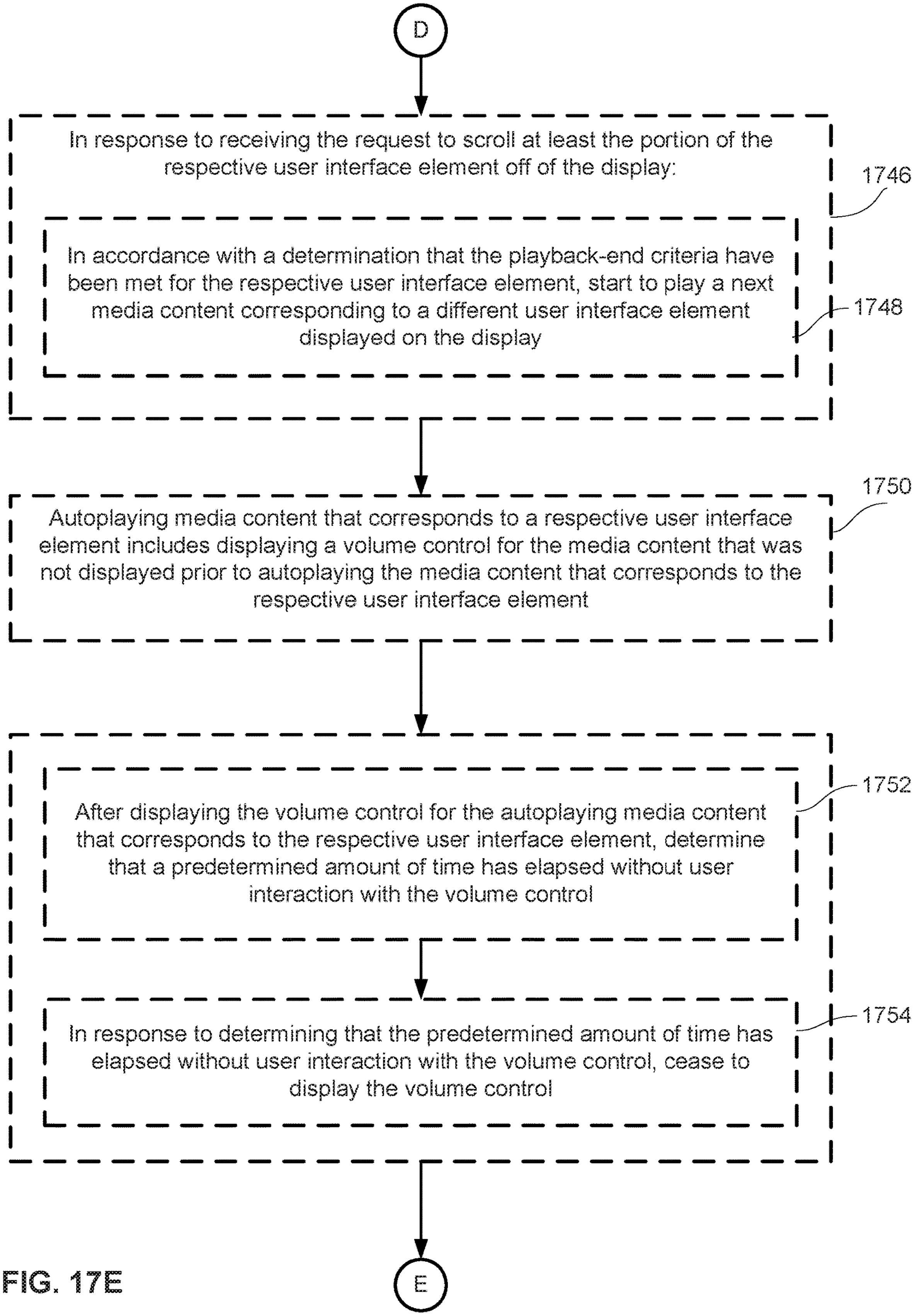
Figure 17F:
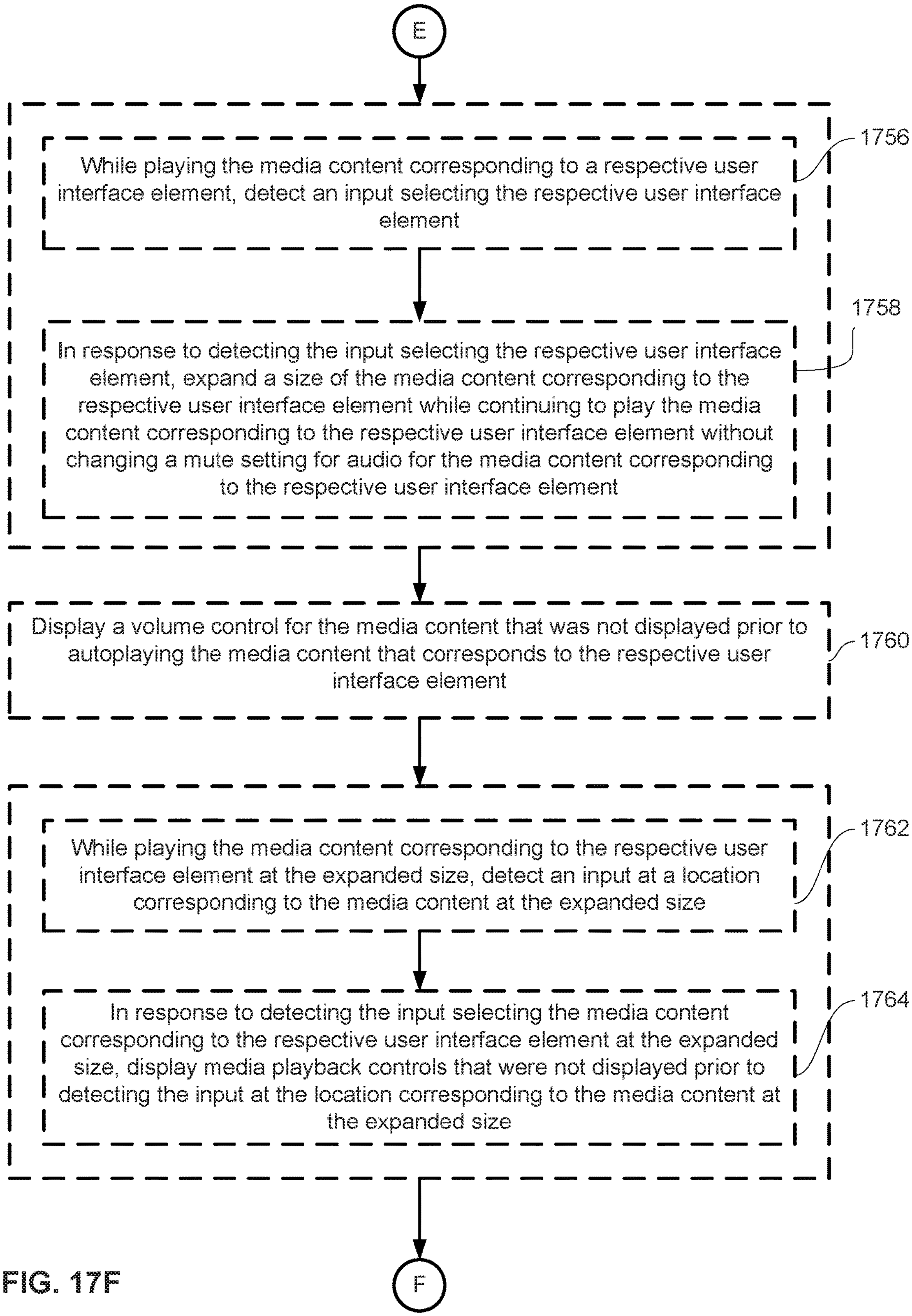
Figure 17G:
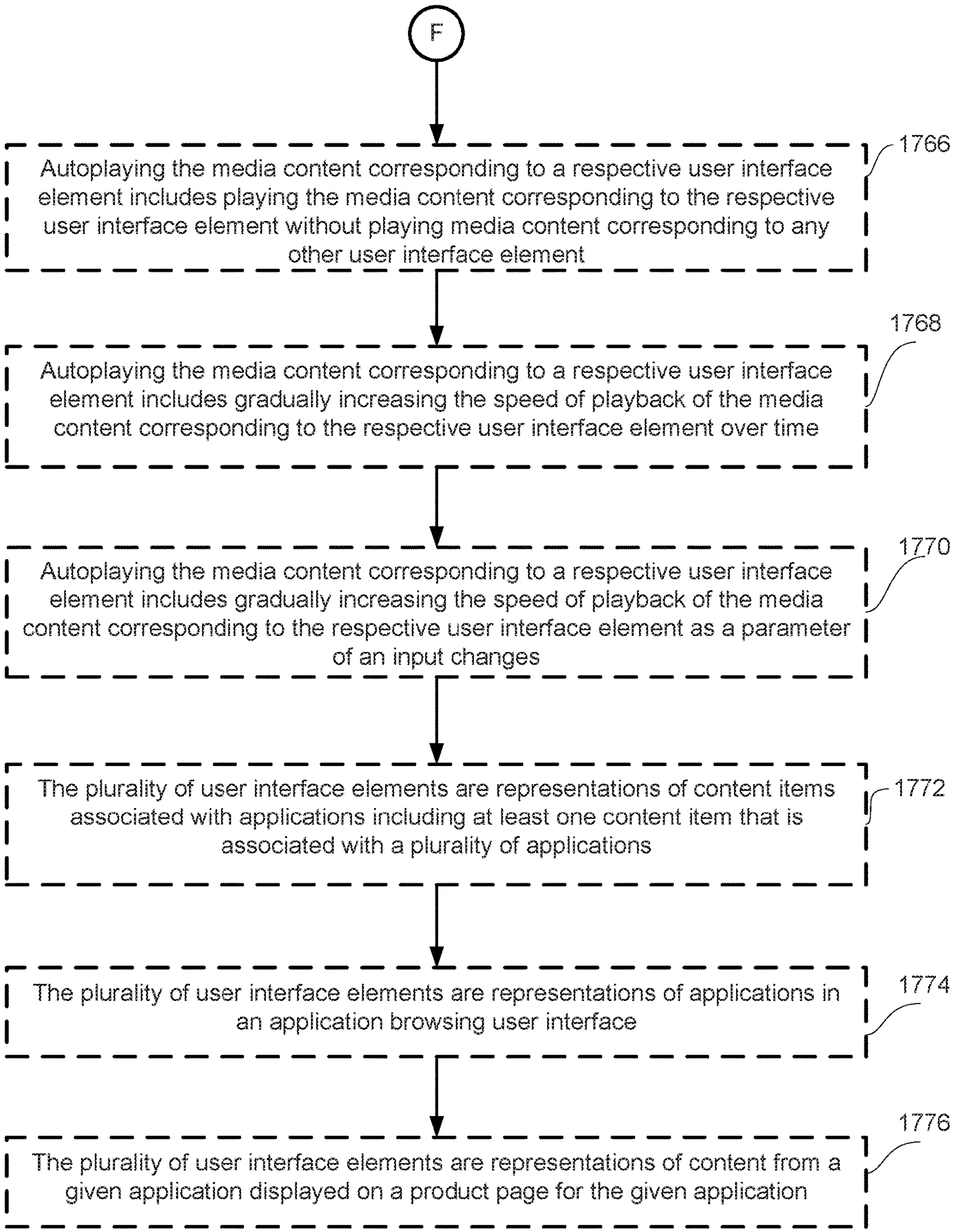

FIGS. 16A-16W illustrate exemplary ways in which an electronic device autoplays media content corresponding to applications (e.g., games, non-game applications, etc.) in an app store application so as to facilitate the ordered presentation of the media content to the user in accordance with some embodiments of the disclosure. The embodiments in these figures are used to illustrate the processes described below, including the processes described with reference to FIGS. 17A-17G.

FIG. 16A illustrates exemplary device 500 with touch screen 504, such as described with reference to FIGS. 5A-5H. Touch screen 504 optionally displays one or more user interfaces that include various content. In the example illustrated in FIG. 16A, touch screen 504 displays an app store application, running on device 500, for browsing applications or games available for download to device 500, such as described in FIGS. 6A and 6JJ, among others. In FIG. 16A, the app store application displays application browsing user interface 1602, which includes a navigation bar 1608. Navigation bar 1608 facilitates navigation through the app store application, as described in greater detail with reference to FIGS. 8A-8LL and method 900. Navigation bar 608 includes a "Today" element, a "Games" element, an "Apps" element and a "Search" element. In FIG. 16A, the "Today" element is currently selected (indicated by selection indicator 1606), and as a result, user interface 1602 displays various information relating to one or more applications that are currently being featured for download to device 500 for various reasons. For example, user interface 1602 includes different cards related to the applications that are currently being featured, such as a card relating to design, a card relating to the game of the day, and a card relating to an application, other than a game, of the day (referred to as "apps"). In some embodiments, one or more of the cards displayed in user interface 1602 include autoplayable media content (e.g., video that is able to be played automatically, independent of user input requesting playback of the media content). Exemplary autoplay behavior of such media content will now be described.

In FIG. 16A, no card displayed in user interface 1602 includes autoplayable media content. In FIGS. 16B-16C, an upward swipe of contact 1603 is detected on touch screen 504. In response, card **1610*a* is scrolled into user interface 1602, as shown in FIG. 16C. Card 1610*a* includes autoplayable media content (e.g., media content 1) corresponding to Game 1 (e.g., a video of content from Game 1, such as a preview video of Game 1). In FIG. 16C, media content 1 is not yet playing. However, because card 1610*a* has been scrolled into user interface 1602 more than a threshold amount (e.g., 20%, 30%, 40%, 50%, etc. of card 1610*a* is displayed in user interface 1602), device 500 begins to autoplay media content 1, as shown in FIG. 16D. Importantly, media content 1 begins to play independent of user input requesting playback of media content 1. Indeed, the only user input received in the examples of FIGS. 16B-16D is the swipe input described with reference to FIGS. 16B-16**C.

In some embodiments, device 500 displays a volume control overlaid on the autoplaying media content when it begins to autoplay that media content, that volume control not being displayed before device 500 started to autoplay the media content. For example, in FIG. 16D, device 500 displays an audio mute toggle control **1612*a* overlaid over media content 1 when device 500 starts to autoplay media content 1. Selection of audio mute toggle control 1612*a* optionally un-mutes (if the audio is muted) or mutes (if the audio is un-muted) the audio corresponding to media content 1. In FIG. 16D, the audio corresponding to media content 1 is currently muted (thus, audio mute toggle control 1612*a* indicates "Mute On"). In some embodiments, device 500 ceases to display audio mute toggle control 1612*a* after a predetermined amount of time (e.g., 0.5, 1, 2, 5 or 10 seconds) has elapsed since playback of media content 1 began, such as shown in FIG. 16**E.

In FIG. 16F, device 500 has played through the entirety of media content 1 (as indicated by "Progress 100%"). Because no other card in user interface 1602 includes autoplayable media content, device 500 begins replaying media content 1 in card 1610*a* (e.g., replaying from the beginning of media content 1) once the end of media content 1 is reached, as shown in FIG. 16G.

In FIG. 16H, two cards—cards 1610*a* and 1610*b*—include autoplayable media content (e.g., media content 1 and media content 2). In FIG. 16H, device 500 has not yet started to autoplay either of media content 1 or media content 2. For example, cards 1610*a* and 1610*b* have optionally just been scrolled into user interface 1602 (e.g., similar to as described with reference to FIG. 16C). In some embodiments, because multiple cards include autoplayable media content, device 500 will autoplay the media content corresponding to those cards based on a predetermined order of those cards. In the example of FIG. 16H, card 1610*a* is first in the predetermined order, and card 1610*b* is second in the predetermined order. In some embodiments, the predetermined autoplay order of cards displayed in user interface 1602 is such that autoplaying of the media content corresponding to those cards will move from left to right, and then top to bottom in user interface 1602, as will be described in more detail with reference to FIG. 16W, though it is understood that any predetermined autoplay order of cards is within the scope of this disclosure.

In accordance with the above-described predetermined order of cards 1610*a* and 1610*b*, device 500 first begins to autoplay media content 1 while not yet autoplaying media content 2, as shown in FIG. 16I. In FIG. 16J, device 500 has played through the end of media content 1, and upon completing playback of media content 1, device 500 stops playing media content 1, and begins autoplaying media content 2 (e.g., because card 1610*b* is the next card after card 1610*a* in the above-mentioned predetermined order of cards). Device 500 continues to play media content 2 while media content 1 is not playing in FIG. 16K. Finally, in FIG. 16L, device 500 has played through the end of media content 2. Because cards 1610*a* and 1610*b* are the only cards in user interface 1602 that include autoplayable media content, upon completing playback of media content 2, device 500 stops playing media content 2, and begins replaying media content 1 (e.g., because card 1610*b* is the last card in the above-mentioned predetermined order of cards that is sufficiently displayed in user interface 1602, and card 1610*a* is the first card in the above-mentioned predetermined order of cards that is sufficiently displayed in user interface 1602). In some embodiments, device 500 replays media content 1 from the beginning. The above-described manner of sequentially autoplaying media content in multiple cards according to a predetermined order, and optionally restarting the autoplay process at the first card in the predetermined order once autoplaying of the media content in the last card in the predetermined order has completed, optionally applies analogously to any number of multiple cards (e.g., three, five, ten, etc.) displayed in user interface 1602.

In some embodiments, selection of media content while it is being autoplayed expands the media content on touch screen 504. For example, in FIG. 16M, media content 1 is being autoplayed, and the audio for media content 1 is currently muted. In FIG. 16N, after device 500 has continued to autoplay media content 1, and after device 500 has ceased displaying the mute indicator over media content 1 (though while the audio for media content 1 continued to be muted), selection of media content 1 is detected (e.g., a tap of contact 1603 is detected over media content 1). In response to the selection of media content 1, device 500 expands media content 1 on touch screen 504 (e.g., displays media content 1 in a full screen mode while ceasing to display cards in user interface 1602 and/or navigation bar 1608 on touch screen 504) and continues to play media content 1, as shown in FIG. 16O. Further, device 500 maintains the audio mute setting of media content 1 that was in effect when selection of media content 1 was detected after expanding and continuing to play media content 1. Specifically, in FIG. 16N, the audio for media content 1 was muted—thus, in FIG. 16O, the audio for media content 1 continues to be muted after device 500 expands media content 1 into a full screen playback mode. Further, device 500 redisplays audio mute toggle control 1612*a*, which indicates the state of the audio of media content 1 (e.g., currently muted) and is manipulable to change the state of the audio of media content 1 (e.g., selectable to unmute the audio), over media content 1 when media content 1 is expanded.

Further selection of expanded media content 1 optionally causes playback controls for media content 1 to be displayed on touch screen 504. For example, in FIG. 16P, a tap of contact 1603 is detected on expanded media content 1. In response, in FIG. 16Q, device 500 displays playback controls 1614, which include a play/pause button that is selectable to play or pause media content 1 depending on whether media content 1 is currently playing or is currently paused (e.g., shown as "pause" in FIG. 16Q, because media content 1 is currently playing), and a scrubber bar that indicates the current play position in media content 1 and is usable to scrub through (e.g., fast-forward, rewind) media content 1.

Upon completing playback of expanded media content 1, device 500 optionally starts autoplaying the next media content in the above-mentioned predetermined order of cards in user interface 1602 (if multiple cards including autoplayable media content are displayed in user interface 1602). For example, in FIG. 16R, device 500 has played through the end of media content 1. In response, device 500 reduces the size of media content 1 (e.g., back to its original, pre-expanded size) and redisplays the cards in user interface 1602 on touch screen 504, as shown in FIG. 16S. Further, because card 1610*b* also includes autoplayable media content, and because card 1610*b* is the next card after card 1610*a* in the above-mentioned predetermined order of cards that is sufficiently displayed in user interface 1602, device 500 begins to autoplay media content 2 corresponding to card 1610*b*, as shown in FIG. 16S. When this occurs, device 500 is optionally no longer autoplaying media content 1.

In some embodiments, device 500 stops autoplaying media content when the card corresponding to that media content is sufficiently scrolled off touch screen 504 (e.g., more than a predetermined amount, such as 30%, 40%, 50%, 60%, 75%, or 90%, etc., of the card has been scrolled off touch screen 504). For example, in FIG. 16T, media content 1 is currently autoplaying while media content 2 is not autoplaying. In FIGS. 16T-16U, a leftward swipe of contact 1603 is detected that corresponds to a request to scroll cards 1610*a* and 1610*b* leftward on touch screen 504. As a result, card 1610*c* has been at least partially scrolled onto touch screen 504, and card 1610*a* has been at least partially scrolled off touch screen 504, as shown in FIG. 16U. Card 1610*c* is optionally also in the above-mentioned predetermined order of cards, and is after card 1610*b* in that predetermined order, and is also sufficiently displayed in user interface 1602 to be autoplayed. The amount by which card 1610*a* has been scrolled off touch screen 504 is optionally more than the above-described predetermined amount. As such, device 500 stops autoplaying media content 1 (e.g., in FIG. 16U, device 500 stopped autoplaying media content 1 10% through the playback of media content 1), and begins to autoplay media content 2 (e.g., because card 1610*b* is a card in user interface 1602 that is sufficiently displayed in user interface 1602 to be autoplayed, and because card 1610*b* is the next card after card 1610*a* in the above-mentioned predetermined order of cards). Device 500 continues to autoplay media content 2 while media content 1 remains paused, as shown in FIG. 16V.

FIG. 16W illustrates an example in which the user has further vertically scrolled through user interface 1602 such that cards 1610*b*, 1610*c*, 1610*d* and 1610*e*, which all include autoplayable media content, are sufficiently displayed in user interface 1602 to be autoplayed. Media content 2, corresponding to card 1610*b*, is currently being autoplayed by device 500. Further, the predetermined autoplay order of cards in the example of FIG. 16W is: card 1610*a*, 1610*b*, 1610*c*, 1610*d* and 1610*e*. As such, device 500 will autoplay media content 2 through completion, at which time device 500 will stop autoplaying media content 2 and will start autoplaying media content 3 (e.g., similar to as described with reference to FIGS. 16I-16K), because card 1610*c* is the next card in the predetermined order of cards that is sufficiently displayed in user interface 1602 to be autoplayed. Device 500 will autoplay media content 3 through completion, at which time device 500 will stop autoplaying media content 3 and will start autoplaying media content 4 (e.g., similar to as described with reference to FIGS. 16I-16K), because card 1610*d* is the next card in the predetermined order of cards that is sufficiently displayed in user interface 1602 to be autoplayed. Device 500 will autoplay media content 4 through completion, at which time device 500 will stop autoplaying media content 4 and will start autoplaying media content 5 (e.g., similar to as described with reference to FIGS. 16I-16K), because card 1610*e* is the next card in the predetermined order of cards that is sufficiently displayed in user interface 1602 to be autoplayed. Device 500 will then autoplay media content 5 through completion. At this time, device 500 will stop autoplaying media content 5, and because card 1610*a* is not sufficiently displayed in user interface 1602 to be autoplayed, device 500 will start autoplaying (e.g., repeating) media content 2 rather than media content 1, even though card 1610*a* is the next card in the predetermined autoplay order of cards (e.g., card 1610*e* is the last card in the order, and card 1610*a* is the first card in the order). Autoplaying of cards 1610*b*, 1610*c*, 1610*d*, and 1610*e* (or any other arrangement of cards with autoplayable media content in user interface 1602) optionally continues to proceed as described above. Thus, in the example of FIG. 16W, autoplaying of media content proceeds from left to right, then moves down and continues from left to right again until all autoplayable media content in user interface 1602 is autoplayed, at which point device 500 returns to autoplaying the upper-most, left-most media content that is autoplayable in user interface 1602 and continues to autoplay the media content in user interface 1602 as described above.

FIGS. 17A-17G are flow diagrams illustrating a method 1700 autoplaying media content corresponding to applications (e.g., games, non-game applications, etc.) in an app store application so as to facilitate the ordered presentation of the media content to the user in accordance with some embodiments of the disclosure. The method 1700 is optionally performed at an electronic device such as device 100, device 300 or device 500 as described above with reference to FIGS. 1A-1B, 2-3, 4A-4B and 5A-5H. Some operations in method 1700 are, optionally, combined and/or the order of some operations is, optionally, changed.

As described below, the method 1700 provides ways of autoplaying media content corresponding to applications (e.g., games, non-game applications, etc.) in an app store application so as to facilitate the ordered presentation of the media content to the user. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set-top box, a mobile phone, a tablet computer, etc., such as device 500) with a display (e.g., a television, a display of the electronic device, a touch screen of the electronic device, such as touch screen 504) and one or more input devices (e.g., a touch screen of the electronic device, such as touch screen 504, a remote control of the set-top box), receives (1702) a request, via the one or more input devices, to display, on the display, a plurality of user interface elements including at least a portion of one or more user interface elements that correspond to autoplayable media content, such as in FIGS. 16B-16C (e.g., a request to switch to a user interface that includes the plurality of user interface elements, or a request to scroll to a portion of a user interface that includes the plurality of user interface elements). In some embodiments, in response to receiving the request to display, on the display, the plurality of user interface elements, the electronic device displays (1704) the plurality of user interface elements and in accordance with a determination that autoplay criteria have been met for a first user interface element of the plurality user interface elements, the electronic device optionally autoplays media content corresponding to the first user interface element, such as in FIG. 16C (e.g., replacing at least a portion of the first user interface element, such as a keyframe of a video or animation, with the video or animation corresponding to the first user interface element). In some embodiments, in response to receiving the request to display, on the display, the plurality of user interface elements, in accordance with a determination that autoplay criteria have not been met for a first user interface element of the plurality user interface elements, the electronic device displays the plurality of user interface elements without autoplaying media content corresponding to the first user interface element.

In some embodiments, after completing playback of the media content corresponding to the first user interface element (1706), in accordance with a determination that the plurality of user interface elements includes a second user interface element that corresponds to autoplayable media content, the electronic device ceases (1708) to play the media content corresponding to the first user interface element (e.g., replacing the video or animation corresponding to the first user interface element with a keyframe of the video or animation) and autoplays media content corresponding to the second user interface element, such as in FIGS. 16J-16K (e.g., replacing at least a portion of the second user interface element, such as a keyframe of a video or animation, with the video or animation corresponding to the second user interface element). In some embodiments, after completing playback of the media content corresponding to the first user interface element, in accordance with a determination that the plurality of user interface elements does not include another user interface element that corresponds to autoplayable media content, the electronic device, automatically, without user input, replays (1710) at least a portion of the media content corresponding to the first user interface element, such as in FIGS. 16F-16G (e.g., looping the autoplayable media corresponding to the first user interface element if the first user interface element is the only user interface element associated with autoplayble media in the plurality of user interface elements displayed on the display).

The above-described manner of automatically transitioning playback from one media content of one user interface element to another media content of another user interface element, or not transitioning depending on whether multiple user interface elements have corresponding autoplayable media content, allows the electronic device to present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, the request to display the plurality of user interface elements includes a request to scroll a user interface that includes the plurality of user interface elements into view on the user interface (1712), such as in FIGS. 16B-16C (e.g., a swipe or drag gesture on a touch-sensitive surface such as a touch-sensitive display). In some embodiments, the autoplay criteria for the first user interface element include a requirement that at least a predefined portion (e.g., 25%, 30%, 50%, 60%, 75%) of the first user interface element has been scrolled onto the display in order for the autoplay of the media content corresponding to the first user interface element to start (1714). In some embodiments, the autoplay criteria are capable of being met without the user providing an explicit request to play the media content corresponding to the first user interface element, such as in FIGS. 16D and 16I (e.g., the media corresponding to the first user interface element autoplays without requiring the user to tap, click or otherwise select a play affordance for the media).

In some embodiments, scrolling the user interface includes scrolling a portion of the user interface, such as in FIGS. 16T-16U (e.g., scrolling a row or pane within the user interface horizontally while other portions of the user interface are not scrolled in response to a horizontal drag input). In some embodiments, scrolling the user interface includes scrolling the whole user interface, such as in FIGS. 16B-16C (e.g., scrolling the plurality of user interface elements vertically in response to a vertical drag input). In some embodiments, when the first user interface element begins autoplaying, audio associated with the autoplaying media content remains muted until a request to unmute the audio is detected, such as in FIGS. 16D and 16I (e.g., selection of a mute/unmute affordance). In some embodiments, when the first user interface element begins autoplaying, audio associated with the autoplaying media content of the first user interface element gradually fades in. In some embodiments, when the first user interface element begins autoplaying, the audio associated with the autoplaying media content of the first user interface element does not gradually fade in, but begins playing immediately at a full volume level set by the electronic device. The above-described manner of automatically starting playback of the media content when the user interface element is scrolled onto the display allows the electronic device to automatically present information to the user, which simplifies interactions between the user and the device and enhances the operability of the device and makes the user-device interface more efficient (e.g., by helping the user to view information using fewer inputs provided to the device), which, additionally, reduces power usage and improves battery life of the device by enabling the user to use the device more quickly and efficiently.

In some embodiments, the plurality of user interface elements includes a subset of user interface elements that includes three or more user interface elements with autoplayable media content, such as in FIG. 16W (1716). In some embodiments, the user interface elements in the subset of user interface elements have a predetermined order (1718), such as in FIG. 16W (e.g., left to right and top to bottom for all user interface elements with autoplayable media content that meet the autoplay criteria (e.g., a sufficient portion of the user interface element is displayed on the display)). After finishing playing the media content corresponding to the first user interface element, the electronic device optionally autoplays media content corresponding to a next user interface element in the predetermined order, such as in FIGS. 16J and 16W (1720). In some embodiments, the device repeats this process for each user interface element in the subset of user interface elements, such as in FIG. 16W (e.g., playing through the autoplayable media content associated with the user interface elements in the subset of user interface elements in sequence). The above-described manner of automatically transitioning playback from one media content item to another based on a predetermined order of user interface elements allows the electronic device to present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, before finishing playing the media content corresponding to the first user interface element and while playing the media content corresponding to the first user interface element (1722), the electronic device detects (1724) an input selecting the first user interface element, such as in FIG. 16N (e.g., a tap on the first user interface element or the playing media content corresponding to the first user interface element). In response to detecting the input selecting the first user interface element, the electronic device optionally expands (1726) a size of the media content corresponding to the first user interface element while continuing to play the media content corresponding to the first user interface element, such as in FIG. 16O (e.g., without restarting or pausing playback). In some embodiments, while the size of the media content corresponding to the first user interface element is expanded, the electronic device determines (1728) that playback of the media content corresponding to the first user interface element has completed, such as in FIG. 16R (e.g., an end of the media content is reached).

In some embodiments, in response to determining that the playback of the media content corresponding to the first user interface element has completed (1730), the electronic device reduces (1732) the size of the media content corresponding to the first user interface element, such as in FIG. 16S (e.g., reducing, automatically and without user input to do so, the size of the media content to the size of the media content before it was expanded, which optionally reveals others of the plurality of user interface elements, other than the first user interface element, on the display). In some embodiments, in response to determining that the playback of the media content corresponding to the first user interface element has completed, the electronic device autoplays (1734) the media content corresponding to the next user interface element in the predetermined order, such as in FIG. 16S (e.g., when playback of the expanded media content is completed, the electronic device optionally continues with autoplaying the next media content, despite the fact that the media content of the first user interface element was expanded). In some embodiments, the next media content is played at its reduced size, and not at an expanded size such as the expanded size at which the media content for the first user interface element was playing. The above-described manner of automatically transitioning playback from one media content item to another based on a predetermined order of user interface elements, even if the currently playing media content is expanded, allows the electronic device to present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, after finishing playback of all of the media content corresponding to the user interface elements in the subset of user interface elements, the electronic device replays (1736) (e.g., automatically, without use intervention) at least a portion of (or all of) the media content corresponding to the first user interface element, such as in FIGS. 16K-16L. The above-described manner of automatically transitioning back to playing the media content corresponding to the first user interface element allows the electronic device to continually present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, while playing media content corresponding to a respective user interface element (e.g., the first user interface element or the second user interface element), the electronic device receives (1738) a request, via the one or more input devices, to scroll at least a portion of the respective user interface element off of the display, such as in FIGS. 16T-16U. In response to receiving the request (e.g., a swipe or drag input on a touch-sensitive surface such as touch sensitive display, a rotation of a digital crown or mouse wheel, or movement of a cursor via a pointer device such as a mouse or trackpad) to scroll at least the portion of the respective user interface element off of the display (1740), in accordance with a determination that playback-end criteria have been met for the respective user interface element, wherein the playback-end criteria include a requirement that more than a predetermined amount (e.g., 30%, 40%, 50%, 60%, 75%, or 90%) of the respective user interface element has been scrolled off of the display, the electronic device optionally ceases (1742) to play the media content corresponding to the respective user interface element, such as in FIG. 16U (e.g., replacing display of the video or animation corresponding to the respective user interface element with a keyframe of the video or animation). In some embodiments, in response to receiving the request to scroll at least the portion of the respective user interface element off of the display, in accordance with a determination that the playback-end criteria have not been met for the respective user interface element, the electronic device continues (1744) to play the media content corresponding to the respective user interface element.

For example, in some embodiments, if the media content is stopped in response to being scrolled off the display, if the media content is scrolled back onto the display, the media content will autoplay and resume playback (e.g., when its turn to autoplay has returned according to one or more of the autoplay rules described herein) from the play position at which the media content was playing when playback of the media content was stopped. In some embodiments, the media content will, instead, autoplay from the beginning of the media content. The above-described manner of automatically stopping playback of media content when its corresponding user interface element is scrolled off the display allows the electronic device to simplify interactions between the user and the device and enhances the operability of the device and makes the user-device interface more efficient (e.g., by saving resources that would otherwise be used for playback of the media content without the need for inputs provided to the device to do so), which, additionally, reduces power usage and improves battery life of the device by enabling the user to use the device more quickly and efficiently.

In some embodiments, in response to receiving the request to scroll at least the portion of the respective user interface element off of the display (1746), in accordance with a determination that the playback-end criteria have been met for the respective user interface element, the electronic device starts (1748) to play a next media content corresponding to a different user interface element displayed on the display, such as in FIG. 16U (e.g., a media item corresponding to a user interface element that is next in order to autoplay media). In some embodiments, in accordance with a determination that the playback-end criteria have not been met for the respective user interface element, the electronic device forgoes starting to play a next media item corresponding to a different user interface element displayed on the display. The above-described manner of automatically transitioning playback from the stopped media content to another allows the electronic device to present information to the user in an ordered fashion, which simplifies interactions between the user and the device and enhances the operability of the device and makes the user-device interface more efficient (e.g., by helping the user to view more information using fewer inputs provided to the device), which, additionally, reduces power usage and improves battery life of the device by enabling the user to use the device more quickly and efficiently.

In some embodiments, autoplaying media content that corresponds to a respective user interface element includes displaying a volume control for the media content that was not displayed prior to autoplaying the media content that corresponds to the respective user interface element (1750), such as in FIG. 16D (e.g., a mute/unmute toggle displayed overlaid on the autoplaying media content). In some embodiments, the media content starts playing with sound disabled (e.g., muted), such as in FIG. 16D. In some embodiments, the media content starts playing with sound enabled (e.g., unmuted). In some embodiments, the volume control is displayed overlaid on the playing media content, such as in FIG. 16D. The above-described manner of automatically displaying the volume control for media content when the media content is autoplaying, but not before it is autoplaying, allows the electronic device to present information (e.g., the volume control) to the user only when it is relevant to the user (e.g., when the media content is playing), which simplifies interactions between the user and the device and enhances the operability of the device and makes the user-device interface more efficient (e.g., by not requiring the electronic device to expend resources on displaying such information when it is not relevant to the current state of the electronic device), which, additionally, reduces power usage and improves battery life of the device by enabling the user to use the device more quickly and efficiently.

In some embodiments, after displaying the volume control for the autoplaying media content that corresponds to the respective user interface element, the electronic device determines (1752) that a predetermined amount of time (e.g., 0.5, 1, 2, 5 or 10 seconds) has elapsed without user interaction with the volume control. In some embodiments, in response to determining that the predetermined amount of time has elapsed without user interaction with the volume control, the electronic device ceases (1754) to display the volume control, such as in FIG. 16E. The above-described manner of automatically ceasing to display the volume control for media content when no interaction with the volume control has been detected allows the electronic device to cease presenting information (e.g., the volume control) to the user when the device determines such information is not relevant to the user, which simplifies interactions between the user and the device and enhances the operability of the device and makes the user-device interface more efficient (e.g., by not requiring the electronic device to expend resources on displaying such information when it is not relevant to the user), which, additionally, reduces power usage and improves battery life of the device by enabling the user to use the device more quickly and efficiently.

In some embodiments, while playing the media content corresponding to a respective user interface element, the electronic device detects (1756) an input selecting the respective user interface element, such as in FIG. 16N (e.g., a tap on the respective user interface element or the playing media content corresponding to the respective user interface element). In some embodiments, in response to detecting the input selecting the respective user interface element, the electronic device expands (1758) a size of the media content corresponding to the respective user interface element while continuing to play the media content corresponding to the respective user interface element (e.g., without restarting or pausing playback) without changing a mute setting for audio for the media content corresponding to the respective user interface element, such as in FIG. 16O (e.g., if the sound is playing for the media item, continuing to play the sound, if the sound is not playing or the media content, then continuing to play the media content without playing the sound). The above-described manner of maintaining the mute setting for audio allows the electronic device to maintain continuity in its presentation of information to the user, which simplifies interactions between the user and the device and enhances the operability of the device and makes the user-device interface more efficient (e.g., by not requiring the user to provide additional input reverting changes to the mute setting for the audio that might otherwise be made by the electronic device), which, additionally, reduces power usage and improves battery life of the device by enabling the user to use the device more quickly and efficiently.

In some embodiments, the electronic device displays (1760) a volume control for the media content that was not displayed prior to autoplaying (or expanding) the media content that corresponds to the respective user interface element, such as in FIG. 16O (e.g., a mute/unmute toggle displayed overlaid on the autoplaying media content). In some embodiments, the media content starts playing with sound disabled (e.g., muted). In some embodiments, the media content starts playing with sound enabled (e.g., unmuted). In some embodiments, the volume control is displayed overlaid on the playing media content. In some embodiments, the mute setting of the audio for the expanded media content will carry over to subsequent playback of other expanded media content such that if the user unmutes a first expanded media content, subsequent playback of a second expanded media content will also be unmuted. Similarly, if the user mutes a first expanded media content, subsequent playback of a second expanded media content will also be muted. The above-described manner of automatically displaying the volume control for media content allows the electronic device to present information (e.g., the volume control) to the user only when it is relevant to the user (e.g., when the media content is playing), which simplifies interactions between the user and the device and enhances the operability of the device and makes the user-device interface more efficient (e.g., by not requiring the electronic device to expend resources on displaying such information when it is not relevant to the current state of the electronic device), which, additionally, reduces power usage and improves battery life of the device by enabling the user to use the device more quickly and efficiently.

In some embodiments, while playing the media content corresponding to the respective user interface element at the expanded size, the electronic device detects (1762) an input at a location corresponding to the media content at the expanded size, such as in FIG. 16P (e.g., a tap on the playing media content corresponding to the respective user interface element). In some embodiments, in response to detecting the input selecting the media content corresponding to the respective user interface element at the expanded size, the electronic device displays (1764) media playback controls (e.g., a play/pause button, a progress scrubber) that were not displayed prior to detecting the input at the location corresponding to the media content at the expanded size, such as in FIG. 16Q. In some embodiments, the media playback controls are not displayed until the device has entered the expanded view of the media content and another input directed to the media content has been detected. The above-described manner of displaying the media playback controls only after another selection of the media content is detected allows the electronic device to present information (e.g., the media controls) to the user only when it is relevant to the user (e.g., when the user has requested such presentation), which simplifies interactions between the user and the device and enhances the operability of the device and makes the user-device interface more efficient (e.g., by not requiring the electronic device to expend resources on displaying such information when it is not relevant to the user and/or current state of the electronic device), which, additionally, reduces power usage and improves battery life of the device by enabling the user to use the device more quickly and efficiently.

In some embodiments, autoplaying the media content corresponding to a respective user interface element (e.g., the first user interface element or the second user interface element) includes playing the media content corresponding to the respective user interface element without playing media content corresponding to any other user interface element (1766), such as in FIGS. 16T-16W. The above-described manner of playing media content for only one user interface element at a time allows the electronic device to present information to the user in an ordered fashion, which simplifies interactions between the user and the device and enhances the operability of the device and makes the user-device interface more efficient (e.g., by helping the user to effectively view information and by saving the electronic device from expending resources on playing multiple media contents at the same time when there are multiple autoplayable media contents on the display at the same time), which, additionally, reduces power usage and improves battery life of the device by enabling the user to use the device more quickly and efficiently.

In some embodiments, autoplaying the media content corresponding to a respective user interface element (e.g., the first user interface element or the second user interface element) includes gradually increasing the speed of playback of the media content corresponding to the respective user interface element over time (1768) (e.g., gradually starting playback of the media content by increasing the speed of playback from a speed that is lower than a standard playback speed to the standard playback speed). The above-described manner of gradually increasing the playback speed of the media content allows the electronic device to give the user time to see that the media content is starting to play, and thus give the user time to focus on the media content before too much of the media content is played, which simplifies interactions between the user and the device and enhances the operability of the device and makes the user-device interface more efficient (e.g., by reducing the need for the user to restart playback of the media content due to having missed a portion of it), which, additionally, reduces power usage and improves battery life of the device by enabling the user to use the device more quickly and efficiently.

In some embodiments, autoplaying the media content corresponding to a respective user interface element (e.g., the first user interface element or the second user interface element) includes gradually increasing the speed of playback of the media content corresponding to the respective user interface element as a parameter of an input changes (1770). For example, gradually starting playback of the media content by increasing the speed of playback from a speed that is lower than a standard playback speed to the standard playback speed where the speed of playback of the media content is dependent on a distance or speed at which the user interface is being scrolled or a distance or speed at which the respective user interface element is being scrolled onto the display. The above-described manner of gradually increasing the playback speed of the media content based on a parameter of user input (e.g., how quickly the user is scrolling through the user interface) allows the electronic device to give the user time to see that the media content is starting to play, that amount of time changing based on the user's input (e.g., less ramp up time if the user is scrolling through the user interface quickly—thus potentially leaving less time that the media content will be visible in the user interface—and more ramp up time if the user is scrolling through the user interface slowly), and thus give the user time to focus on the media content before too much of the media content is played. Such actions optionally simplify interactions between the user and the device and enhance the operability of the device and make the user-device interface more efficient (e.g., by reducing the need for the user to restart playback of the media content due to having missed a portion of it), which, additionally, reduces power usage and improves battery life of the device by enabling the user to use the device more quickly and efficiently.

In some embodiments, the plurality of user interface elements are representations of content items associated with applications including at least one content item that is associated with a plurality of applications (1772) (e.g., as described in greater detail with reference to method 700). In some embodiments, the plurality of user interface elements are representations of applications in an application browsing user interface (1774) (e.g., as described in greater detail with reference to method 900). In some embodiments, the plurality of user interface elements are representations of content from a given application displayed on a product page for the given application (1776). (e.g., as described in greater detail with reference to method 900).

It should be understood that the particular order in which the operations in FIGS. 17A-17G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, 1300 and 1500) are also applicable in an analogous manner to method 1700 described above with respect to FIGS. 17A-17G. For example, the user interfaces, user interface elements, applications, application browsing user interfaces, product pages, etc., described above with reference to method 1700 optionally have one or more of the characteristics of the user interfaces, user interface elements, applications, application browsing user interfaces, product pages, etc. described herein with reference to other methods described herein (e.g., methods 700, 900, 1100, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 17A-17G are, optionally, implemented by components depicted in FIGS. 1A-1B. For example, receiving operation 1702, displaying and autoplaying operation 1704, autoplaying operation 1708 and replaying operation 1710 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and one or more input devices:

displaying, on the display, an application browsing user interface for obtaining applications, for use on the electronic device, that are not already available on the electronic device, wherein displaying the application browsing user interface includes concurrently displaying a plurality of user interface elements corresponding to one or more applications accessible on the electronic device that are different from the application browsing user interface, wherein displaying the plurality of user interface elements includes concurrently displaying:

a first user interface element associated with obtaining authorization to access a first feature of a first application of the plurality of applications, wherein the first user interface element includes a graphic and displaying the graphic of the first user interface element comprises:

in accordance with a determination that the first user interface element is being displayed on a page not dedicated to the first application, displaying the graphic with a first design; and in accordance with a determination that the first user interface element is being displayed on a page dedicated to the first application, displaying the graphic with a second design, different than the first design; and a second user interface element, the second user interface element associated with obtaining a second application of the plurality of applications, wherein the second application is different from the first application;

while displaying the application browsing user interface, receiving, via the one or more input devices, an input at the first user interface element corresponding to a request to obtain authorization to access the first feature of the first application; and in response to receiving the input at the first user interface element corresponding to the request to obtain the authorization to access the first feature of the first application, initiating a process for providing the electronic device with the authorization to access the first feature of the first application.

2. The method of claim 1, wherein:

in accordance with the determination that the first user interface element is being displayed on the page not dedicated to the first application, the graphic includes:

at least a part of an icon of the first application, and an additional graphic that corresponds to the first feature of the first application, and in accordance with the determination that the first user interface element is being displayed on the page dedicated to the first application, the graphic includes the additional graphic that corresponds to the first feature of the first application, but does not include the at least the part of the icon of the first application.

3. The method of claim 1, wherein:

the plurality of user interface elements further includes a third user interface element associated with obtaining authorization to access a second feature of a third application of the plurality of applications, the first user interface element includes a visual indication, the visual indication indicating that the first user interface element is associated with obtaining authorization to access, not a respective application, but a respective feature of the respective application, and the third user interface element includes the visual indication.

4. The method of claim 1, wherein displaying the application browsing user interface further includes concurrently displaying, with the first user interface element, a third user interface element associated with obtaining a subscription to a content provider, the third user interface displaying content from the content provider.

5. The method of claim 1, wherein:

in accordance with a determination that a given feature of a respective application satisfies one or more context criteria, the plurality of user interface elements includes a user interface element associated with obtaining access to the given feature of the respective application; and in accordance with a determination that the given feature of the respective application does not satisfy the one or more context criteria, the plurality of user interface elements does not include the user interface element associated with obtaining access to the given feature of the respective application.

6. The method of claim 1, wherein the process for providing the electronic device with the authorization to access the first feature of the first application includes providing the electronic device with the authorization to access the first feature without displaying the first application on the electronic device.

7. The method of claim 1, wherein the process for providing the electronic device with the authorization to access the first feature of the first application includes:

displaying the first application on the electronic device;

while the first application is displayed on the electronic device, providing the electronic device with the authorization to access the first feature; and after providing the electronic device with the authorization to access the first feature, continuing to display the first application on the electronic device.

8. An electronic device, comprising:

one or more processors;

memory; and one or more programs, wherein the one or more programs are stored in the memory and configured to be executed by the one or more processors, the one or more programs including instructions for:

displaying, on a display, an application browsing user interface for obtaining applications, for use on the electronic device, that are not already available on the electronic device, wherein displaying the application browsing user interface includes concurrently displaying a plurality of user interface elements corresponding to one or more applications accessible on the electronic device that are different from the application browsing user interface, wherein displaying the plurality of user interface elements includes concurrently displaying:

a first user interface element associated with obtaining authorization to access a first feature of a first application of the plurality of applications, wherein the first user interface element includes a graphic and displaying the graphic of the first user interface element comprises:

in accordance with a determination that the first user interface element is being displayed on a page not dedicated to the first application, displaying the graphic with a first design; and in accordance with a determination that the first user interface element is being displayed on a page dedicated to the first application, displaying the graphic with a second design, different than the first design; and a second user interface element, the second user interface element associated with obtaining a second application of the plurality of applications, wherein the second application is different from the first application;

while displaying the application browsing user interface, receiving, via one or more input devices, an input at the first user interface element corresponding to a request to obtain authorization to access the first feature of the first application; and in response to receiving the input at the first user interface element corresponding to the request to obtain the authorization to access the first feature of the first application, initiating a process for providing the electronic device with the authorization to access the first feature of the first application.

9. The electronic device of claim 8, wherein:

in accordance with the determination that the first user interface element is being displayed on the page not dedicated to the first application, the graphic includes: at least a part of an icon of the first application, and an additional graphic that corresponds to the first feature of the first application, and in accordance with the determination that the first user interface element is being displayed on the page dedicated to the first application, the graphic includes the additional graphic that corresponds to the first feature of the first application, but does not include the at least the part of the icon of the first application.

10. The electronic device of claim 8, wherein:

the plurality of user interface elements further includes a third user interface element associated with obtaining authorization to access a second feature of a third application of the plurality of applications, the first user interface element includes a visual indication, the visual indication indicating that the first user interface element is associated with obtaining authorization to access, not a respective application, but a respective feature of the respective application, and the third user interface element includes the visual indication.

11. The electronic device of claim 8, wherein displaying the application browsing user interface further includes concurrently displaying, with the first user interface element, a third user interface element associated with obtaining a subscription to a content provider, the third user interface displaying content from the content provider.

12. The electronic device of claim 8, wherein:

in accordance with a determination that a given feature of a respective application satisfies one or more context criteria, the plurality of user interface elements includes a user interface element associated with obtaining access to the given feature of the respective application; and in accordance with a determination that the given feature of the respective application does not satisfy the one or more context criteria, the plurality of user interface elements does not include the user interface element associated with obtaining access to the given feature of the respective application.

13. The electronic device of claim 8, wherein the process for providing the electronic device with the authorization to access the first feature of the first application includes providing the electronic device with the authorization to access the first feature without displaying the first application on the electronic device.

14. The electronic device of claim 8, wherein the process for providing the electronic device with the authorization to access the first feature of the first application includes:

displaying the first application on the electronic device;

while the first application is displayed on the electronic device, providing the electronic device with the authorization to access the first feature; and after providing the electronic device with the authorization to access the first feature, continuing to display the first application on the electronic device.

15. A non-transitory computer readable storage medium storing one or more programs, the one or more programs comprising instructions, which when executed by one or more processors of an electronic device, cause the electronic device to:

display, on a display, an application browsing user interface for obtaining applications, for use on the electronic device, that are not already available on the electronic device, wherein displaying the application browsing user interface includes concurrently displaying a plurality of user interface elements corresponding to one or more applications accessible on the electronic device that are different from the application browsing user interface, wherein displaying the plurality of user interface elements includes concurrently displaying:

a first user interface element, the first user interface element associated with obtaining authorization to access a first feature of a first application of the plurality of applications, wherein the first user interface element includes a graphic and displaying the graphic of the first user interface element comprises:

in accordance with a determination that the first user interface element is being displayed on a page not dedicated to the first application, displaying the graphic with a first design; and in accordance with a determination that the first user interface element is being displayed on a page dedicated to the first application, displaying the graphic with a second design, different than the first design; and a second user interface element, the second user interface element associated with obtaining a second application of the plurality of applications, wherein the second application is different from the first application;

while displaying the application browsing user interface, receive, via one or more input devices, an input at the first user interface element corresponding to a request to obtain authorization to access the first feature of the first application; and in response to receiving the input at the first user interface element corresponding to the request to obtain the authorization to access the first feature of the first application, initiate a process for providing the electronic device with the authorization to access the first feature of the first application.

16. The non-transitory computer readable storage medium of claim 15, wherein:

in accordance with the determination that the first user interface element is being displayed on the page not dedicated to the first application, the graphic includes: at least a part of an icon of the first application, and an additional graphic that corresponds to the first feature of the first application, and in accordance with the determination that the first user interface element is being displayed on the page dedicated to the first application, the graphic includes the additional graphic that corresponds to the first feature of the first application, but does not include the at least the part of the icon of the first application.

17. The non-transitory computer readable storage medium of claim 15, wherein:

the plurality of user interface elements further includes a third user interface element associated with obtaining authorization to access a second feature of a third application of the plurality of applications, the first user interface element includes a visual indication, the visual indication indicating that the first user interface element is associated with obtaining authorization to access, not a respective application, but a respective feature of the respective application, and the third user interface element includes the visual indication.

18. The non-transitory computer readable storage medium of claim 15, wherein displaying the application browsing user interface further includes concurrently displaying, with the first user interface element, a third user interface element associated with obtaining a subscription to a content provider, the third user interface displaying content from the content provider.

19. The non-transitory computer readable storage medium of claim 15, wherein:

in accordance with a determination that a given feature of a respective application satisfies one or more context criteria, the plurality of user interface elements includes a user interface element associated with obtaining access to the given feature of the respective application; and in accordance with a determination that the given feature of the respective application does not satisfy the one or more context criteria, the plurality of user interface elements does not include the user interface element associated with obtaining access to the given feature of the respective application.

20. The non-transitory computer readable storage medium of claim 15, wherein the process for providing the electronic device with the authorization to access the first feature of the first application includes providing the electronic device with the authorization to access the first feature without displaying the first application on the electronic device.

21. The non-transitory computer readable storage medium of claim 15, wherein the process for providing the electronic device with the authorization to access the first feature of the first application includes:

displaying the first application on the electronic device;

while the first application is displayed on the electronic device, providing the electronic device with the authorization to access the first feature; and after providing the electronic device with the authorization to access the first feature, continuing to display the first application on the electronic device.

* * * * *